US011549409B2

(12) United States Patent
Looney

(10) Patent No.: US 11,549,409 B2
(45) Date of Patent: Jan. 10, 2023

(54) INTERNAL COMBUSTION ENGINE VALVE SYSTEM AND METHOD

(71) Applicant: LSE R&D ENGINEERING LIMITED, Kowloon (HK)

(72) Inventor: Allen Eugene Looney, Kowloon (HK)

( * ) Notice: Subject to any disclaimer, the term of this patent is extended or adjusted under 35 U.S.C. 154(b) by 0 days.

(21) Appl. No.: 17/875,839

(22) Filed: Jul. 28, 2022

(65) Prior Publication Data

US 2022/0372897 A1 Nov. 24, 2022

Related U.S. Application Data

(60) Continuation-in-part of application No. 17/572,264, filed on Jan. 10, 2022, now Pat. No. 11,486,275, and (Continued)

(51) Int. Cl.
*F01L 7/18* (2006.01)
*F01L 7/06* (2006.01)
(Continued)

(52) U.S. Cl.
CPC ................ *F01L 7/18* (2013.01); *F01L 1/026* (2013.01); *F01L 1/12* (2013.01); *F01L 1/267* (2013.01);
(Continued)

(58) Field of Classification Search
CPC ... F01L 1/12; F01L 1/026; F01L 1/267; F01L 7/06; F01L 7/14; F01L 7/18; F02F 1/22; F02F 7/0043; F16H 1/06
See application file for complete search history.

(56) References Cited

U.S. PATENT DOCUMENTS 1,766,101 A 6/1930 Bowen
3,522,797 A 8/1970 Stinebaugh
(Continued)

FOREIGN PATENT DOCUMENTS

DE 19931129 A1 1/2000
GB 2465188 A 5/2010
WO WO-2005080759 A1 * 9/2005 ............. F01L 7/028

OTHER PUBLICATIONS

R. Shriram et al., Design and Development of Camless Valve Train for I.C. Engines, Article, International Review of Mechanical Engineering vol. 6, N. 5, 6 pages, © 2012, Praise Worthy Prize.
(Continued)

*Primary Examiner* — Grant Moubry
(74) *Attorney, Agent, or Firm* — Kevin Mark Klughart

(57) ABSTRACT

A valve system/method suitable for an internal combustion engine (ICE), compressor pump, vacuum pump, and/or reciprocating mechanical device is disclosed. The system/method is optimized for construction of a four-stroke ICE. The rudimentary system incorporates an intake engine block cover (IEC) and exhaust engine block cover (EEC) that enclose an intake rotary valve disc (IVD) and exhaust rotary valve disc (EVD) that control intake/exhaust flow through a respective intake rotary valve port (IVP) and an exhaust rotary valve port (EVP) into and out of a combustion cylinder that provides power to a piston and crankshaft. An intake multi-staged valve (IMV) and exhaust multi-staged valve (EMV) provide intake and exhaust flow control for the IVD/IVP and EVD/EVP. An enhanced system may include a variety of intake/exhaust port seals (IPS/EPS), forced induction/discharge (FIN), centrifugal advance (CAD), and/or cooling channel spool (ICS/ECS).

24 Claims, 256 Drawing Sheets

Related U.S. Application Data a continuation-in-part of application No. 17/572,074, filed on Jan. 10, 2022, now Pat. No. 11,492,933, which is a continuation-in-part of application No. 16/509,156, filed on Jul. 11, 2019, now Pat. No. 11,220,934, which is a continuation-in-part of application No. 17/028,028, filed on Sep. 22, 2020, now Pat. No. 11,401,840, and a continuation-in-part of application No. 17/028,028, filed on Sep. 22, 2020, now Pat. No. 11,401,840, which is a continuation-in-part of application No. 16/509,156, filed on Jul. 11, 2019, now Pat. No. 11,220,934, which is a division of application No. 16/509,156, filed on Jul. 11, 2019, now Pat. No. 11,220,934.

(60) Provisional application No. 62/697,183, filed on Jul. 12, 2018.

(51) Int. Cl.

| | |
|---|---|
| ***F01L 1/02*** | (2006.01) |
| ***F01L 1/12*** | (2006.01) |
| ***F01L 1/26*** | (2006.01) |
| ***F16H 1/06*** | (2006.01) |
| ***F02F 1/22*** | (2006.01) |
| ***F01L 7/14*** | (2006.01) |
| ***F02F 7/00*** | (2006.01) |

(52) U.S. Cl.

CPC .................. *F01L 7/06* (2013.01); *F01L 7/14* (2013.01); *F02F 1/22* (2013.01); *F02F 7/0043* (2013.01); *F16H 1/06* (2013.01)

(56) References Cited

U.S. PATENT DOCUMENTS

| | | | | |
|---|---|---|---|---|
| 4,163,438 | A | 8/1979 | Guenther et al. | |
| 4,373,476 | A | 2/1983 | Vervoordt et al. | |
| 4,494,500 | A | 1/1985 | Hansen | |
| 4,879,979 | A | 11/1989 | Triguero | |
| 5,535,715 | A | 7/1996 | Mouton | |
| 5,890,462 | A * | 4/1999 | Bassett | F02B 75/26 123/56.7 |
| 5,967,108 | A | 10/1999 | Kutlucinar | |
| 5,988,133 | A | 11/1999 | Agapiades et al. | |
| 6,390,048 | B1 | 5/2002 | Luchansky | |
| 6,467,455 | B1 | 10/2002 | Posh | |
| 6,578,538 | B2 | 6/2003 | Trantham | |
| 6,591,794 | B2 | 7/2003 | Toda | |
| 7,140,342 | B1 | 11/2006 | Murray | |
| 7,421,995 | B2 | 9/2008 | Zajac et al. | |
| 7,685,986 | B2 | 3/2010 | Agapiades | |
| 9,194,264 | B2 | 11/2015 | Khajepour et al. | |
| 9,677,434 | B2 * | 6/2017 | Pattakos | F01L 7/027 |
| 2005/0184269 | A1 * | 8/2005 | Agapiades | F01L 7/18 251/314 |
| 2013/0327291 | A1 * | 12/2013 | Pett, Jr. | F02B 19/00 123/253 |

OTHER PUBLICATIONS

Wikipedia webpages, Two-Stroke (or two-cycle) Engine, 15 pages n.m.wikipedia.org/wiki/Two-stroke_engine, Jun. 17, 2019.

Subhash Chandar et al., "Design of a Camless Rotating Cylinder Engine," 3 pages, Abstract, International Journal of Emerging Technology, Jan. 2010.

PCT/US2019/041534 International Search Report and Written Opinion, dated Oct. 1, 2019, 13 pages.

* cited by examiner

0500

1100

1600

4800

5000

6400

7500

7700

9300

9900

10100

11700

11800

11900

12300

12400

12500

13100

13400

14300

16300

16400

17100

17500

17600

17800

18200

18300

18900

19000

19100

19500

19700

20300

20800

21400

22700

22900

24800

25100

25300

25400

Prior Art

INTERNAL COMBUSTION ENGINE VALVE SYSTEM AND METHOD

CROSS REFERENCE TO RELATED APPLICATIONS

Continuation-In-Part

This patent application is a Continuation-In-Part (CIP) patent application of and includes by reference parent United States Utility patent application for APPARATUS AND METHOD FOR VALVE TIMING IN AN INTERNAL COMBUSTION ENGINE by inventor Allen Eugene Looney, filed with the USPTO on 2020 Sep. 22, with Ser. No. 17/028,028, EFS ID 40627326, confirmation number 4029, issued as U.S. Pat. No. 11,401,840 on 2022-08-02.

This patent application is a Continuation-In-Part (CIP) patent application of and includes by reference parent United States Utility patent application for VALVE TIMING SYSTEM AND METHOD by inventor Allen Eugene Looney, filed with the USPTO on 2022 Jan. 10, with Ser. No. 17/572,074, EFS ID 44708078, confirmation number 8641.

This patent application is a Continuation-In-Part (CIP) patent application of and includes by reference parent United States Utility patent application for VALVE TIMING SYSTEM AND METHOD by inventor Allen Eugene Looney, filed with the USPTO on 2022 Jan. 10, with Ser. No. 17/572,264, EFS ID 44709906, confirmation number 6377.

U.S. Patent Applications

United States Utility patent application for VALVE TIMING SYSTEM AND METHOD by inventor Allen Eugene Looney, filed with the USPTO on 2022 Jan. 10, with Ser. No. 17/572,264, EFS ID 44709906, confirmation number 6377 is a Continuation-In-Part (CIP) of and includes by reference parent United States Utility patent application for APPARATUS AND METHOD FOR VALVE TIMING IN AN INTERNAL COMBUSTION ENGINE by inventor Allen Eugene Looney, filed with the USPTO on 2020 Sep. 22, with Ser. No. 17/028,028, EFS ID 40627326, confirmation number 4029, issued as U.S. Pat. No. 11,401,840 on 2022-08-02.

United States Utility patent application for VALVE TIMING SYSTEM AND METHOD by inventor Allen Eugene Looney, filed with the USPTO on 2022 Jan. 10, with Ser. No. 17/572,264, EFS ID 44709906, confirmation number 6377 is a Continuation-In-Part (CIP) of and includes by reference parent United States Utility patent application for INTAKE AND EXHAUST VALVE SYSTEM FOR AN INTERNAL COMBUSTION ENGINE by inventor Allen Eugene Looney, filed with the USPTO on 2019 Jul. 11, with Ser. No. 16/509,156, EFS ID 36560751, confirmation number 1060, issued as U.S. Pat. No. 11,220,934 on 2022-01-11.

United States Utility patent application for VALVE TIMING SYSTEM AND METHOD by inventor Allen Eugene Looney, filed with the USPTO on 2022 Jan. 10, with Ser. No. 17/572,074, EFS ID 44708078, confirmation number 8641 is a divisional patent application (DPA) of and includes by reference parent United States Utility patent application for INTAKE AND EXHAUST VALVE SYSTEM FOR AN INTERNAL COMBUSTION ENGINE by inventor Allen Eugene Looney, filed with the USPTO on 2019 Jul. 11, with Ser. No. 16/509,156, EFS ID 36560751, confirmation number 1060, issued as U.S. Pat. No. 11,220,934 on 2022-01-11.

United States Utility patent application for APPARATUS AND METHOD FOR VALVE TIMING IN AN INTERNAL COMBUSTION ENGINE by inventor Allen Eugene Looney, filed with the USPTO on 2020 Sep. 22, with Ser. No. 17/028,028, EFS ID 40627326, confirmation number 4029, issued as U.S. Pat. No. 11,401,840 on 2022-08-02 is a Continuation-In-Part (CIP) patent application and incorporates by reference United States Utility patent application for INTAKE AND EXHAUST VALVE SYSTEM FOR AN INTERNAL COMBUSTION ENGINE by inventor Allen Eugene Looney, filed with the USPTO on 2019 Jul. 11, with Ser. No. 16/509,156, EFS ID 36560751, confirmation number 1060, issued as U.S. Pat. No. 11,220,934 on 2022-01-11.

Provisional Patent Applications

United States Utility patent application for INTAKE AND EXHAUST VALVE SYSTEM FOR AN INTERNAL COMBUSTION ENGINE by inventor Allen Eugene Looney, filed with the USPTO on 2019 Jul. 11, with Ser. No. 16/509,156, EFS ID 36560751, confirmation number 1060, issued as U.S. Pat. No. 11,220,934 on 2022-01-11, claims benefit under 35 U.S.C. § 119 and incorporates by reference United States Provisional Patent application for VALVE SYSTEM FOR AN INTERNAL COMBUSTION ENGINE by inventor Allen Eugene Looney, filed electronically with the USPTO on 2018 Jul. 12, with Ser. No. 62/697,183, EFS ID 33164853, confirmation number 3188.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention relates to a valve system and method that may be utilized in a variety of mechanical devices. Specifically, and without limitation, the present invention relates to a valve system and method that may be utilized in an internal combustion engine (ICE), compressor pump, vacuum pump, and/or reciprocating mechanical device. Without limitation, the present invention is particularly suited to construction of a four-stroke internal combustion engine.

BACKGROUND AND PRIOR ART

The closest related arts are found in U.S. Pat. No. 6,467,455 issued on Oct. 22, 2002 for FOUR-STROKE INTERNAL COMBUSTION ENGINE to Raymond C. Posh; U.S.

Pat. No. 4,418,658 issued on Dec. 6, 1983 for ENGINE VALVE to James DIROSS; and U.S. Pat. No. 9,677,434 issued on Jun. 13, 2017 for DISK ROTARY VALVE HAVING OPPOSED ACTING FRONTS to Pattakos, et al. Citations herein to "POSH", "DIROSS", and "PATTAKOS" are in reference to these patents respectively.

BRIEF SUMMARY OF THE INVENTION

The present invention pertains to a system and method wherein one or more rotary valve discs (RVD) are used to control the combustion cycle of an internal combustion engine (ICE), compressor pump, vacuum pump, and/or reciprocating mechanical device. The present invention is best described in terms of a rudimentary embodiment and an enhanced embodiment. The rudimentary embodiment incorporates the basic engine construction while the enhanced embodiment incorporates advanced features that may or may not be individually or corporately incorporated into the overall system design. While a variety of application contexts for the present invention are possible, the overall the system is generally optimized for construction of a 4-stroke ICE.

With respect to the rudimentary invention embodiment, the system incorporates an intake engine block cover (IEC) and exhaust engine block cover (EEC) that enclose an intake rotary valve disc (IVD) and exhaust rotary valve disc (EVD) that control intake/exhaust flow through a respective intake rotary valve port (IVP) and an exhaust rotary valve port (EVP) into and out of a combustion chamber that provides power to a piston and crankshaft, which are elements comprising the power drive train (PDT). An intake multi-staged valve (IMV) and exhaust multi-staged valve (EMV) provide intake and exhaust flow control for the IVD/IVP and EVD/EVP.

With respect to the enhanced invention embodiment, the rudimentary system may be augmented to include a variety of intake/exhaust port seals (ISP/ESP), forced induction (FIN)/forced discharge (FID), centrifugal advance (CAD), crankcase oil reservoir, and/or cooling channel spool (CCS) capabilities.

BRIEF DESCRIPTION OF THE DRAWINGS

For a fuller understanding of the advantages provided by the invention, reference should be made to the following detailed description together with the accompanying drawings wherein:

FIG. 119 illustrates a bottom left rear perspective isometric view of an internal construction of a multi-staged valve (MSV) assembly embodiment of a preferred exemplary invention system embodiment;

FIG. 120 illustrates a bottom right front perspective isometric view of an internal construction of a multi-staged valve (MSV) assembly embodiment of a preferred exemplary invention system embodiment;

FIG. 121 illustrates a front perspective view of an engine block cover, intake (IEC) and exhaust (EEC) embodiment of a preferred exemplary rudimentary invention system embodiment;

FIG. 122 illustrates a back perspective view of an engine block cover, intake (IEC) and exhaust (EEC) embodiment of a preferred exemplary rudimentary invention system embodiment;

FIG. 123 illustrates a bottom right front perspective isometric view of an engine block cover, intake (IEC) and exhaust (EEC) embodiment of a preferred exemplary rudimentary invention system embodiment;

FIG. 124 illustrates a top right front perspective isometric view of an engine block cover, intake (IEC) and exhaust (EEC) embodiment of a preferred exemplary rudimentary invention system embodiment;

FIG. 125 illustrates a bottom left rear perspective isometric view of an engine block cover, intake (IEC) and exhaust (EEC) embodiment of a preferred exemplary rudimentary invention system embodiment;

FIG. 126 illustrates a top left rear perspective isometric view of an engine block cover, intake (IEC) and exhaust (EEC) embodiment of a preferred exemplary rudimentary invention system embodiment;

FIG. 127 illustrates a bottom right rear perspective isometric view of an engine block cover, intake (IEC) and exhaust (EEC) embodiment of a preferred exemplary rudimentary invention system embodiment;

FIG. 128 illustrates a top right rear perspective isometric view of an engine block cover, intake (IEC) and exhaust (EEC) embodiment of a preferred exemplary rudimentary invention system embodiment;

FIG. 129 illustrates front view of a preferred exemplary enhanced invention system embodiment engine block (BLK) system embodiment;

FIG. 130 illustrates back view of a preferred exemplary enhanced invention system embodiment engine block (BLK) system embodiment;

Figure 131:
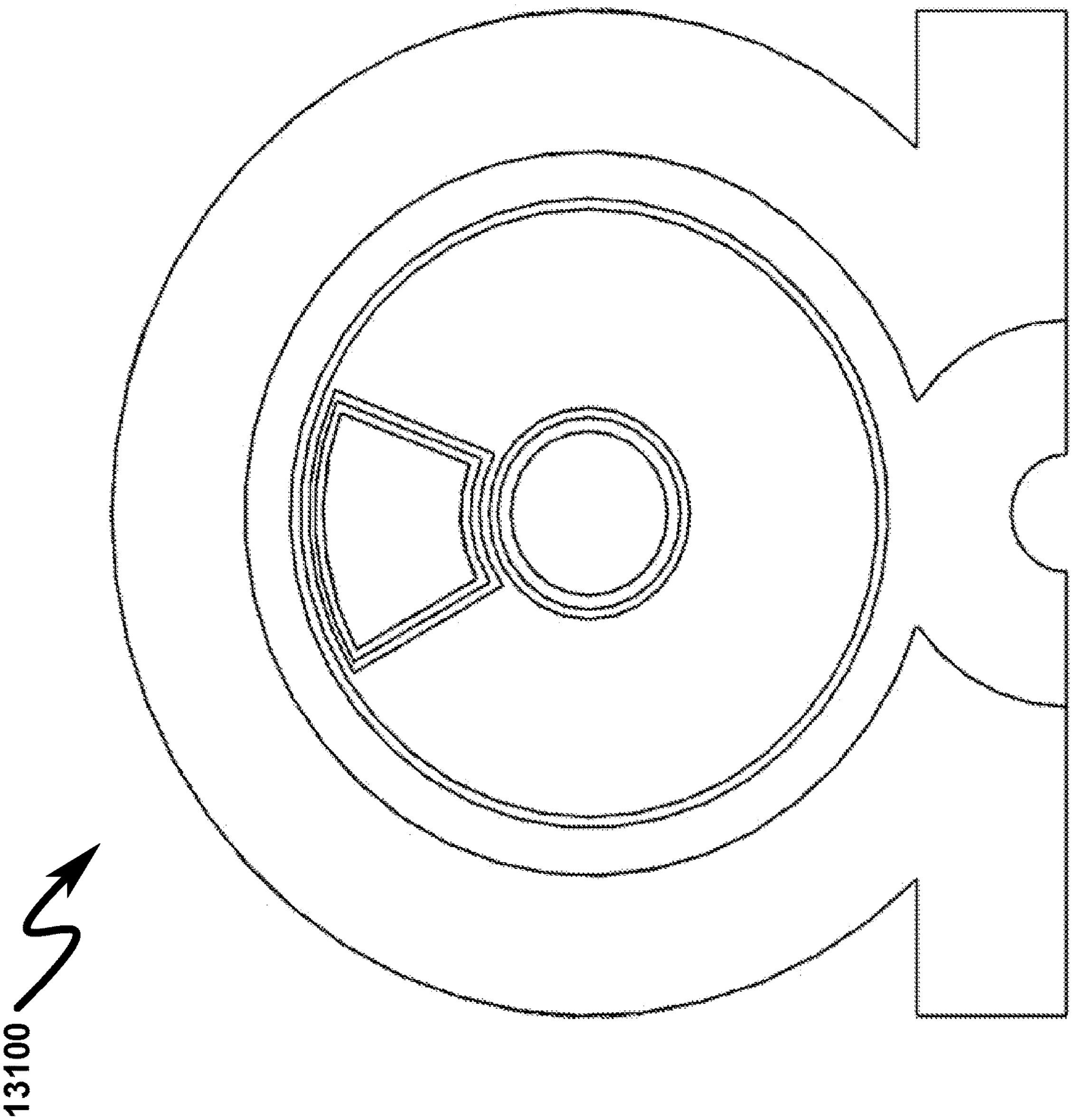
Figure 132:
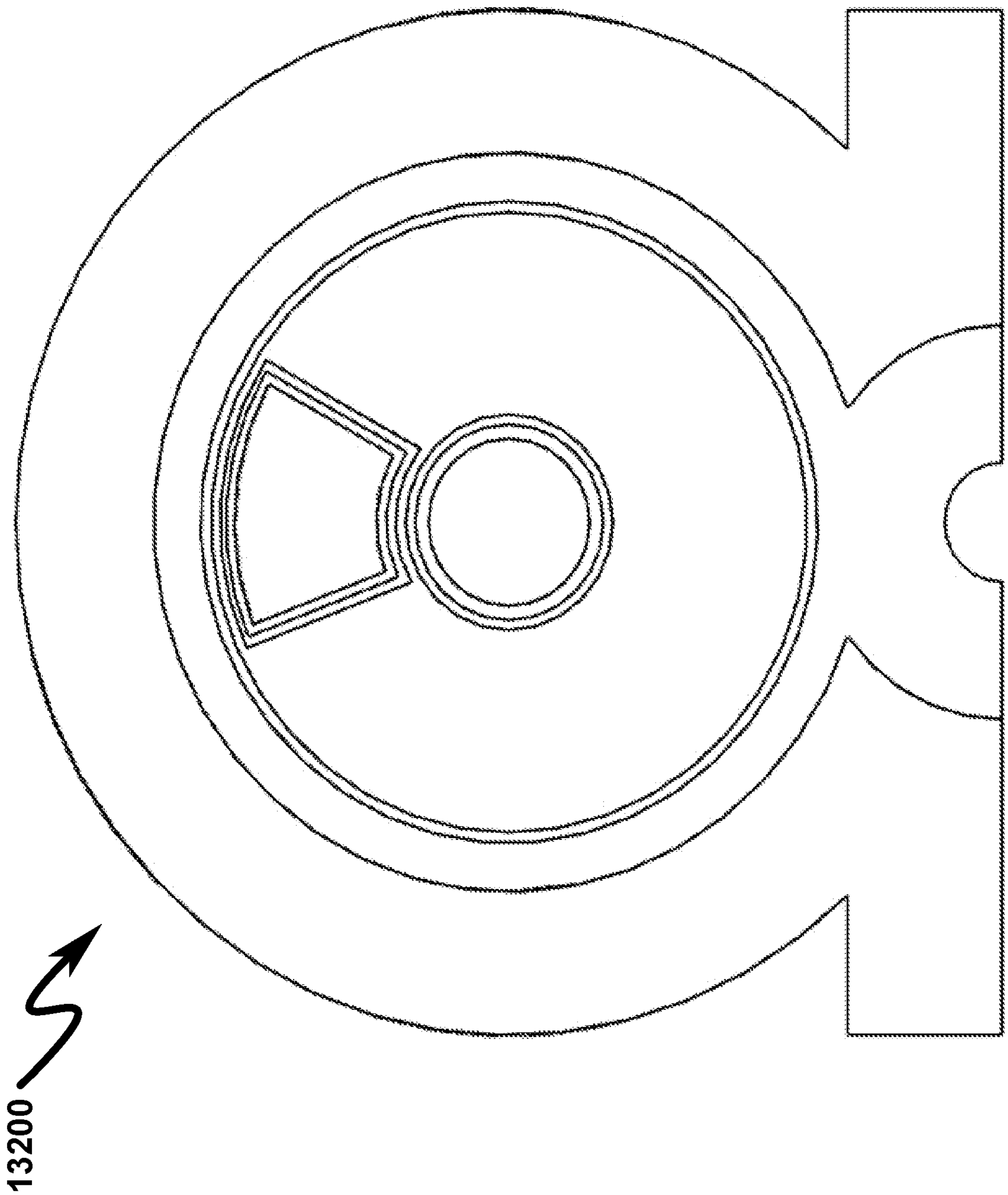
Figure 133:
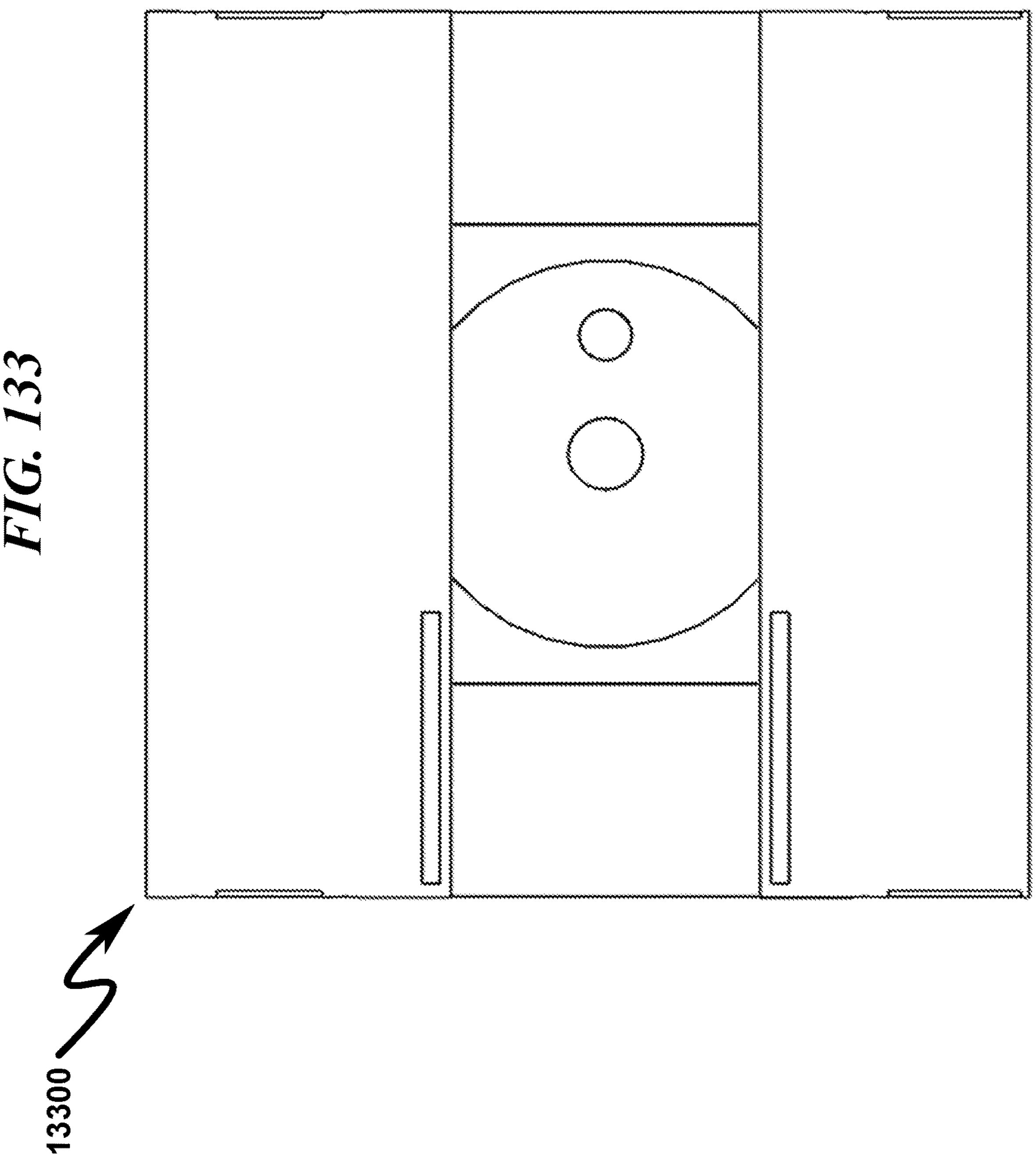
Figure 134:
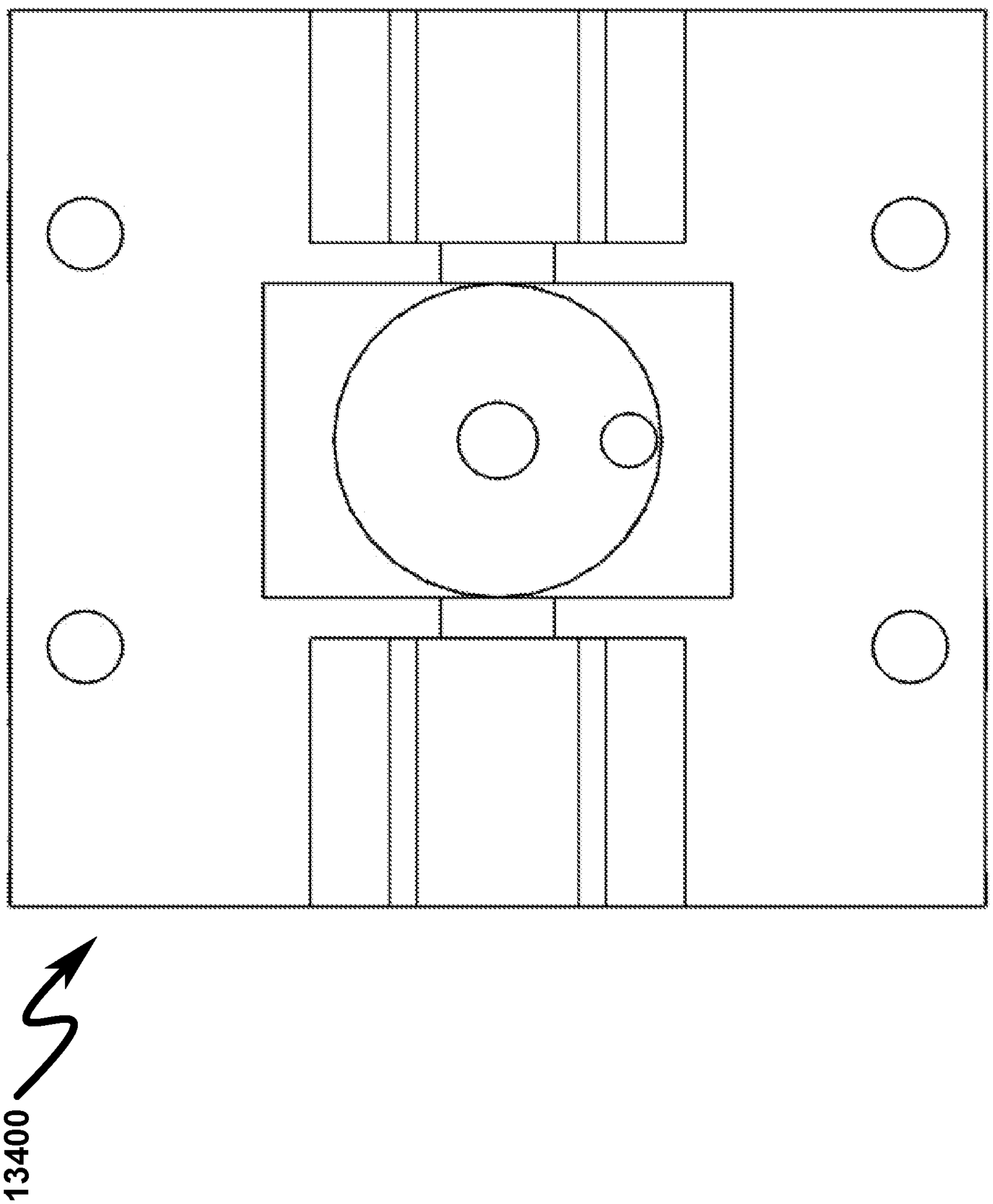
Figure 135:
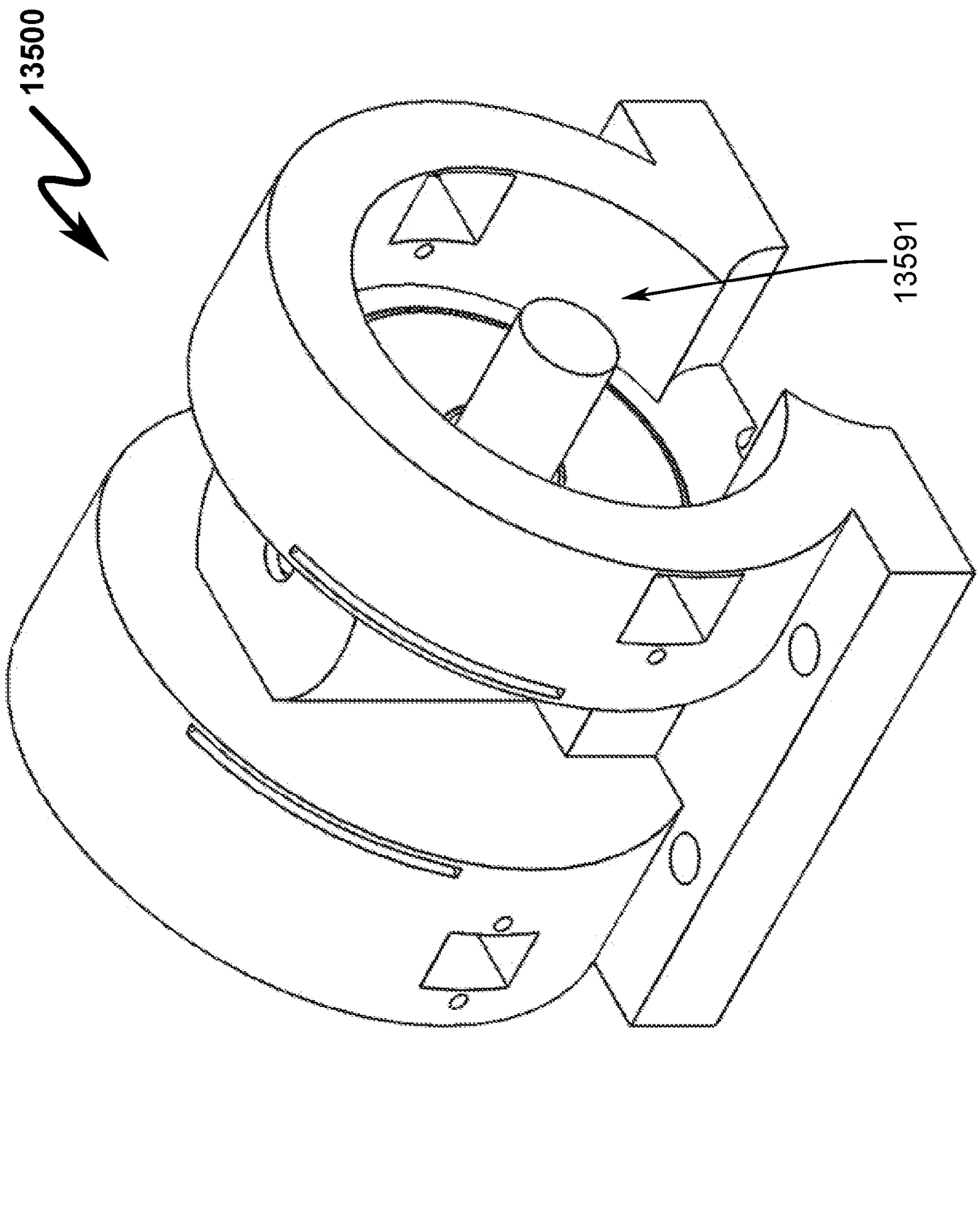
Figure 136:
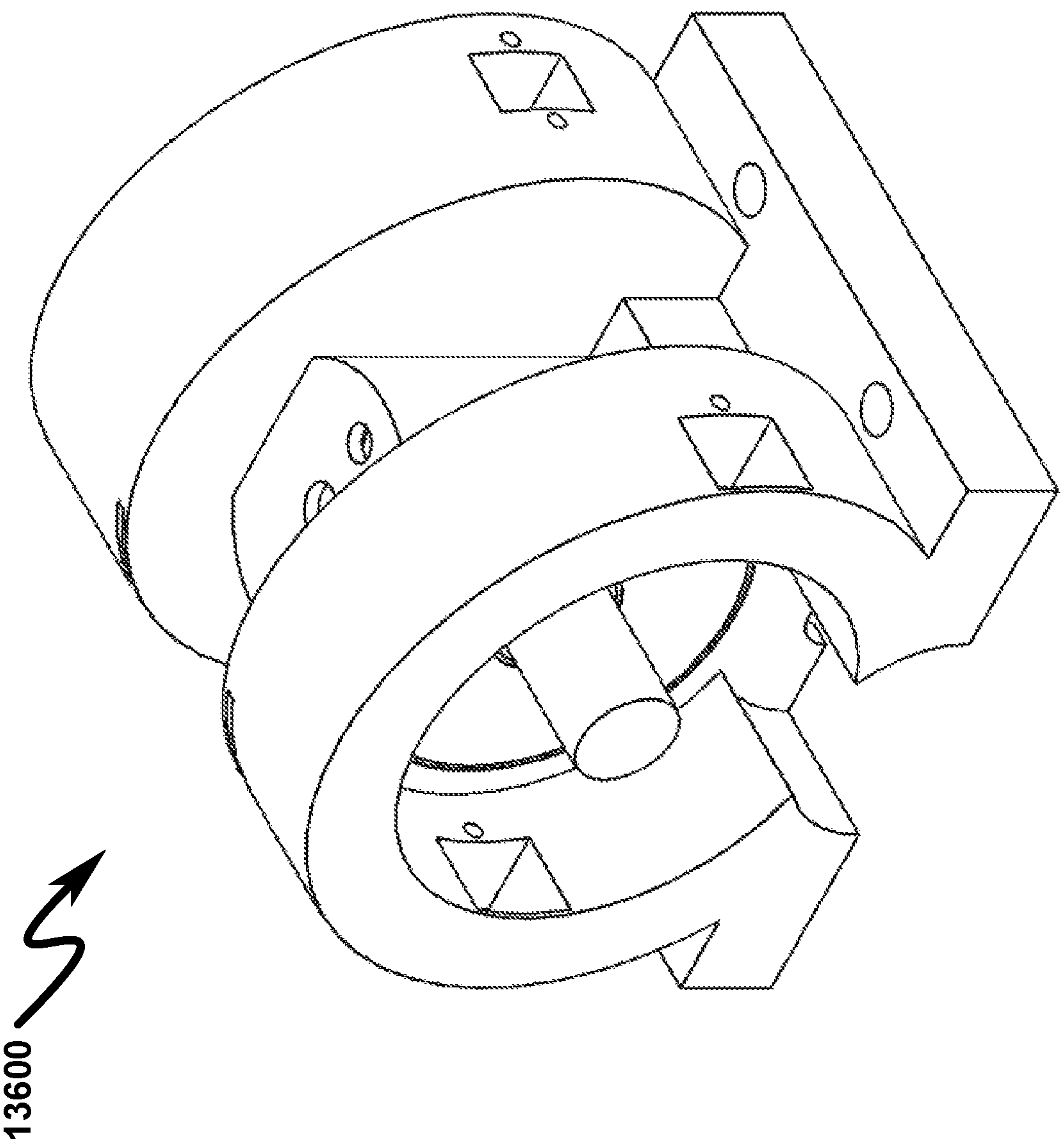
Figure 137:
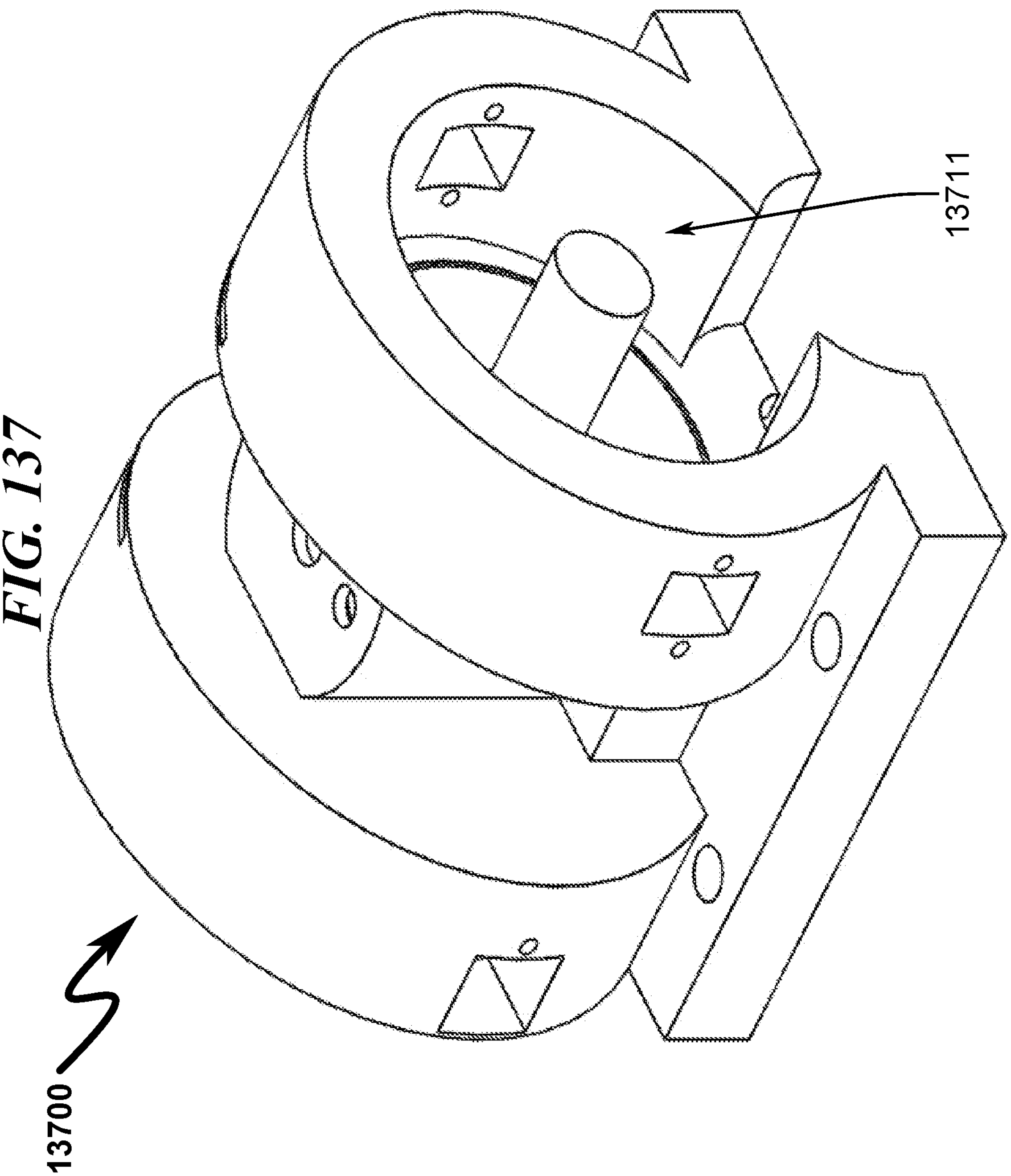
Figure 138:
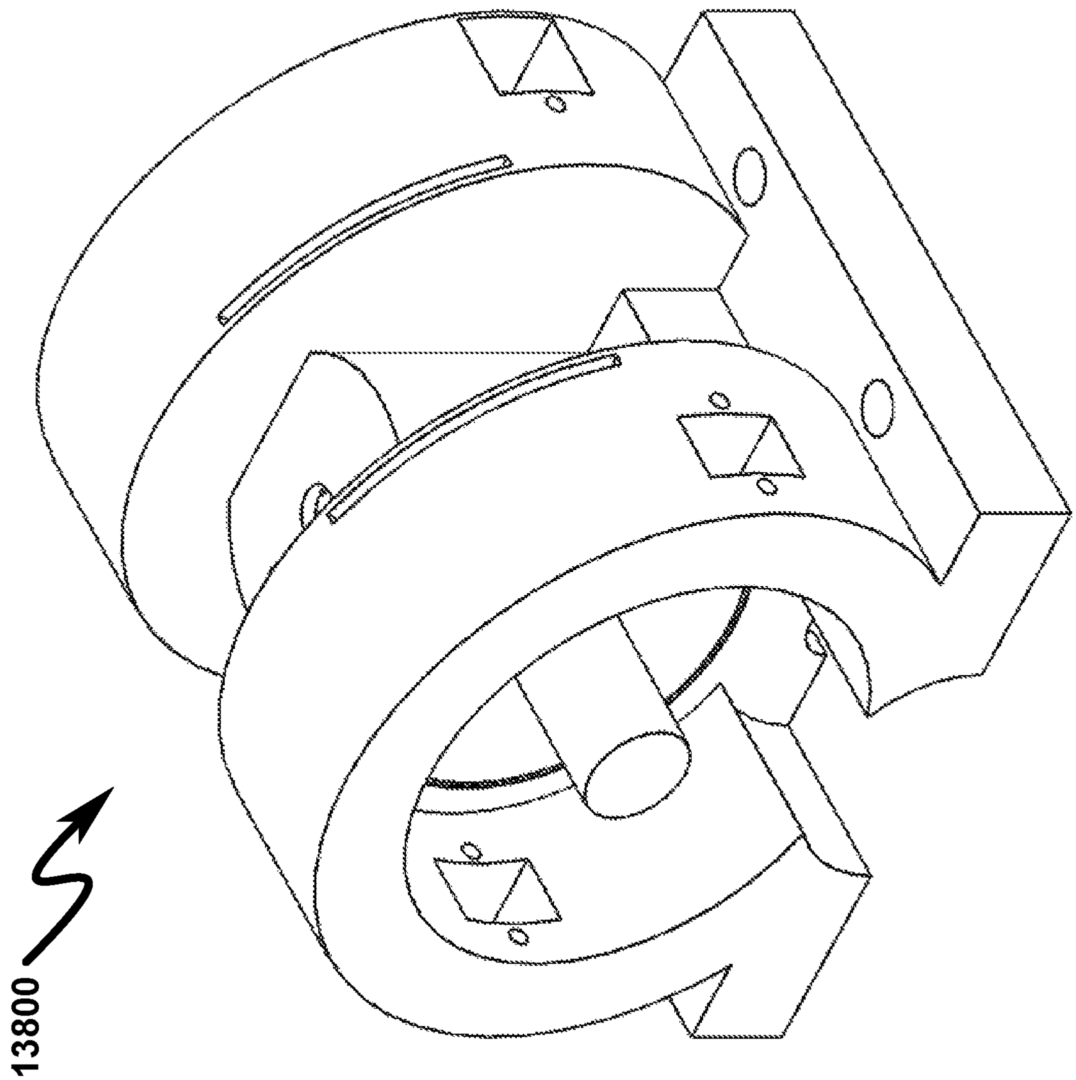
Figure 139:
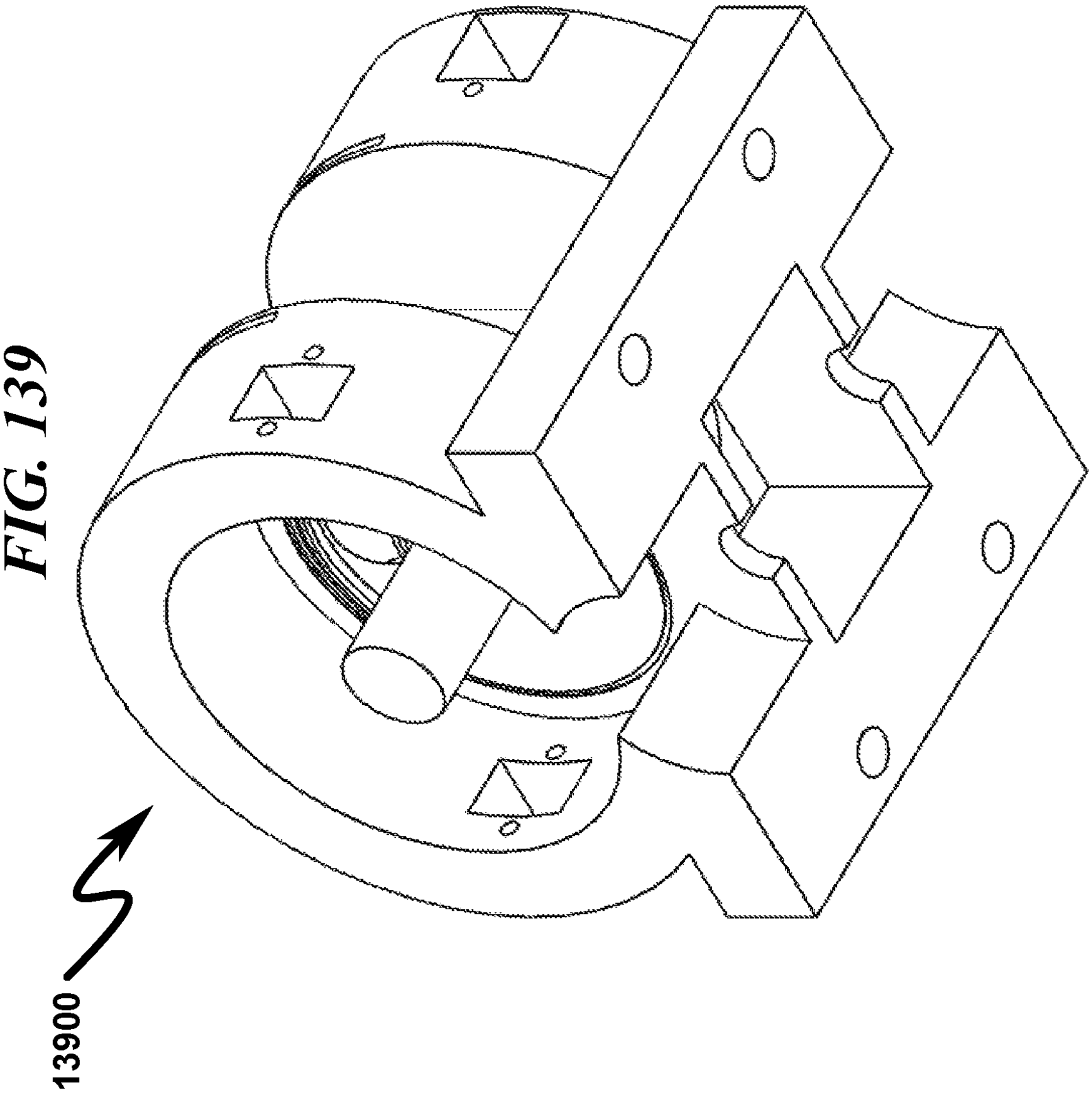
Figure 140:
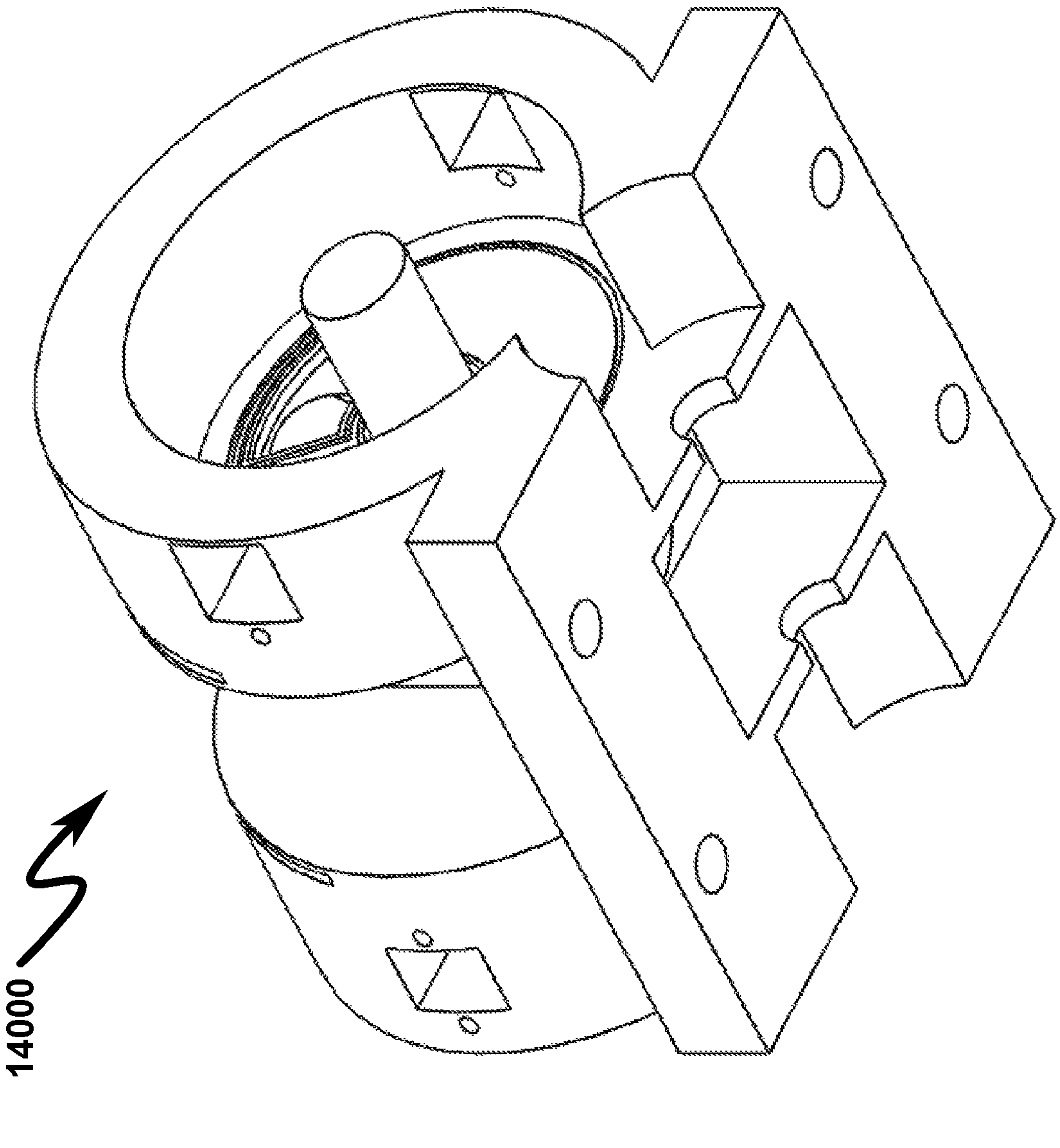
Figure 141:
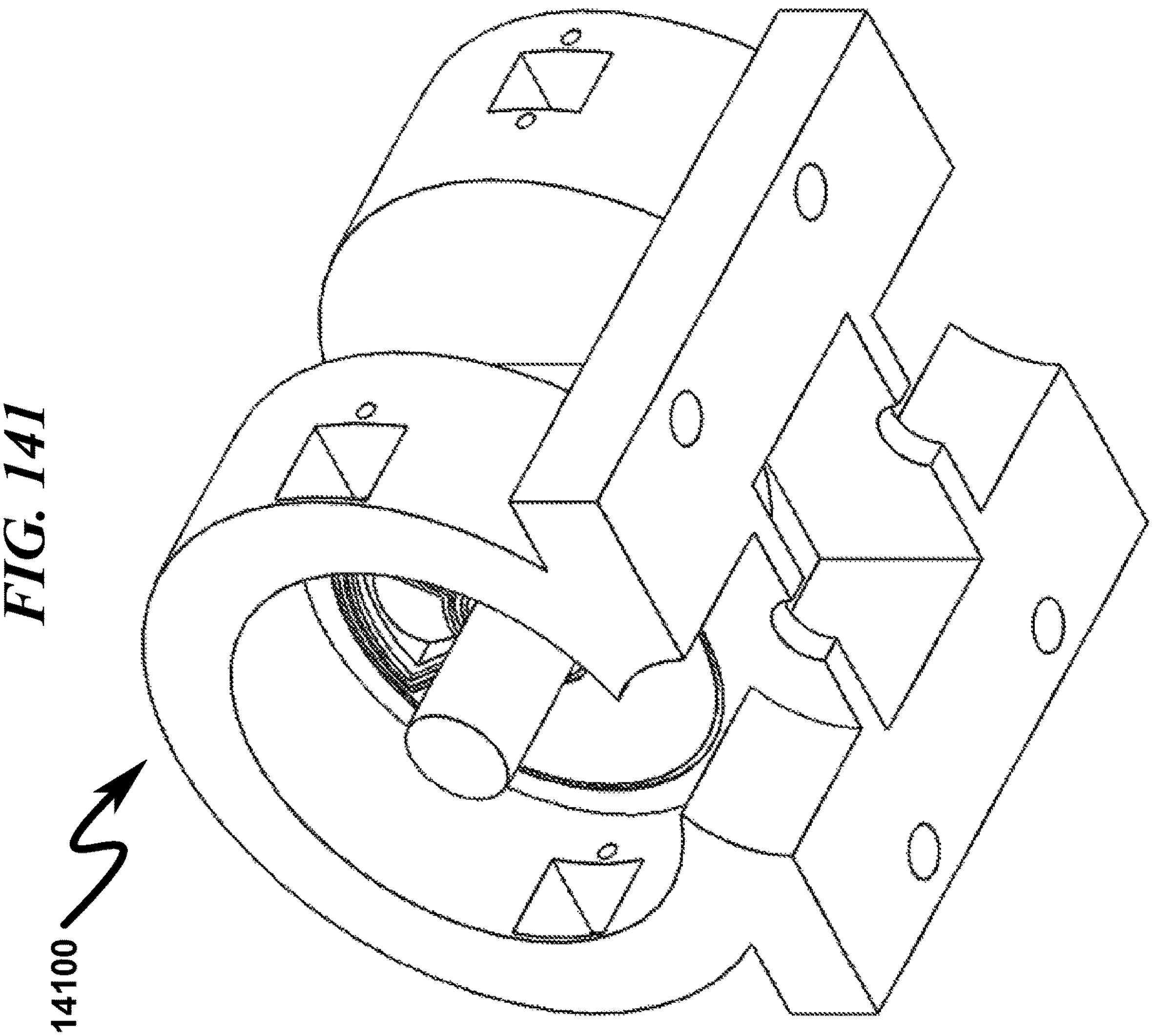
Figure 142:
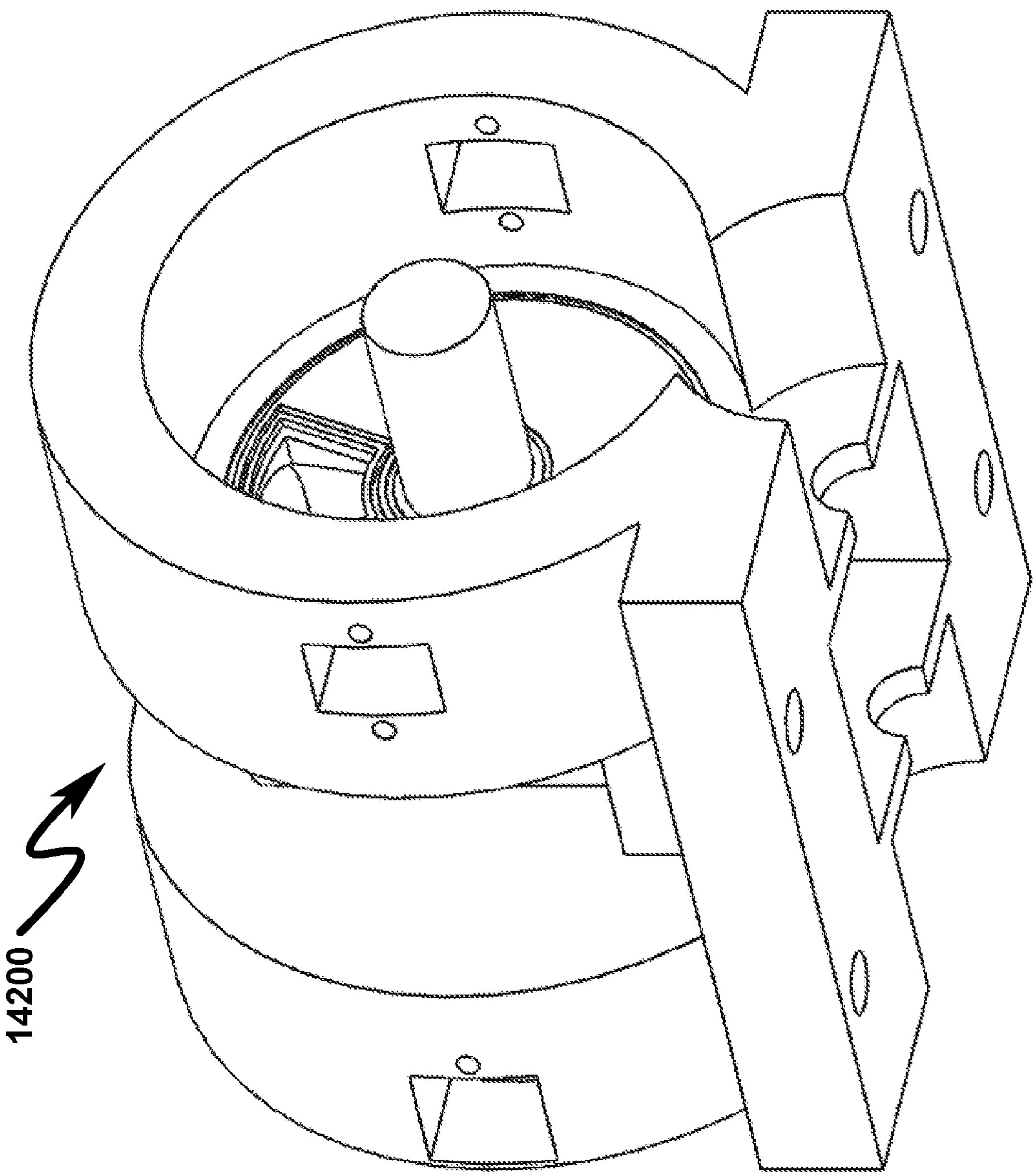
Figure 143:
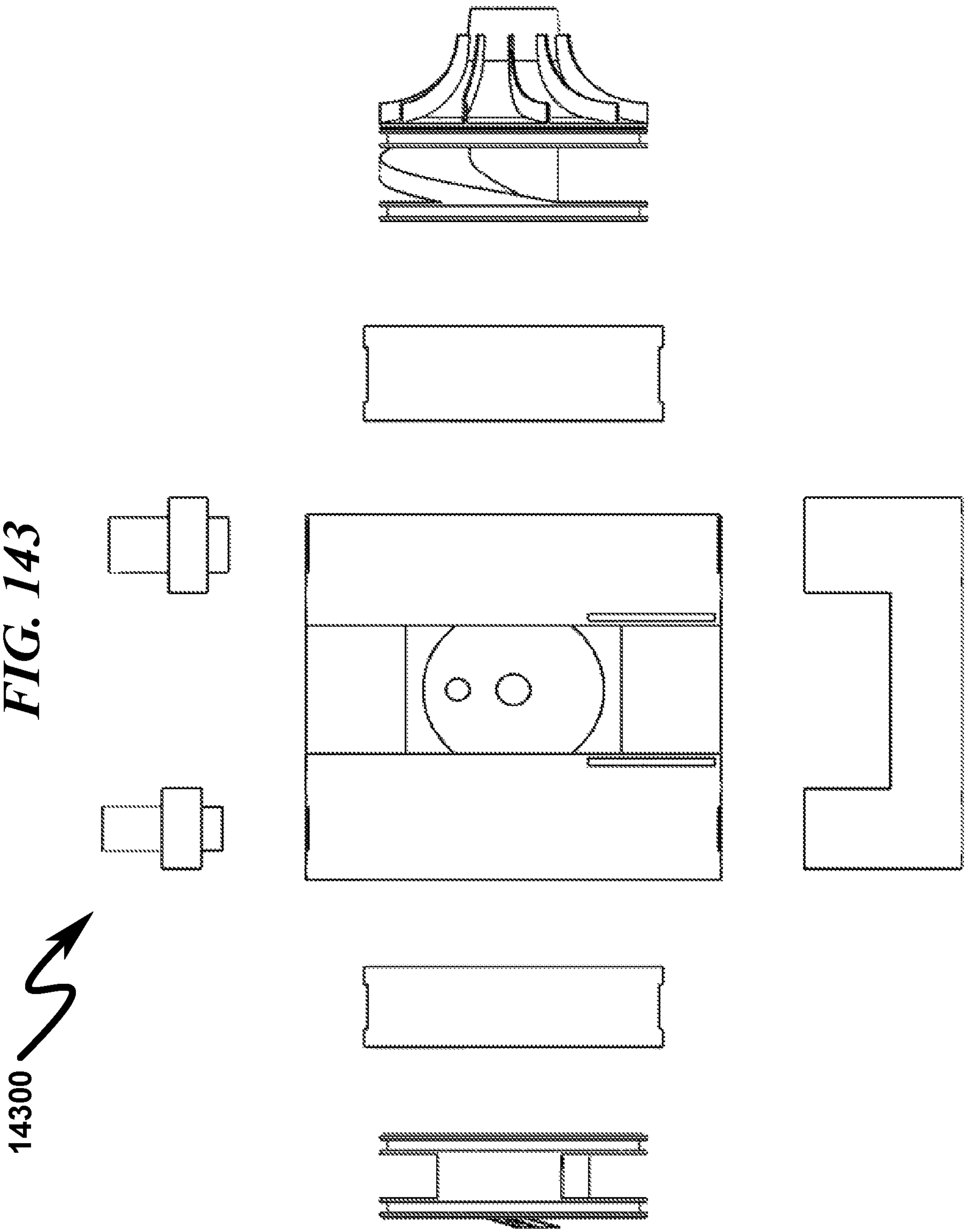
Figure 144:
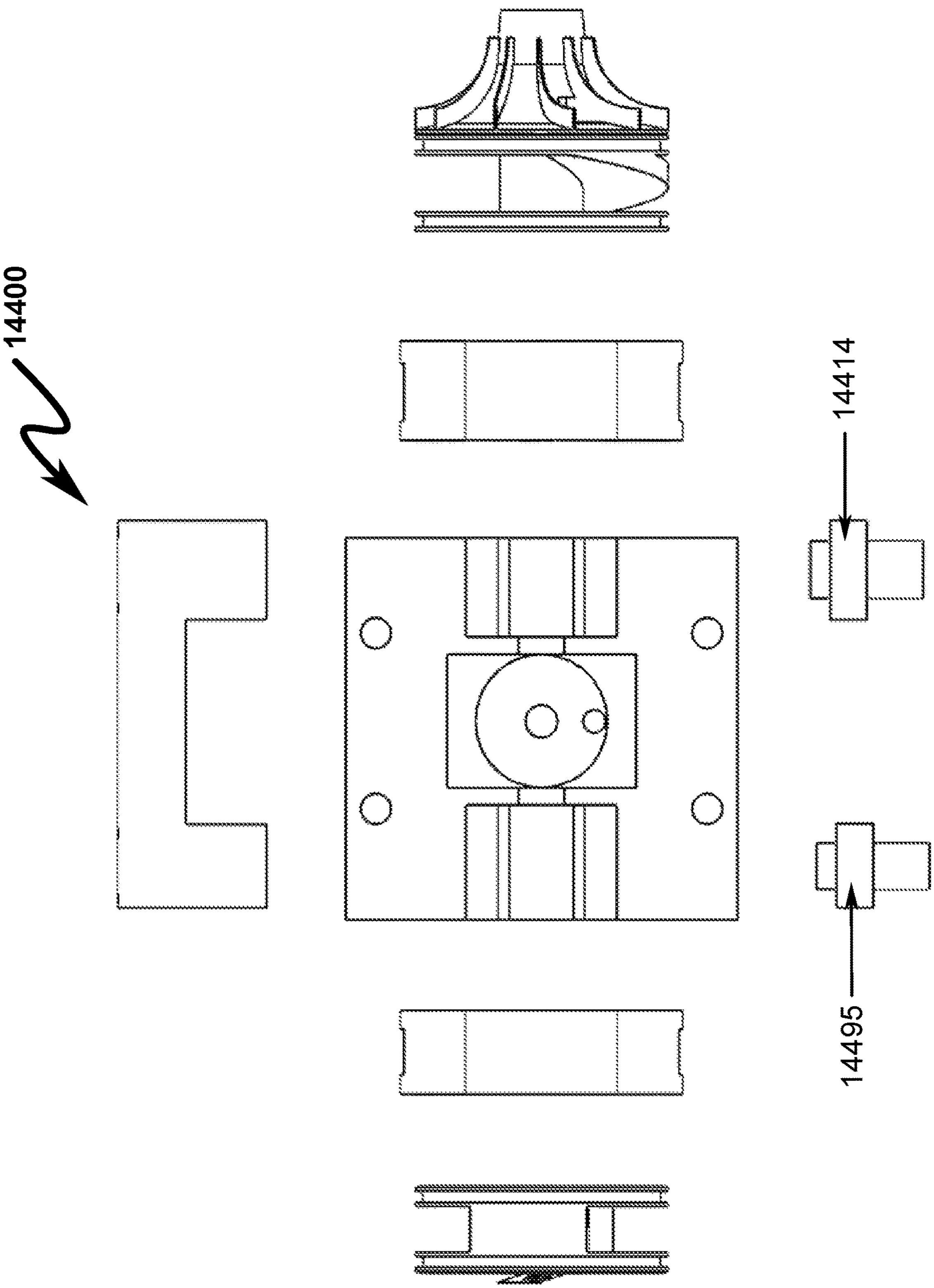
Figure 145:
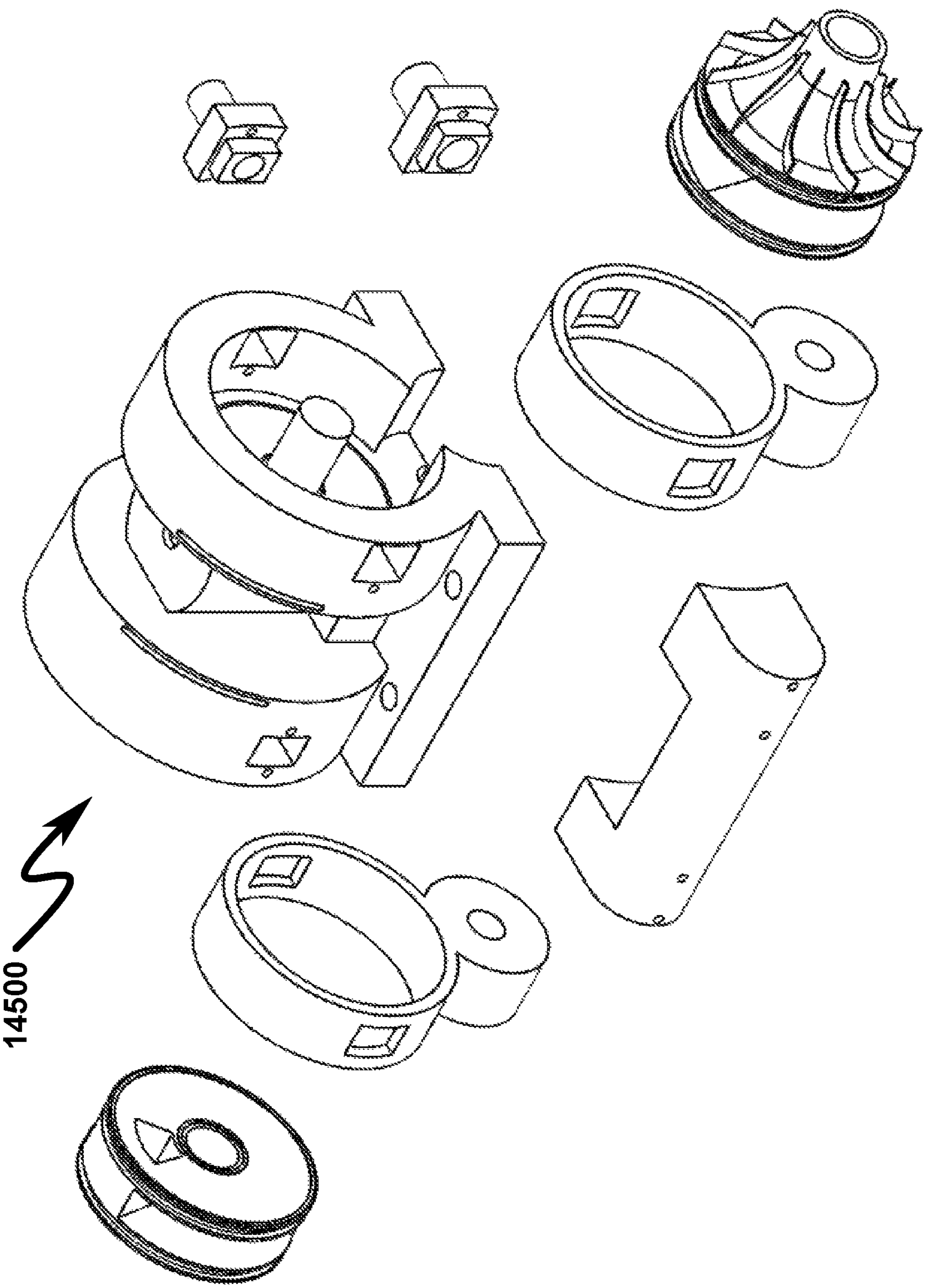
Figure 146:
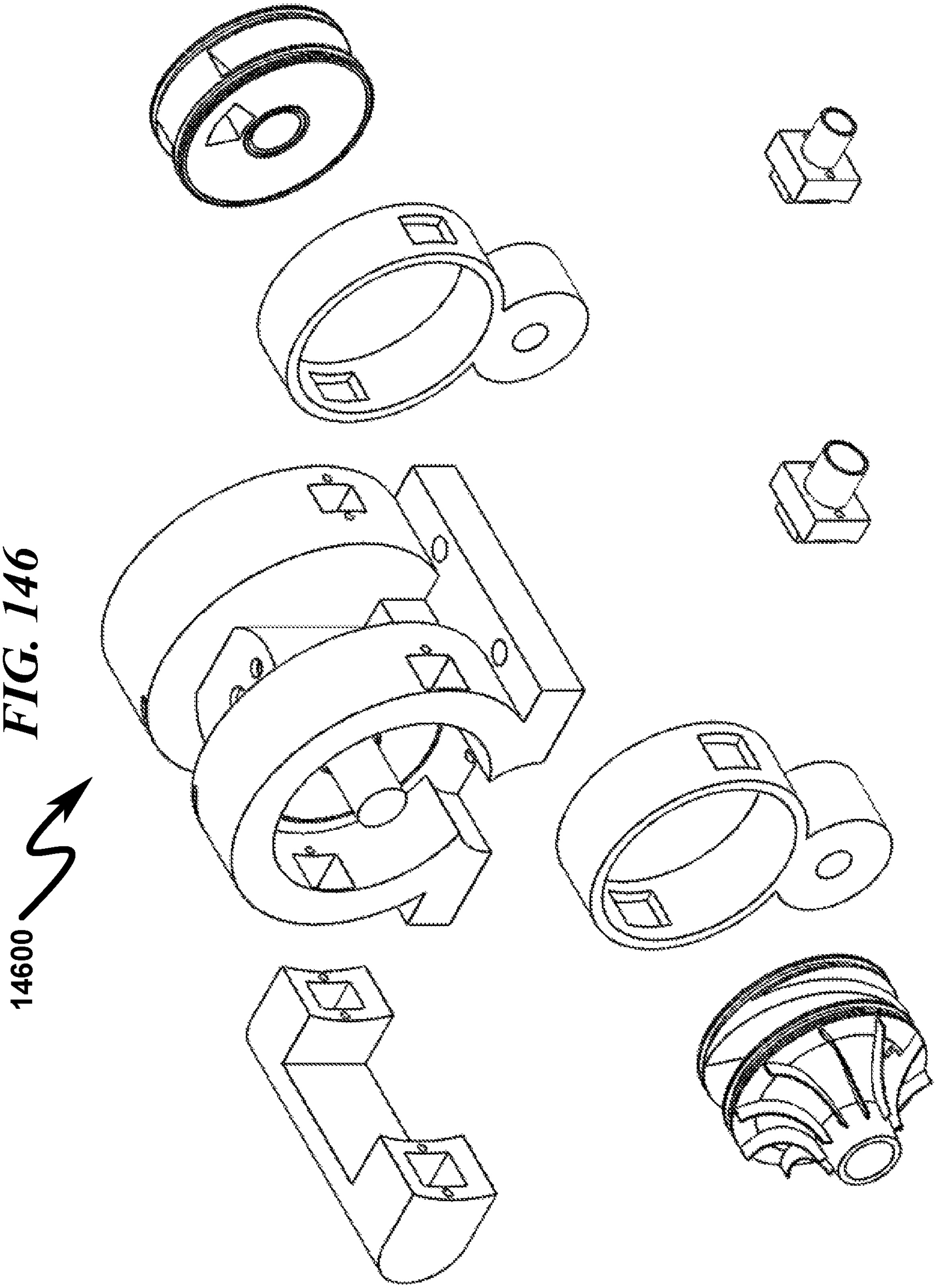
Figure 147:
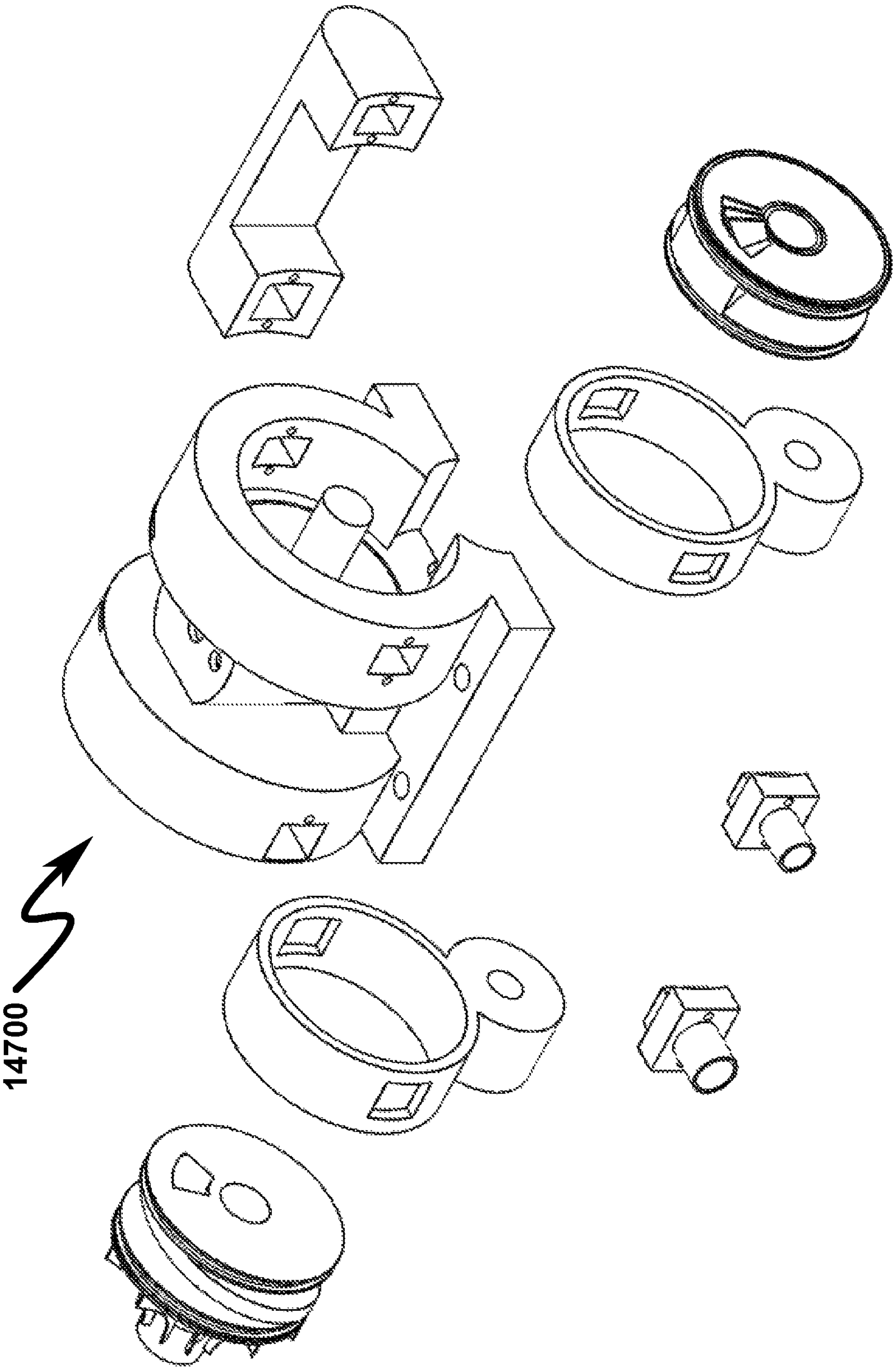
Figure 148:
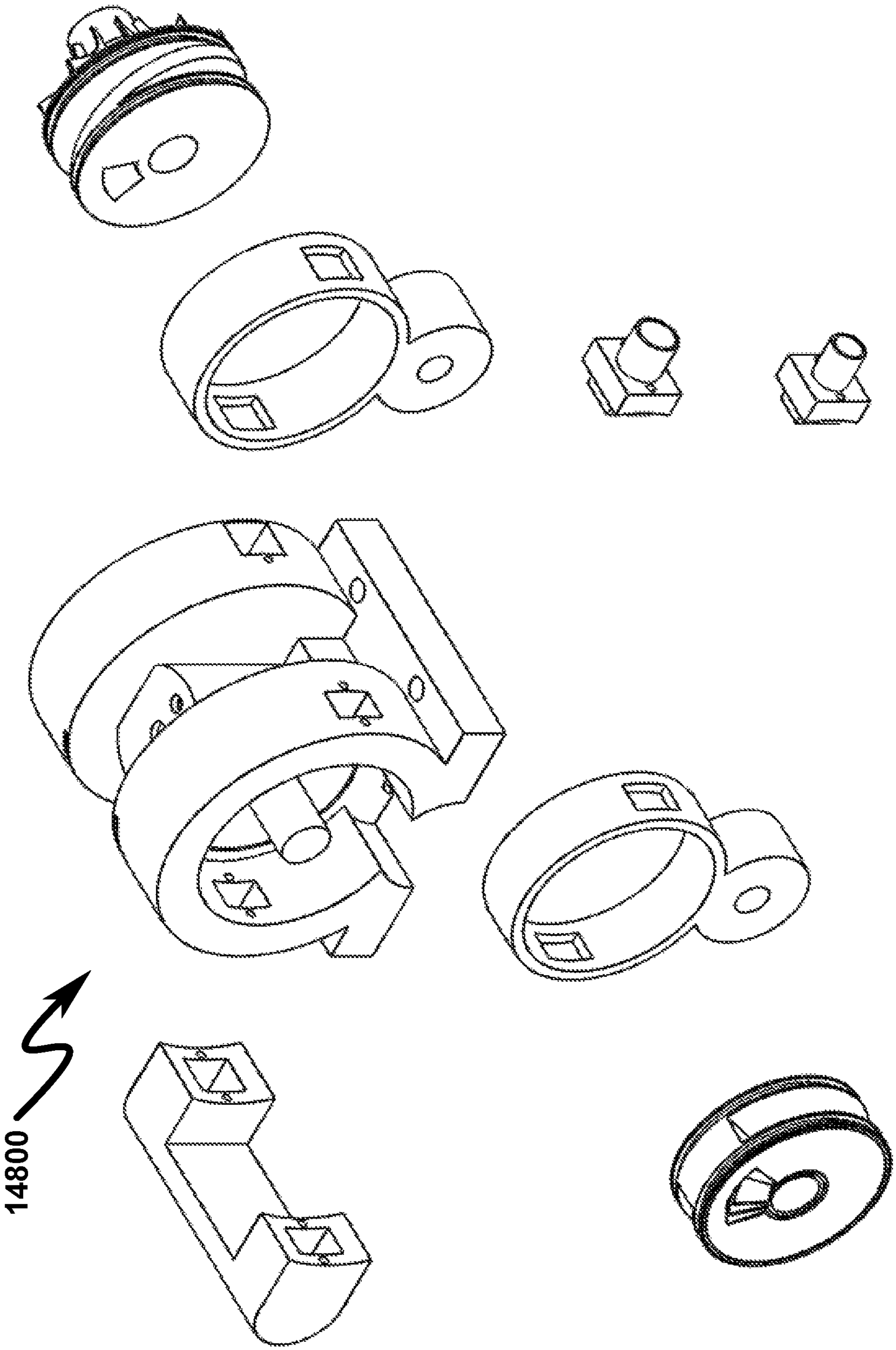
Figure 149:
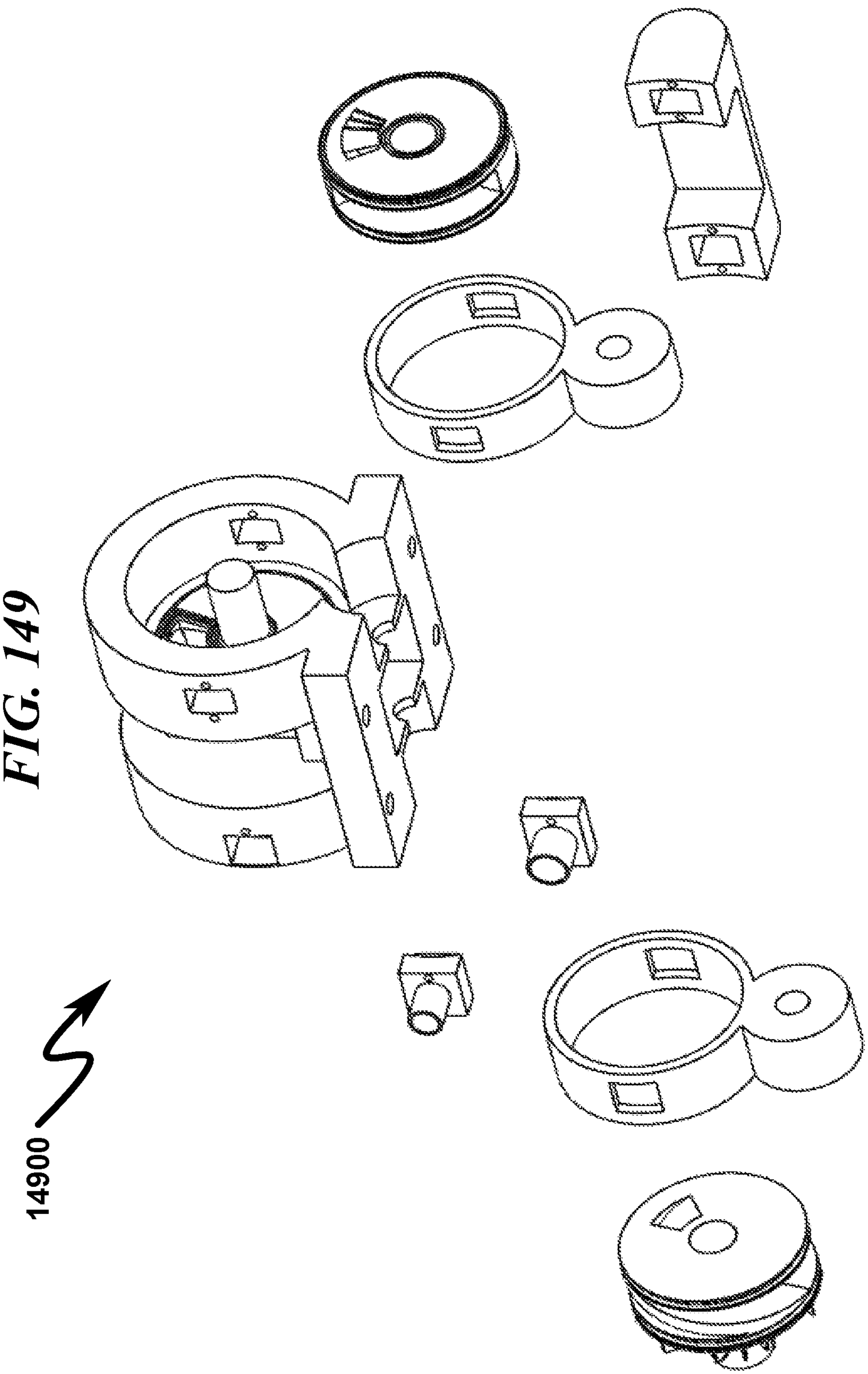
Figure 150:
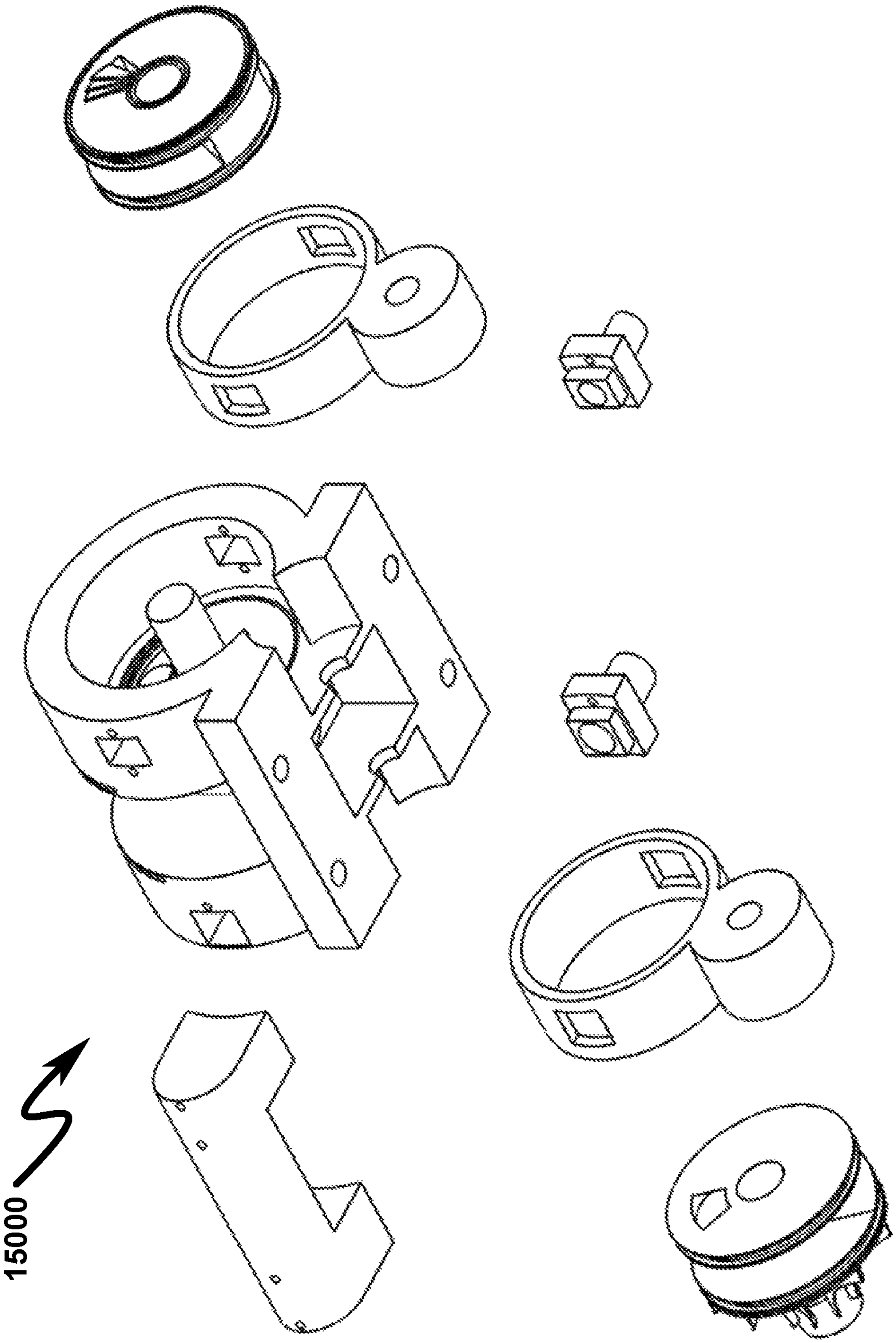
Figure 151:
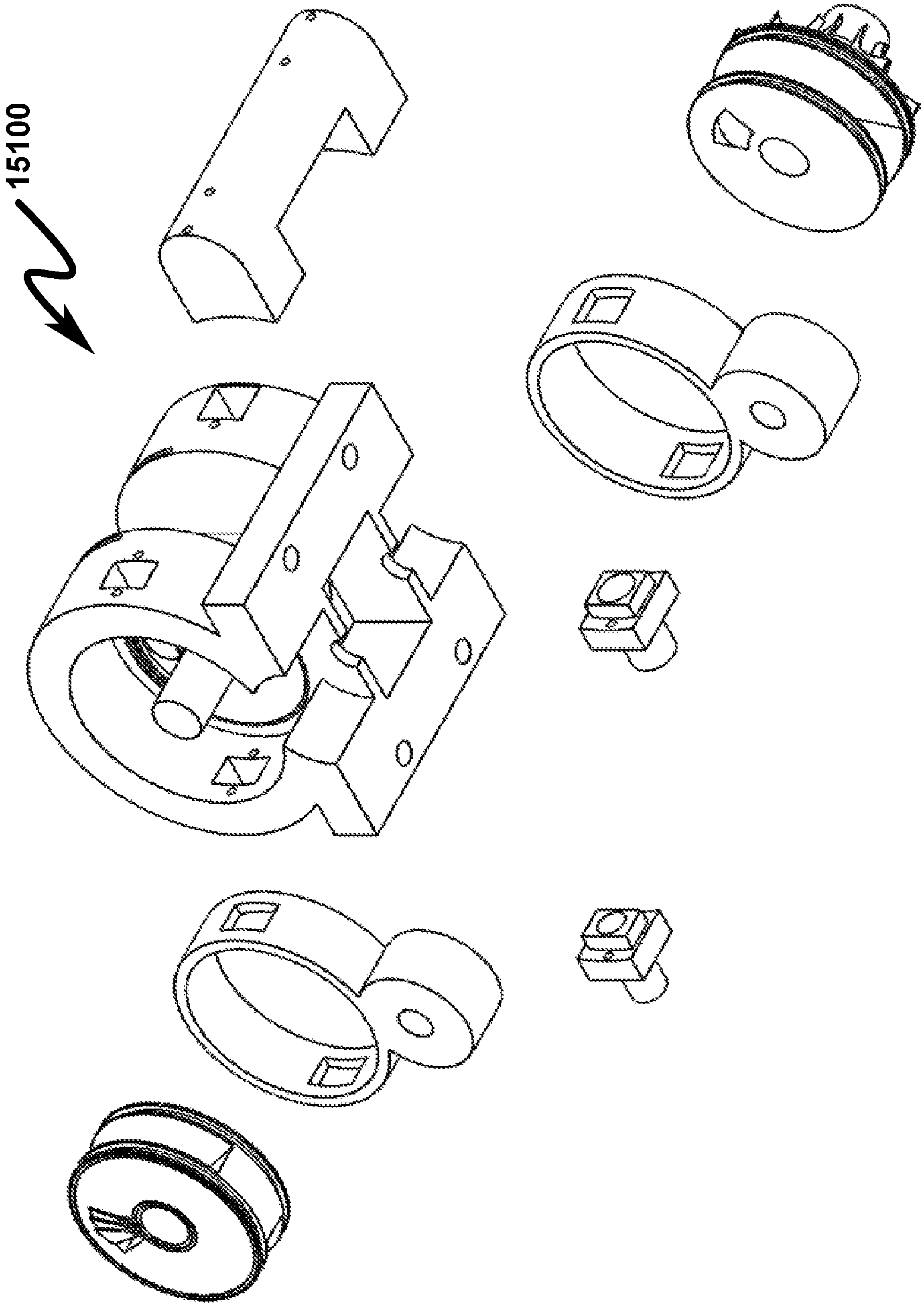
Figure 152:
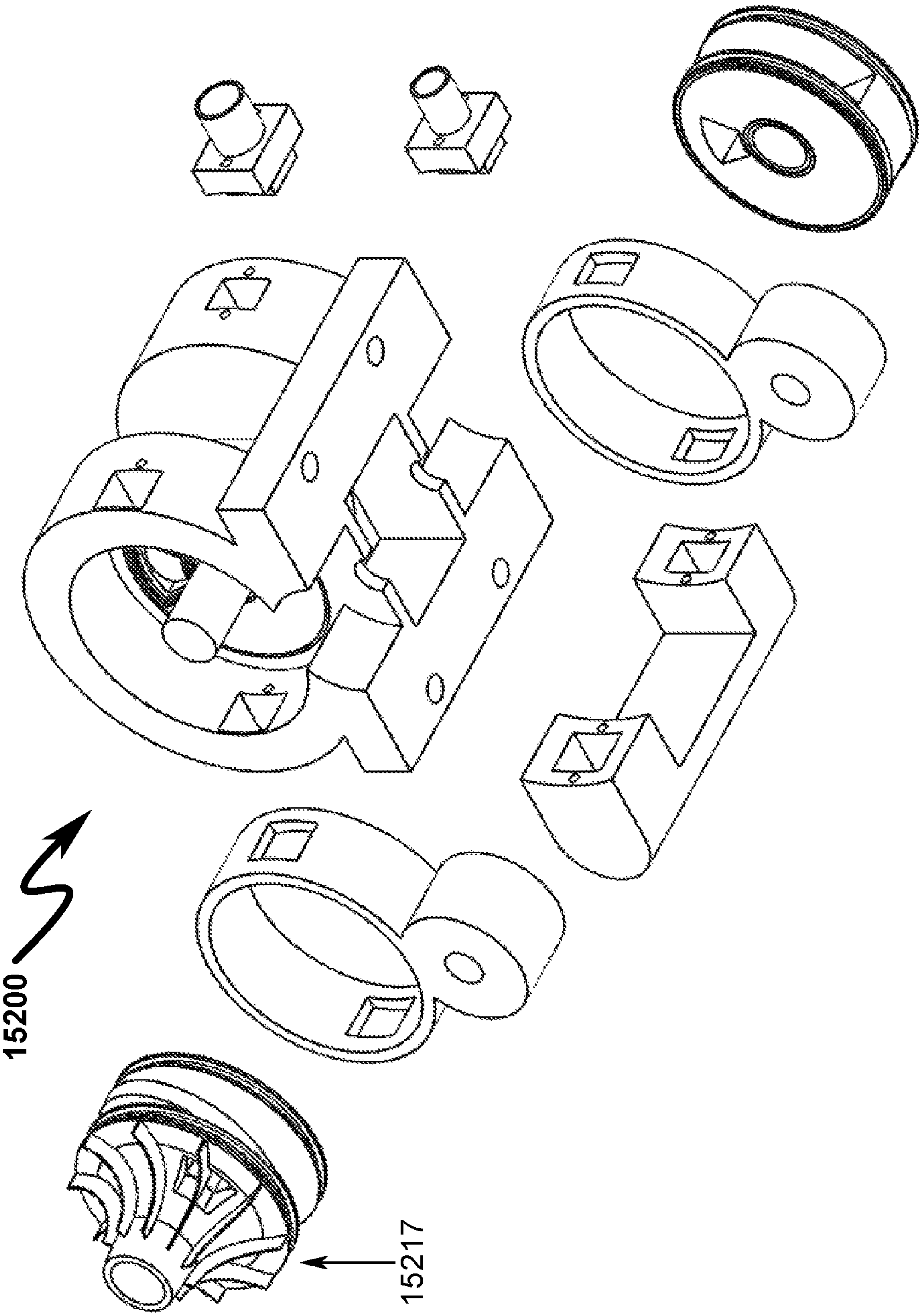
Figure 153:
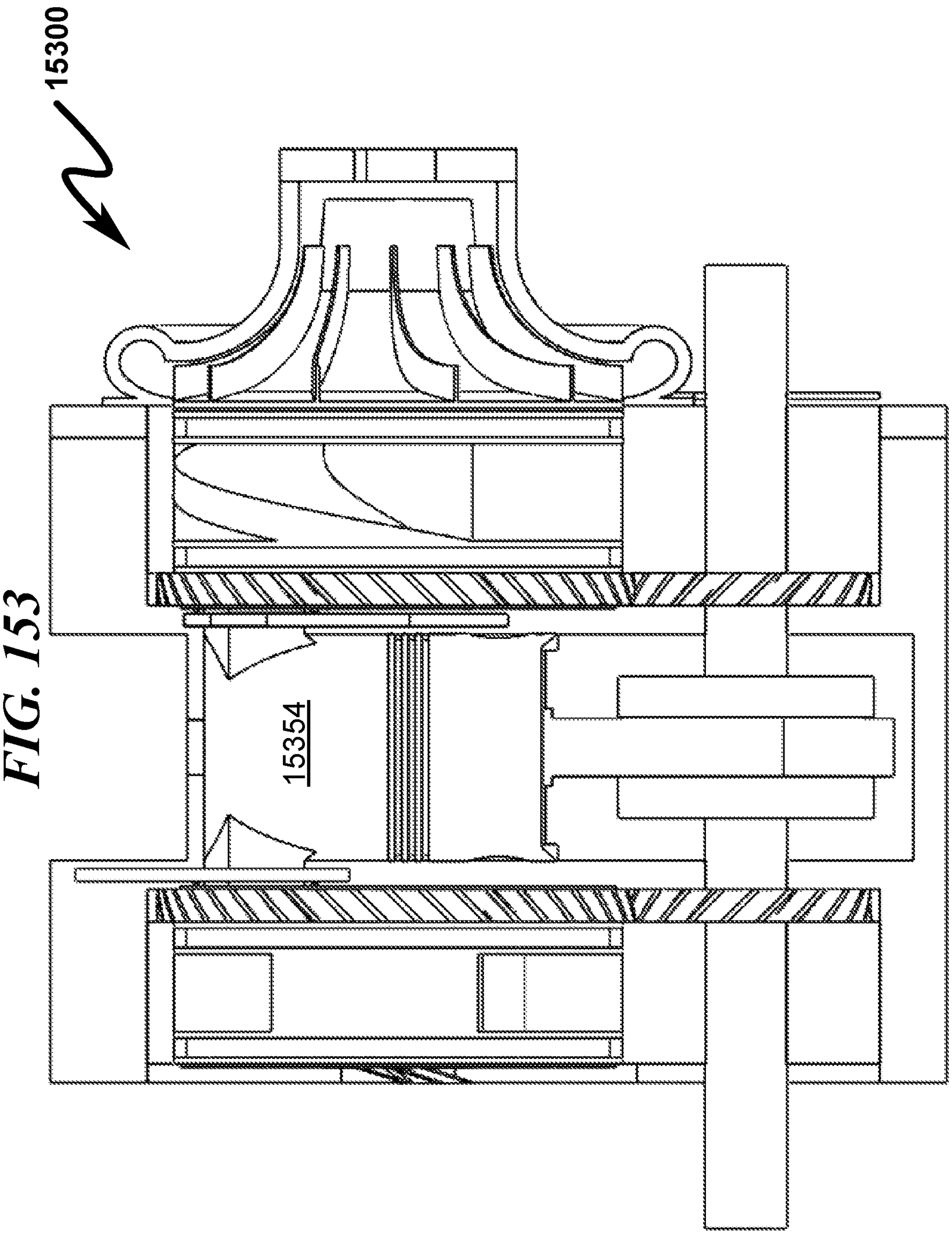
Figure 154:
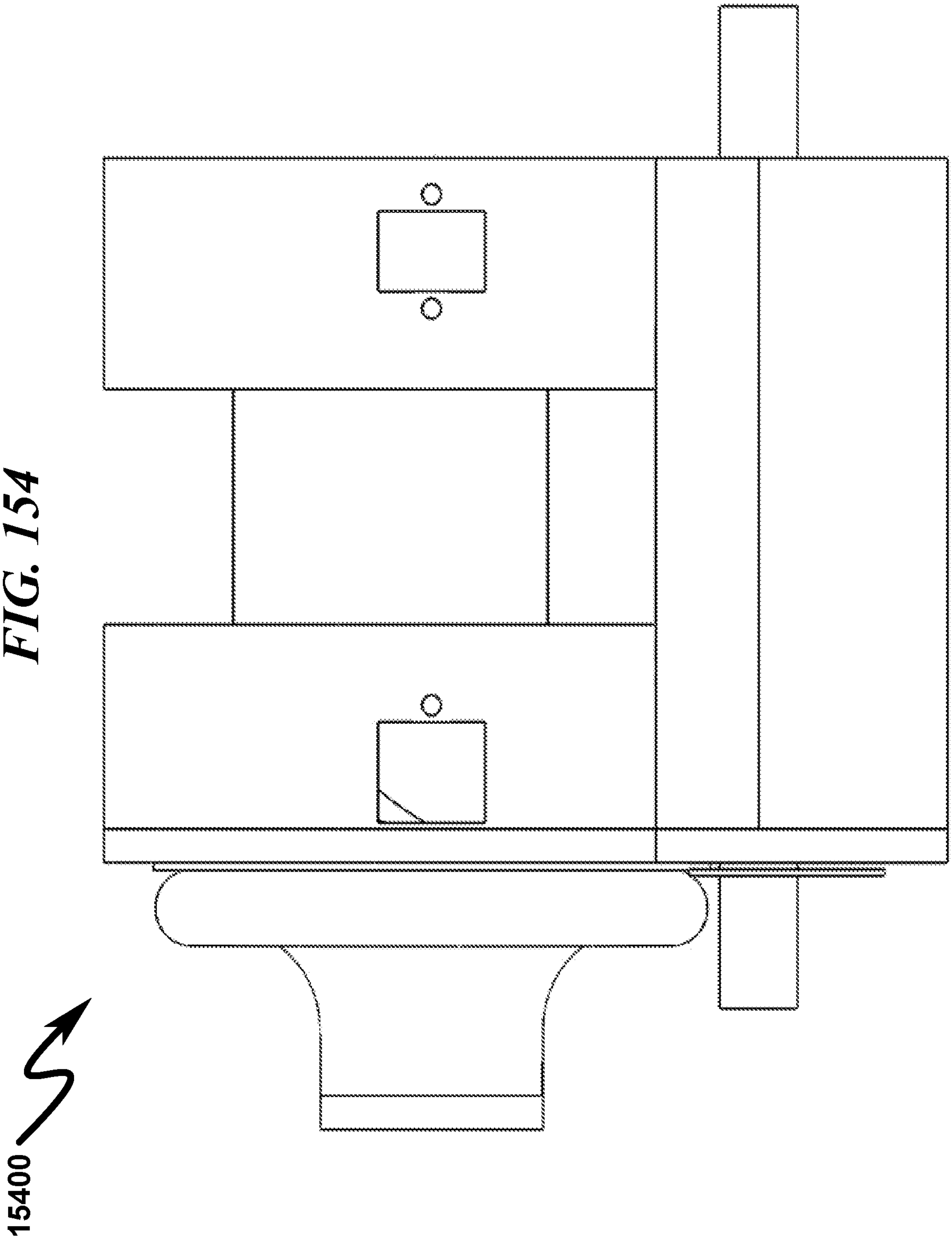
Figure 155:
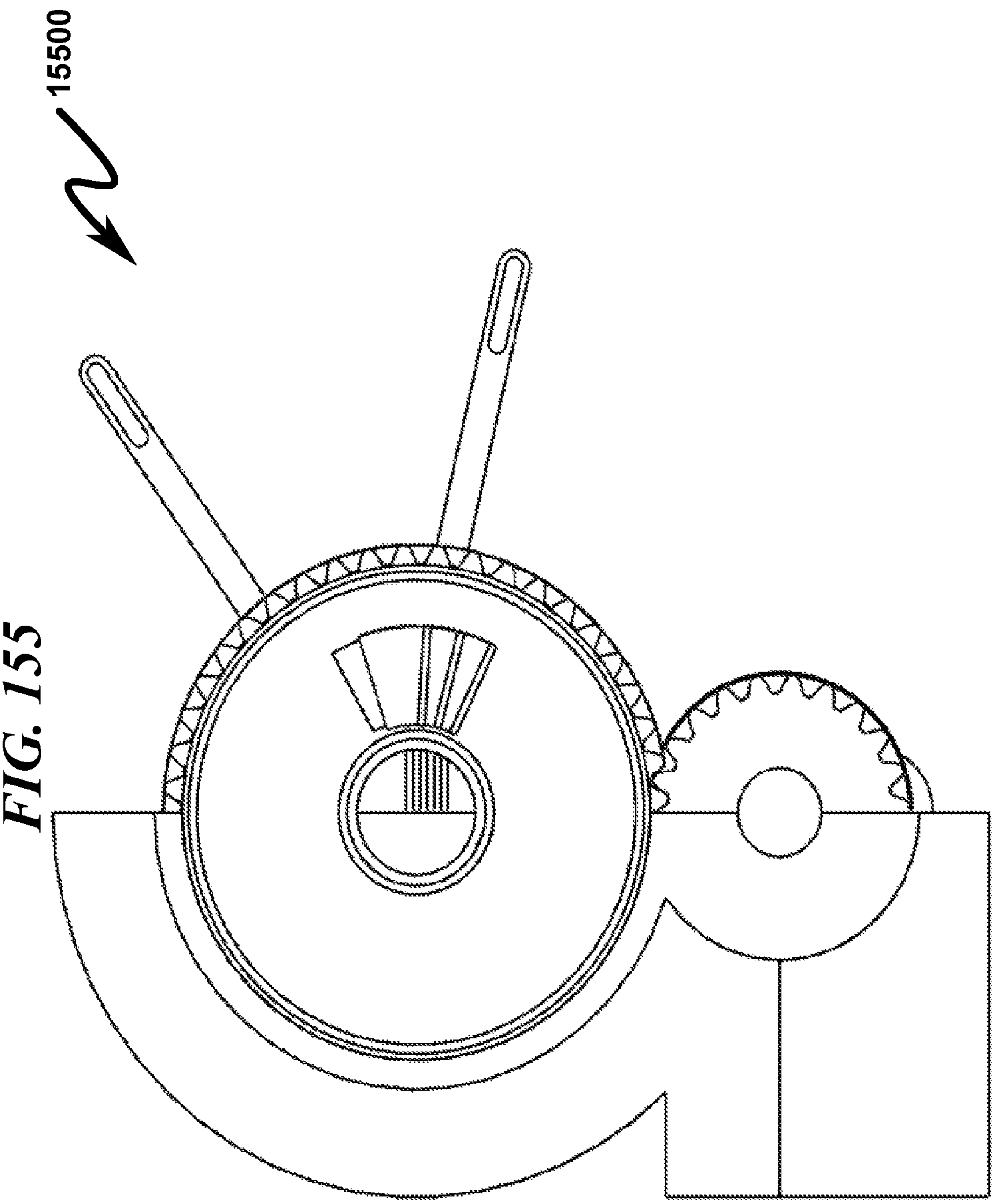
Figure 156:
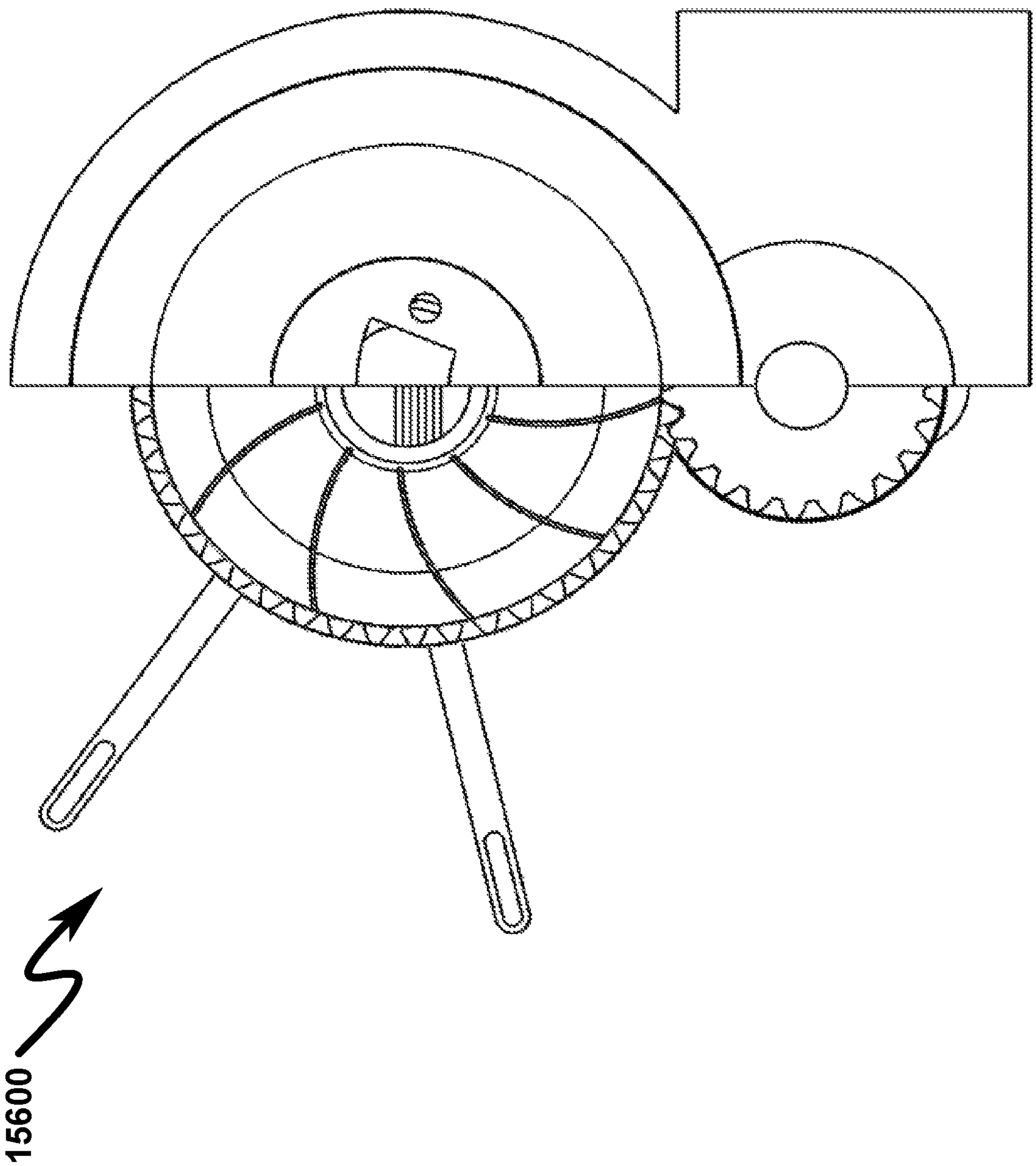
Figure 157:
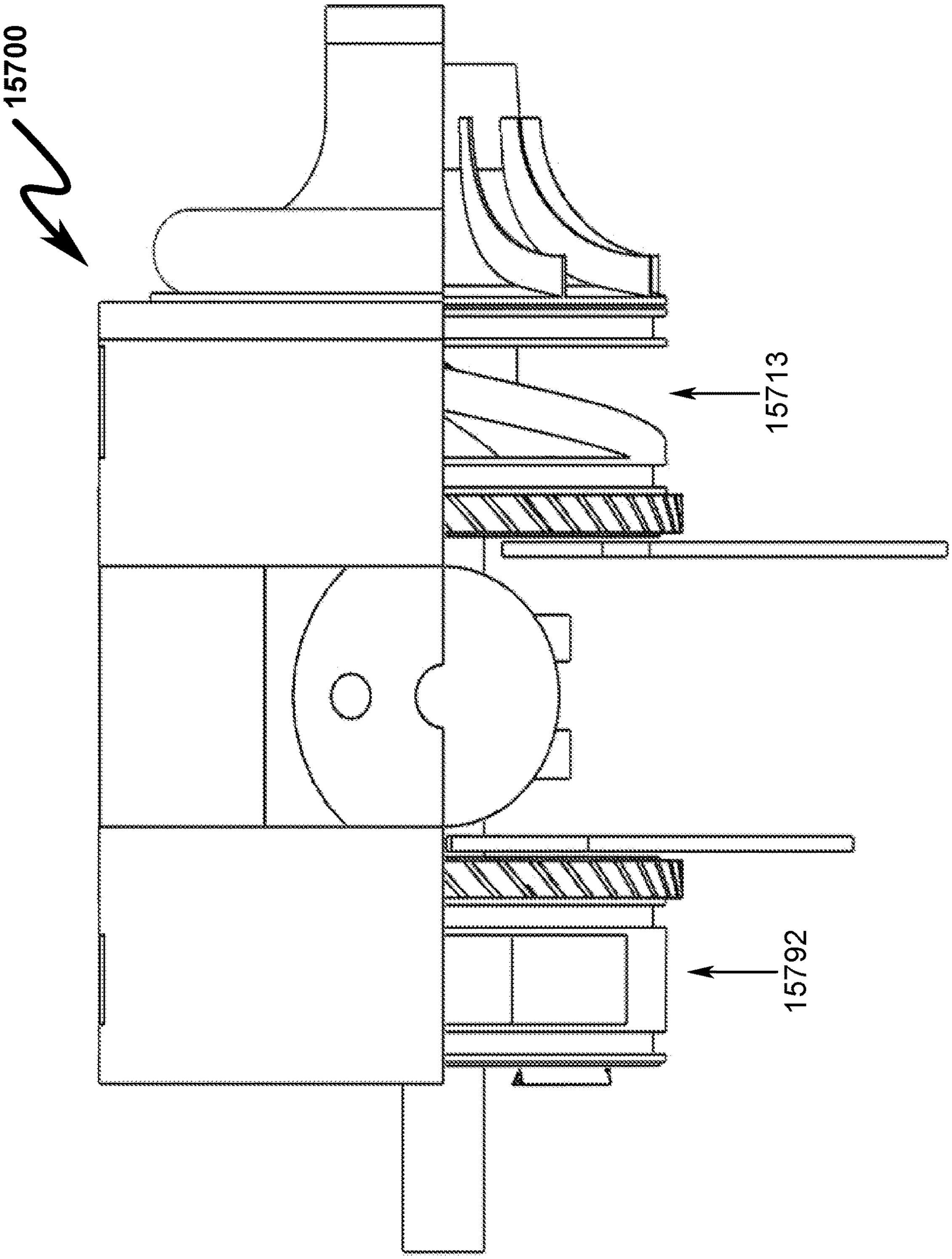
Figure 158:
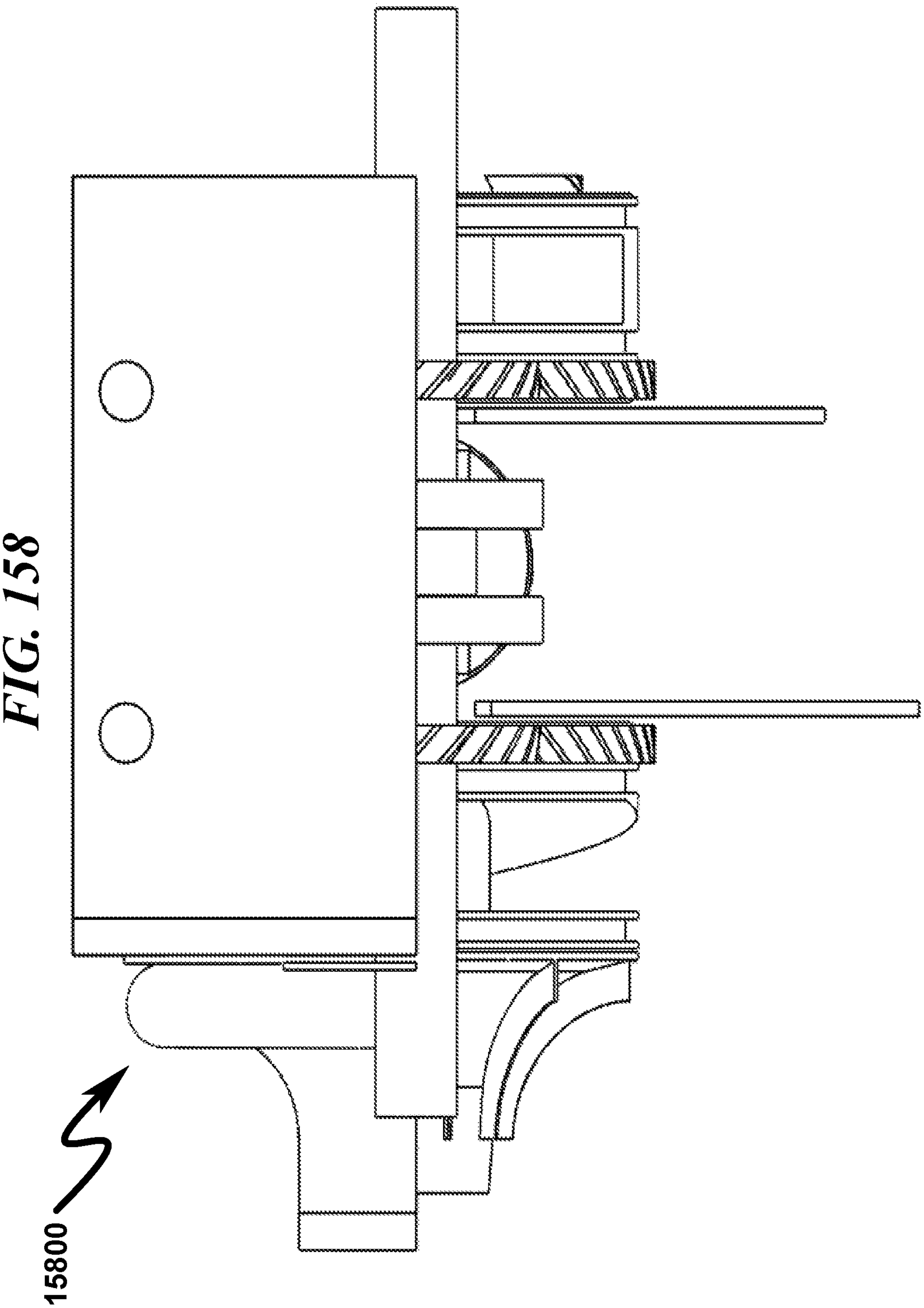
Figure 159:
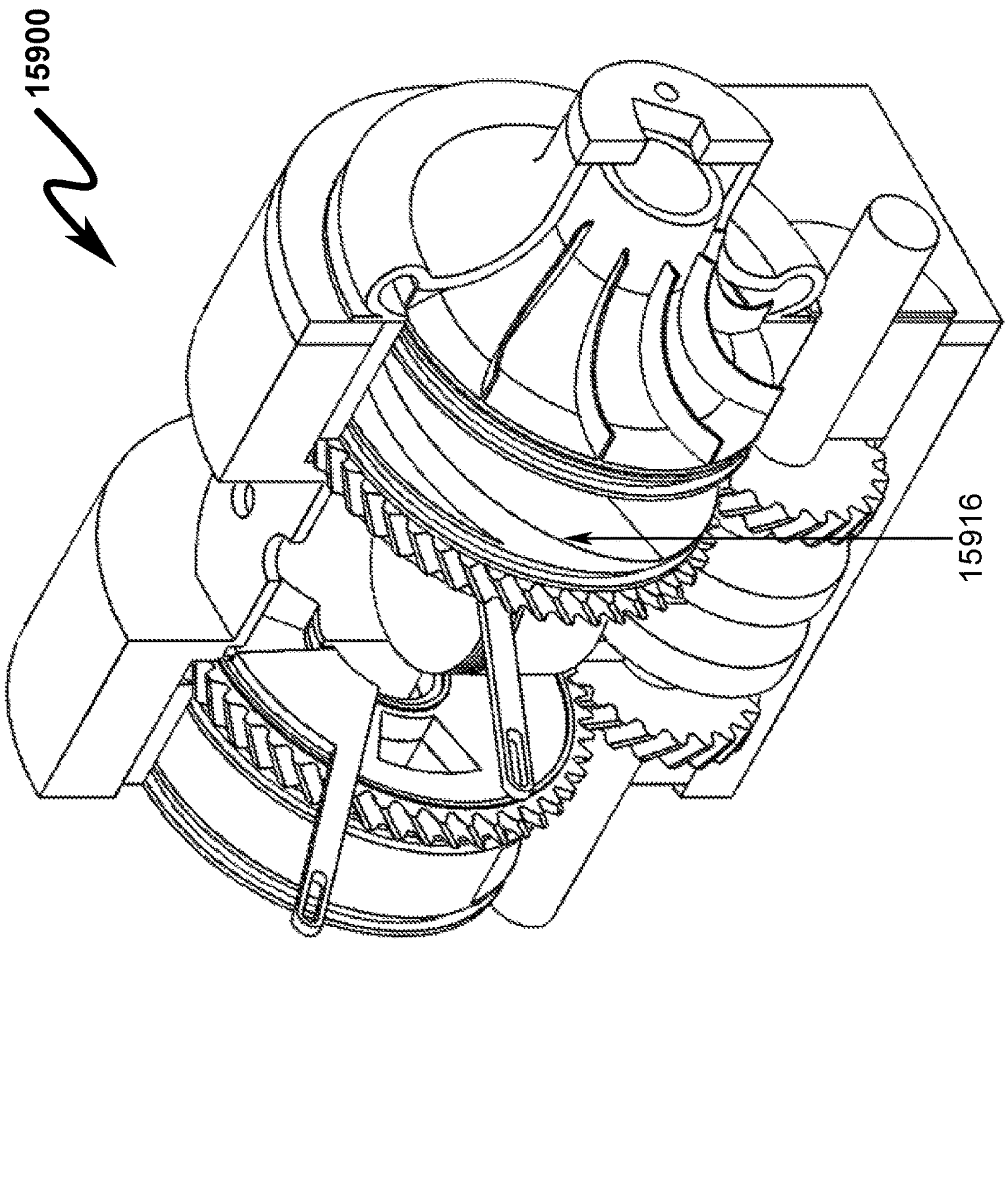
Figure 160:
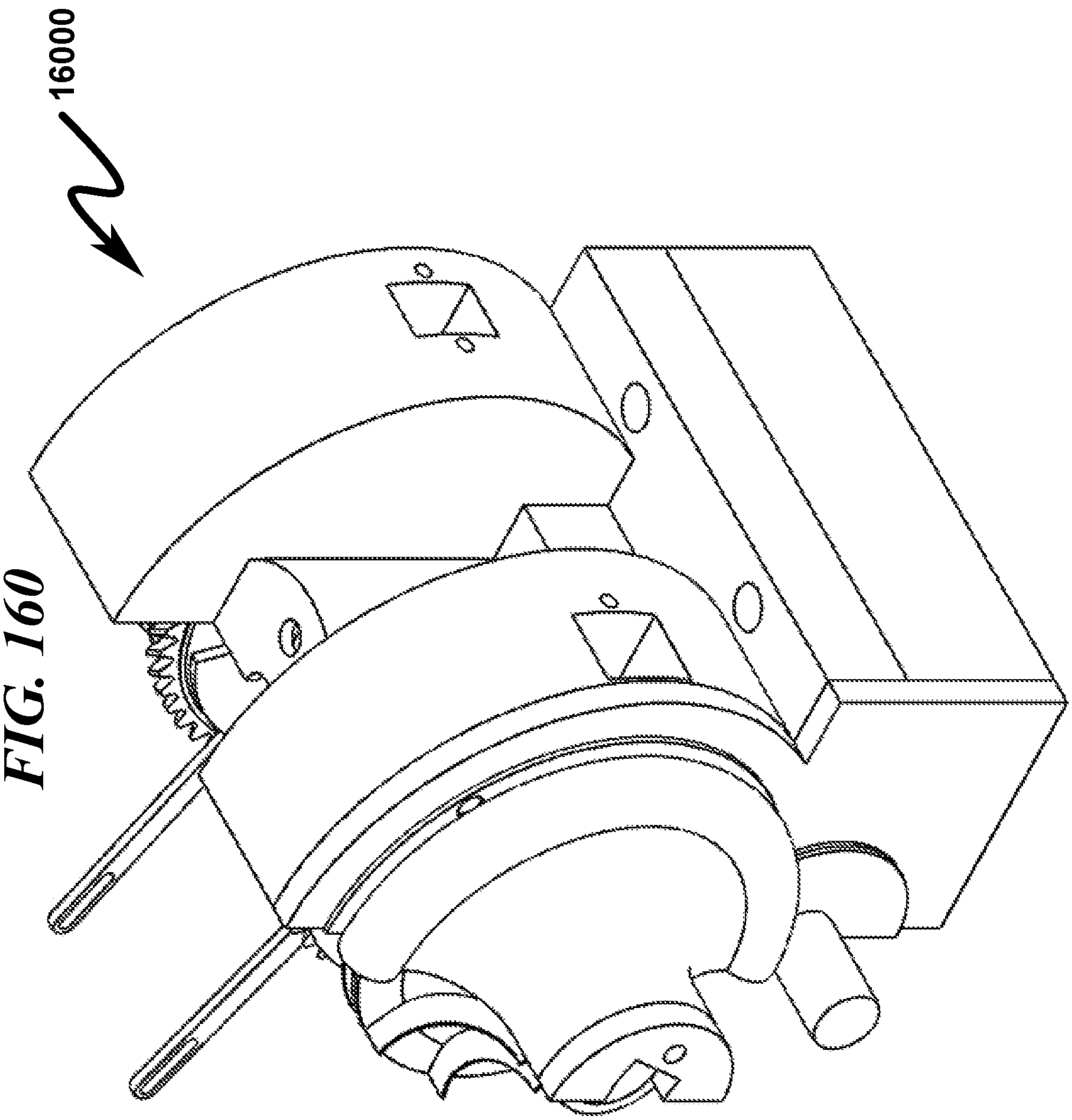
Figure 161:
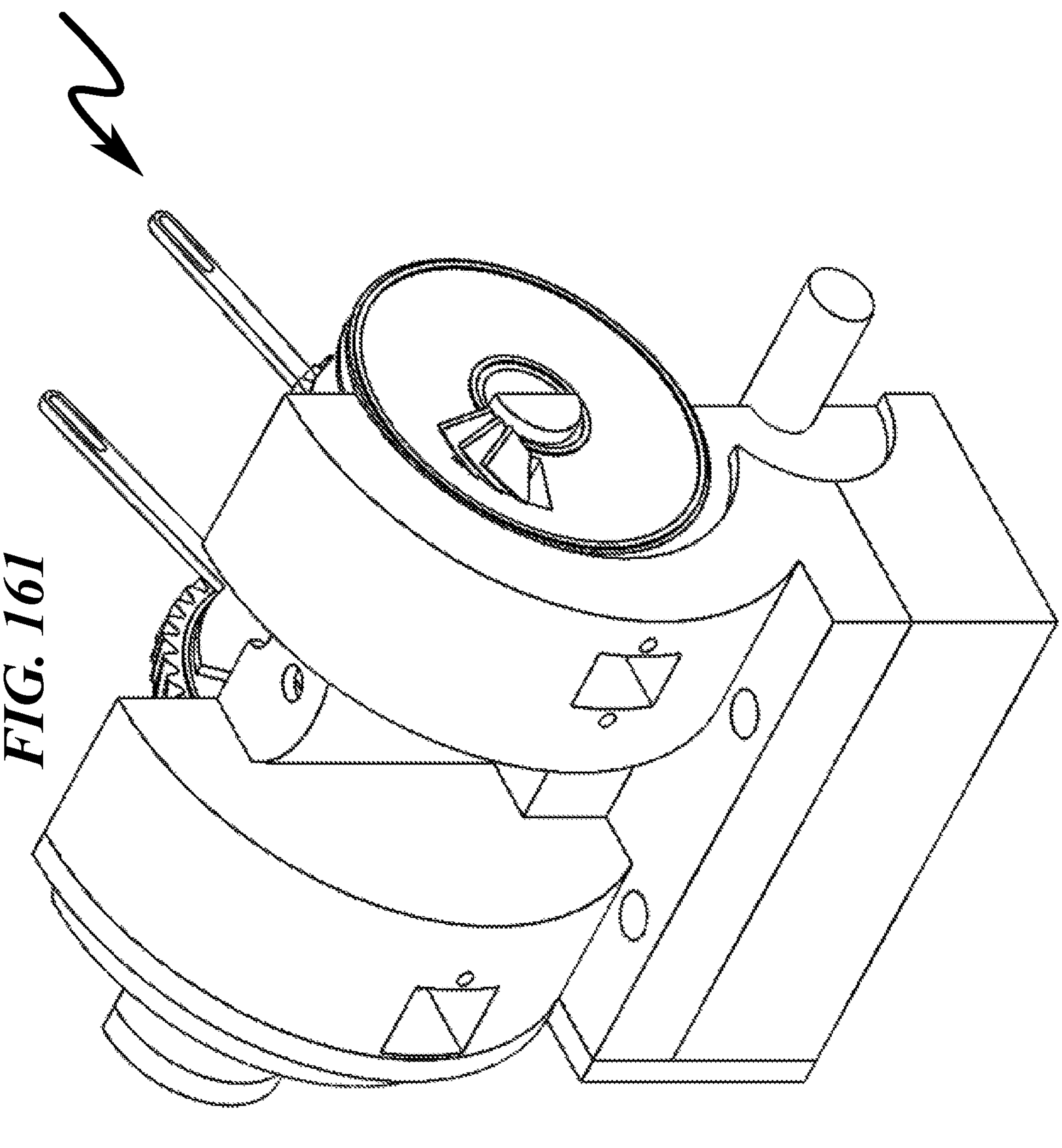
Figure 162:
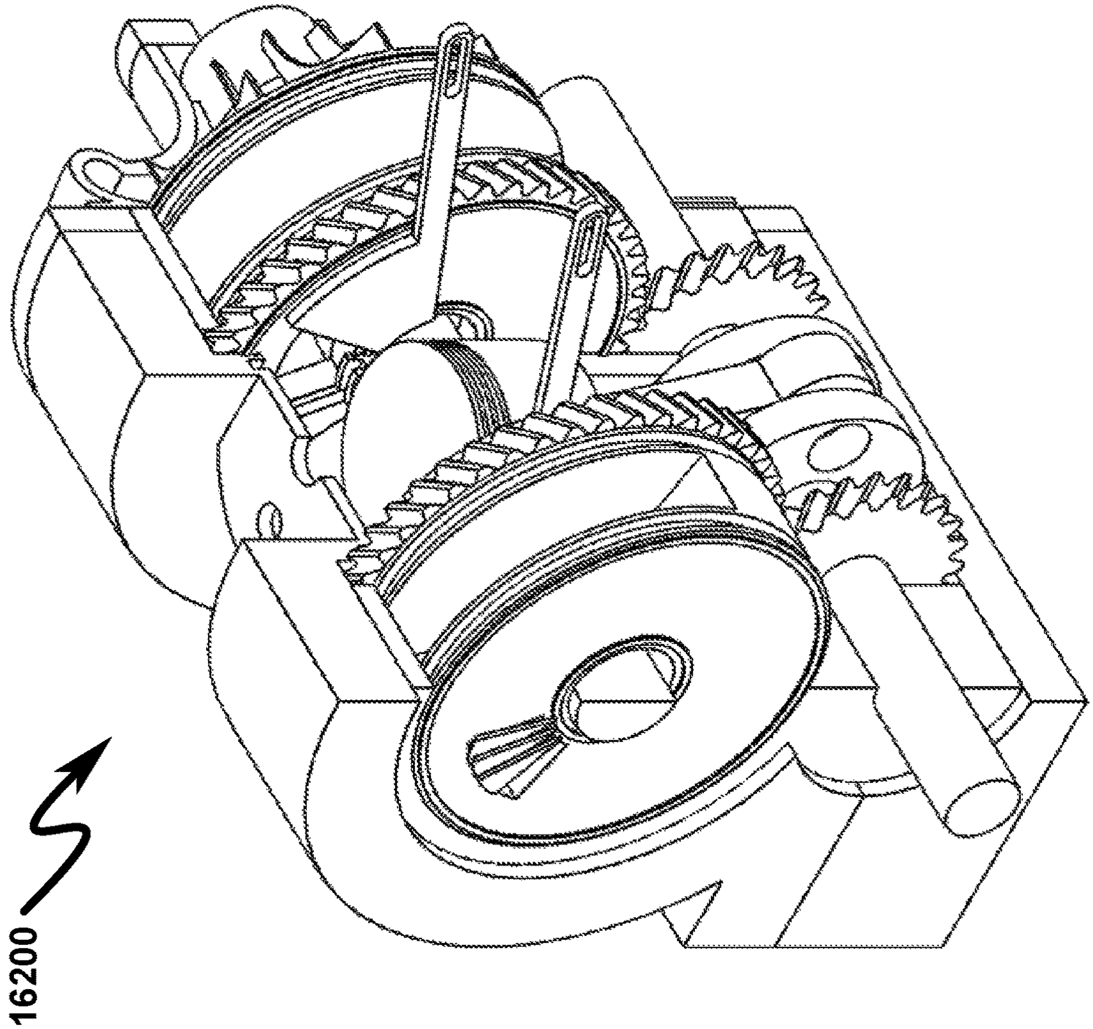
Figure 163:
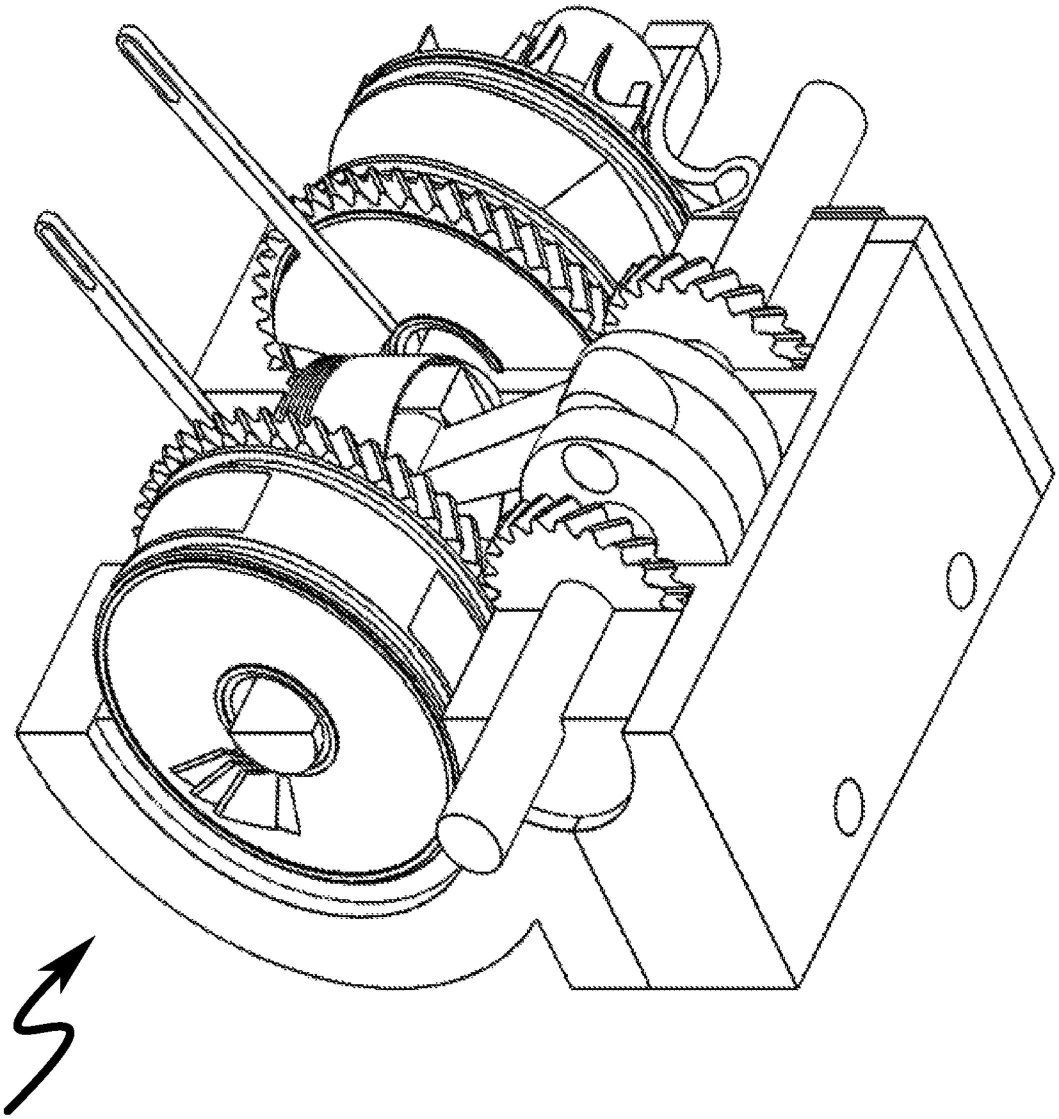
Figure 164:
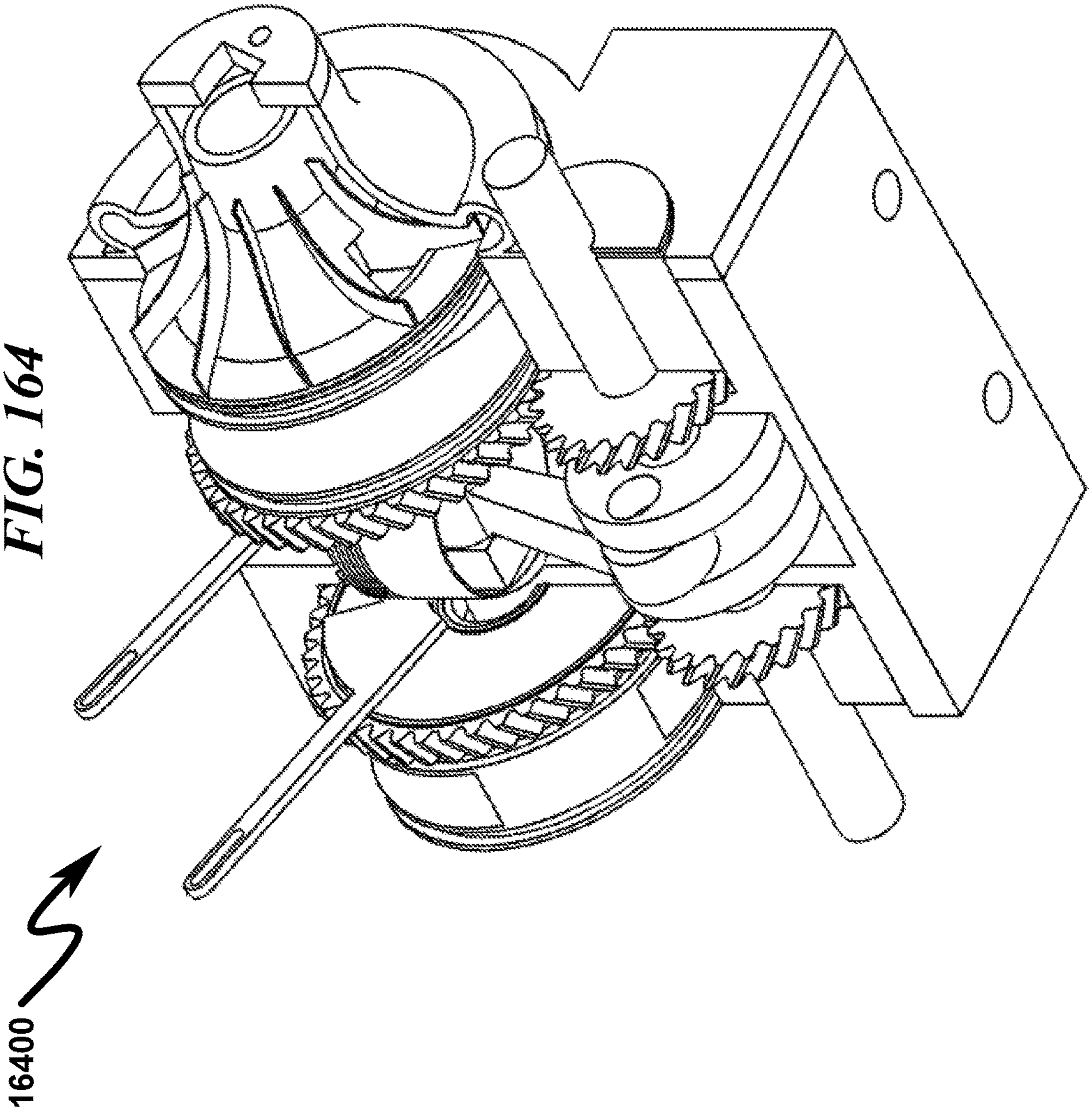
Figure 165:
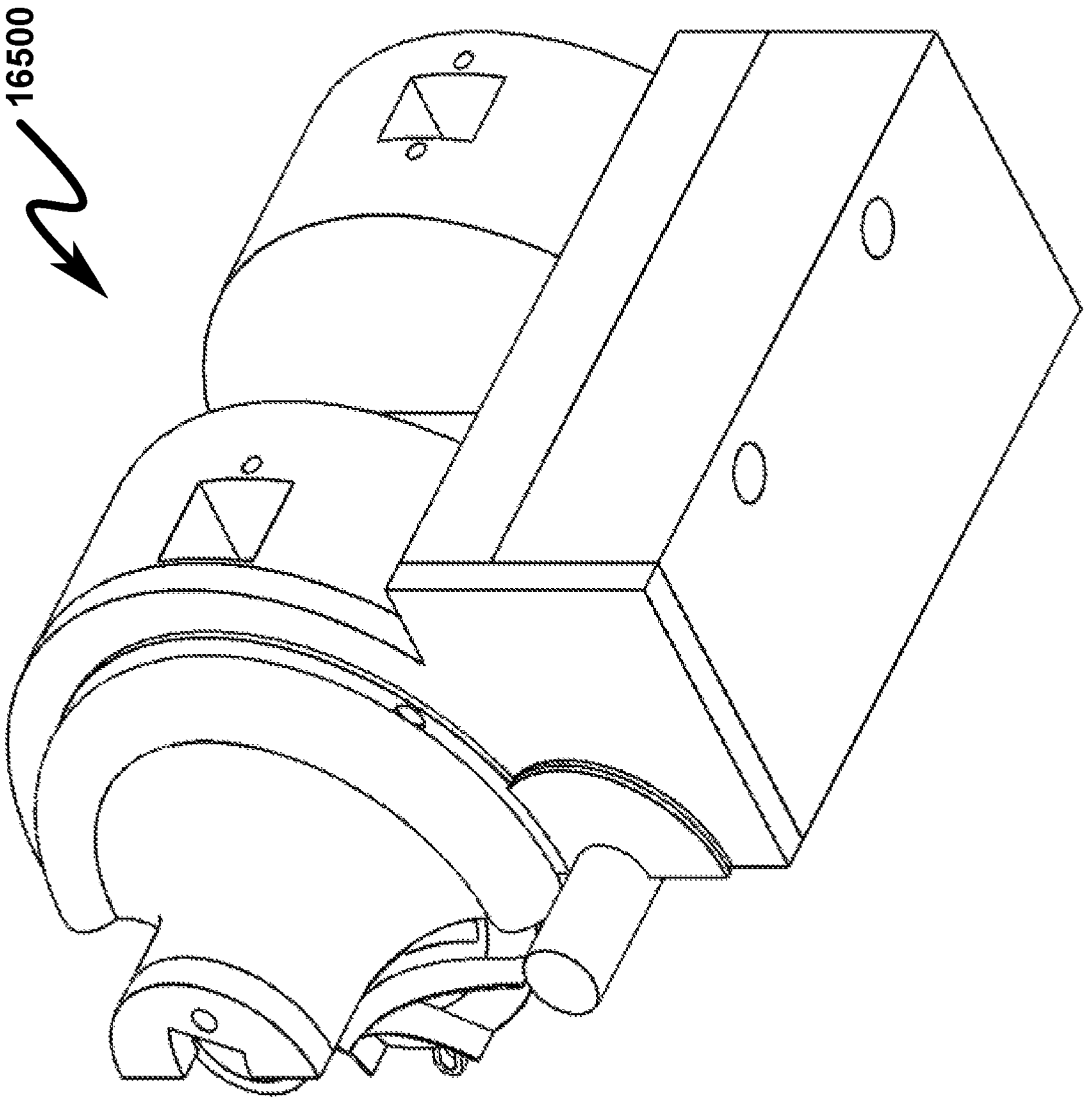
Figure 166:
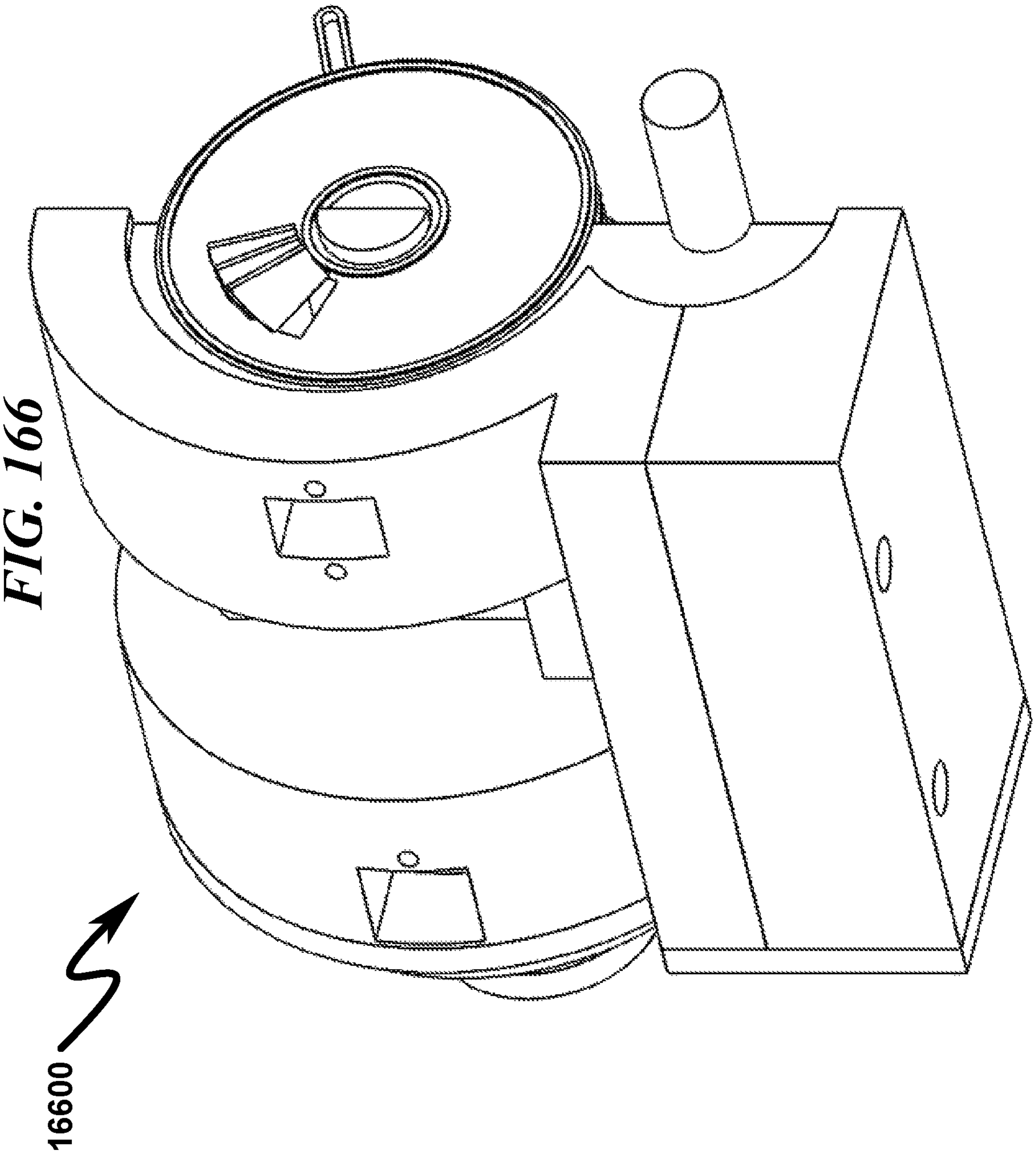
Figure 167:
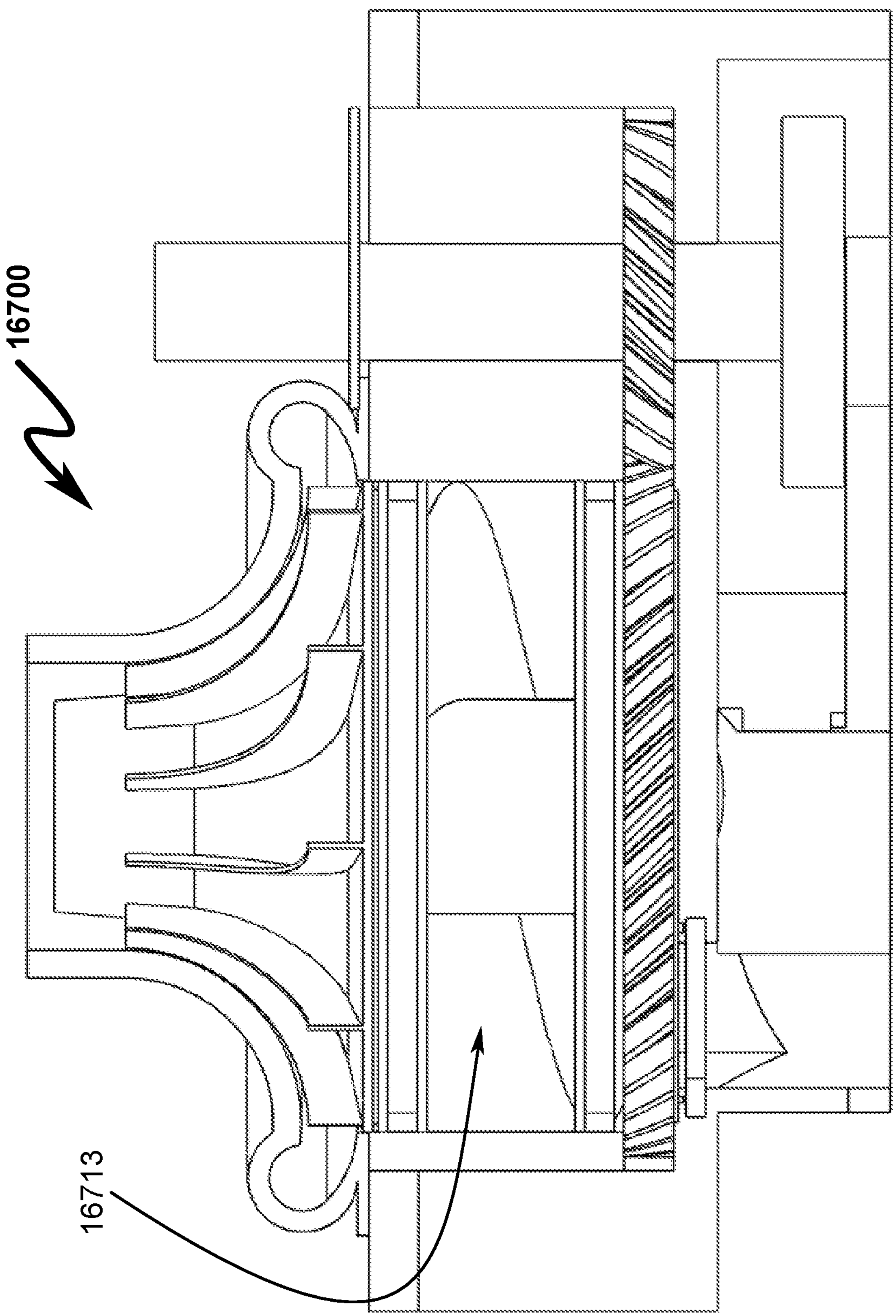
Figure 168:
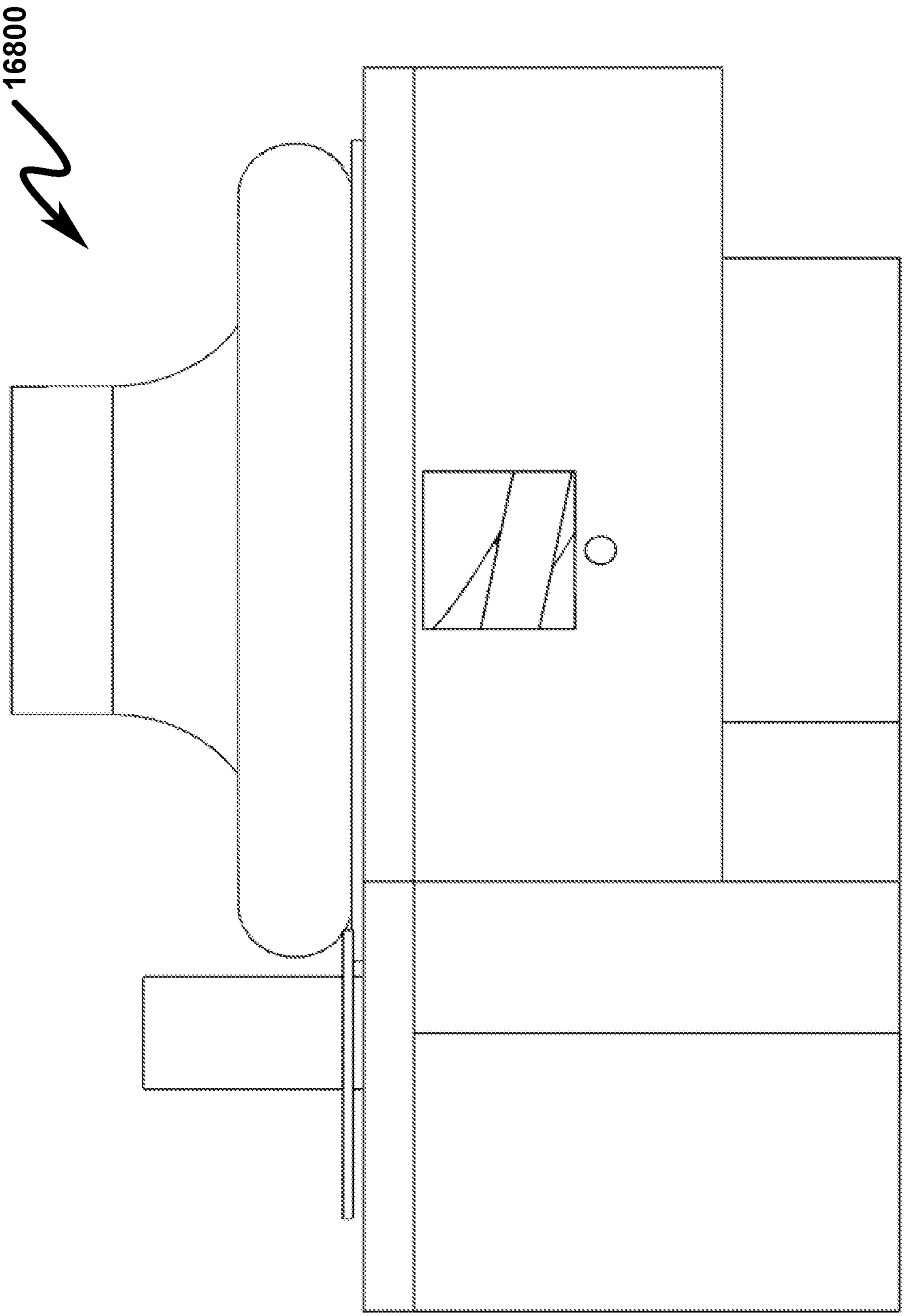
Figure 169:
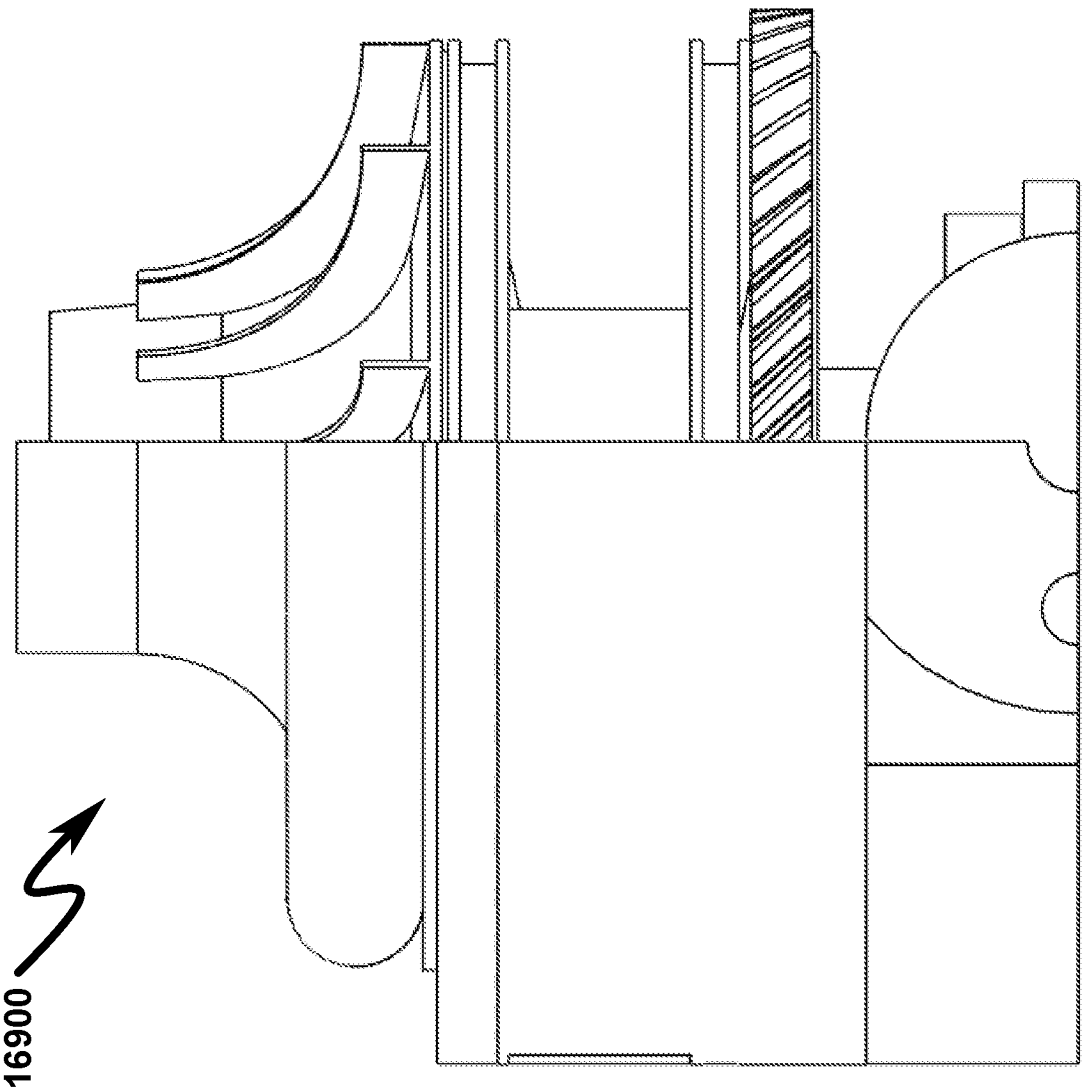
Figure 170:
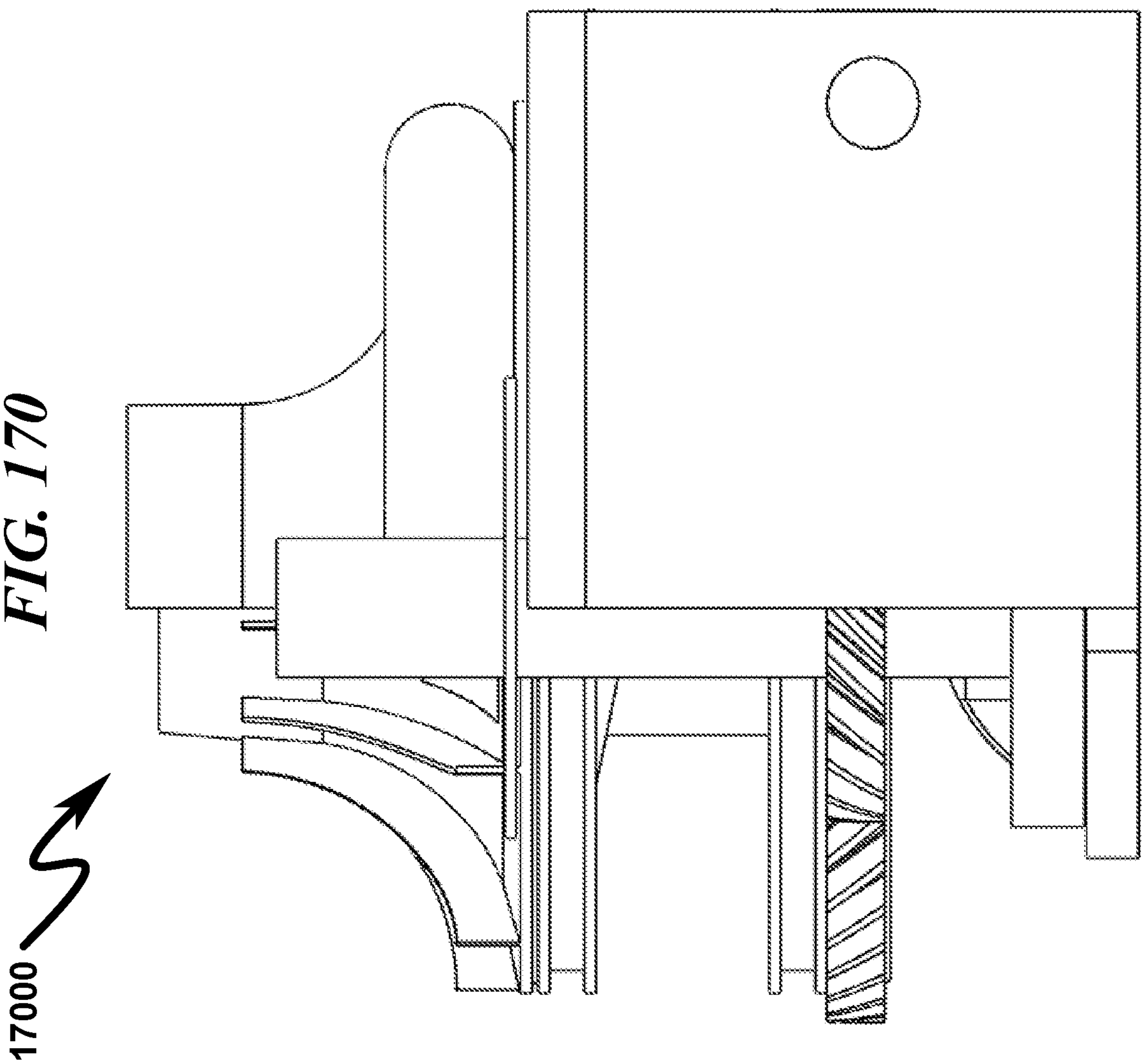
Figure 171:
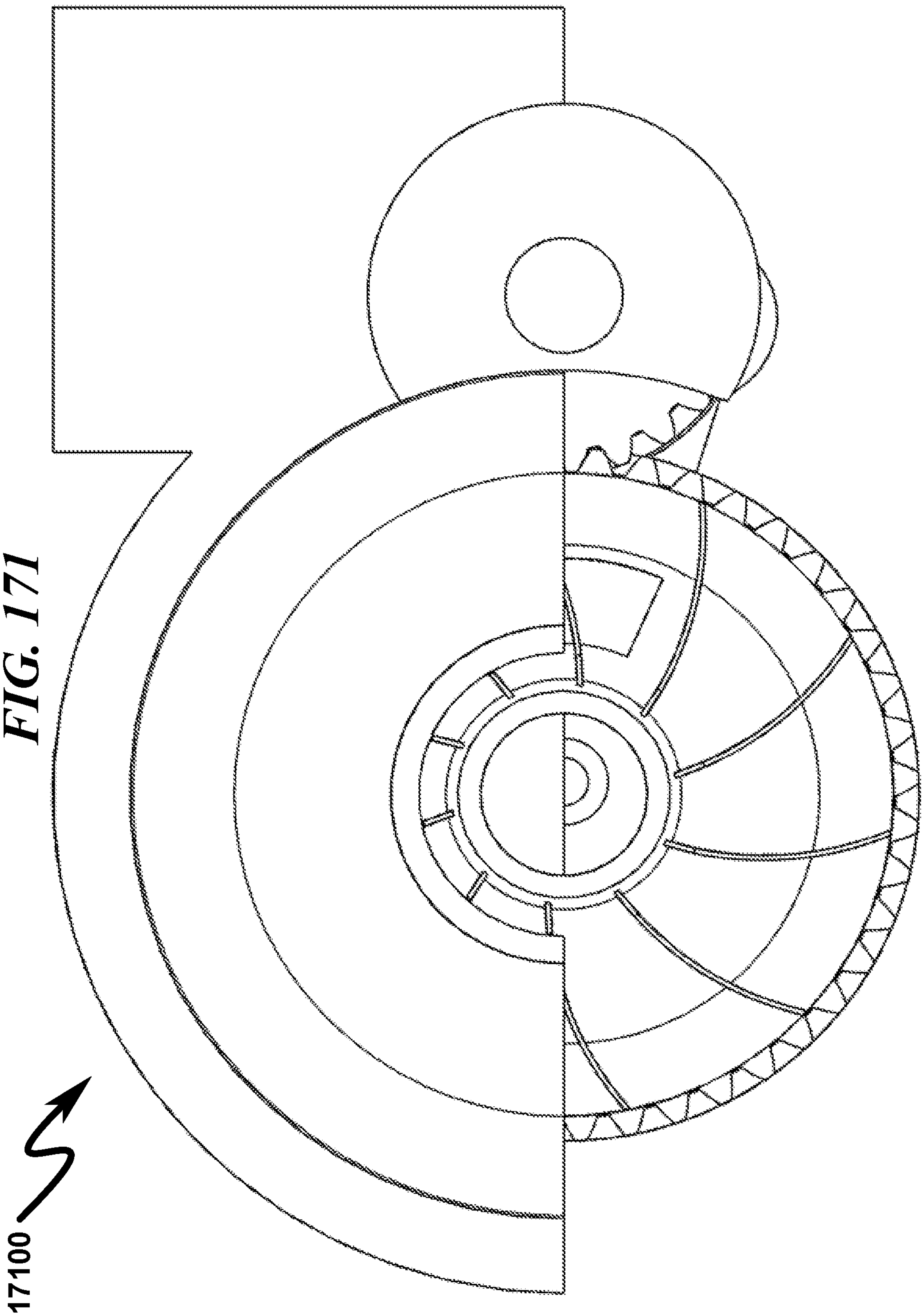
Figure 172:
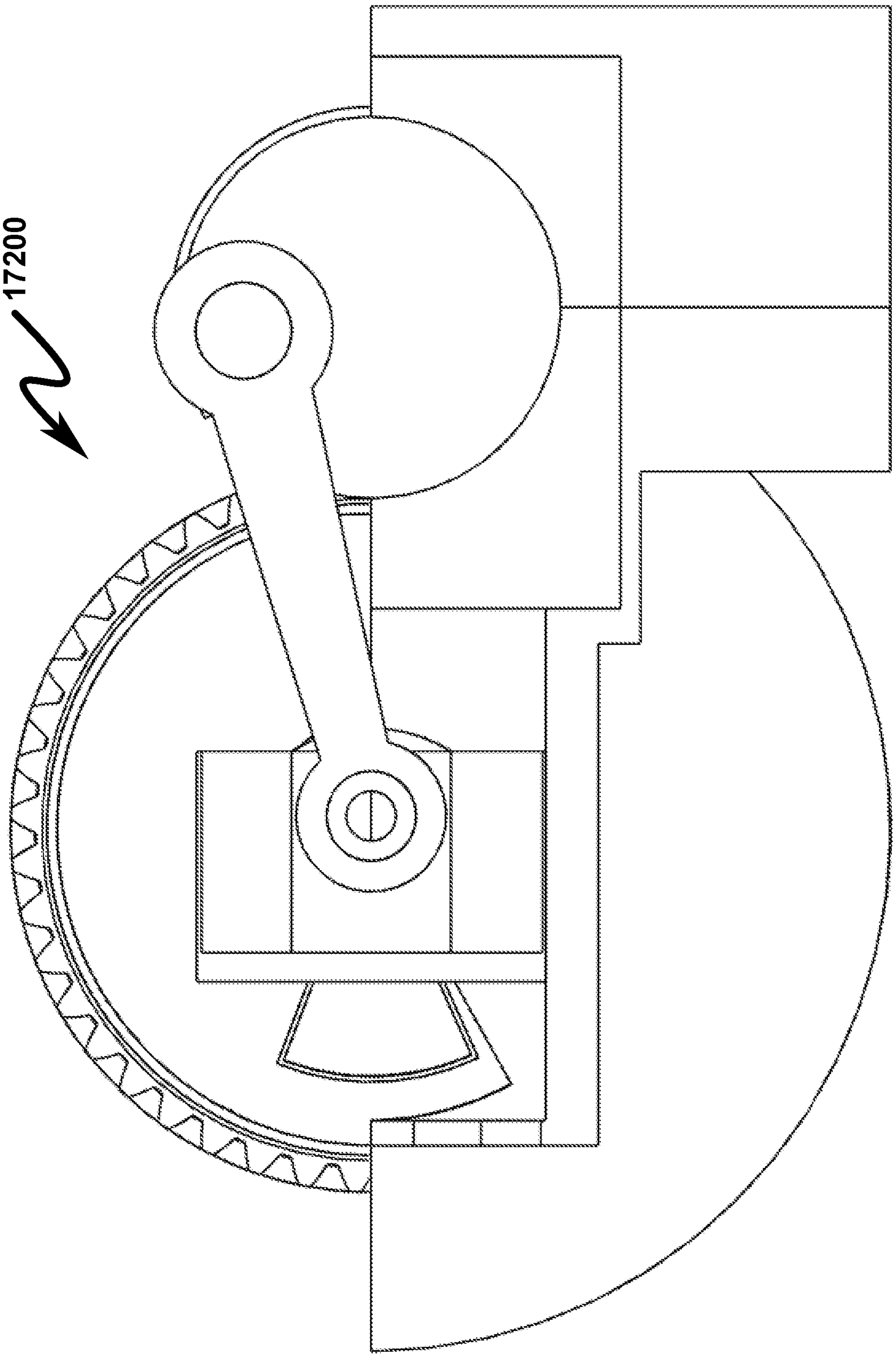
Figure 173:
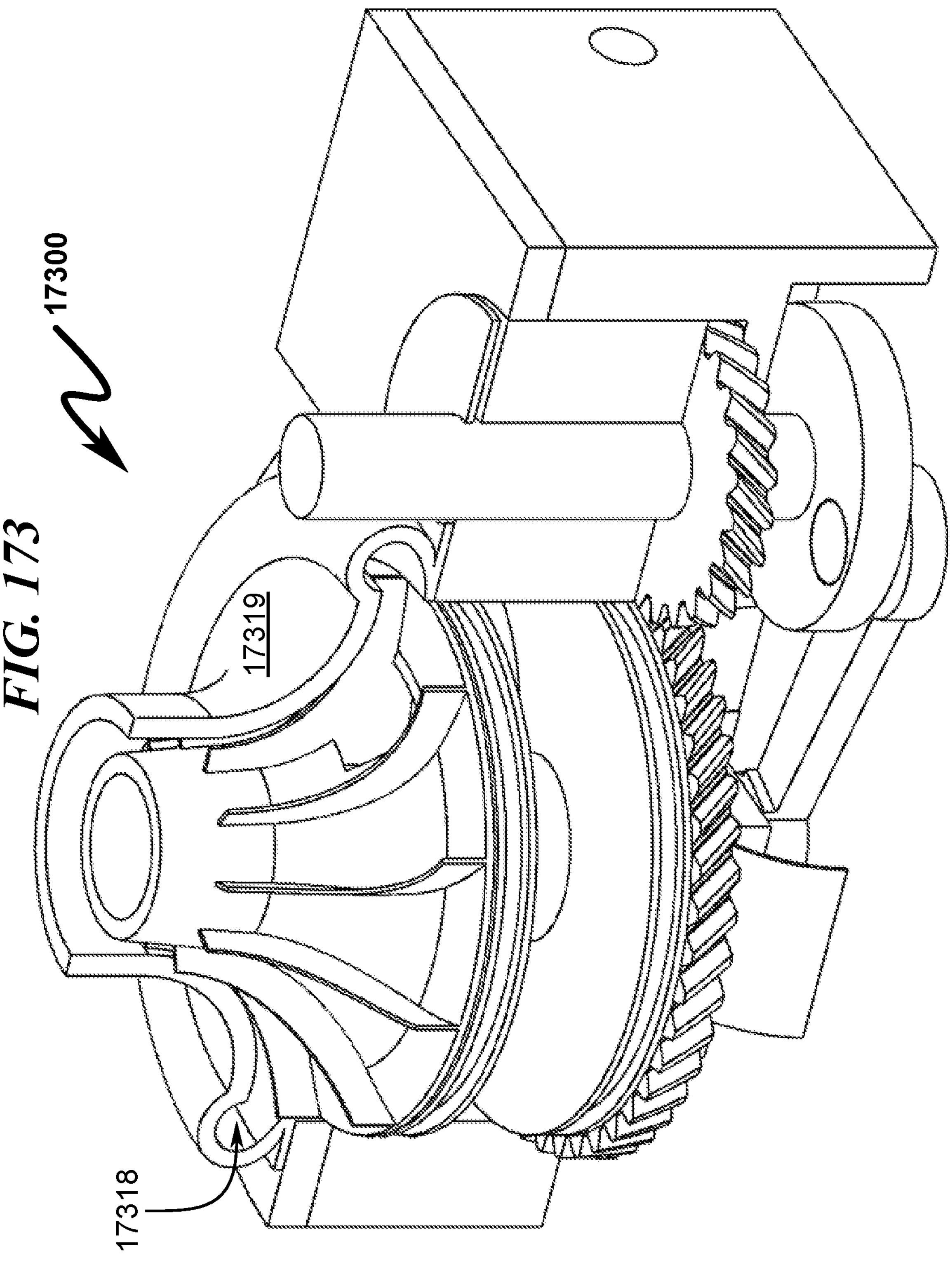
Figure 174:
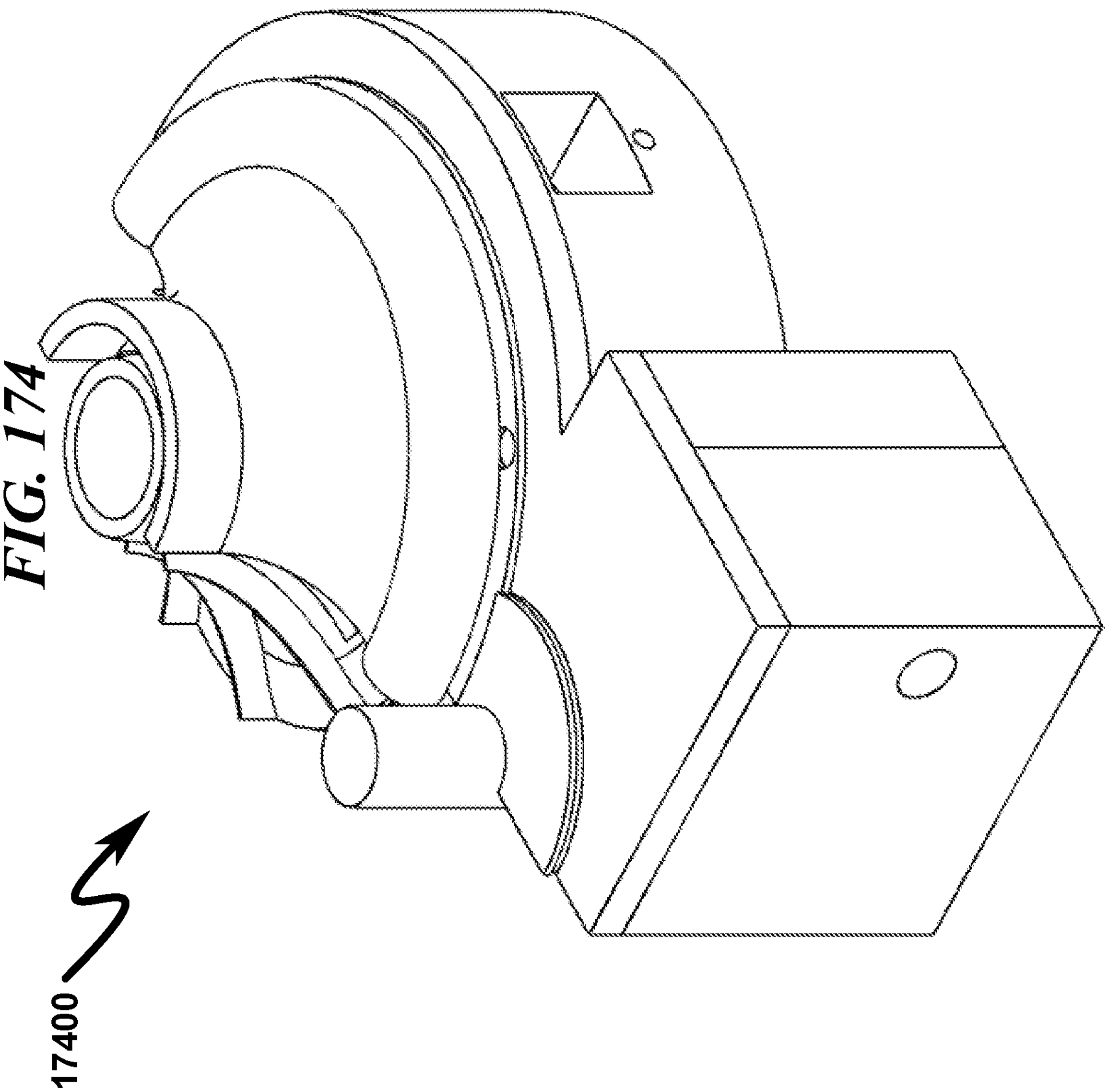
Figure 175:
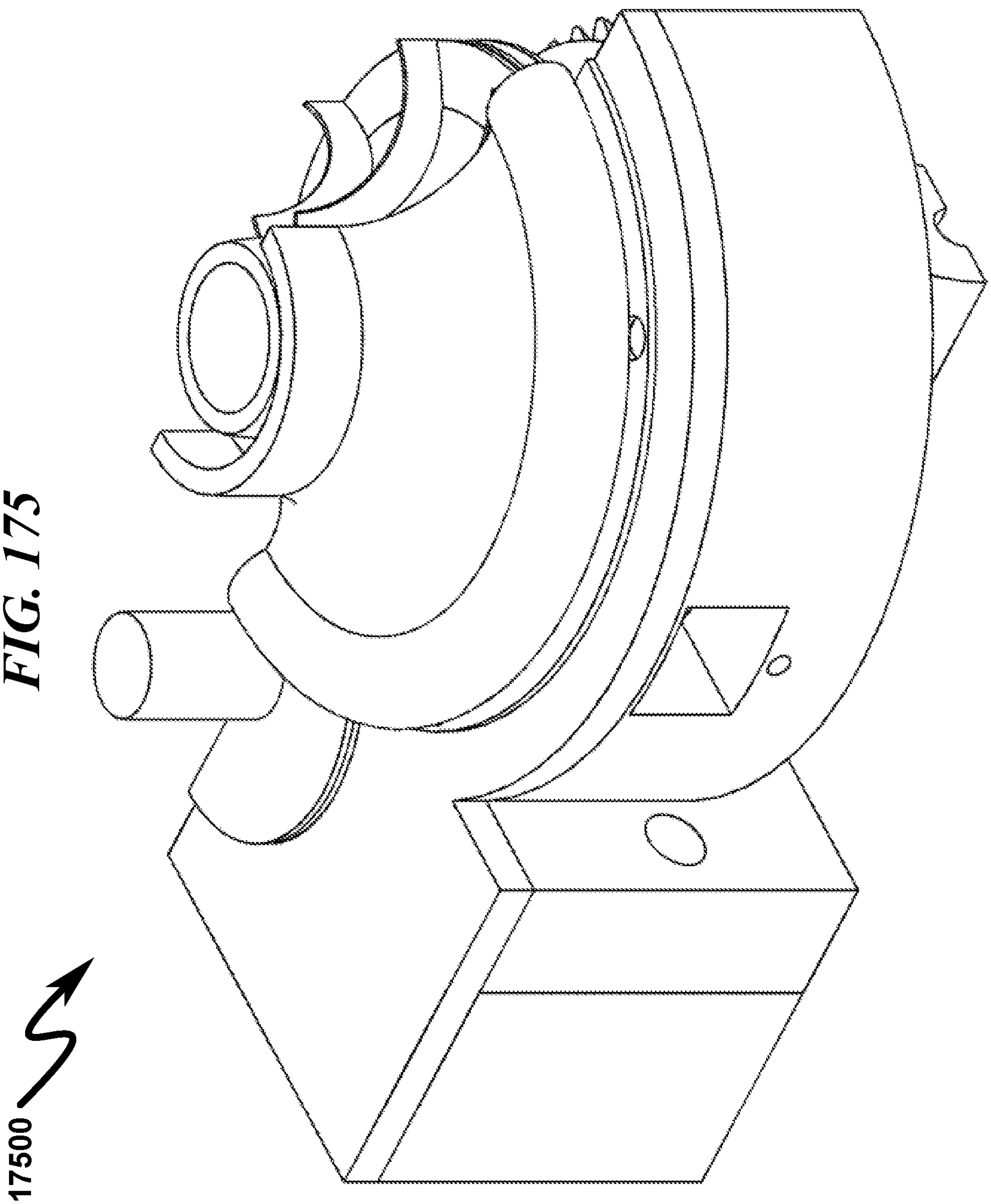
Figure 176:
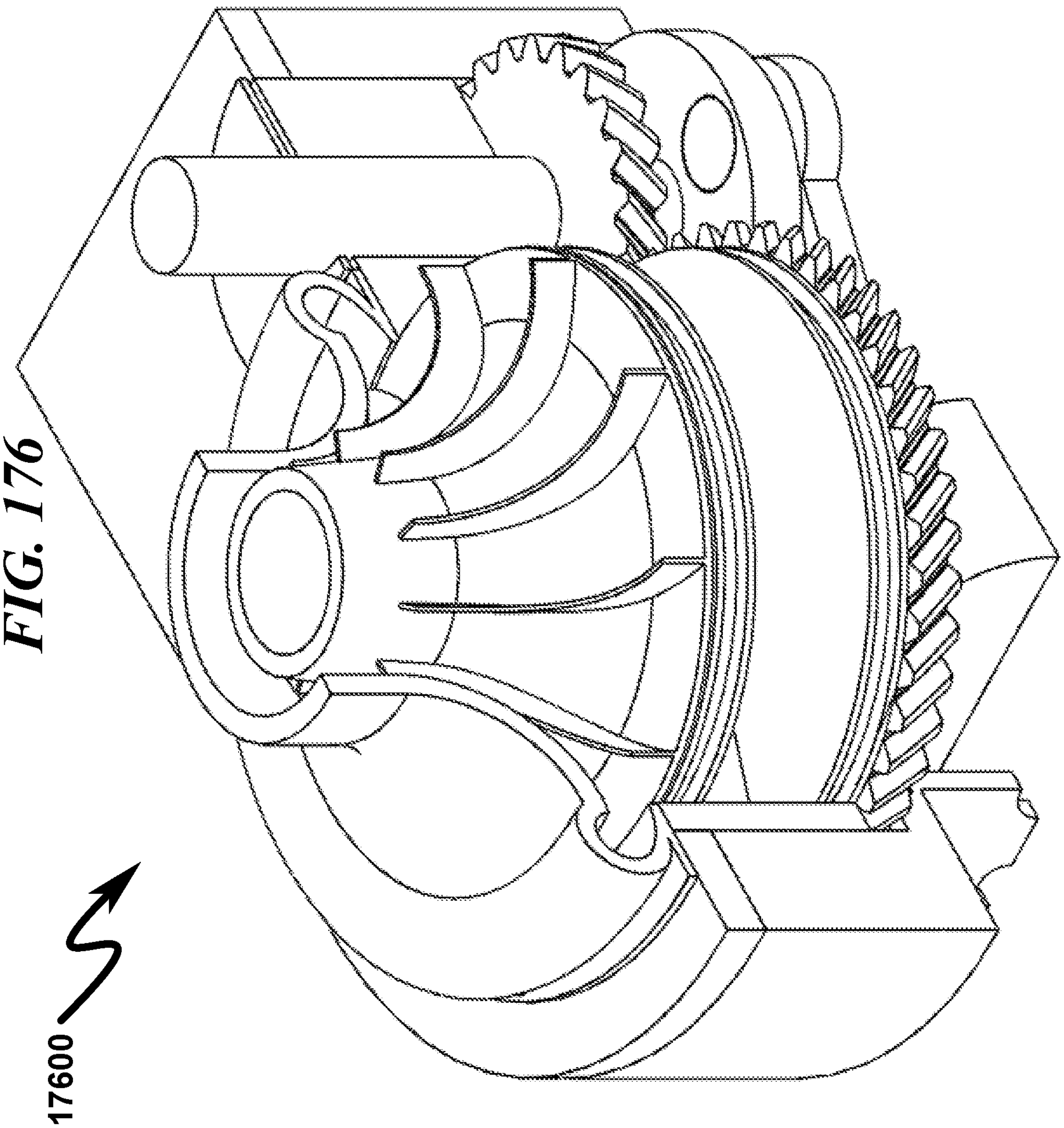
Figure 177:
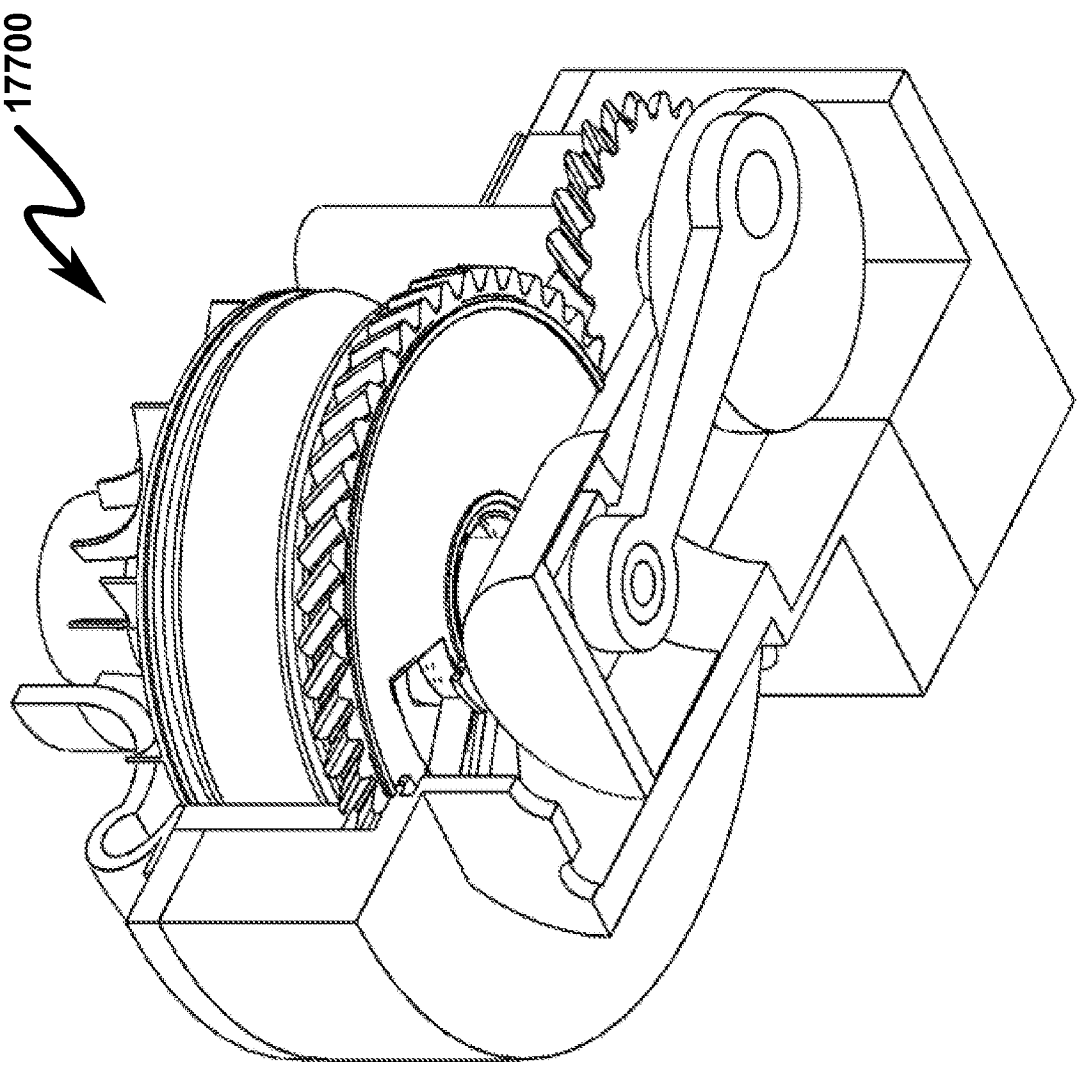
Figure 178:
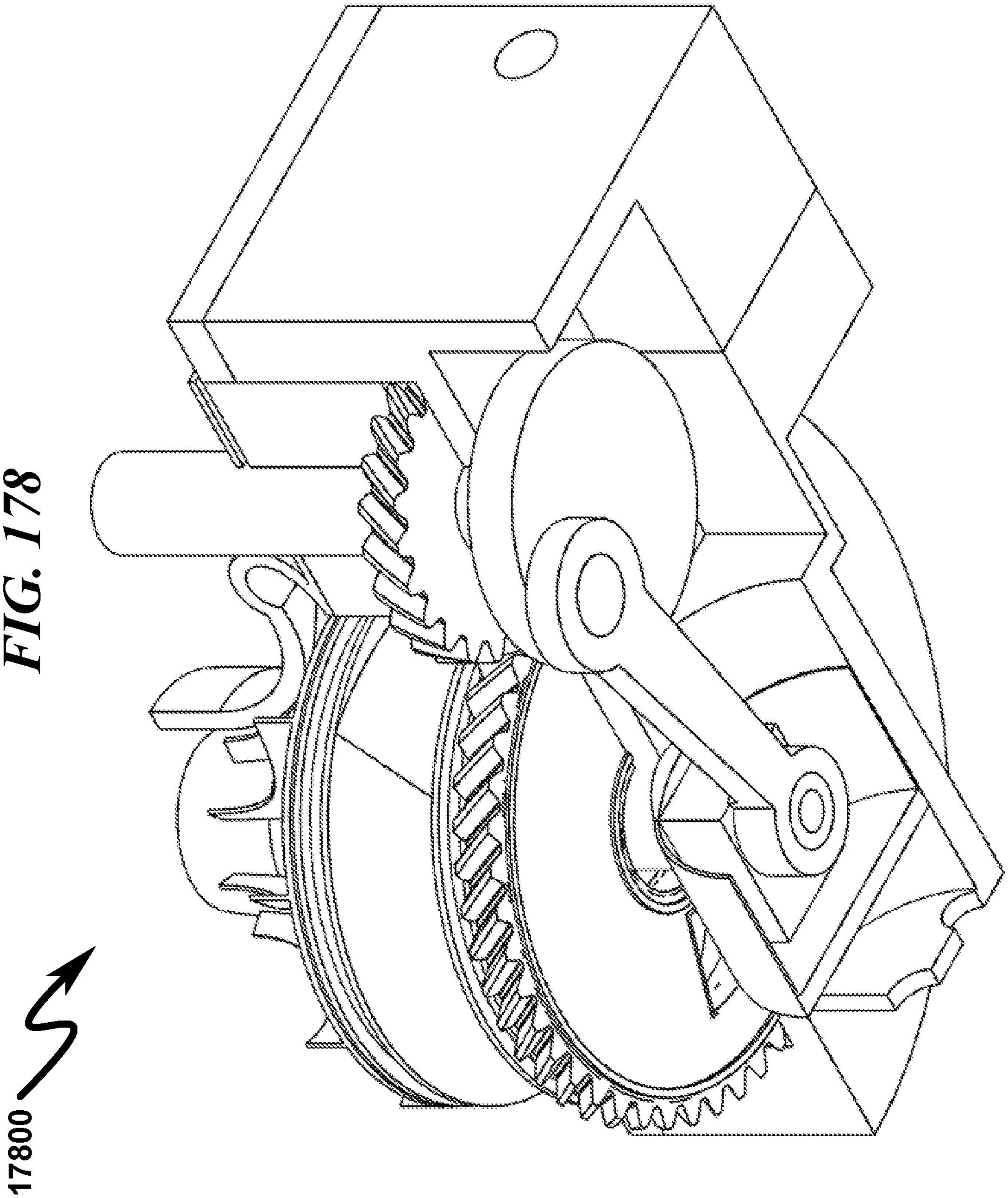
Figure 179:
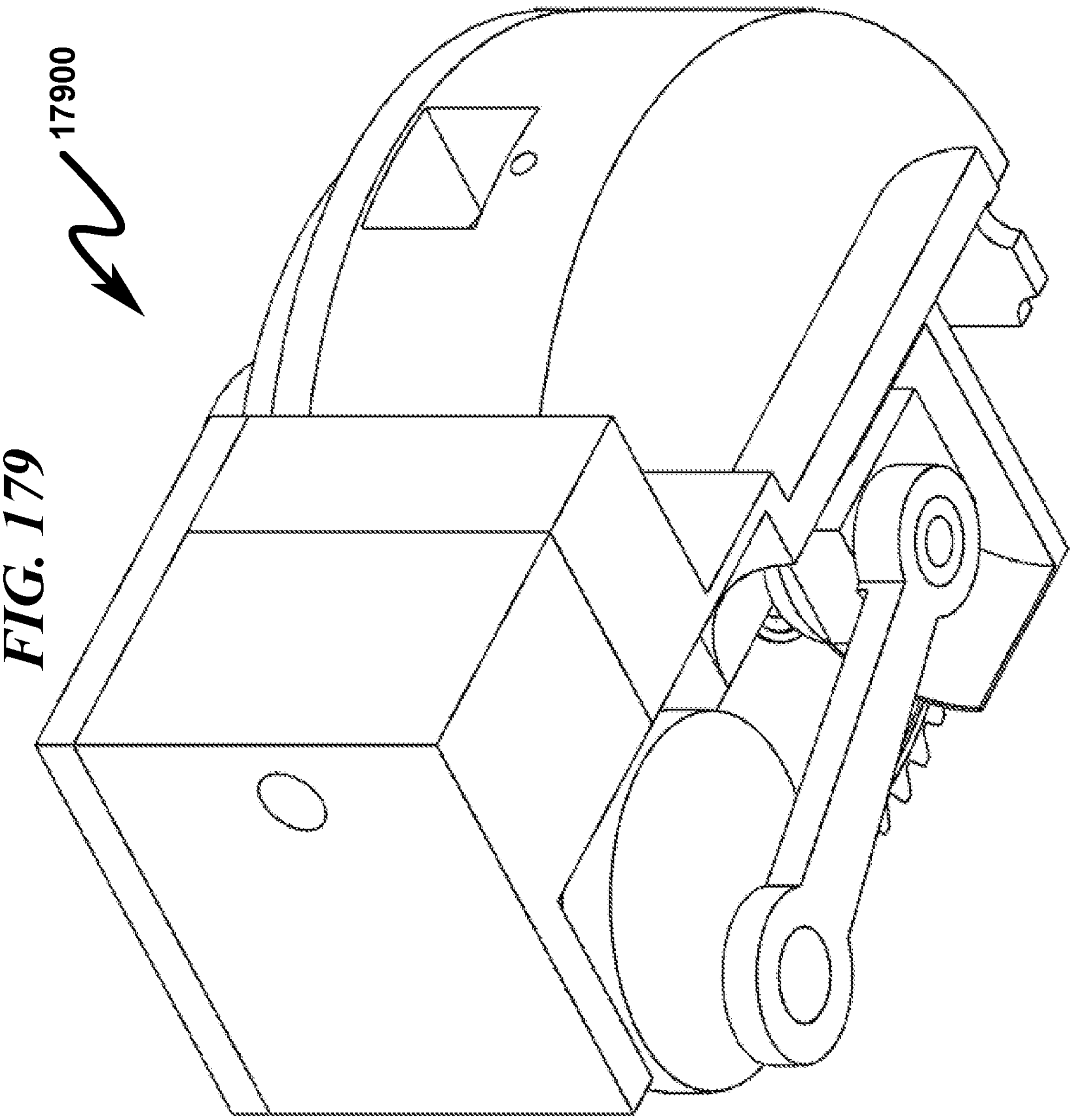
Figure 180:
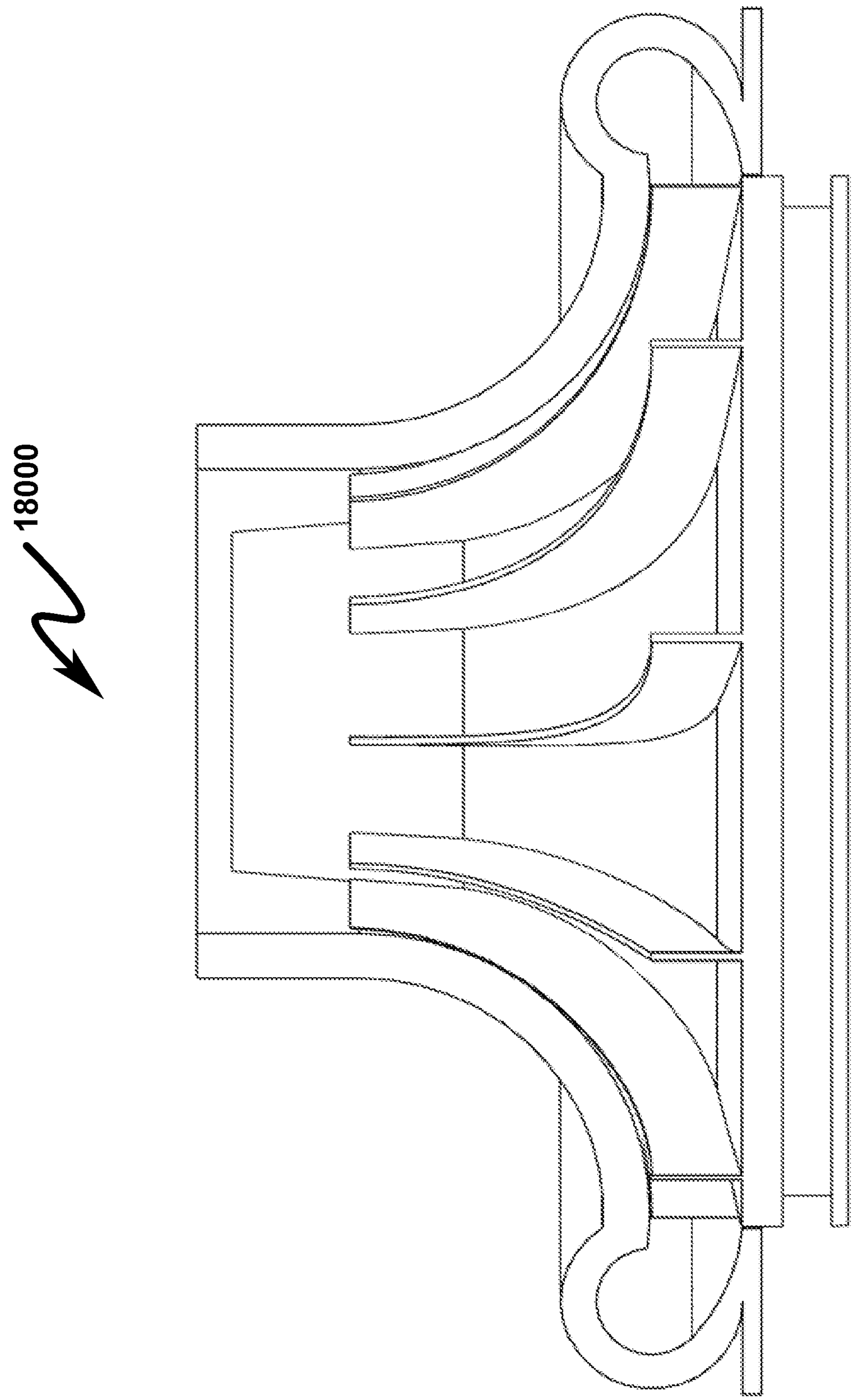
Figure 181:
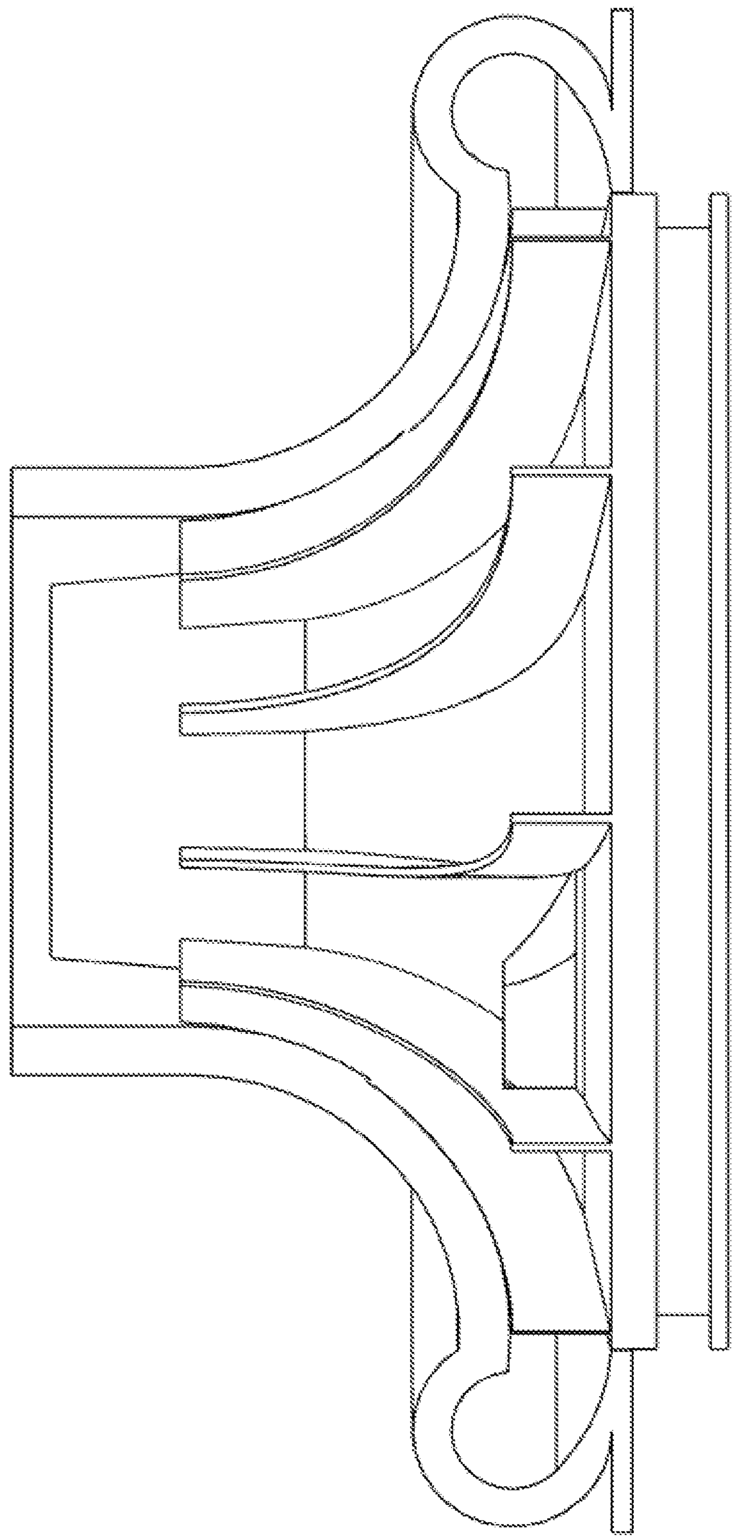
Figure 182:
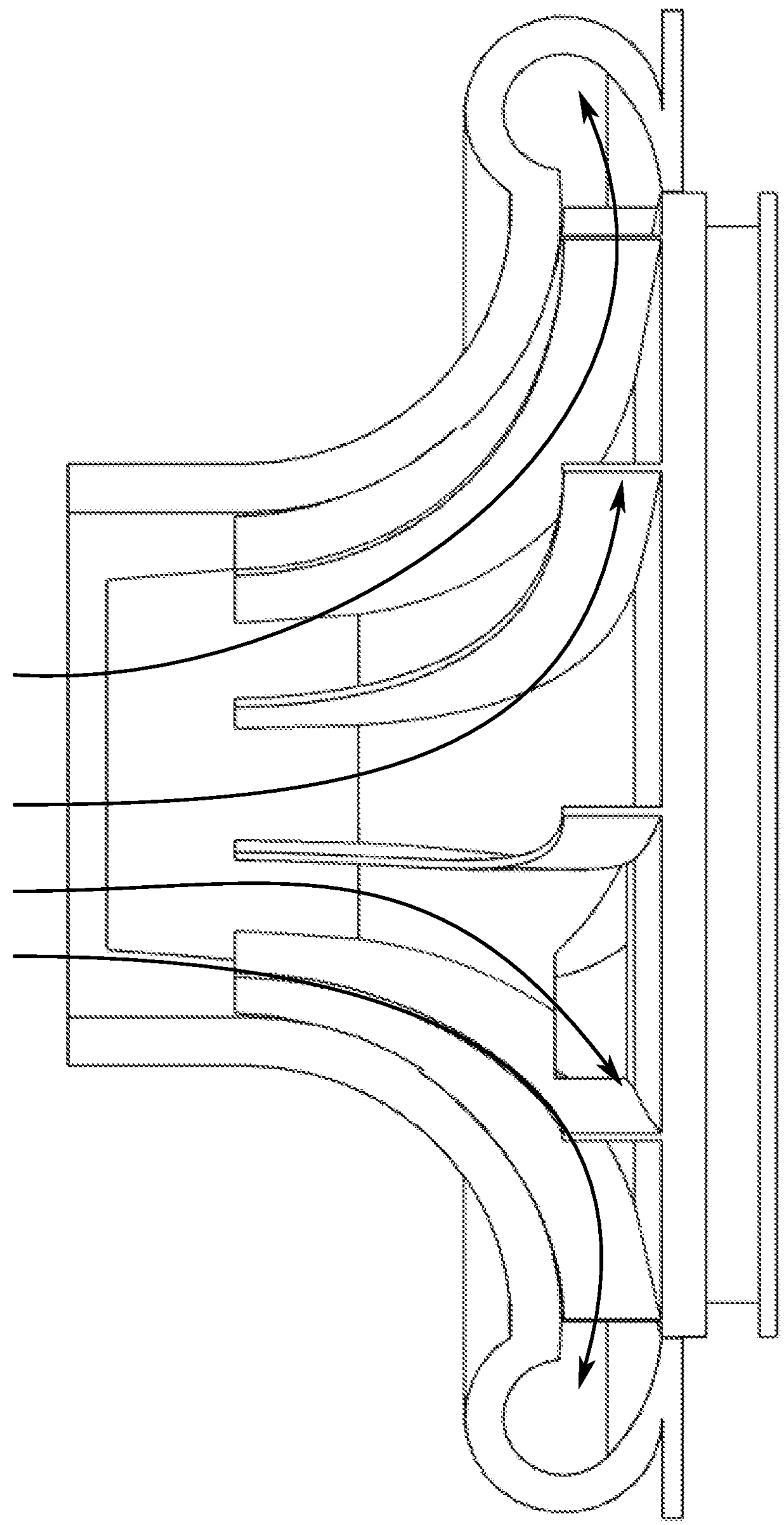
Figure 183:
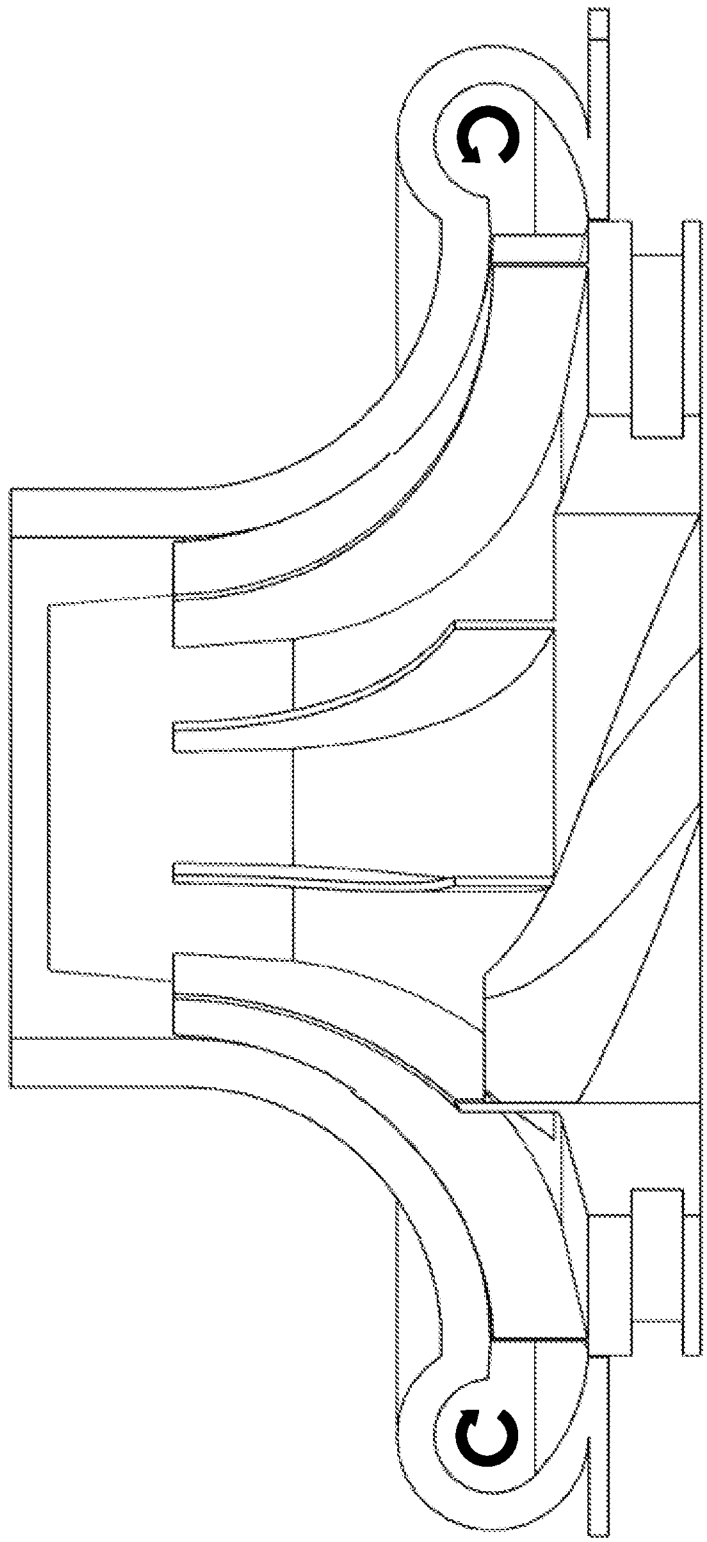
Figure 184:
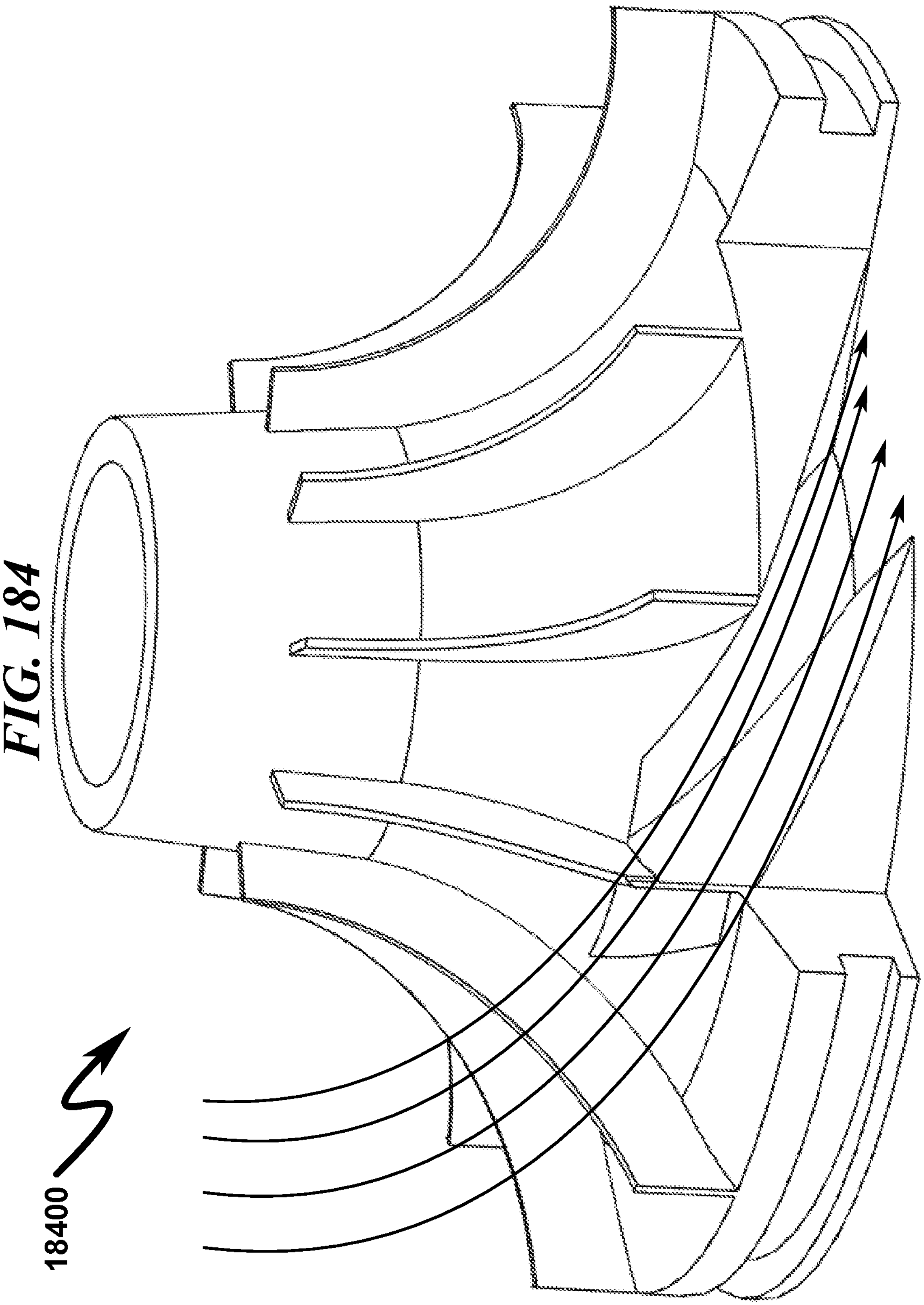
Figure 185:
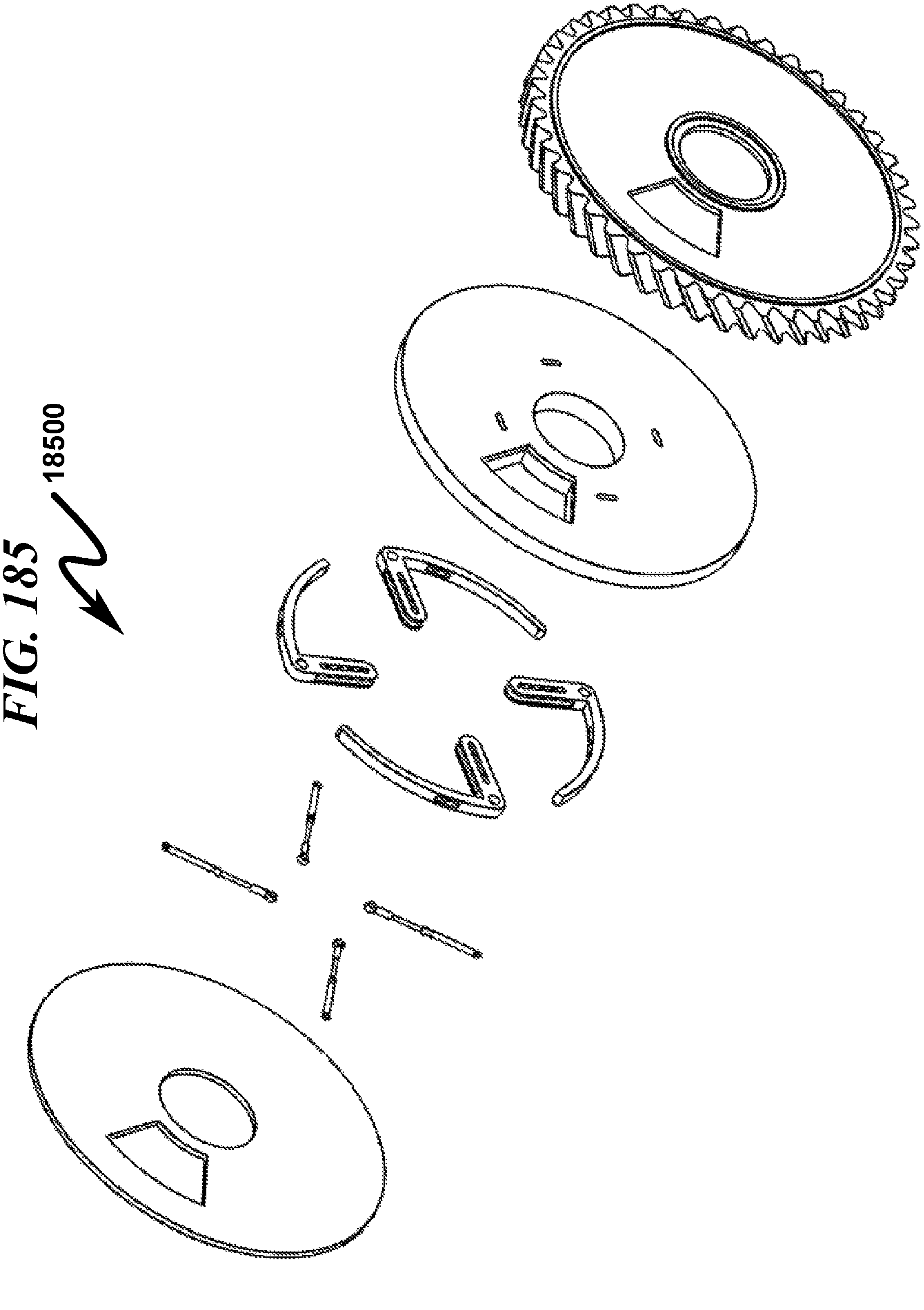
Figure 186:
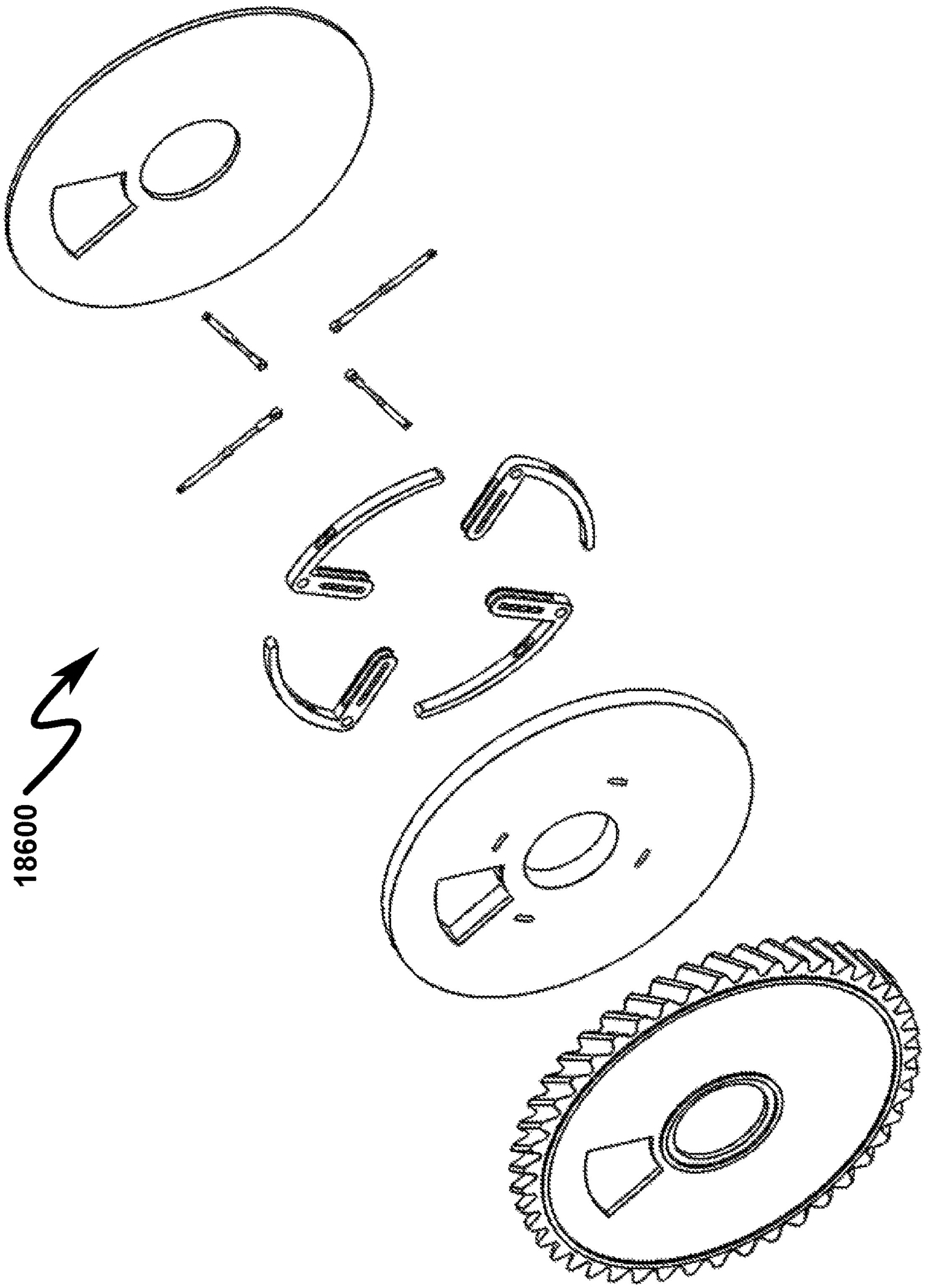
Figure 187:
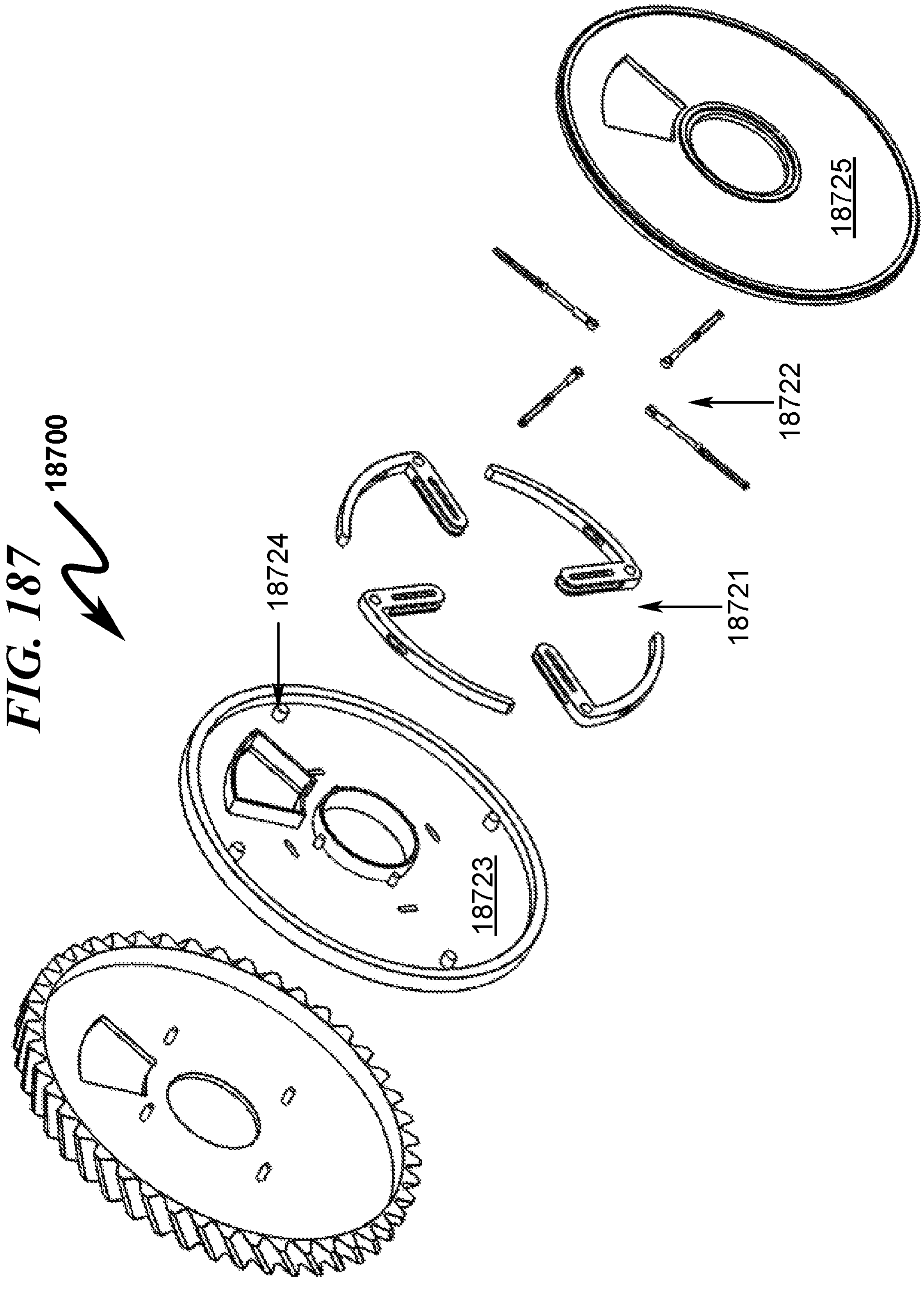
Figure 188:
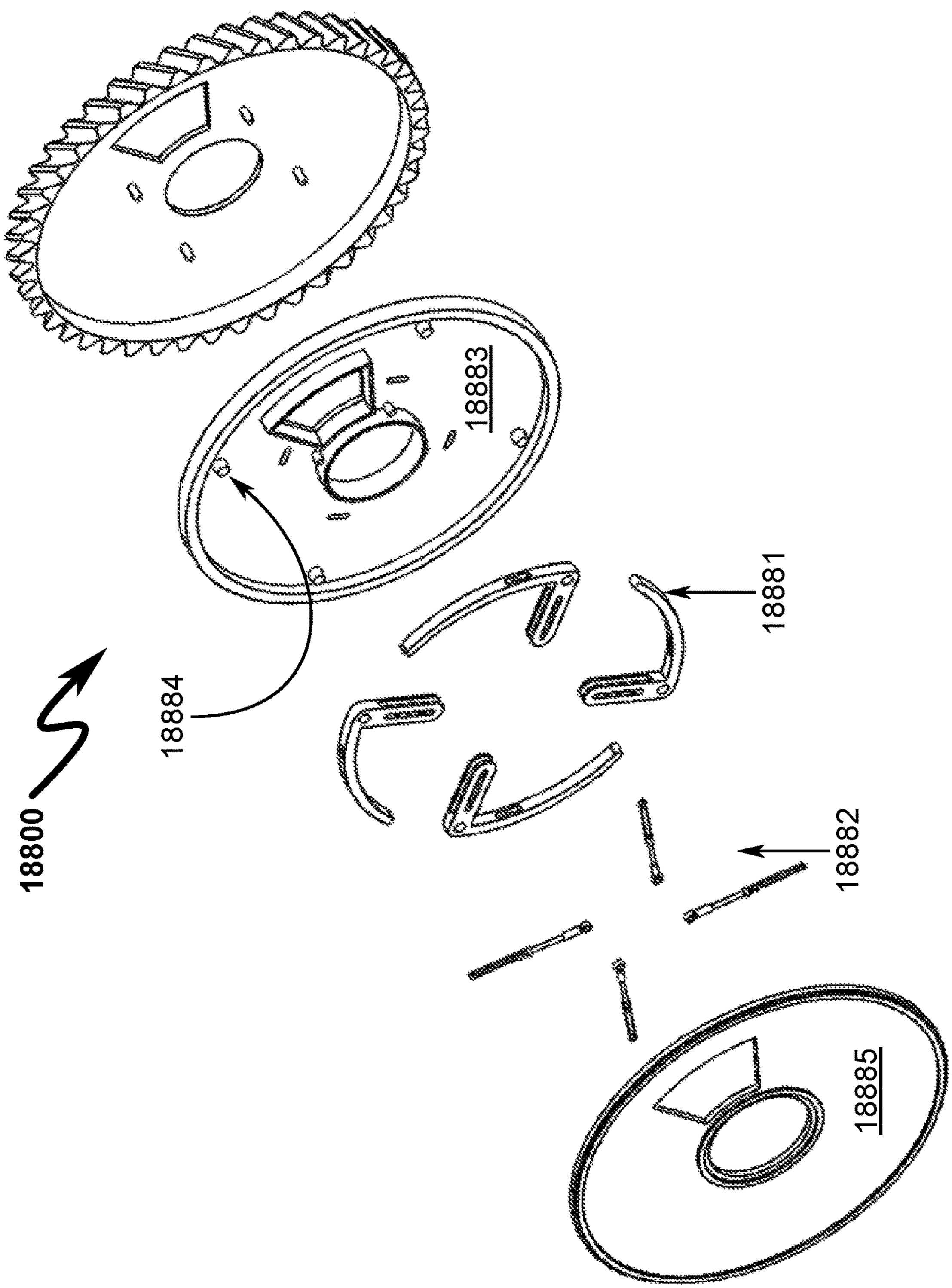
Figure 189:
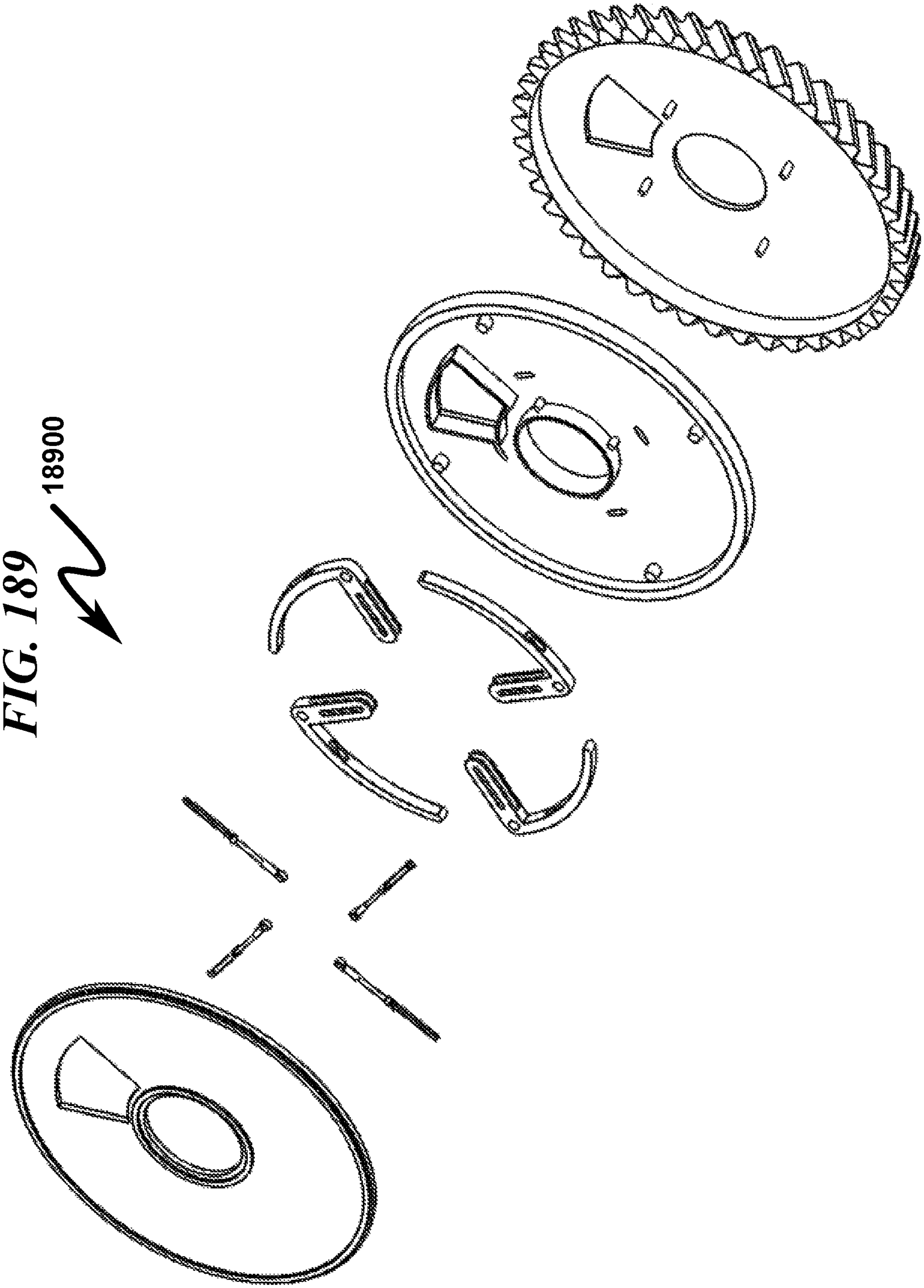
Figure 190:
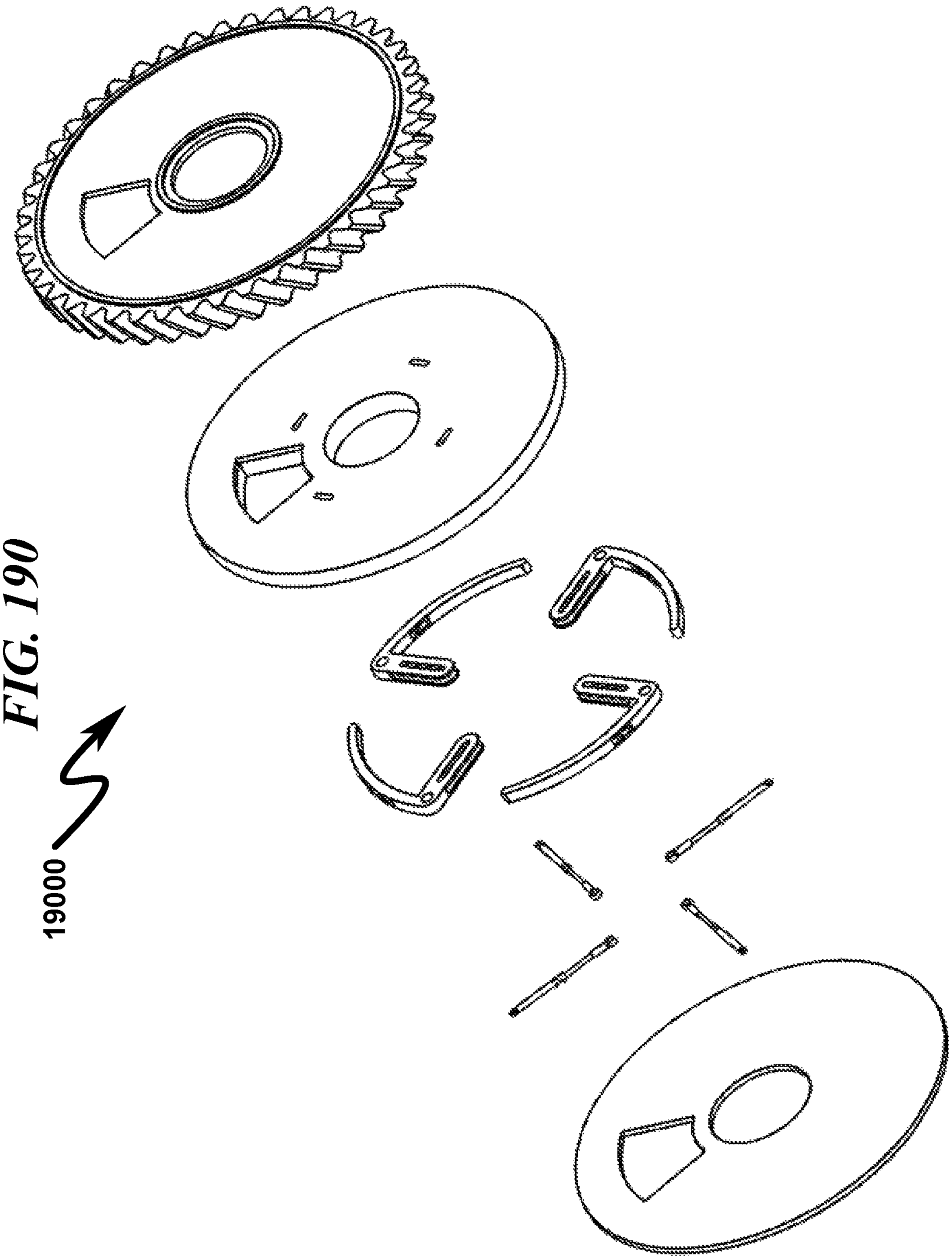
Figure 191:
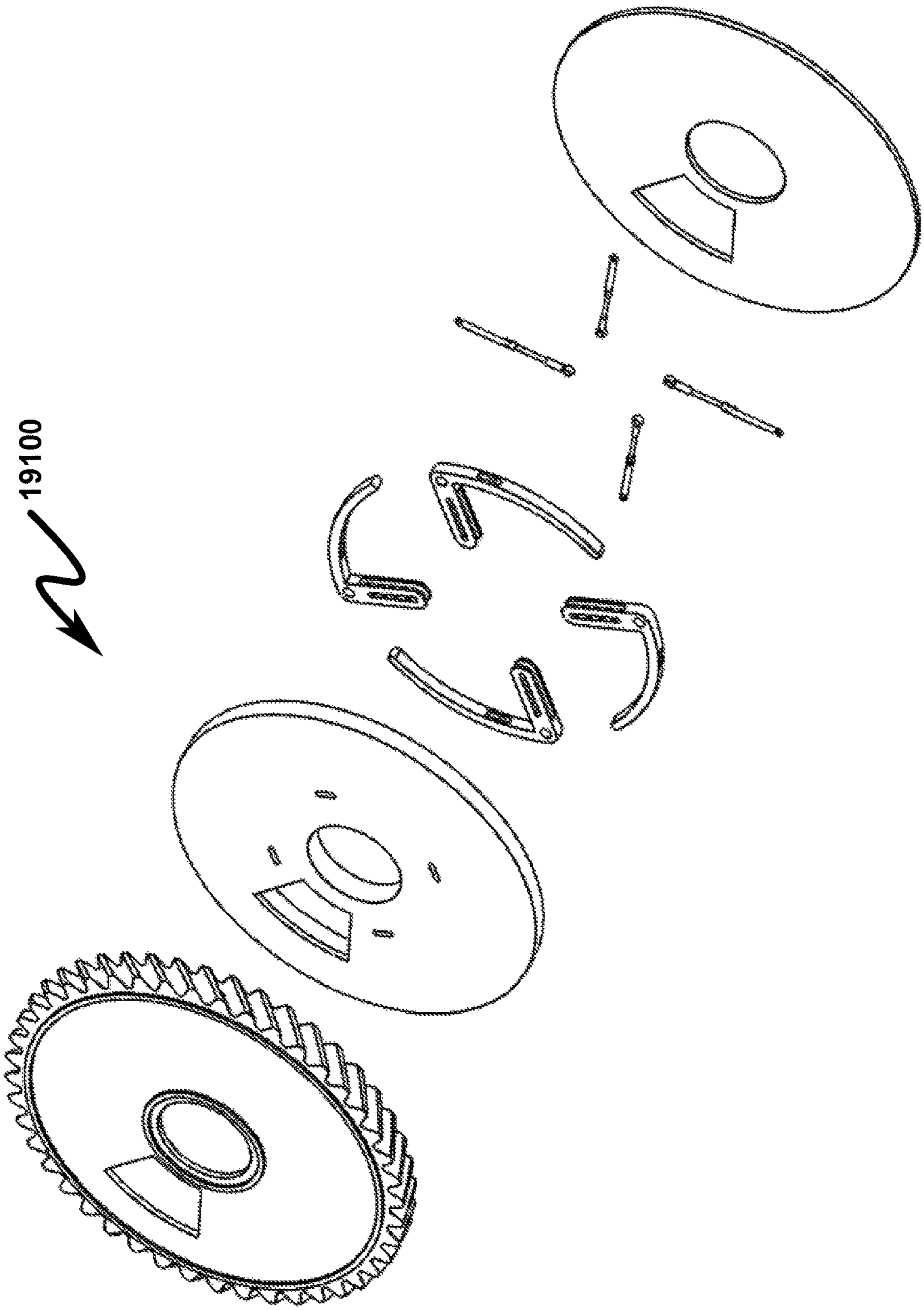
Figure 192:
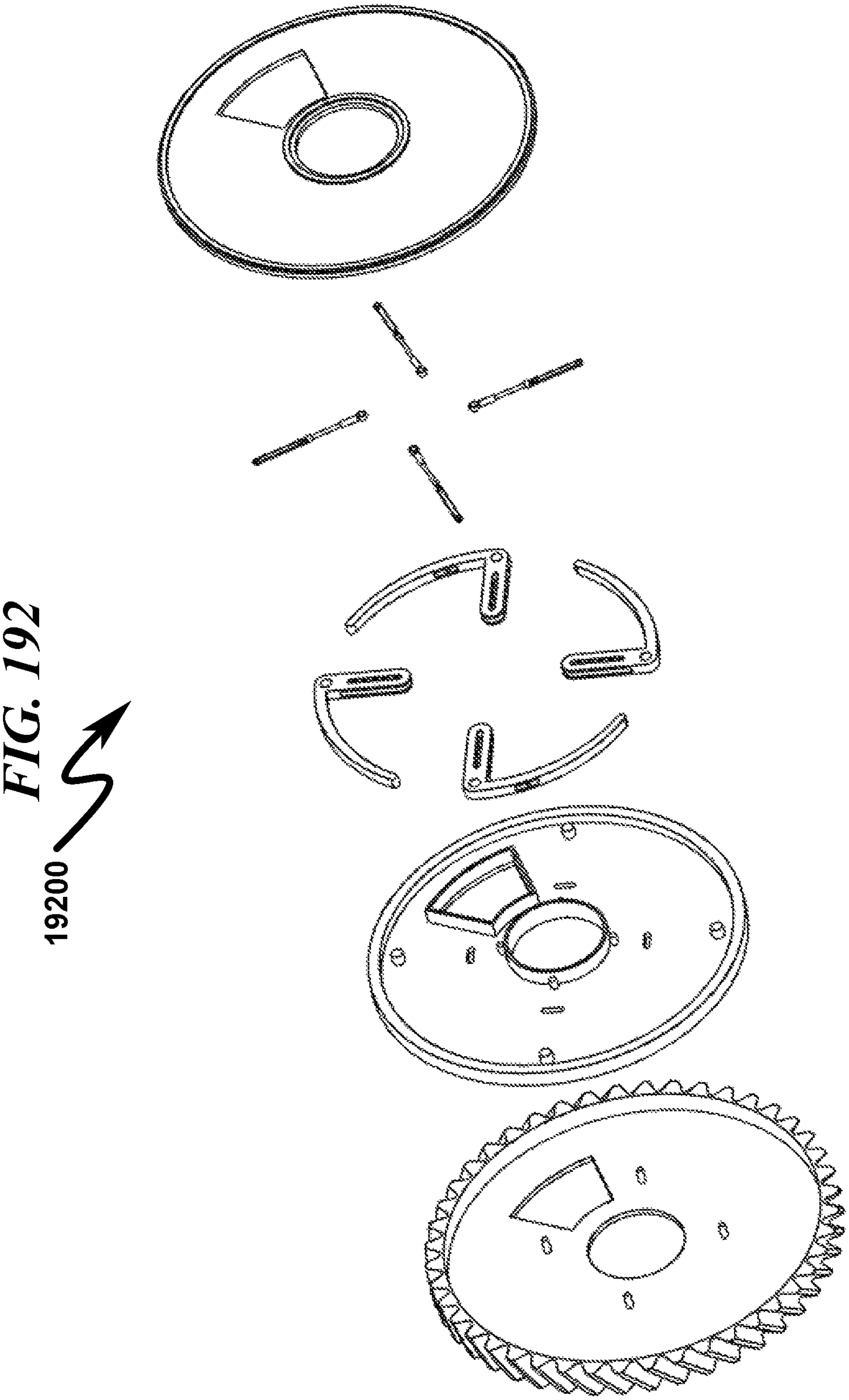
Figure 193:
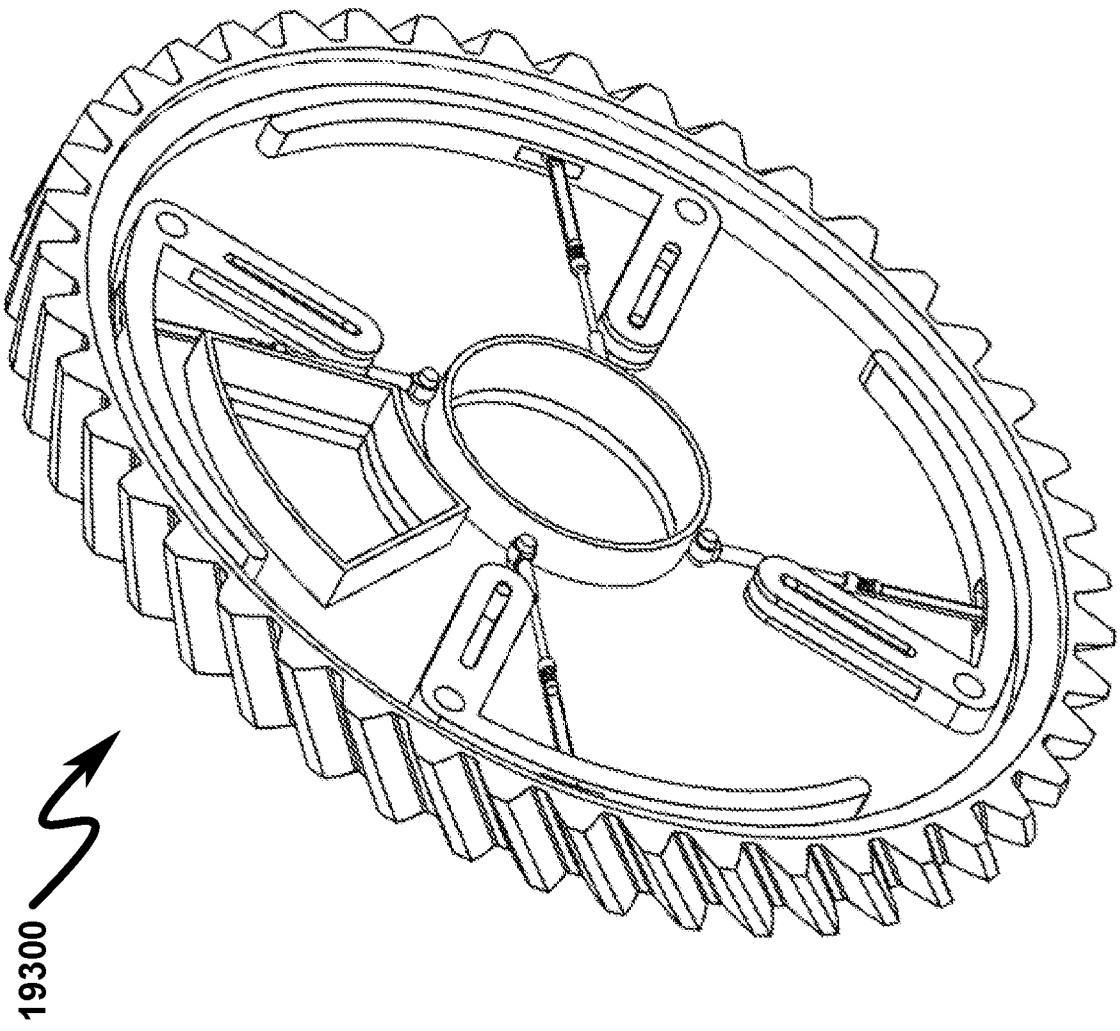
Figure 194:
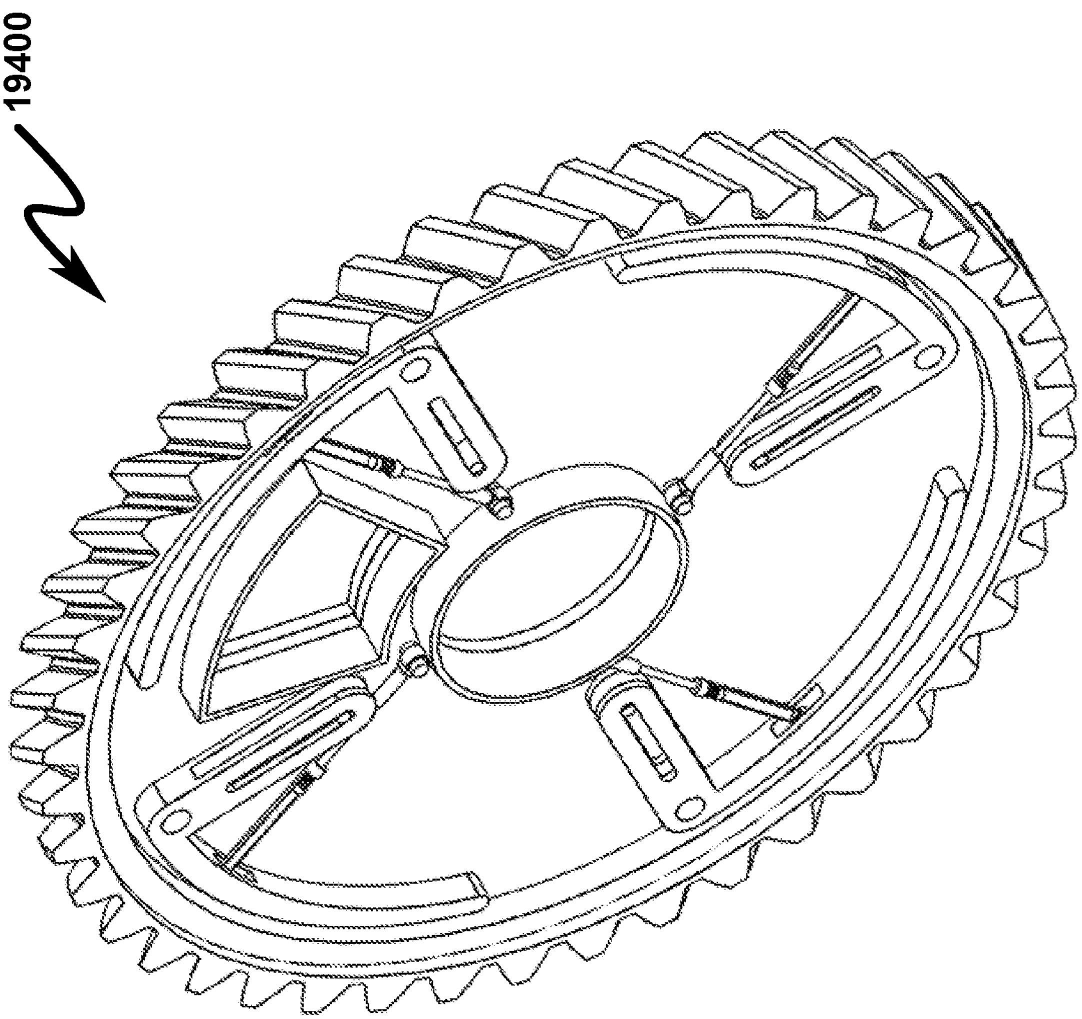
Figure 195:
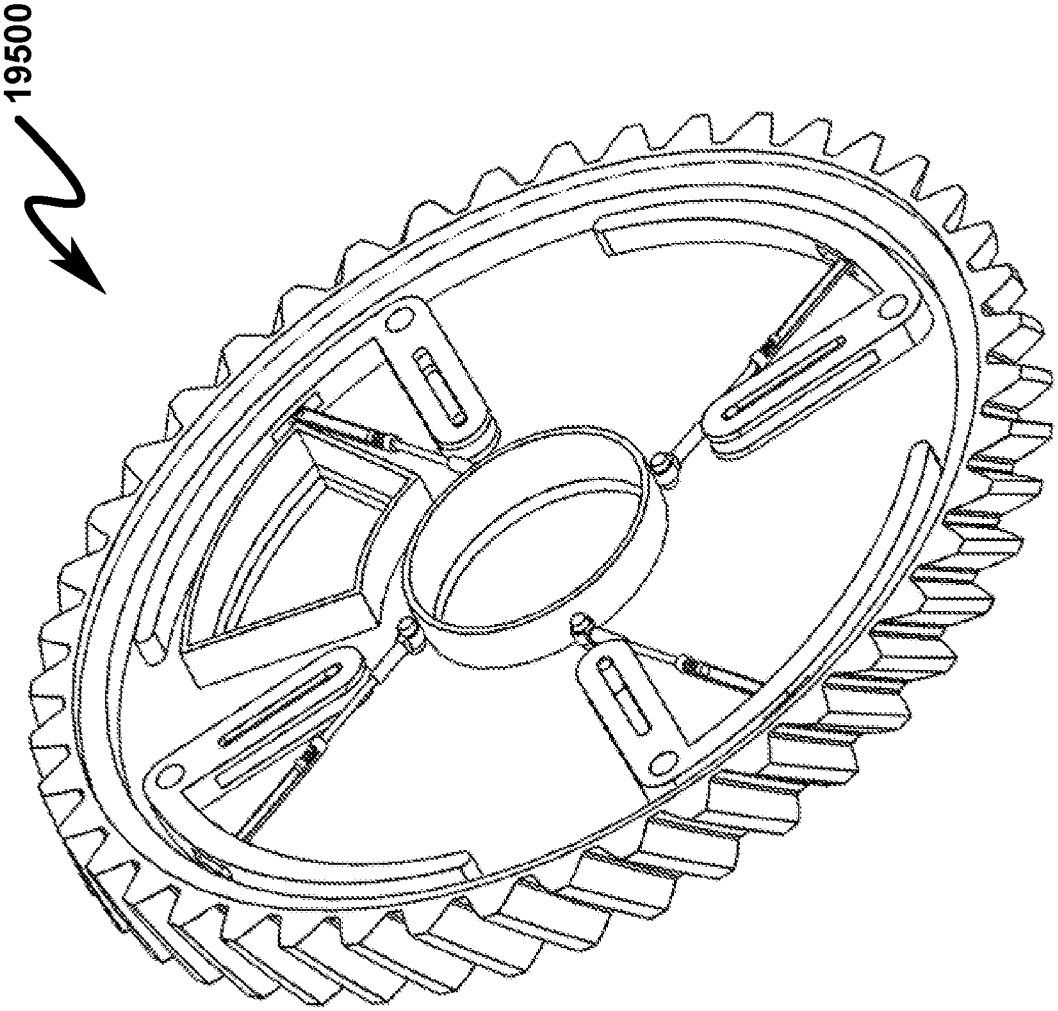
Figure 196:
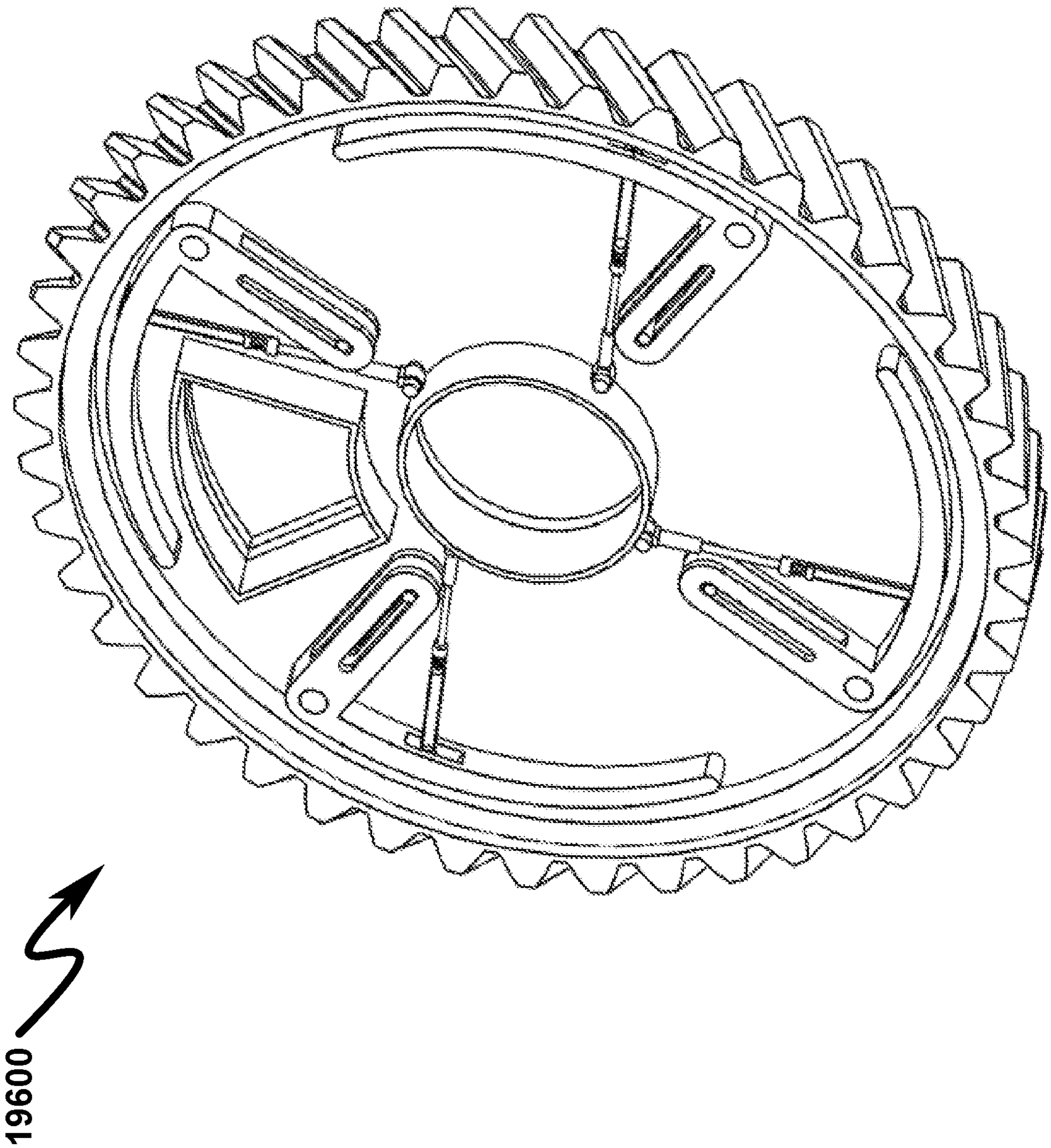
Figure 197:
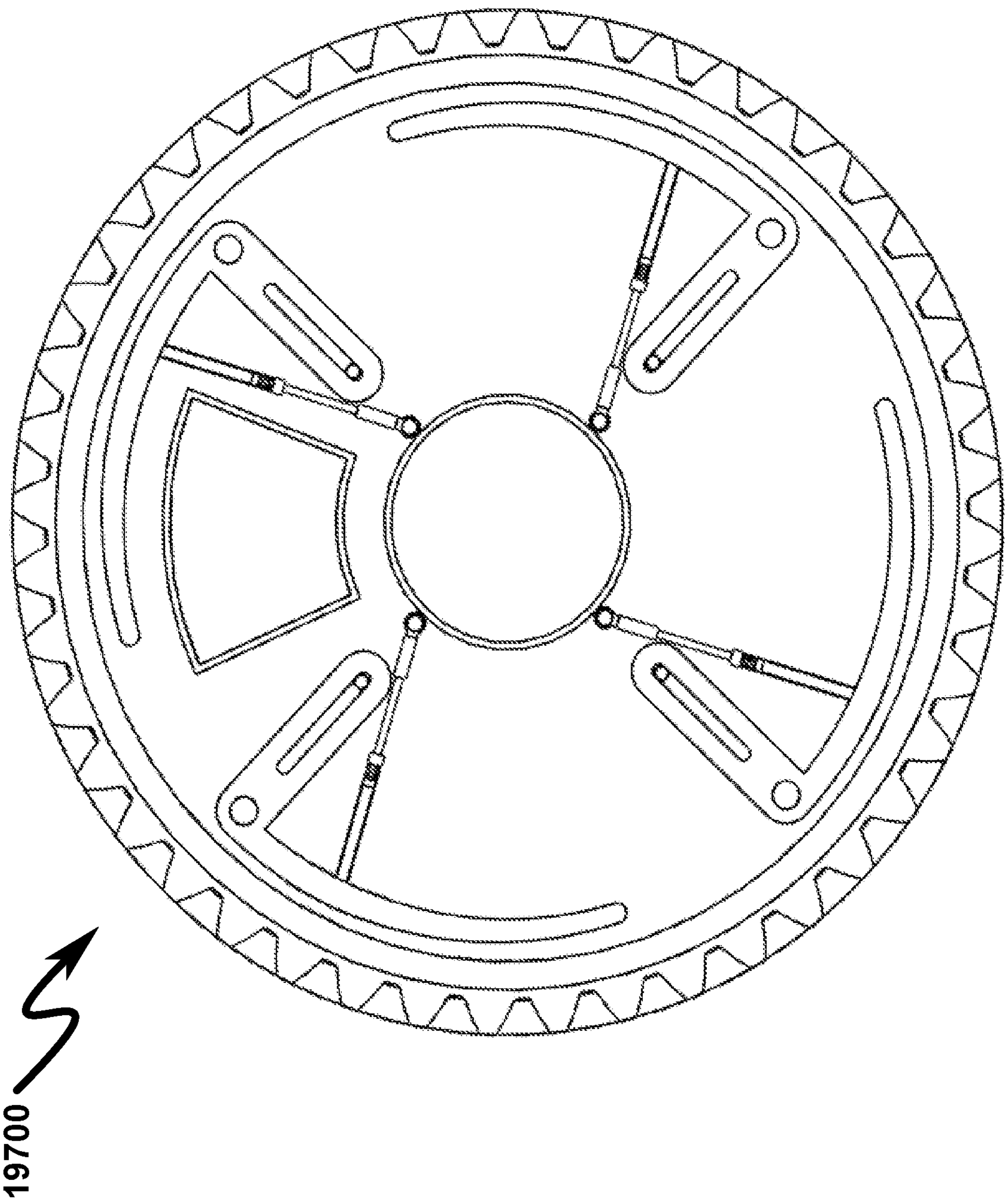
Figure 198:
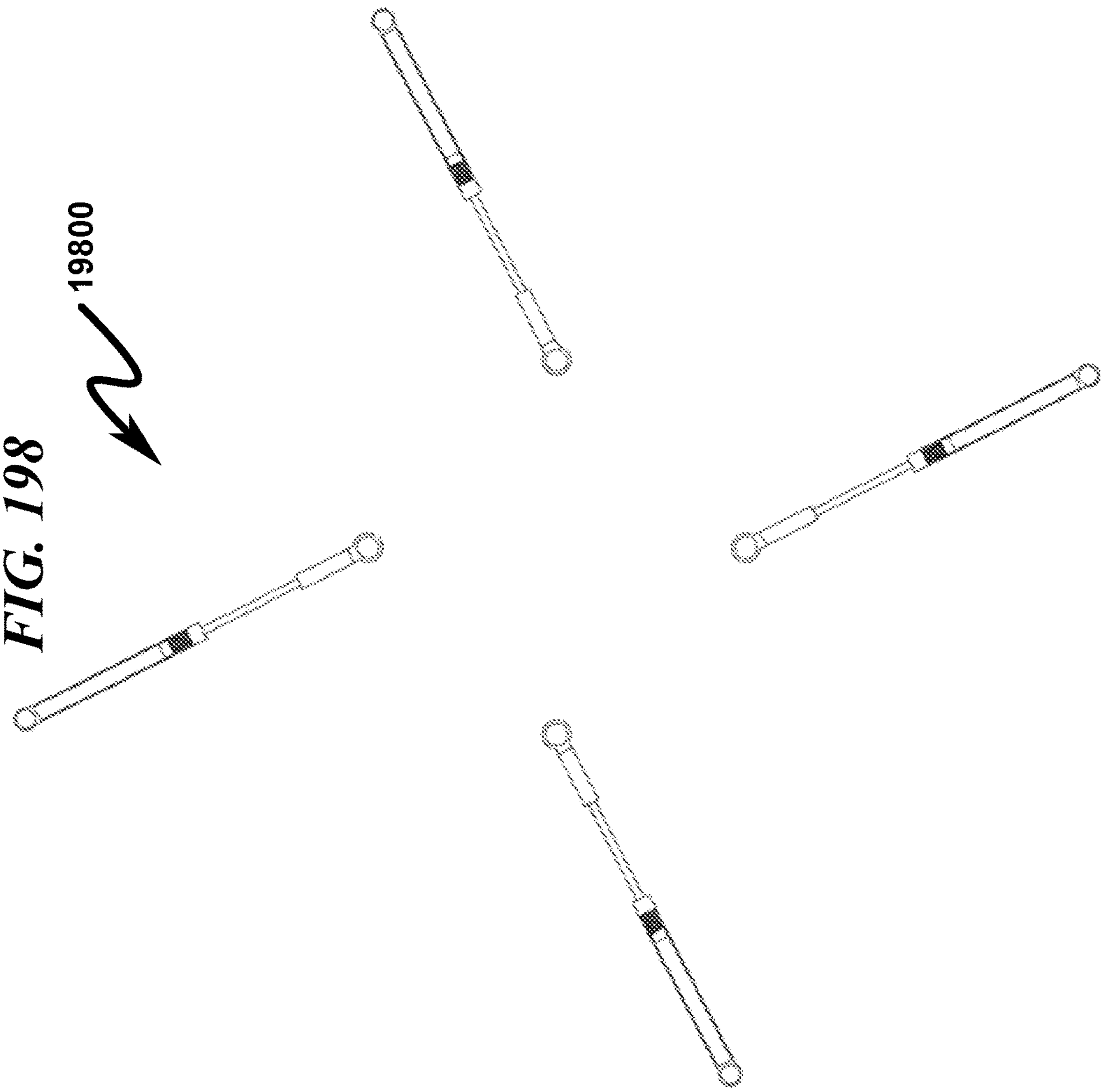
Figure 199:
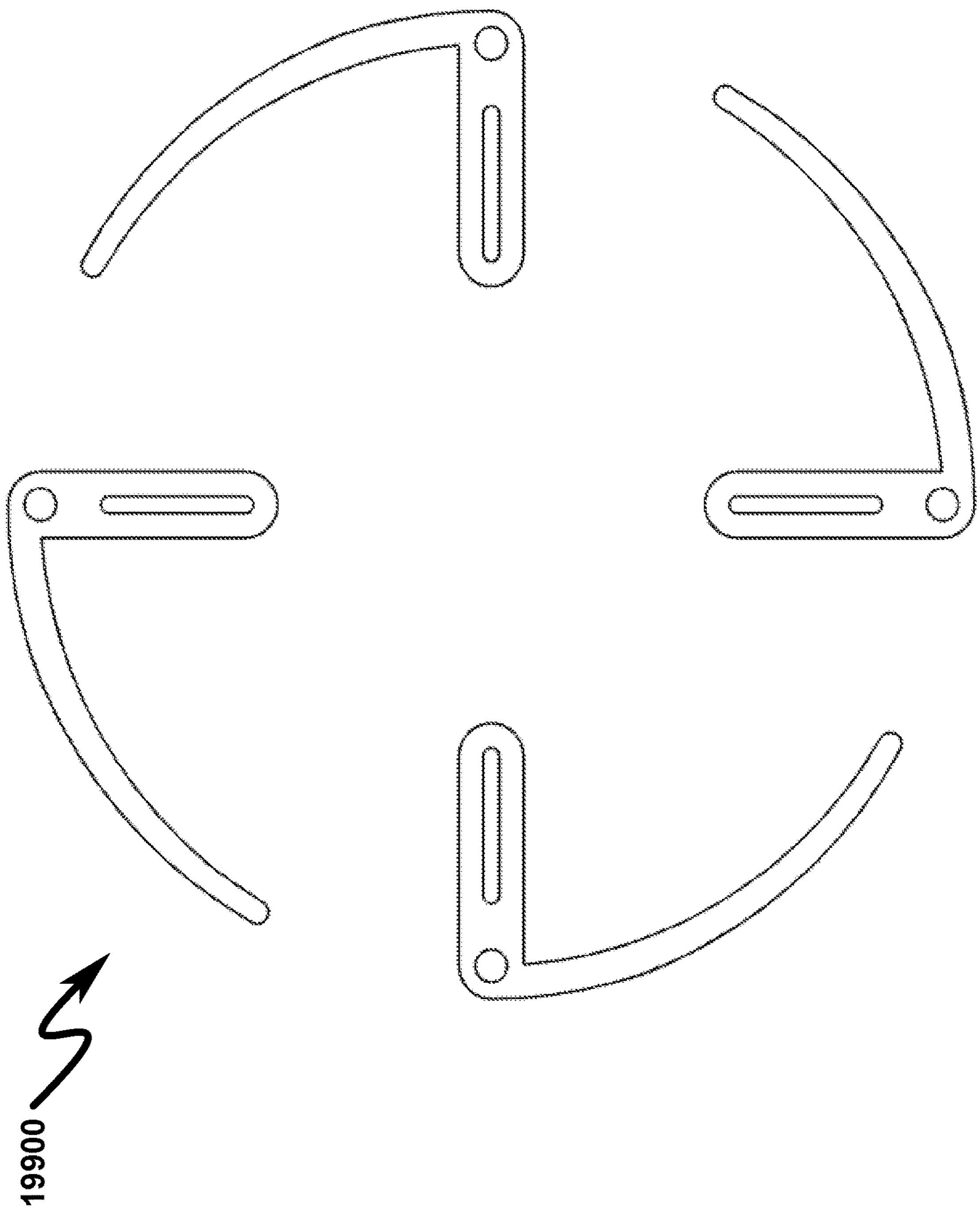
Figure 200:
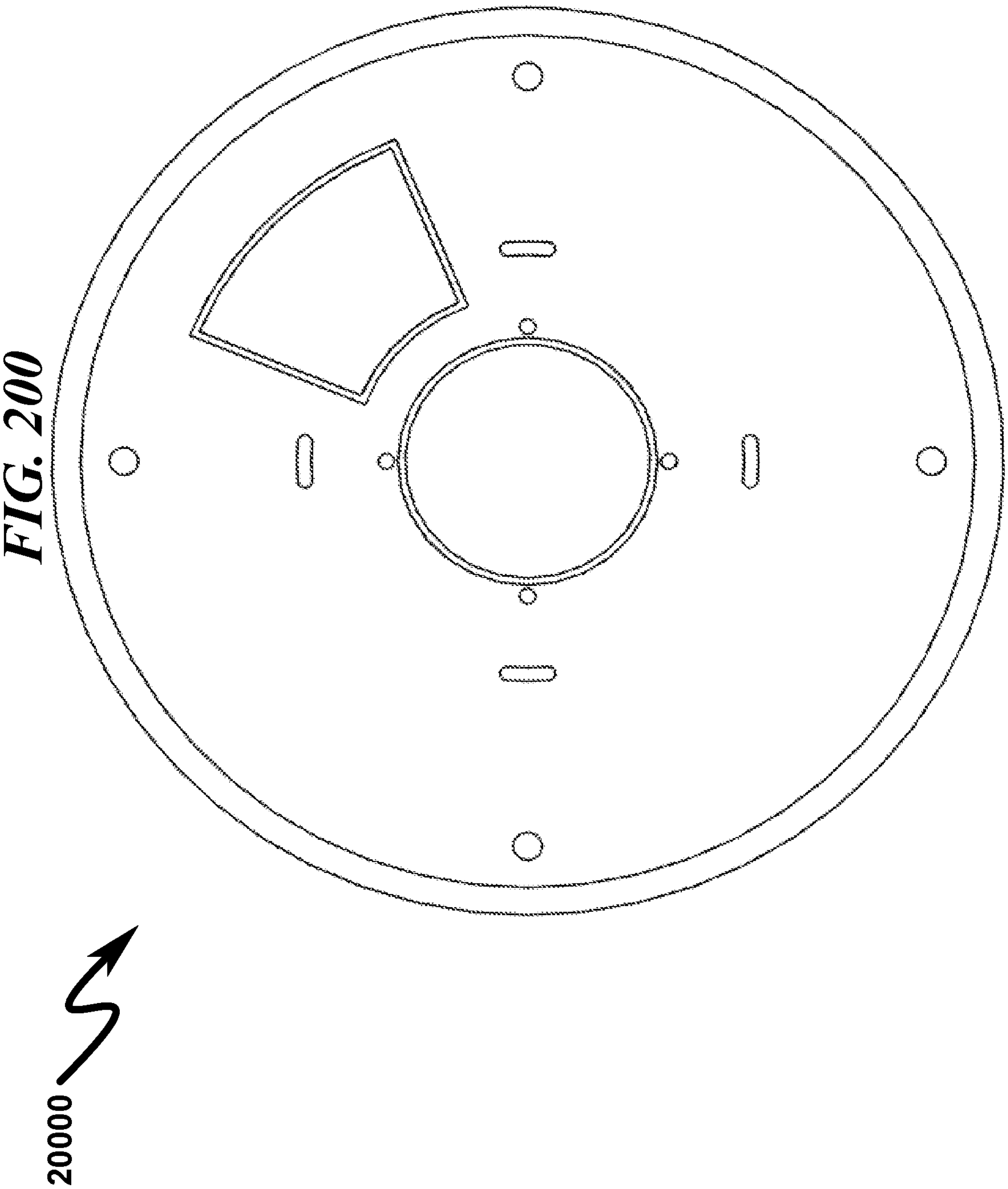
Figure 201:
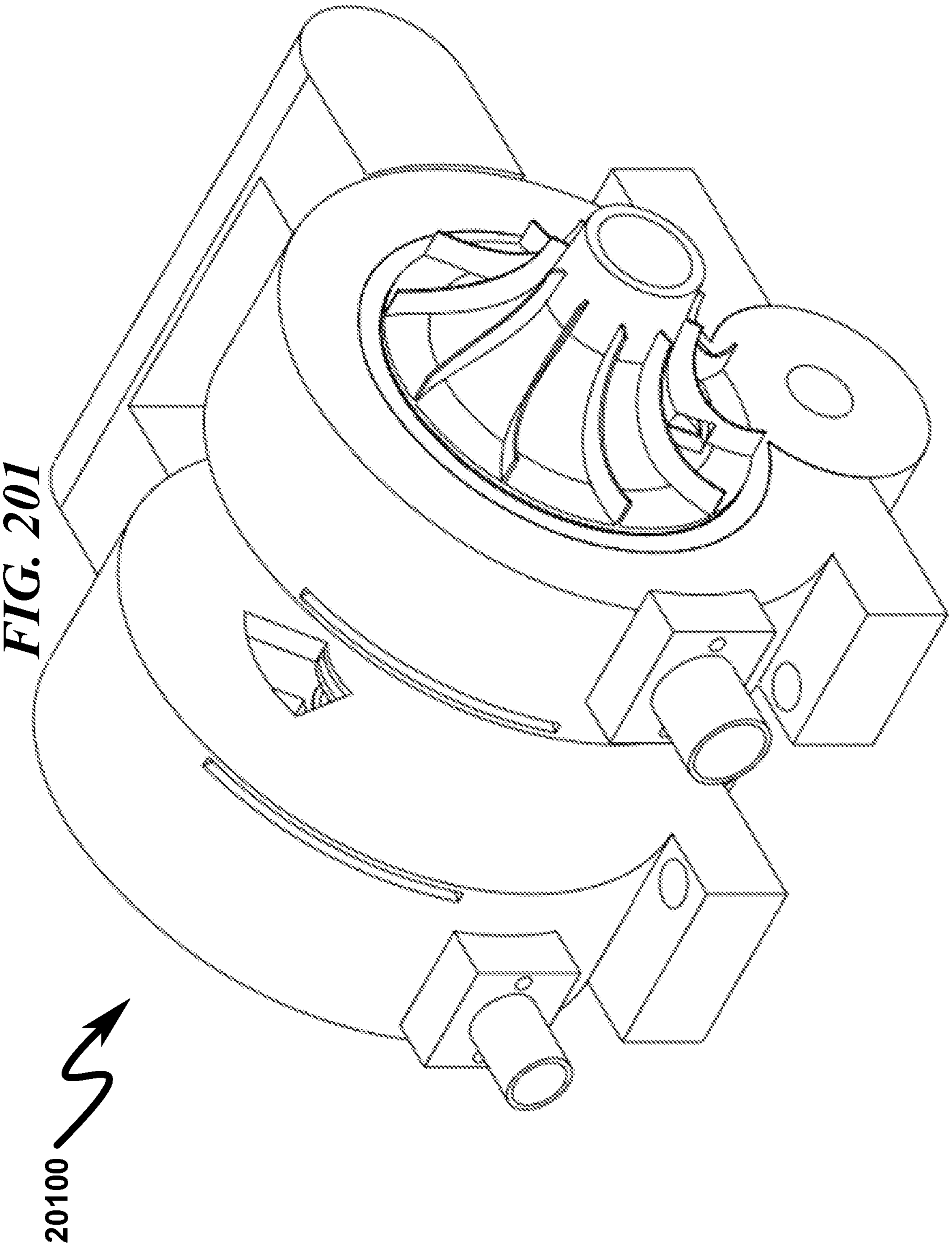
Figure 202:
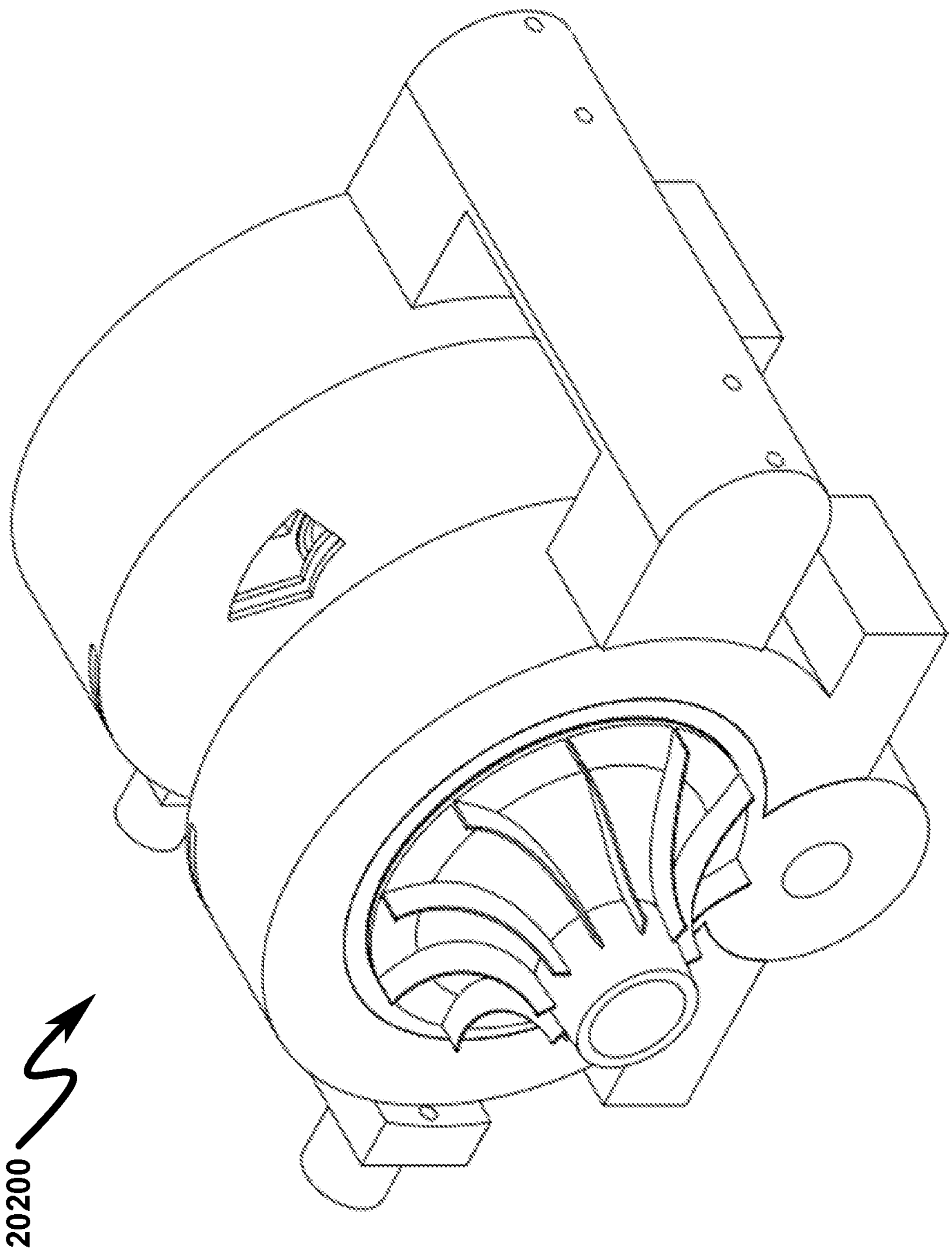
Figure 203:
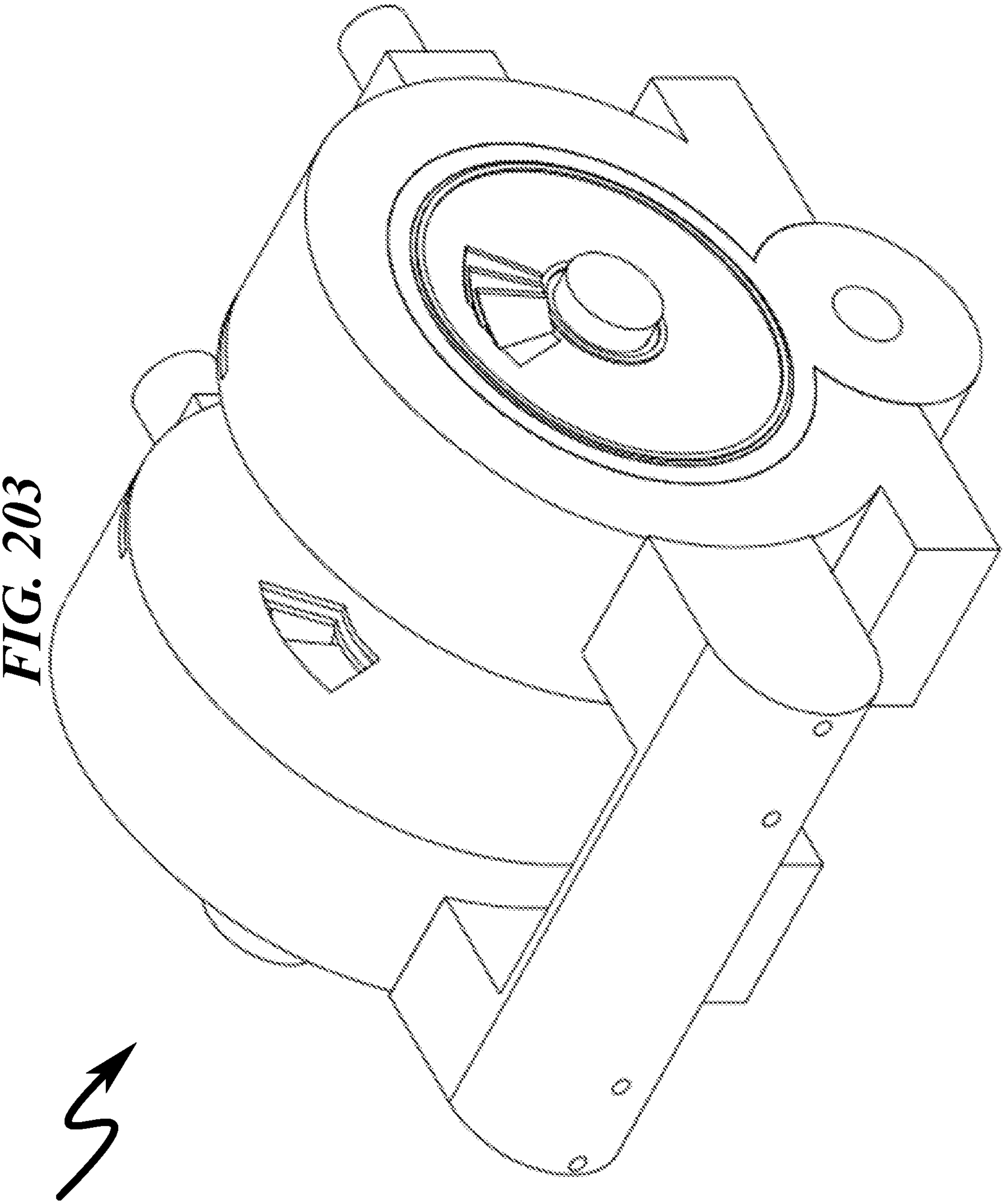
Figure 204:
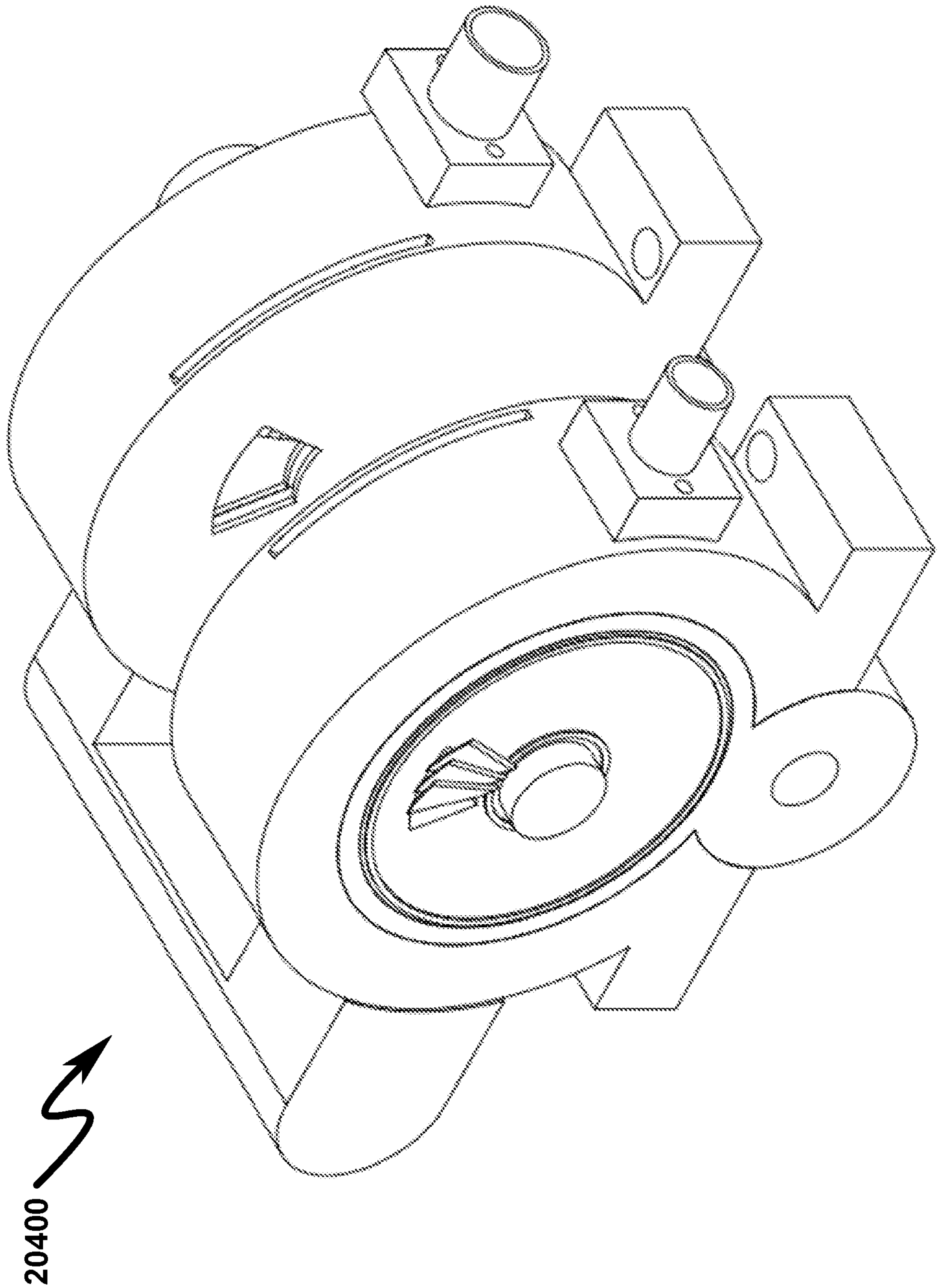
Figure 205:
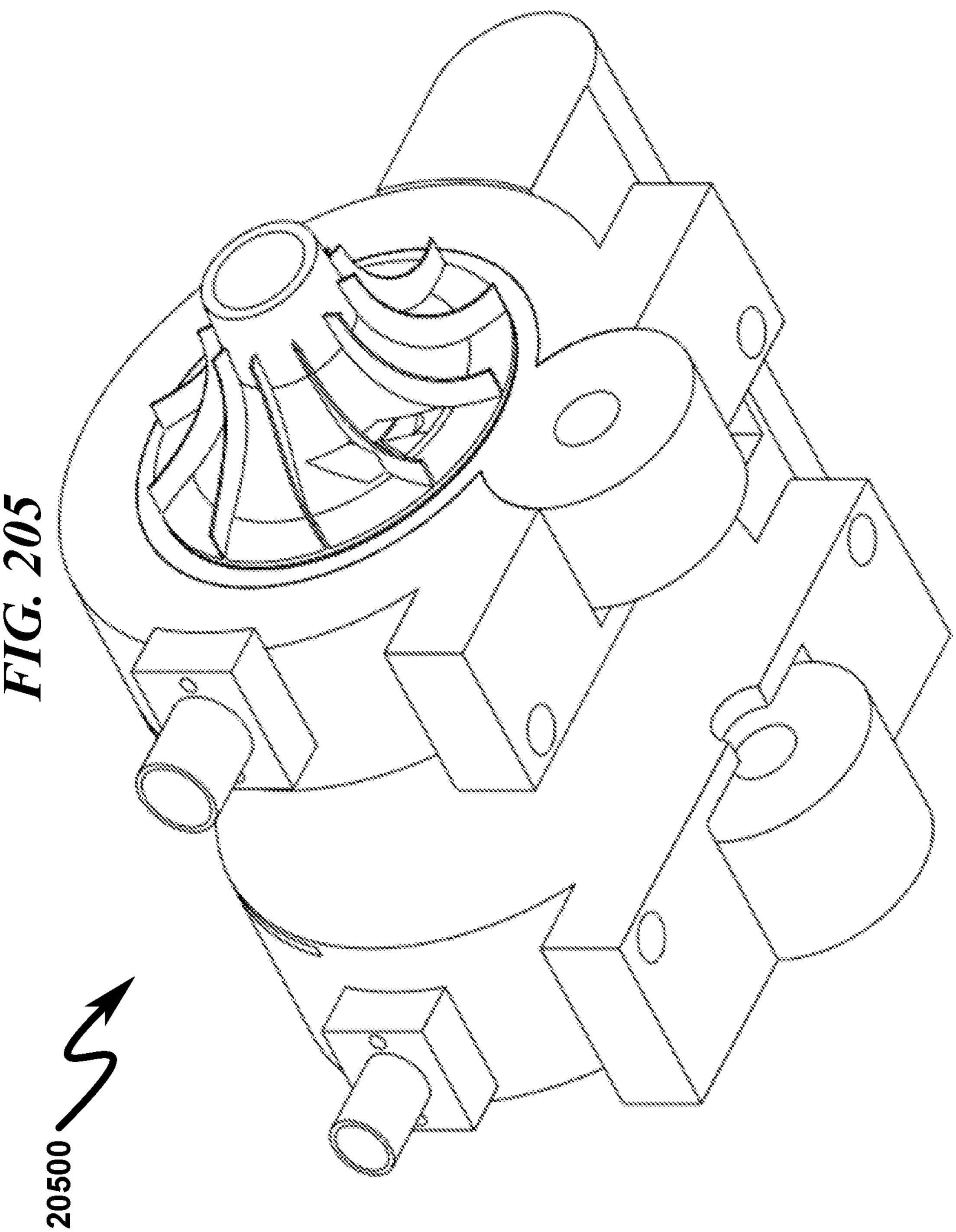
Figure 206:
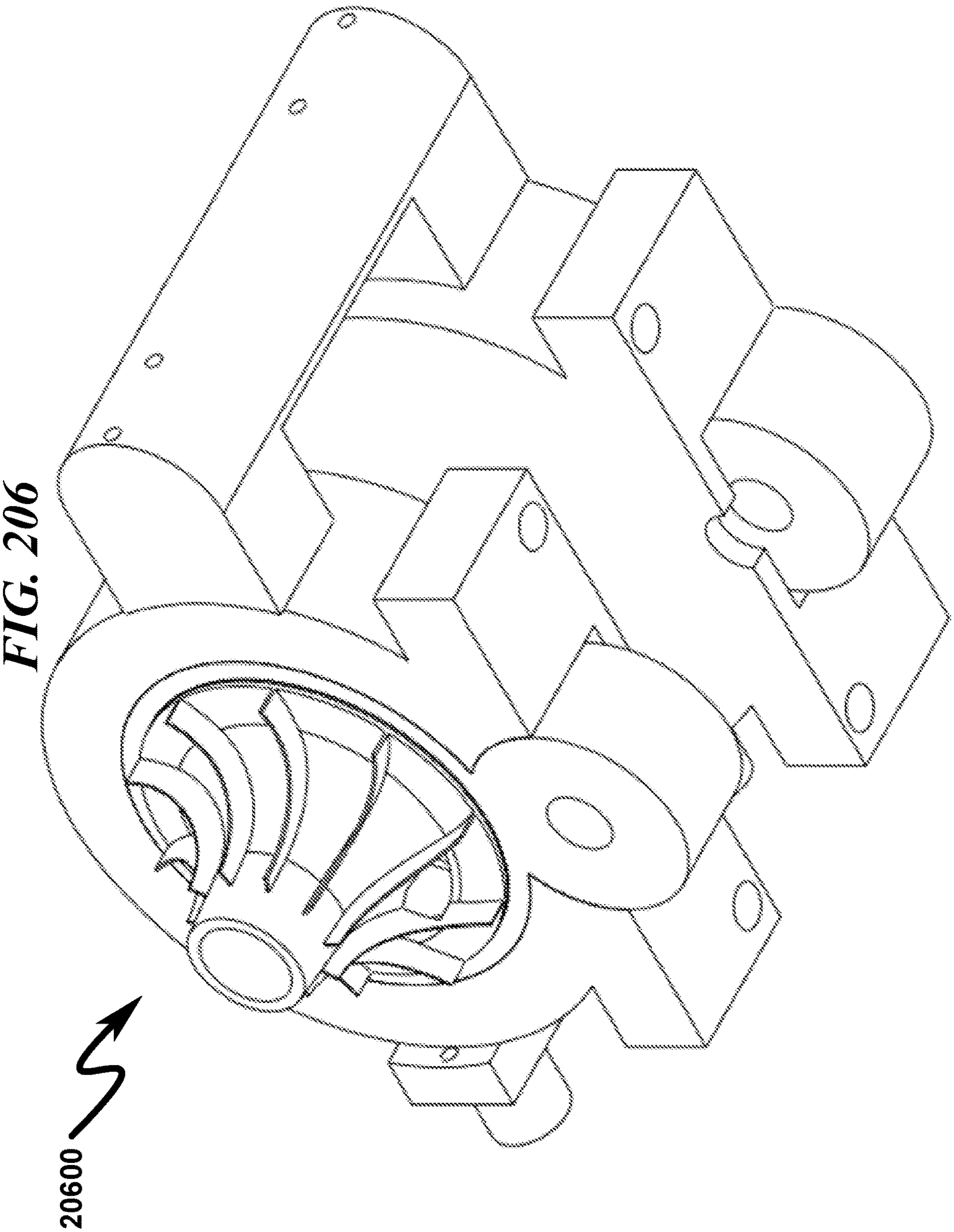
Figure 207:
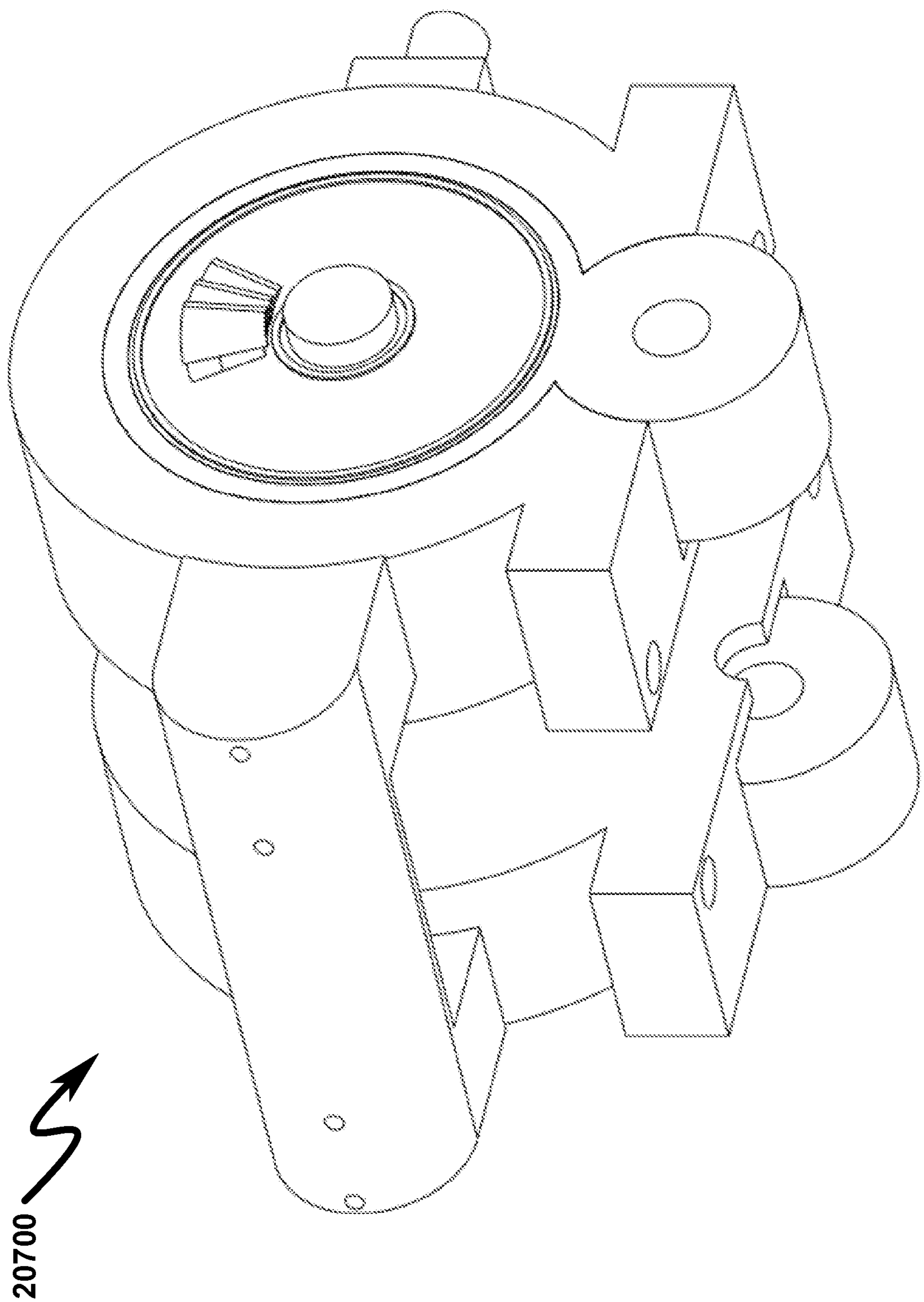
Figure 208:
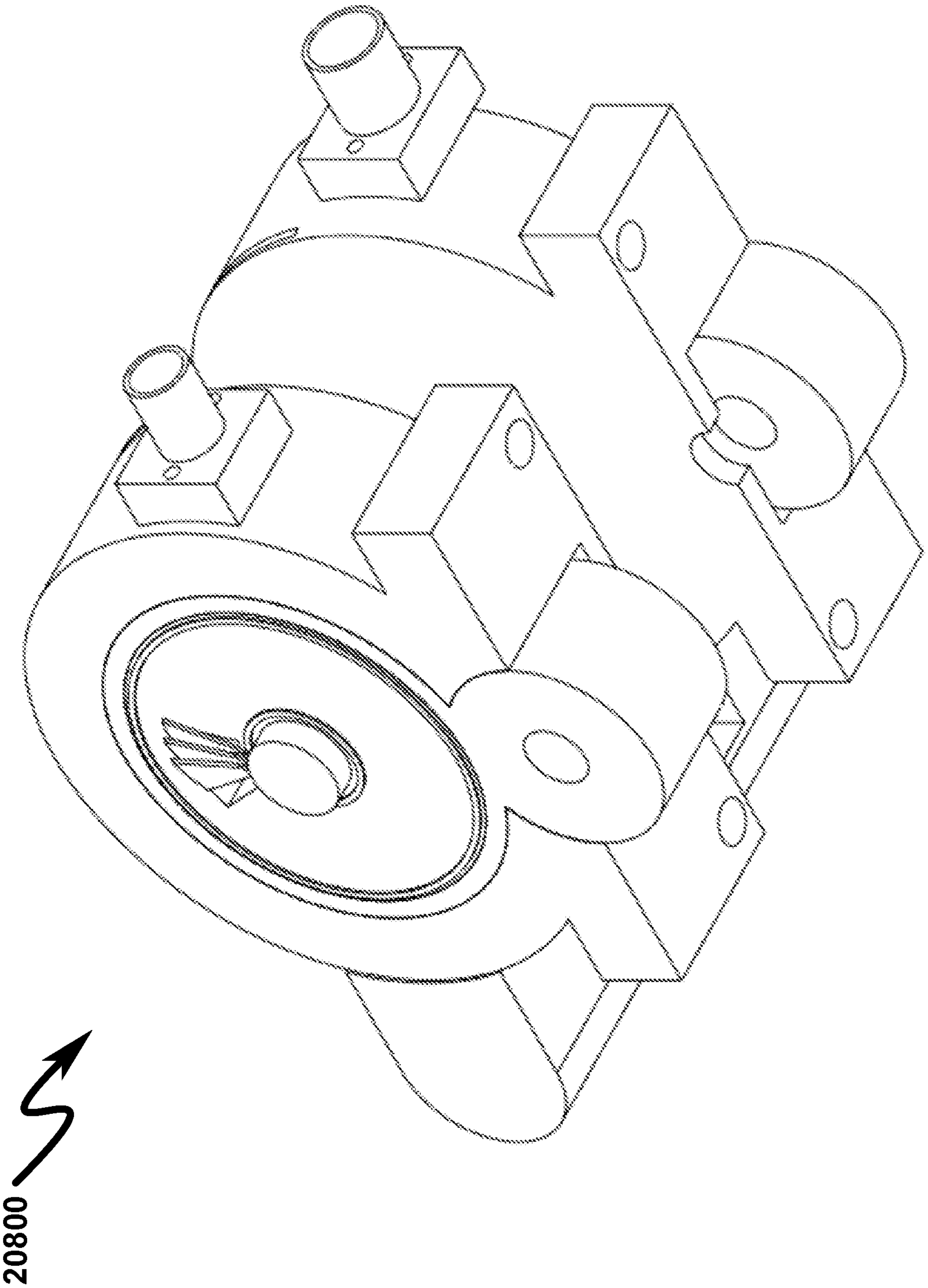
Figure 209:
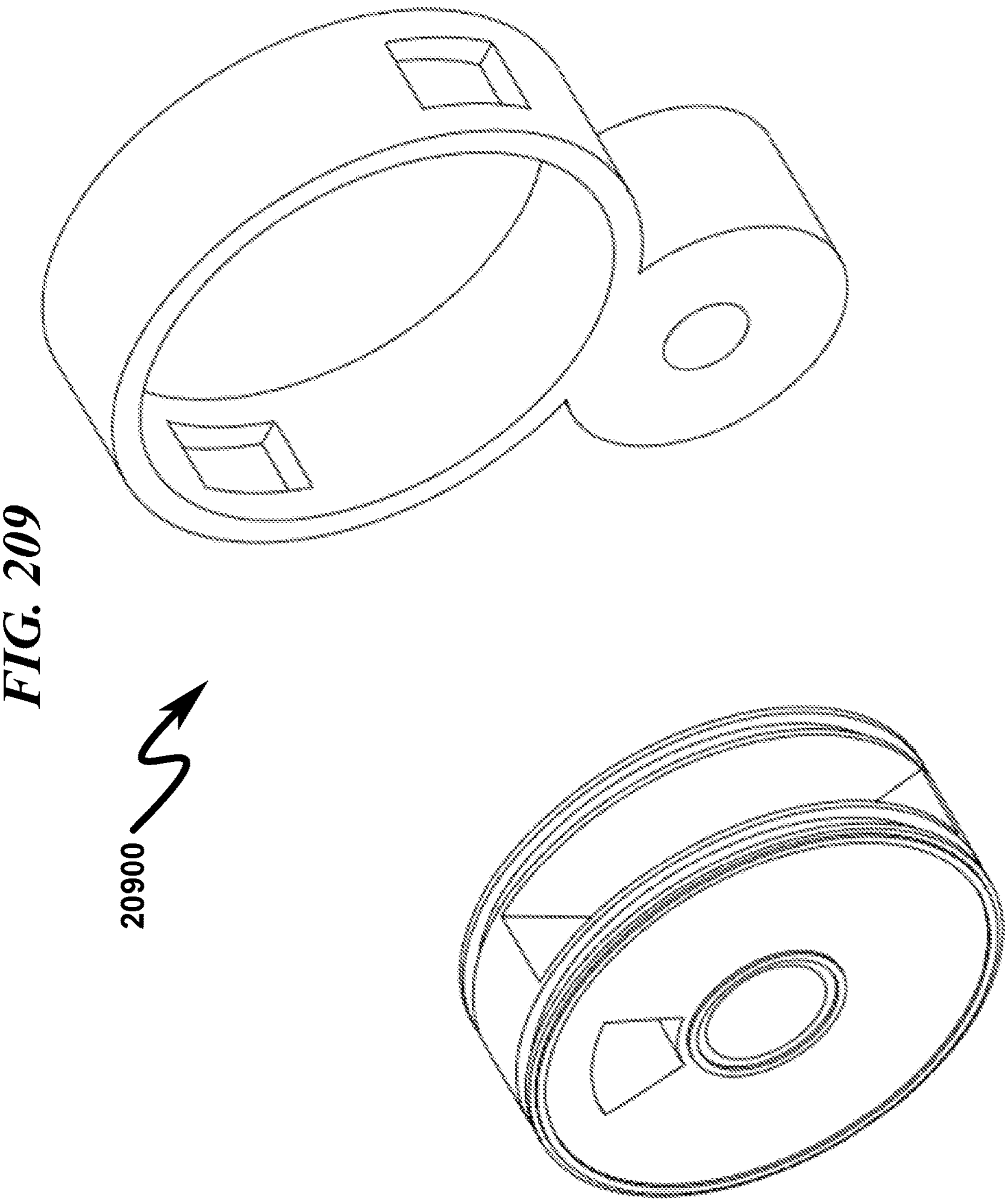
Figure 210:
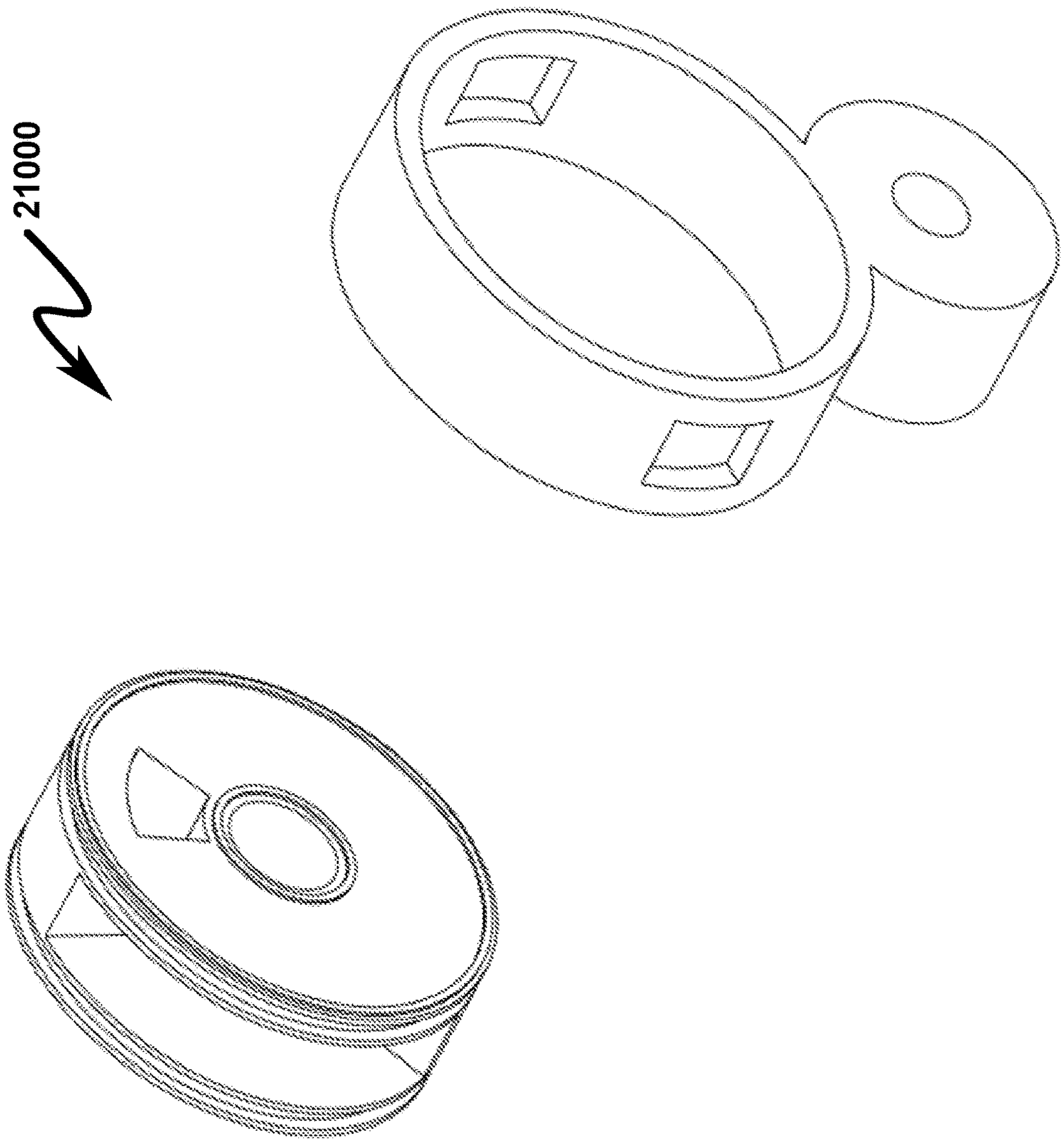
Figure 211:
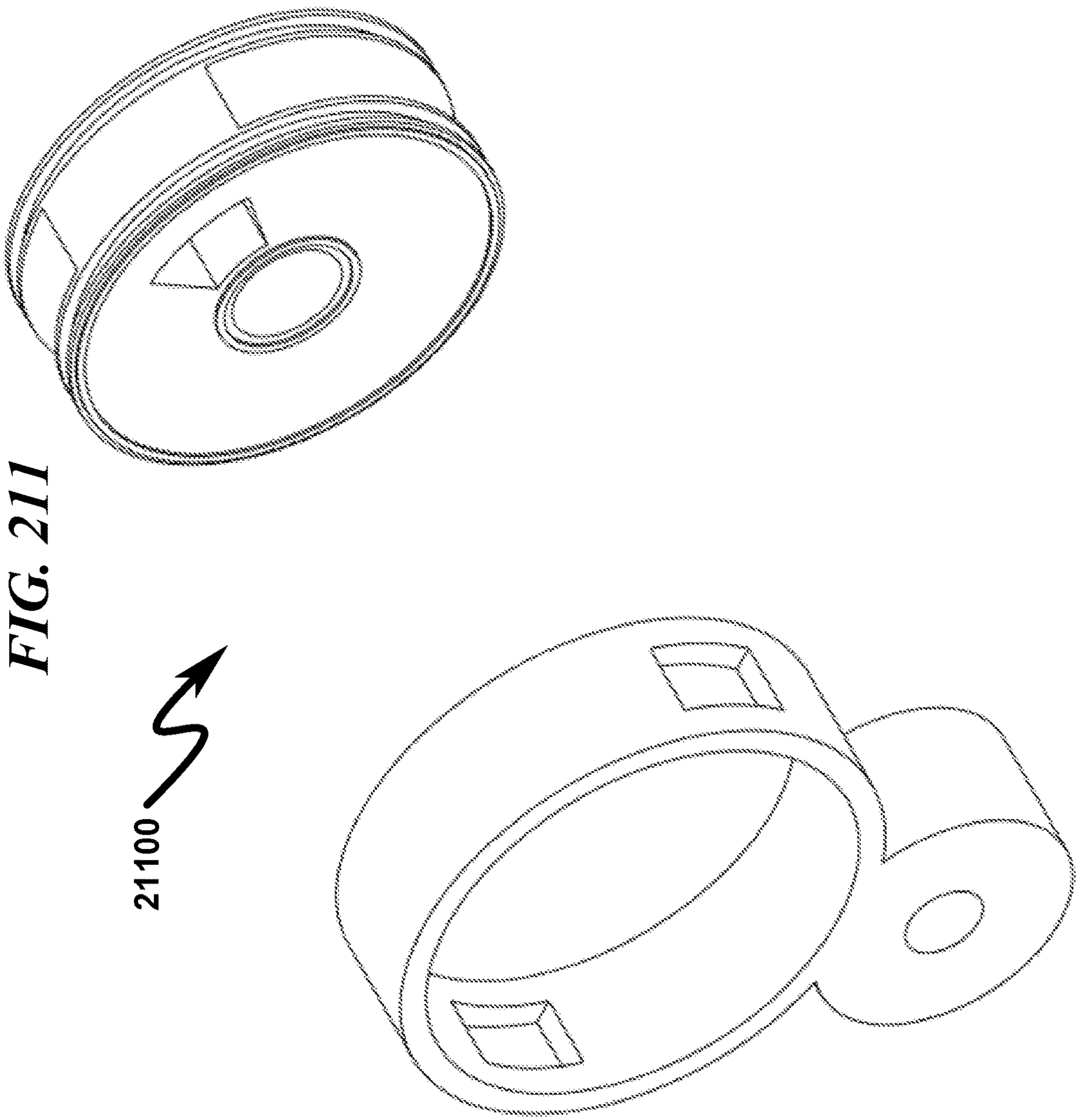
Figure 212:
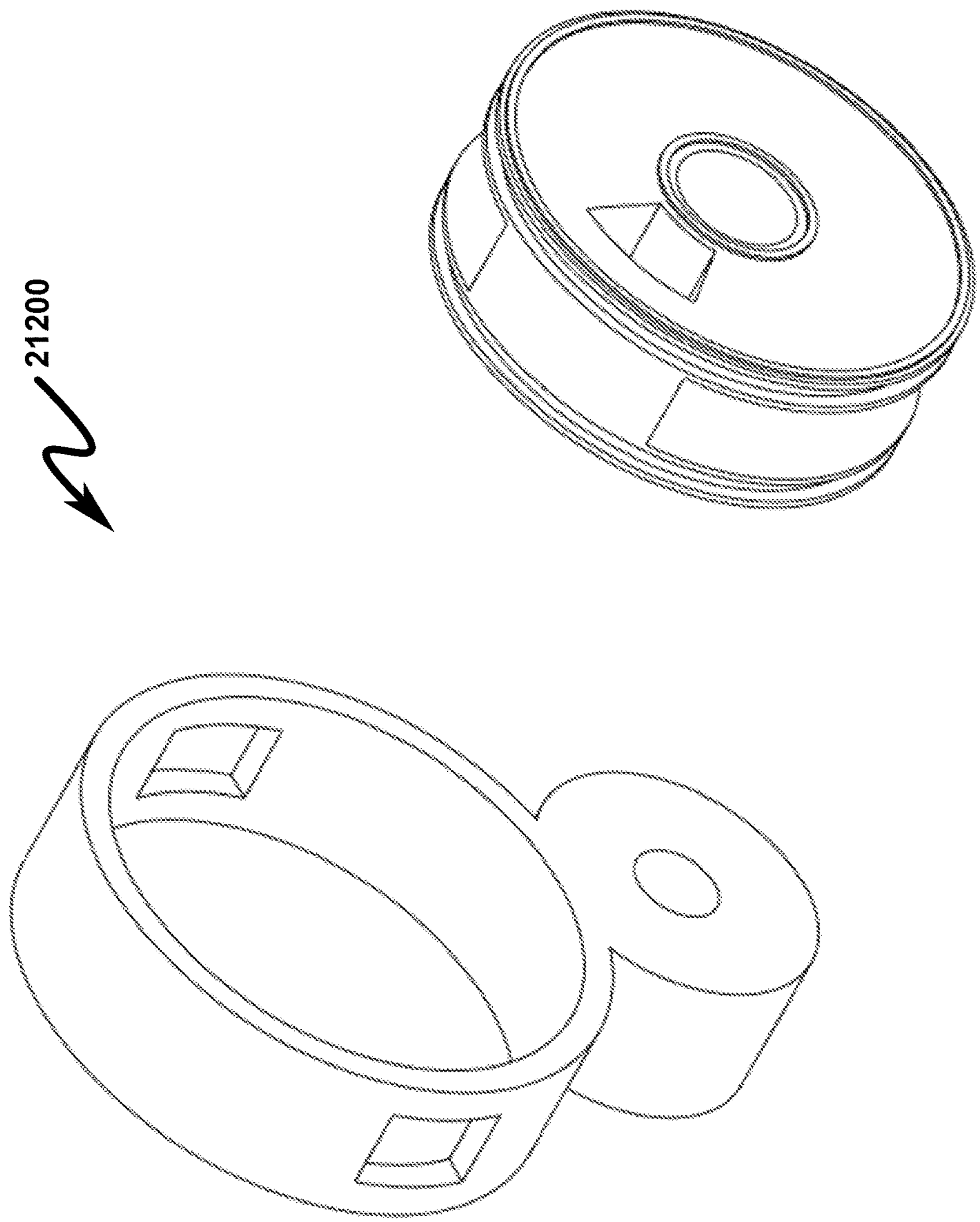
Figure 213:
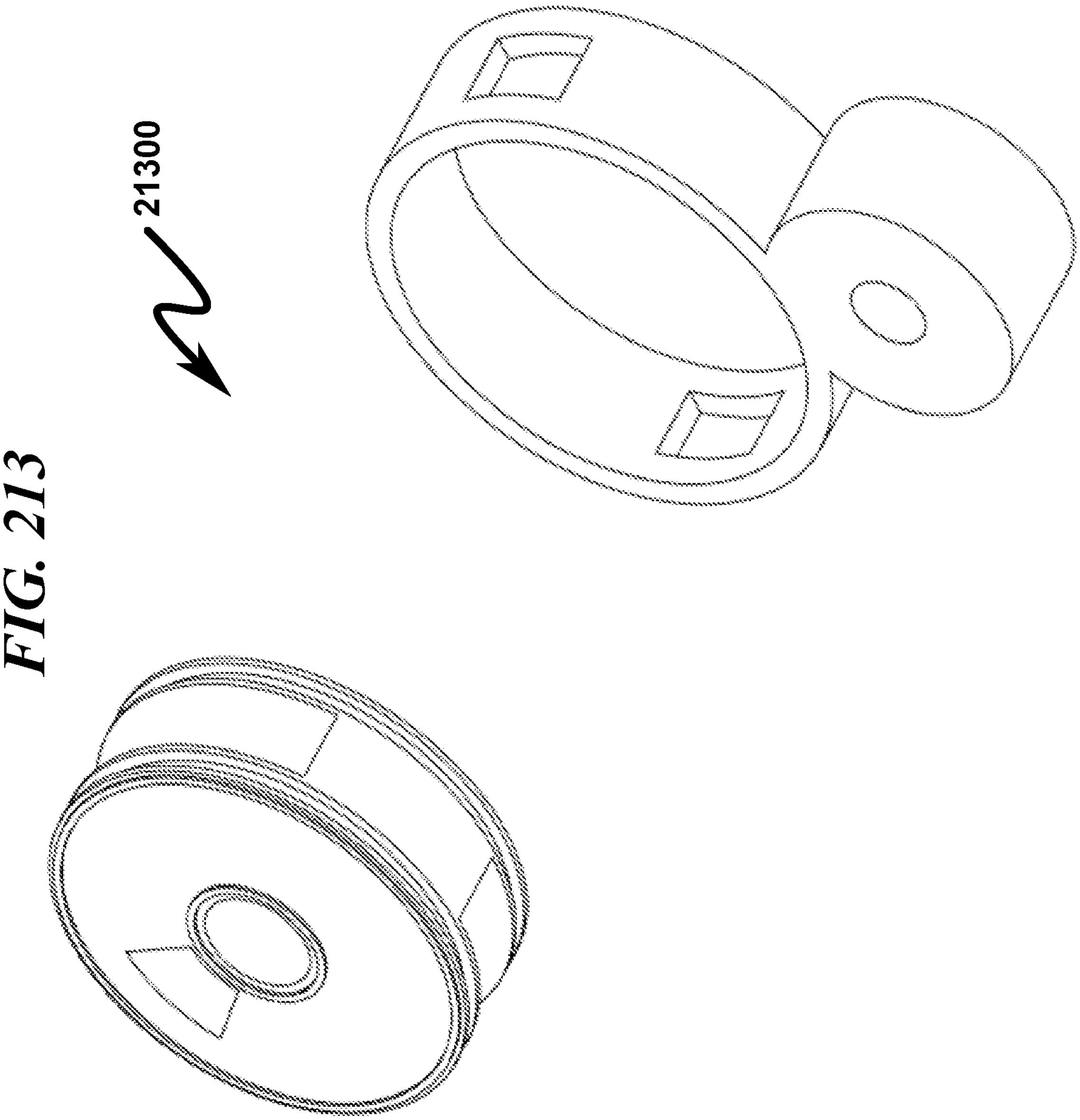
Figure 214:
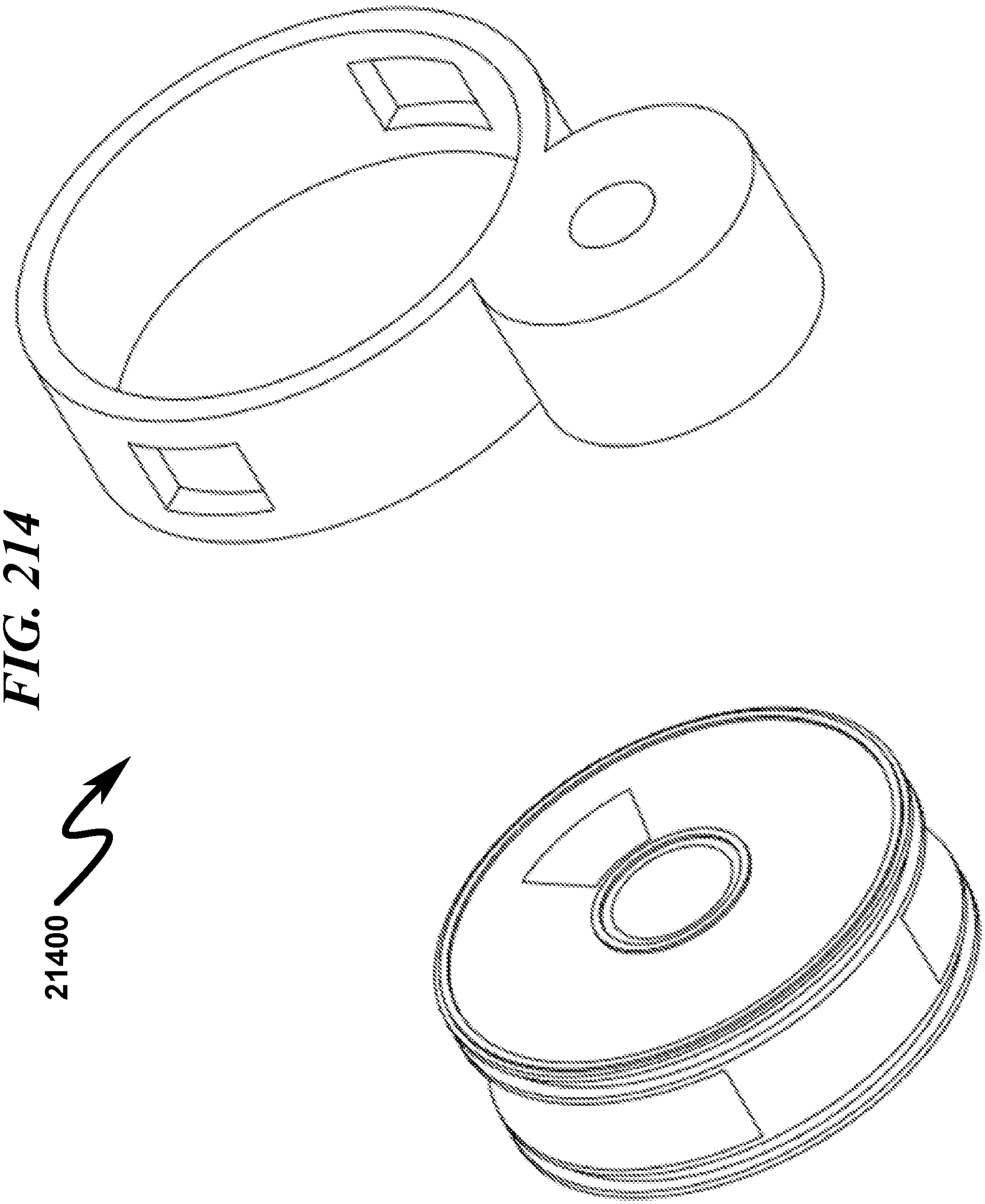
Figure 215:
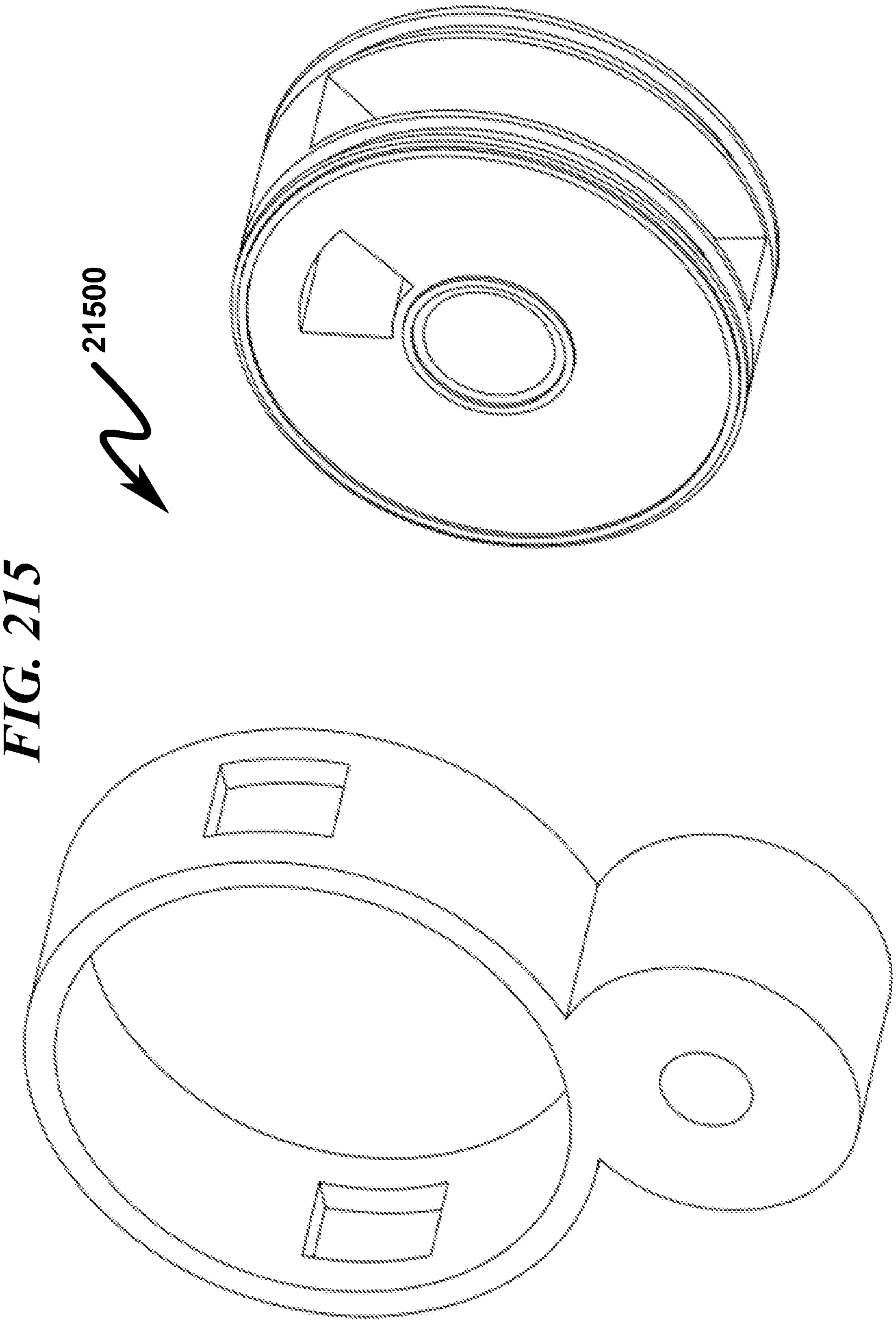
Figure 216:
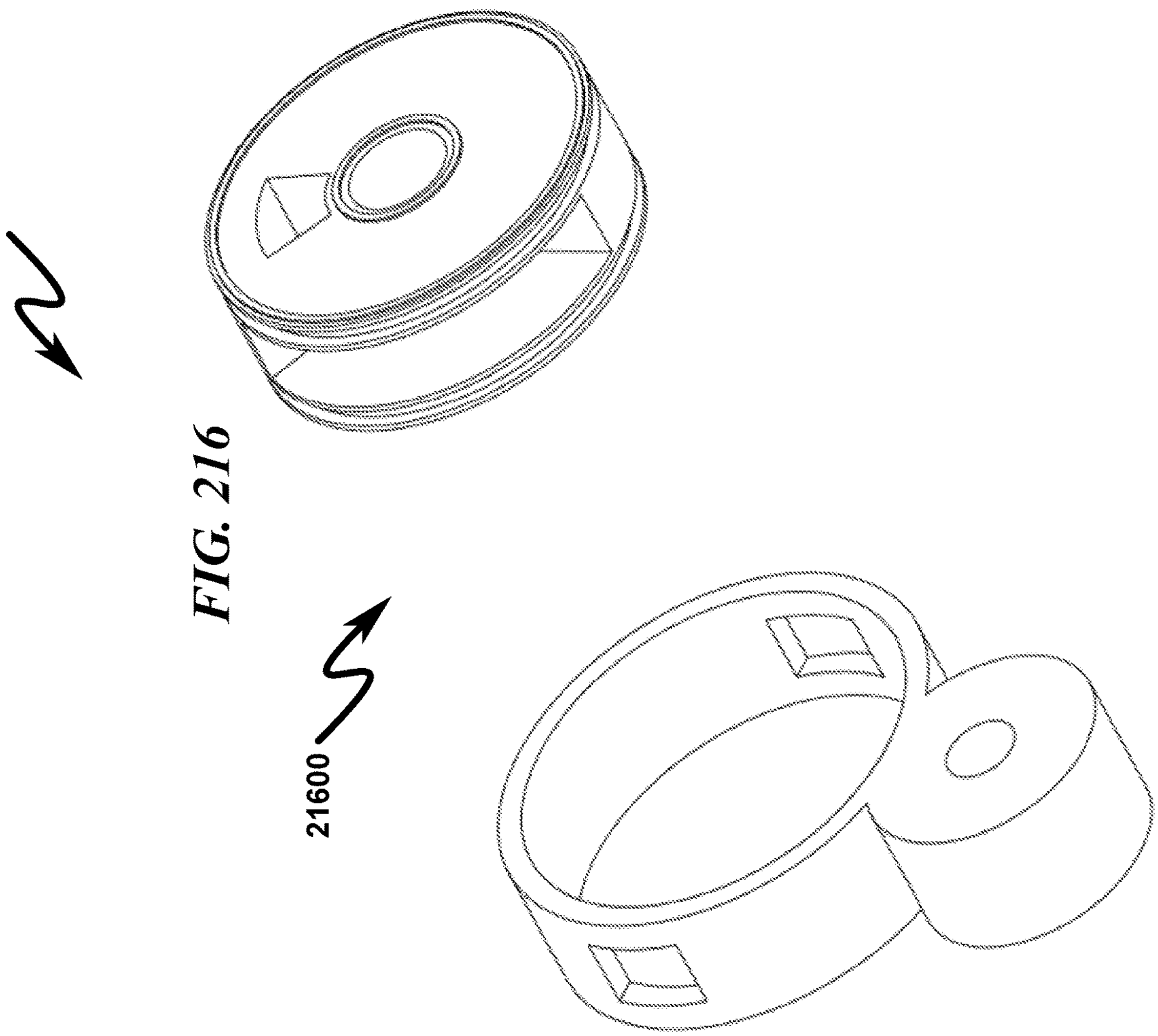
Figure 217:
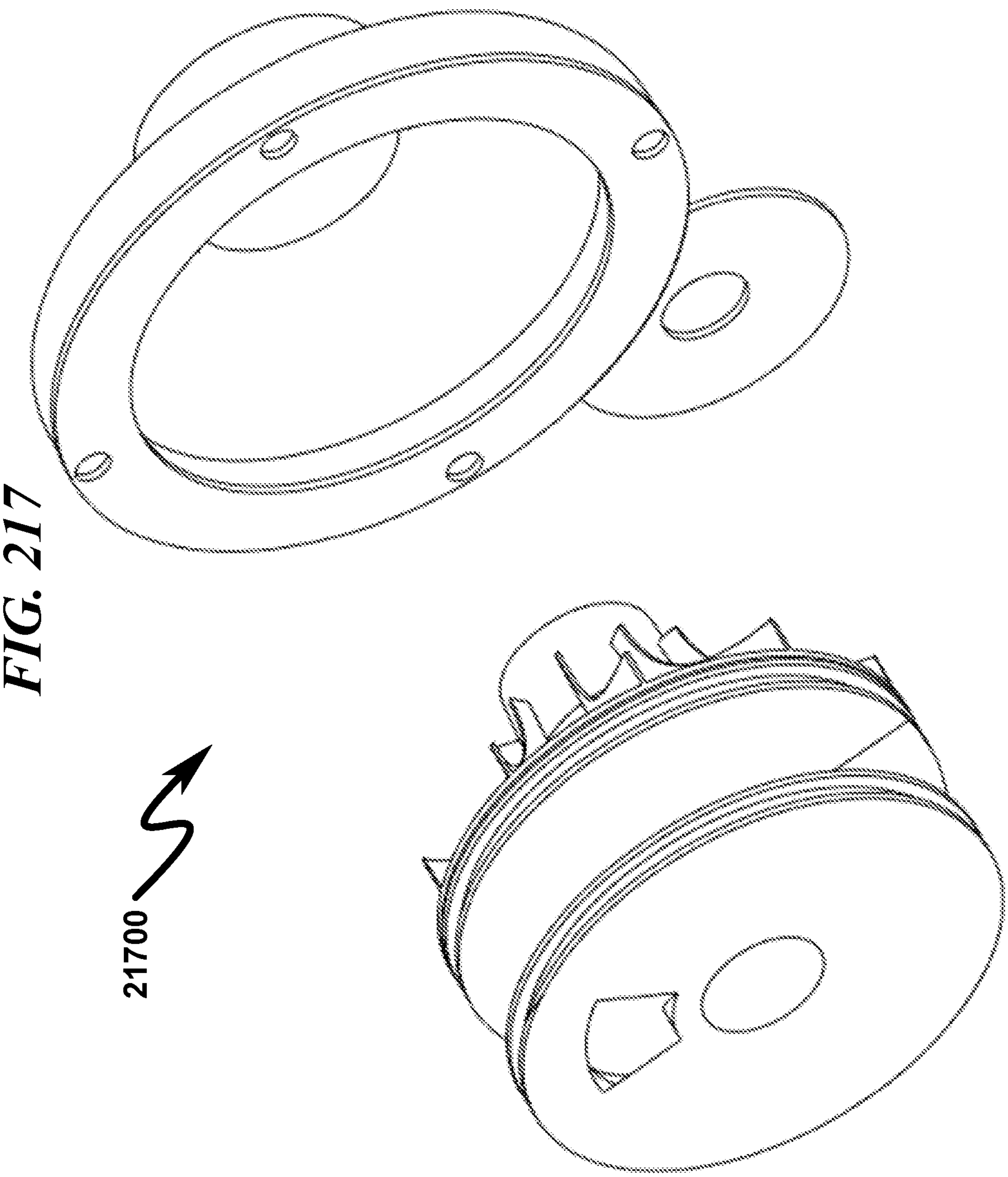
Figure 218:
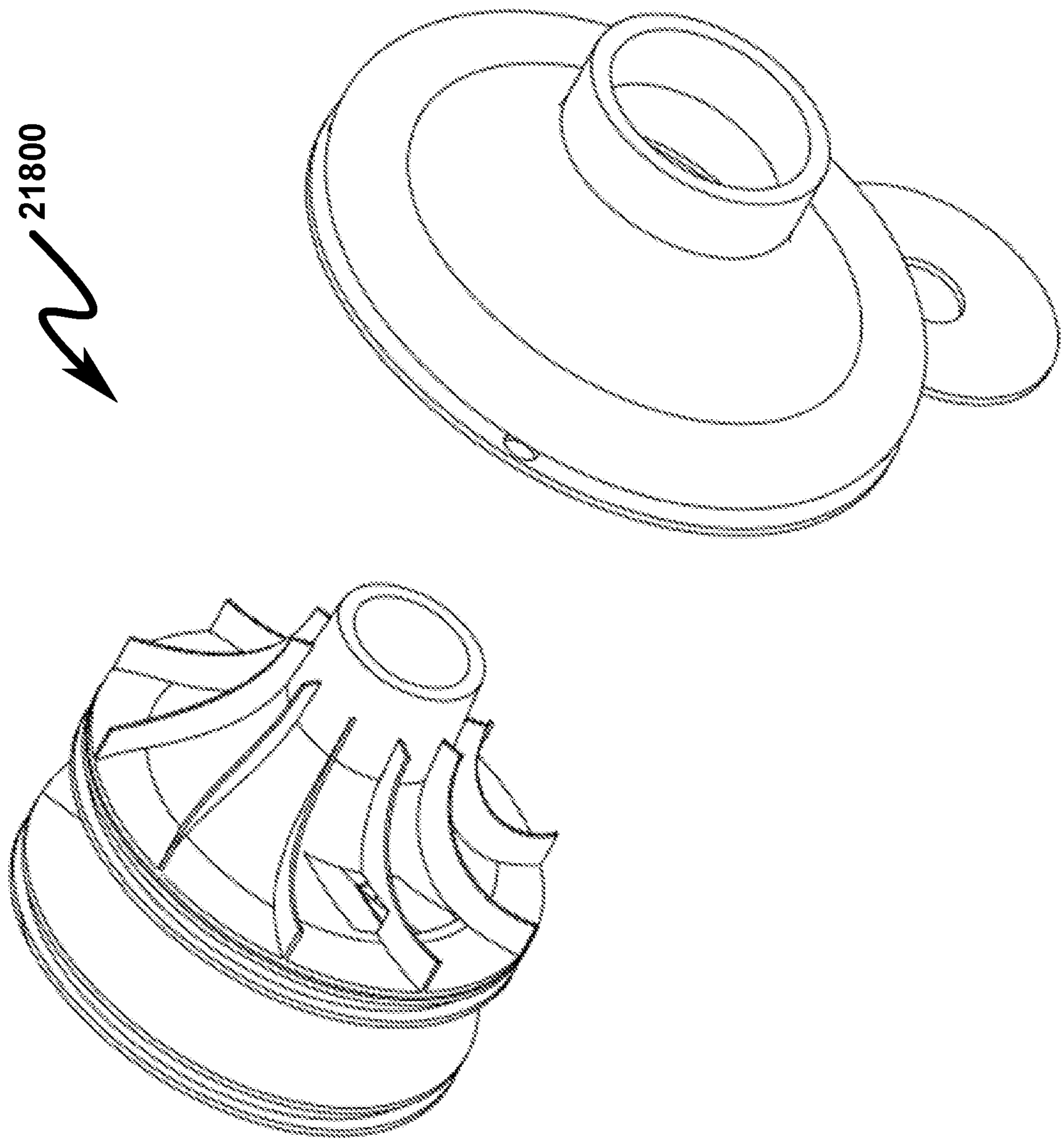
Figure 219:
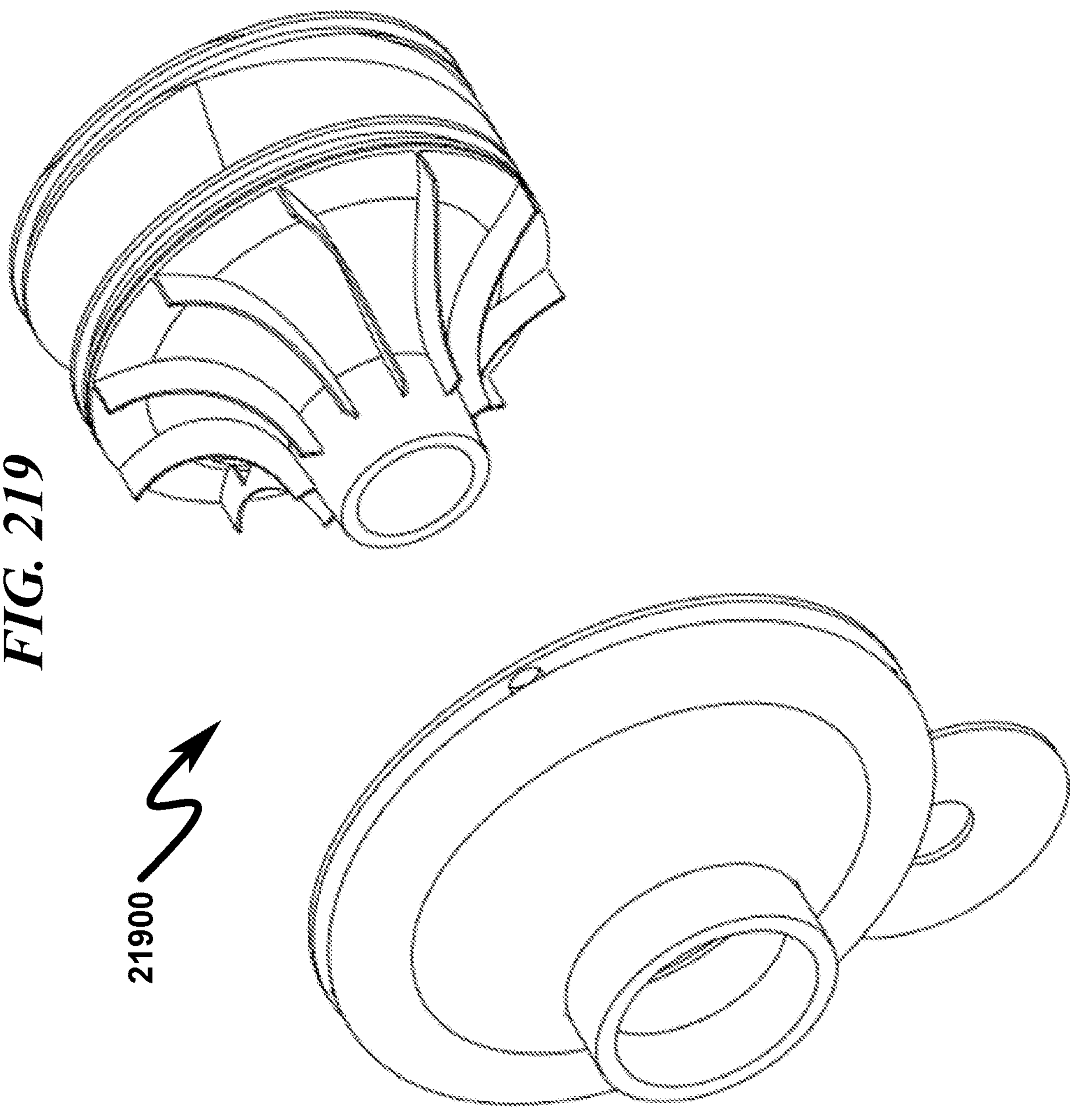
Figure 220:
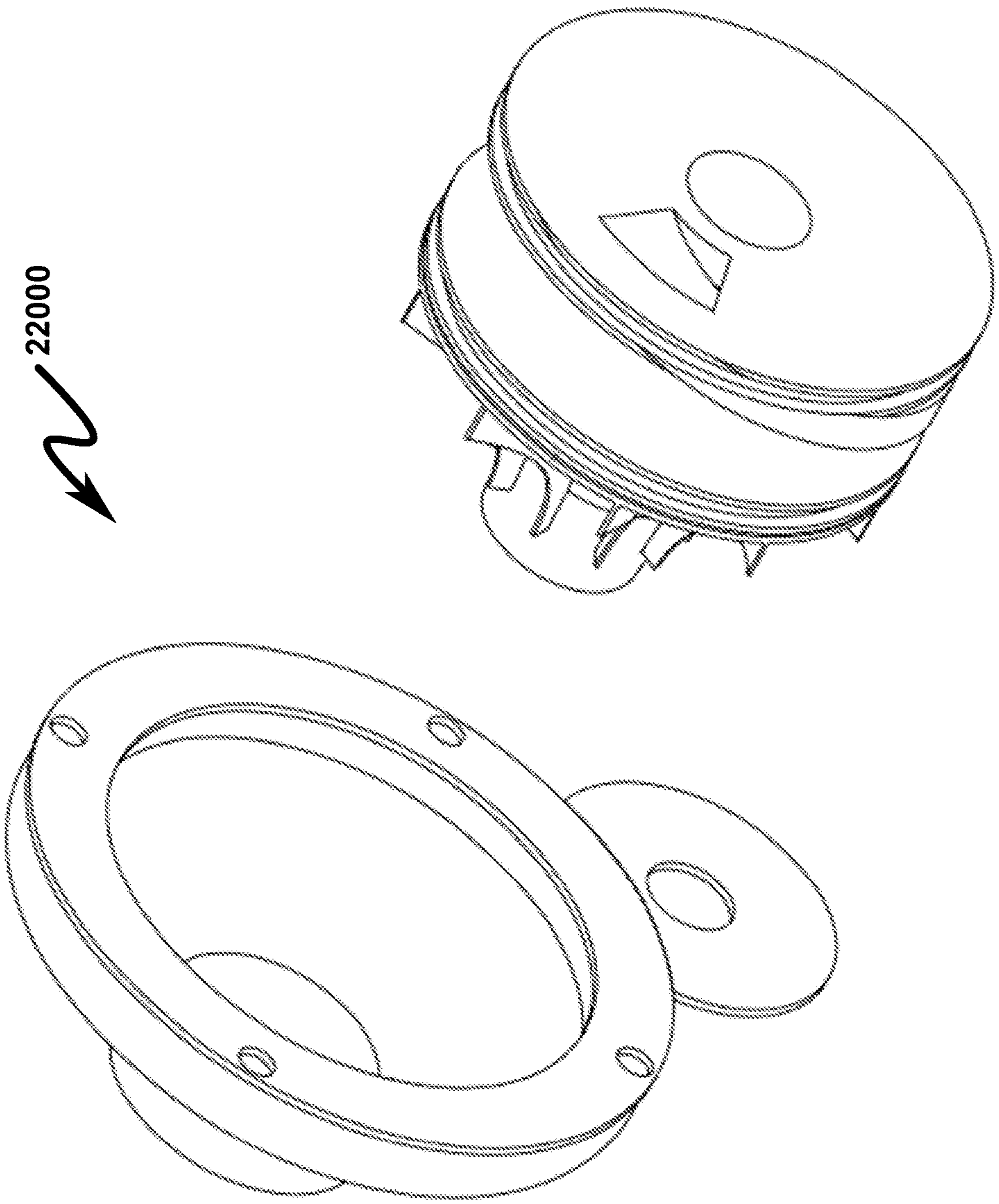
Figure 221:
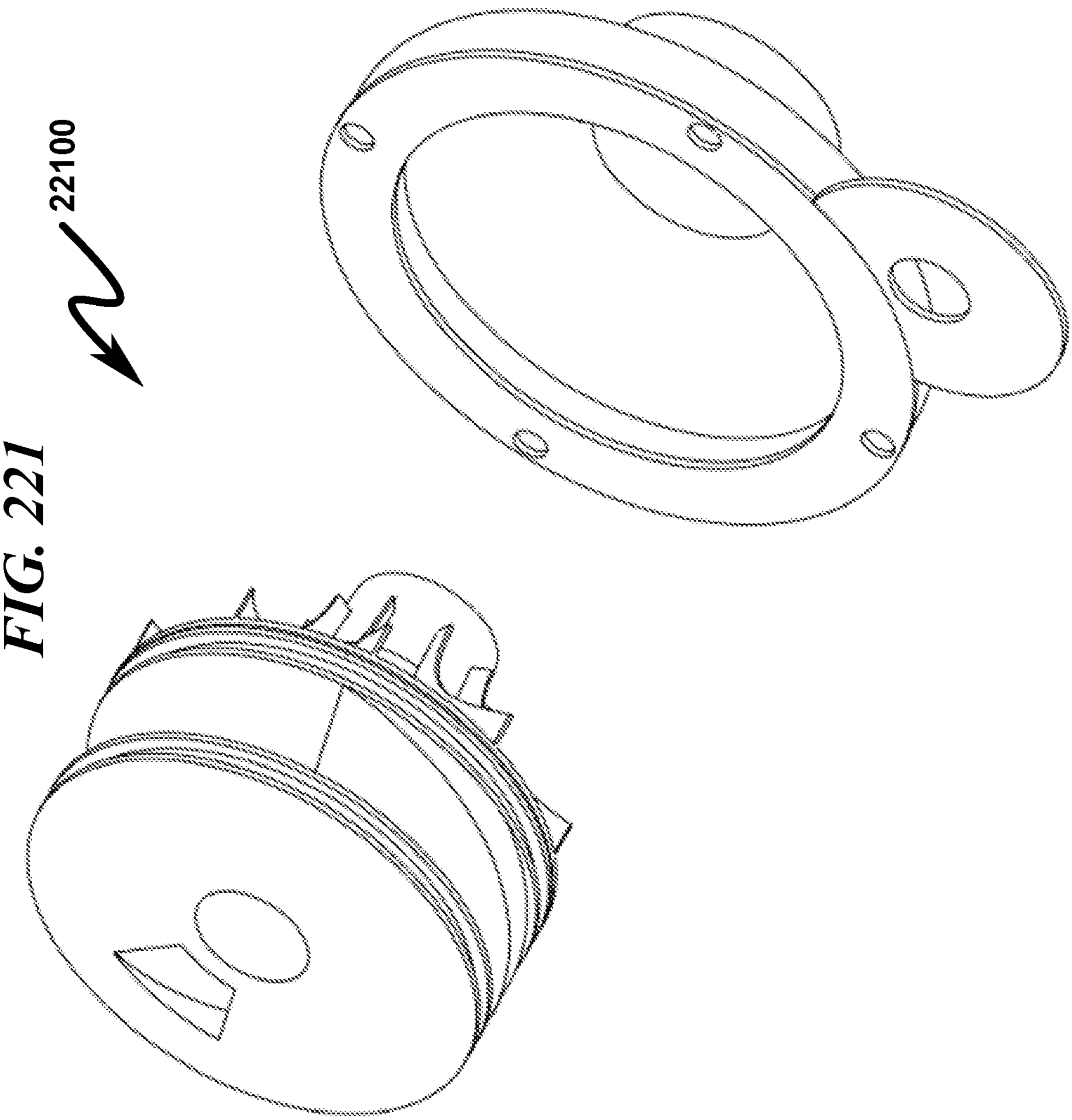
Figure 222:
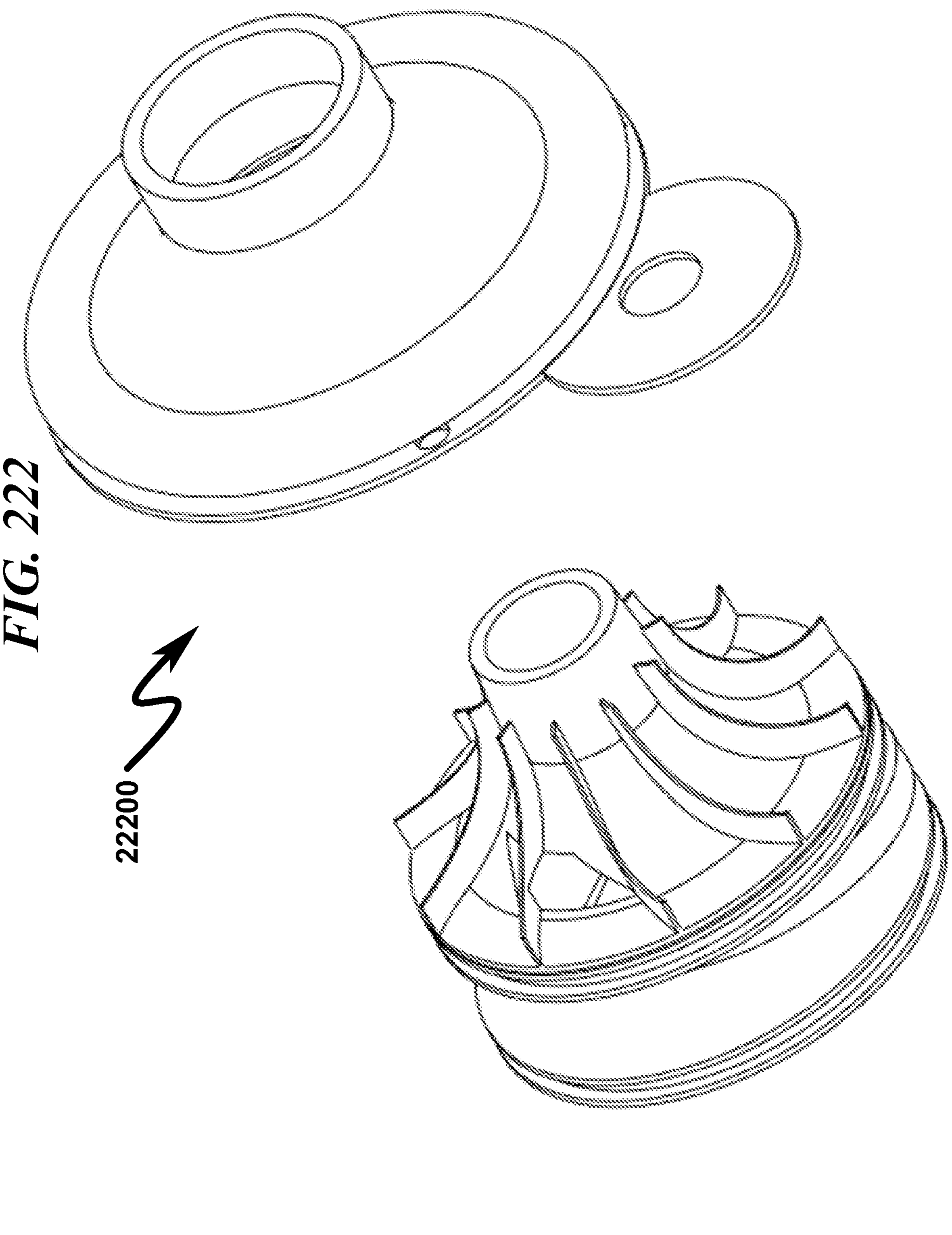
Figure 223:
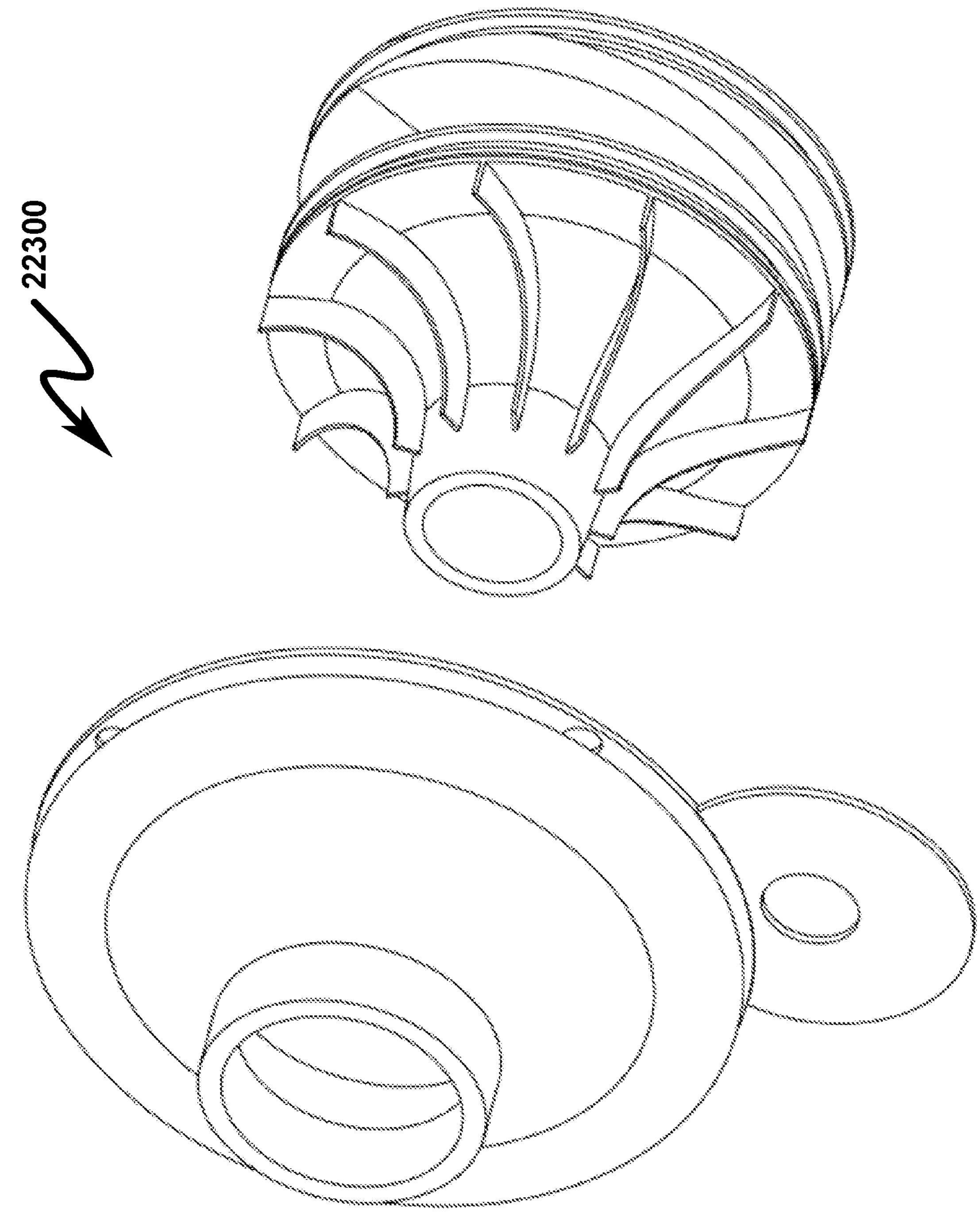
Figure 224:
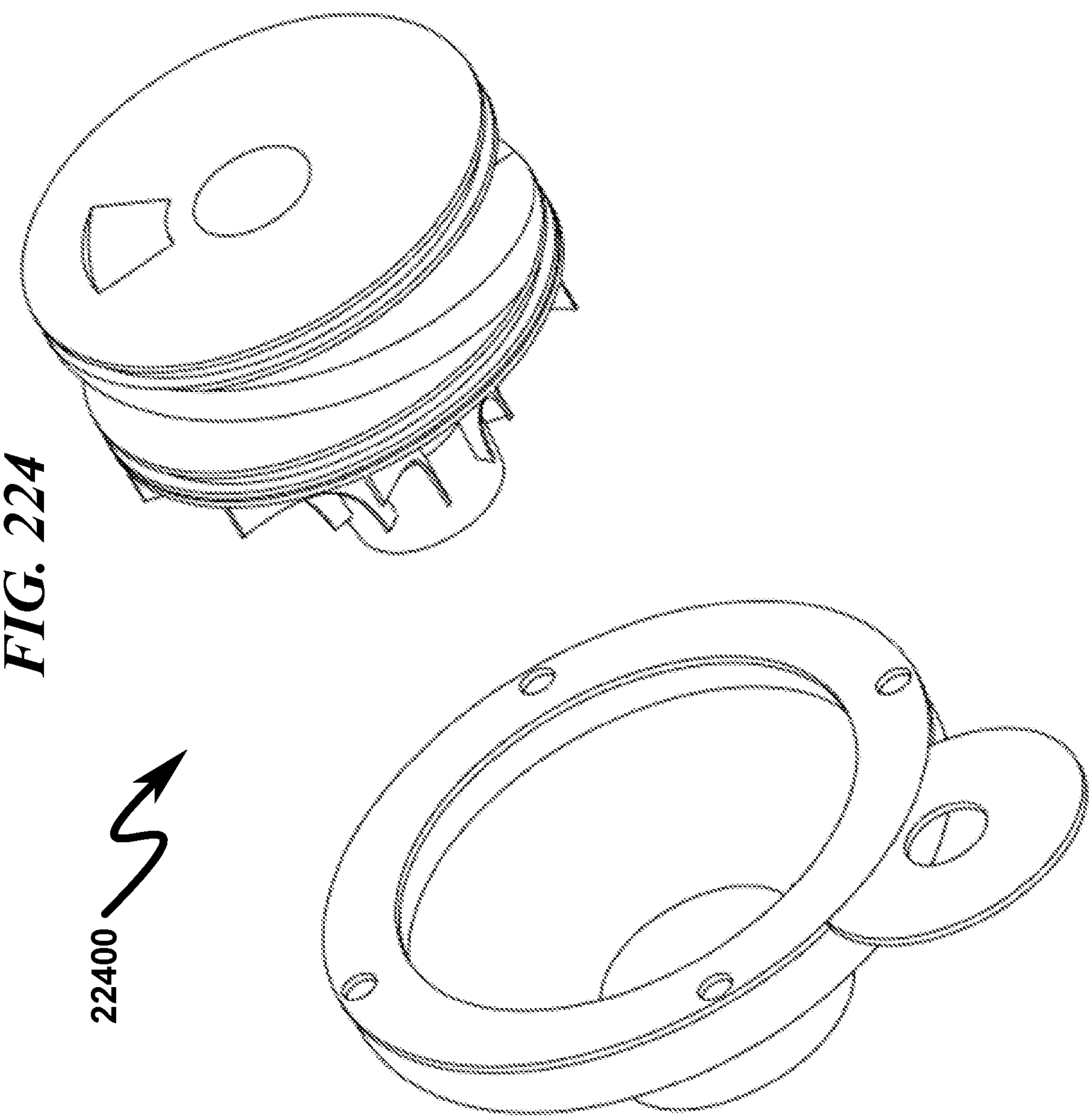
Figure 225:
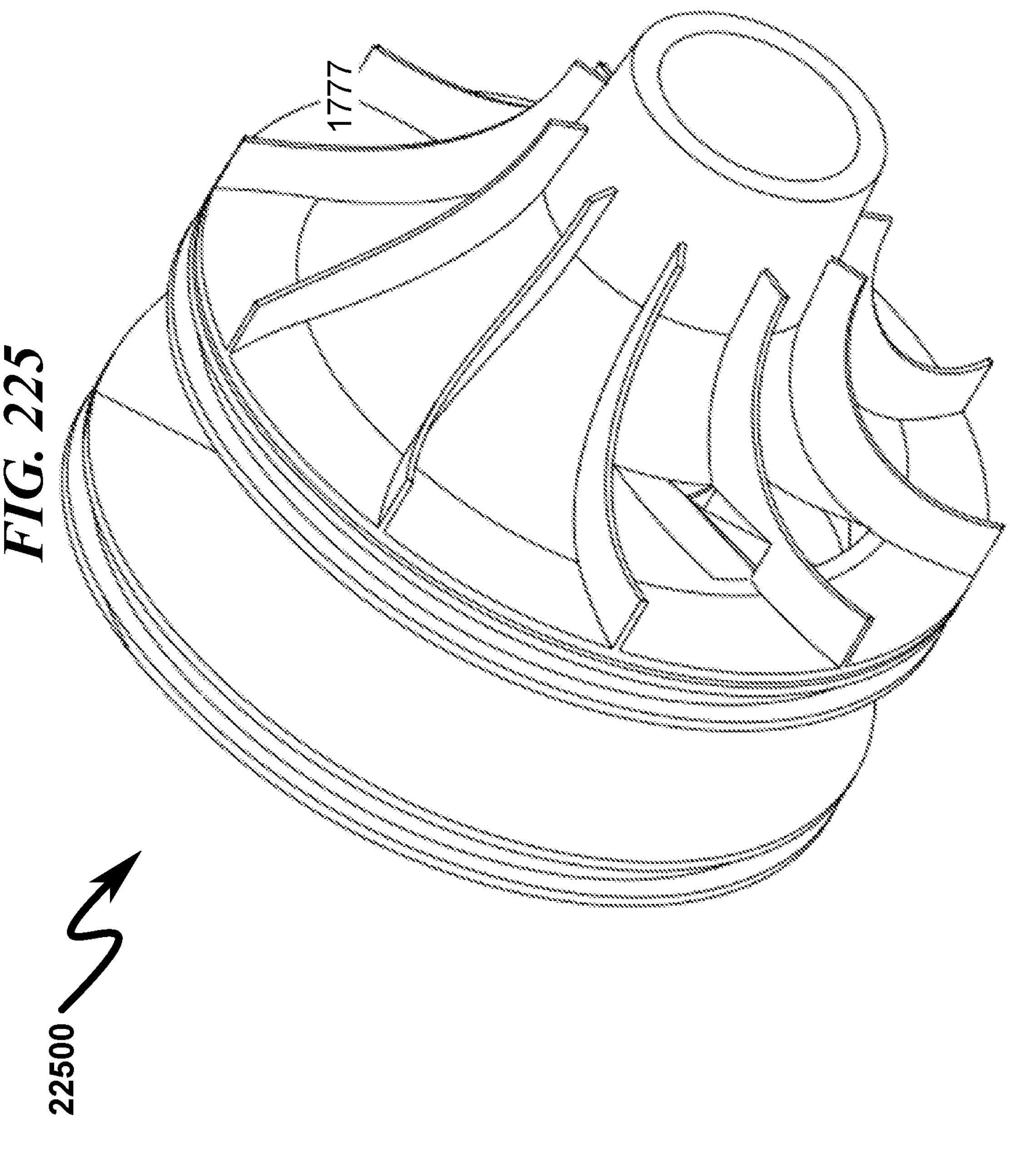
Figure 226:
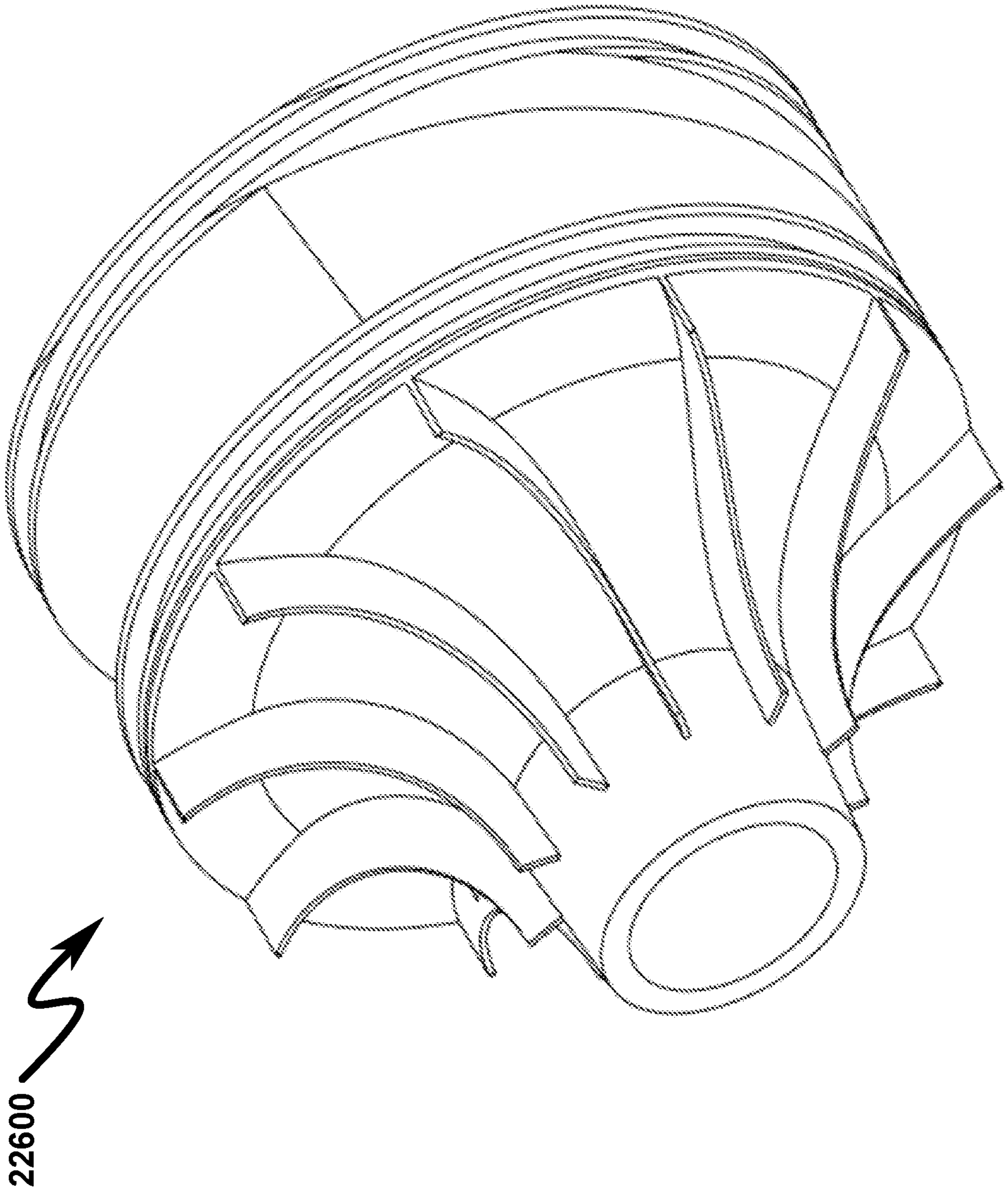
Figure 227:
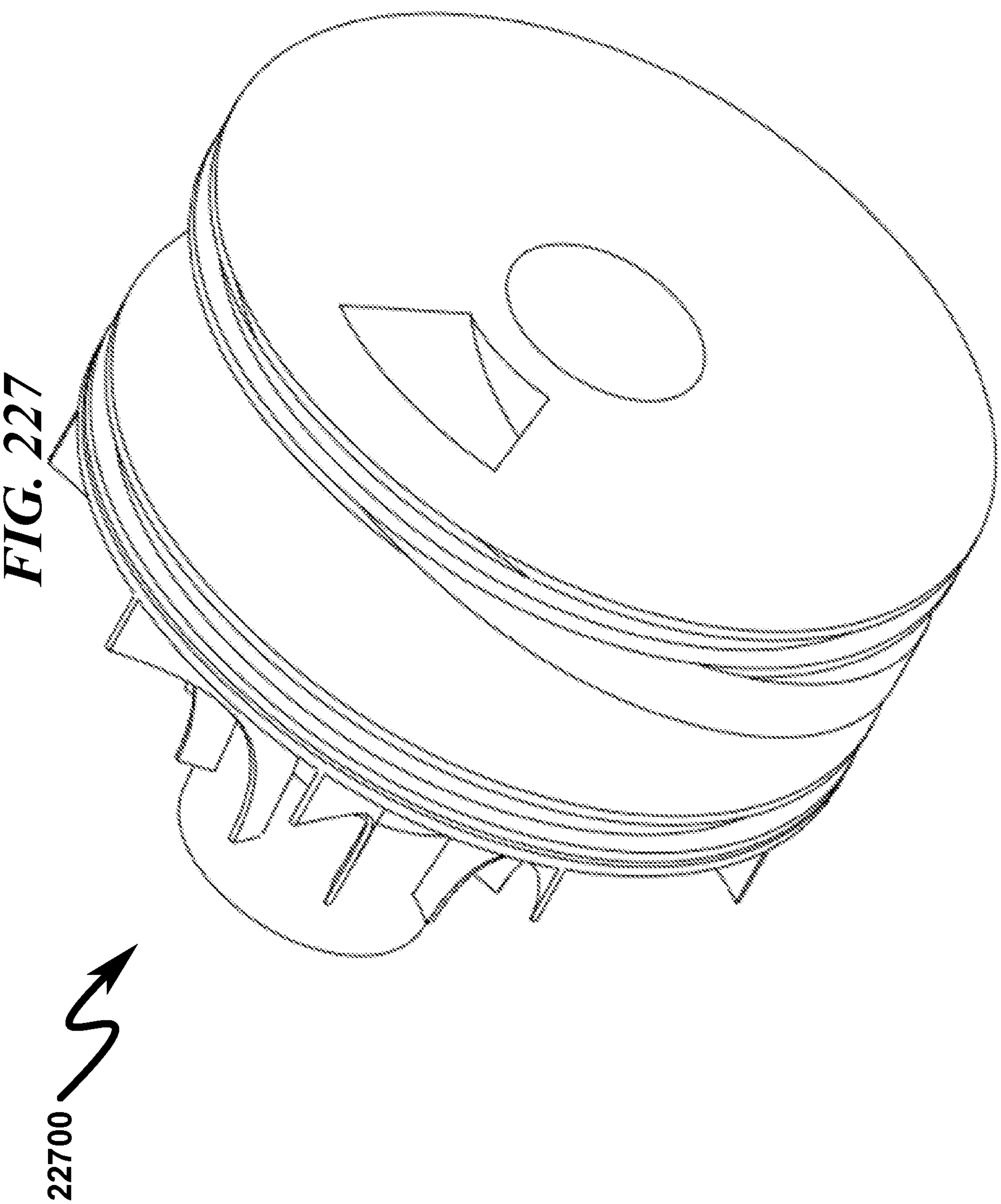
Figure 228:
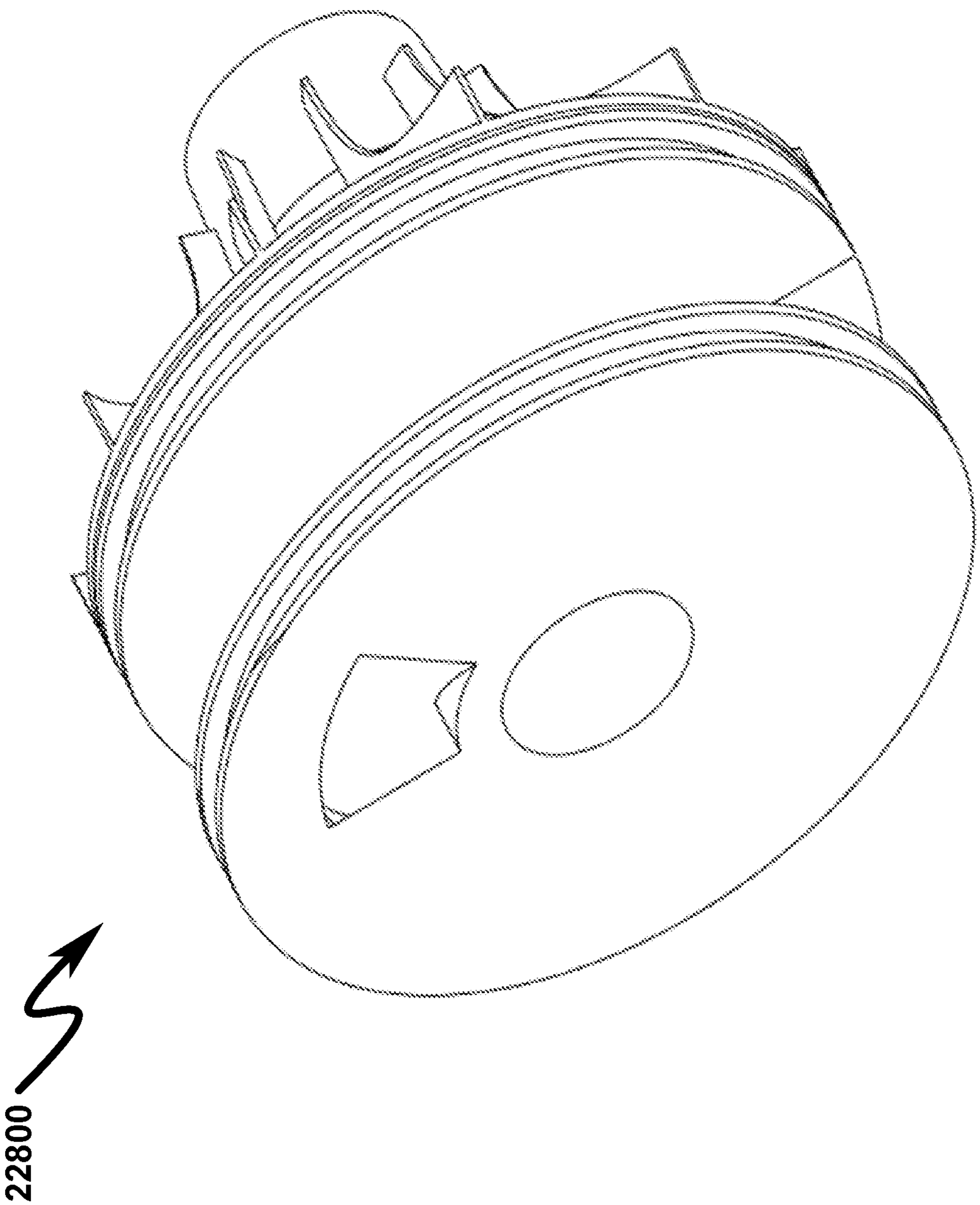
Figure 229:
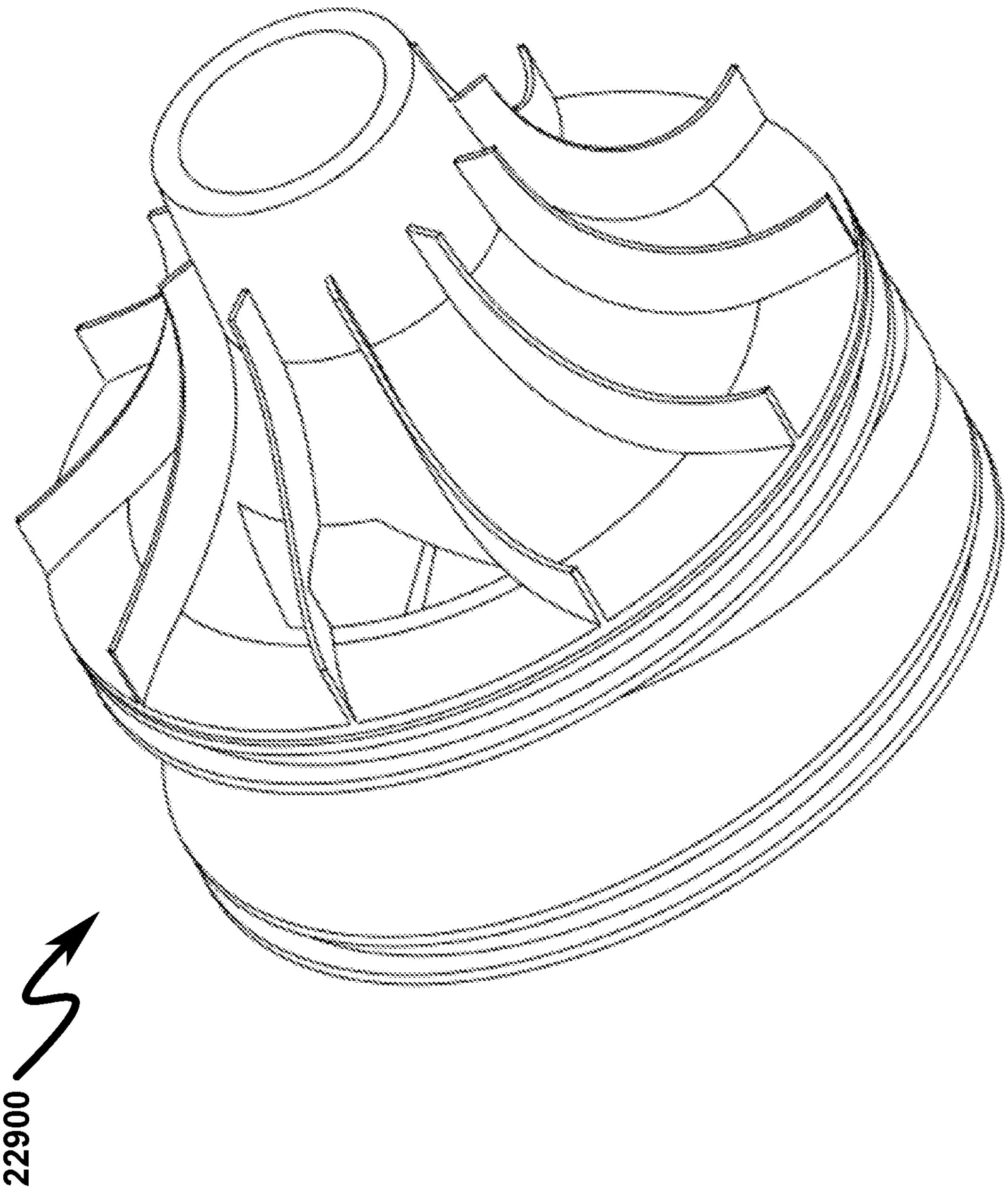
Figure 230:
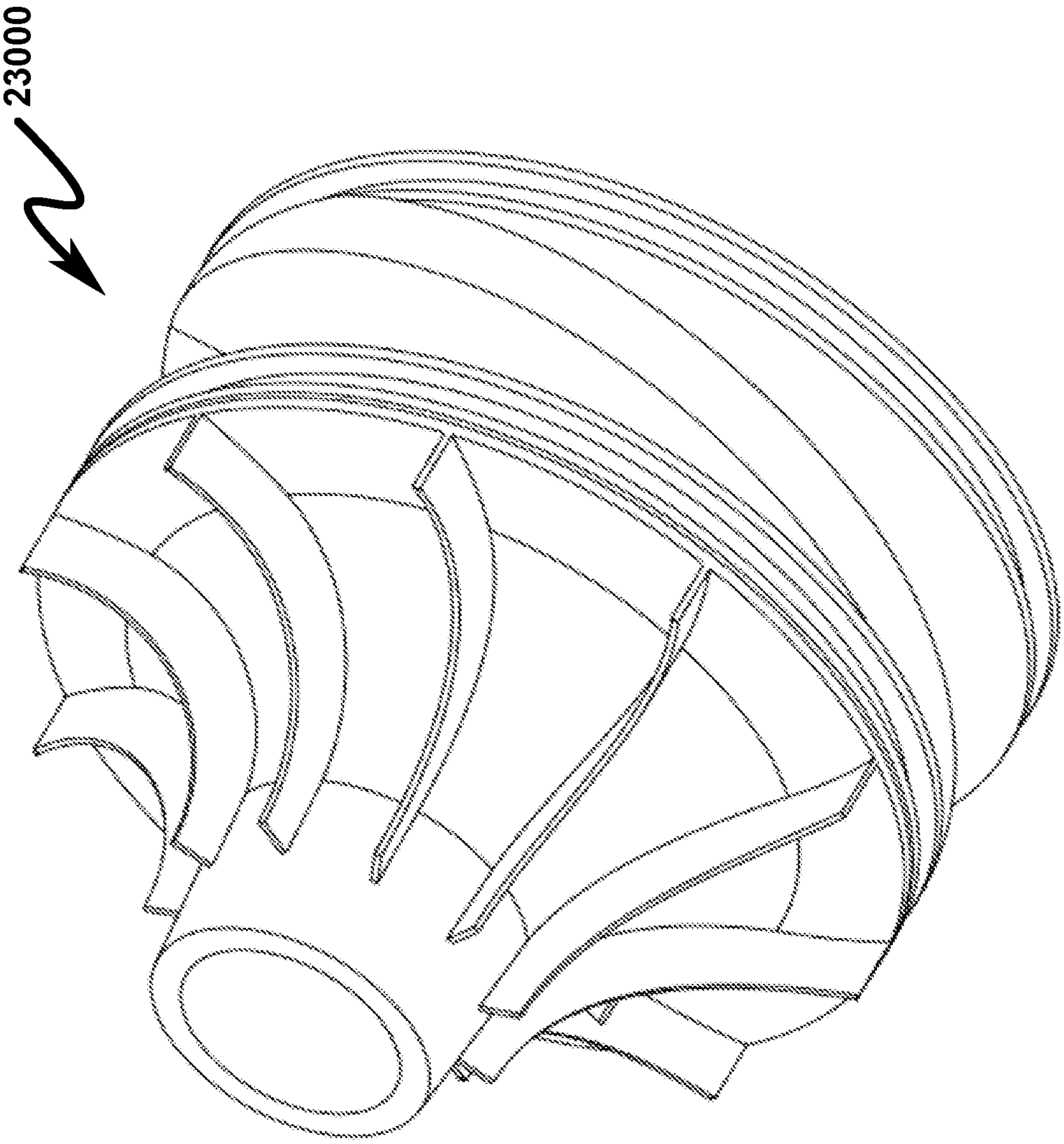
Figure 231:
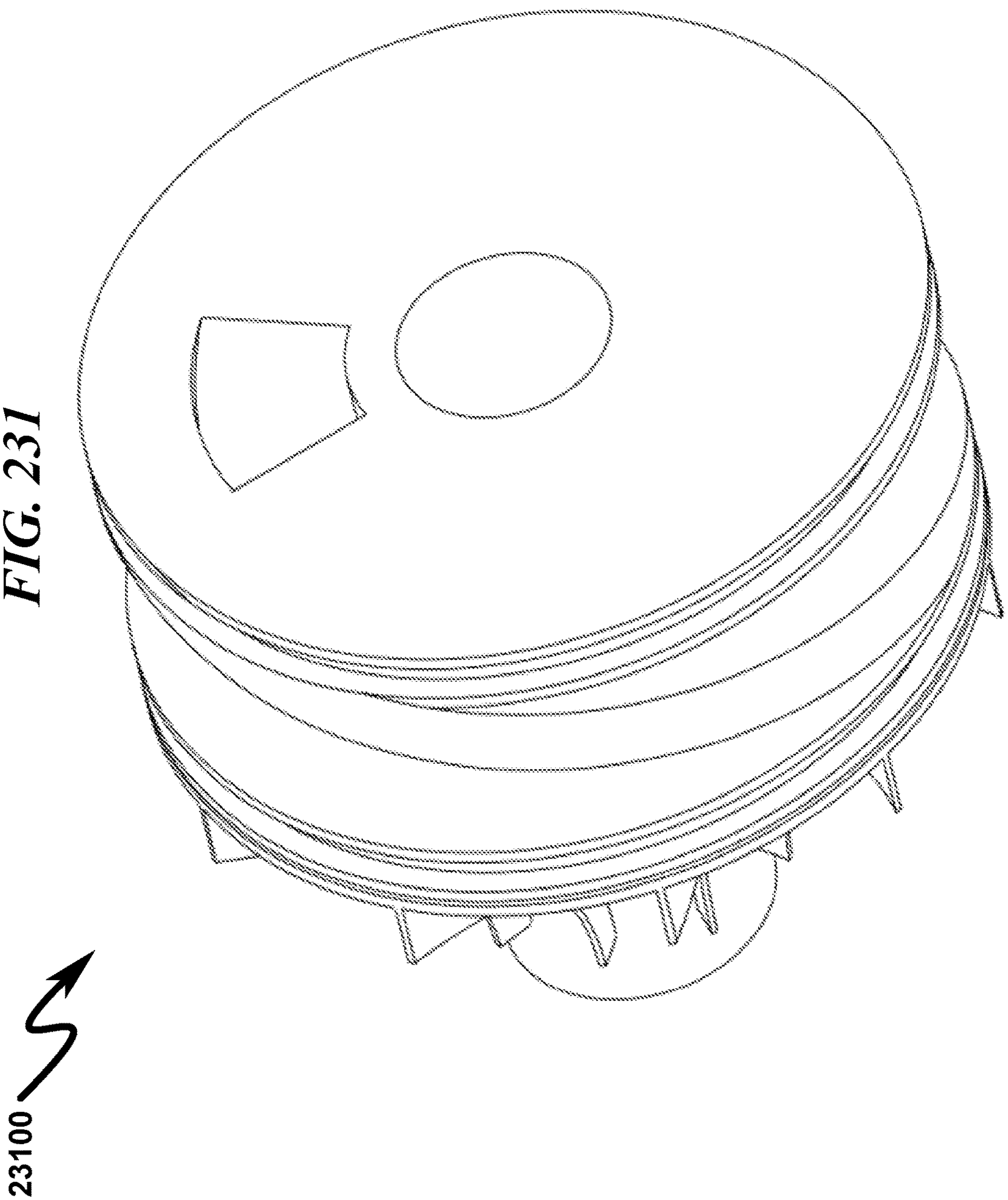
Figure 232:
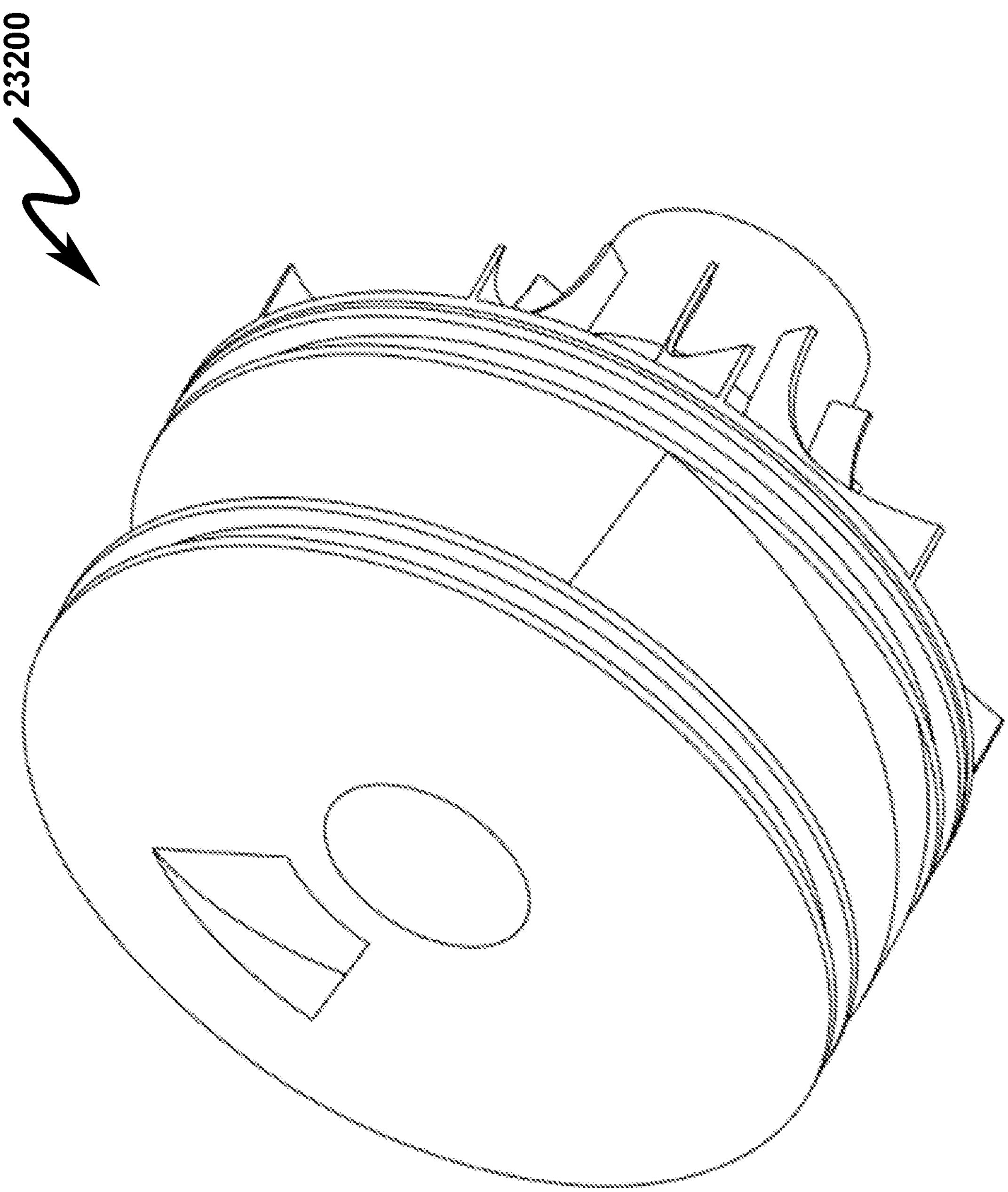
Figure 233:
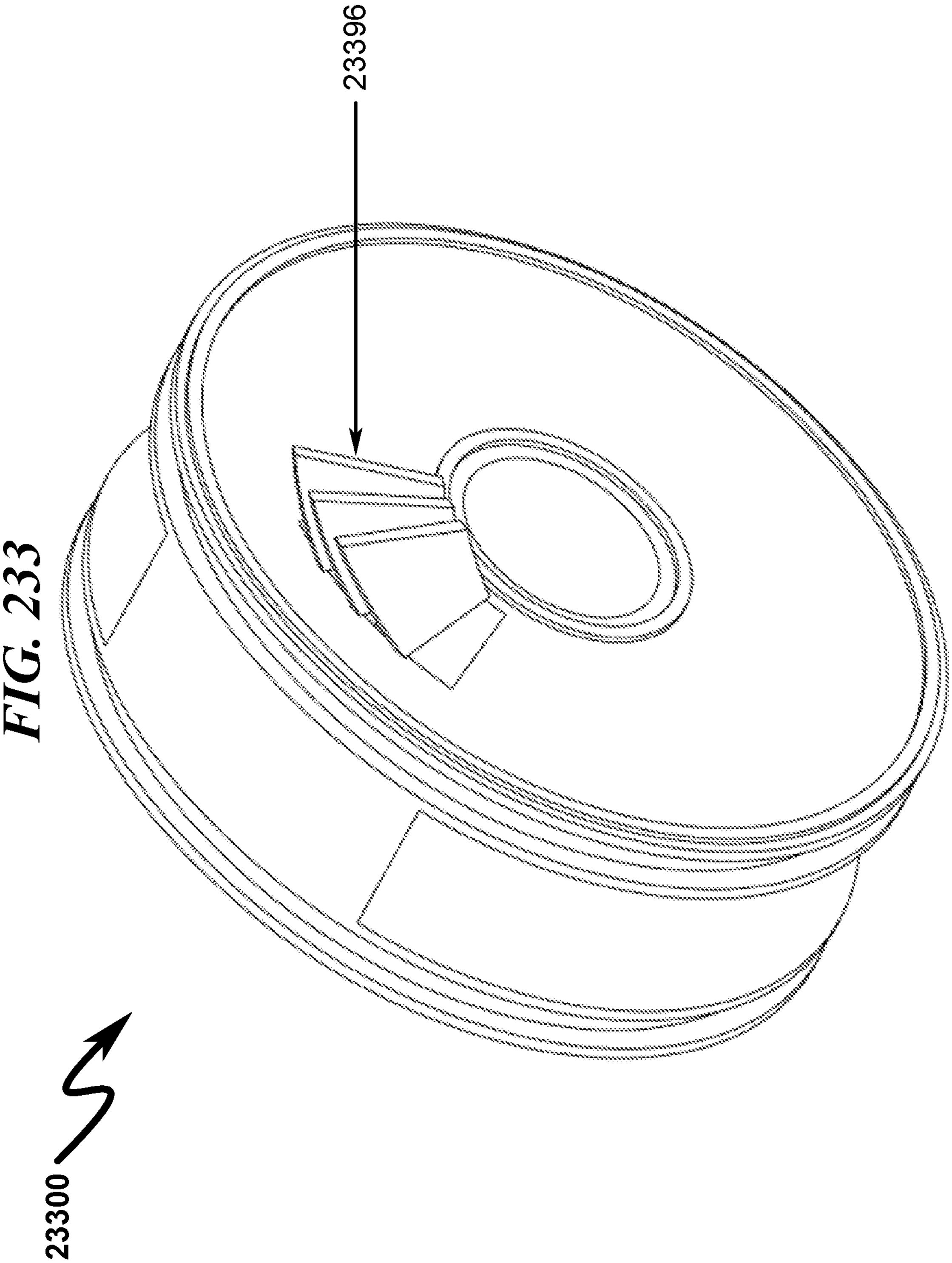
Figure 234:
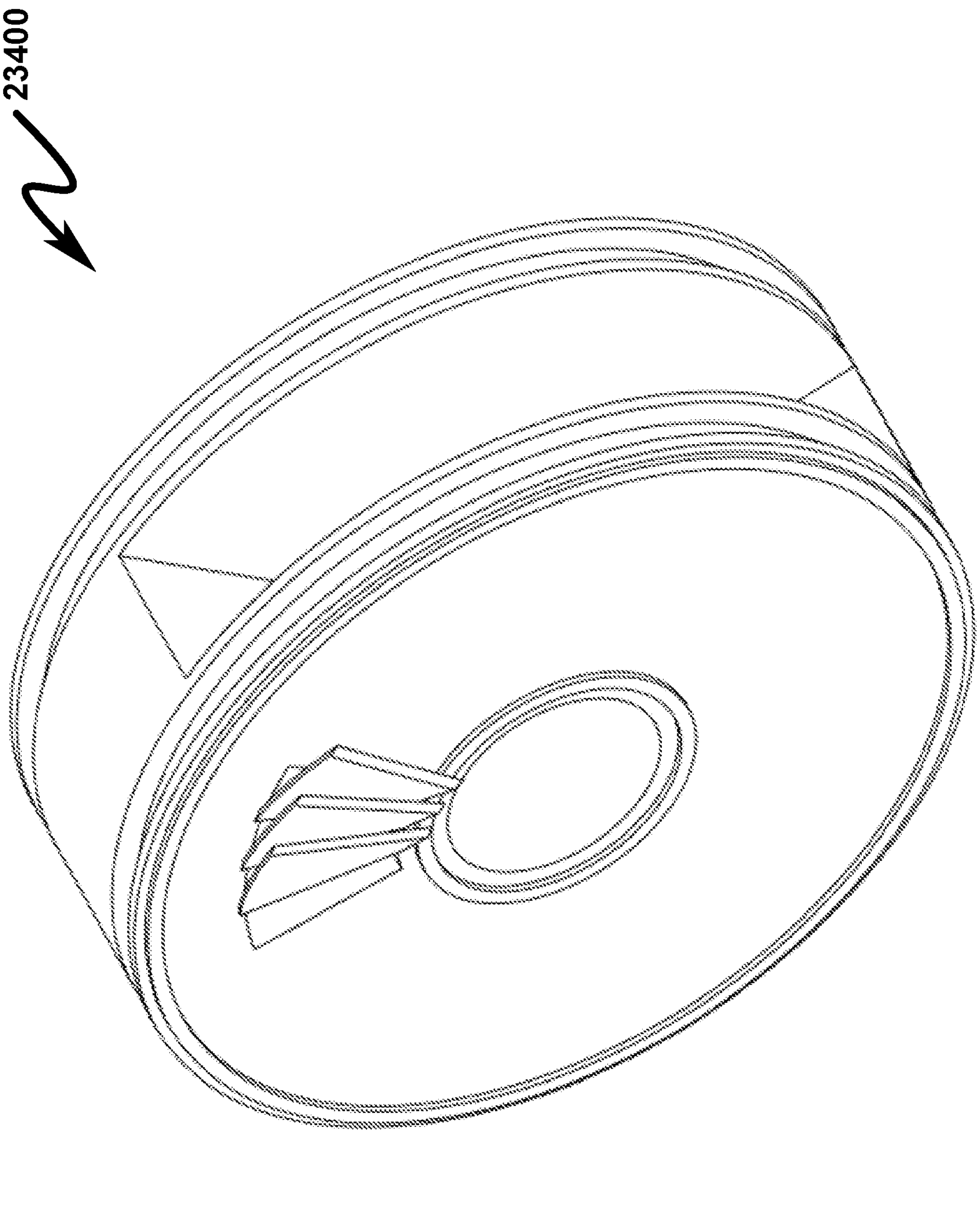
Figure 235:
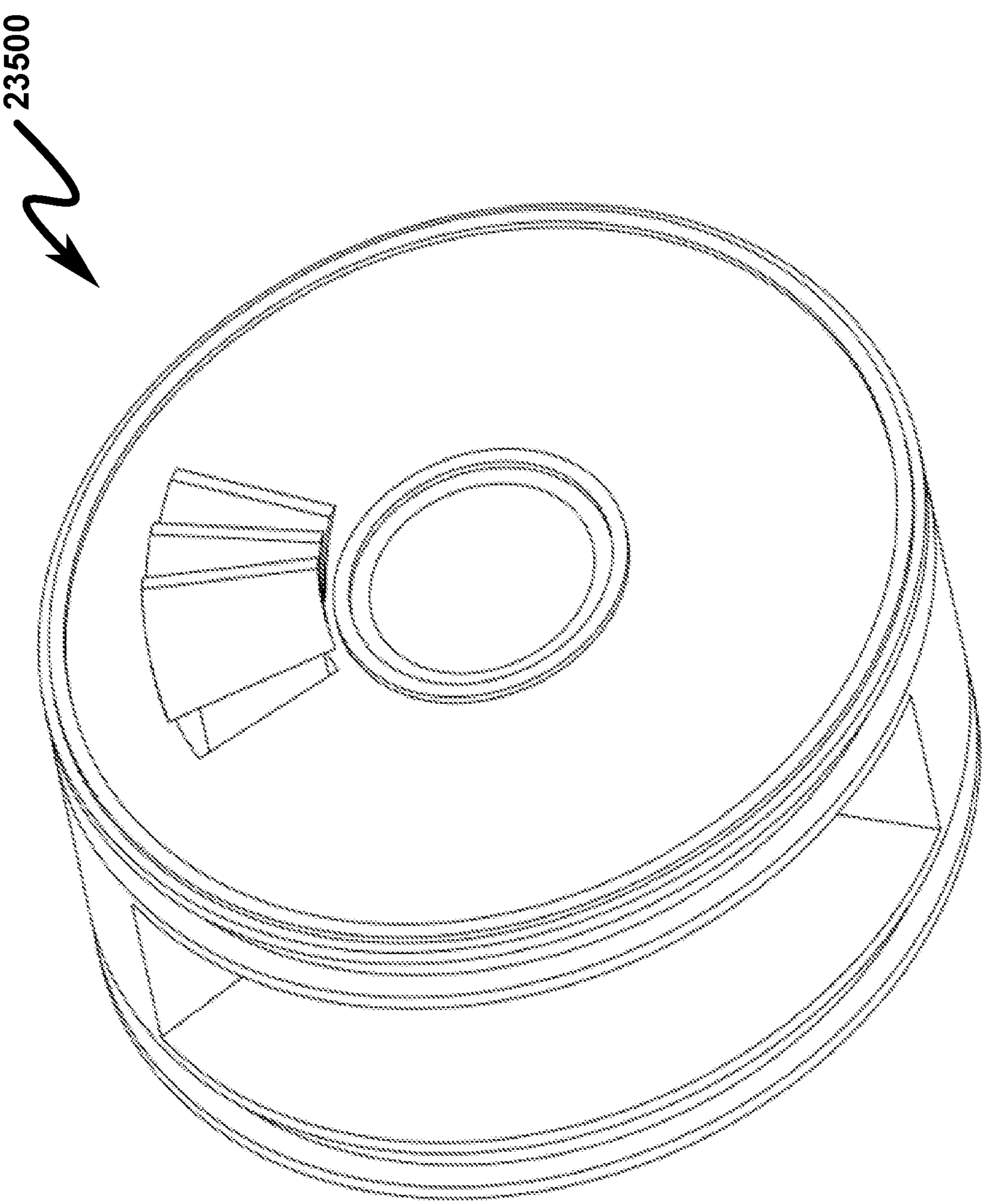
Figure 236:
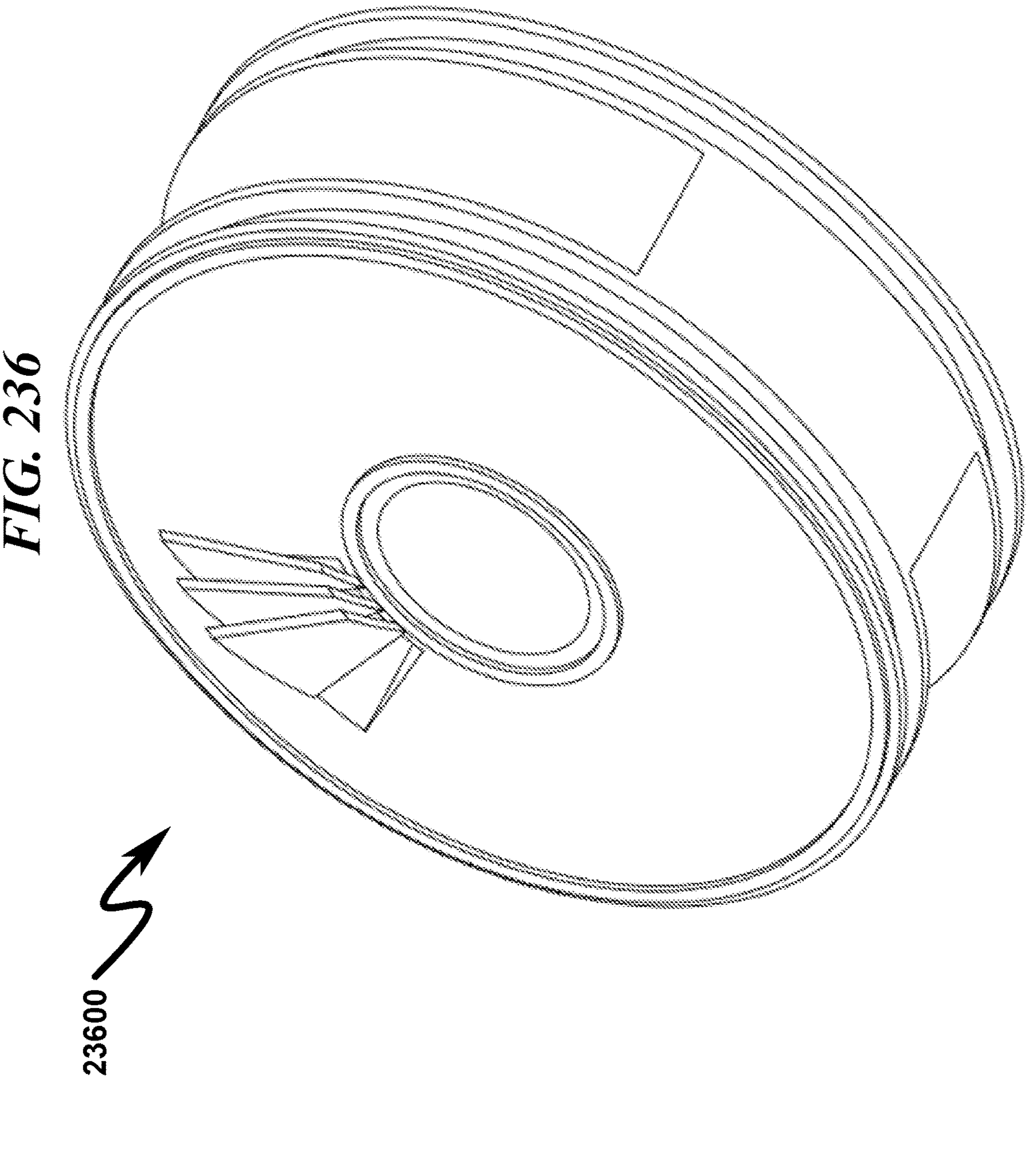
Figure 237:
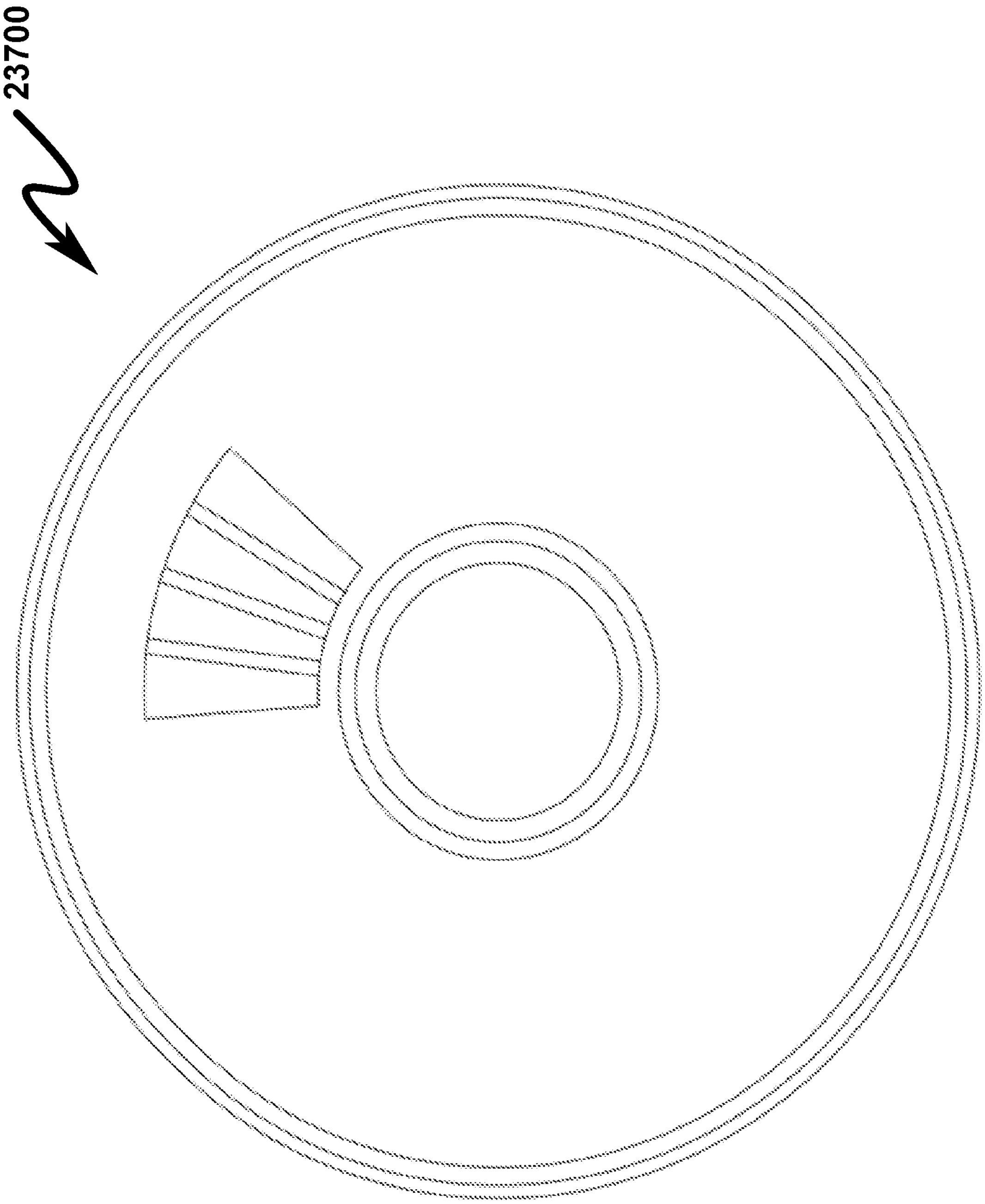
Figure 238:
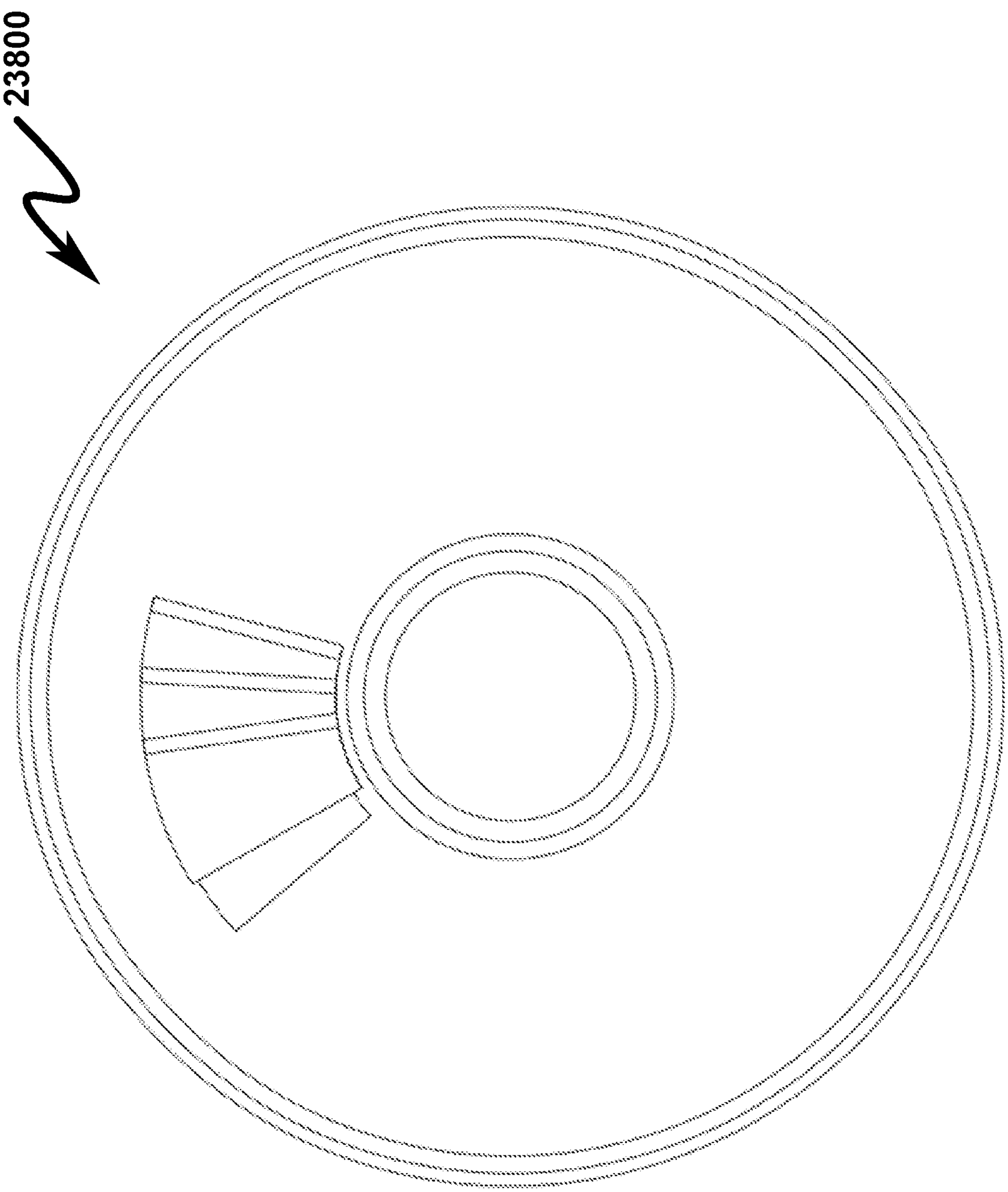
Figure 239:
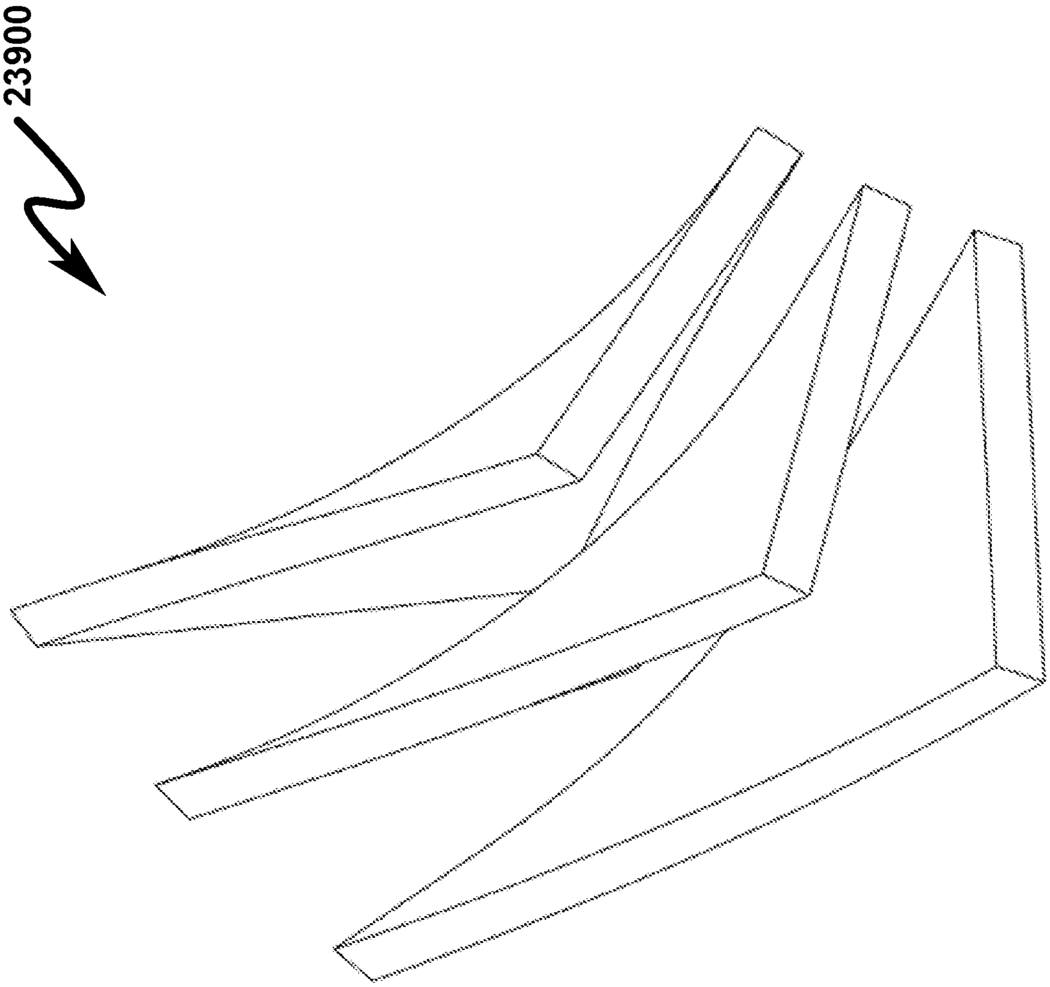
Figure 240:
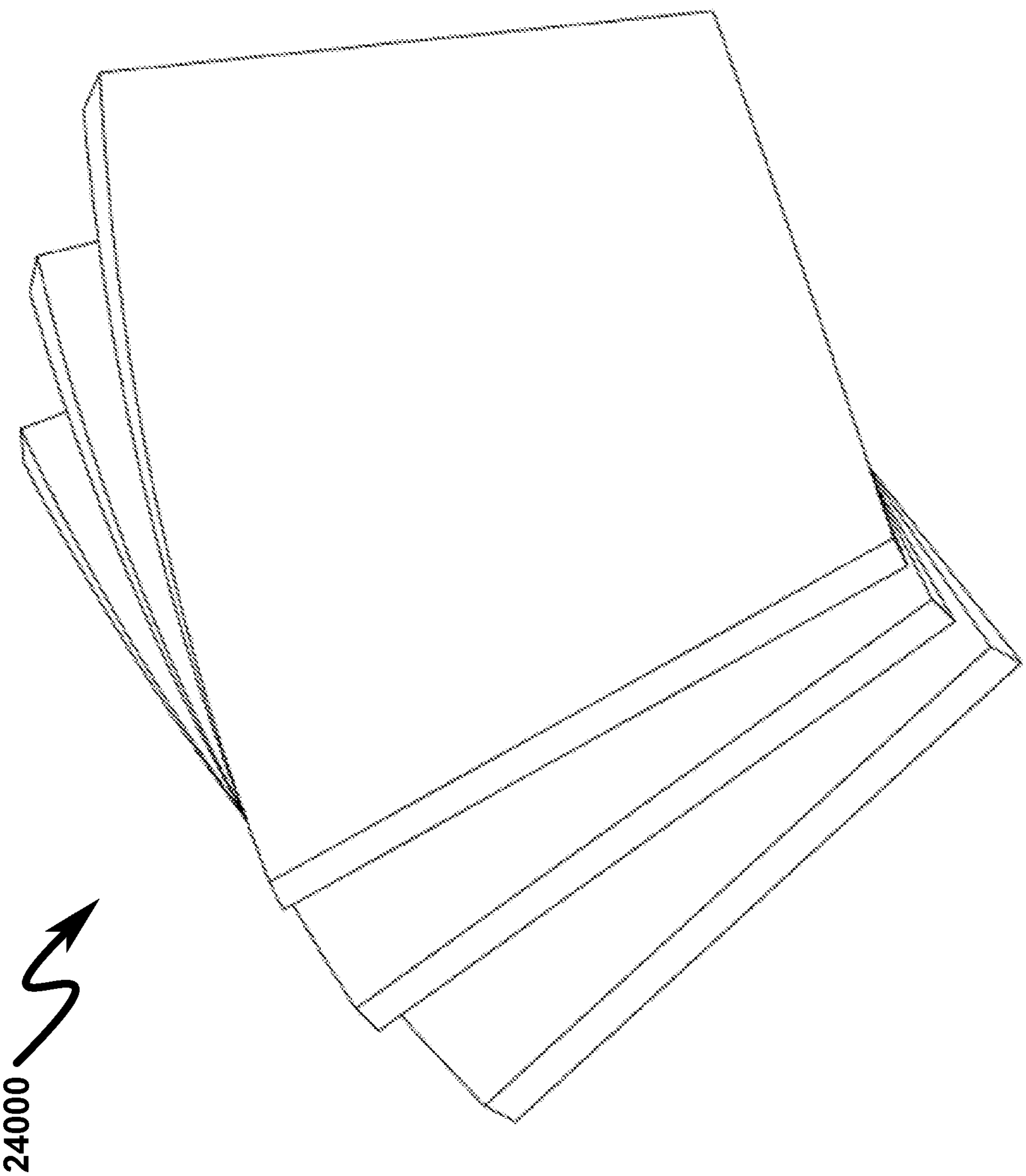
Figure 241:
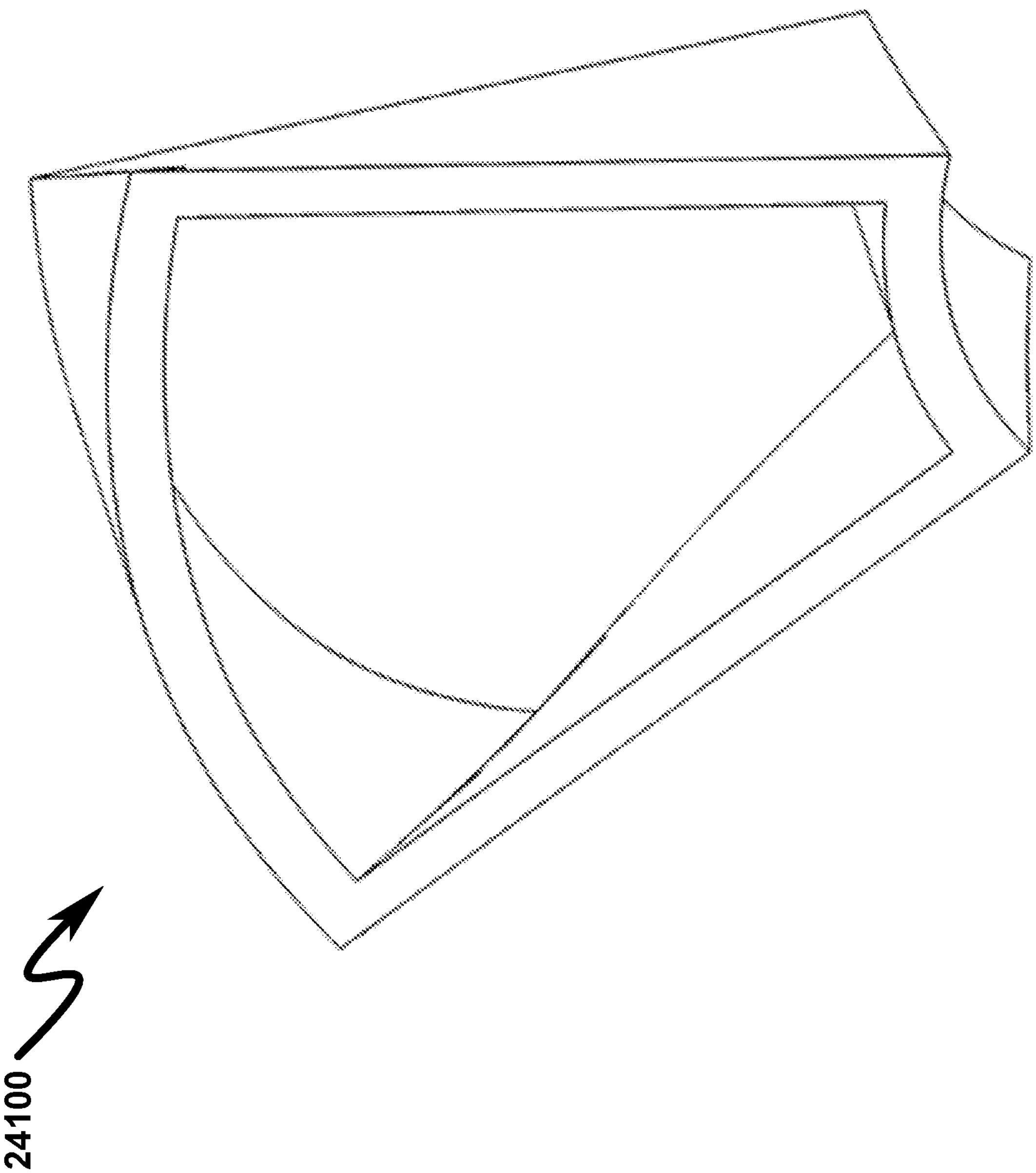
Figure 242:
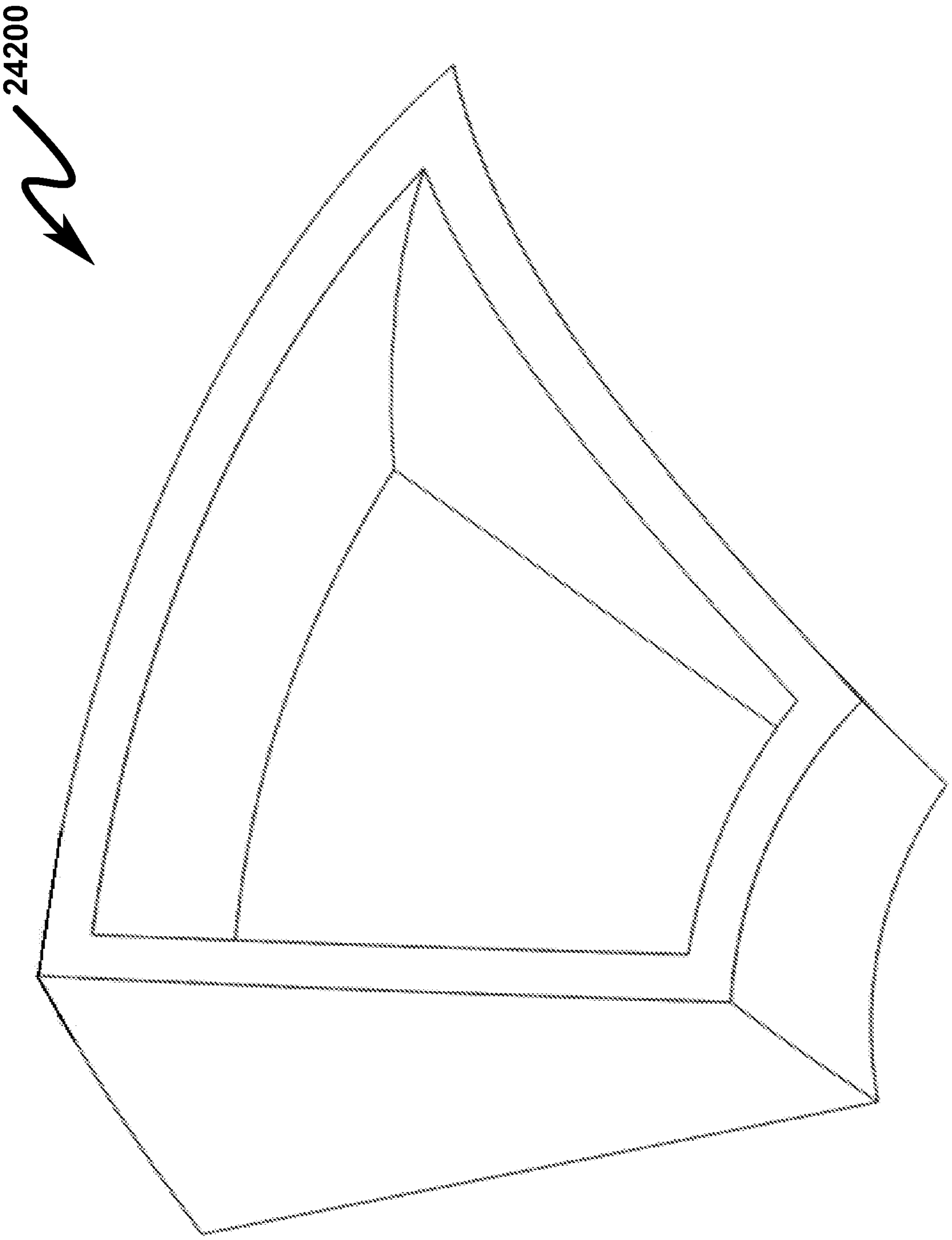
Figure 243:
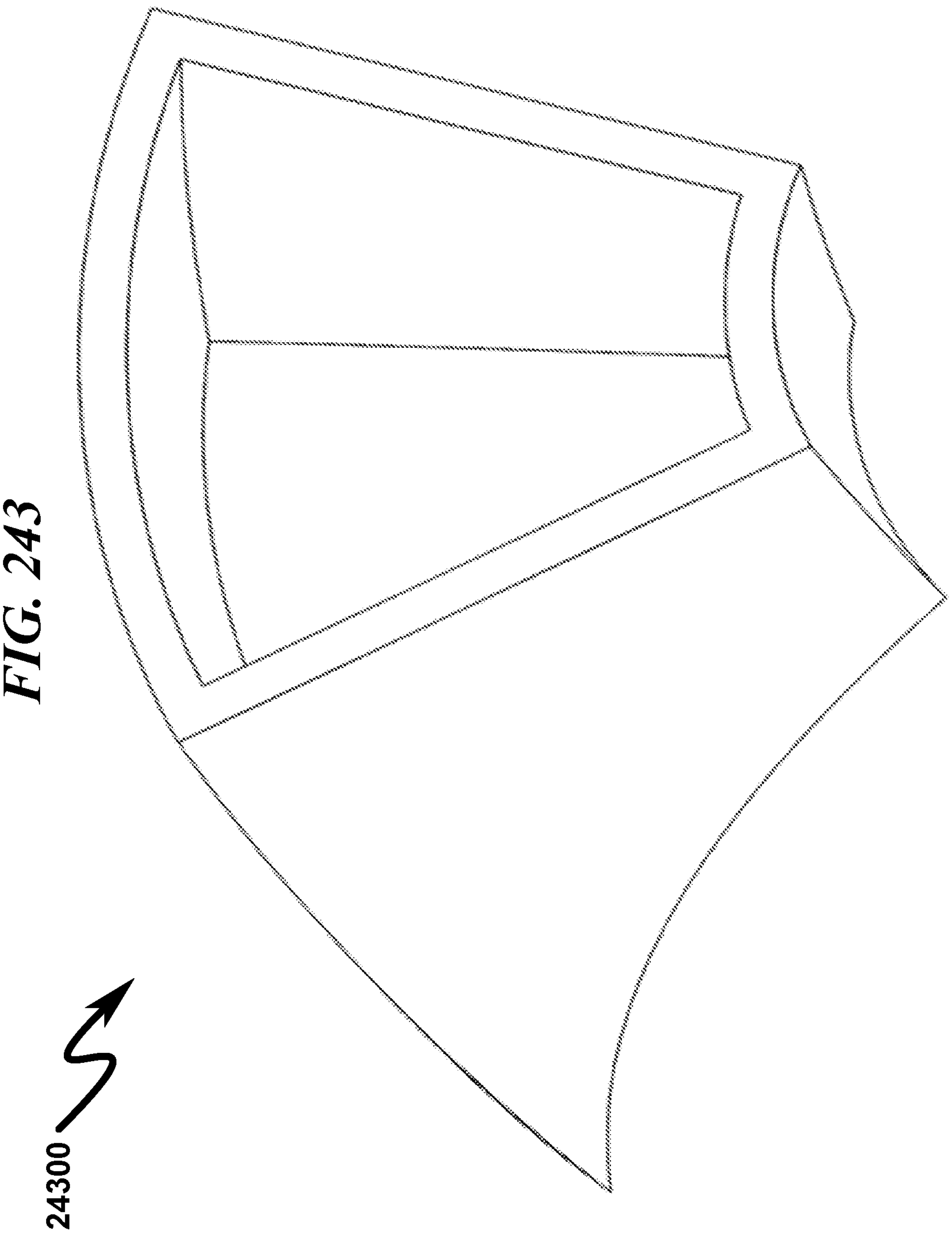
Figure 244:
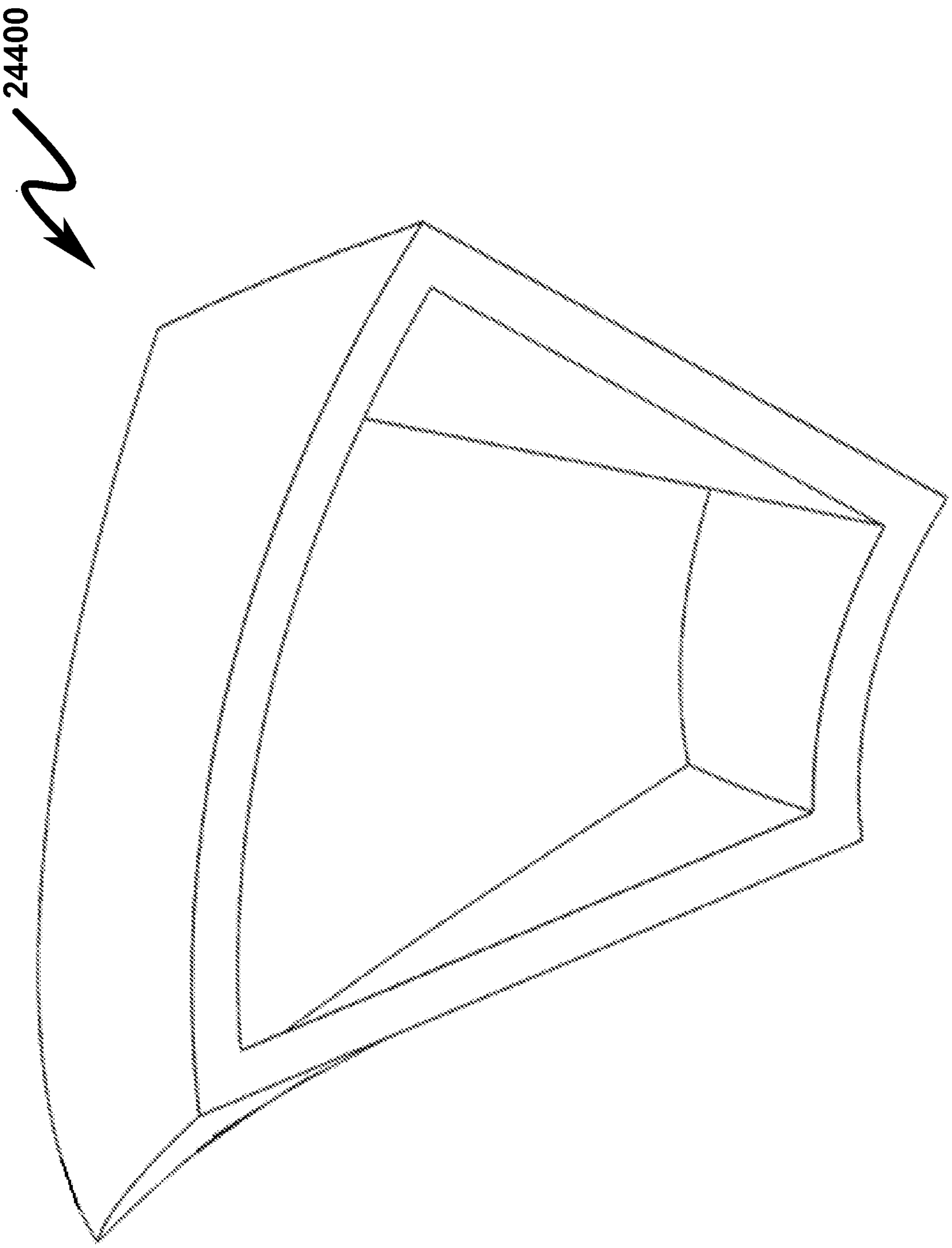
Figure 245:
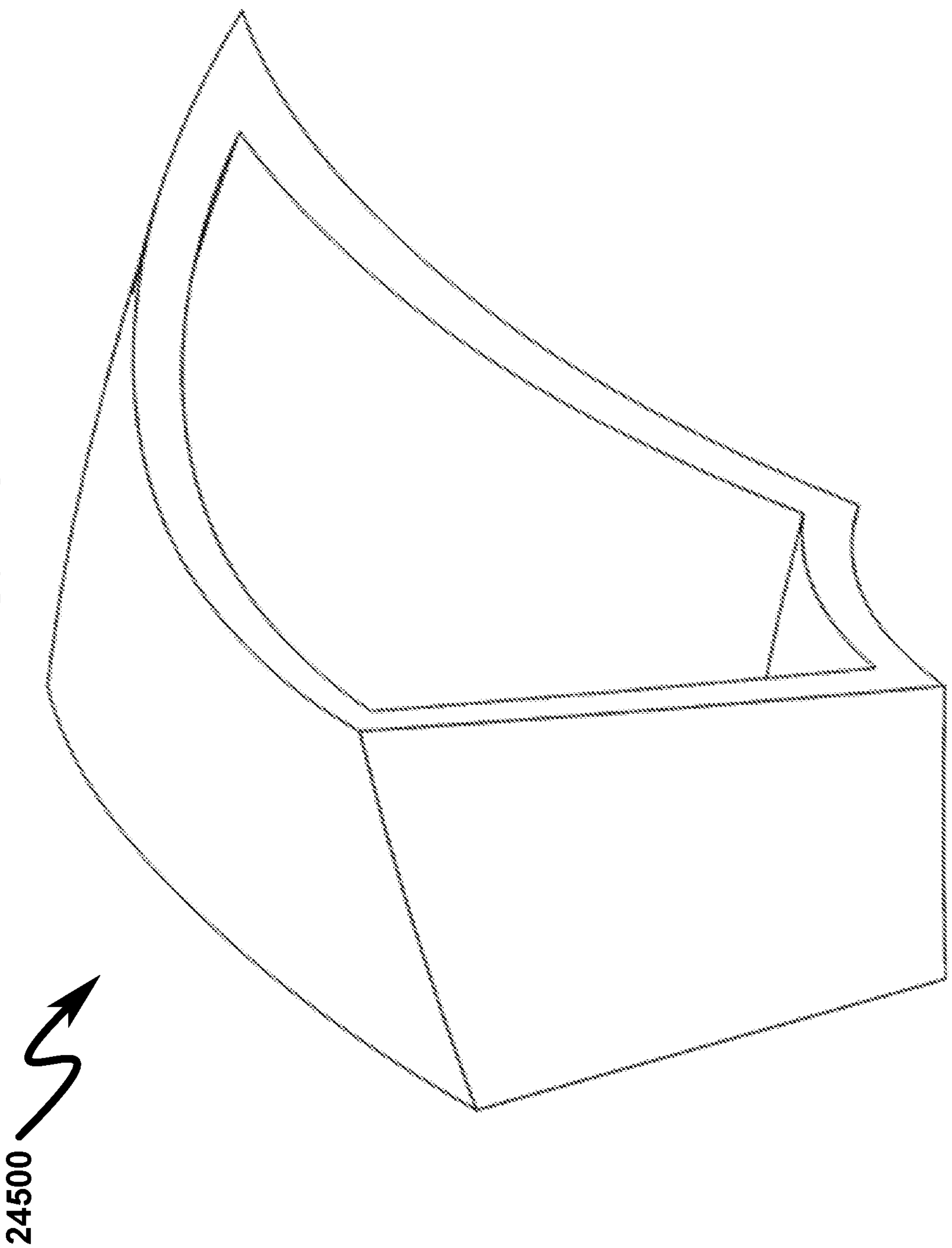
Figure 246:
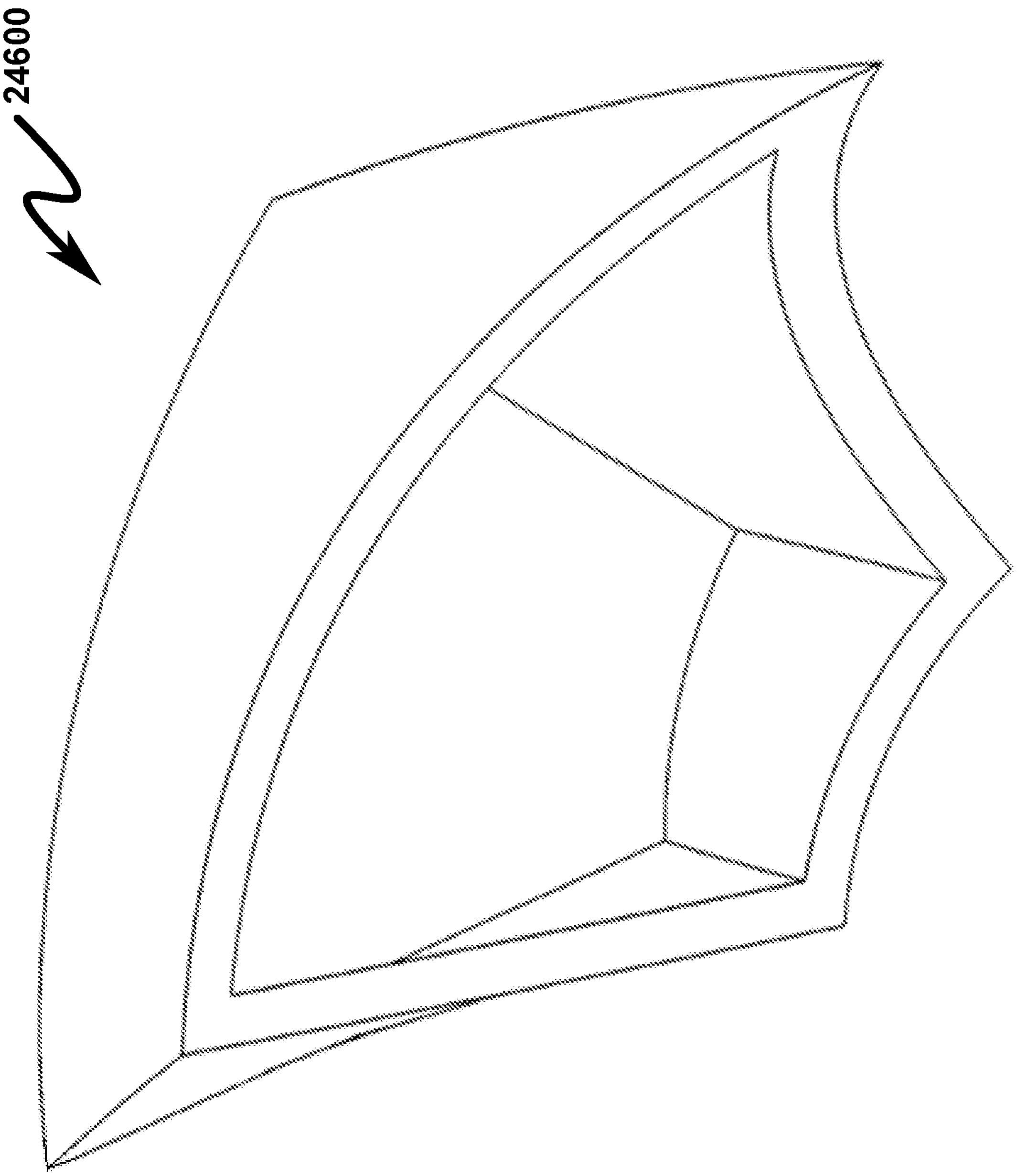
Figure 247:
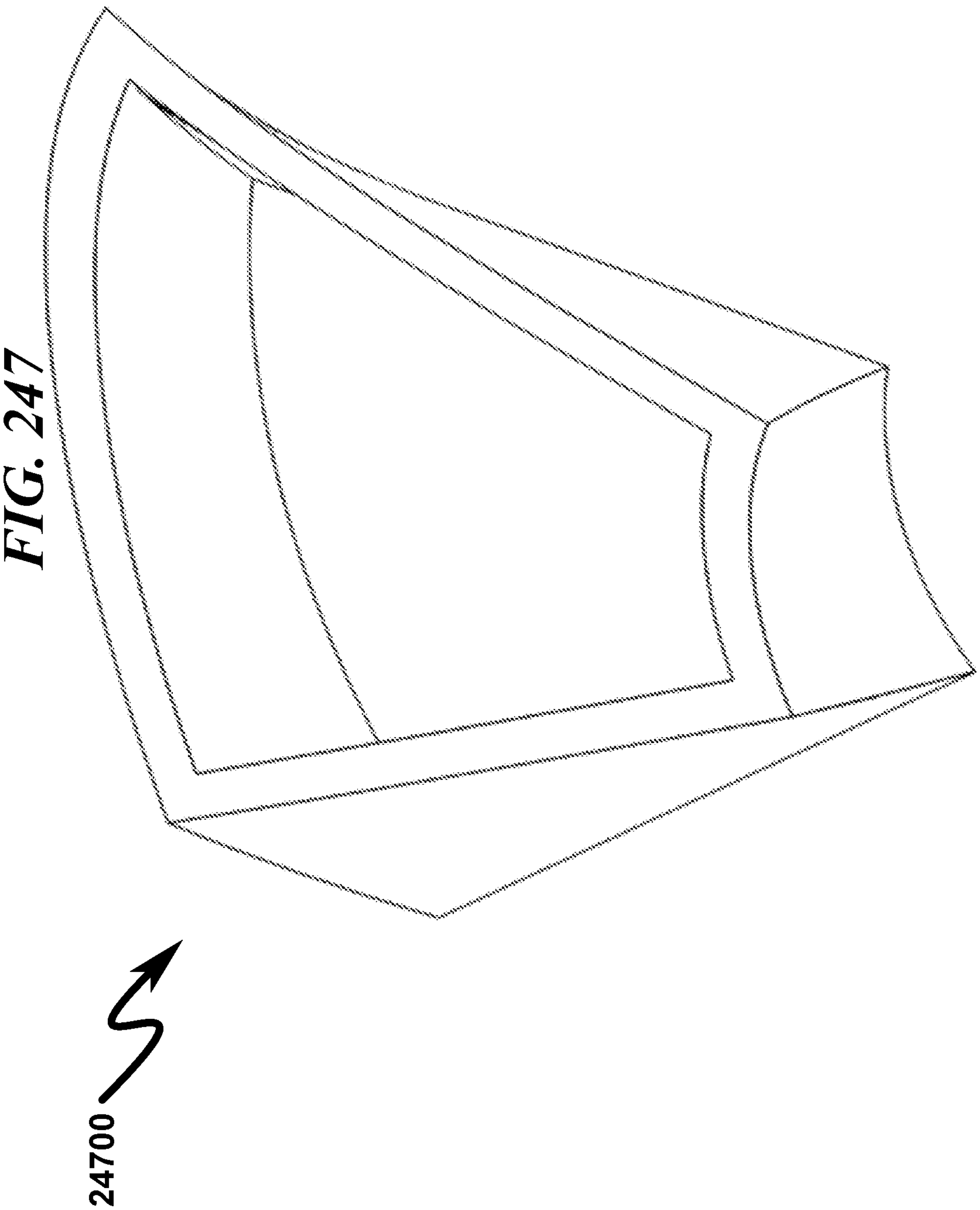
Figure 248:
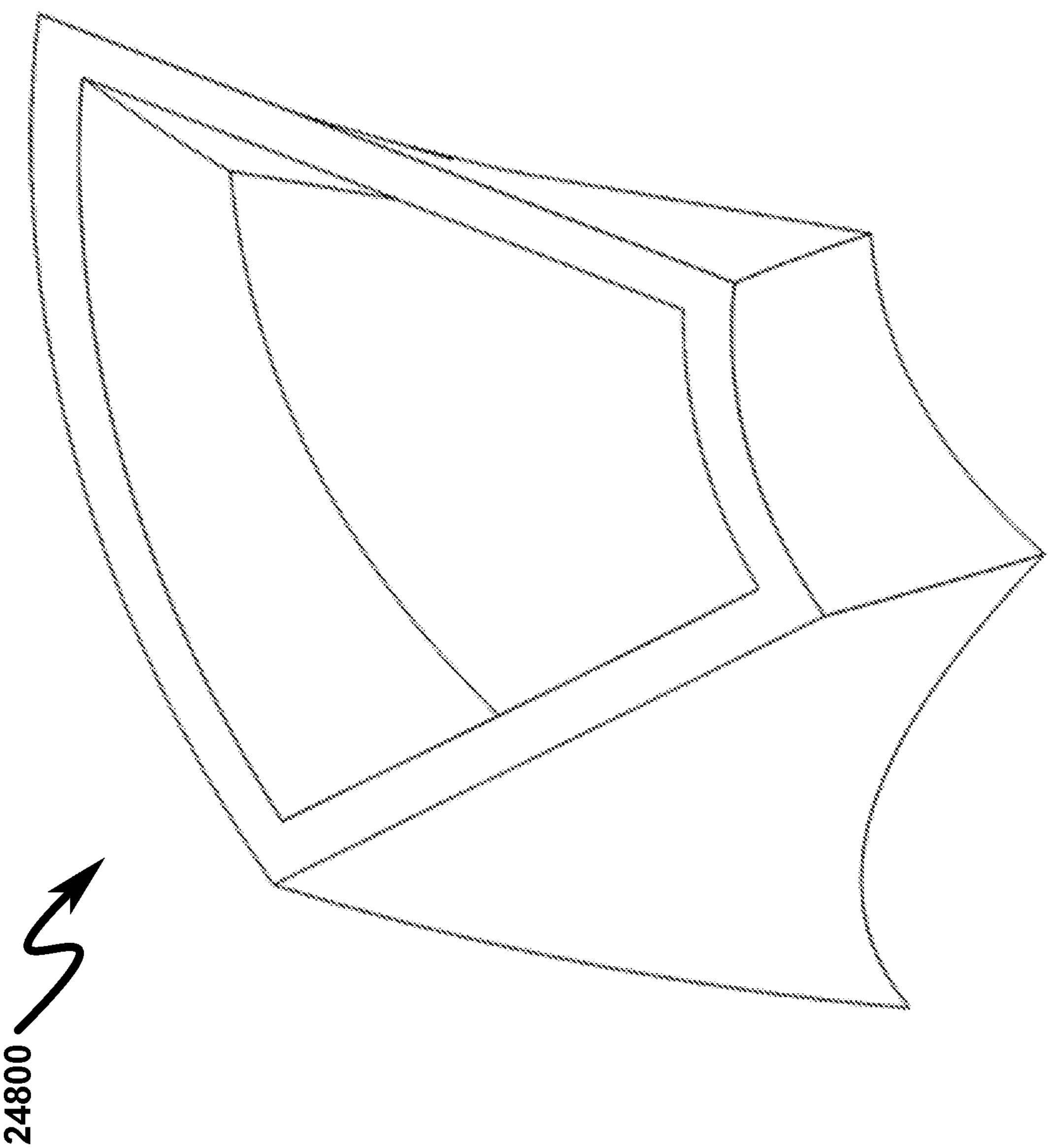
Figure 249:
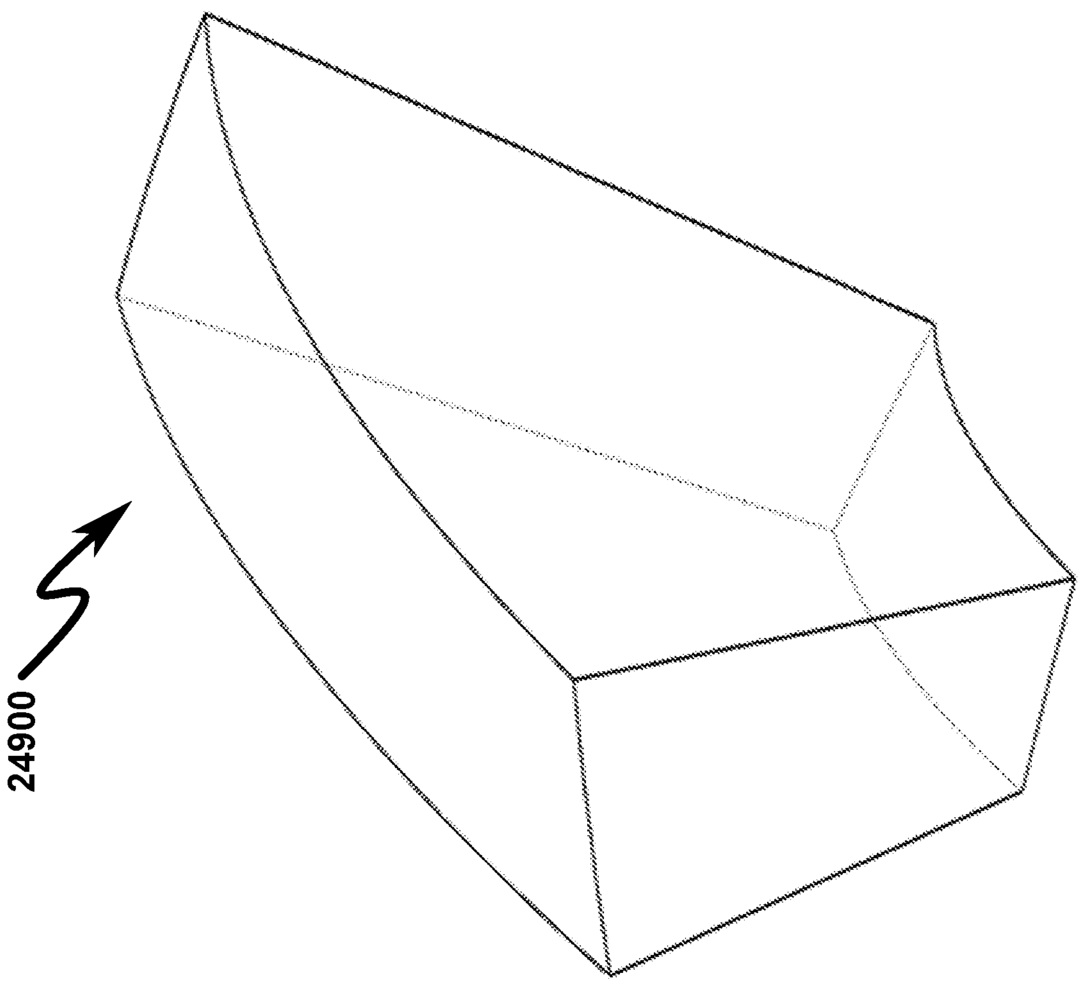
Figure 250:
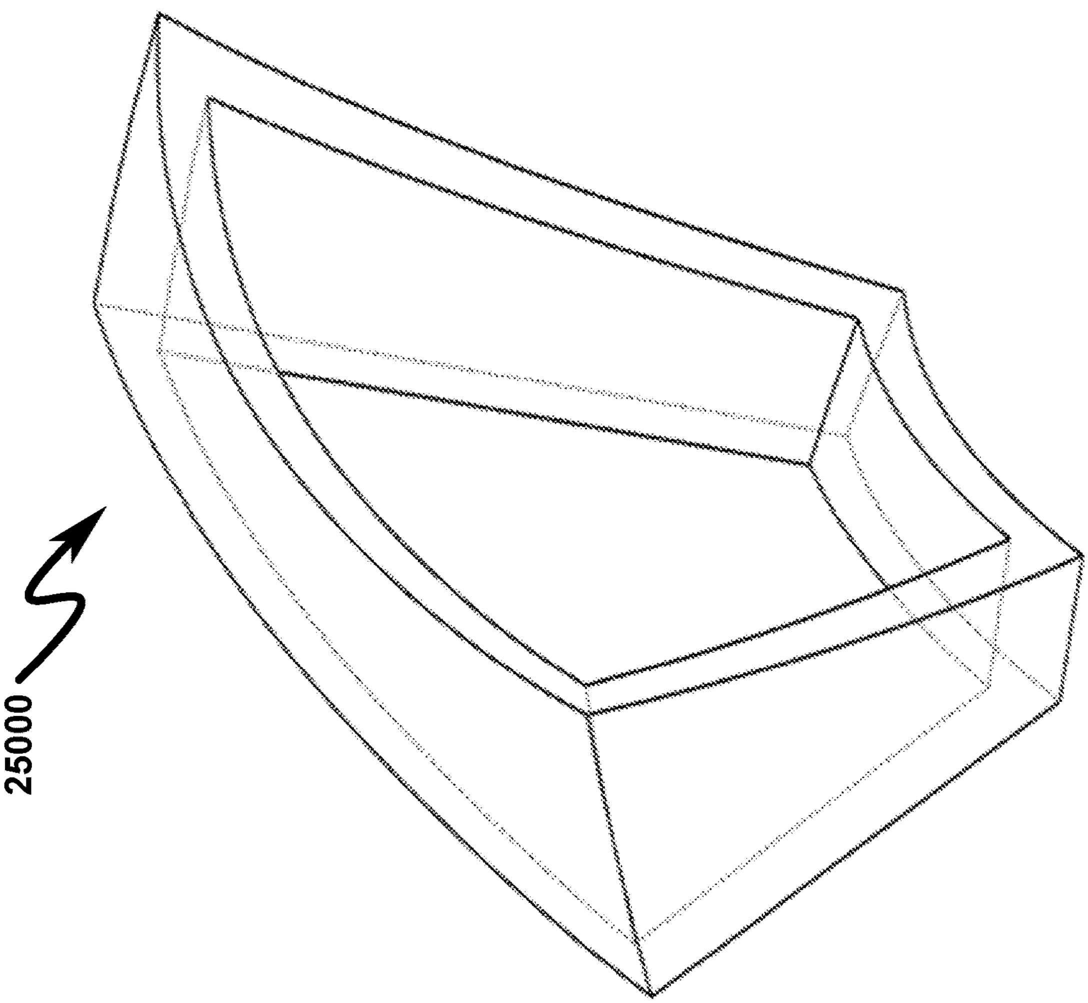
Figure 251:
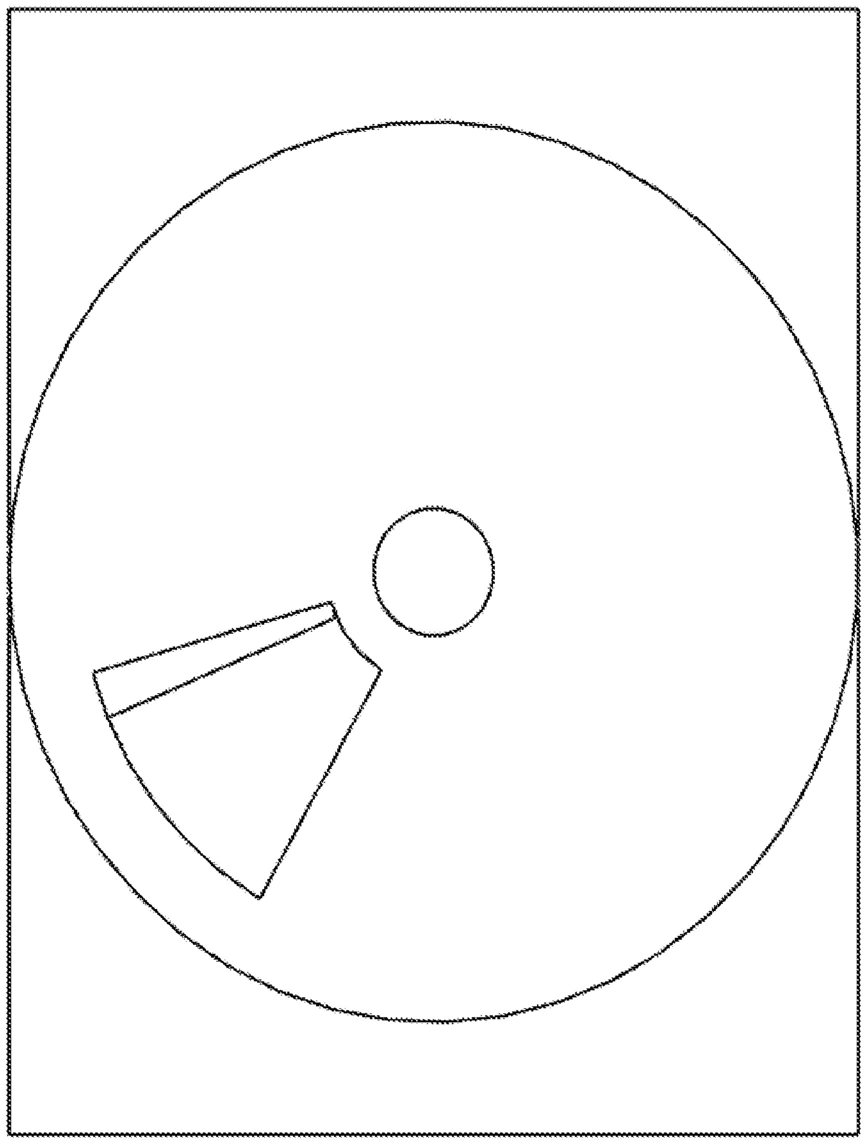
Figure 252:
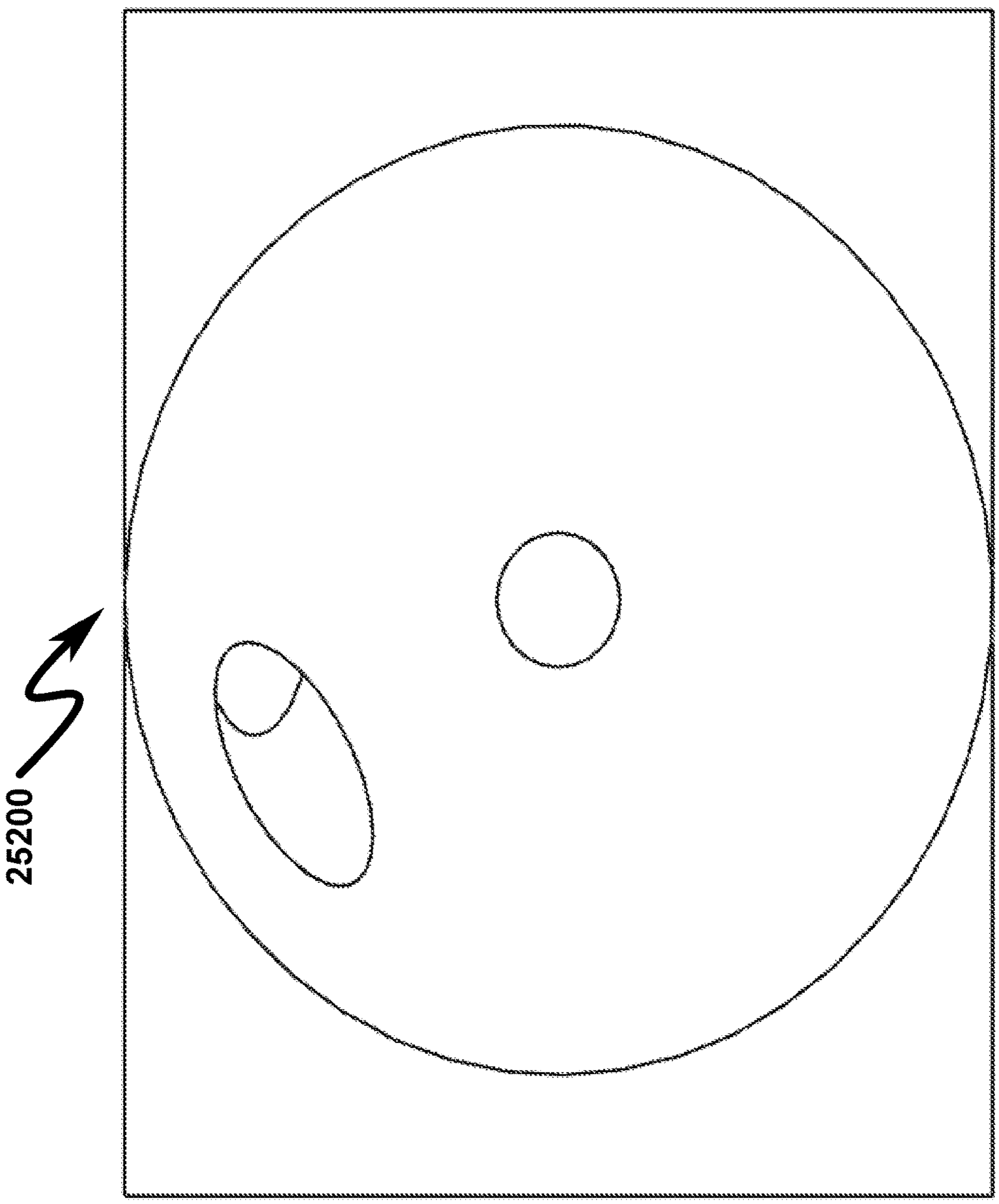
Figure 253:
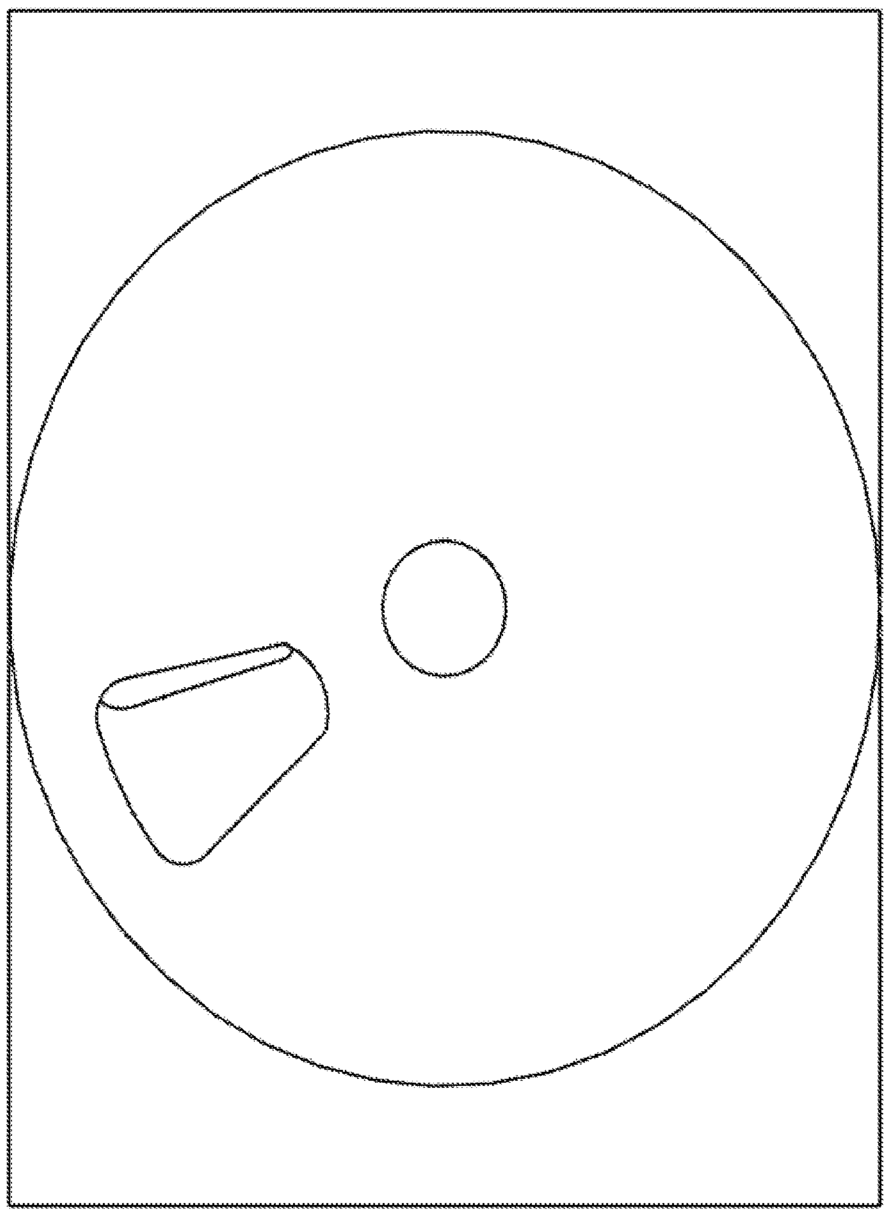
Figure 254:
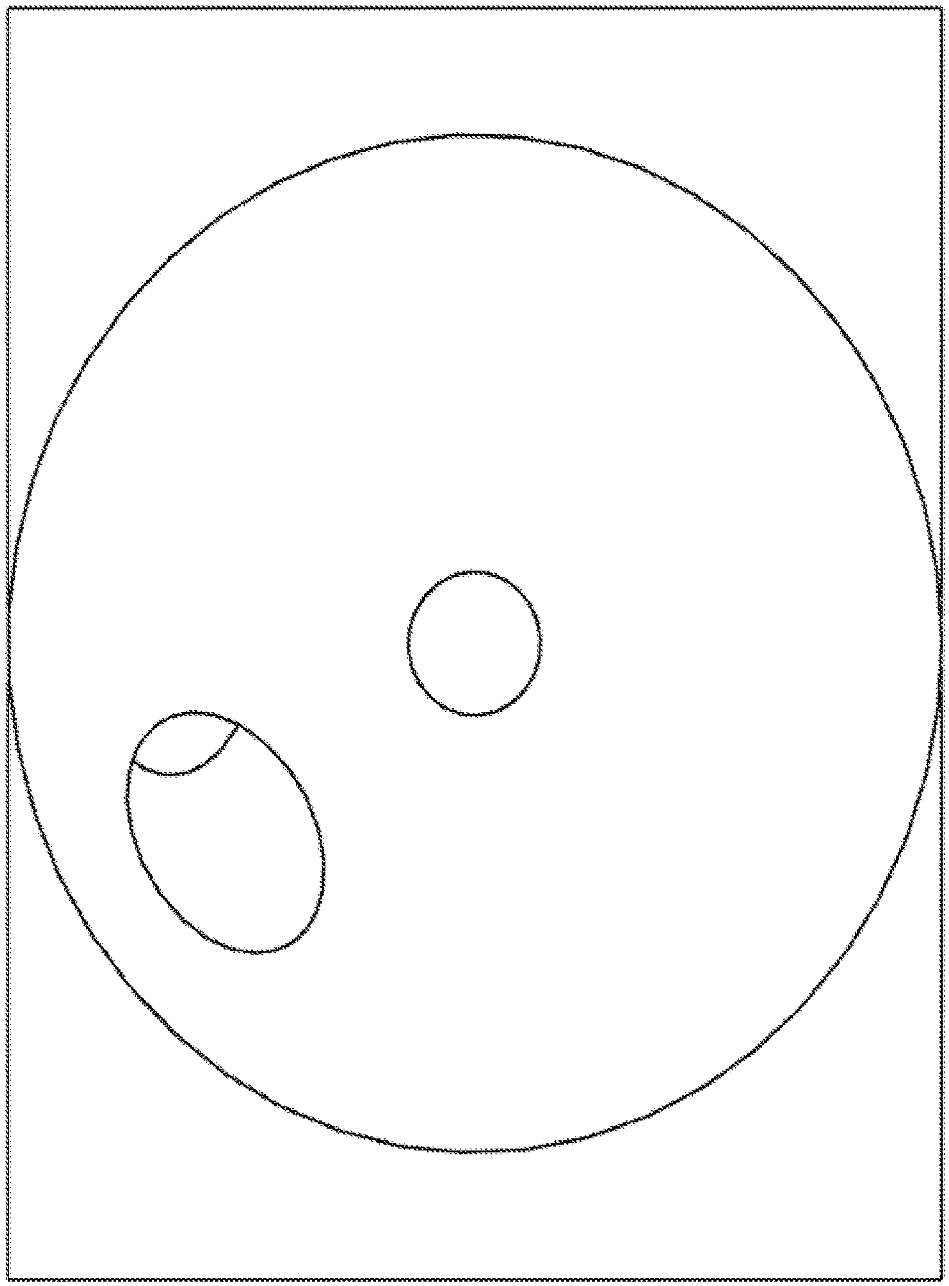
Figure 255:
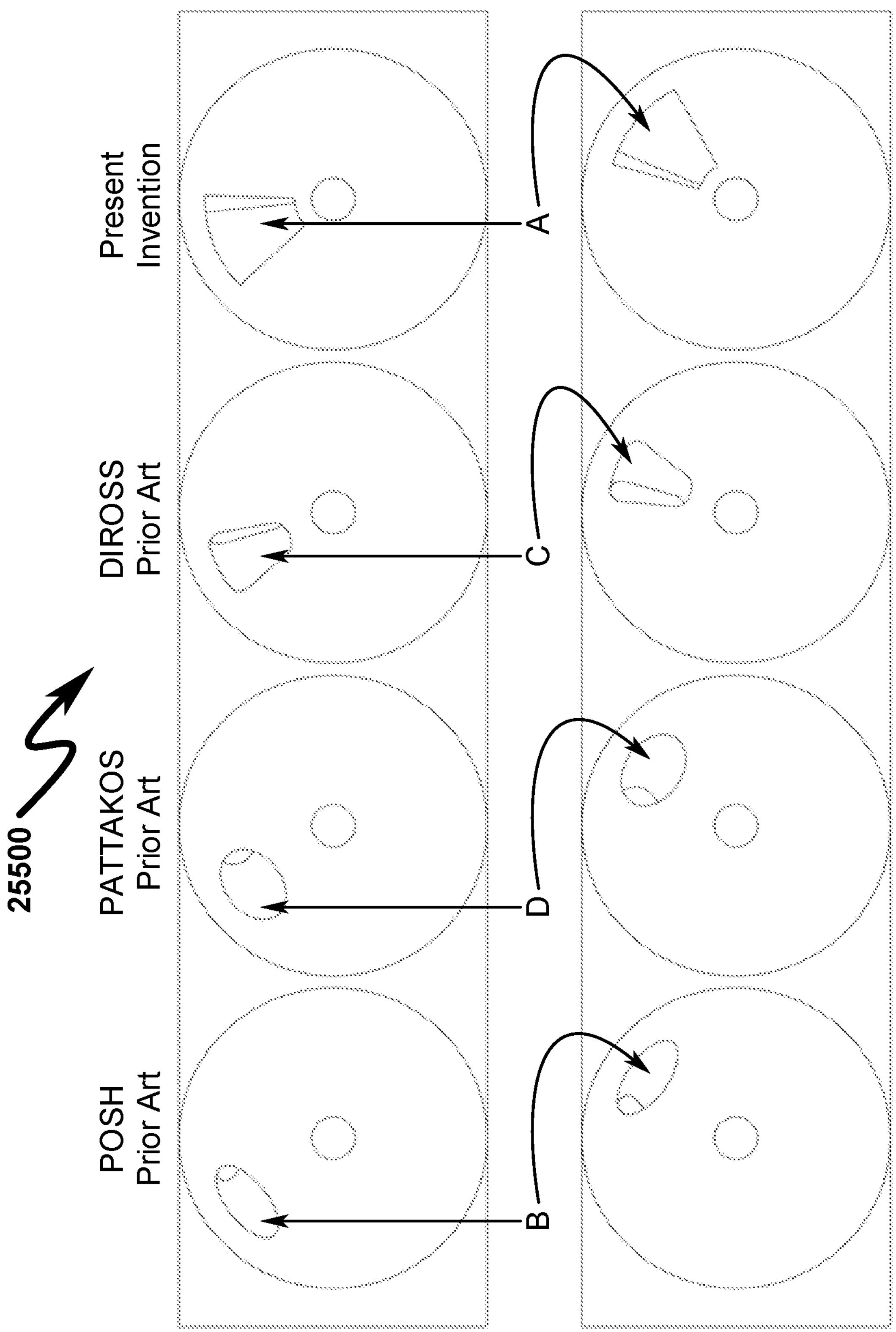
Figure 256:
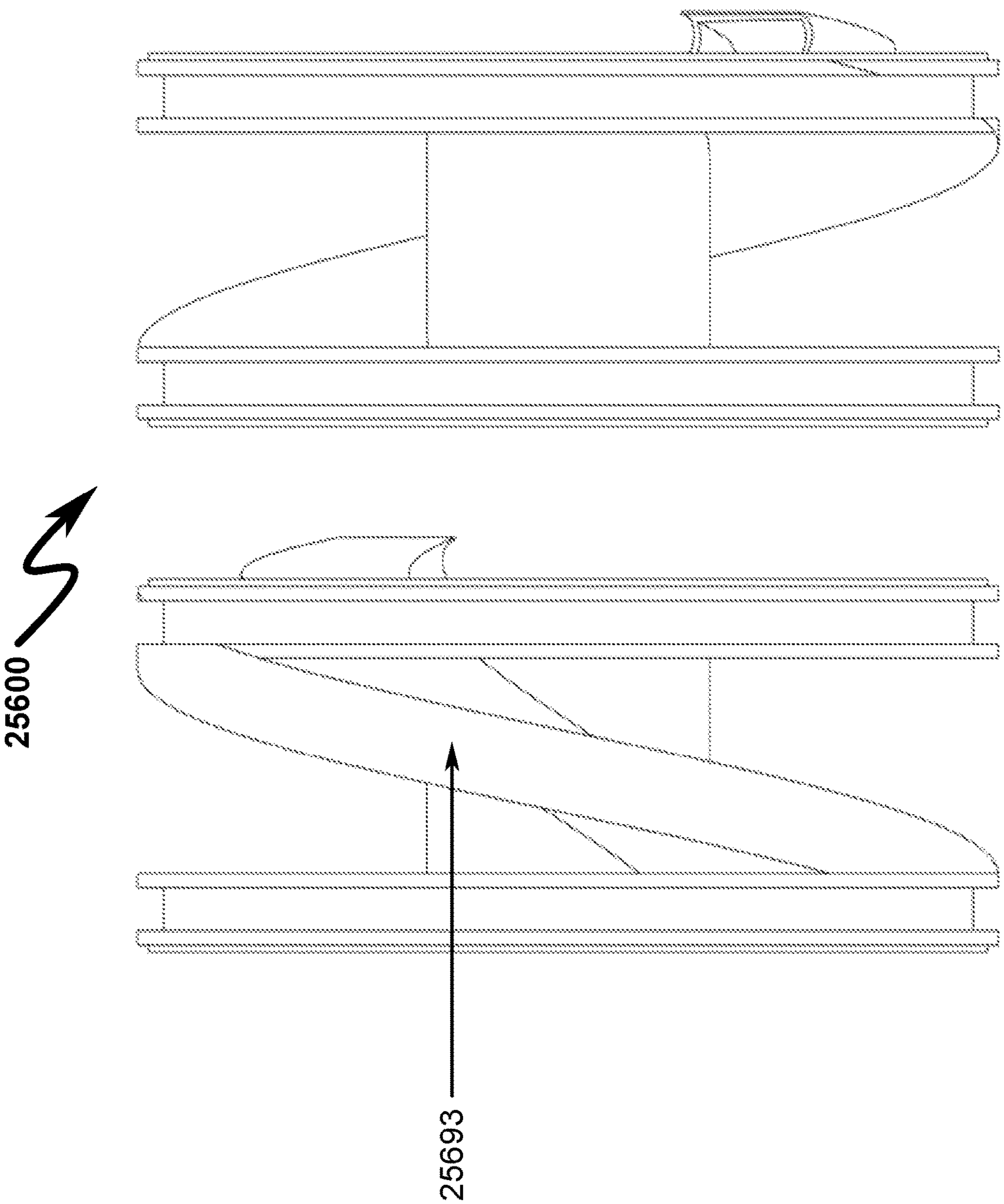

FIG. 131 illustrates left view of a preferred exemplary enhanced invention system embodiment engine block (BLK) system embodiment;

FIG. 132 illustrates right view of a preferred exemplary enhanced invention system embodiment engine block (BLK) system embodiment;

FIG. 133 illustrates top view of a preferred exemplary enhanced invention system embodiment engine block (BLK) system embodiment;

FIG. 134 illustrates bottom view of a preferred exemplary enhanced invention system embodiment engine block (BLK) system embodiment;

FIG. 135 illustrates a top left front perspective isometric view of a preferred exemplary enhanced invention system embodiment engine block (BLK) system embodiment;

FIG. 136 illustrates a top right rear perspective isometric view of a preferred exemplary enhanced invention system embodiment engine block (BLK) system embodiment;

FIG. 137 illustrates a top left rear perspective isometric view of a preferred exemplary enhanced invention system embodiment engine block (BLK) system embodiment;

FIG. 138 illustrates a top right front perspective isometric view of a preferred exemplary enhanced invention system embodiment engine block (BLK) system embodiment;

FIG. 139 illustrates a bottom right front perspective isometric view of a preferred exemplary enhanced invention system embodiment engine block (BLK) system embodiment;

FIG. 140 illustrates a bottom left front perspective isometric view of a preferred exemplary enhanced invention system embodiment engine block (BLK) system embodiment;

FIG. 141 illustrates a bottom right rear perspective isometric view of a preferred exemplary enhanced invention system embodiment engine block (BLK) system embodiment;

FIG. 142 illustrates a bottom left rear perspective isometric view of a preferred exemplary enhanced invention system embodiment engine block (BLK) system embodiment;

FIG. 143 illustrates a top perspective exploded view of a preferred exemplary enhanced invention system embodiment engine assembly embodiment;

FIG. 144 illustrates a bottom perspective exploded view of a preferred exemplary enhanced invention system embodiment engine assembly embodiment;

FIG. 145 illustrates a top left front perspective isometric exploded view of a preferred exemplary enhanced invention system embodiment illustrating internal construction of major system components;

FIG. 146 illustrates a top right rear perspective isometric exploded view of a preferred exemplary enhanced invention system embodiment illustrating internal construction of major system components;

FIG. 147 illustrates a top left rear perspective isometric exploded view of a preferred exemplary enhanced invention system embodiment illustrating internal construction of major system components;

FIG. 148 illustrates a top right front perspective isometric exploded view of a preferred exemplary enhanced invention system embodiment illustrating internal construction of major system components;

FIG. 149 illustrates a bottom left rear perspective isometric exploded view of a preferred exemplary enhanced invention system embodiment illustrating internal construction of major system components;

FIG. 150 illustrates a bottom left front perspective isometric exploded view of a preferred exemplary enhanced invention system embodiment illustrating internal construction of major system components;

FIG. 151 illustrates a bottom right front perspective isometric exploded view of a preferred exemplary enhanced invention system embodiment illustrating internal construction of major system components;

FIG. 152 illustrates a bottom right rear perspective isometric exploded view of a preferred exemplary enhanced invention system embodiment illustrating internal construction of major system components;

FIG. 153 illustrates a front sectioned perspective view of a preferred exemplary enhanced invention system embodiment illustrating internal construction of major system components;

FIG. 154 illustrates a back sectioned perspective view of a preferred exemplary enhanced invention system embodiment illustrating internal construction of major system components;

FIG. 155 illustrates a left sectioned perspective view of a preferred exemplary enhanced invention system embodiment illustrating internal construction of major system components;

FIG. 156 illustrates a right sectioned perspective view of a preferred exemplary enhanced invention system embodiment illustrating internal construction of major system components;

FIG. 157 illustrates a top sectioned perspective view of a preferred exemplary enhanced invention system embodiment illustrating internal construction of major system components;

FIG. 158 illustrates a bottom sectioned perspective view of a preferred exemplary enhanced invention system embodiment illustrating internal construction of major system components;

FIG. 159 illustrates a top left front sectioned perspective isometric view of a preferred exemplary enhanced invention system embodiment illustrating internal construction of major system components;

FIG. 160 illustrates a top right rear sectioned perspective isometric view of a preferred exemplary enhanced invention system embodiment illustrating internal construction of major system components;

FIG. 161 illustrates a top left rear sectioned perspective isometric view of a preferred exemplary enhanced invention system embodiment illustrating internal construction of major system components;

FIG. 162 illustrates a top right front sectioned perspective isometric view of a preferred exemplary enhanced invention system embodiment illustrating internal construction of major system components;

FIG. 163 illustrates a bottom right front sectioned perspective isometric view of a preferred exemplary enhanced invention system embodiment illustrating internal construction of major system components;

FIG. 164 illustrates a bottom left front sectioned perspective view of a preferred exemplary enhanced invention system embodiment illustrating internal construction of major system components;

FIG. 165 illustrates a bottom right rear sectioned perspective isometric view of a preferred exemplary enhanced invention system embodiment illustrating internal construction of major system components;

FIG. 166 illustrates a bottom left rear sectioned perspective isometric view of a preferred exemplary enhanced invention system embodiment illustrating internal construction of major system components;

FIG. 167 illustrates a front sectioned perspective view of a preferred exemplary enhanced invention system embodiment illustrating internal construction of major system components;

FIG. 168 illustrates a back sectioned perspective view of a preferred exemplary enhanced invention system embodiment illustrating internal construction of major system components;

FIG. 169 illustrates a left sectioned perspective view of a preferred exemplary enhanced invention system embodiment illustrating internal construction of major system components;

FIG. 170 illustrates a right sectioned perspective view of a preferred exemplary enhanced invention system embodiment illustrating internal construction of major system components;

FIG. 171 illustrates a top sectioned perspective view of a preferred exemplary enhanced invention system embodiment illustrating internal construction of major system components;

FIG. 172 illustrates a bottom sectioned perspective view of a preferred exemplary enhanced invention system embodiment illustrating internal construction of major system components;

FIG. 173 illustrates a top right rear sectioned perspective isometric view of a preferred exemplary enhanced invention system embodiment illustrating internal construction of major system components;

FIG. 174 illustrates a top left rear sectioned perspective isometric view of a preferred exemplary enhanced invention system embodiment illustrating internal construction of major system components;

FIG. 175 illustrates a top right front sectioned perspective isometric view of a preferred exemplary enhanced invention system embodiment illustrating internal construction of major system components;

FIG. 176 illustrates a top left front sectioned perspective isometric view of a preferred exemplary enhanced invention system embodiment illustrating internal construction of major system components;

FIG. 177 illustrates a bottom left front sectioned perspective isometric view of a preferred exemplary enhanced invention system embodiment illustrating internal construction of major system components;

FIG. 178 illustrates a bottom left rear sectioned perspective isometric view of a preferred exemplary enhanced invention system embodiment illustrating internal construction of major system components;

FIG. 179 illustrates a bottom right rear sectioned perspective isometric view of a preferred exemplary enhanced invention system embodiment illustrating internal construction of major system components;

FIG. 180 illustrates a sectioned assembly perspective isolation view of a preferred exemplary enhanced invention system embodiment illustrating internal construction of the forced induction system components;

FIG. 181 illustrates a sectioned assembly perspective isolation view of a preferred exemplary enhanced invention system embodiment illustrating internal construction of the forced induction system components;

FIG. 182 illustrates a sectioned assembly airflow perspective isolation view of a preferred exemplary enhanced invention system embodiment illustrating internal construction of the forced induction system components;

FIG. 183 illustrates a sectioned assembly airflow perspective isolation view of a preferred exemplary enhanced invention system embodiment illustrating internal construction of the forced induction system components;

FIG. 184 illustrates a sectioned airflow perspective isolation view of a preferred exemplary enhanced invention system embodiment illustrating internal construction of the forced induction system components;

FIG. 185 illustrates a top right front exploded perspective isolation detail view of a preferred exemplary enhanced invention system embodiment illustrating the internal construction of the centrifugal advance major system components;

FIG. 186 illustrates a top left front exploded perspective isolation detail view of a preferred exemplary enhanced invention system embodiment illustrating the internal construction of the centrifugal advance major system components;

FIG. 187 illustrates a top right rear exploded perspective isolation detail view of a preferred exemplary enhanced invention system embodiment illustrating the internal construction of the centrifugal advance major system components;

FIG. 188 illustrates a top left rear exploded perspective isolation detail view of a preferred exemplary enhanced invention system embodiment illustrating the internal construction of the centrifugal advance major system components;

FIG. 189 illustrates a bottom right rear exploded perspective isolation detail view of a preferred exemplary enhanced invention system embodiment illustrating the internal construction of the centrifugal advance major system components;

FIG. 190 illustrates a bottom right front exploded perspective isolation detail view of a preferred exemplary enhanced invention system embodiment illustrating the internal construction of the centrifugal advance major system components;

FIG. 191 illustrates a bottom left rear exploded perspective isolation detail view of a preferred exemplary enhanced invention system embodiment illustrating the internal construction of the centrifugal advance major system components;

FIG. 192 illustrates a bottom right rear exploded perspective isolation detail view of a preferred exemplary enhanced invention system embodiment illustrating the internal construction of the centrifugal advance major system components;

FIG. 193 illustrates a bottom right cut-away perspective isolation detail view of a preferred exemplary enhanced invention system embodiment illustrating the internal construction of the centrifugal advance major system components;

FIG. 194 illustrates a bottom left cut-away perspective isolation detail view of a preferred exemplary enhanced invention system embodiment illustrating the internal construction of the centrifugal advance major system components;

FIG. 195 illustrates a top right front cut-away perspective isolation detail view of a preferred exemplary enhanced invention system embodiment illustrating the internal construction of the centrifugal advance major system components;

FIG. 196 illustrates a top left front cut-away perspective isolation detail view of a preferred exemplary enhanced invention system embodiment illustrating the internal construction of the centrifugal advance major system components;

FIG. 197 illustrates a front cut-away perspective isolation detail view of a preferred exemplary enhanced invention system embodiment illustrating the internal construction of the centrifugal advance major system components;

FIG. 198 illustrates a front perspective isolation detail view of a preferred exemplary enhanced invention system embodiment illustrating the internal construction of the centrifugal advance spring major system components;

FIG. 199 illustrates a front perspective isolation detail view of a preferred exemplary enhanced invention system embodiment illustrating the internal construction of the centrifugal advance counter weight major system components;

FIG. 200 illustrates a front perspective isolation detail view of a preferred exemplary enhanced invention system embodiment illustrating the internal construction of the centrifugal advance plate major system components;

FIG. 201 illustrates a top left front perspective isometric assembly view of a preferred exemplary enhanced invention system embodiment illustrating the internal construction of the cooling channel spool (CCS) apparatus embodiment;

FIG. 202 illustrates a top right rear perspective isometric assembly view of a preferred exemplary enhanced invention system embodiment illustrating the internal construction of the cooling channel spool (CCS) apparatus embodiment;

FIG. 203 illustrates a top left rear perspective isometric assembly view of a preferred exemplary enhanced invention system embodiment illustrating the internal construction of the cooling channel spool (CCS) apparatus embodiment;

FIG. 204 illustrates a top right front perspective isometric assembly view of a preferred exemplary enhanced invention system embodiment illustrating the internal construction of the cooling channel spool (CCS) apparatus embodiment;

FIG. 205 illustrates a bottom left front perspective isometric assembly view of a preferred exemplary enhanced invention system embodiment illustrating the internal construction of the cooling channel spool (CCS) apparatus embodiment;

FIG. 206 illustrates a bottom right rear perspective isometric assembly view of a preferred exemplary enhanced invention system embodiment illustrating the internal construction of the cooling channel spool (CCS) apparatus embodiment;

FIG. 207 illustrates a bottom left rear perspective isometric assembly view of a preferred exemplary enhanced invention system embodiment illustrating the internal construction of the cooling channel spool (CCS) apparatus embodiment;

FIG. 208 illustrates a bottom right front perspective isometric assembly view of a preferred exemplary enhanced invention system embodiment illustrating the internal construction of the cooling channel spool (CCS) apparatus embodiment;

FIG. 209 illustrates a top left front perspective isometric assembly view of a preferred exemplary enhanced invention system embodiment illustrating the internal construction of the cooling channel spool (CCS) apparatus embodiment;

FIG. 210 illustrates a top right front perspective isometric assembly view of a preferred exemplary enhanced invention system embodiment illustrating the internal construction of the cooling channel spool (CCS) apparatus embodiment;

FIG. 211 illustrates a top left rear perspective isometric assembly view of a preferred exemplary enhanced invention system embodiment illustrating the internal construction of the cooling channel spool (CCS) apparatus embodiment;

FIG. 212 illustrates a top right rear perspective assembly view of a preferred exemplary enhanced invention system embodiment illustrating the internal construction of the cooling channel spool (CCS) apparatus embodiment;

FIG. 213 illustrates a bottom left rear perspective isometric assembly view of a preferred exemplary enhanced invention system embodiment illustrating the internal construction of the cooling channel spool (CCS) apparatus embodiment;

FIG. 214 illustrates a bottom right rear perspective isometric assembly view of a preferred exemplary enhanced invention system embodiment illustrating the internal construction of the cooling channel spool (CCS) apparatus embodiment;

FIG. 215 illustrates a bottom left front perspective isometric assembly view of a preferred exemplary enhanced invention system embodiment illustrating the internal construction of the cooling channel spool (CCS) apparatus embodiment;

FIG. 216 illustrates a bottom right front perspective isometric assembly view of a preferred exemplary enhanced invention system embodiment illustrating the internal construction of the cooling channel spool (CCS) apparatus embodiment;

FIG. 217 illustrates a top left rear perspective isometric assembly view of a preferred exemplary enhanced invention system embodiment illustrating the internal construction of the forced induction (FIN) apparatus embodiment;

FIG. 218 illustrates a top right front perspective isometric assembly view of a preferred exemplary enhanced invention system embodiment illustrating the internal construction of the forced induction (FIN) apparatus embodiment;

FIG. 219 illustrates a top left front perspective isometric assembly view of a preferred exemplary enhanced invention system embodiment illustrating the internal construction of the forced induction (FIN) apparatus embodiment;

FIG. 220 illustrates a top right rear perspective isometric assembly view of a preferred exemplary enhanced invention system embodiment illustrating the internal construction of the forced induction (FIN) apparatus embodiment;

FIG. 221 illustrates a bottom left rear perspective isometric assembly view of a preferred exemplary enhanced invention system embodiment illustrating the internal construction of the forced induction (FIN) apparatus embodiment;

FIG. 222 illustrates a bottom right front perspective isometric assembly view of a preferred exemplary enhanced invention system embodiment illustrating the internal construction of the forced induction (FIN) apparatus embodiment;

FIG. 223 illustrates a bottom left front perspective isometric assembly view of a preferred exemplary enhanced invention system embodiment illustrating the internal construction of the forced induction (FIN) apparatus embodiment;

FIG. 224 illustrates a bottom right rear perspective isometric assembly view of a preferred exemplary enhanced invention system embodiment illustrating the internal construction of the forced induction (FIN) apparatus embodiment;

FIG. 225 illustrates a top right front perspective isometric assembly view of a preferred exemplary enhanced invention system embodiment illustrating the unitized construction of the cooling channel spool and centrifugal impeller of the forced induction (FIN) apparatus embodiment;

FIG. 226 illustrates a top left front perspective isometric assembly view of a preferred exemplary enhanced invention system embodiment illustrating the unitized construction of the cooling channel spool and centrifugal impeller of the forced induction (FIN) apparatus embodiment;

FIG. 227 illustrates a top right rear perspective isometric assembly view of a preferred exemplary enhanced invention system embodiment illustrating the unitized construction of the cooling channel spool and centrifugal impeller of the forced induction (FIN) apparatus embodiment;

FIG. 228 illustrates a top left rear perspective isometric assembly view of a preferred exemplary enhanced invention system embodiment illustrating the unitized construction of the cooling channel spool and centrifugal impeller of the forced induction (FIN) apparatus embodiment;

FIG. 229 illustrates a bottom right front perspective isometric assembly view of a preferred exemplary enhanced invention system embodiment illustrating the unitized construction of the cooling channel spool and centrifugal impeller of the forced induction (FIN) apparatus embodiment;

FIG. 230 illustrates a bottom left front perspective isometric assembly view of a preferred exemplary enhanced invention system embodiment illustrating the unitized construction of the cooling channel spool and centrifugal impeller of the forced induction (FIN) apparatus embodiment;

FIG. 231 illustrates a bottom right rear perspective isometric assembly view of a preferred exemplary enhanced invention system embodiment illustrating the unitized construction of the cooling channel spool and centrifugal impeller of the forced induction (FIN) apparatus embodiment;

FIG. 232 illustrates a bottom left rear perspective isometric assembly view of a preferred exemplary enhanced invention system embodiment illustrating the unitized construction of the cooling channel spool and centrifugal impeller of the forced induction (FIN) apparatus embodiment;

FIG. 233 illustrates a top right top perspective isometric assembly view of a preferred exemplary enhanced invention system embodiment illustrating the unitized construction of the forced discharge (FID) apparatus embodiment;

FIG. 234 illustrates a top left front perspective isometric assembly view of a preferred exemplary enhanced invention system embodiment illustrating the unitized construction of the forced discharge (FID) apparatus embodiment;

FIG. 235 illustrates a bottom right front perspective isometric assembly view of a preferred exemplary enhanced invention system embodiment illustrating the unitized construction of the forced discharge (FID) apparatus embodiment;

FIG. 236 illustrates a bottom left front perspective isometric assembly view of a preferred exemplary enhanced invention system embodiment illustrating the unitized construction of the forced discharge (FID) apparatus embodiment;

FIG. 237 illustrates a back view of a preferred exemplary enhanced invention system embodiment illustrating the unitized construction of the forced discharge (FID) apparatus embodiment;

FIG. 238 illustrates a front view of a preferred exemplary enhanced invention system embodiment illustrating the unitized construction of the forced discharge (FID) apparatus embodiment;

FIG. 239 illustrates a perspective isometric assembly view of a preferred exemplary enhanced invention system embodiment illustrating the exhaust spiral impeller construction of the forced discharge (FID) apparatus embodiment;

FIG. 240 illustrates a perspective isometric assembly view of a preferred exemplary enhanced invention system embodiment illustrating the exhaust spiral impeller construction of the forced discharge (FID) apparatus embodiment;

FIG. 241 illustrates an isometric perspective view of a preferred exemplary invention system embodiment fixed valve port depicting the annular sectored conical frustum (ACF) shaped port system embodiment (view 1 of 10);

FIG. 242 illustrates an isometric perspective view of a preferred exemplary invention system embodiment fixed valve port depicting the annular sectored conical frustum (ACF) shaped port system embodiment (view 2 of 10);

FIG. 243 illustrates an isometric perspective view of a preferred exemplary invention system embodiment fixed valve port depicting the annular sectored conical frustum (ACF) shaped port system embodiment (view 3 of 10);

FIG. 244 illustrates an isometric perspective view of a preferred exemplary invention system embodiment fixed valve port depicting the annular sectored conical frustum (ACF) shaped port system embodiment (view 4 of 10);

FIG. 245 illustrates an isometric perspective view of a preferred exemplary invention system embodiment fixed valve port depicting the annular sectored conical frustum (ACF) shaped port system embodiment (view 5 of 10);

FIG. 246 illustrates an isometric perspective view of a preferred exemplary invention system embodiment fixed valve port depicting the annular sectored conical frustum (ACF) shaped port system embodiment (view 6 of 10);

FIG. 247 illustrates an isometric perspective view of a preferred exemplary invention system embodiment fixed valve port depicting the annular sectored conical frustum (ACF) shaped port system embodiment (view 7 of 10);

FIG. 248 illustrates an isometric perspective view of a preferred exemplary invention system embodiment fixed valve port depicting the annular sectored conical frustum (ACF) shaped port system embodiment (view 8 of 10);

FIG. 249 illustrates an isometric perspective view of a preferred exemplary invention system embodiment rotary valve port void depicting the annular sectored conical frustum (ACF) shaped port system embodiment (view 9 of 10);

FIG. 250 illustrates an isometric perspective view of a preferred exemplary invention system embodiment fixed valve port void depicting the annular sectored conical frustum (ACF) shaped port system embodiment (view 10 of 10);

FIG. 251 illustrates a front perspective view of the ACF shaped port opening geometry of the present preferred exemplary invention;

FIG. 252 illustrates a front perspective view of the port opening geometry of the POSH prior art example;

FIG. 253 illustrates a front perspective view of the port opening geometry of the DIROSS prior art example;

FIG. 254 illustrates a front perspective view of the port opening geometry of the PATTAKOS prior art example;

FIG. 255 illustrates a front perspective view of the port opening geometry comparisons of the present preferred exemplary invention system embodiment and the prior art examples of POSH, DIROSS and PATTAKOS; and FIG. 256. illustrates the front and rear perspective views of a preferred exemplary enhanced invention system embodiment illustrating the intake or exhaust spiral channel cooling spool (ICP)/(ECP) of the cooling channel spool (CCS) apparatus embodiment.

DESCRIPTION OF THE PRESENTLY PREFERRED EXEMPLARY EMBODIMENTS

While this invention is susceptible of embodiment in many different forms, it is shown in the drawings and will herein be described in detailed description as the preferred embodiment of the present invention with the understanding that the present disclosure is to be considered as an exemplification of the principles of the invention and is not intended to limit the broad aspect of the invention to the embodiment as illustrated.

The numerous innovative teachings of the present application will be described with particular reference to the presently preferred embodiment, wherein these innovative teachings are advantageously applied to the particular inherent problems of an INTERNAL COMBUSTION ENGINE VALVE SYSTEM AND METHOD. However, it should be understood that this embodiment is only one example of the many advantageous uses of the innovative teachings herein.

Where practicable, in the present invention a conceptualization termed as molecular "follow-the-leader" (FTL) methodization is adhered to and further enhanced. The FTL characteristic dictates that molecular gas elements tend to follow or be carried along by the effects of the preceding molecular gas elements in front of it, all adhering to the same forces acting upon them. This use of the FTL method seeks to enable a more volumetrically effective atomization of the intake of the air-fuel mixture and more complete exhaust of the combusted air-fuel mixture during the Intake, Compression, Power, and Exhaust strokes of an ICE. This FTL conceptualization is not limitive. The variance will affect the rate of molecular tumbling exercised on the gas molecules which in turn affect the inherent inundated/emanated atomization flow characteristic of the combustion chamber as is well known to those skilled in the art.

In general, statements made in the specification of the present application do not necessarily limit any of the various claimed inventions. Moreover, some statements may apply to some inventive features but not to others.

Views Not Limitive

The present invention anticipates a rudimentary implementation as well as a number of enhanced implementations. For clarity of presentation, the views presented for the rudimentary implementation may not depict features in the enhanced implementation. Some common aspects of engine construction such as intake manifolds and exhaust manifolds have been omitted from the presentation of the rudimentary implementation as they are well known to those skilled in the art and not critical to the overall invention design. It should be noted that the power drive train (PDT) remains consistent whether in the rudimentary configurations or in the enhanced configurations of the present preferred exemplary invention.

Bearings/Bushings Not Limitive

While the present invention as depicted does not explicitly incorporate bearings and/or bushings in the design, the present invention is not limited to designs that do not incorporate these elements. One skilled in the art will readily incorporate these elements as necessary based on the application context of the invention.

While not explicitly depicted in the drawings, the present invention may incorporate a number of bearings and/or bushings in the design. These elements are well known to those skilled in the art and will not be detailed herein. However, a brief description of their operation in this context follows below.

Bushings or bearings occur wherever there are two surfaces that meet to form an axle and axle shaft configuration or that there exists a condition wherein a positional/endplay regiment is required. Although they are not shown in the drawings, they are well known requirements in the industry.

In the disclosed configuration the first significant application of bearings would be on the RVD crankshaft (CRK) (1755). It should be noted that the enhancement features, i.e., (i) Cooling Channel Spool (CCS), (ii) Centrifugal Advance (CAD), (iii) Forced Induction (FIN) and (iv) Forced Discharge (FID) obviously can be combined in some fashion so as to unitize the operational performance and compact them together in a more functional space. In the depiction of this invention, an elaboration exploding them out to a large size was done to affect clarity and understanding of the inherent concepts. Because of this factor, bearings or bushings would be required to maintain the balanced regiment of the crankshaft and to control unwanted endplay. These bearings or bushings that control the crankshafts endplay are common and well known to those skilled in the industry.

The incorporation of pressurized oil lubricated roller bearings are used in areas where specific placement and balancing are regimented. Such placement areas on the present invention configuration are common to every component where the output shaft passes through that component which is also given the task of specific positional placement of the output shaft in such a fashion as "not" to allow unwanted endplay due to the longer span of said output shaft.

Some of the critical but not limitive bearings and bushings locations are:

- the RVD axle shaft
- the upper and lower sections of the engine block which form the main journals of the engine block
- the Cooling Channel Spool spiral/straight channeled "Spool" components which form additional main journals
- the outer engine covers where there also must be a seal to retain the lubrication oils within the engine's crankcase casings Dependent upon the size of the application, a functional profile can be easily realized. The larger the size that an ICE is, the more the use of pressurized oil lubricated roller bearings. Transversely, the smaller the size of an ICE is, the more the use of bushings rather than the use of pressurized oil lubricated roller bearings.

It should also be easily recognized that the pressurized oil lubrication system also contributes to the overall cooling of the ICE. In common applications it is found that the pressurized oil lubrication system accounts for 20% to 30% of the cooling regiment in ICEs. This is why in some applications the pressurized oil lubrication system is tapped and an "Oil Cooler" is added to the cooling system's radiator or a separate oil cooling radiator is added to facilitate the required profiled level of cooling as is well known to those skilled in the art.

In smaller ICE applications, bushings are more commonly used due to the fact that there is less endplay because of the smaller and lighter parts than the greater mass of larger ICEs.

The surfaces of components which form the main journals in the present invention smaller size ICE can be machined to provide adequate bearing surfaces for these smaller ICEs.

Since many of the components of the present invention may be unitized together as one component, the placement of the main journal placements may vary based on the configuration of each model depicted herein.

Direct Injection Not Limitive

The present invention anticipates that many embodiments will incorporate direct injection of fuel into the combustion chamber. Exceptions to this would be an upstream injector provided for emission and operational profiles. The present invention depicted herein provides for direct injection in the various drawings and views.

Common ICE Components Not Detailed

A variety of common ICE components that may be utilized in the present invention are Not Depicted in detail and identified as ND or N/D, Not Used or NU within this document. This may include items such as spark plugs, fuel injectors, throttle plate, a variety of covers, etc. that are all well known to those skilled in the art.

POPPET Valve References

Within the context of the present invention disclosure references may be made to "poppet" valves and the like (herein identified as POPPET valves for clarity). The POPPET valve was invented in 1833 by American E. A. G. Young of the Newcastle and Frenchtown Railroad. Young had patented his idea, but the Patent Office fire of 1836 destroyed all records of it.

A POPPET valve (also called mushroom valve) is a valve typically used to control the timing and quantity of gas or vapor flow into an engine. It consists of a hole or open-ended chamber, usually round or oval in cross-section, and a plug, usually a disk shape on the end of a shaft known as a valve stem. The working end of this plug, the valve face, is typically ground at a 45° bevel to seal against a corresponding valve seat ground into the rim of the chamber being sealed. The shaft travels through a valve guide to maintain its alignment. A pressure differential on either side of the valve can assist or impair its performance. In exhaust applications higher pressure against the valve helps to seal the valve, and in intake applications lower pressure helps open the valve.

Seals/Rings Components Constructed From Grooves/Ridges

With respect to seals and rings described herein, the present invention anticipates that a variety of configurations may be utilized, including O-rings and seals conforming to irregular perimeter shapes of a variety of grooves and ridges depicted herein. One skilled in the art will recognize how these seals and/or rings should be constructed from the ridges and grooves depicted in the drawings that detail the present invention construction.

Unity of Construction Not Limitive

With respect to various depictions of components shown herein, it should understood that these components may be constructed using a number of individual pieces and that unity of construction is not essential to the teachings of the present invention. For example, the engine block (BLK) is shown as a unitized construction in the drawings depicted herein. However, this as well as other components depicted may be constructed of a number of pieces. One skilled in the art will recognize this aspect of the invention as described herein.

Symmetry Not Limitive

Many components within the present invention as disclosed herein may be identical or symmetric in construction. However, while disclosed as such, the present invention is not limited to this specific type of construction. It should be noted that only one depiction of identical components are depicted and are not necessarily indicative of their use in intake/exhaust configurations. Where similar components are depicted, it should be understood that the materials used are determinable by operational conditions such as temperature, pressure, formidability, indexing, unitizations, etc.

Exploded Views Ordering Not Limitive

The present invention as described herein may include a number of exploded views. The ordering of components in these exploded views may be ordered in a number of ways, not necessarily in the order of parts assembly. Thus, exploded views may not necessarily indicate assembly views. Specifically, the engine block and engine cylinder components may be exaggeratedly offset or enlarged in the overall views in order to promote clarity in their disclosure.

Intake/Exhaust Not Limitive

Various views of the present invention may incorporate intake on the left and exhaust on the right side of the figures or the reverse ordering. Due to the symmetry in many aspects of the present invention, one skilled in the art will be able to recognize and track the appropriate intake/exhaust configuration from the figures depicted.

REFERENCE DESIGNATORS NOMENCLATURE

Figure 12:
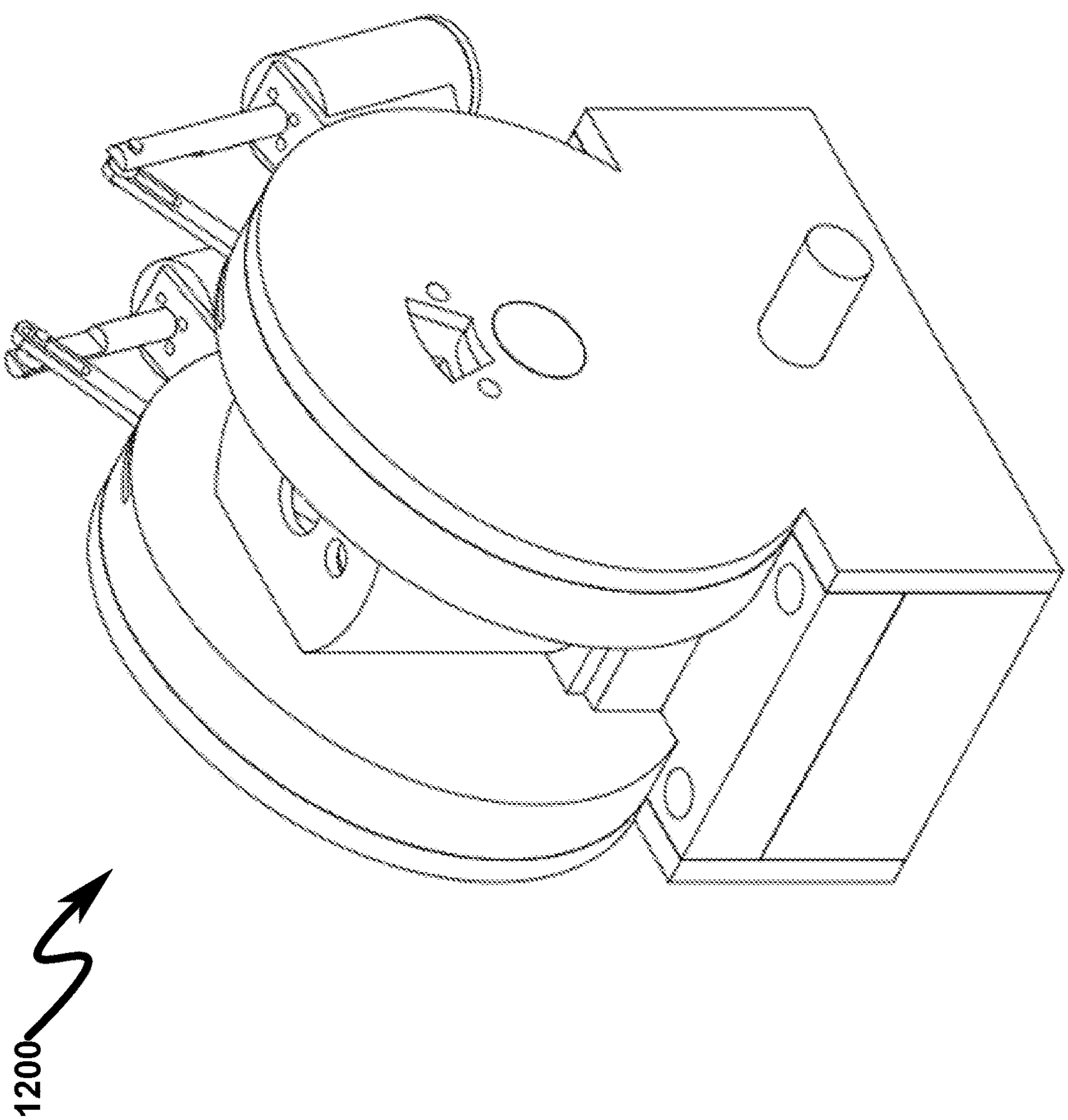
FIG. 12 illustrates a top left rear perspective isometric view of a preferred exemplary rudimentary invention system embodiment.
Figure 13:
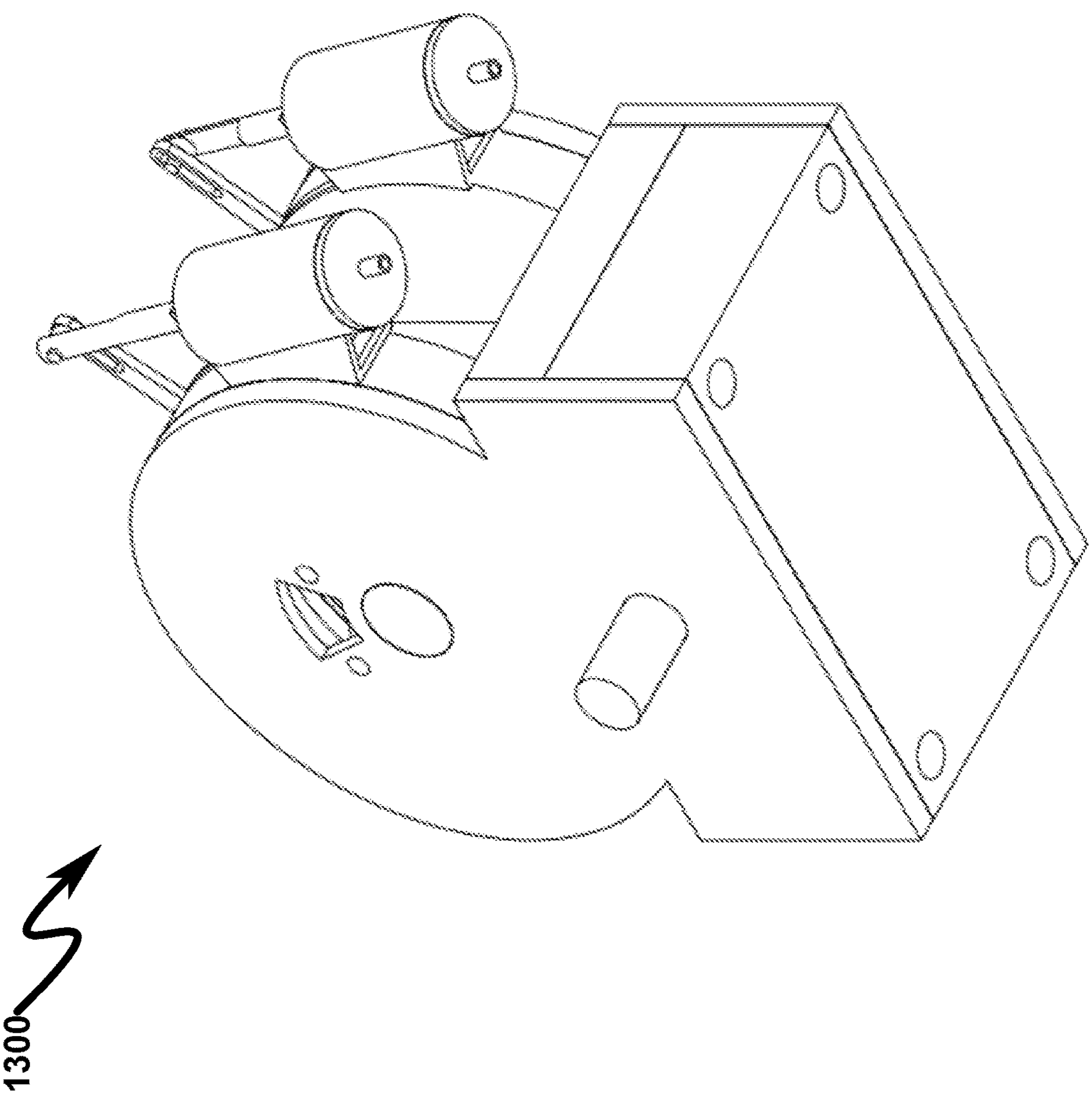
FIG. 13 illustrates a bottom right front perspective isometric view of a preferred exemplary rudimentary invention system embodiment.
Figure 14:
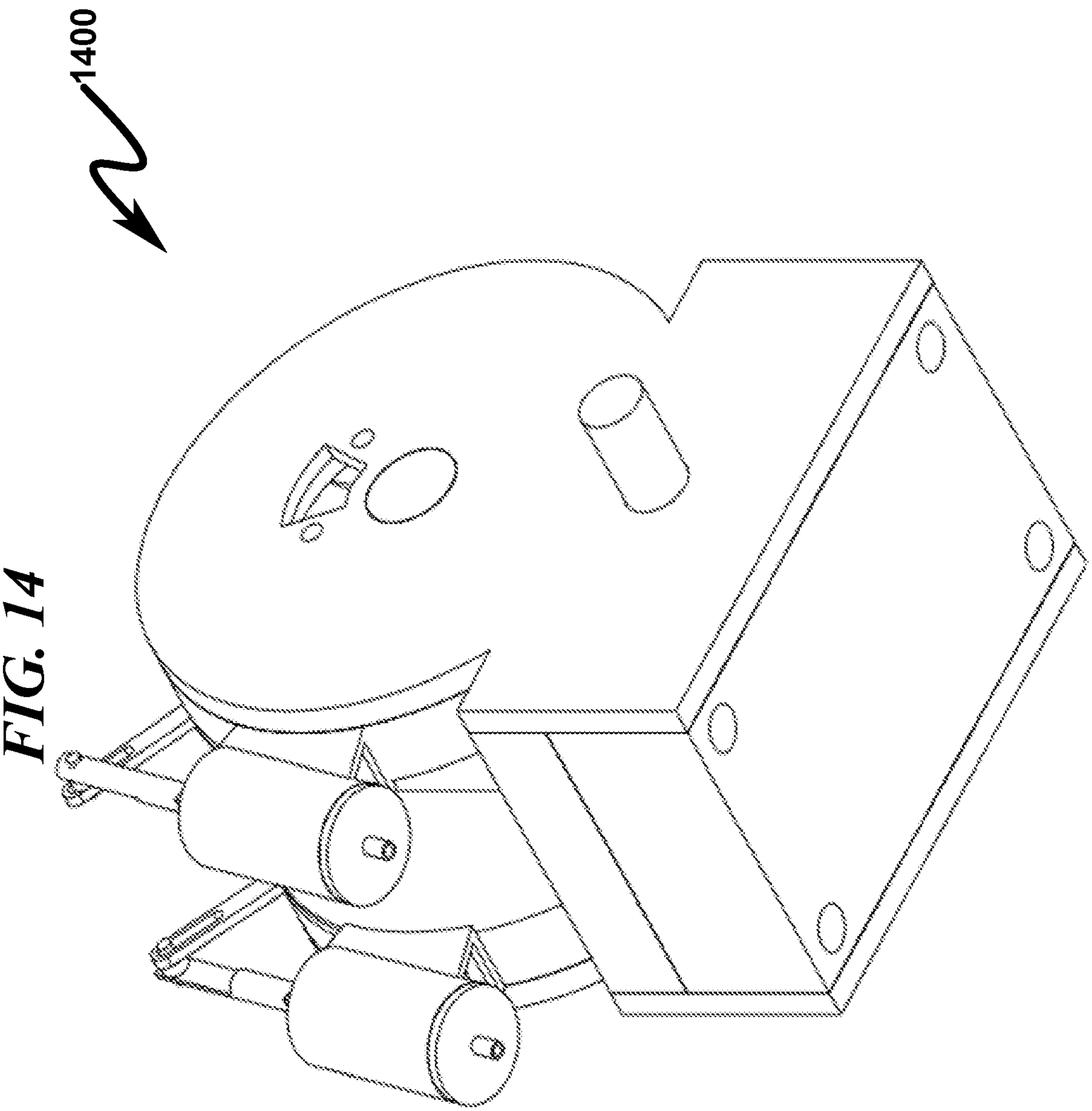
FIG. 14 illustrates a bottom right rear perspective isometric view of a preferred exemplary rudimentary invention system embodiment.
Figure 15:
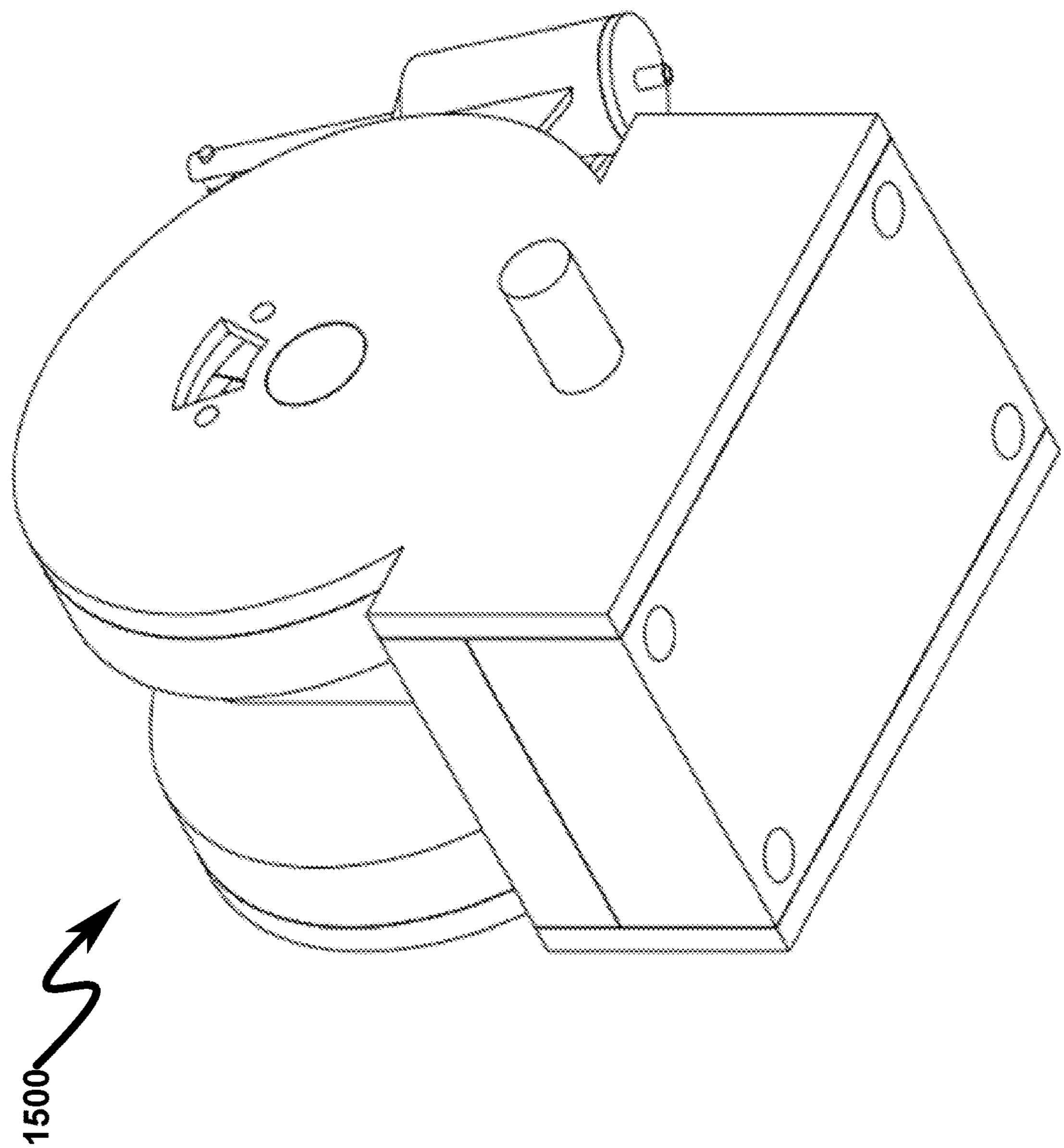
FIG. 15 illustrates a bottom left front perspective isometric view of a preferred exemplary rudimentary invention system embodiment.
Figure 123:
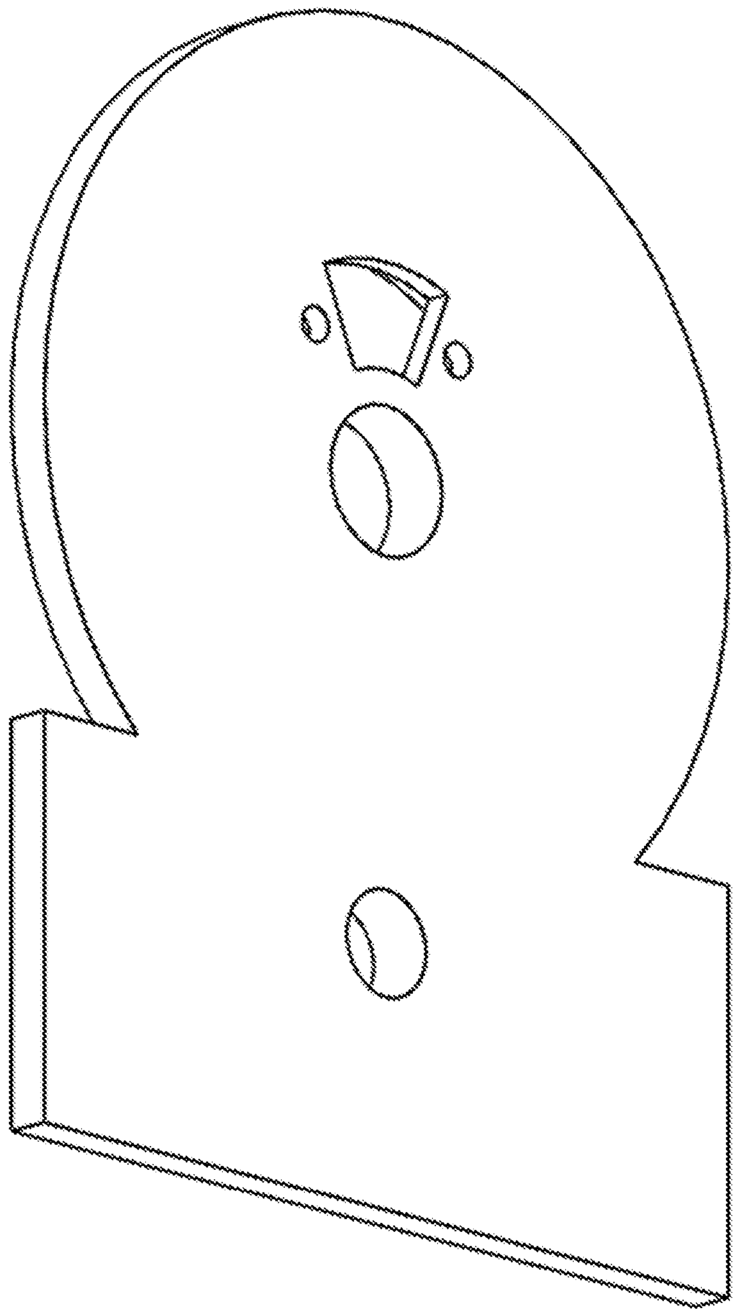
Figure 124:
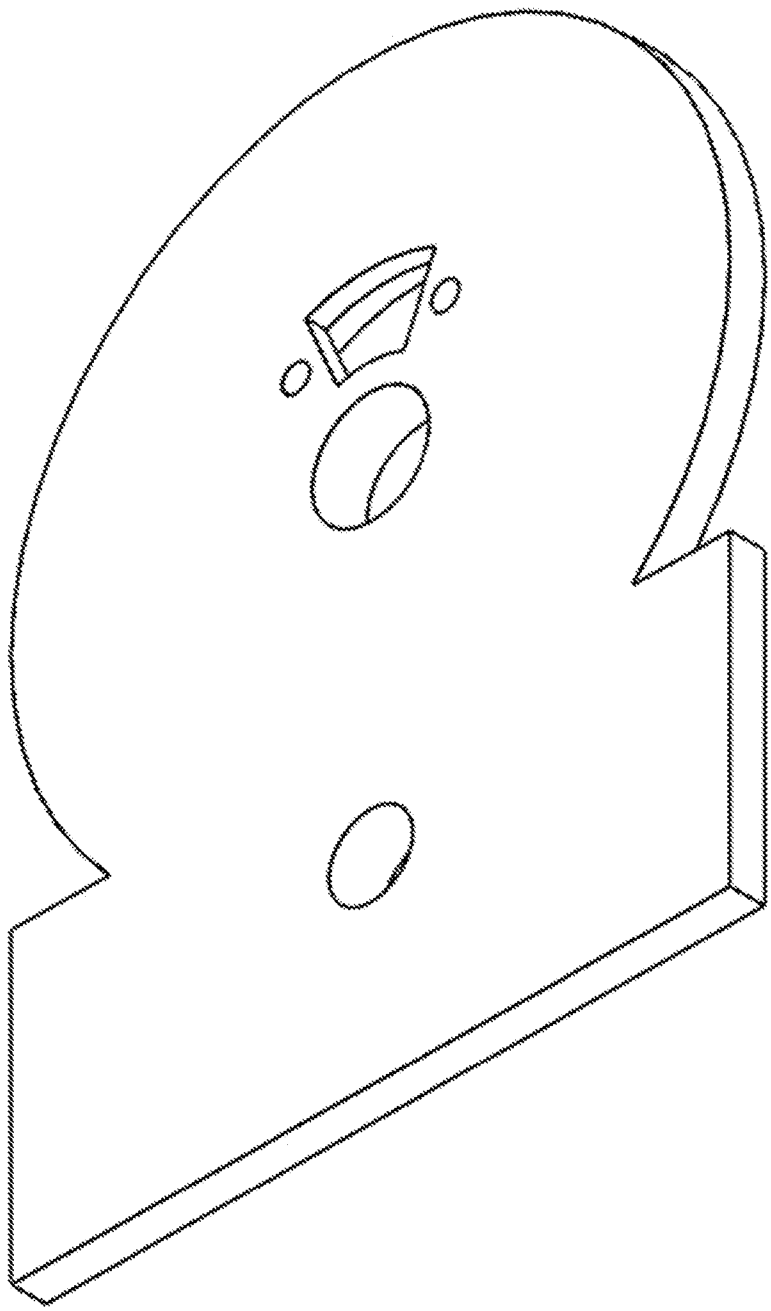
Figure 125:
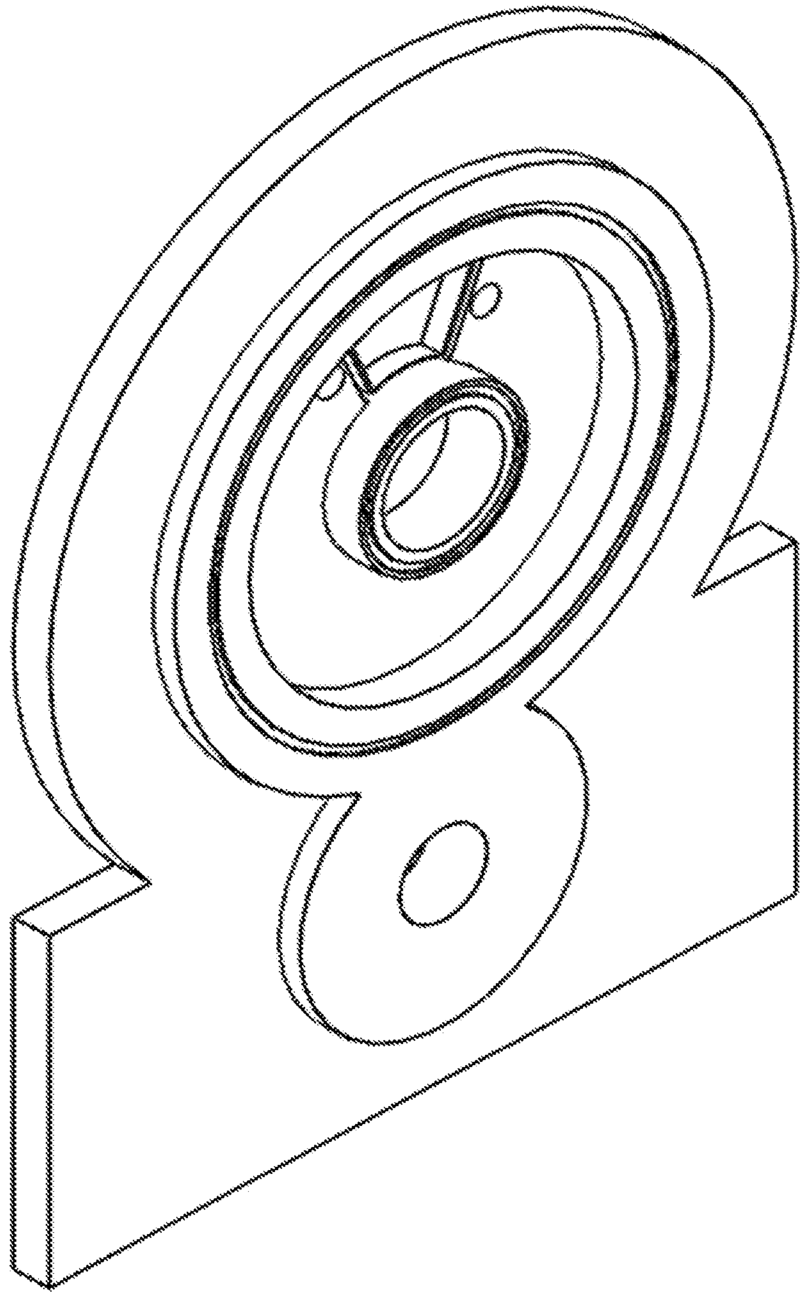
Figure 126:
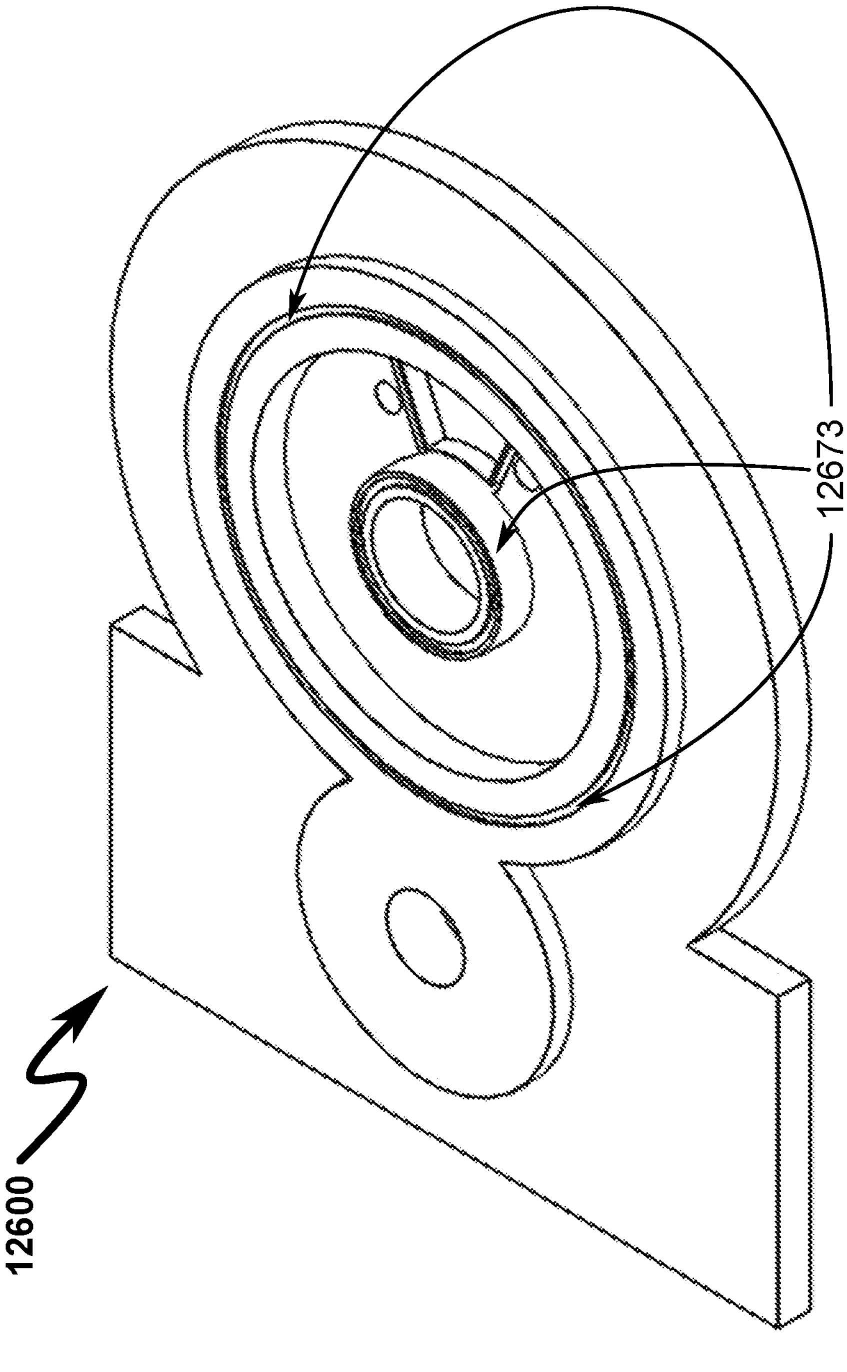
Figure 127:
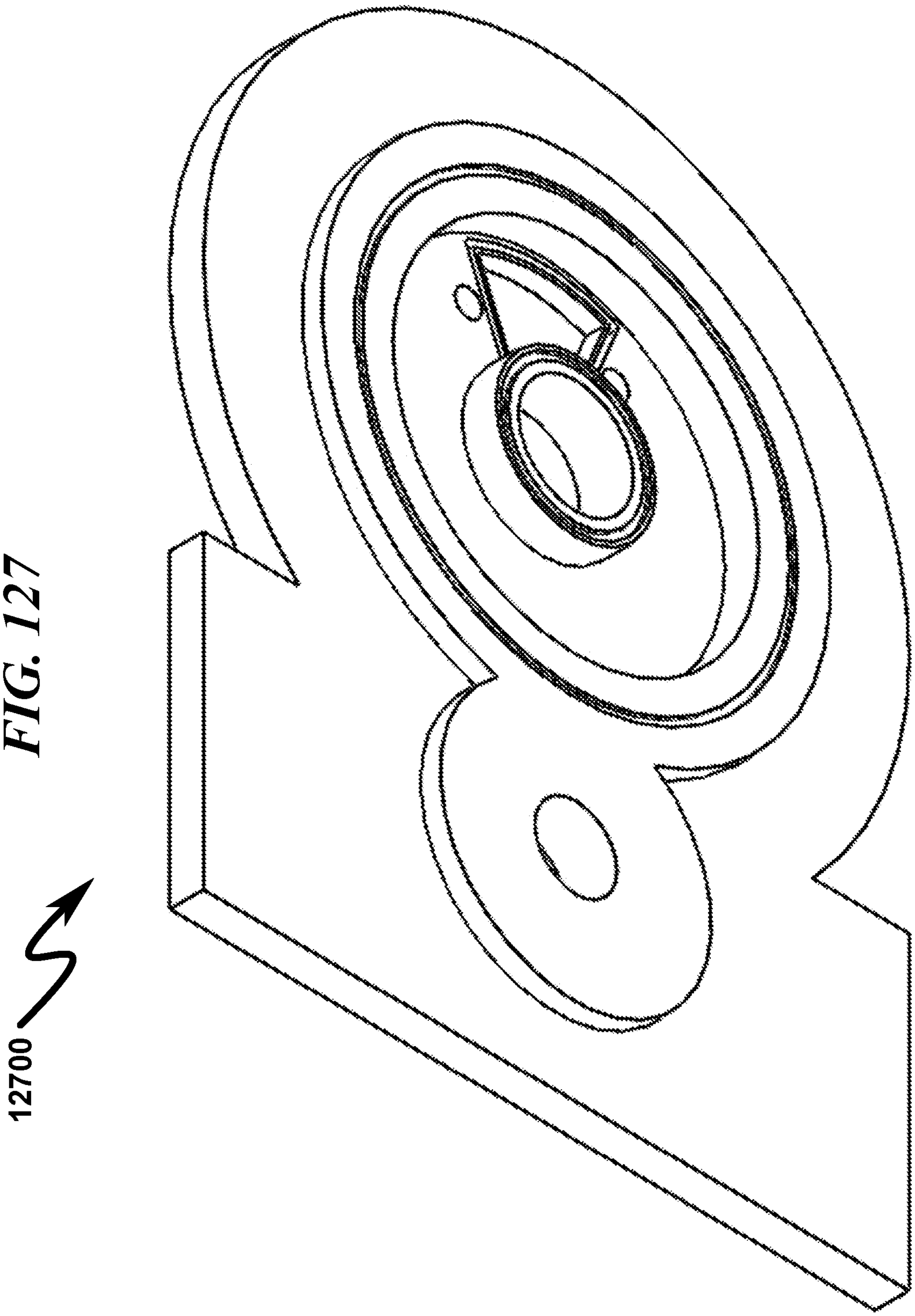

Generally speaking, the components detailed herein will be referred to using a NUMERICAL REFERENCE IDENTIFIER (e.g., (1234) or (12345)) comprising a 2-digit or 3-digit numerical prefix indicating a FIGURE NUMBER on which the element may be identified followed by a 2-digit PART IDENTIFIER for the assembly or part. For example, the NUMERICAL REFERENCE IDENTIFIER (1234) makes reference to PART IDENTIFIER 34 located in FIG. 12. Similarly, the NUMERICAL REFERENCE IDENTIFIER (12345) makes reference to PART IDENTIFIER 45 located in FIG. 123.

Generally speaking, if the NUMERICAL REFERENCE IDENTIFIER is of the form (XXYY) or (XXXYY), the reference is general and refers to any FIG. XX or FIG. XXX containing the PART IDENTIFIER "YY." For example, the NUMERICAL REFERENCE IDENTIFIER (XX34) makes reference to PART IDENTIFIER 34 located in any FIGURE. Similarly, the NUMERICAL REFERENCE IDENTIFIER (XXX45) makes reference to PART IDENTIFIER 45 located in any FIGURE.

In this manner the specific reference to the part and where it may be located can be uniquely specified, as well as allowing a reference to a specific figure in which the part is detailed. Various views of each assembly are systematically and uniformly provided to avoid any ambiguity as to the construction of each part or the related assembly. For clarity, most NUMERICAL REFERENCE IDENTIFIERs will only be listed on a single FIGURE. One skilled in the art will be able to discern the identity of each component given the various views presented.

Invention Component Nomenclature

The present invention discussed herein will utilize component/assembly nomenclature detailed in the tables below. Three-character acronyms (ANM) will be used to identify individual assemblies and parts within the assemblies and general acronyms to describe the functional characteristics about the said assemblies and parts.

General Acronyms

| ELEMENT/PART/ COMPONENT | Functional Characteristic | ANM | ID# |
|---|---|---|---|
| Engine | Internal Combustion Engine | ICE | — |
| Crankshaft | Longitudinal Rotation Axis | LRA | ND |
| Valve Port Shape | Annular Sectored Conical Frustum | ACF | 17 |
| Engine Block | Compressor Engine Block | CEB | ND |
| RVD comprising an RVP | Rotary Intake | RIN | ND |
| RVD comprising an RVP | Rotary Exhaust | REX | ND |
| MSV and Sealing | Intake Control | INC | ND |
| MSV and Sealing | Exhaust Control | EXC | ND |
| Intake side | Positive Crankcase Ventilation | ICV | ND |
| Exhaust side | Positive Crankcase Ventilation | ECV | ND |
| Methodization | Follow the Leader | FTL | ND |
| Engine timing | top dead center | TDC | ND |
| Engine timing | bottom dead center | BDC | ND |
| Engine timing retarded | after top dead center | ATDC | ND |
| Engine timing advanced | before top dead center | BTDC | ND |

Rudimentary 4-Stroke Engine Legend (0300)-(3200)

Figure 3:
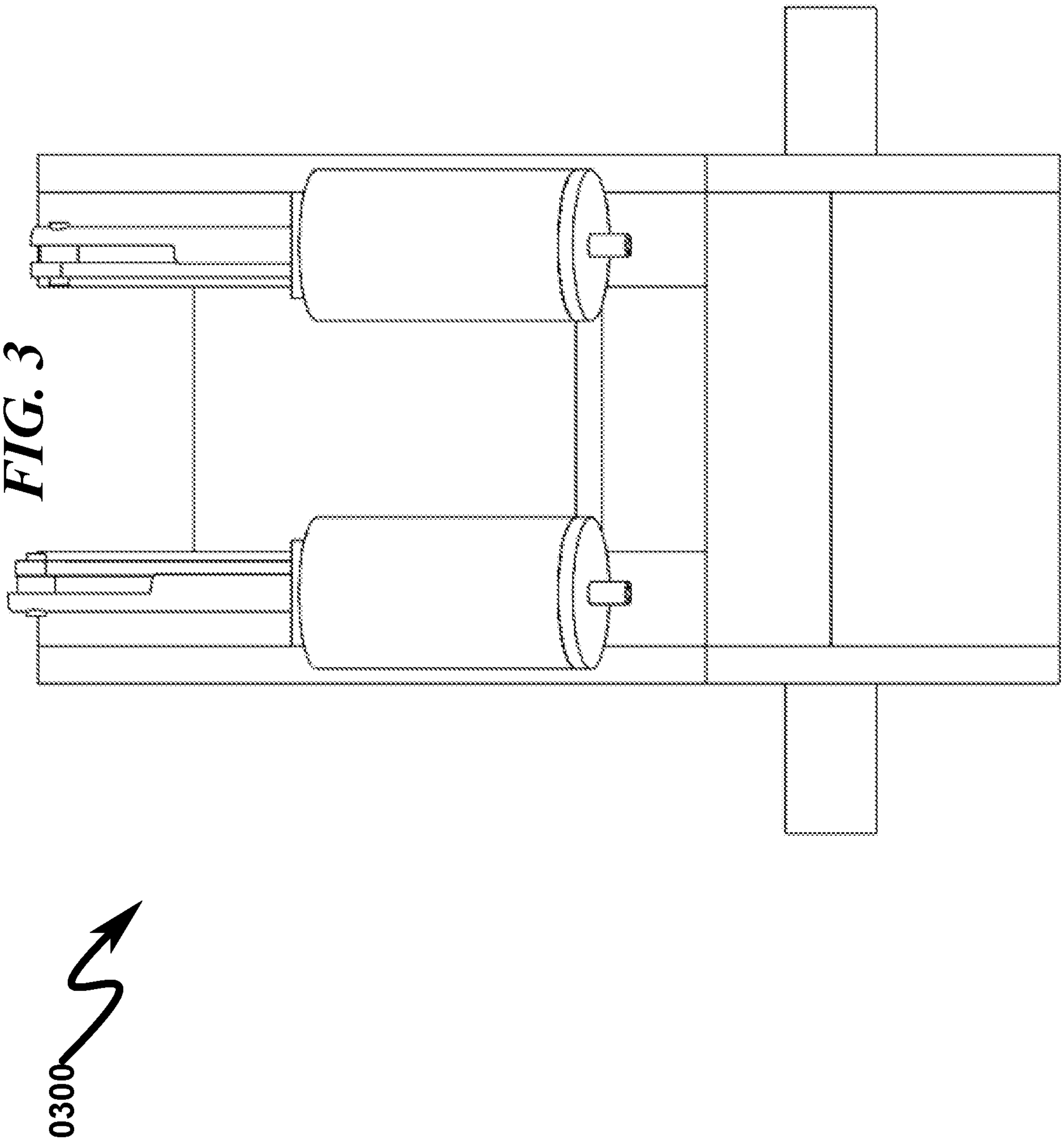
FIG. 3 illustrates a front view of a preferred exemplary rudimentary invention system embodiment.
Figure 4:
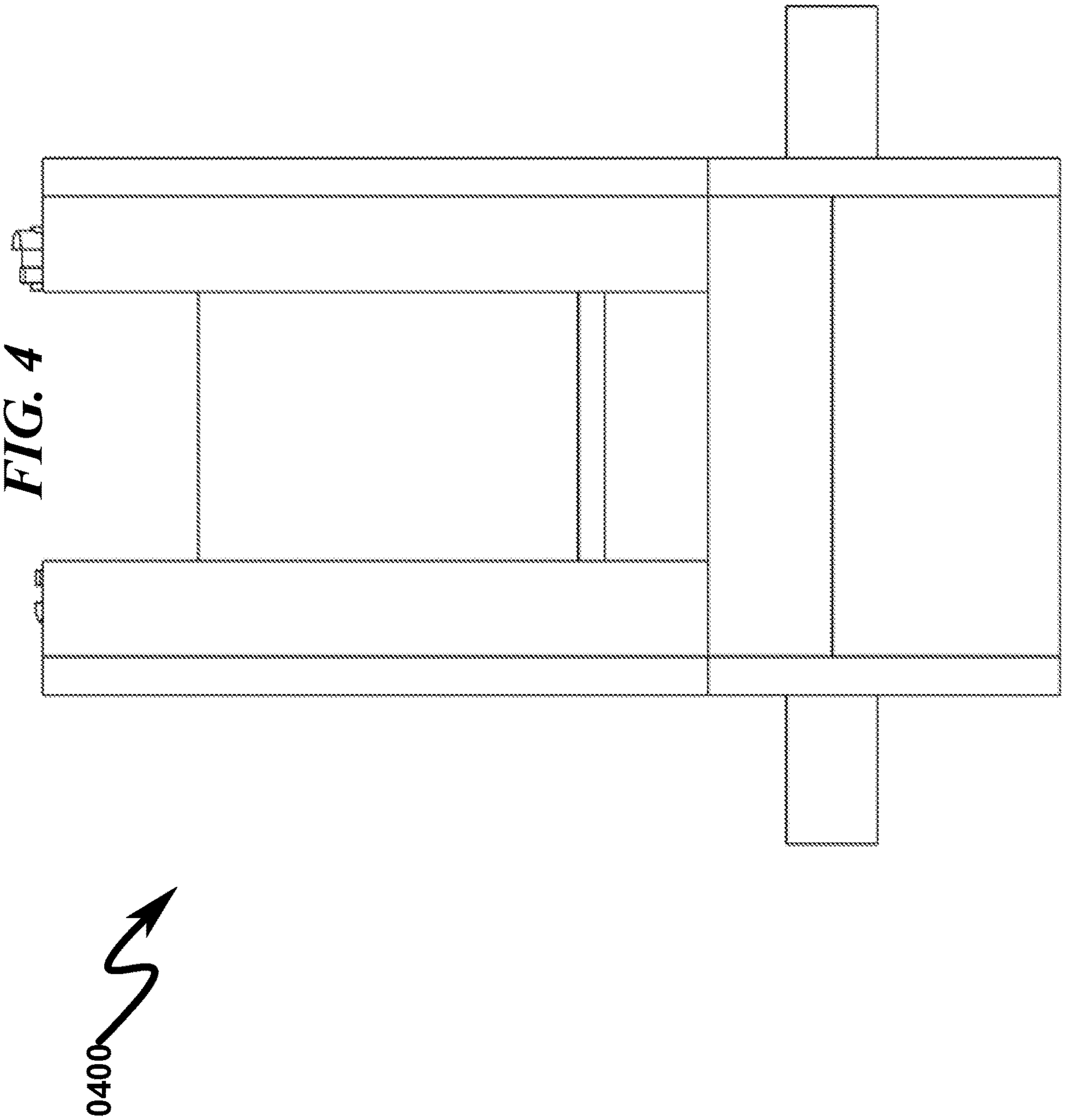
FIG. 4 illustrates a rear view of a preferred exemplary rudimentary invention system embodiment.
Figure 5:
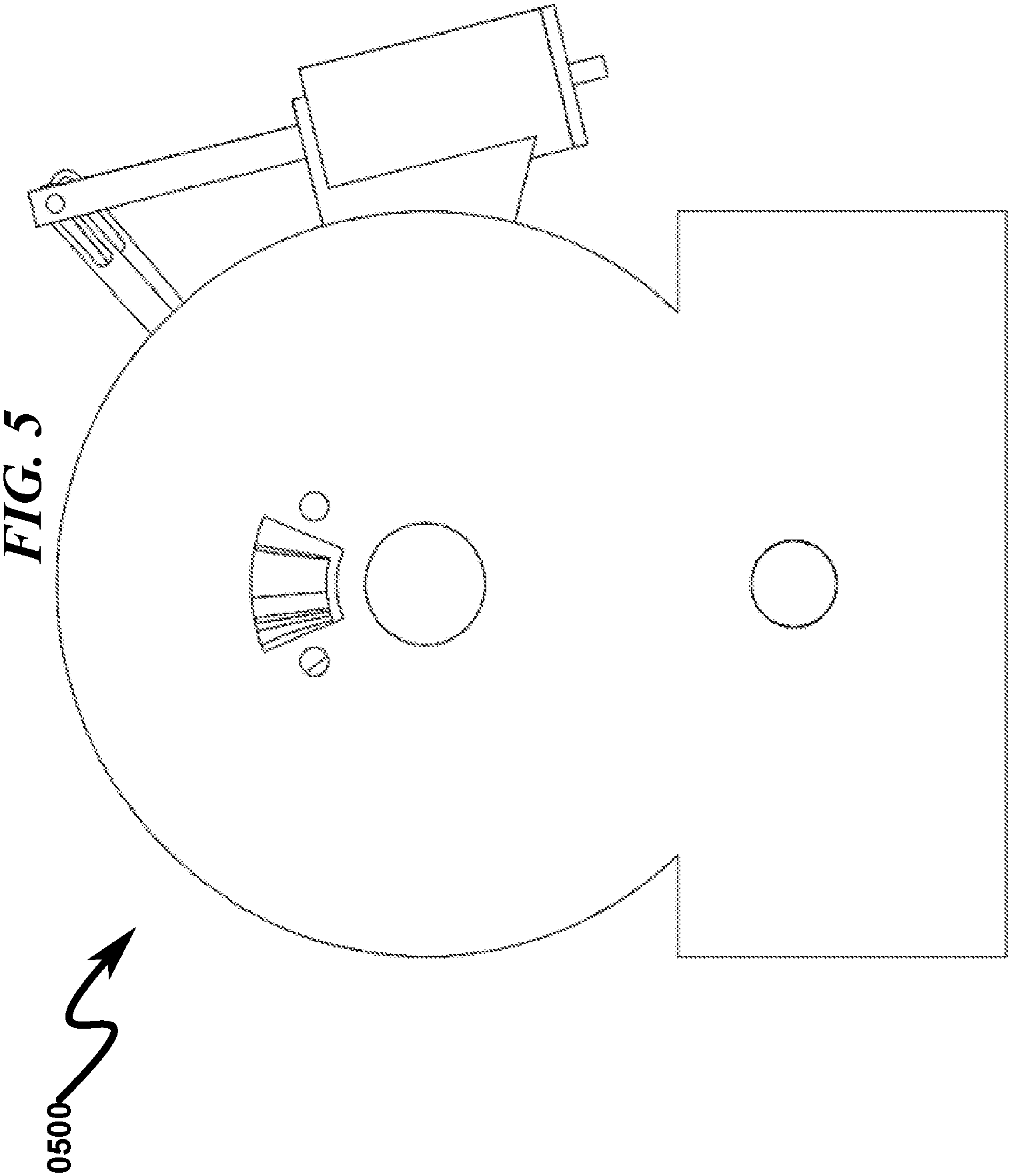
FIG. 5 illustrates a left side view of a preferred exemplary rudimentary invention system embodiment.
Figure 6:
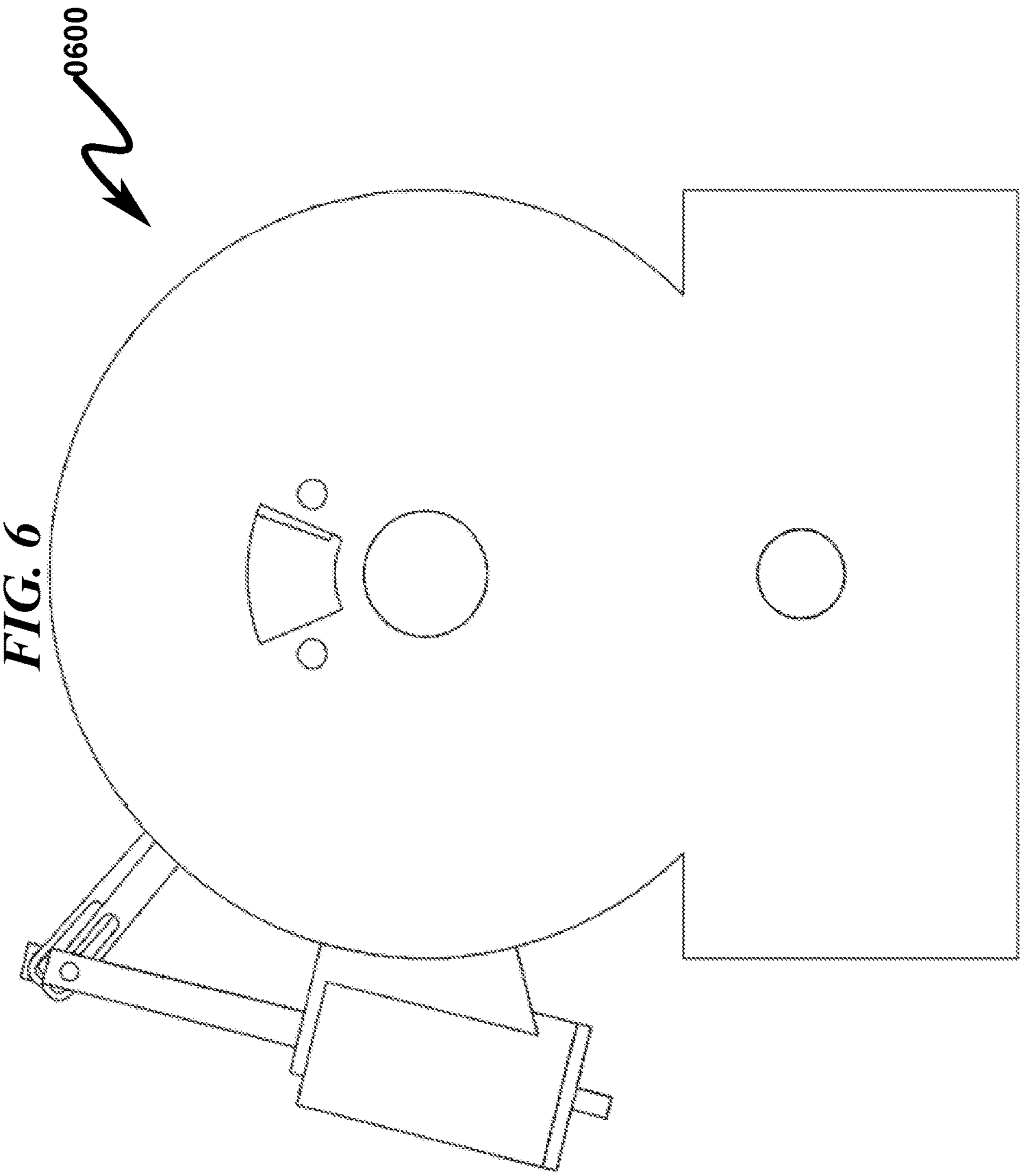
FIG. 6 illustrates a right side view of a preferred exemplary rudimentary invention system embodiment.
Figure 7:
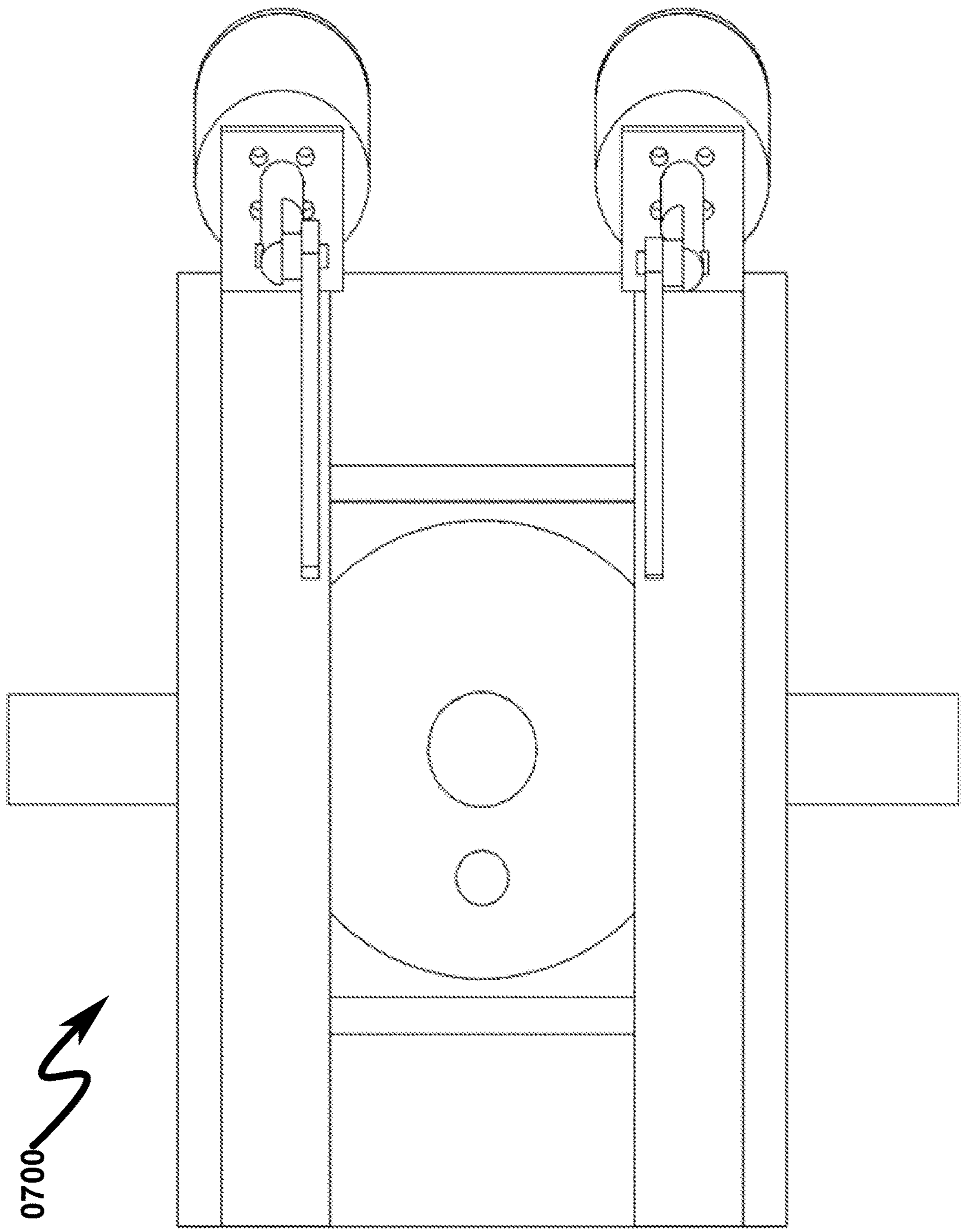
FIG. 7 illustrates a top view of a preferred exemplary rudimentary invention system embodiment.
Figure 8:
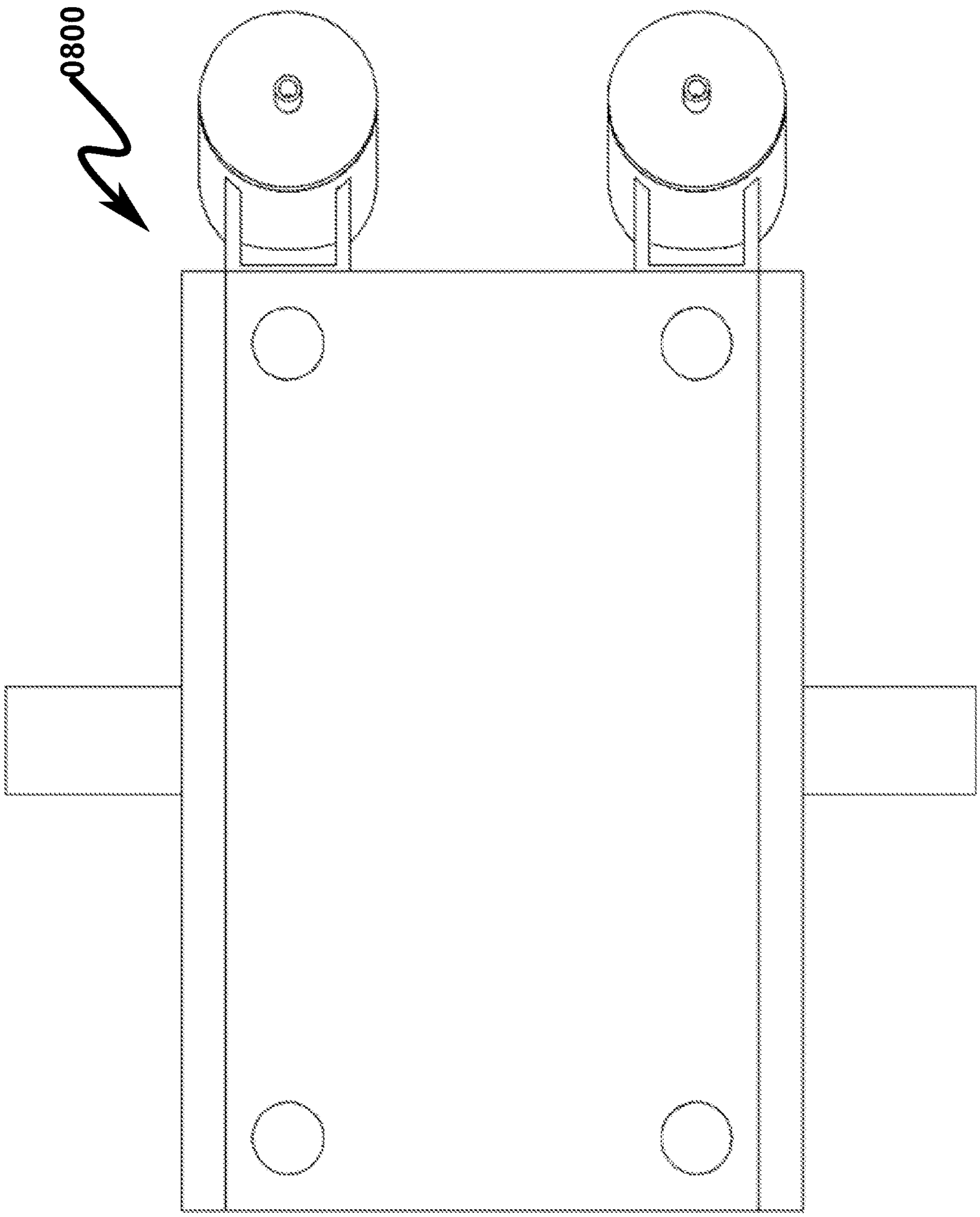
FIG. 8 illustrates a bottom view of a preferred exemplary rudimentary invention system embodiment.
Figure 9:
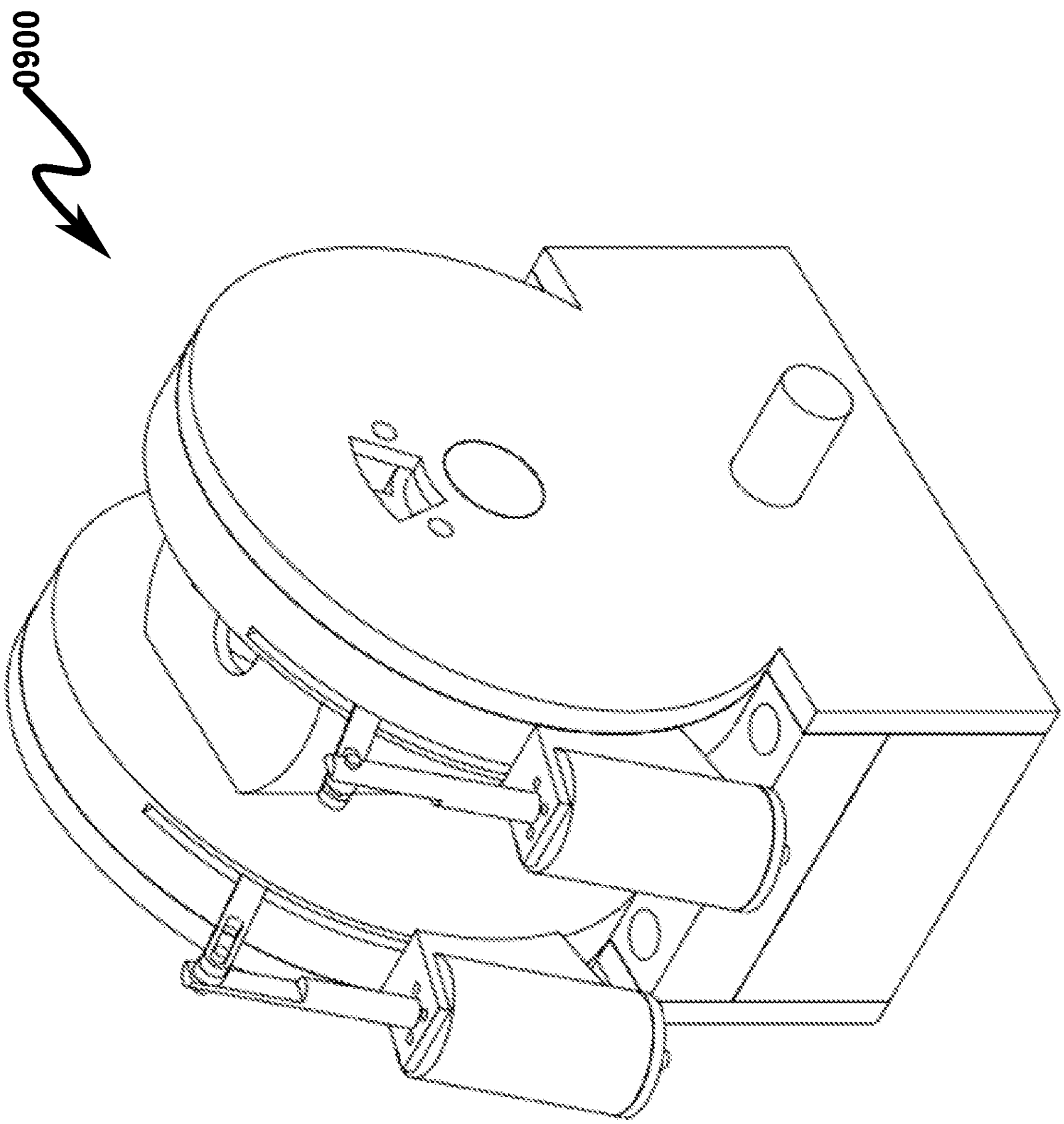
FIG. 9 illustrates a top right front perspective isometric view of a preferred exemplary rudimentary invention system embodiment.
Figure 10:
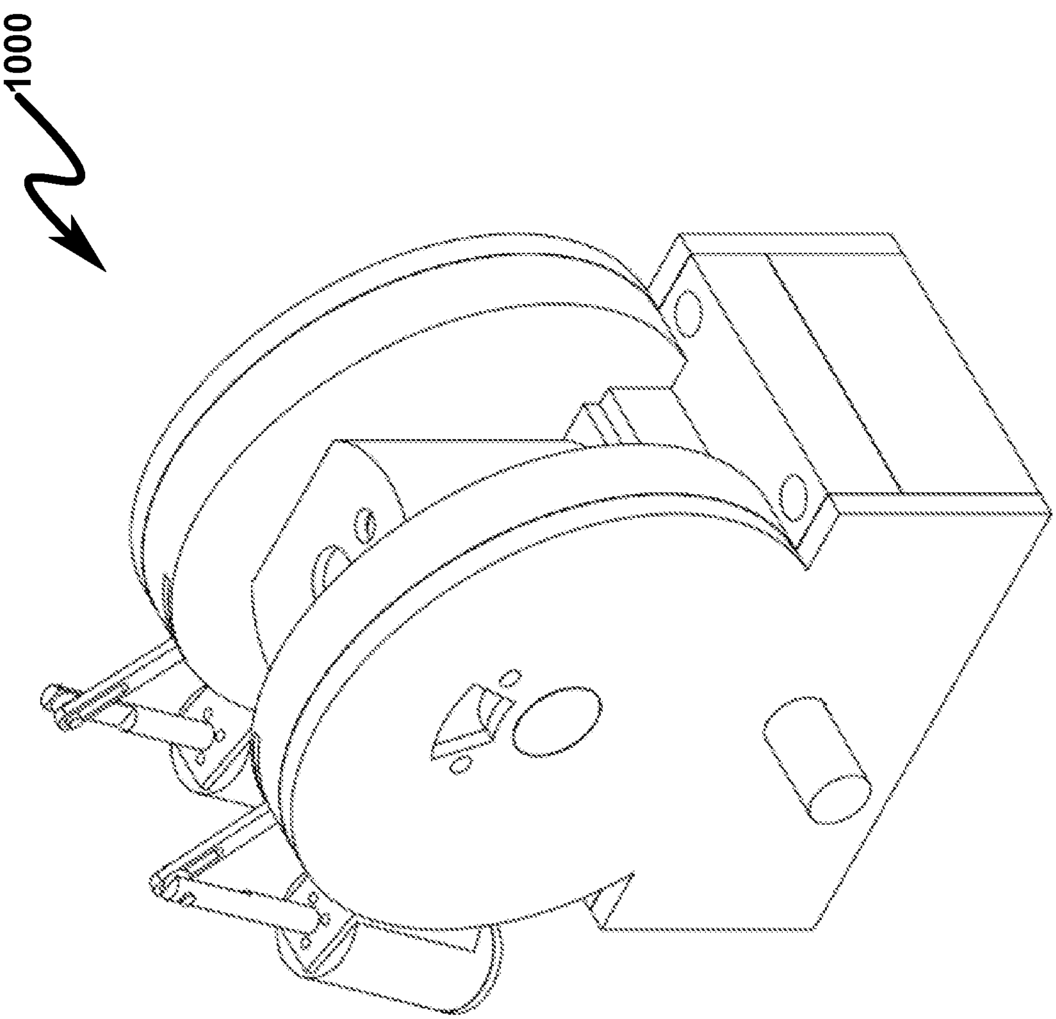
FIG. 10 illustrates a top right rear perspective isometric view of a preferred exemplary rudimentary invention system embodiment.
Figure 11:
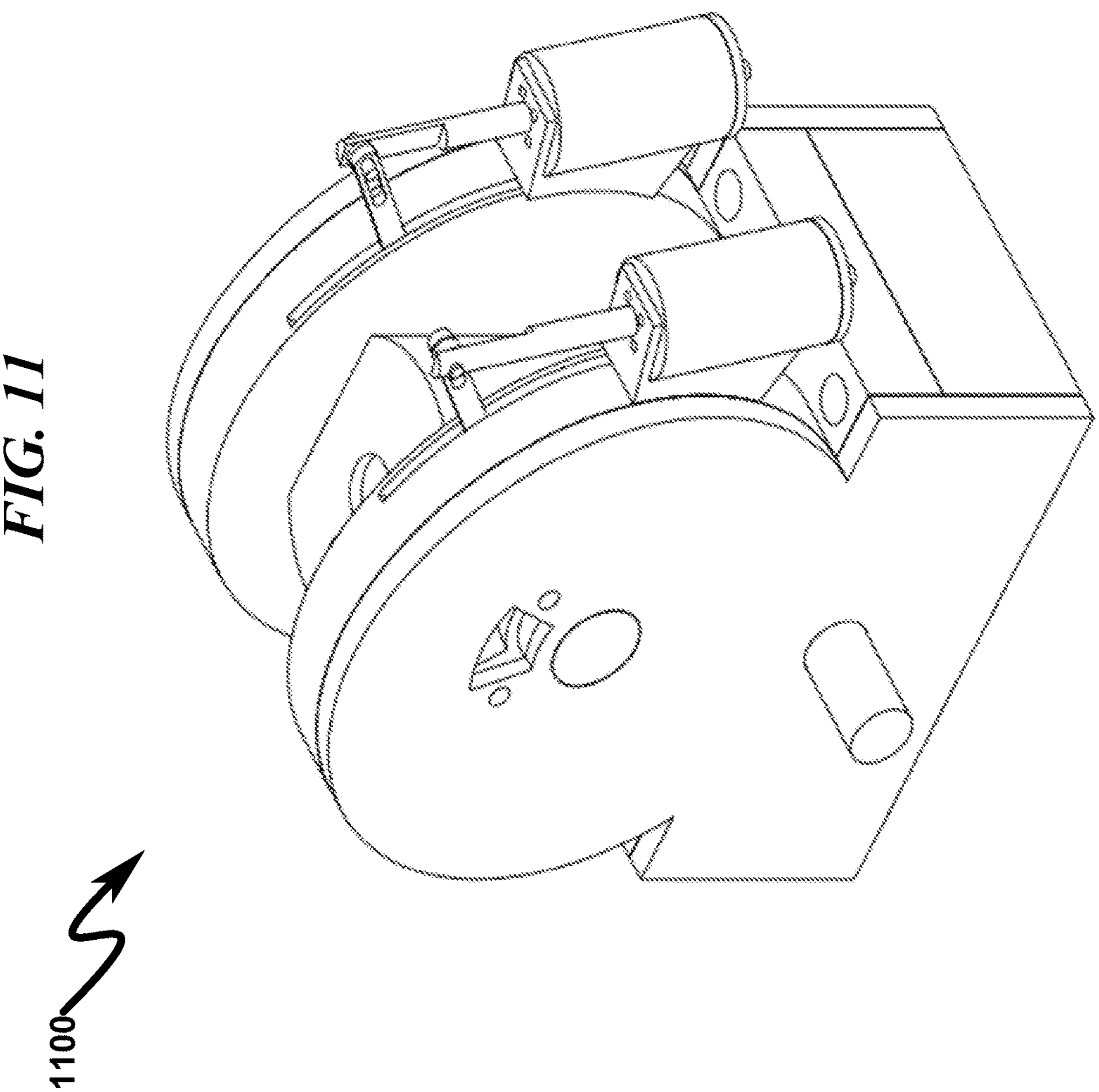
FIG. 11 illustrates a top left front perspective isometric view of a preferred exemplary rudimentary invention system embodiment.

The rudimentary 4-stroke engine is depicted in FIG. 3 (0300)-FIG. 32 (3200) and includes the elements detailed in the following table:

| RUDIMENTARY 4-STROKE COMPRESSOR ENGINE BLOCK (DEPICTED IN FIG. 3-FIG. 32) | | | | |
|---|---|---|---|---|
| ASSEMBLY/ MECHANISM | ELEMENT/PART/ COMPONENT | ANM | ID# | 1st LOC |
| Rudimentary Engine Block Accessories (BEA) (1700) (4900) | Spark Plug | SPK | C1 | ND |
| | Upstream Fuel Injector | UFI | C2 | ND |
| | Direct Fuel Injector | DFI | C3 | ND |
| | Positive Crankcase Ventilation | PCV | C4 | ND |
| | Throttle Plate Plenum | TPP | C5 | ND |
| | Throttle Plate Highrise | TPH | C6 | ND |
| | Piston | RPI | C7 | 17 |
| | Piston Connecting Rod | RPR | C8 | 17 |
| Intake Sealing (ISP) (1730) (4930) | Engine Block Grooves and Ridges | IGR | 31 | 82 |
| | Intake Engine Block Cover | IEC | 32 | 17 |
| | Engine Block Covers Grooves and Ridges | IGC | 33 | 122 |
| | Oil Seals | IOS | 34 | 97 |
| | Compression Rings | ICR | 35 | 97 |
| | Recessed Areas | IRA | 36 | 81 |
| | RVD Grooves and Ridges | IRG | 37 | 79 |
| | Intake Annular Sectored Conical Frustum Void | ISV | 38 | 17 |
| | Intake Manifold | INM | 39 | 49 |
| Intake Multi-Staged Valve (IMV) (1740) (4940) | Intake Fixed Port | IFP | 41 | 89 |
| | Intake MSV Blade | IMB | 42 | 113 |
| | Intake MSV Spring | IMS | 43 | 113 |
| | Intake MSV Diaphragm | IMD | 44 | 113 |
| | Intake MSV Housing | IMH | 45 | 105 |
| | Intake MSV Housing Cover | IMC | 46 | 113 |
| | Intake MSV Fixed Port | IMF | 47 | 81 |
| | Intake Boundary Layer Effect | IBE | 48 | 26 |
| Power Drive Train (PDT) (1750) (4950) | Intake Rotary Valve Port | IVP | 51 | 73 |
| | Intake Rotary Valve Disc | IVD | 52 | 17 |
| | Engine Block | BLK | 53 | 17 |
| | Combustion Chamber | CCH | 54 | 153 |
| | Crankshaft | CRK | 55 | 17 |
| | Crankcase Oil Reservoir | COR | 56 | 17 |
| | Engine Crankcase Cover | CKC | 57 | 17 |
| | Exhaust Rotary Valve Disc | EVD | 58 | 17 |
| | Exhaust Rotary Valve Port | EVP | 59 | 76 |
| Exhaust Multi-Staged Valve (EMV) (1760) (4960) | Exhaust Fixed Port | EFP | 61 | 90 |
| | Exhaust MSV Blade | EMB | 62 | 116 |
| | Exhaust MSV Spring | EMS | 63 | 116 |
| | Exhaust MSV Diaphragm | EMD | 64 | 116 |
| | Exhaust MSV Housing | EMH | 65 | 106 |
| | Exhaust MSV Housing Cover | EMC | 66 | 116 |
| | Exhaust MSV Fixed Port | EMF | 67 | 81 |
| | Exhaust Boundary Layer Effect | EBE | 68 | 25 |
| Exhaust Sealing (ESP) (1770) (4970) | Engine Block Grooves and Ridges | EGR | 71 | 87 |
| | Exhaust Engine Block Cover | EEC | 72 | 17 |
| | Engine Block Covers Grooves/Ridges | EGC | 73 | 126 |
| | Oil Seals | EOS | 74 | 104 |
| | Compression Rings | ECR | 75 | 104 |
| | Recessed Areas | ERA | 76 | 88 |
| | RVD Grooves and Ridges | ERG | 77 | 80 |
| | Exhaust Annular Sectored Conical Frustum Void | ESV | 78 | 17 |
| | Exhaust Manifold | EXM | 79 | 49 |

Enhanced Compressor Engine Legend (3300)-(6400)

Figure 33:
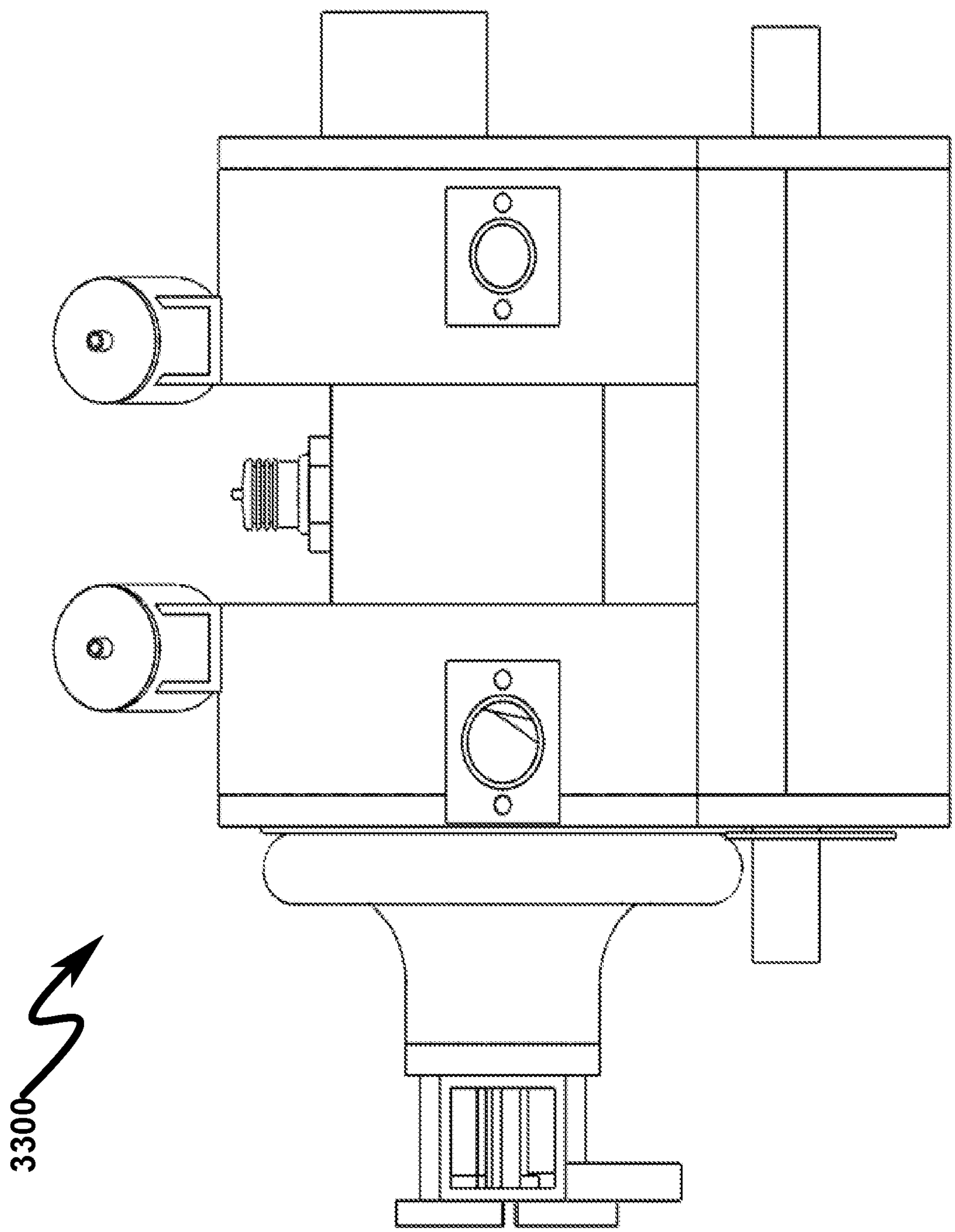
FIG. 33 illustrates a front view of a preferred exemplary enhanced invention system embodiment.
Figure 34:
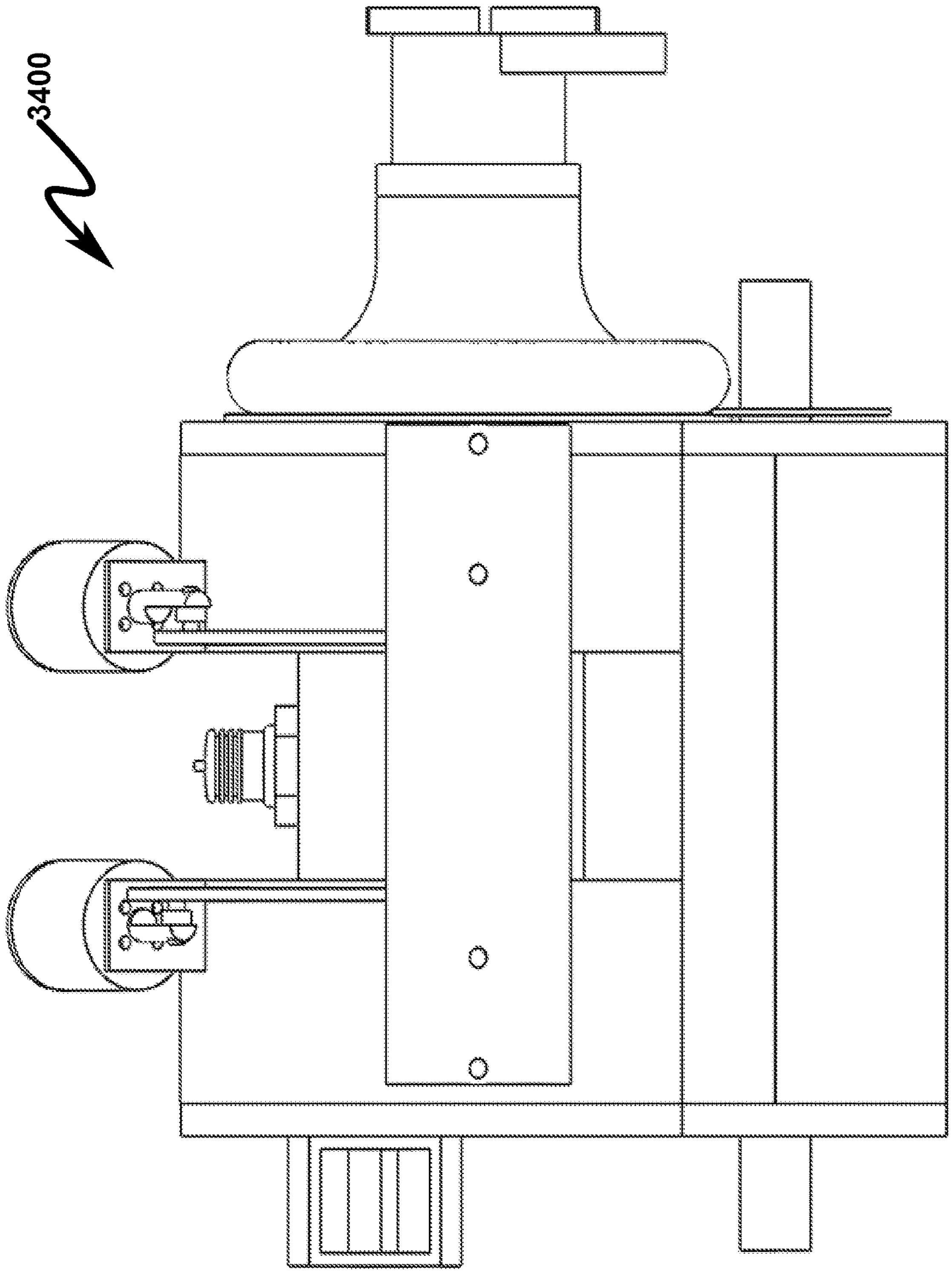
FIG. 34 illustrates a rear view of a preferred exemplary enhanced invention system embodiment.
Figure 35:
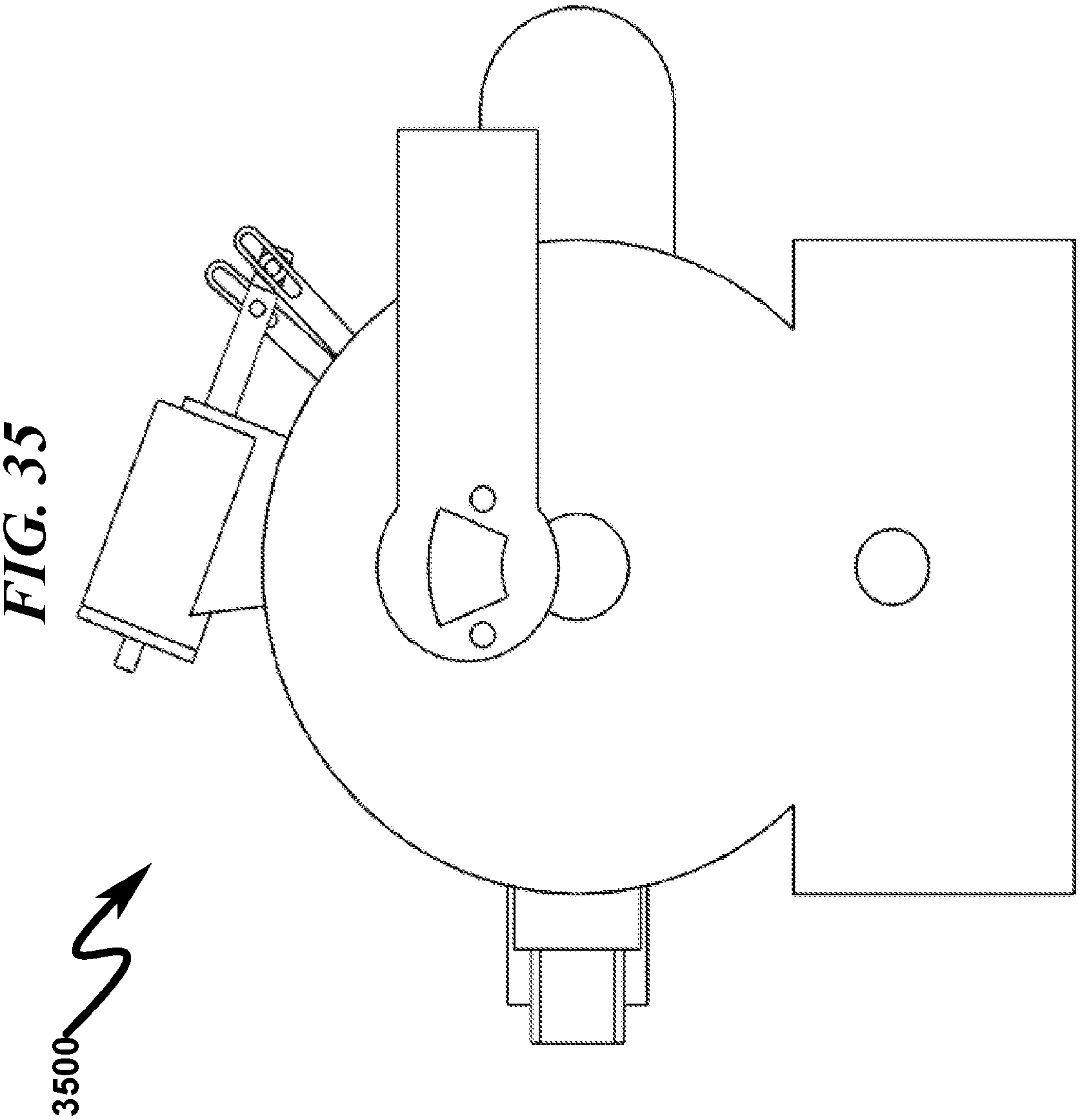
FIG. 35 illustrates a left side view of a preferred exemplary enhanced invention system embodiment.
Figure 36:
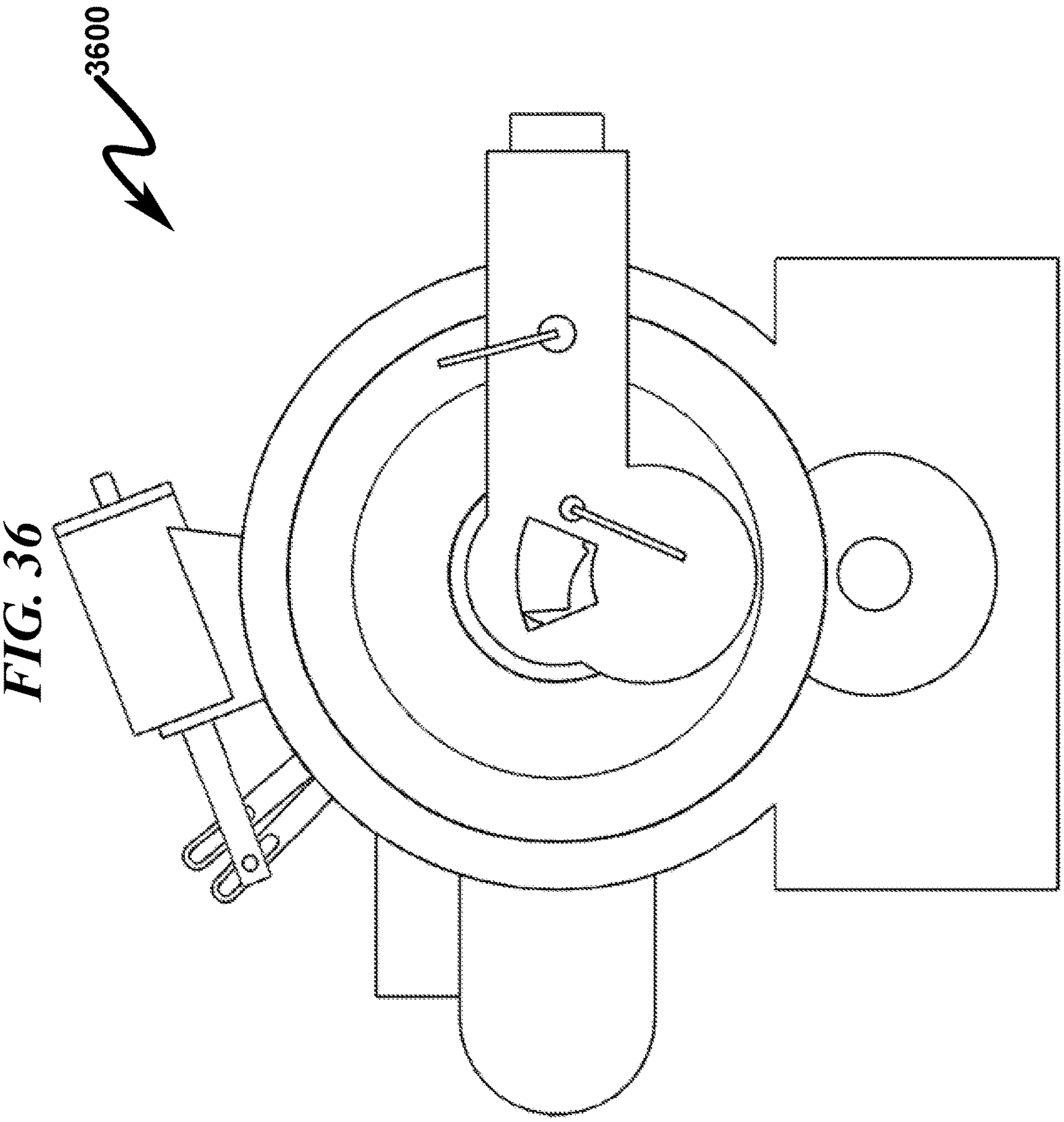
FIG. 36 illustrates a right side view of a preferred exemplary enhanced invention system embodiment.
Figure 37:
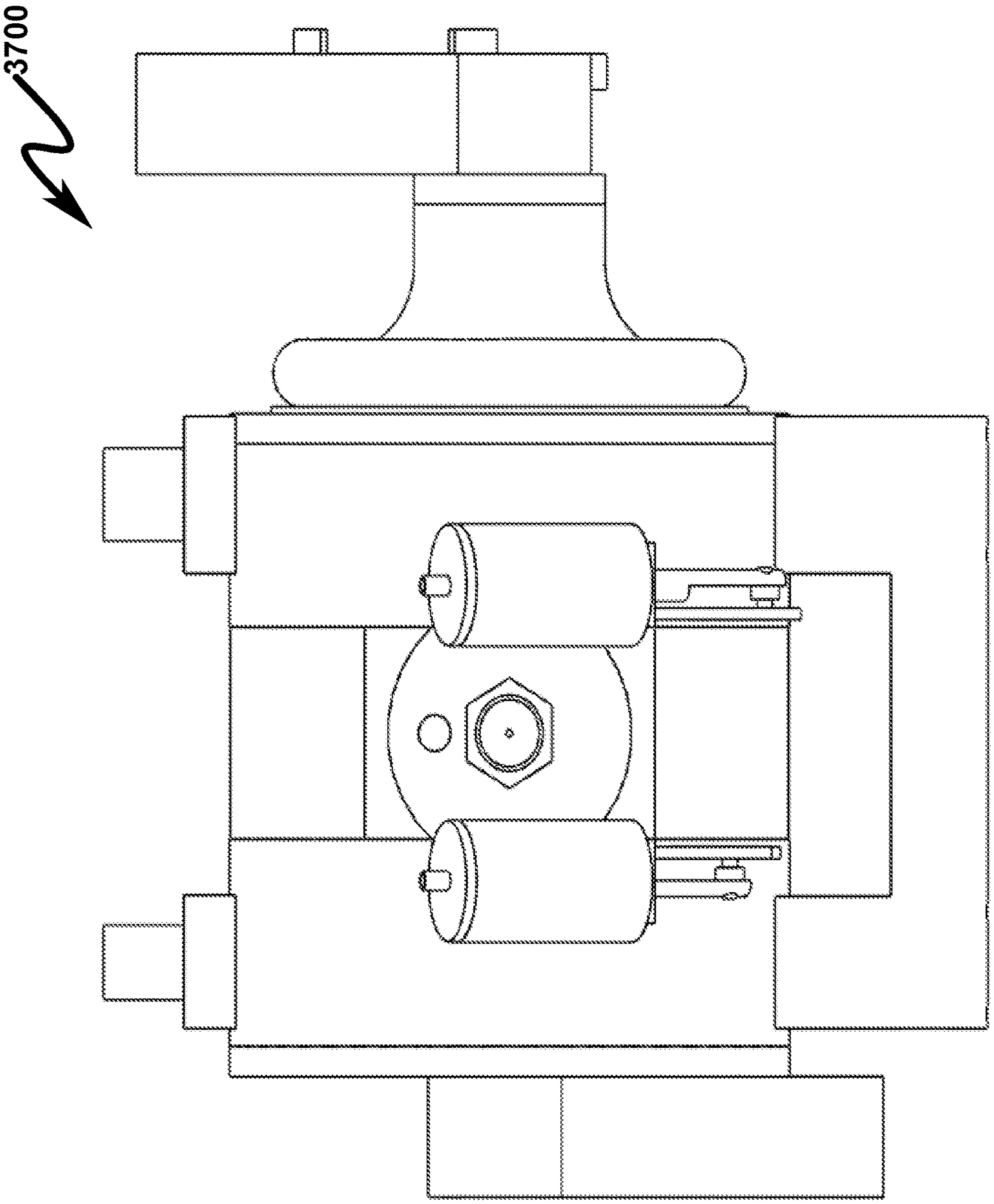
FIG. 37 illustrates a top view of a preferred exemplary enhanced invention system embodiment.
Figure 38:
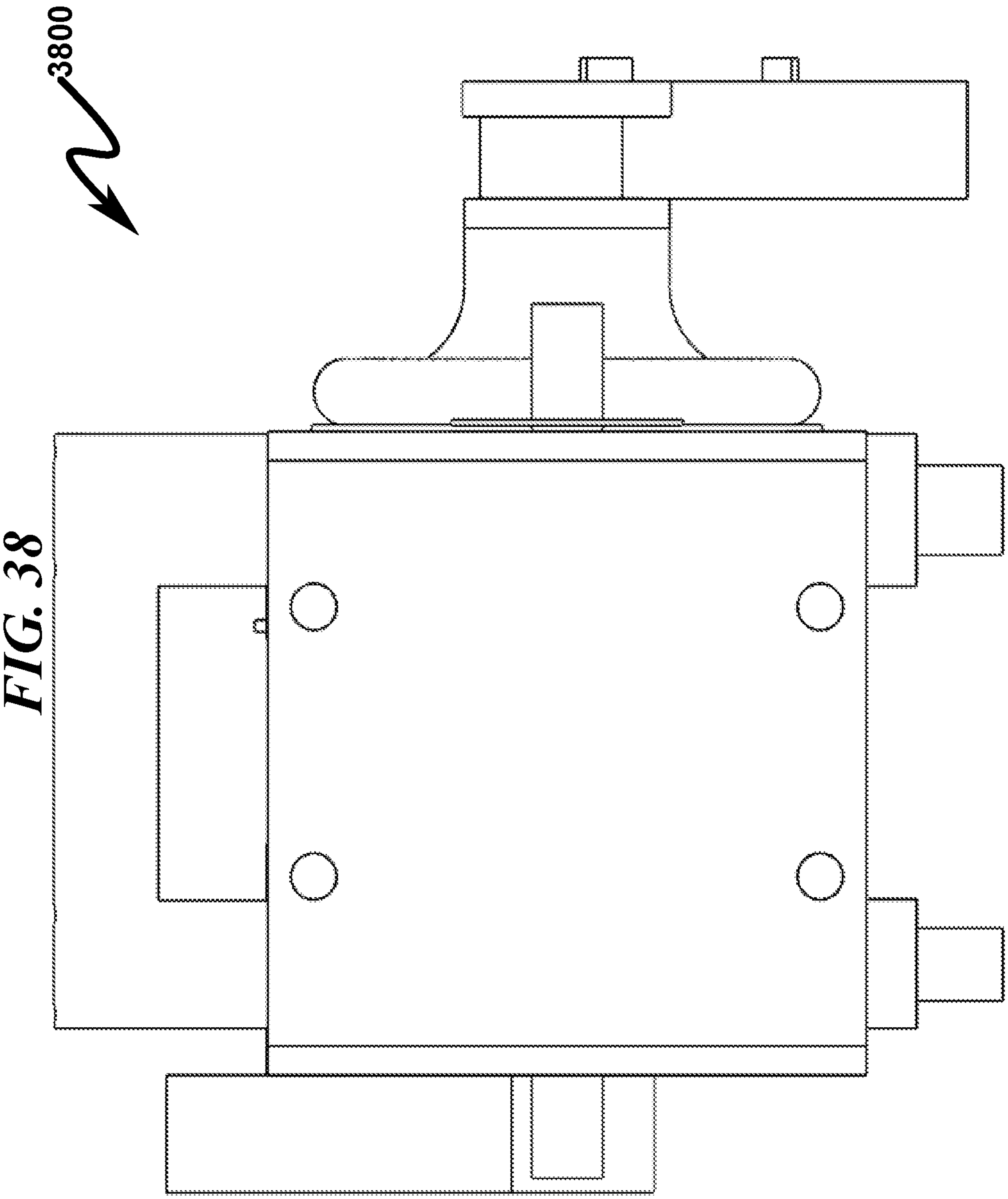
FIG. 38 illustrates a bottom view of a preferred exemplary enhanced invention system embodiment.
Figure 39:
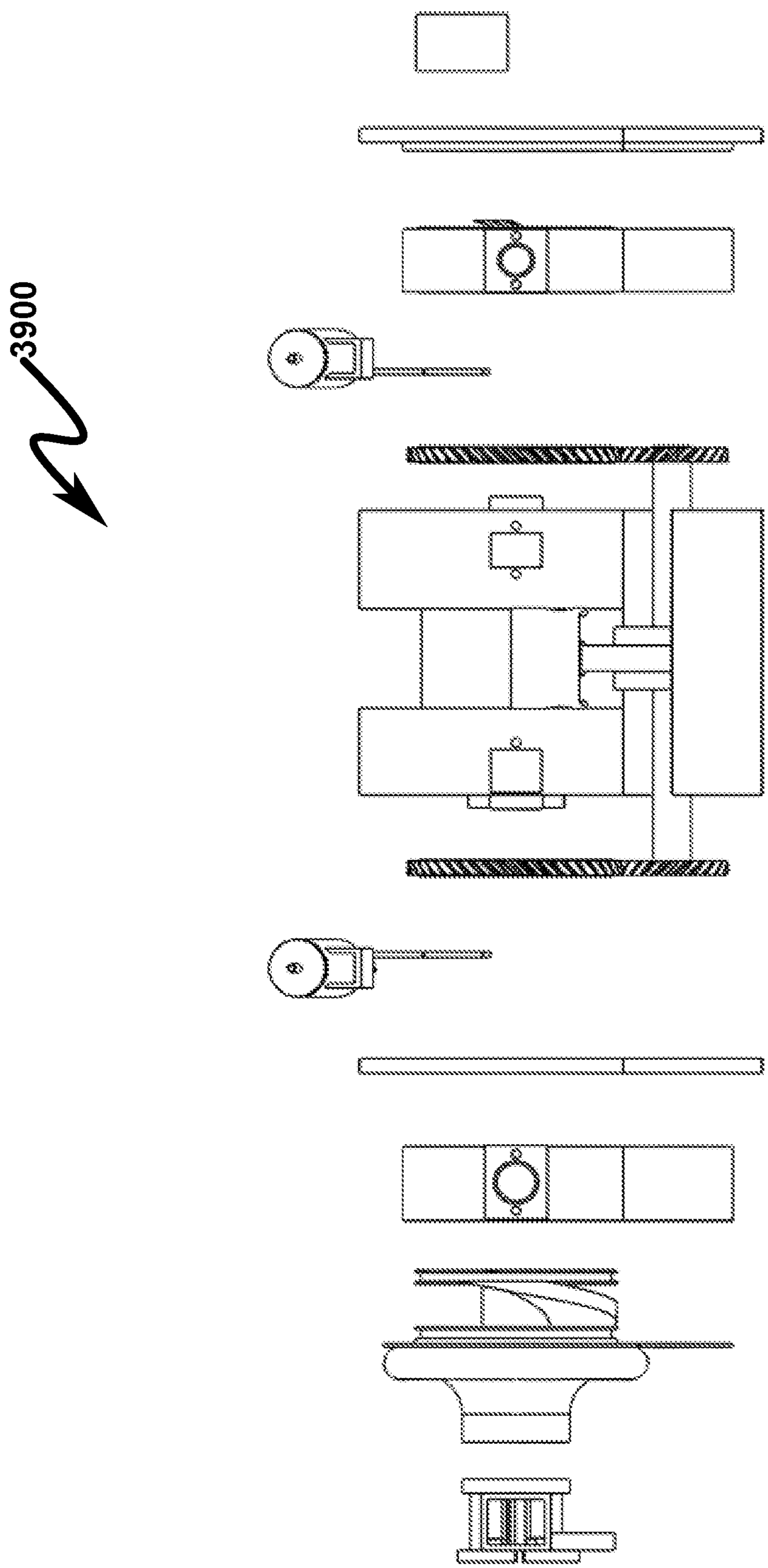
FIG. 39 illustrates a front exploded view of a preferred exemplary enhanced invention system embodiment.
Figure 40:
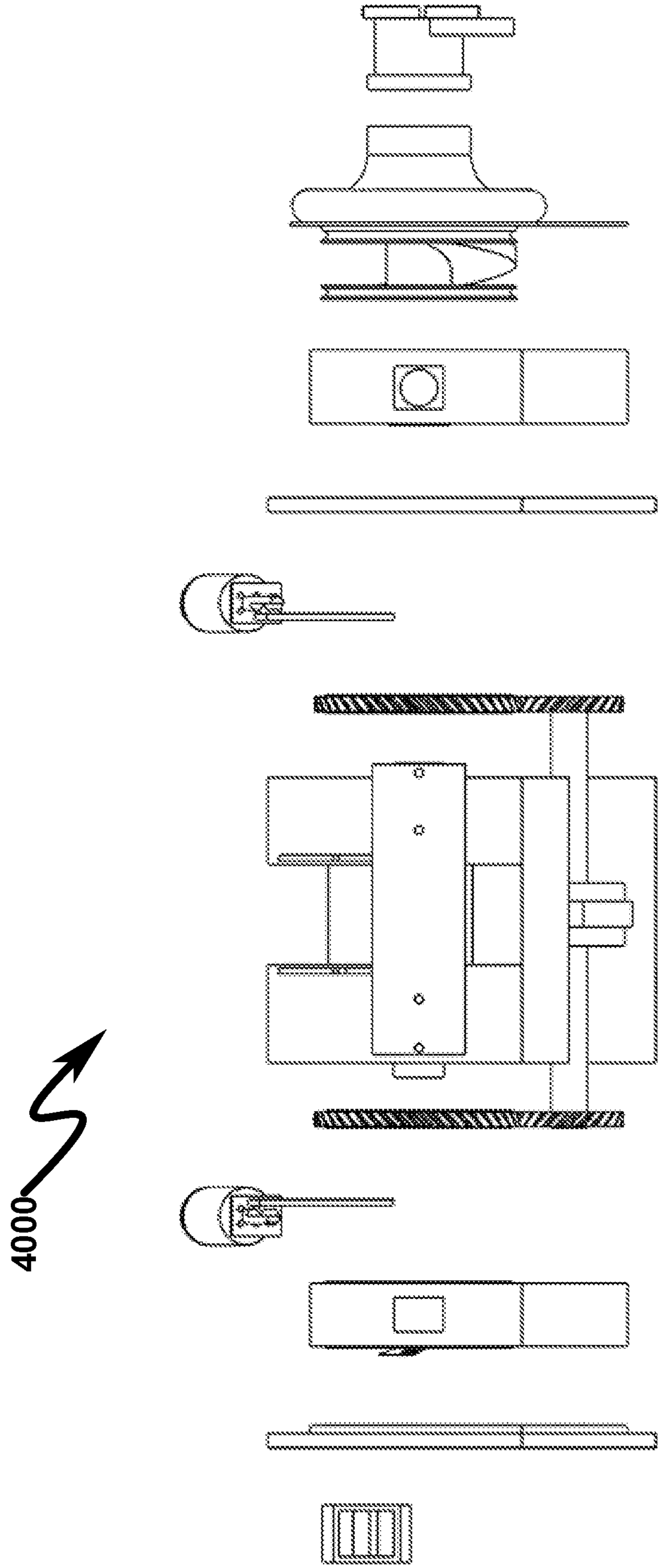
FIG. 40 illustrates a rear exploded view of a preferred exemplary enhanced invention system embodiment.
Figure 41:
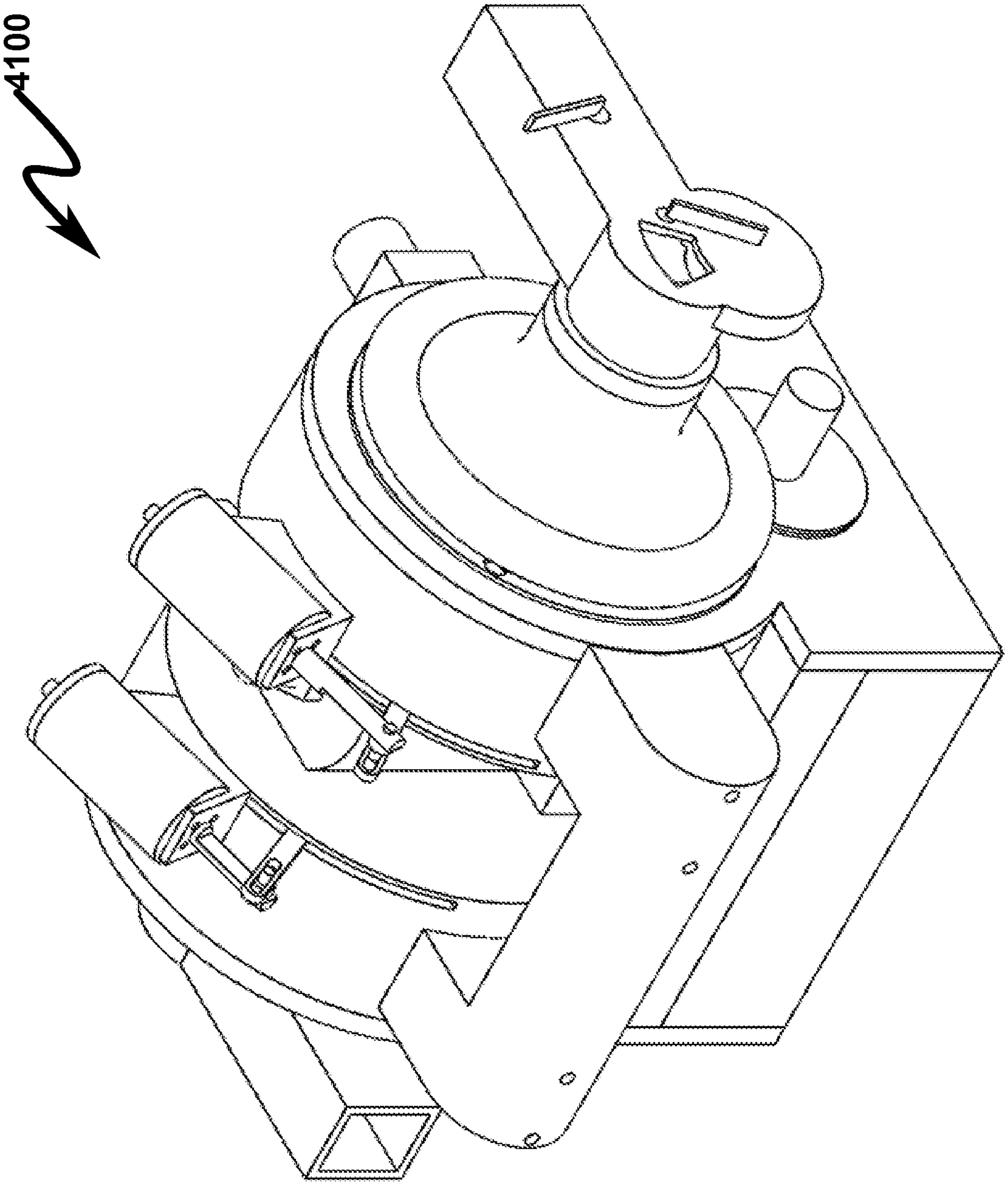
FIG. 41 illustrates a top right front perspective isometric view of a preferred exemplary enhanced invention system embodiment.
Figure 42:
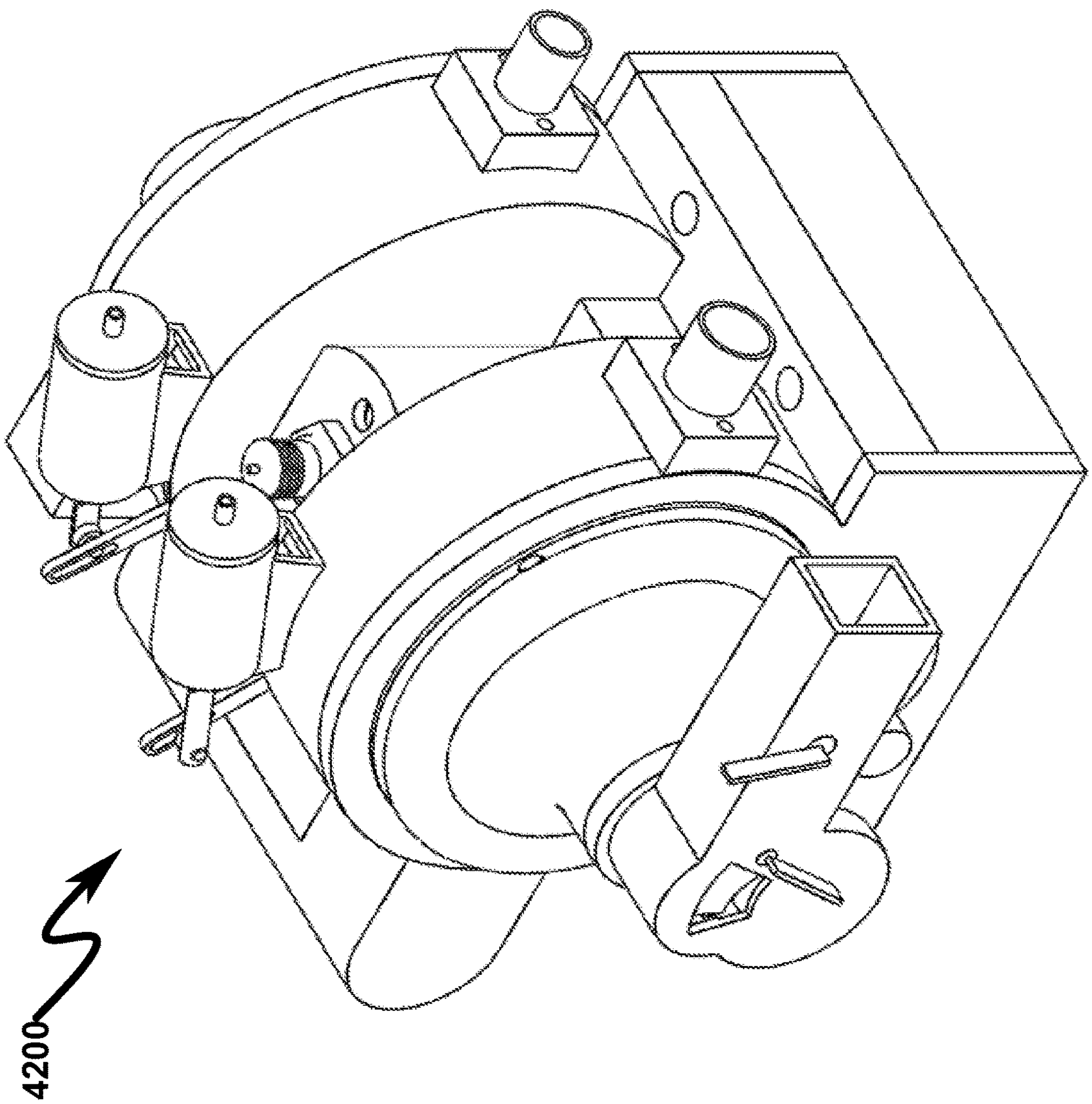
FIG. 42 illustrates a top right rear perspective isometric view of a preferred exemplary enhanced invention system embodiment.
Figure 43:
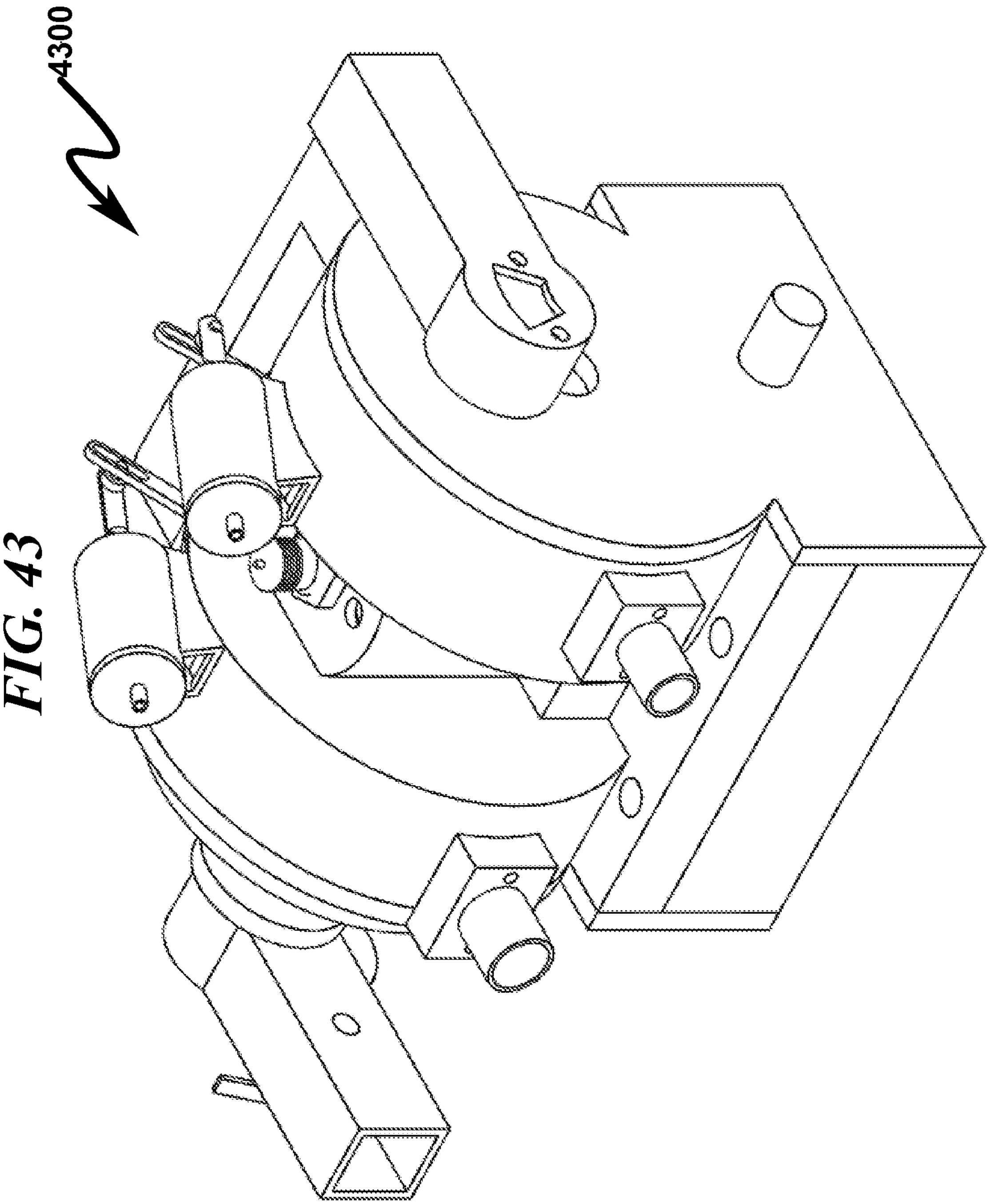
FIG. 43 illustrates a top left front perspective isometric view of a preferred exemplary enhanced invention system embodiment.
Figure 44:
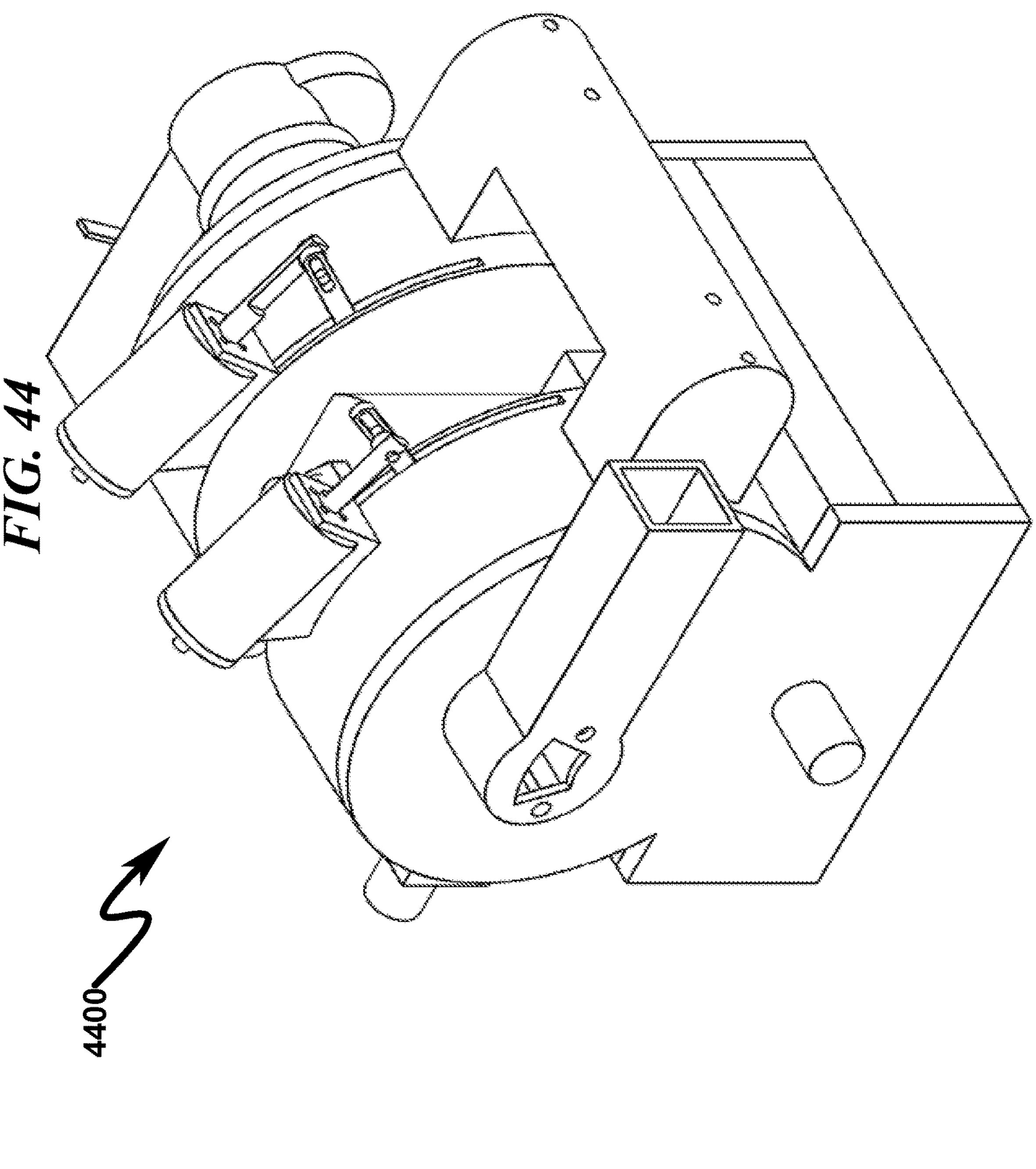
FIG. 44 illustrates a top left rear perspective isometric view of a preferred exemplary enhanced invention system embodiment.
Figure 45:
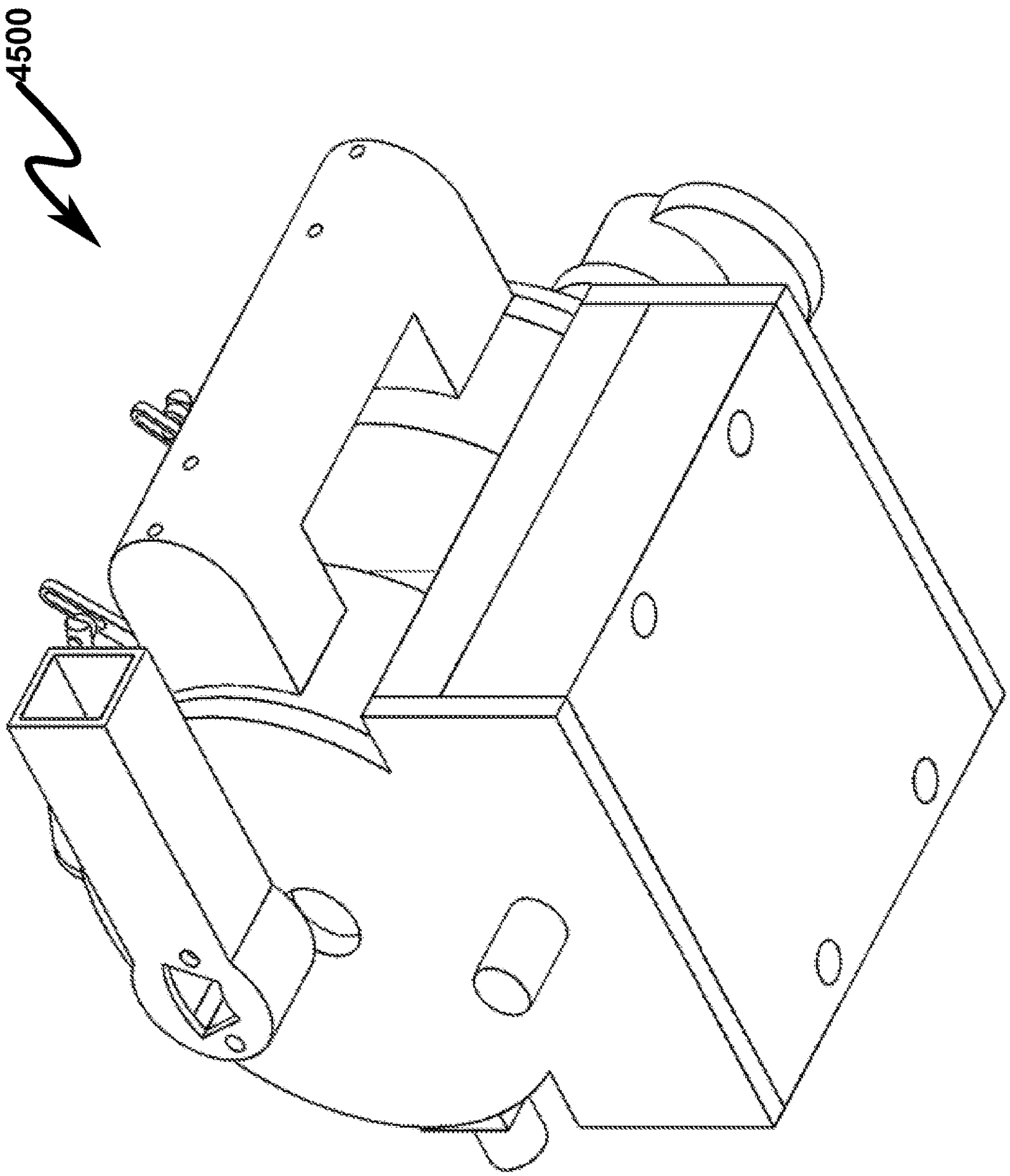
FIG. 45 illustrates a bottom right front perspective isometric view of a preferred exemplary enhanced invention system embodiment.
Figure 46:
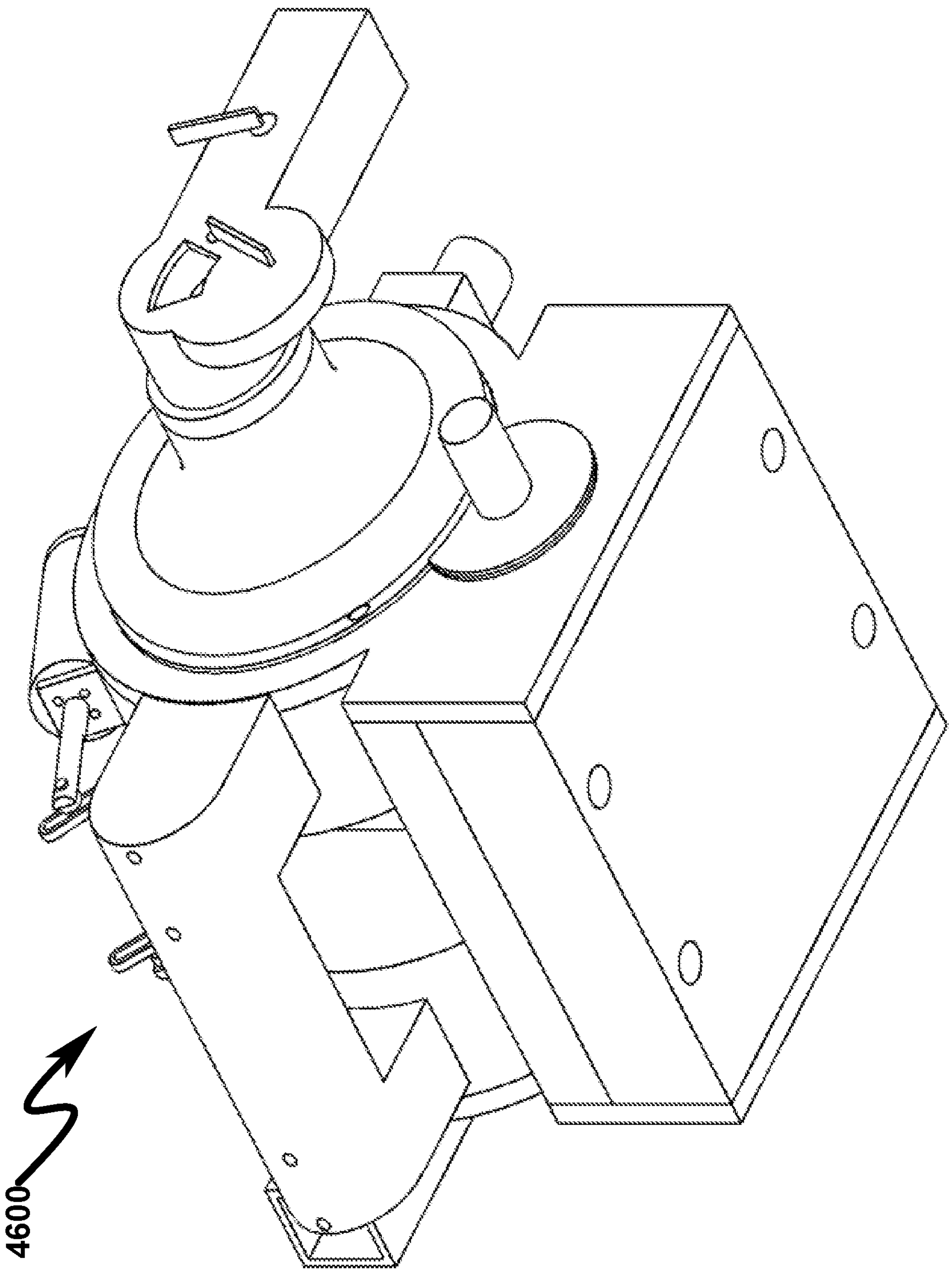
FIG. 46 illustrates a bottom right rear perspective isometric view of a preferred exemplary enhanced invention system embodiment.
Figure 47:
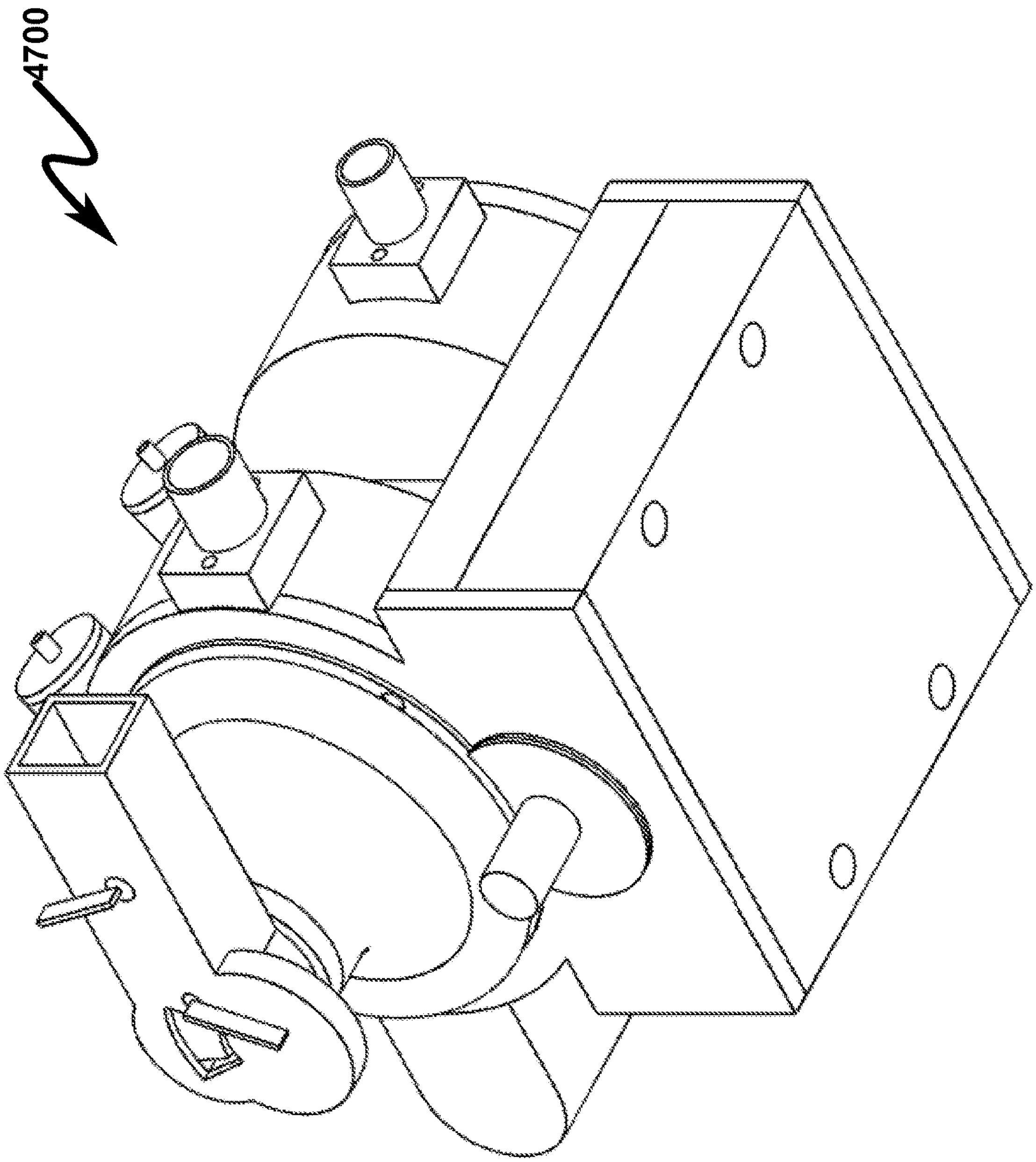
FIG. 47 illustrates a bottom left rear perspective isometric view of a preferred exemplary enhanced invention system embodiment.
Figure 64:
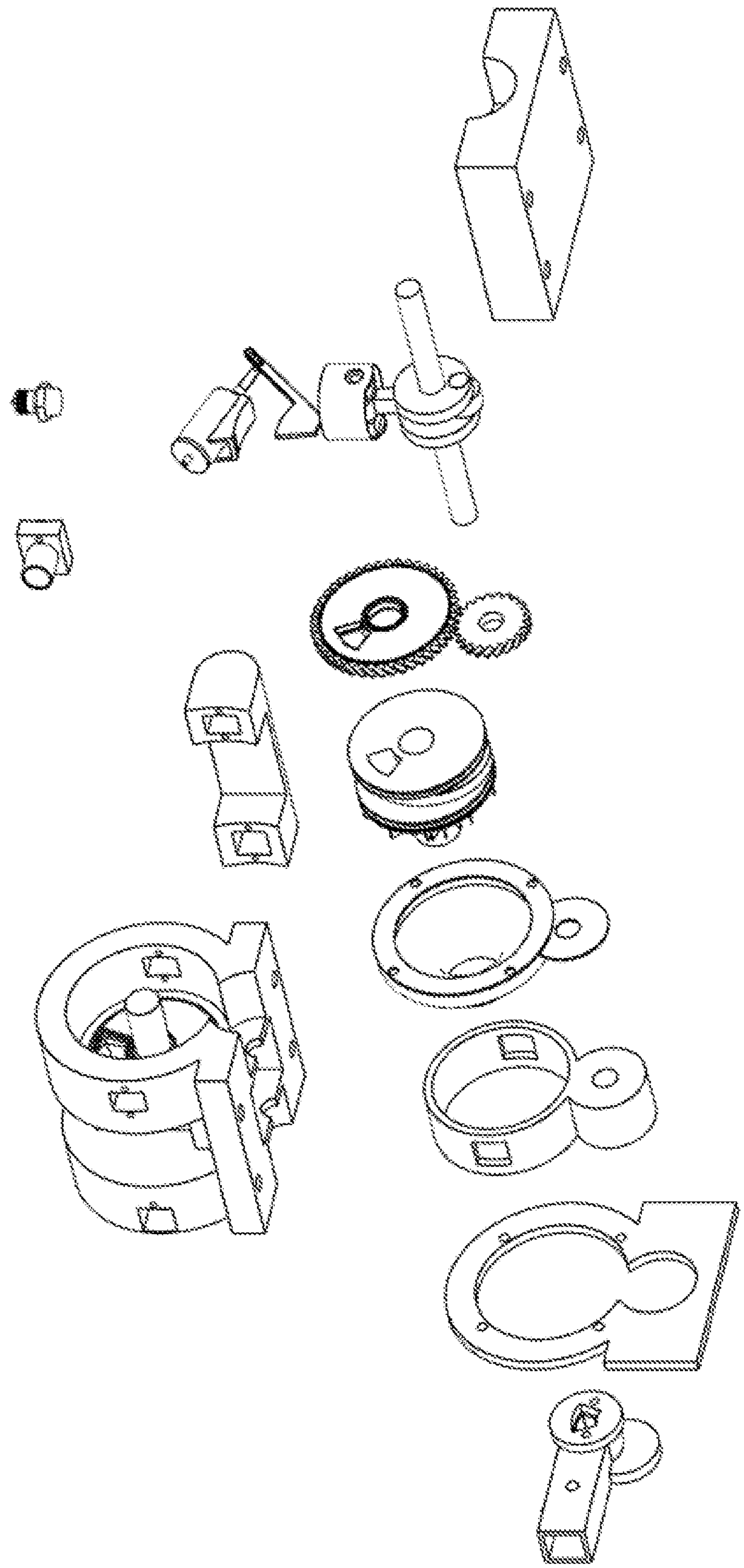
FIG. 64 illustrates a bottom left half front perspective isometric exploded detail view of a preferred exemplary enhanced invention system embodiment.

The rudimentary 4-Stroke engine may be enhanced using intake and exhaust compressors and is depicted in FIG. 33 (3300)-FIG. 64 (6400). This invention embodiment may include any combination of the elements detailed in the following table:

| ASSEMBLY/ MECHANISM | ELEMENT/PART/COMPONENT | ANM | ID# | 1st LOC |
|---|---|---|---|---|
| ENHANCED COMPRESSOR ENGINE (DEPICTED IN FIG. 33-FIG. 64) | | | | |
| Cooling Channel Spool (CCS) & Intake Forced Induction (FIN) (4910) | Cooling Water Jacket | IWJ | 11 | 137 |
| | Straight Channel Spool | ISC | 12 | NU |
| | Spiral Channel Spool | ICP | 13 | 157 |
| | Water Jacket Inlet Port | IIP | 14 | 144 |
| | Spiral Impeller | ISI | 16 | 159 |
| | Centrifugal Impeller | CIP | 17 | 152 |
| | Volute Swirl Chamber | VSC | 18 | 173 |
| | Volute Housing | VOH | 19 | 173 |
| Intake Centrifugal Advance (CAD) (4920) | CAD Counter Weight | IAW | 21 | 187 |
| | CAD Spring | IAS | 22 | 187 |
| | CAD Plate | IAP | 23 | 187 |
| | CAD Counter Weight Pivot | IWP | 24 | 187 |
| | CAD Cover Intake | IAC | 25 | 187 |
| ENHANCED COMPRESSOR ENGINE (COMPONENTS FROM RUDIMENTARY 4-STROKE COMPRESSOR ENGINE) (DEPICTED IN FIG. 33-FIG. 64) | | | | |
| Rudimentary Engine Block Accessories (BEA) (1700) (4900) | Spark Plug | SPK | 01 | ND |
| | Upstream Fuel Injector | UFI | 02 | ND |
| | Direct Fuel Injector | DFI | 03 | ND |
| | Positive Crankcase Ventilation | PCV | 04 | ND |
| | Throttle Plate Plenum | TPP | 05 | ND |
| | Throttle Plate Highrise | TPH | 06 | ND |
| | Piston | RPI | 07 | 17 |
| | Piston Connecting Rod | RPR | 08 | 17 |
| Intake Sealing (ISP) (1730) (4930) | Engine Block Grooves and Ridges | IGR | 31 | 82 |
| | Intake Engine Block Cover | IEC | 32 | 17 |
| | Engine Block Cover Grooves/Ridges | IGC | 33 | 122 |
| | Oil Seals | IOS | 34 | 97 |
| | Compression Rings | ICR | 35 | 97 |
| | Recessed Areas | IRA | 36 | 81 |
| | RVD Grooves and Ridges | IRG | 37 | 79 |
| | Intake Annular Sectored Conical Frustum Void | ISV | 38 | 17 |
| | Intake Manifold | INM | 39 | 49 |
| Intake Multi-Staged Valve (IMV) (1740) (4940) | Intake Fixed Port | IFP | 41 | 89 |
| | Intake MSV Blade | IMB | 42 | 113 |
| | Intake MSV Spring | IMS | 43 | 113 |
| | Intake MSV Diaphragm | IMD | 44 | 113 |
| | Intake MSV Housing | IMH | 45 | 105 |
| | Intake MSV Housing Cover | IMC | 46 | 113 |
| | Intake MSV Fixed Port | IMF | 47 | 81 |
| | Intake Boundary Layer Effect | IBE | 48 | 26 |
| Power Drive Train (PDT) (1750) (4950) | Intake Rotary Valve Port | IVP | 51 | 73 |
| | Intake Rotary Valve Disc | IVD | 52 | 17 |
| | Engine Block | BLK | 53 | 17 |
| | Combustion Chamber | CCH | 54 | 153 |
| | Crankshaft | CRK | 55 | 17 |
| | Crankcase Oil Reservoir | COR | 56 | 17 |
| | Engine Crankcase | CKC | 57 | 17 |
| | Exhaust Rotary Valve Disc | EVD | 58 | 17 |
| | Exhaust Rotary Valve Port | EVP | 59 | 76 |
| Exhaust Multi-Staged Valve (EMV) (1760) (4960) | Exhaust Fixed Port | EFP | 61 | 90 |
| | Exhaust MSV Blade | EMB | 62 | 116 |
| | Exhaust MSV Spring | EMS | 63 | 116 |
| | Exhaust MSV Diaphragm | EMD | 64 | 116 |
| | Exhaust MSV Housing | EMH | 65 | 106 |
| | Exhaust MSV Housing Cover | EMC | 66 | 116 |
| | Exhaust MSV Fixed Port | EMF | 67 | 81 |
| | Exhaust Boundary Layer Effect | EBE | 68 | 25 |
| Exhaust Sealing (ESP) (1770) (4970) | Engine Block Grooves and Ridges | EGR | 71 | 97 |
| | Exhaust Engine Block Cover | EEC | 72 | 17 |
| | Engine Block Cover Grooves/Ridges | EGC | 73 | 126 |
| | Oil Seals | EOS | 74 | 104 |
| | Compression Rings | ECR | 75 | 104 |
| | Recessed Areas | ERA | 76 | 88 |
| | RVD Grooves and Ridges | ERG | 77 | 80 |

-continued

| ASSEMBLY/ MECHANISM | ELEMENT/PART/COMPONENT | ANM | ID# | 1st LOC |
|---|---|---|---|---|
| | Exhaust Annular Sectored Conical Frustum Void | ESV | 78 | 17 |
| | Exhaust Manifold | EXM | 79 | 49 |
| | ENHANCED COMPRESSOR ENGINE (DEPICTED IN FIG. 33-FIG. 64) | | | |
| Exhaust Centrifugal Advance (CAD) (4980) | CAD Counter Weight | EAW | 81 | 188 |
| | CAD Spring | EAS | 82 | 188 |
| | CAD Plate | EAP | 83 | 188 |
| | CAD Counter Weight Pivot | EWP | 84 | 188 |
| | CAD Cover Exhaust | EAC | 85 | 188 |
| Cooling Channel Spool (CCS) & Exhaust Forced Discharge (FID) (4990) | Cooling Water Jacket | EWJ | 91 | 135 |
| | Straight Channel Spool | ESC | 92 | 157 |
| | Spiral Channel Spool | ECP | 93 | 256 |
| | Cooling System Bypass | CSB | 94 | 49 |
| | Water Jacket Outlet Port | EOP | 95 | 144 |
| | Spiral Impeller | ESI | 96 | 233 |

General System Overview

Figure 17:
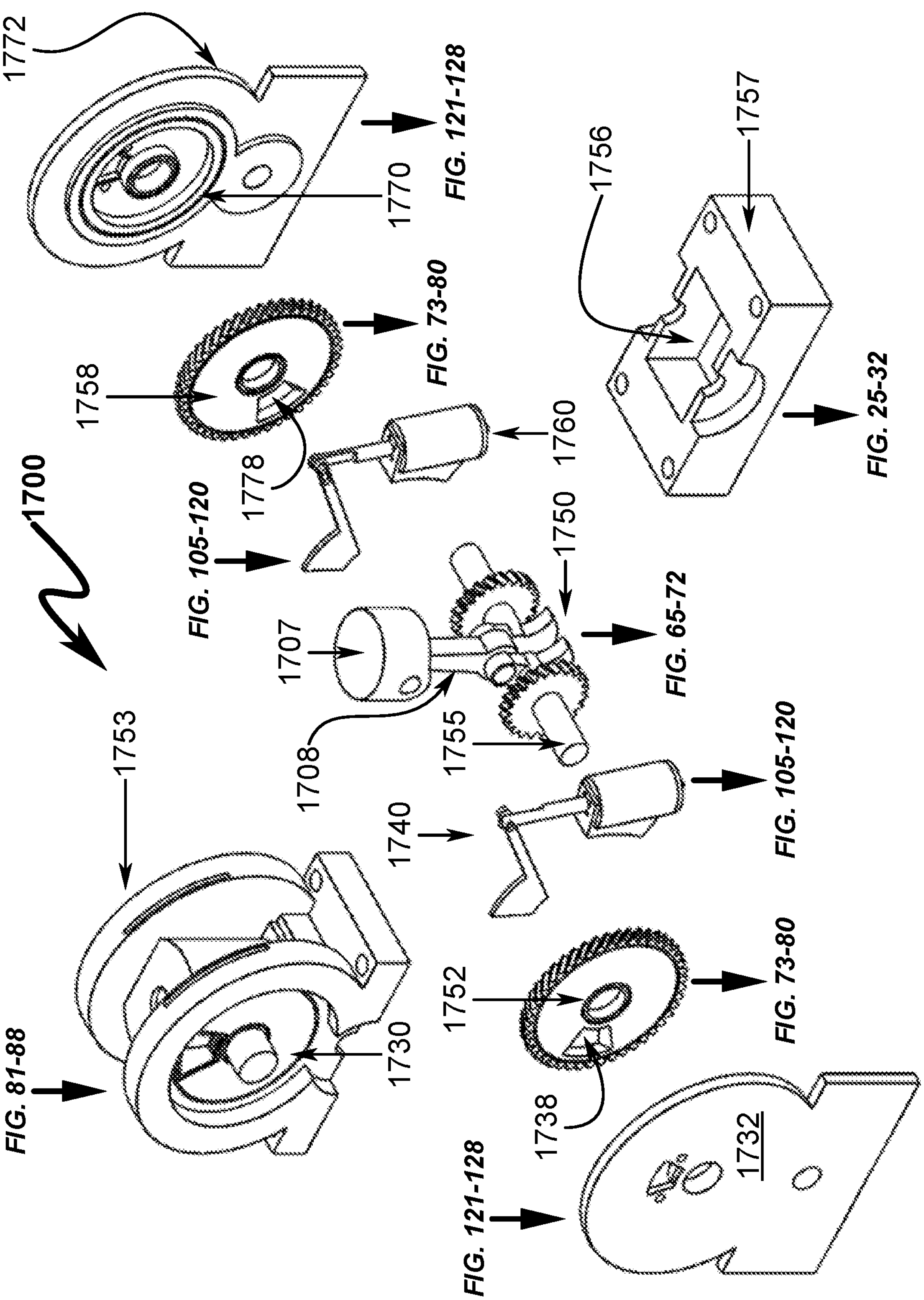
FIG. 17 illustrates a top right front perspective isometric exploded view of a preferred exemplary rudimentary invention system embodiment.
Figure 49:
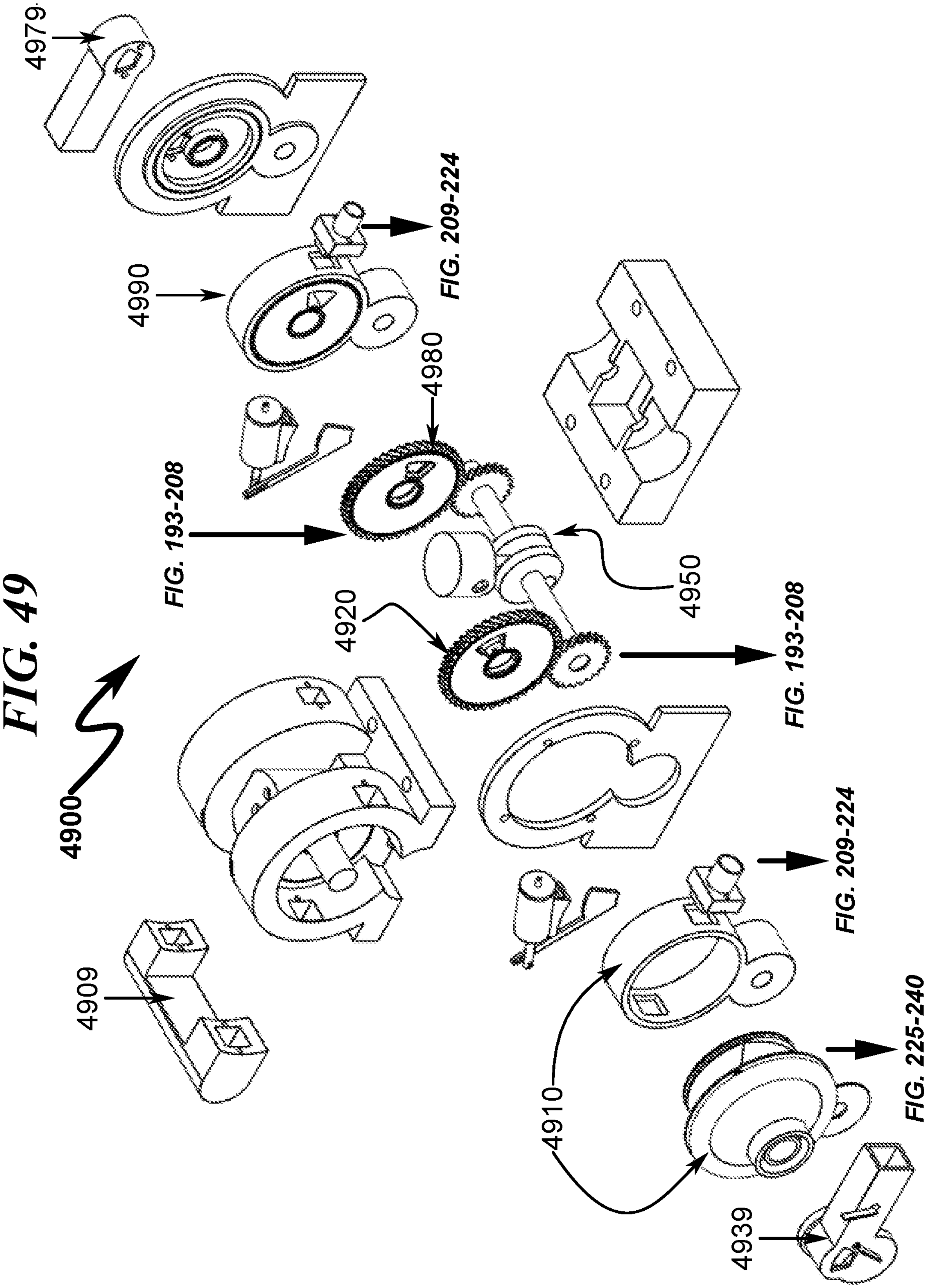
FIG. 49 illustrates a top right front perspective isometric exploded view of a preferred exemplary enhanced invention system embodiment.

The present invention details a rudimentary ICE embodiment as generally depicted in FIG. 17 (1700) and an enhanced ICE embodiment as generally depicted in FIG. 49 (4900). The present invention rudimentary system embodiment describes basic ICE functionality, whereas the present invention enhanced system embodiment incorporates performance enhancements that may be individually or corporately combined in a variety of fashions to improve overall ICE system performance.

Rudimentary System Overview (0100)

Figure 1:
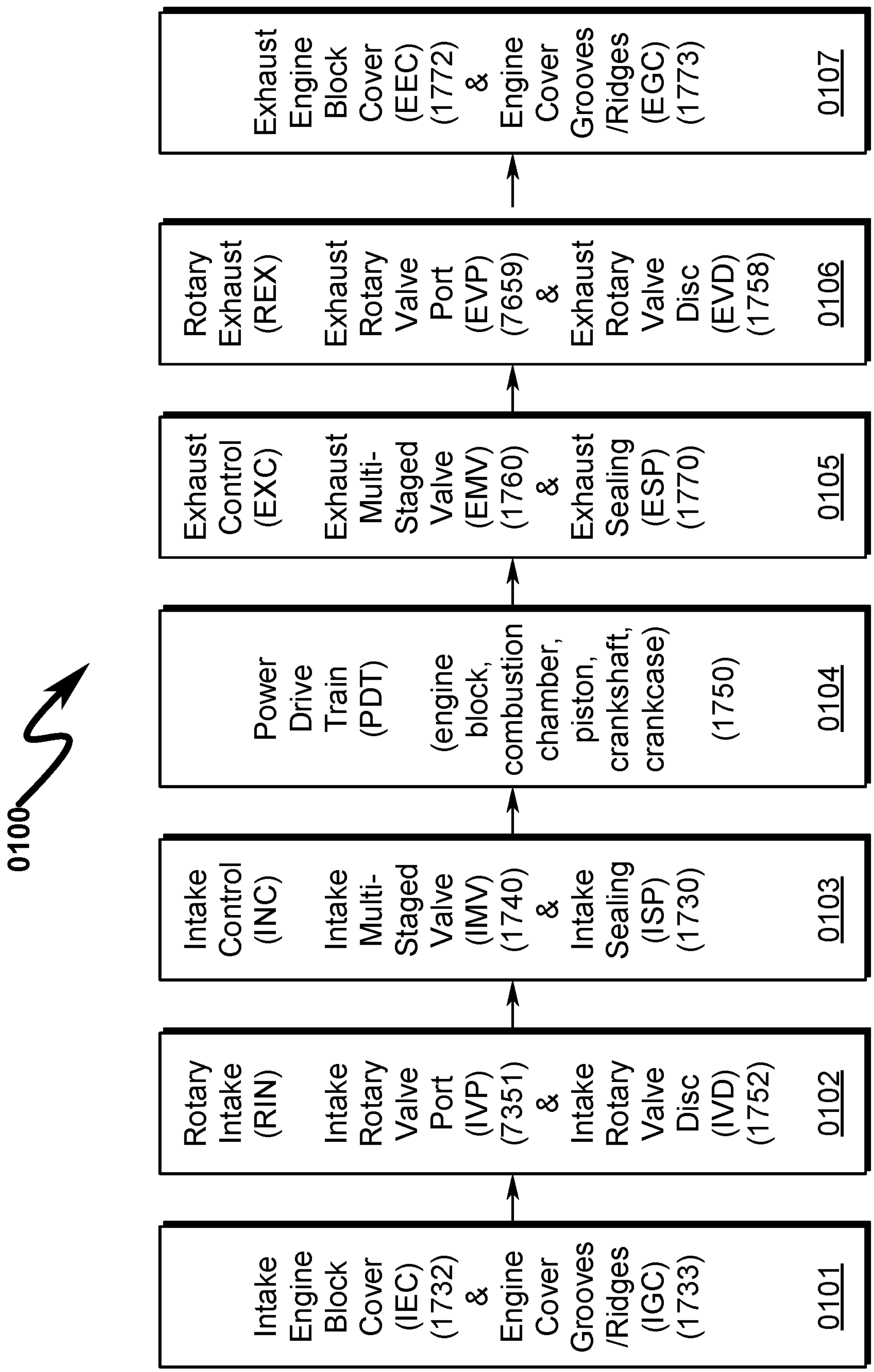
FIG. 1 illustrates a block diagram depicting a preferred rudimentary exemplary invention system embodiment.

A block diagram depicting the major system components of the present invention rudimentary embodiment is generally depicted in FIG. 1 (0100). This present invention embodiment may be constructed using a variety of combinations of the elements depicted in this block diagram. Some invention embodiments may incorporate only a portion of the elements and/or subassemblies listed in this block diagram. A brief description of these subassemblies and their related elements is provided below.

Referencing the block diagram of FIG. 1 (0100), this system comprises an intake engine block cover (IEC) (0101) and exhaust engine block cover (EEC) (0107) that enclose the remaining system components. The IEC (0101) and EEC (0107) provide side covers for the engine as well as providing intake and exhaust port runners/couplings for air/fuel molecules into the engine and exhaust gas emission from the engine respectively.

Rotary intake (RIN) (0102) takes air/fuel mixture from the IEC (0101) and via an intake rotary valve disc (IVD) comprising an intake rotary valve port (IVP) and sends the air/fuel mixture to the engine intake control (INC) (0103). Timing of the intake to the INC (0103) is accomplished using the IVP within the IVD. Engine intake control (INC) (0103) is accomplished using an intake multi-staged valve (IMV) located on the intake side of the engine block that modulates the air/fuel mixture to the power drive train (PDT) (0104) combustion chamber (CCH) (15354).

Sealing of the intake side of the CCH (15354) is accomplished via the intake sealing apparatus (ISP) (1730) comprising the grooves/ridges of the engine cover (12233) and engine block (8231) for containment of the combustion gases while fluid sealing is provided for by the oil seals (IOS) (9734).

The PDT (0104) encompasses common engine elements such as the engine block (BLK) (1753), spark plug (ND), fuel injector (ND), combustion chamber (CCH) (15354), piston (RPI) (1707), crankshaft (1755), engine crankcase cover (CKC) (1757) and other power-transmission elements that are dependent on the type of engine implemented. The CCH (15354) is formed by an individual cylinder bored into the BLK (1753). The spark plug, fuel injector, positive crankcase ventilation, and throttle plates are not depicted (ND) as they are well known to those skilled in the art.

Exhaust from the PDT (0104) combustion chamber (CCH) (15354) is delivered to the exhaust control (EXC) (0105). Engine exhaust control (EXC) (0105) is accomplished using an exhaust multi-staged valve (EMV) (1770) located on the exhaust side of the engine block that modulates the combusted exhaust gas emissions from the PDT (0104) CCH (15354). Timing of the exhausting combusted gases after the modulation of the EXC (0104) is accomplished by reciprocating these gases using a rotary exhaust (REX) (0106) that incorporates an exhaust rotary valve disc (EVD) (1758) comprising an exhaust rotary valve port (EVP) (7659) which ports the combusted exhaust gases out through the EEC (0107).

Sealing of the exhaust side of the combustion chamber is accomplished via the exhaust sealing apparatus (ESP) (1770) comprising the grooves/ridges of the engine cover (12673) and engine block (8771) for containment of the combustion gases while fluid sealing is provided for by the oil seals (EOS) (10474).

Intake Multi-Staged Valve (IMV) (1740) and Exhaust Multi-Staged Valve (BIM (1760)

The intake multi-staged valve (IMV) (1740) and exhaust multi-staged valve (EMV) (1760) assembly apparatus are deployed in their respective multi-staged valve (MSV) fixed ports, intake (IMF) (8147) and exhaust (EMF) (8167) located on each side of the combustion chamber piercing into the respective fixed ports, intake (IFP) (8941) and exhaust (EFP) (9061). The main function of the MSV is to provide a restriction that causes a time delay to the flow of air molecules over and around the MSV blades, intake (IMB) (11342) and exhaust (EMB) (11662) as these molecules is channeled and flowing through the respective fixed IFP (8941) and EFP (9061).

This delay can limit or restrict this molecular flow and thus can be used to create an operational profile to cause the ICE to be more fuel efficient and emit less environmentally harmful emissions. This delay can also cause the CCH to run hotter or cooler at any range of the ICE's operation. It is well known to those skilled in the art that the introduction or restriction of the amount of air molecules in a precision fashion is an essential component for the fuel efficient operation of ICEs.

Intake/Exhaust Combustion and Compression Sealing Apparatus (ISP) (1730) (ESP) (1770)

The ISP (1730) and ESP (1770) are responsible for containing intake and exhaust combustion and compression gases when and where necessary in the overall engine construction.

They generally comprise engine block grooves and ridges, intake (IGR) (8231) and exhaust (EGR) (8771), engine block cover, intake (IEC) (1732) and exhaust (EEC) (1772), engine block cover grooves/ridges, intake (IGC) (12233) and exhaust (EGC) (12673), compression rings, intake (ICR) (9735) and exhaust (ECR) (10475), recessed areas, intake (IRA) (8136) and exhaust (ERA) (8876), which is where the boundary layer effect, intake (IBE) (2648) and exhaust (EBE) (2568) occur in between the rotating IVD and EVD and the stationery face of the outer walls of the CCH (15354) and the inner walls of the IEC (1732) and EEC (1772).

Typically, all of these components are precision machined and/or powder coated surfaced elements, with the exception of the boundary layer effect which is a result of molecules being sandwiched between stationery and rotating powder coated surfaced components as is well known to those skilled in the art.

Where applicable, the ceramic powdered coatings provide for an expected wear pattern to exist to the extent of a designed service life between intervals wherein they must have the ceramic powdered coatings redeployed. These ceramic powdered coatings can be configured to wear similarly as does the clutch disc and brake pads as they are used in their prescribed functions. The prescribed function herein is to provide an adequate sealing/buffering while also allowing the flow of molecules into and then out of the CCH (15354).

Since the IVP (7351) and EVP (7659) are rotating elements, the sealing of these components must incorporate specific types of sealing apparatus (ISP) (1730) and (ESP) (1770). The sealing example provided in the present invention's sealing apparatus comprises specifically adopted and designed structures to facilitate the adequate sealing of rotating valve elements.

Standard Fluid Sealing Apparatus (ISP) (1730) (ESP) (1770)

In all of the present invention embodiments, it should be noted that all oil and fluid sealing is achieved by using oil and fluid seals, intake (IOS) (9734) and exhaust (EOS) (10474). These seals comprise synthetic high temperature and pressure resistant materials, i.e., intake oil seals (IOS) (9734) and exhaust oil seals (EOS) (10474) secured in place by engine block grooves and ridges, intake (IGR) (8231) and exhaust (EGR) (8771) that are placed in close proximity of areas where fluids would be expected to leak or permeate into unwanted areas. These seals must be resilient and resistant to high temperatures and high pressures.

The sealing elements must retain their shape and tensile strength over the wide operational range of the ICE. The elements will have special components and configurations that will enable them to provide these sealing characteristics over a reasonable operational service life. On average, it is expected that during normal operation these seals will last 2 to 4 years and will have regular prescribed maintenance intervals, so that additional damage or wear can be avoided, if the replacement schedules are adhered to. Further field engineering test research into the sealing apparatus may yield longer operational periods between maintenance intervals as is well known to those skilled in the art.

Boundary Layer Effect (BLE)

The Boundary Layer Effect (BLE), intake (IBE) (2648) and exhaust (EBE) (2568) may be described as follows. In physics and fluid mechanics, a boundary layer is the layer of fluid in the immediate vicinity of a bounding surface where the effects of viscosity are most significant. In other words, the liquid or gas in the boundary layer tends to cling to the surface of both the stationary and rotating components.

In a rotating system, this "clinging to the surface" effect causes the fluid or gas to reside in a more centralized placement closest to the center of the rotation as the rotation occurs.

This means that because of the BLE, intake (IBE) (2648) and exhaust (EBE) (2568), the fluid or gas that is inherent in the containment areas are naturally prone to resist leaking outwardly, thus prohibiting compression past the IVP (7351) and EVP (7659) elements until the respective mating of the IFP (8941) and EFP (9061) and the RVPs mated alignments is achieved, thereby giving the fluid or gas particles/molecules a path of least resistance so that they can exit the containment area. This methodology is utilized on the intake and the exhaust sides of the ICE.

As mentioned earlier, compression rings, intake (ICR) (9735) and exhaust (ECR) (10475) are incorporated where practical and since these rings are free to also rotate, some miniscule BLE is also applied to some degree in that area as well. This gives three clear methods to arrest the compression leakage and with the incorporation of the standard ICE positive crankcase ventilation (PCV), intake (ICV) (ND) and exhaust (ECV) (ND) which captures and returns an effective portion of any blow-by compression remaining in the containment areas of both the intake and exhaust sides of the ICE that lingers around after the compression or combustion cycles/strokes of the ICE.

Annular Sectored Conical Frustum (ACF) Shaped Port

The present exemplary invention incorporates an annular sectored conical frustum (ACF) shape in its ports. The present invention's ACF port shape is deployed in the IVP (7351) and EVP (7659) as well as the IFP (8941) and EFP (9061) of the rudimentary and enhanced ICE example. This geometrical port shape was chosen due to the superior geometric performance characteristic inherent in its ability to maintain a constant height vector while varying the port opening width during the opening and closing of the intake and exhaust valve port duration regiments, commonly termed as Intake and Exhaust strokes as is well known to those skilled in the art.

This performance characteristic was found to provide a more volumetric effective valve opening and closing regiment for an ICE valve mechanism because this specific port shape does not restrict (pinch) the flow of air and gas molecules while it is opening and closing in the counterproductive way that other POPPET or rotary valve systems do.

Rudimentary Engine Assembled/Assembly Detail (0300)-(3200)

Rudimentary Engine Block Assembled Views (0300)-(1600)

Figure 16:
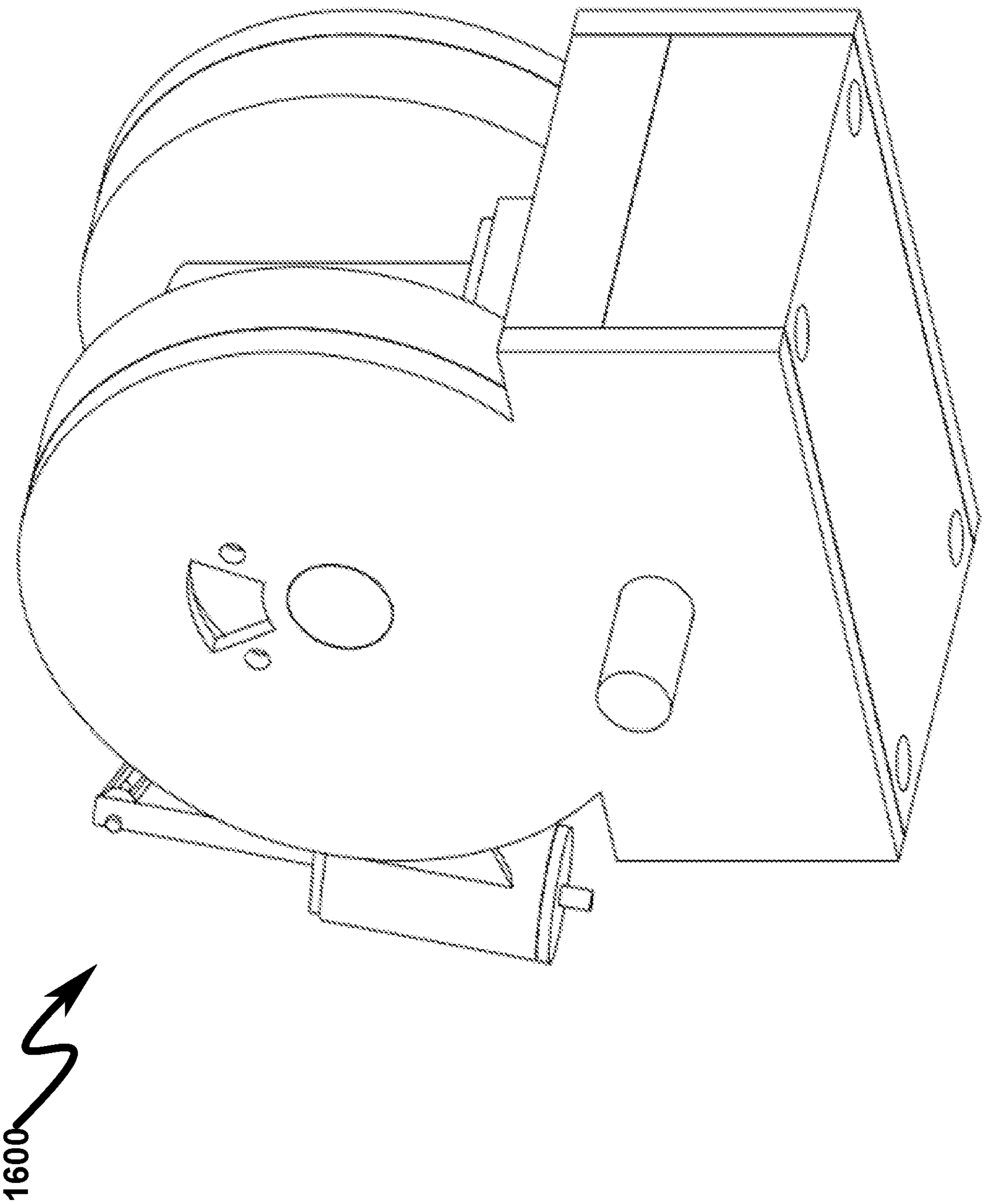
FIG. 16 illustrates a bottom left rear perspective isometric view of a preferred exemplary rudimentary invention system embodiment.

The present invention as embodied in rudimentary form is generally depicted in assembled views in FIG. 3 (0300)-FIG. 16 (1600). The major components depicted in these assembled views include the following:

- Annular Sectored Conical Frustum (ACF) shaped Rotary Valve Port, intake (IVP) (7351) and exhaust (EVP) (7659);
- ACF shaped fixed ports, intake (IFP) (8941) and exhaust (EFP) (9061);
- Rudimentary Engine Block (BLK) (1753);
- Power Drive Train (PDT) (1750);
- Multi-Staged Valve (MSV), intake (1740) and exhaust (EMV) (1760);
- Sealing, intake (ISP) (1730) and exhaust (ESP) (1770); and
- Rudimentary Engine Block Cover, intake (IEC) (1732) and exhaust (EEC) (1772).

Rudimentary Engine Block Assembly Exploded Views (1700)-(3200)

The present invention as embodied in rudimentary form is generally depicted in assembly exploded views in FIG. 17

Figure 32:
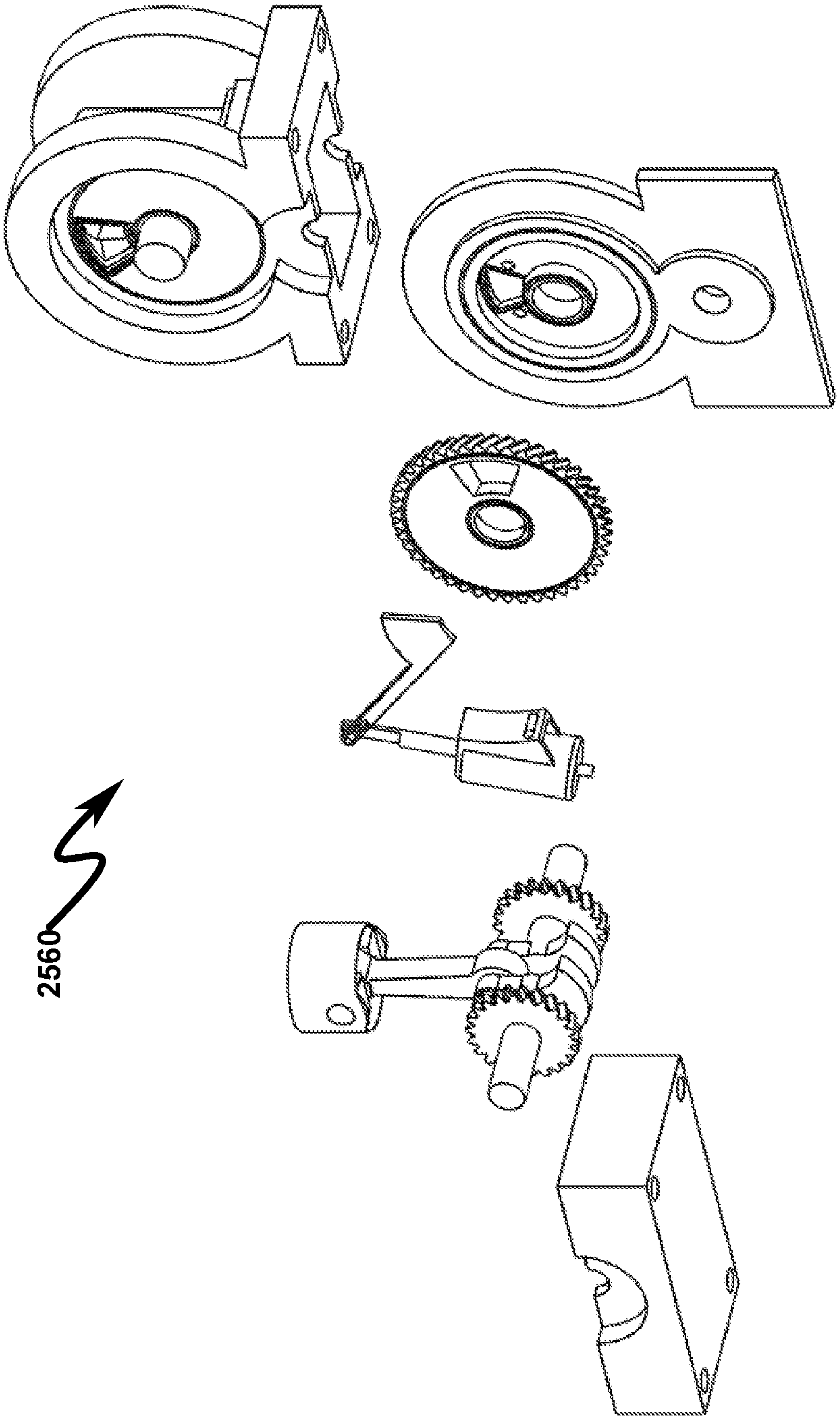
FIG. 32 illustrates a bottom left rear perspective engine block exploded view of a preferred exemplary rudimentary invention system embodiment.

(1700)-FIG. 32 (3200). The major components depicted in these assembly exploded views include the following:

- Annular Sectored Conical Frustum (ACF) shaped Rotary Valve Port, intake (IVP) (7351) and exhaust (EVP) (7659);
- ACF shaped fixed ports, intake (IFP) (8941) and exhaust (EFP) (9061);
- Rudimentary Engine Block (BLK) (1753);
- Power Drive Train (PDT) (1750);
- Multi-Staged Valve (MSV), intake (1740) and exhaust (EMV) (1760);
- Sealing, intake (ISP) (1730) and exhaust (ESP) (1770); and
- Rudimentary Engine Block Cover, intake (IEC) (1732) and exhaust (EEC) (1772).

The preferred exemplary invention's rudimentary rotary valve system embodiment is comprised of several specific components that operate in concert to provide for the much sought after stoichiometric efficiency ratio of 14.7:1.

The 14.7 parts of air is necessary to mix together with 1 part of fuel to provide for adequate oxygen for a complete and efficient combustion process to occur. The volumetric efficiency is achieved because of the collaborative effort of the rotary valve, the rotary valve sealing, and the MSV modulation on the relative size of the fixed intake and exhaust ports.

The main rudimentary components must be clearly depicted in order to grasp the concepts behind how this preferred exemplary invention's rudimentary rotary valve system embodiment achieves its designed goal.

The present invention's rudimentary rotary valve system embodiment comprises a standard Power Drive Train (PDT) (1750) modified to accept rotary valve port in the following configuration comprising these standard elements:

- an intake RVD (IVD) mechanism (1752) comprising an intake RVP (IVP) (7351)
- an exhaust RVD (EVD) (1758) comprising an exhaust RVP (EVP) (7659)
- an intake MSV (IMV) (1740) comprising an intake MSV fixed port (IMF) (8147)
- an exhaust MSV (EMV) (1760) comprising an exhaust MSV fixed port (EMF) (8167);
- sealing, intake (ISP) (1730) and exhaust (ESP) (1770); and
- a rudimentary Engine Block Cover, intake (IEC) (1732) and exhaust (EEC) (1772).

Internal Engine Construction (6500)-(7200)

Figure 65:
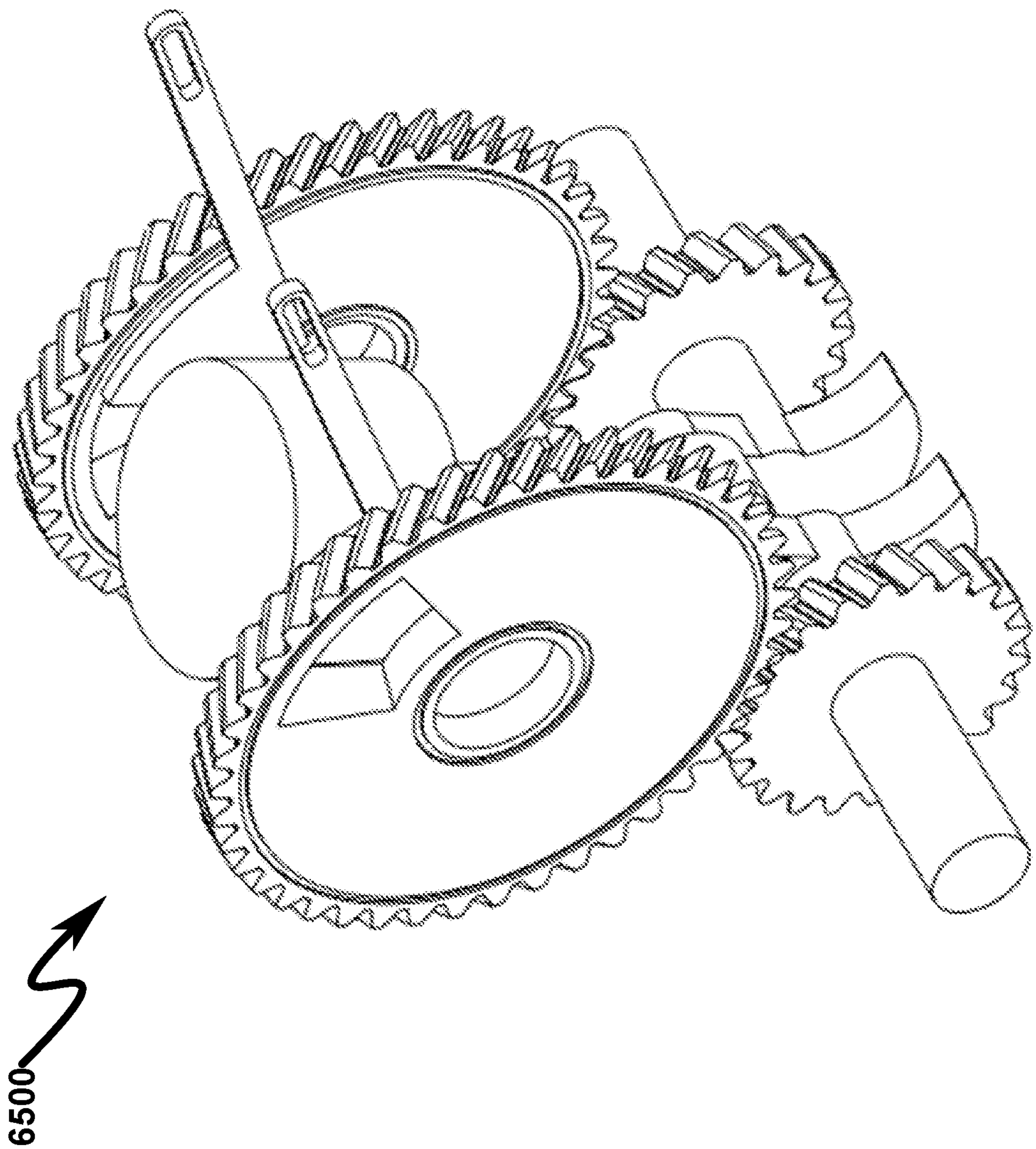
FIG. 65 illustrates a top right front perspective isometric view of the internal construction of a power drive train (PDT) of a preferred exemplary invention system embodiment.
Figure 66:
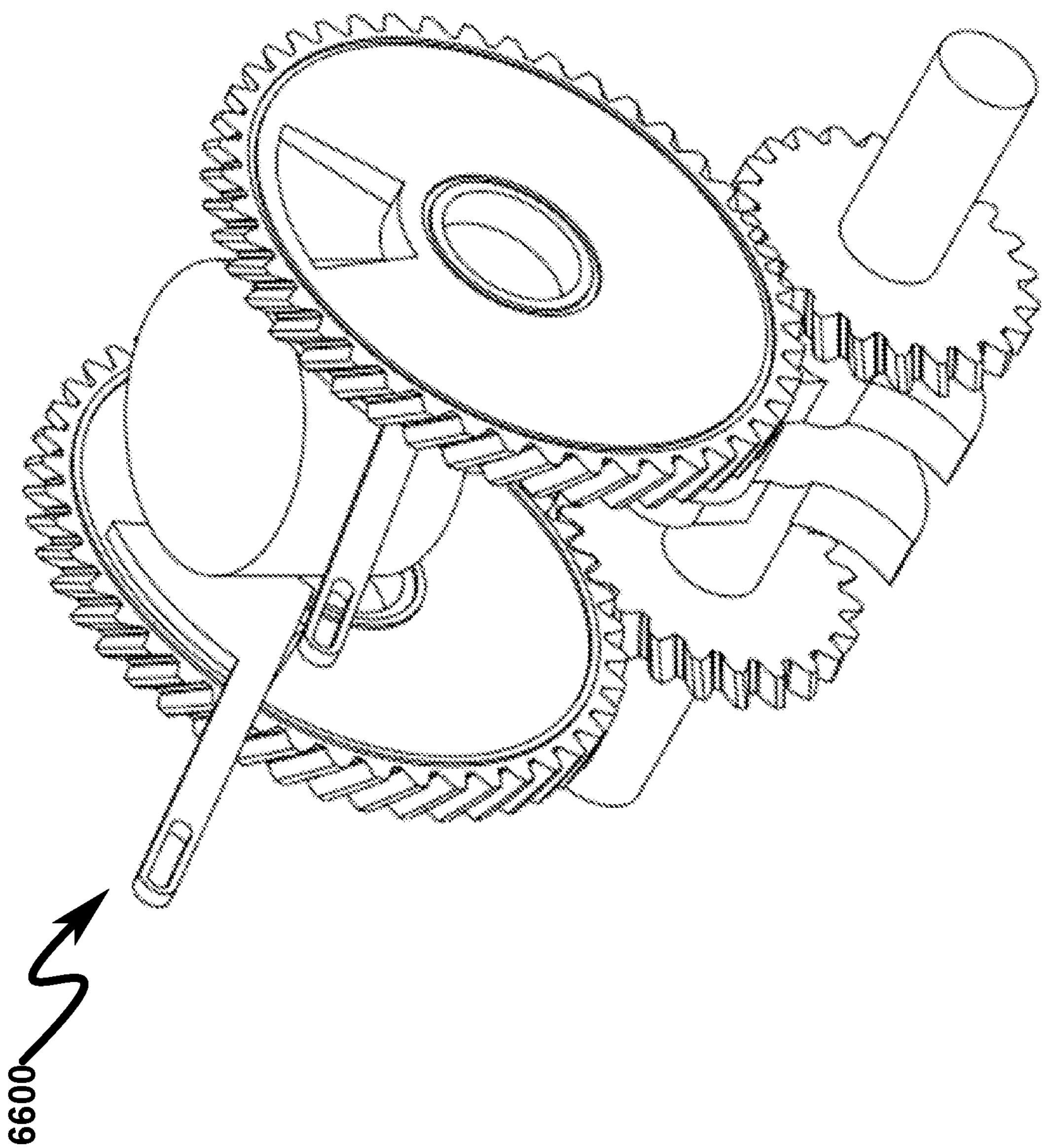
FIG. 66 illustrates a top left front perspective isometric view of the internal construction of a power drive train (PDT) of a preferred exemplary invention system embodiment.
Figure 67:
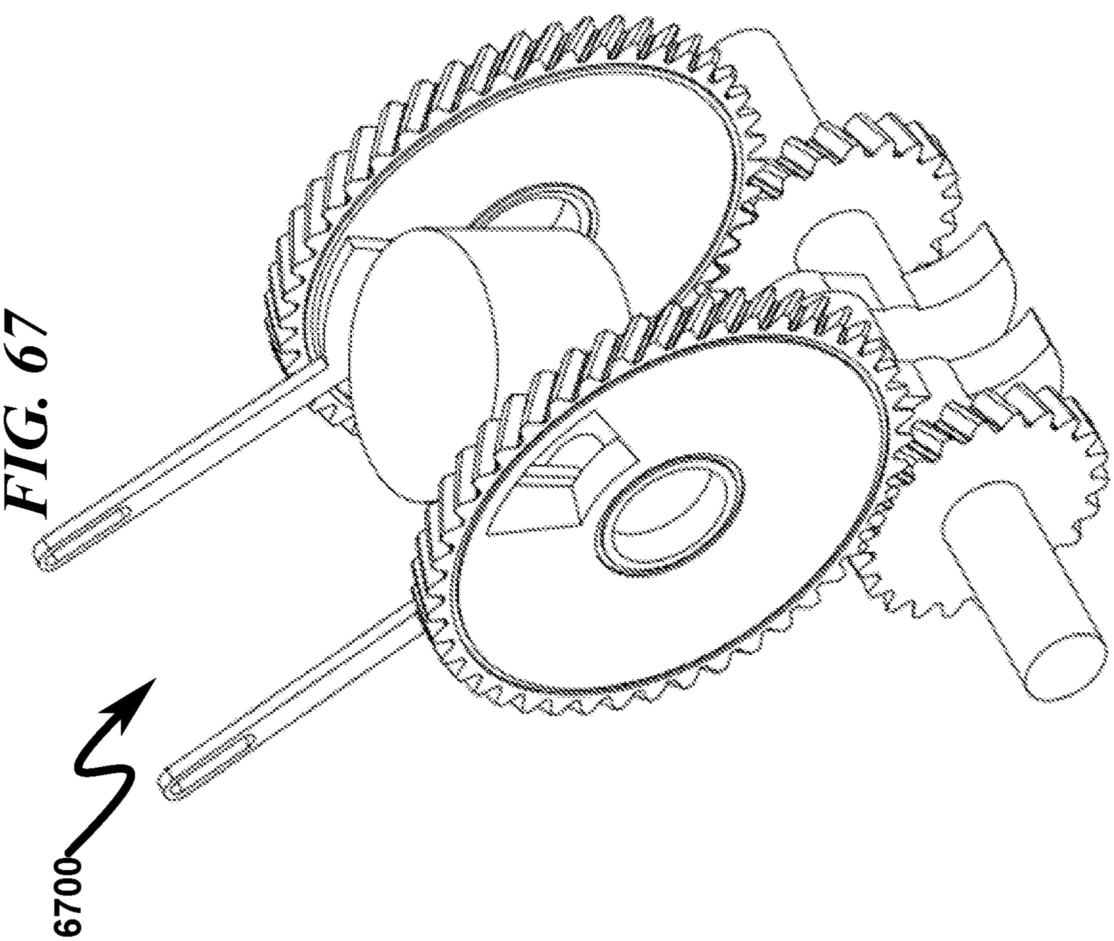
FIG. 67 illustrates a top right rear perspective isometric view of the internal construction of a power drive train (PDT) of a preferred exemplary invention system embodiment.
Figure 68:
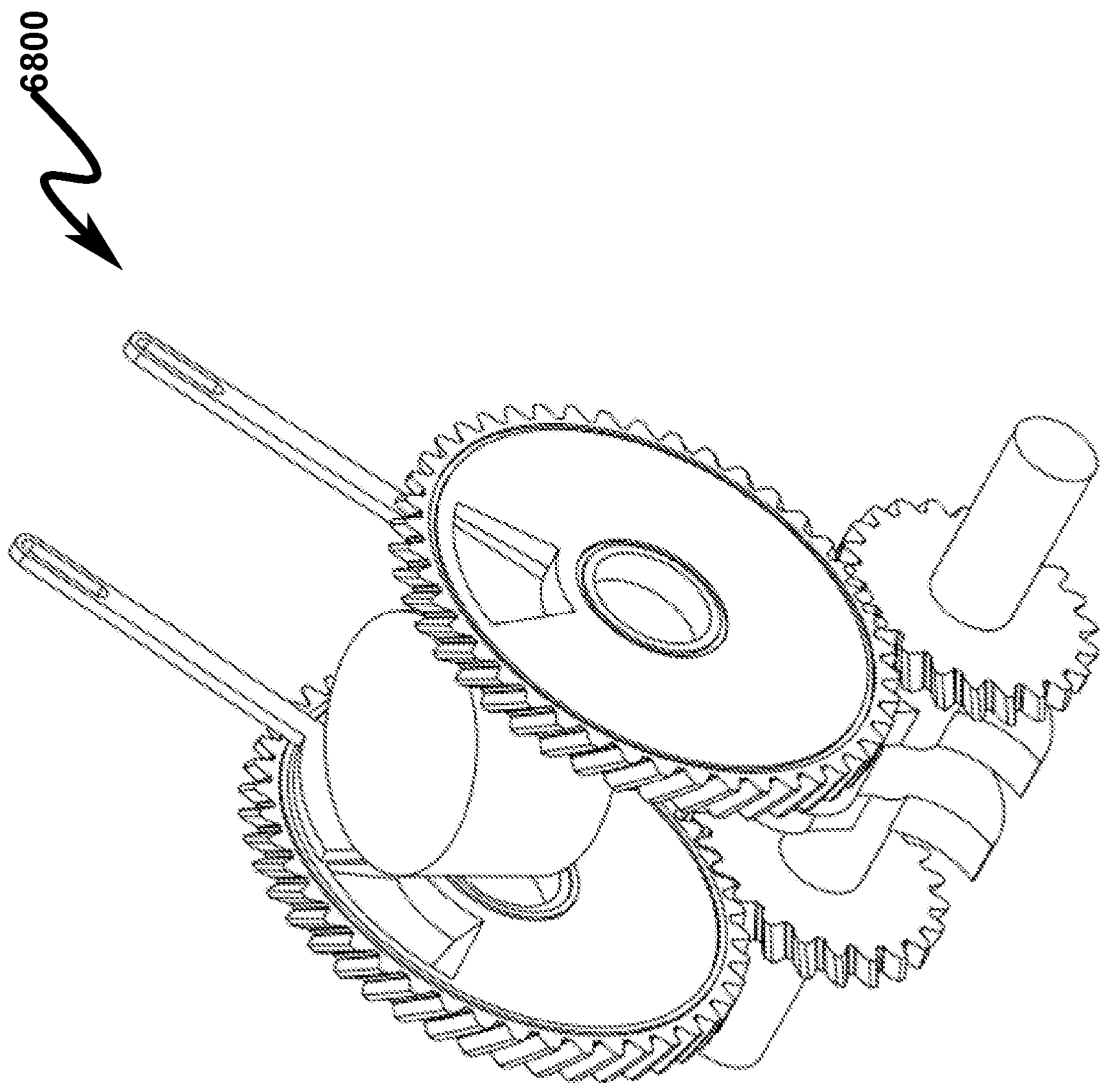
FIG. 68 illustrates a top left rear perspective isometric view of the internal construction of a power drive train (PDT) of a preferred exemplary invention system embodiment.
Figure 69:
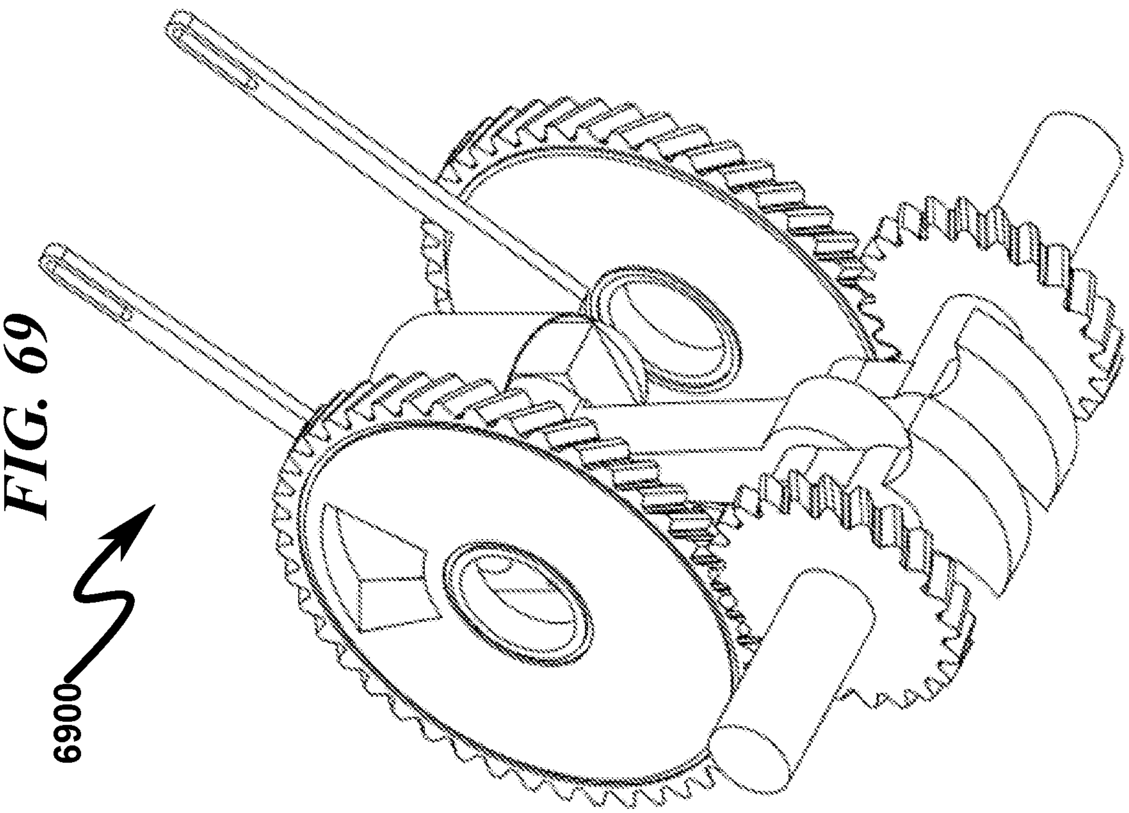
FIG. 69 illustrates a bottom right front perspective isometric view of the internal construction of a power drive train (PDT) of a preferred exemplary invention system embodiment.
Figure 70:
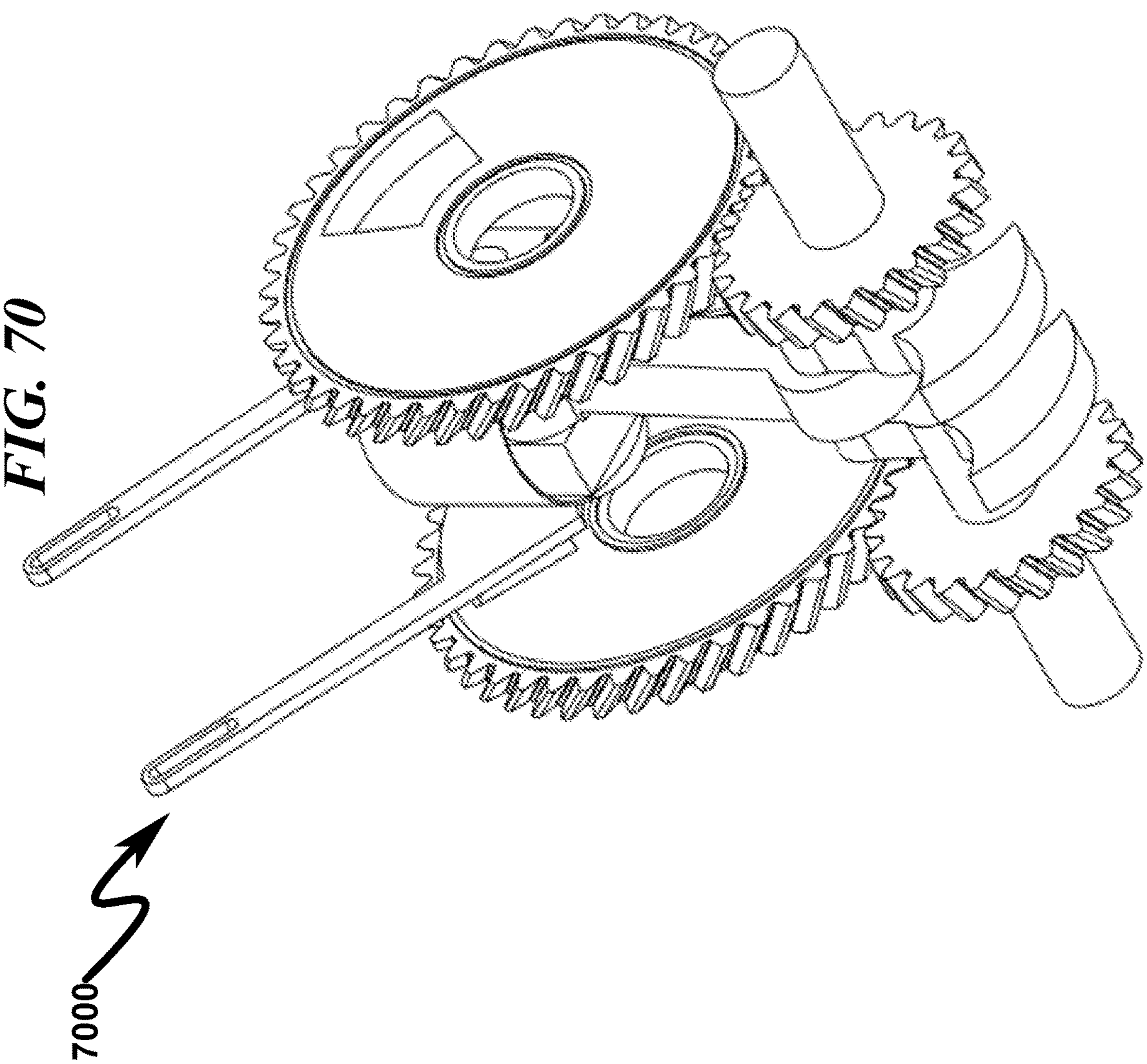
FIG. 70 illustrates a bottom left front perspective isometric view of the internal construction of a power drive train (PDT) of a preferred exemplary invention system embodiment.
Figure 71:
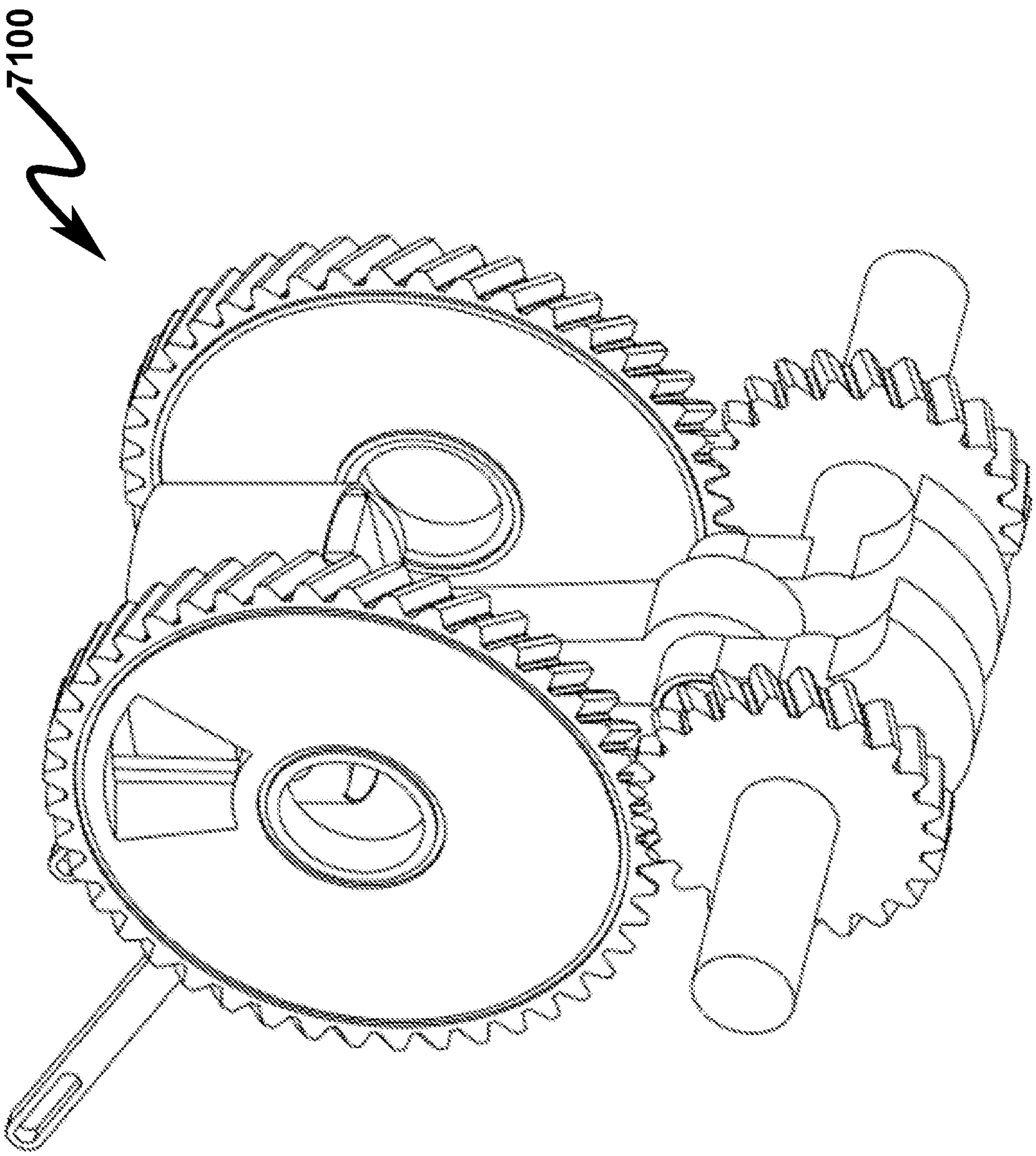
FIG. 71 illustrates a bottom right rear perspective isometric view of the internal construction of a power drive train (PDT) of a preferred exemplary invention system embodiment.
Figure 72:
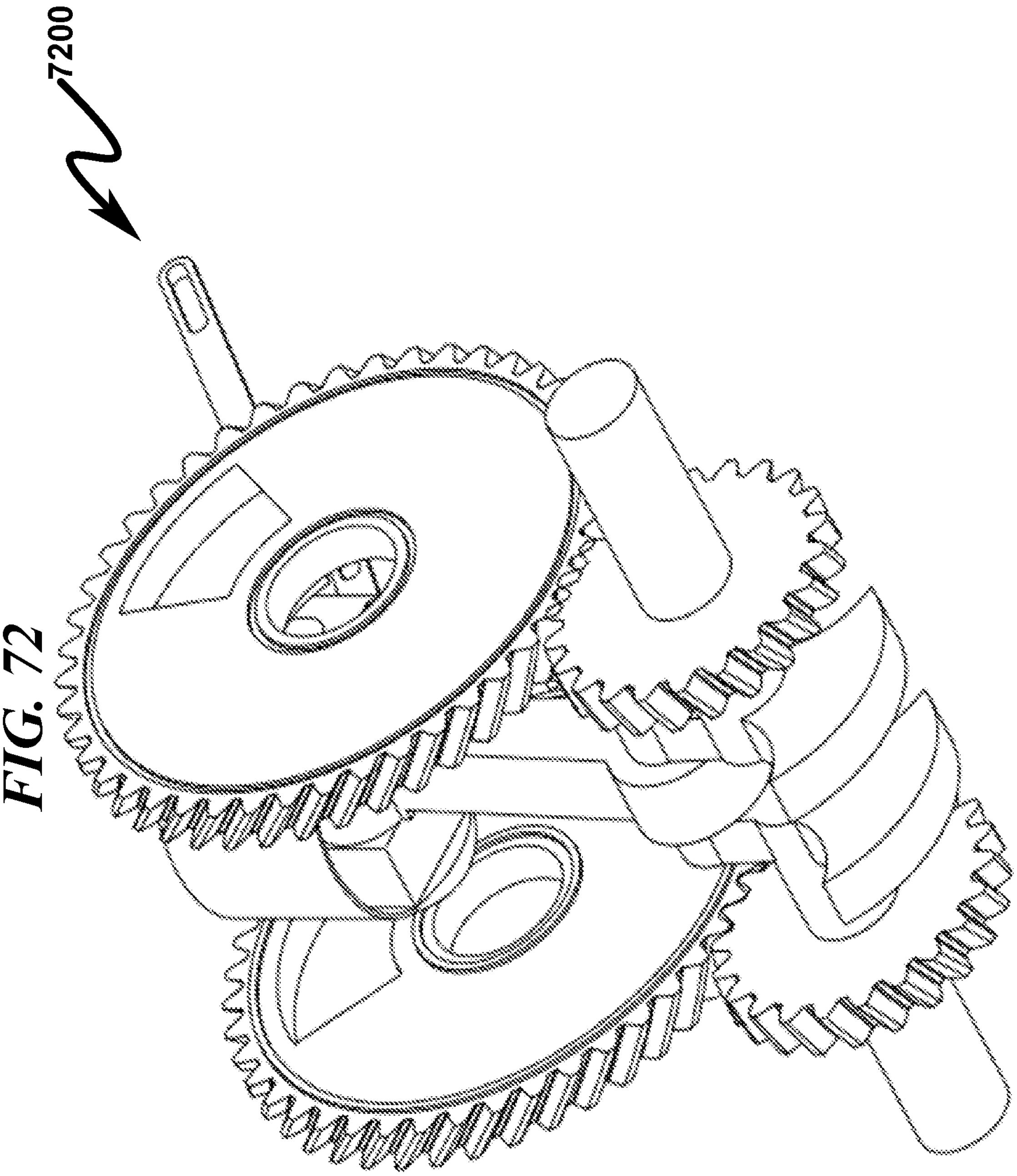
FIG. 72 illustrates a bottom left rear perspective isometric view of the internal construction of a power drive train (PDT) of a preferred exemplary invention system embodiment.

Detail views of the rudimentary internal engine construction, the power drive train (PDT) (1750) are generally depicted in FIG. 65 (6500)-FIG. 72 (7200). In these views it can be seen how the relationship between the crankshaft (CRK) (1755), piston (RPI) (1707), multi-staged valve, intake (IMV) (1740) and exhaust (EMV) (1760), rotary valve disc, intake (IVD) (1752) and exhaust (EVD) (1758) and other components interact in concert to provide the present invention's exemplary rudimentary valve concept.

Note here that the engine block (BLK) (1753) and crankcase cover (CKC) (1755) components have been removed for clarity in isolating the components that are depicted.

Additionally, it is understood that this ICE adheres to all of the functionalities normally associated with any naturally aspirated ICE but has been appropriately modified to accept the present invention's above stated structural arrangement. These elements comprise what is termed and well known to those skilled in the art as a rotary valve system.

The present invention effort to introduce a more effective and conceptual design that fully supports and facilitates a precision valve mechanism. All elements of this valve system work in concert to avail the desired effect of providing an exacting valve operation to an ICE.

This exacting molecular valve operation to an ICE is implemented by the transfer of the rotational and reciprocated characteristics of the PDT (1750) comprising: a Piston (RPI) (1707), a Combustion Chamber (CCH) (15354), a Crankshaft (CRK) (1755), a Crankcase Oil Reservoir (COR) (1756), a Piston Connecting Rod (RPR) (1708).

This specifically timed transfer of the rotational and reciprocated characteristics of the PDT causes the rotation of at least one intake RVD (IVD) (1752) comprising a RVP (IVP) (7351) and at least one exhaust RVD (EVD) (1758) comprising a RVP (EVP) (7659), to mate with the intake fixed port (IFP) (8941) and exhaust fixed port (EFP) (9061) respectively.

These elements all work in concert to affect a flow of gas molecules into and then out of the CCH (15354). Once the mated alignment of the respective fixed ports and rotating ports has occurred, the said gas flow stops after the valve opening duration of the mated union of the fixed ports and each IVP (7351) and EVP (7659) has ended.

During the reciprocated operation of the PDT (1750), the present invention is further enhanced by the reciprocated modulating operation of at least one intake MSV (IMV) (1740) comprising an IMF (8147) and at least one exhaust MSV (EMV) (1760) comprising an EMF (8167) which both operate a continuous reciprocated positioning of their respective intake MSV blade (IMB) (11342) and exhaust MSV blade (EMB) (11662) so as to continuously pierce into the IFP (8941) and EFP (9061) respectively, thus varying the relative size geometry of the fixed ports and creating an obstruction to the molecular flow characteristic.

The continuous reciprocated operation of the respective MSV blades, IMB (11342) and EMB (11662) creates a delay or divergence of the flow of gas molecules that are flowing through the fixed intake and exhaust passageways into and out of the CCH (15354). This delay to the flow is controlled by the load being imposed on the ICE as indicated by the present or absence of vacuum in the intake stream. A heavy load would require more molecules to flow whereas a light load would require less.

The MSV can be configured to control its operation on the presence or absence of manifold, throttle or venturi vacuum. These various vacuum sources only occur in significant levels at specific points on the ICE that follows and reflects the operating range of the ICE:

- manifold vacuum—most pronounced at idle and just off idle operations
- throttle vacuum—is vacuum that is activated by the movement of the throttle plate or the lack thereof. It is sometimes referred to as a vacuum switch.
- venturi vacuum—most pronounced at high cruise speeds and snap throttle operations We can use manifold, throttle or venturi vacuum through a series of switches analogously or monitored with digital transducers to provide control as a subroutine of a microprocessor controller.

The MSV affords a delay in the flow of the molecules into or out of the CCH (15354). This delay is caused by the MSV presenting itself by "piercing" into the intake or exhaust fixed ports passageways. Once inserted, the molecules will have to go around it in order to complete their travel path, thus creating a timing delay. The MSV is found placed in close proximity in between the CCH (15354) and the rotary valve port element. There are limitless configurative possibilities for the placement or operational characteristic of the MSV.

Rudimentary Engine Block Power Drive Train (PDT) Assembly (6500)-(7200)

The Power Drive Train (PDT) assembly (1750) is generally depicted in FIG. 65 (6500)-FIG. 72 (7200). The PDT assembly provides the transmittal support for the rotational drive of the IVD (1752) and EVD (1758). The PDT comprises the crankshaft (CRK) (1755), piston (RPI) (1707), multi-staged valve, intake (IMV) (1740) and exhaust (EMV) (1760), rotary valve disc, intake (IVD) (1752) and exhaust (EVD) (1758) and the gear coupling linkage as is depicted in FIG. 65 (6500)-FIG. 72 (7200).

The PDT (1750) may incorporate an oil pump (not shown in the drawings) or other pressurized lubrication system wherever there are two or more gears that are meshed together such that a flow of oil can be initialized by the interactive movement of the gears as is well known to those skilled in the art.

The PDT (1750) may also incorporate a water/coolant pump (not shown in the drawings) or other pressurized water/coolant system that are well known to those skilled in the art.

The PDT (1750) may incorporate an oil or coolant filtration system (not shown in the drawings) or other pressurized oil or coolant filtration system that are well known to those skilled in the art.

The PDT (1750) may incorporate an additive injection system on both the intake or exhaust sides of the CCH (15354) such as water or other substance element (not shown in the drawings) or other pressurized additive injection element system that are well known to those skilled in the art as being a facilitative enhancement to the naturally aspirated ICE operation.

Rudimentary Engine Block Multi-Staged Valve (MSV) apparatus Intake (IMV) and Exhaust (EMV) (10500)-(12000)

Figure 105:
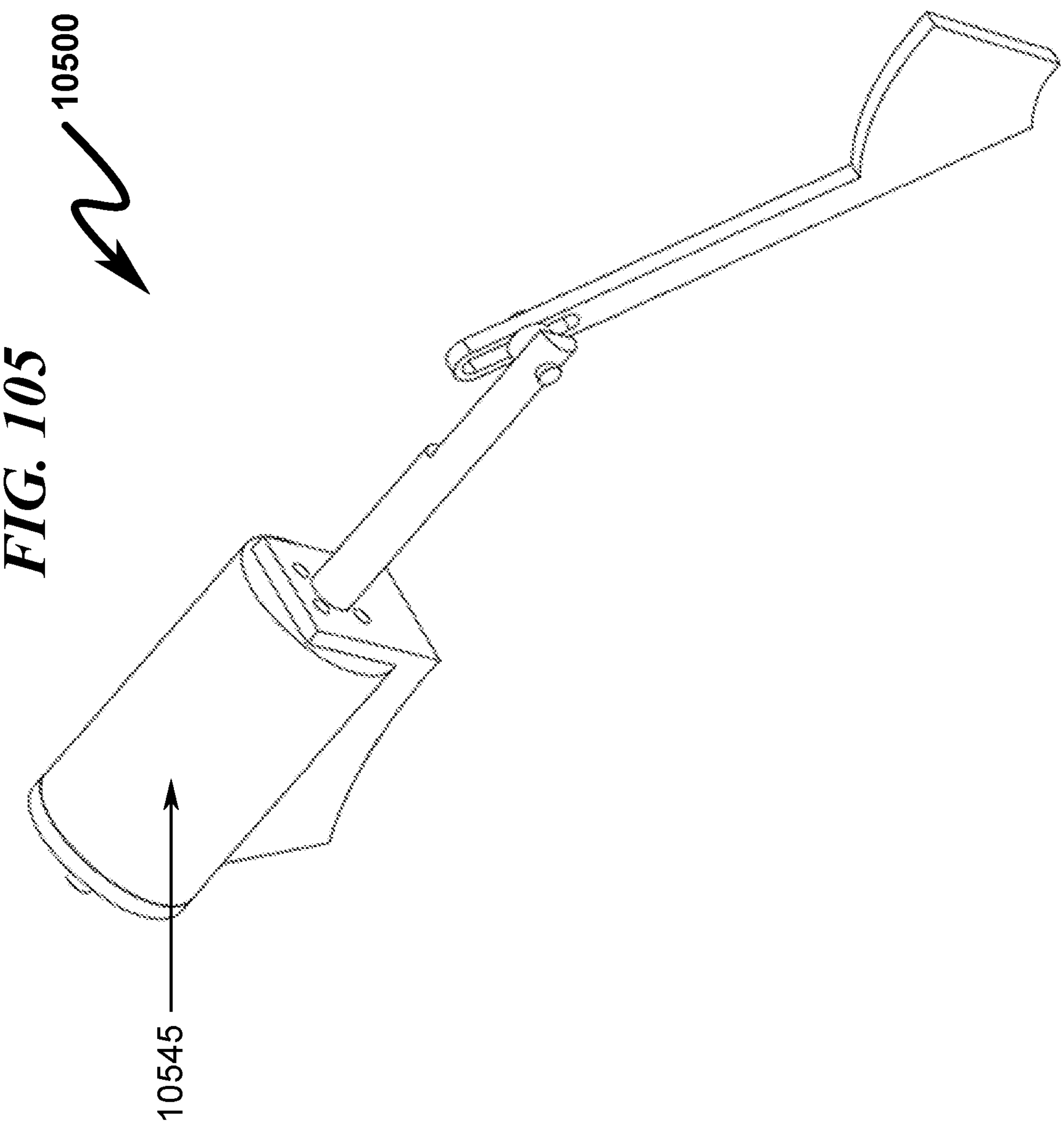
FIG. 105 illustrates a top left front perspective isometric view of a multi-staged valve (MSV) assembly embodiment of a preferred exemplary invention system embodiment.
Figure 106:
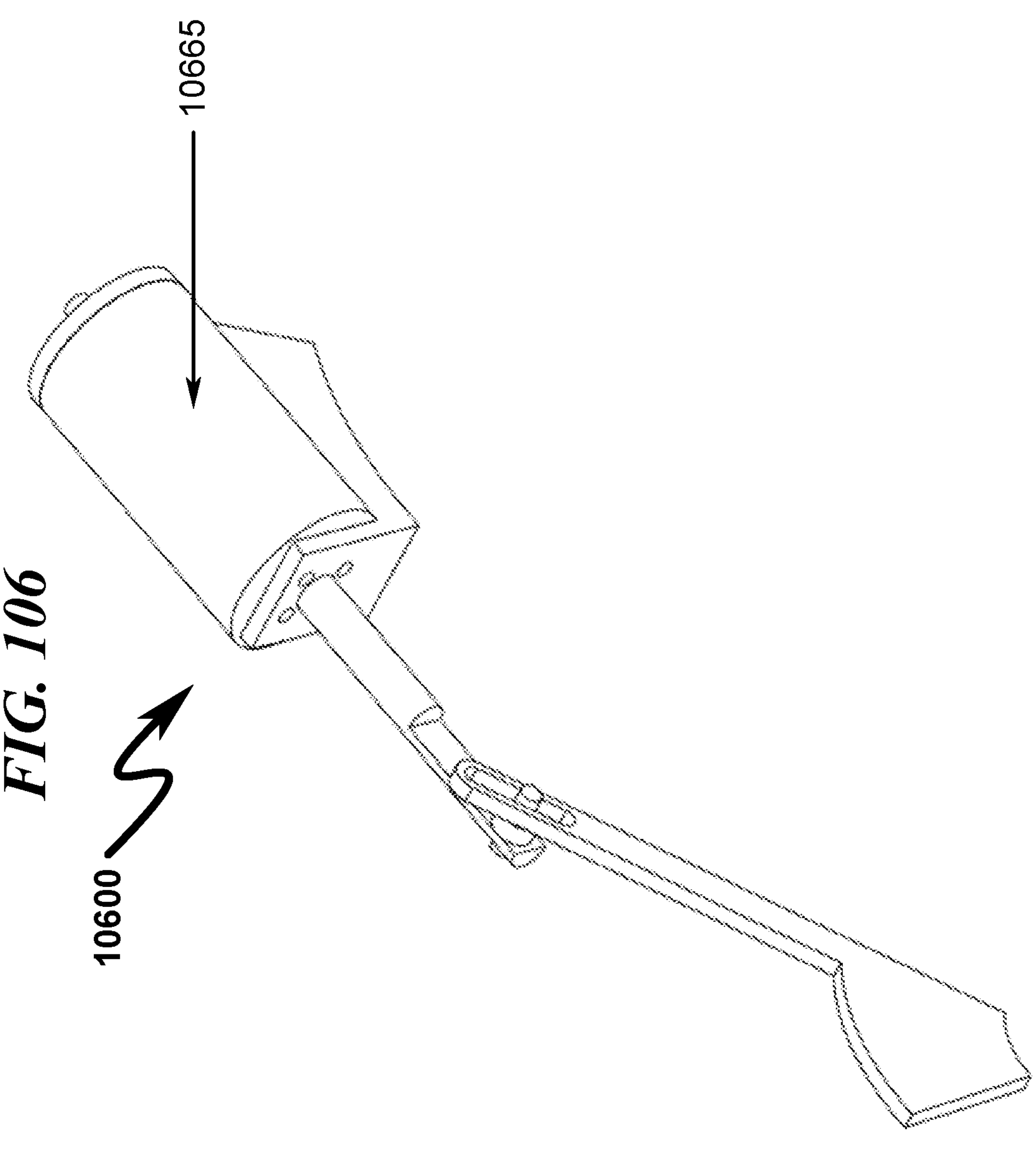
FIG. 106 illustrates a top right rear perspective isometric view of a multi-staged valve (MSV) assembly embodiment of a preferred exemplary invention system embodiment.
Figure 107:
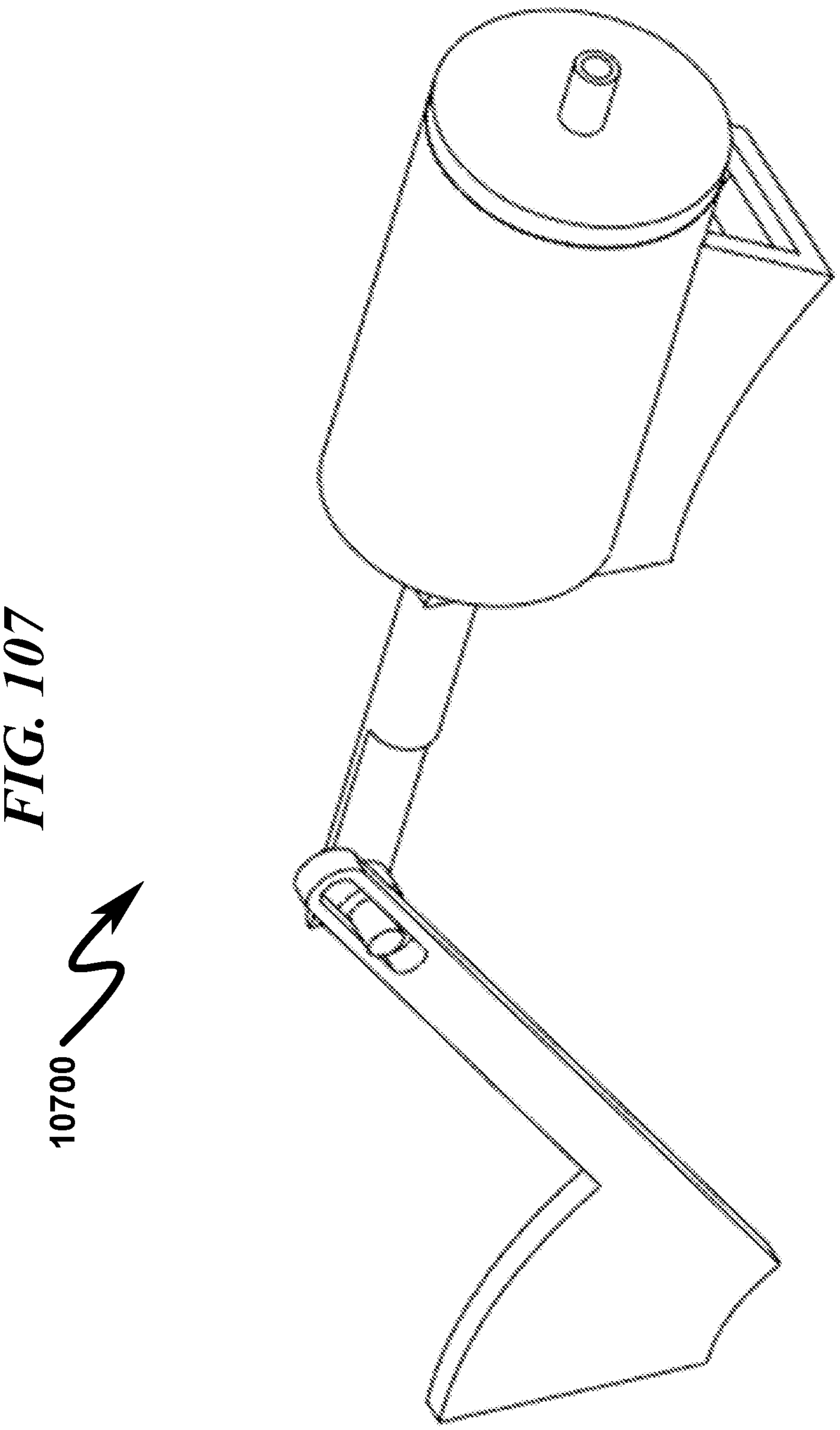
FIG. 107 illustrates a top left rear perspective isometric view of a multi-staged valve (MSV) assembly embodiment of a preferred exemplary invention system embodiment.
Figure 108:
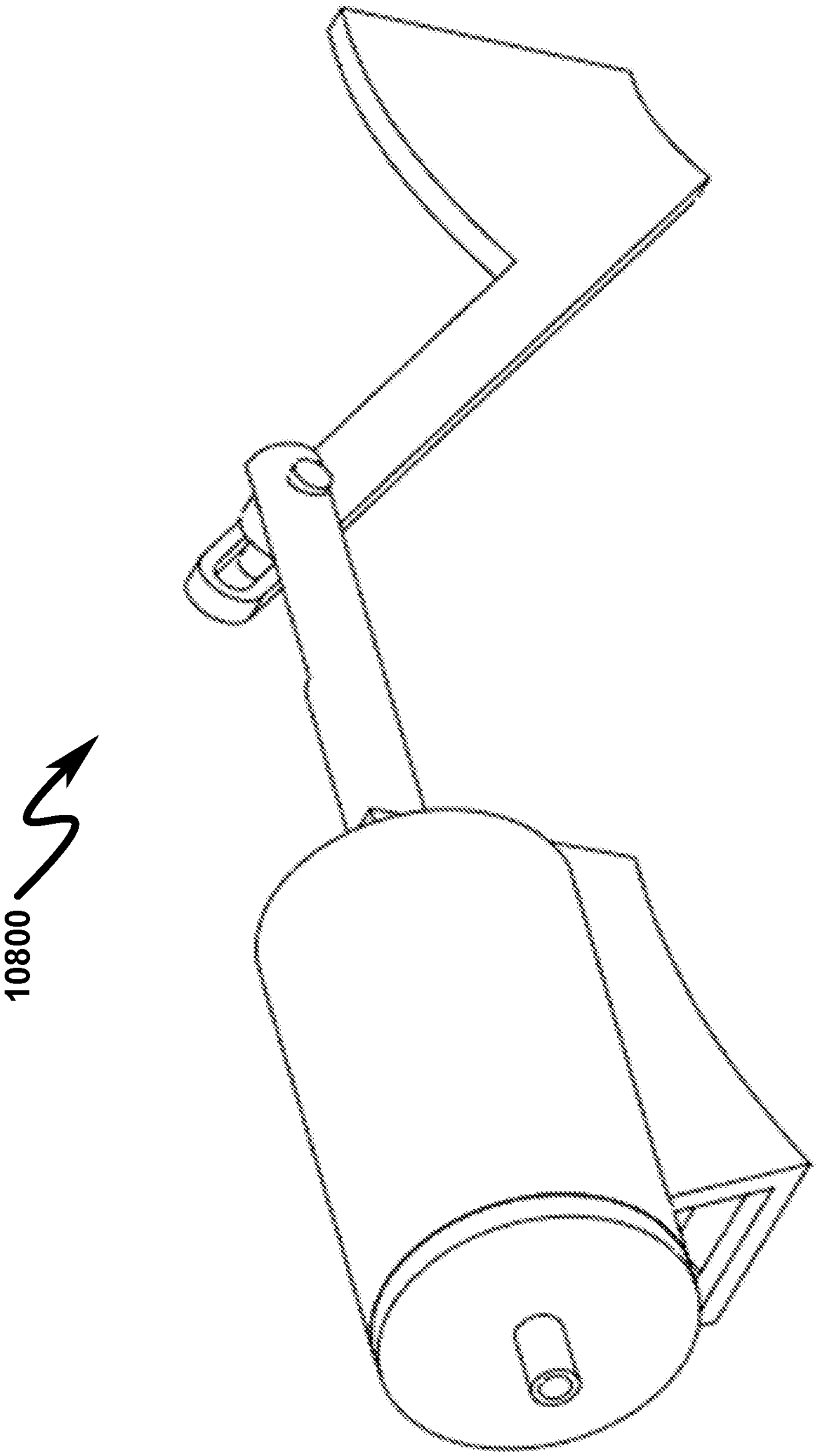
FIG. 108 illustrates a top right front perspective isometric view of a multi-staged valve (MSV) assembly embodiment of a preferred exemplary invention system embodiment.
Figure 109:
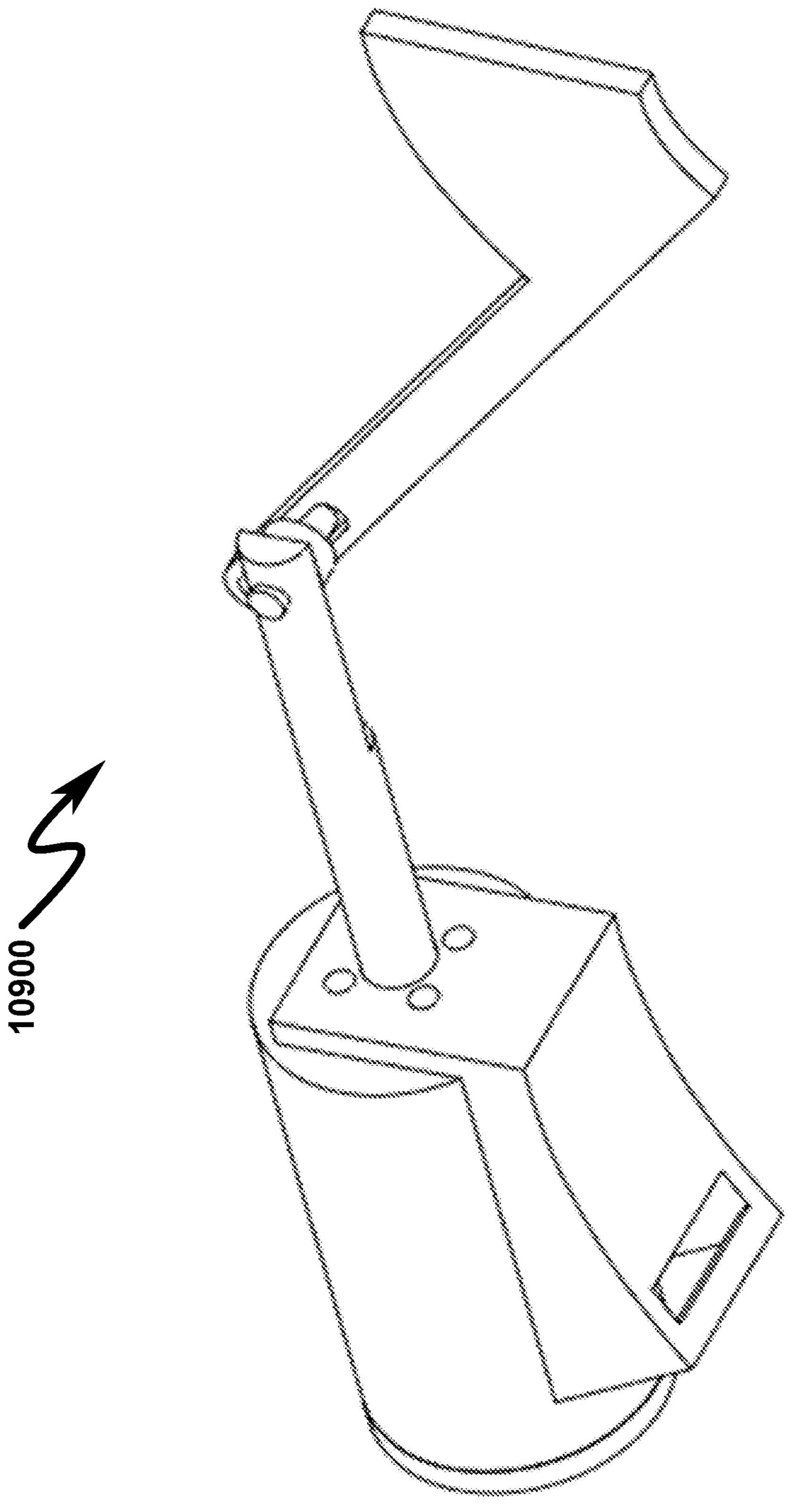
FIG. 109 illustrates a bottom left front perspective isometric view of a multi-staged valve (MSV) assembly embodiment of a preferred exemplary invention system embodiment.
Figure 110:
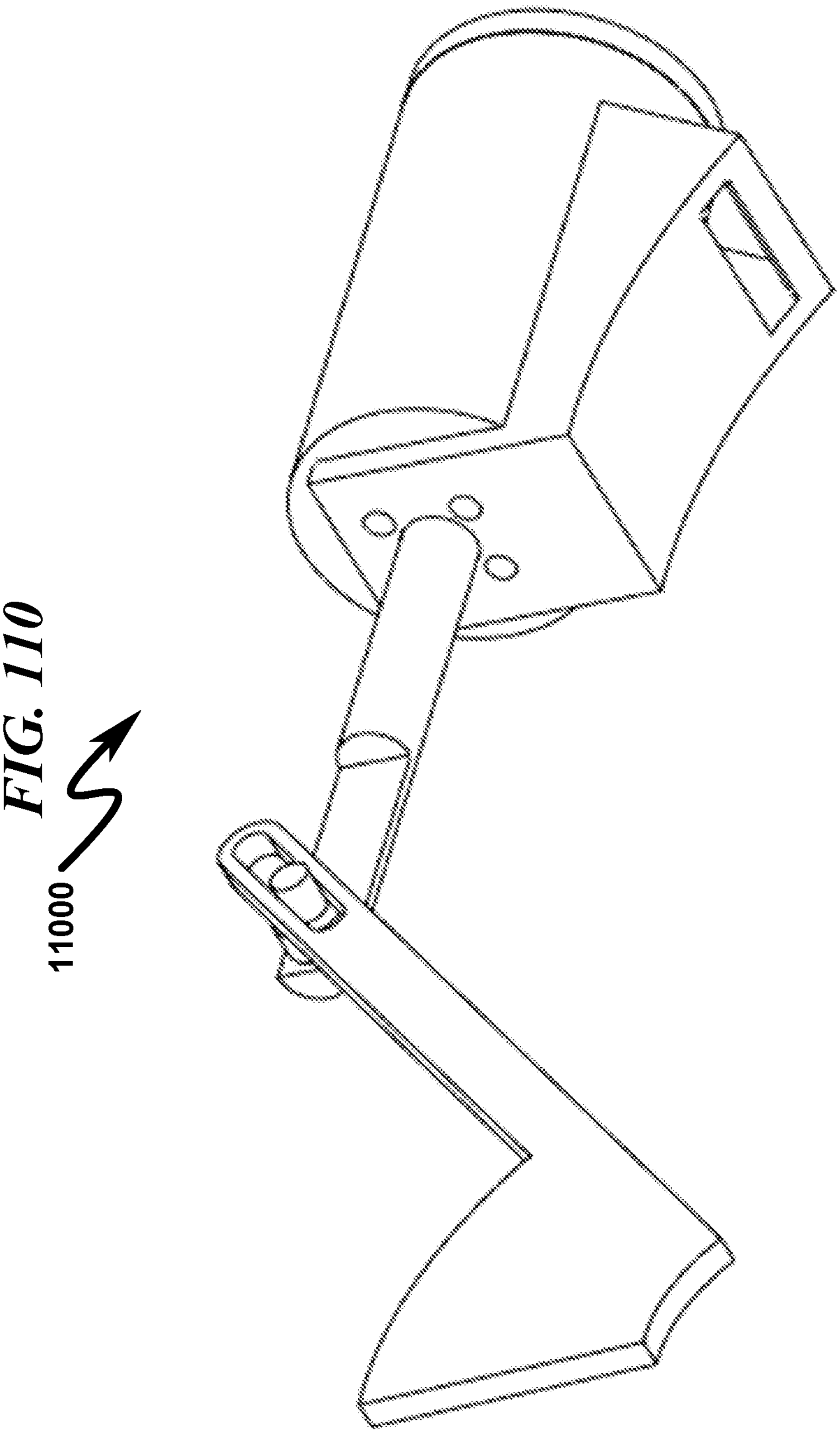
FIG. 110 illustrates a bottom right rear perspective isometric view of a multi-staged valve (MSV) assembly embodiment of a preferred exemplary invention system embodiment.
Figure 111:
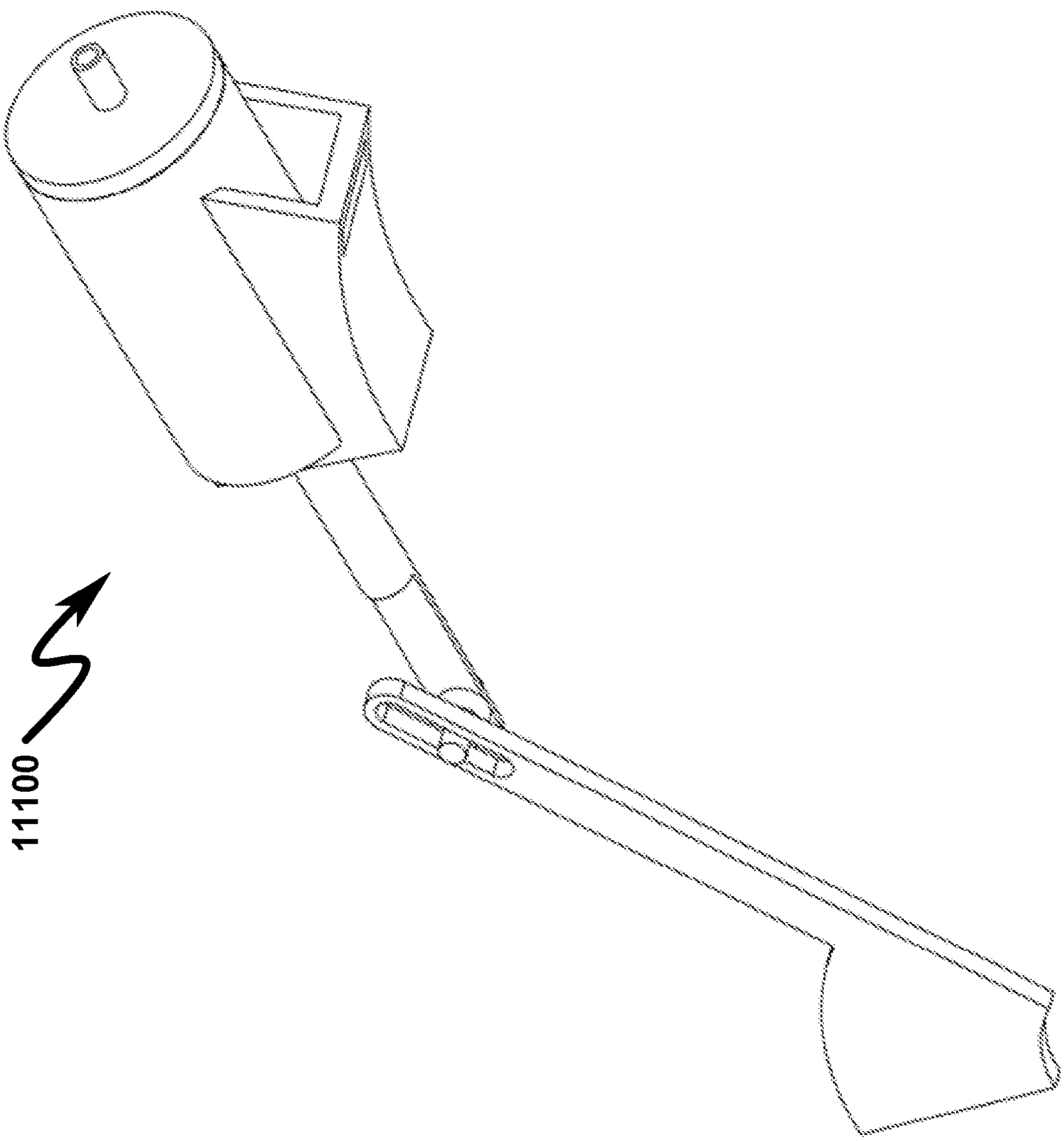
FIG. 111 illustrates a bottom left rear perspective isometric view of a multi-staged valve (MSV) assembly embodiment of a preferred exemplary invention system embodiment.
Figure 112:
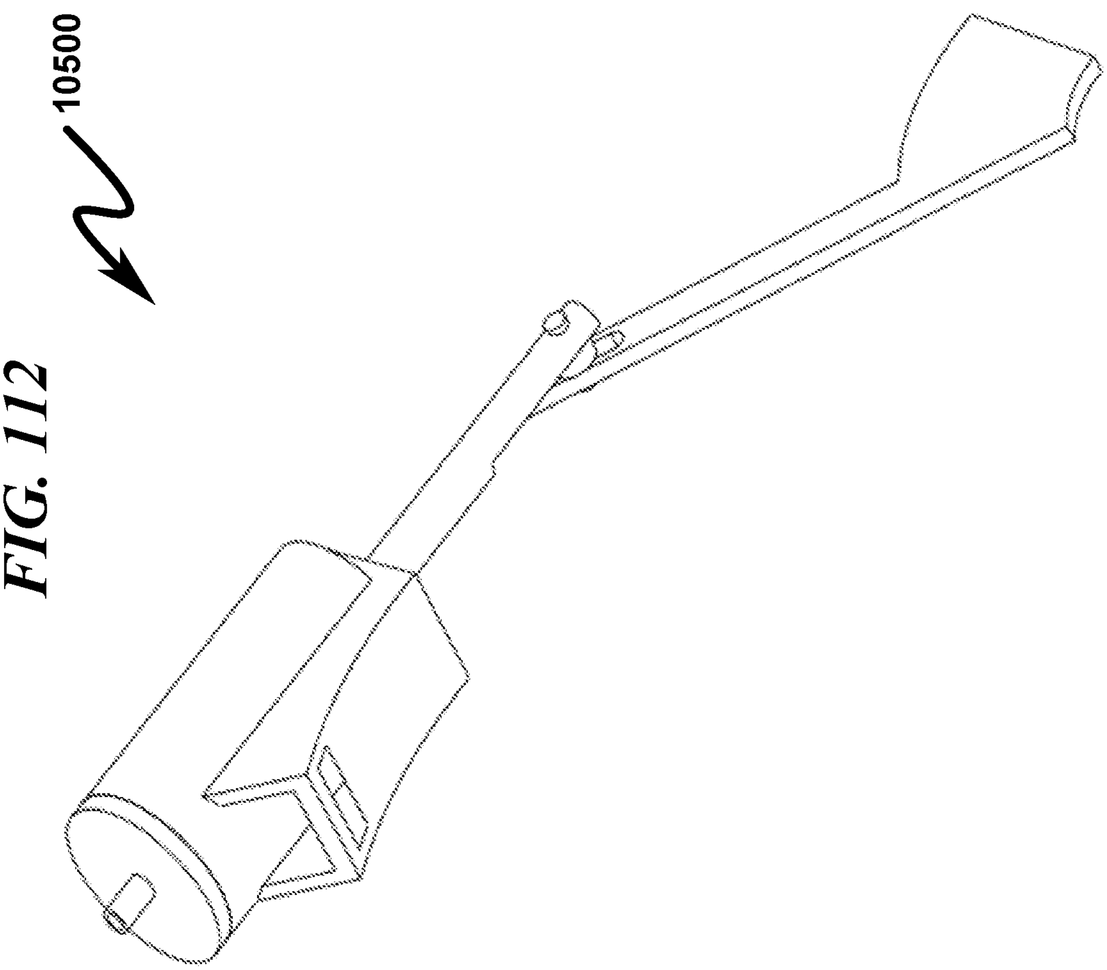
FIG. 112 illustrates a bottom right front perspective isometric view of a multi-staged valve (MSV) assembly embodiment of a preferred exemplary invention system embodiment.
Figure 113:
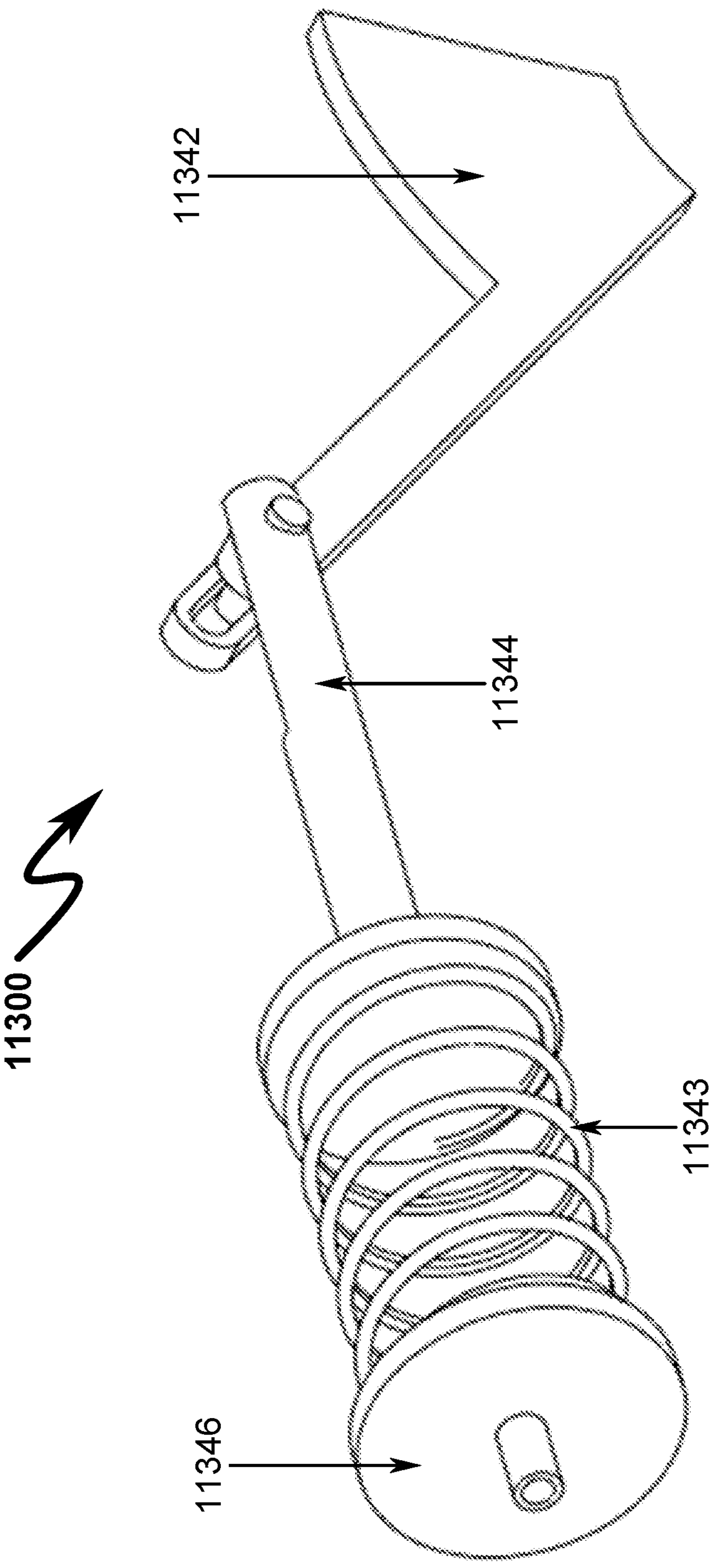
FIG. 113 illustrates a top right front perspective isometric view of an internal construction of a multi-staged valve (MSV) assembly embodiment of a preferred exemplary invention system embodiment.
Figure 114:
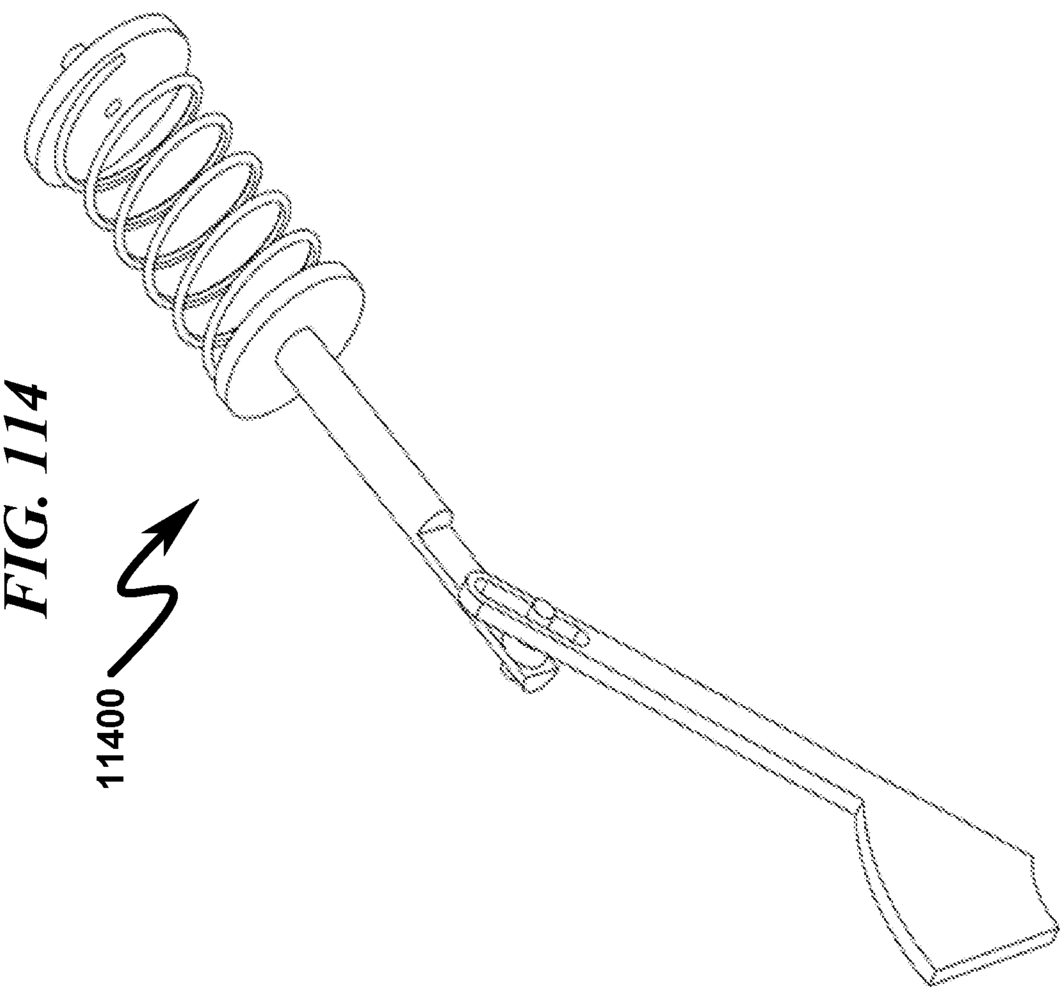
FIG. 114 illustrates a top right rear perspective isometric view of an internal construction of a multi-staged valve (MSV) assembly embodiment of a preferred exemplary invention system embodiment.
Figure 115:
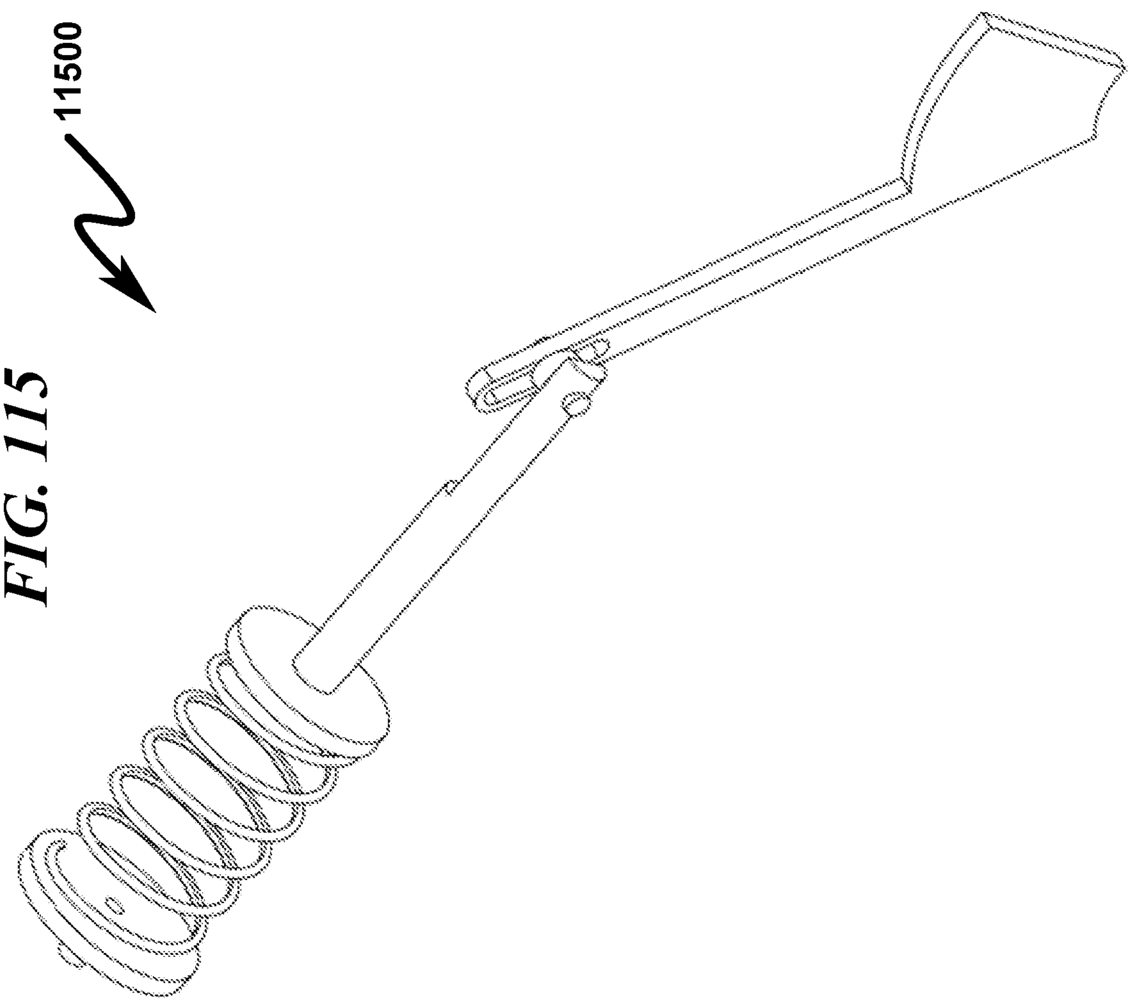
FIG. 115 illustrates a top left front perspective isometric view of an internal construction of a multi-staged valve (MSV) assembly embodiment of a preferred exemplary invention system embodiment.
Figure 116:
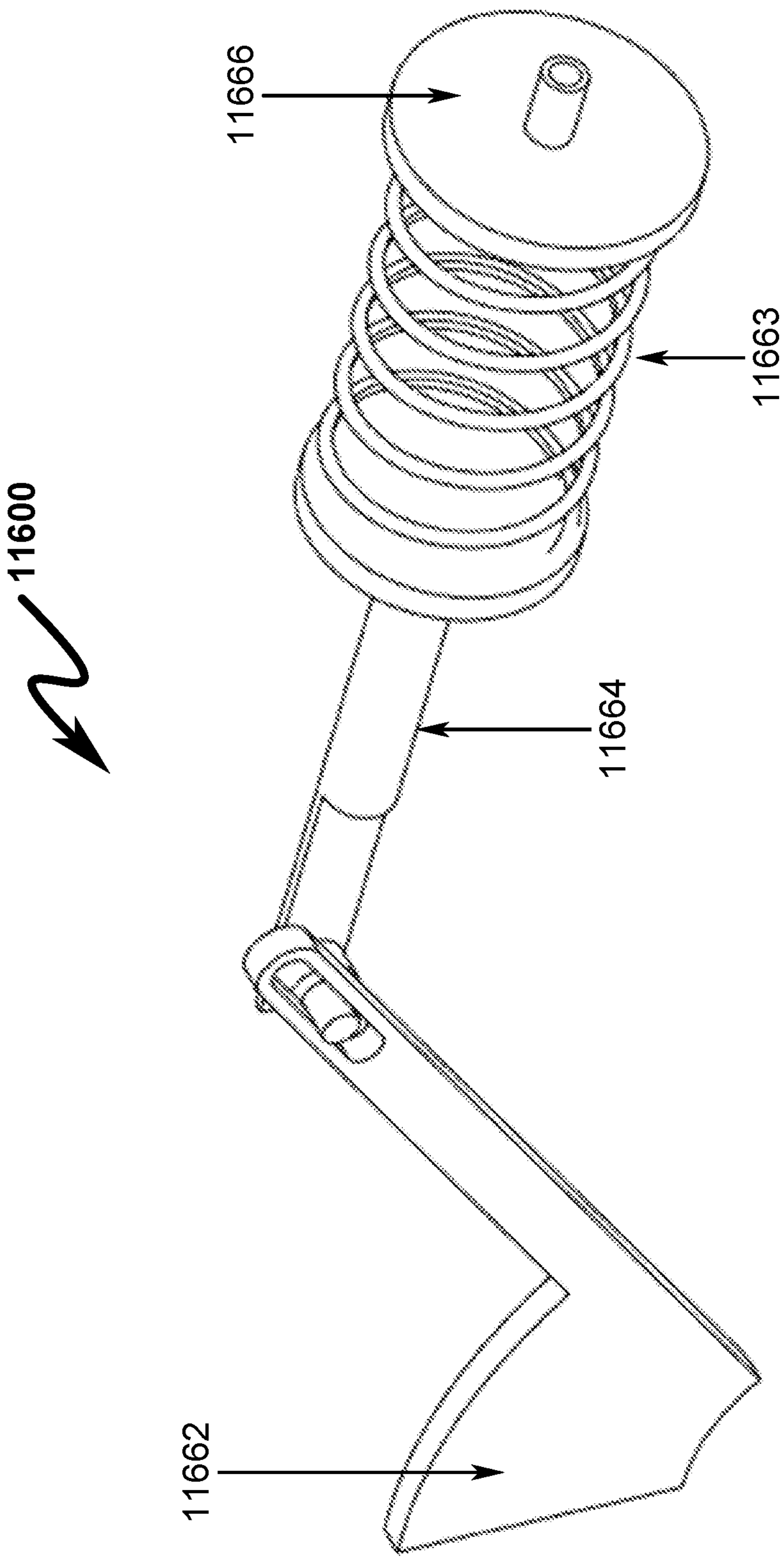
FIG. 116 illustrates a top left rear perspective isometric view of an internal construction of a multi-staged valve (MSV) assembly embodiment of a preferred exemplary invention system embodiment.
Figure 117:
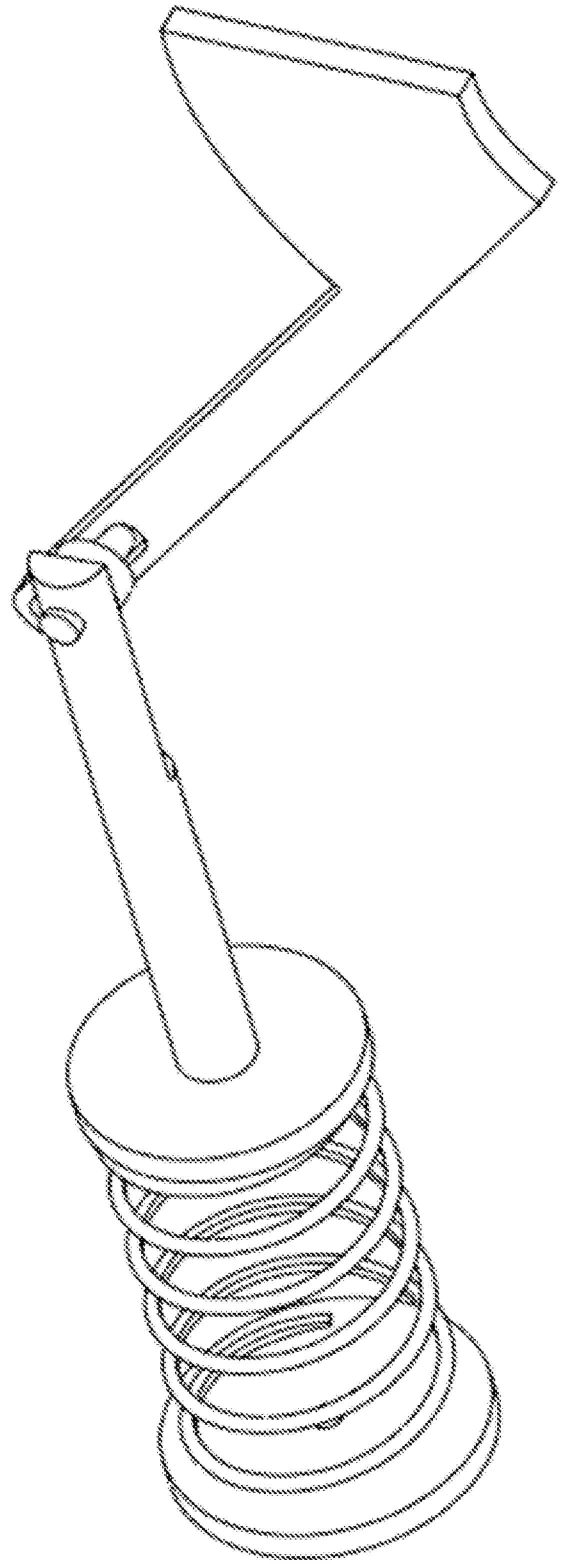
FIG. 117 illustrates a bottom left front perspective isometric view of an internal construction of a multi-staged valve (MSV) assembly embodiment of a preferred exemplary invention system embodiment.
Figure 118:
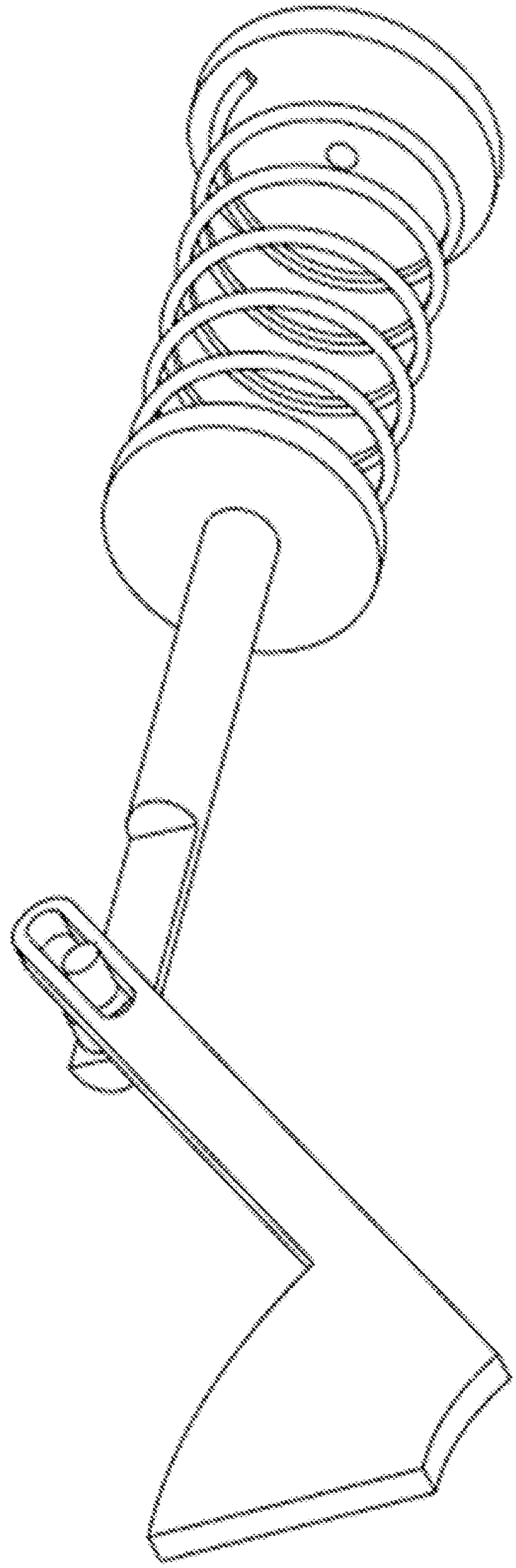
FIG. 118 illustrates a bottom right rear perspective isometric view of an internal construction of a multi-staged valve (MSV) assembly embodiment of a preferred exemplary invention system embodiment.
Figure 119:
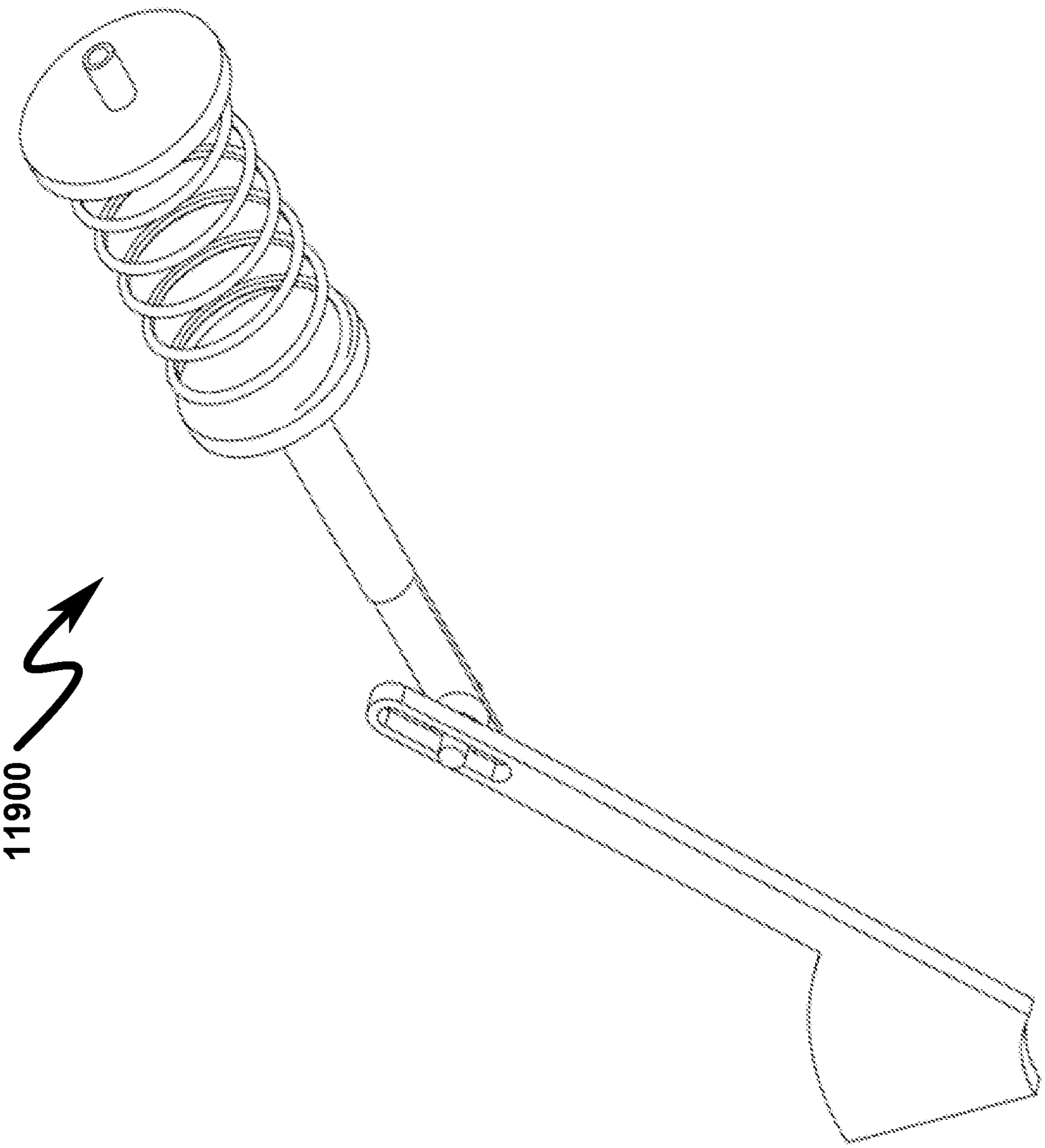
Figure 120:
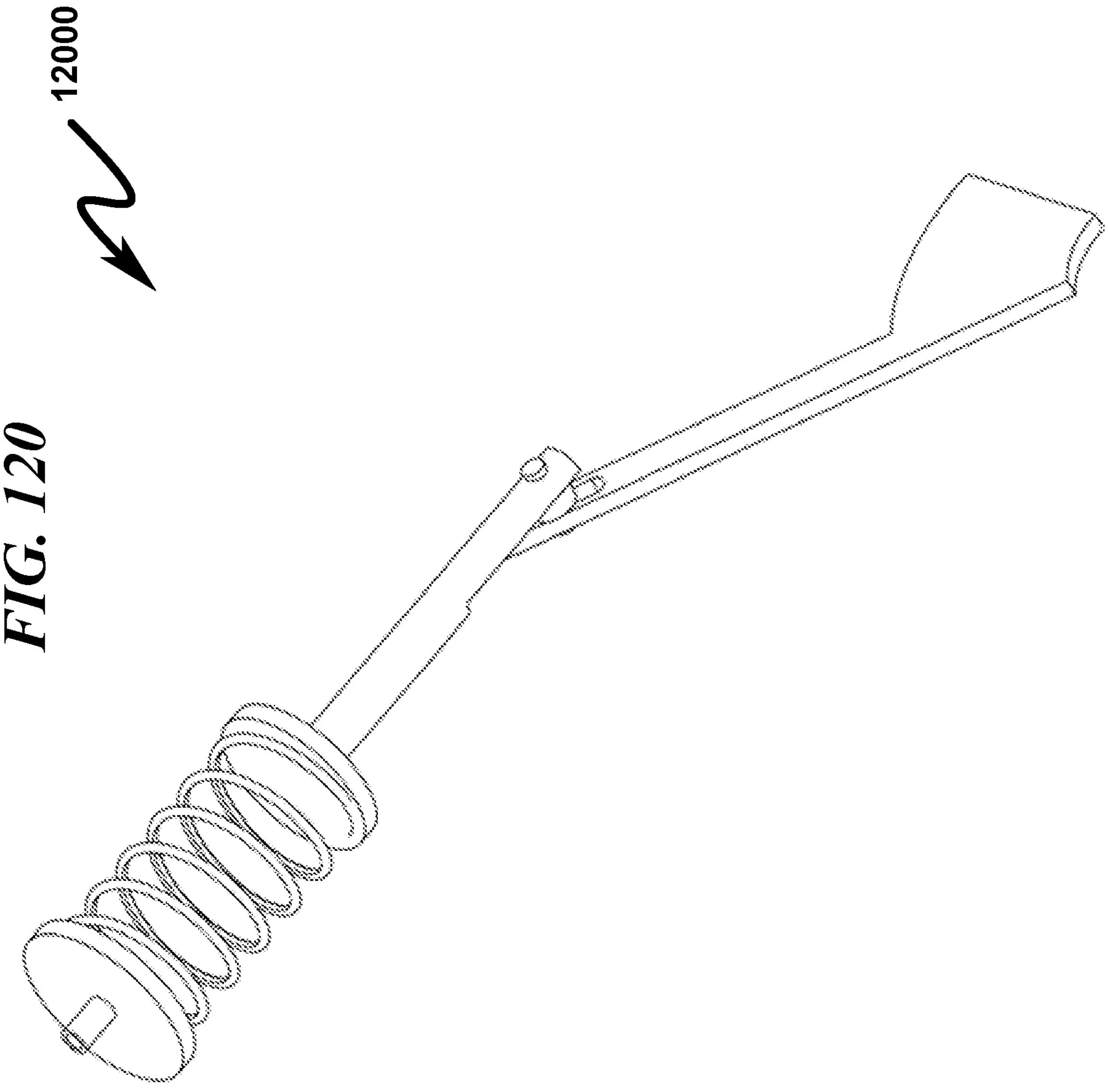

Detail views of the multi-staged valve (MSV) intake (IMV) and exhaust (EMV) embodiments are generally depicted in FIG. 105 (10500)-FIG. 120 (12000).

The IMV (1740) and EMV (1760) primary function is to modulate the inherent intake and exhaust flow of molecules such that a delay or restriction is applied to said flow.

The MSV comprises a blade, intake (IMB) (11342) and exhaust (EMB) (11662), a spring, intake (IMS) (11343) and exhaust (EMS) (11663), and a diaphragm, intake (IMD) (11344) and exhaust (EMD) (11664) such that the blades separately engage ports in the engine block to individually modulate intake into and exhaust out of the CCH (15354) respectively.

This function or effect affords the present invention the ability to cause the effective size of the intake and exhaust fixed port passageways to be altered in a restriction or delay to the molecular flow such that the resultant piercing effect of the MSV acts the same as the operation of changing the size of the relative respective intake or exhaust valve port opening geometry being exercised onto the fixed port passageways.

This delay that is caused by the MSV presenting itself in a sort of "piercing" expression into the fixed intake or exhausts ports passageways and once inserted the molecules will have to go around it in order to complete their travel path, thus creating a timing delay. This has the same effect as reducing the size of a POPPET valve, thus creating a greater or less restriction to the naturally aspirated flow of molecules.

Just as POPPET valve systems require a change of the size of the actual valve and its associative engine head to afford a greater or smaller valve opening to achieve the similar result of the MSV, the present invention affords this ability simply by the addition of the MSV, as is well known to those skilled in the art.

The MSV is an integrally important component in the present invention's valve mechanism/system since it gives the ability to directly adjust the geometry of the relative port opening which will limit or adjust the ICE range of intake performance profile and exhaust emissions profile of the tailpipe.

The IMV (1740) is configured to modulate the induction of air-fuel mixtures into the CCH (15354) such that a greater or lesser molecular flow is modulated by its piercing into the IFP (8961) which effectively varies its relative valve port opening geometry of the IFP (8941) passageways.

This control of the induction can be configured in response to the necessary volumetric efficiency profiles and other regulatory emission regulations owing to limiting or cancelling environmentally harmful particulate matter from being discharged into the atmosphere.

The EMV (1760) is configured to modulate the discharge of the combusted gas molecules from the CCH (15354) such that this flow is altered by the EMV's piercing into the EFP (9061), effectively changing the size of the relative valve port opening geometry of the EFP (9061) passageways.

This control of the discharge can be configured in response to the necessary tailpipe emission regulations owing to limiting or cancelling environmentally harmful particulate matter from being discharged into the atmosphere.

This process is well known to those skilled in the art. However, until now there was no effective mechanism to adjust these exhaust emissions after the manufacture of an ICE.

The MSV is found placed in close proximity in between the CCH (15354) and the rotary valve port element (RVD or RVC). There are limitless configurative possibilities for the placement or operational characteristic of the MSV.

The present invention's IMV (1740) and EMV (1760) are identical. As such, only one needs to be depicted.

Rudimentary System Individual Component Detail (6500)-(12800)

Major system components will now be discussed in detail as depicted in drawings depicted in FIG. 65 (6500)-FIG. 128 (12800).

Engine Block (BLK) (8100)-(8800)

Figure 81:
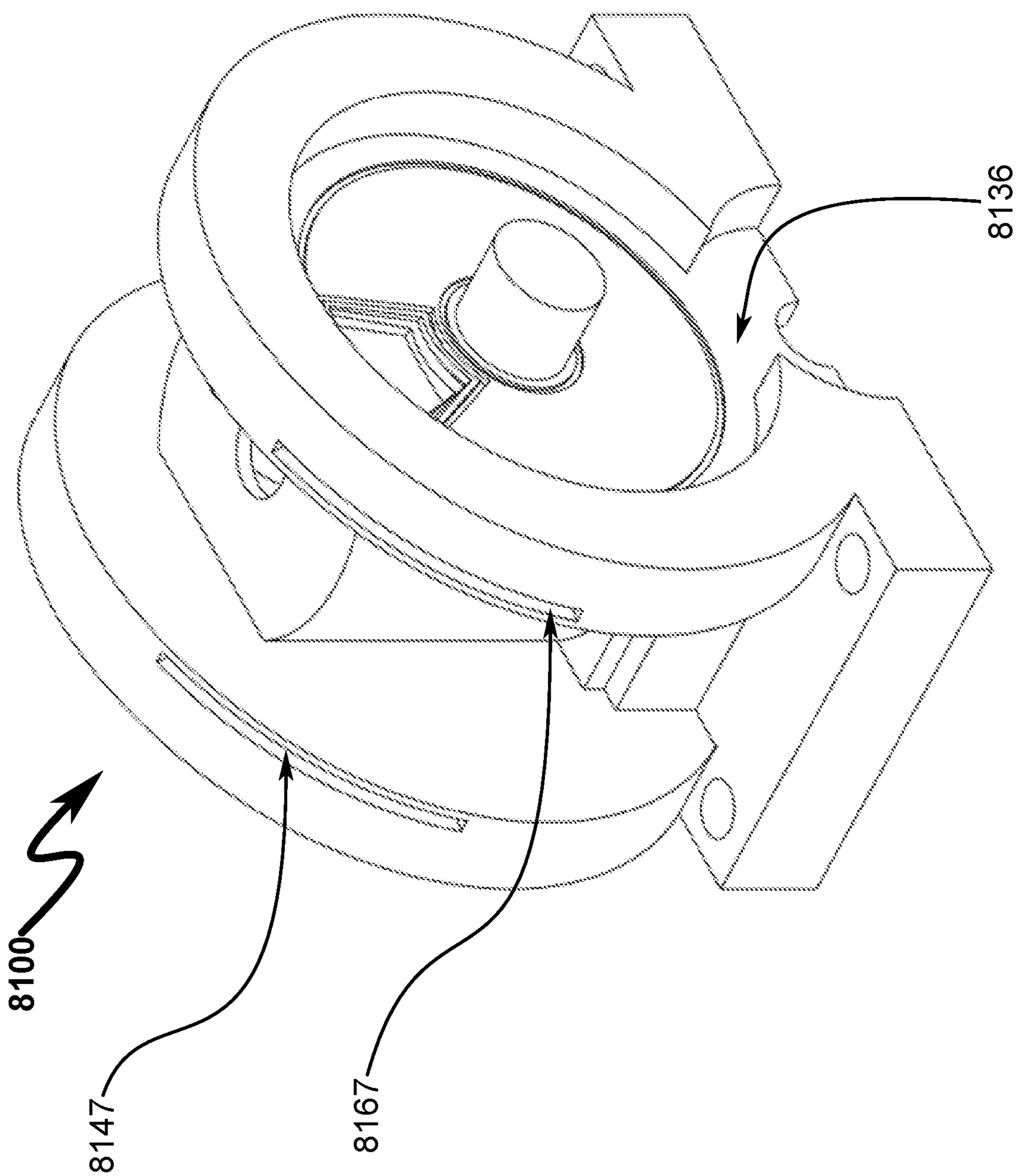
FIG. 81 illustrates a top left front perspective isometric view of an engine block (BLK) system embodiment of a preferred exemplary rudimentary invention system embodiment.
Figure 82:
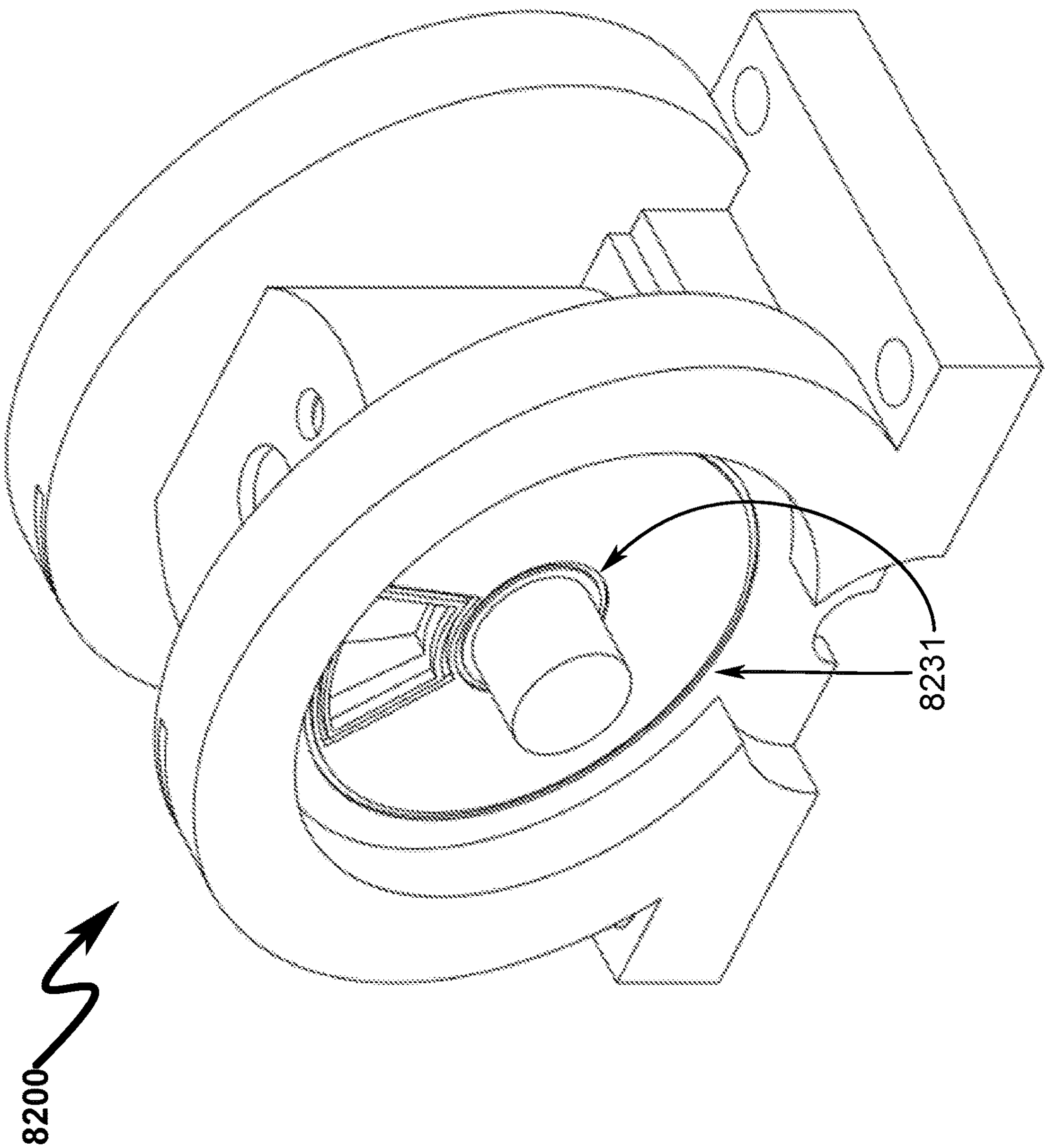
FIG. 82 illustrates a top right rear perspective isometric view of an engine block (BLK) system embodiment of a preferred exemplary rudimentary invention system embodiment.
Figure 83:
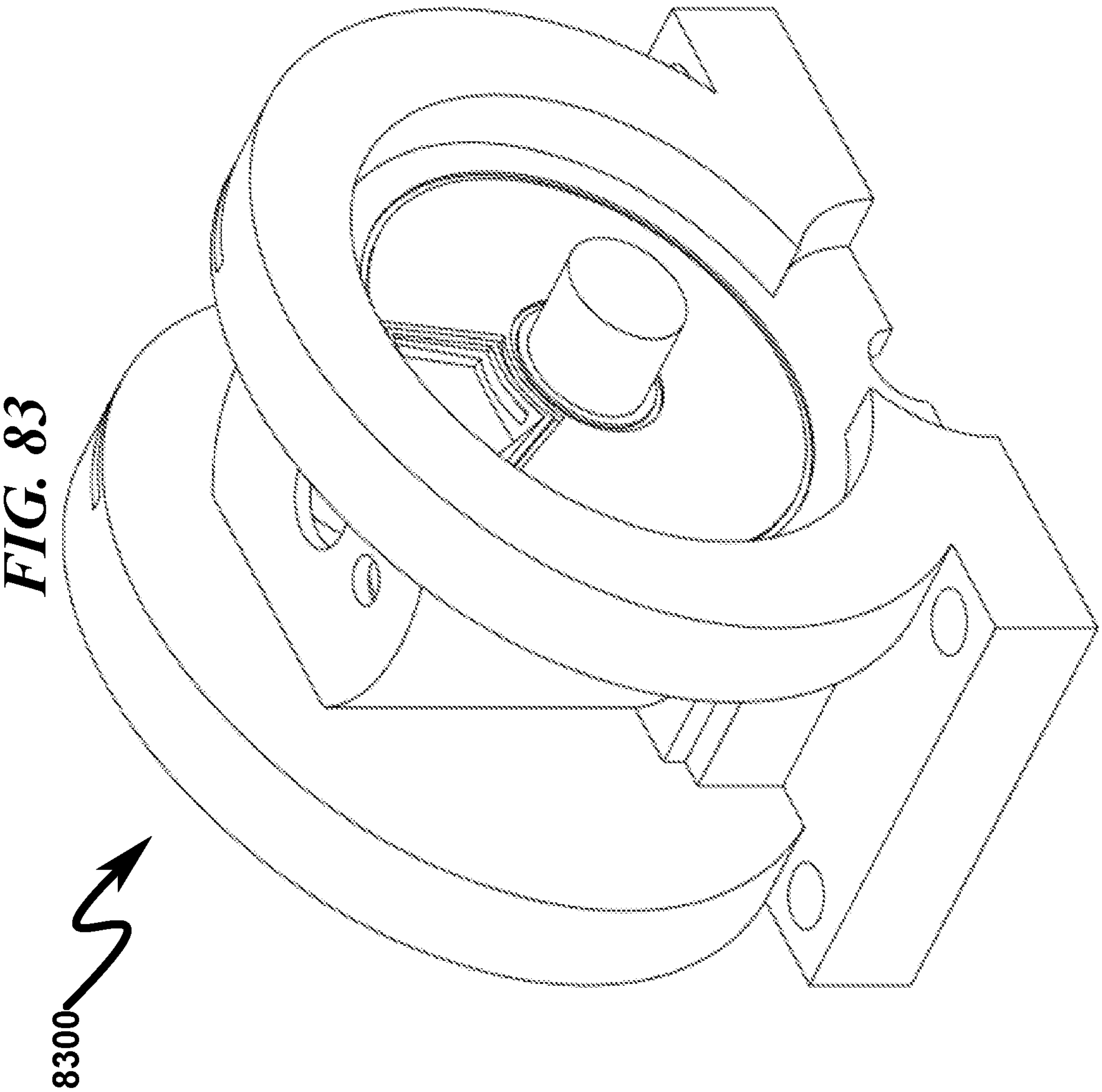
FIG. 83 illustrates a top left rear perspective isometric view of an engine block (BLK) system embodiment of a preferred exemplary rudimentary invention system embodiment.
Figure 84:
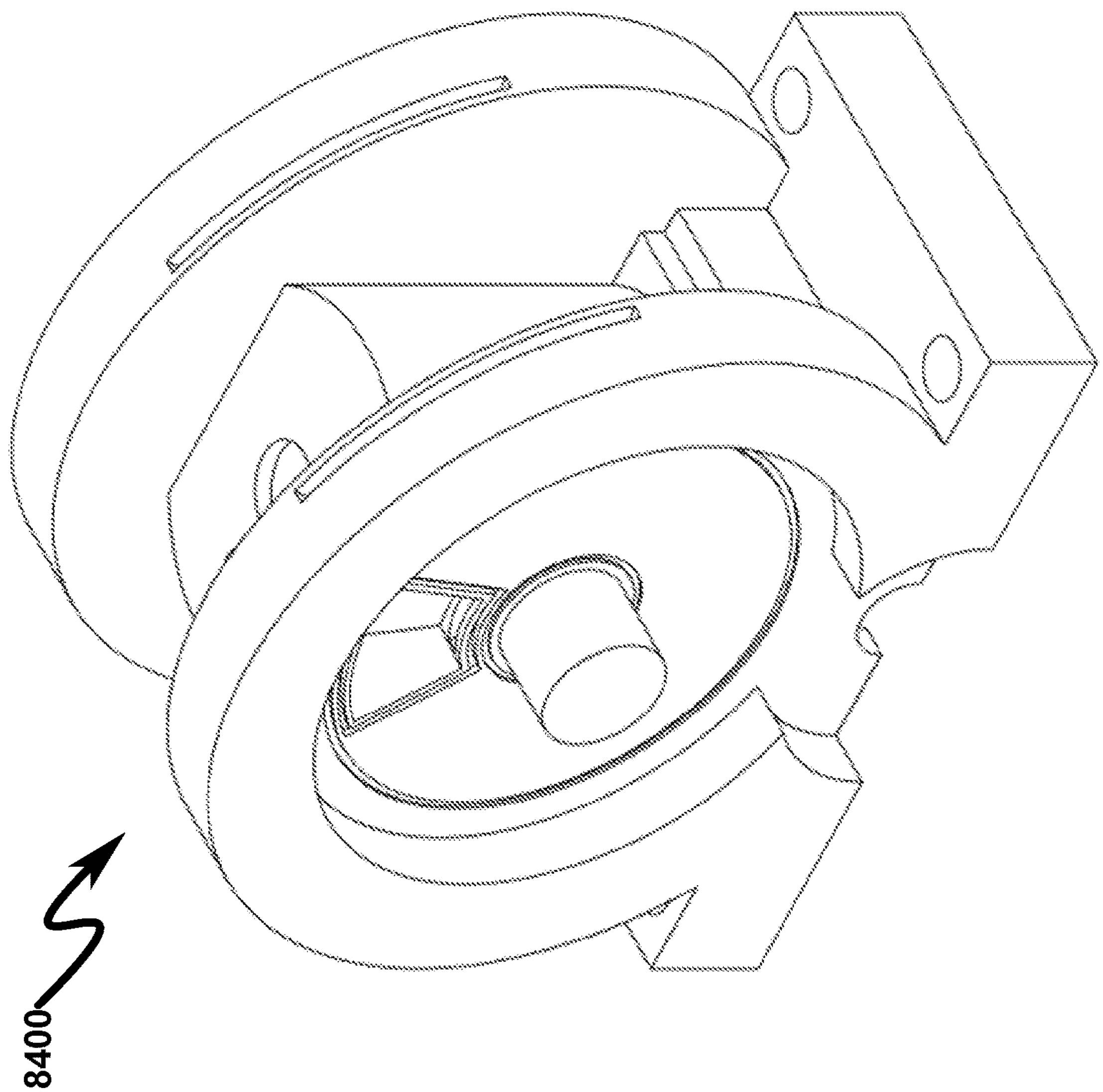
FIG. 84 illustrates a top right front perspective isometric view of an engine block (BLK) system embodiment of a preferred exemplary rudimentary invention system embodiment.
Figure 85:
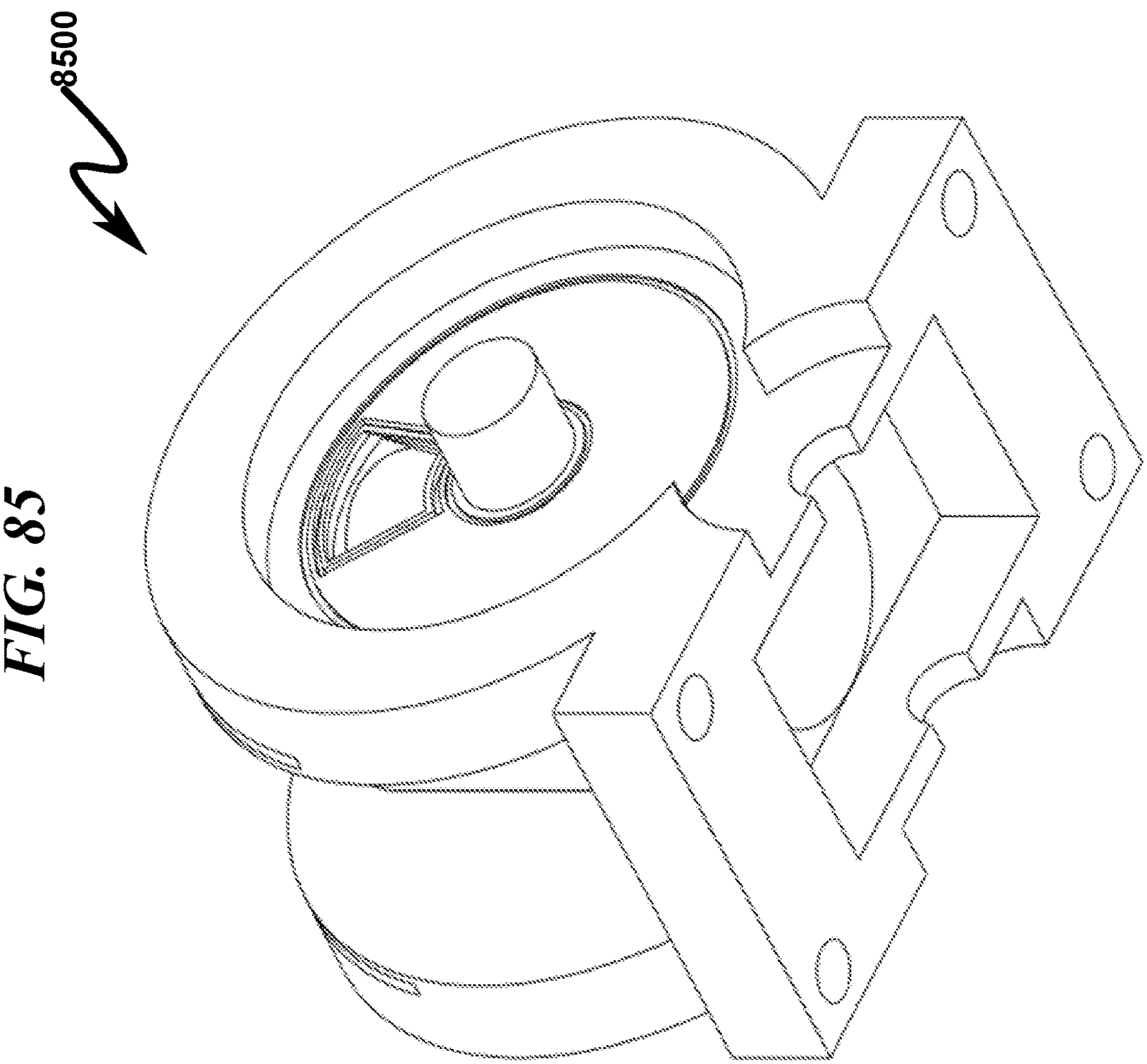
FIG. 85 illustrates a bottom left front perspective isometric view of an engine block (BLK) system embodiment of a preferred exemplary rudimentary invention system embodiment.
Figure 86:
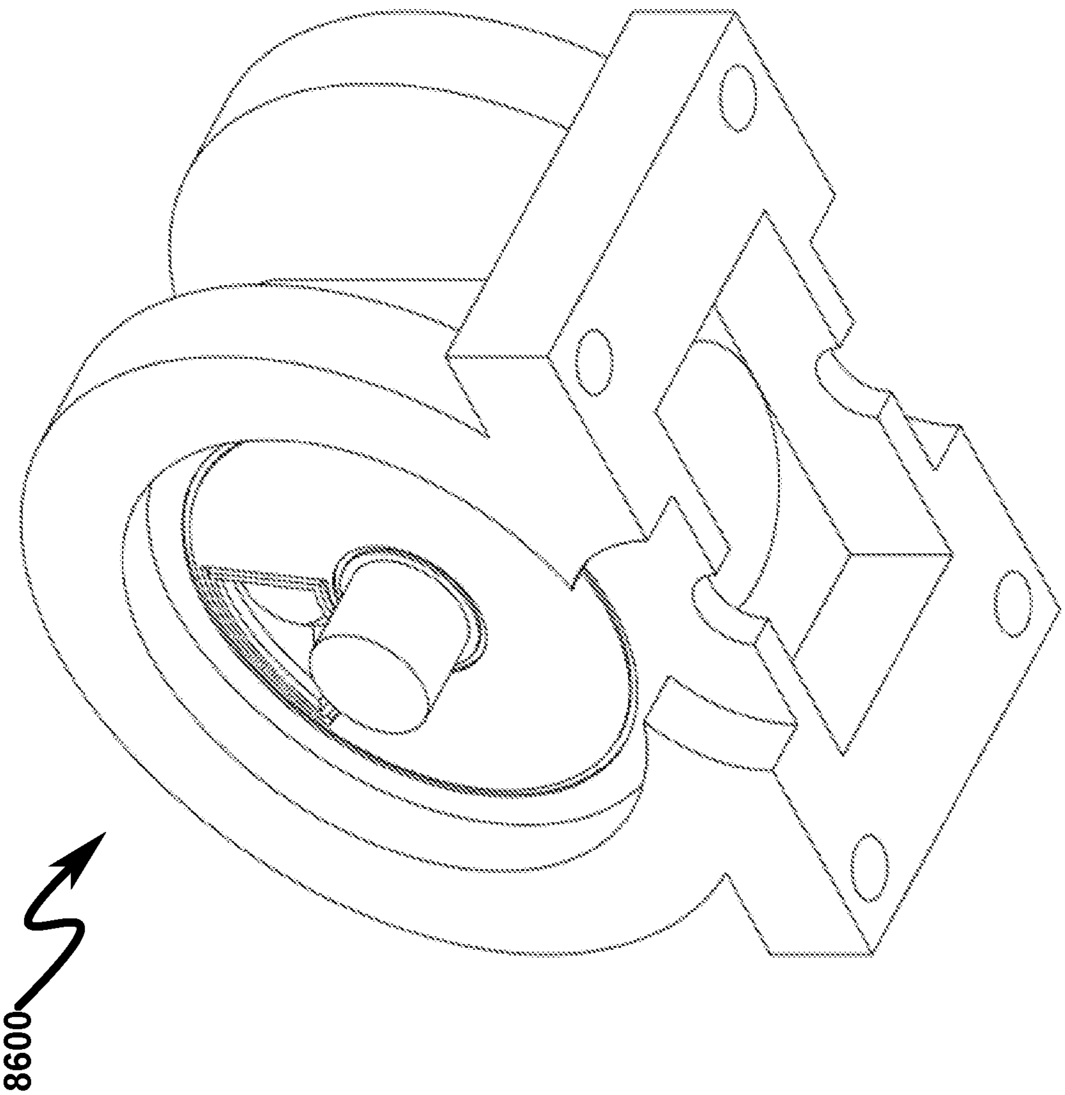
FIG. 86 illustrates a bottom right rear perspective isometric view of an engine block (BLK) system embodiment of a preferred exemplary rudimentary invention system embodiment.
Figure 87:
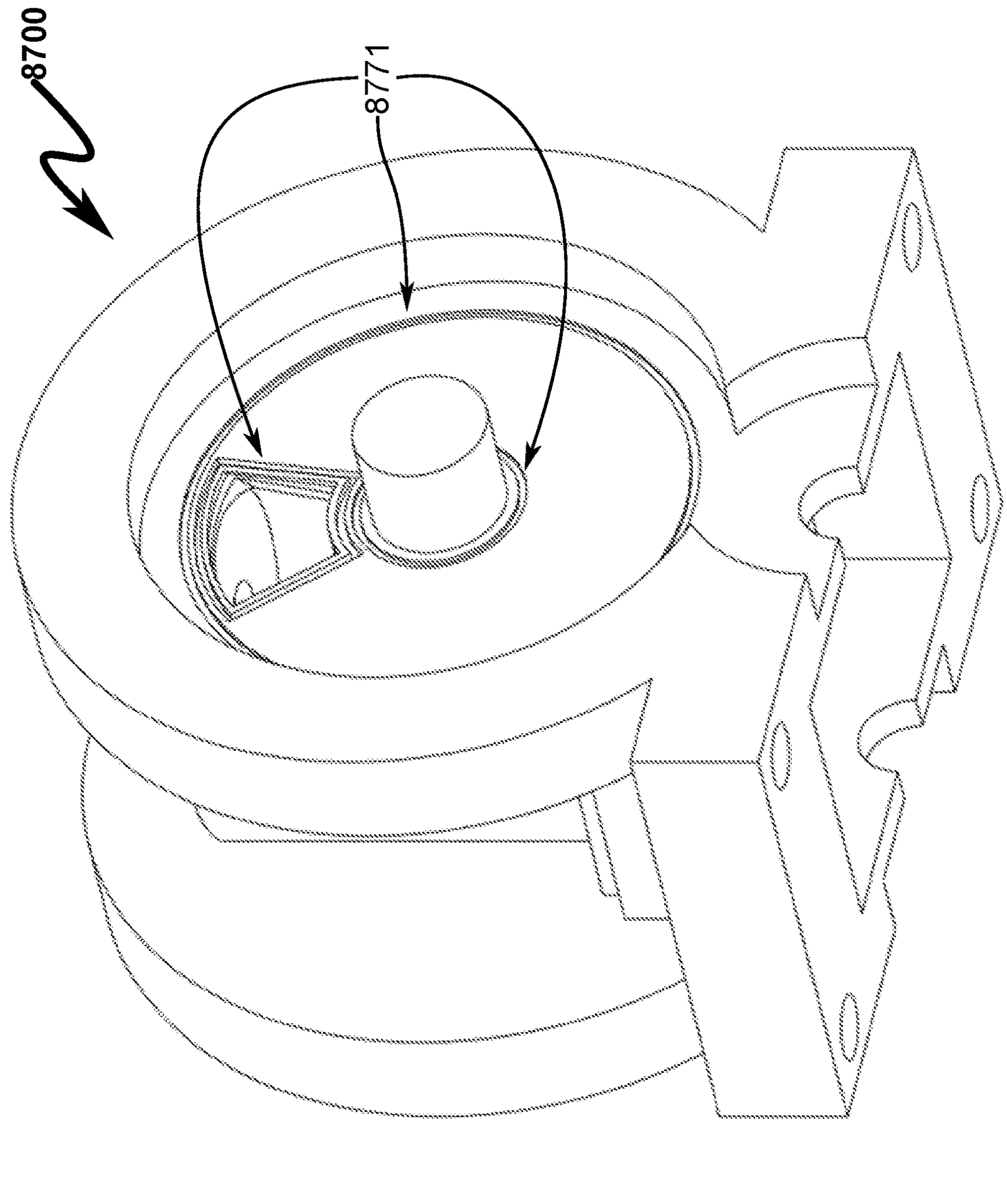
FIG. 87 illustrates a bottom left rear perspective isometric view of an engine block (BLK) system embodiment of a preferred exemplary rudimentary invention system embodiment.
Figure 88:
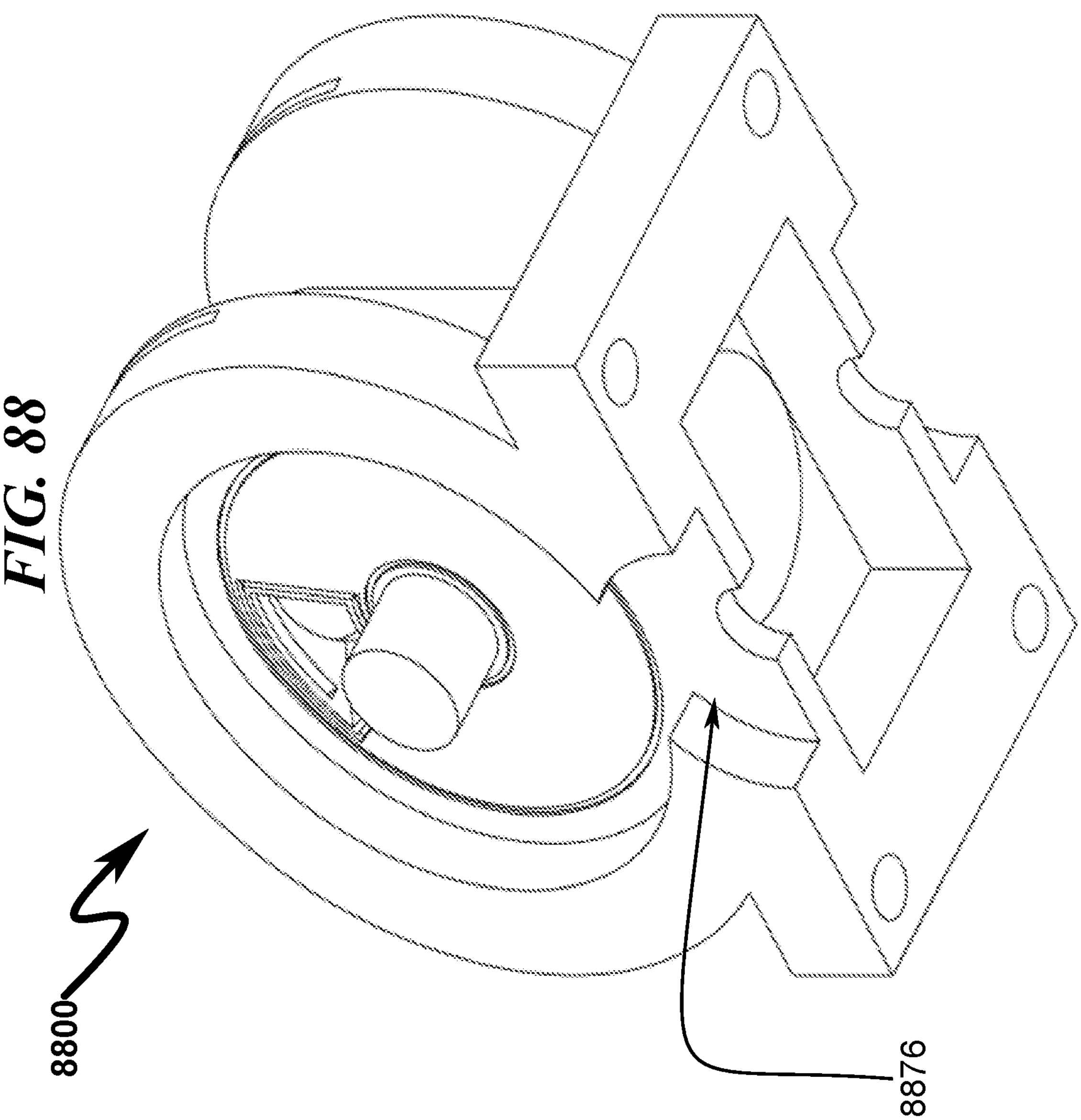
FIG. 88 illustrates a bottom right front perspective isometric view of an engine block (BLK) system embodiment of a preferred exemplary rudimentary invention system embodiment.

The Engine Block (BLK) (1753) is generally depicted in FIG. 81 (8100)-FIG. 88 (8800). The BLK provides the structural support system for the internal and external engine components and accessories.

The BLK (1753) rudimentarily comprises an engine crankcase cover (CKC) (1757), an engine cover, intake (IEC) (1732) and exhaust (EEC) (1772). The IEC (1732) and EEC (1772) may be integral with the intake and exhaust manifolds respectively. The BLK (1753) has at least one intake fixed port (IFP) (8941) and one exhaust fixed port (EFP) (9061) as well as at least one intake multi-staged valve fixed port (IMF) (8147) and one exhaust multi-staged valve fixed port (EMF) (8167).

Engine Crankcase Cover (CKC) (1700)-(2400)

Figure 24:
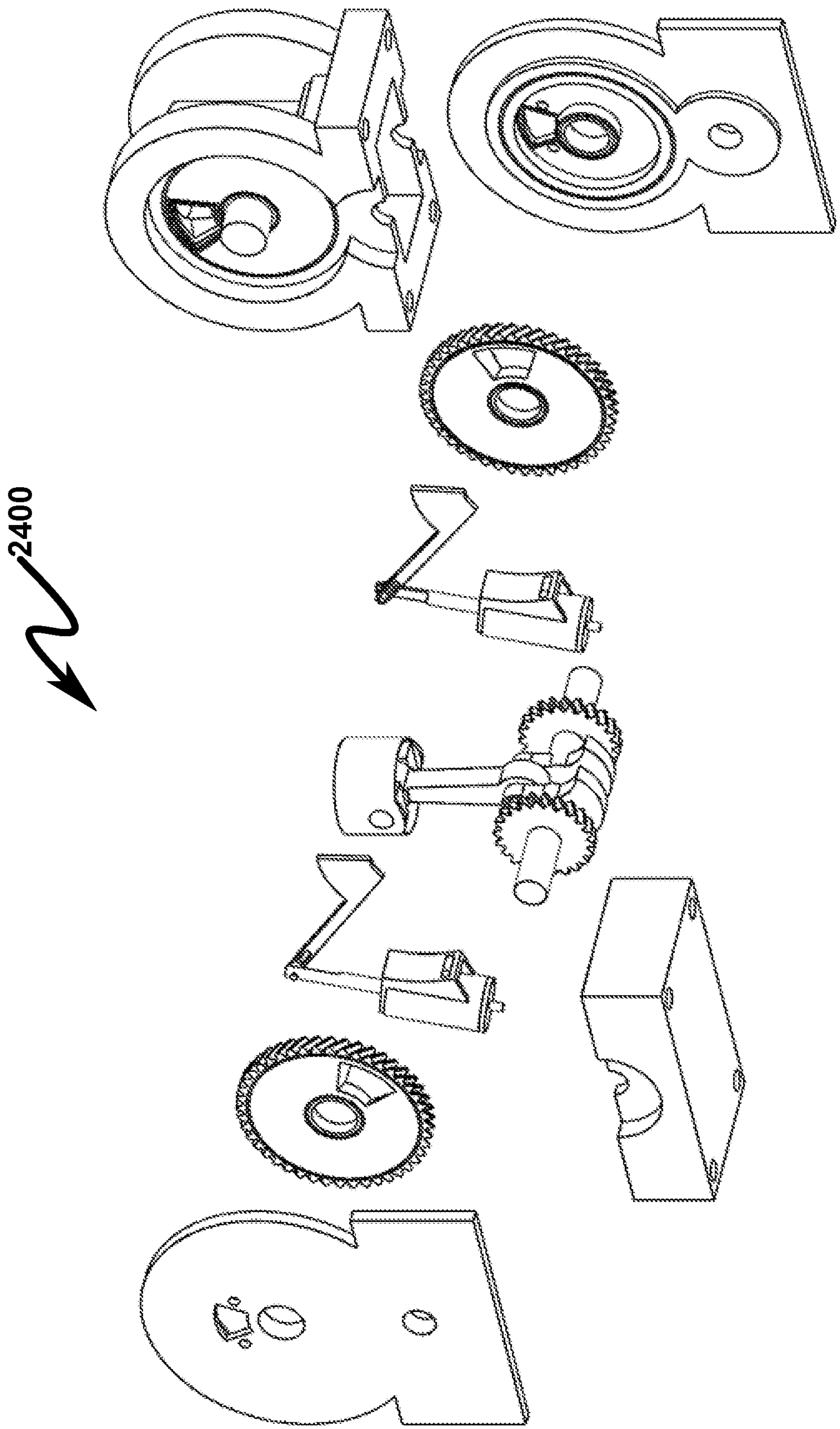
FIG. 24 illustrates a bottom left rear perspective isometric exploded view of a preferred exemplary rudimentary invention system embodiment.
Figure 25:
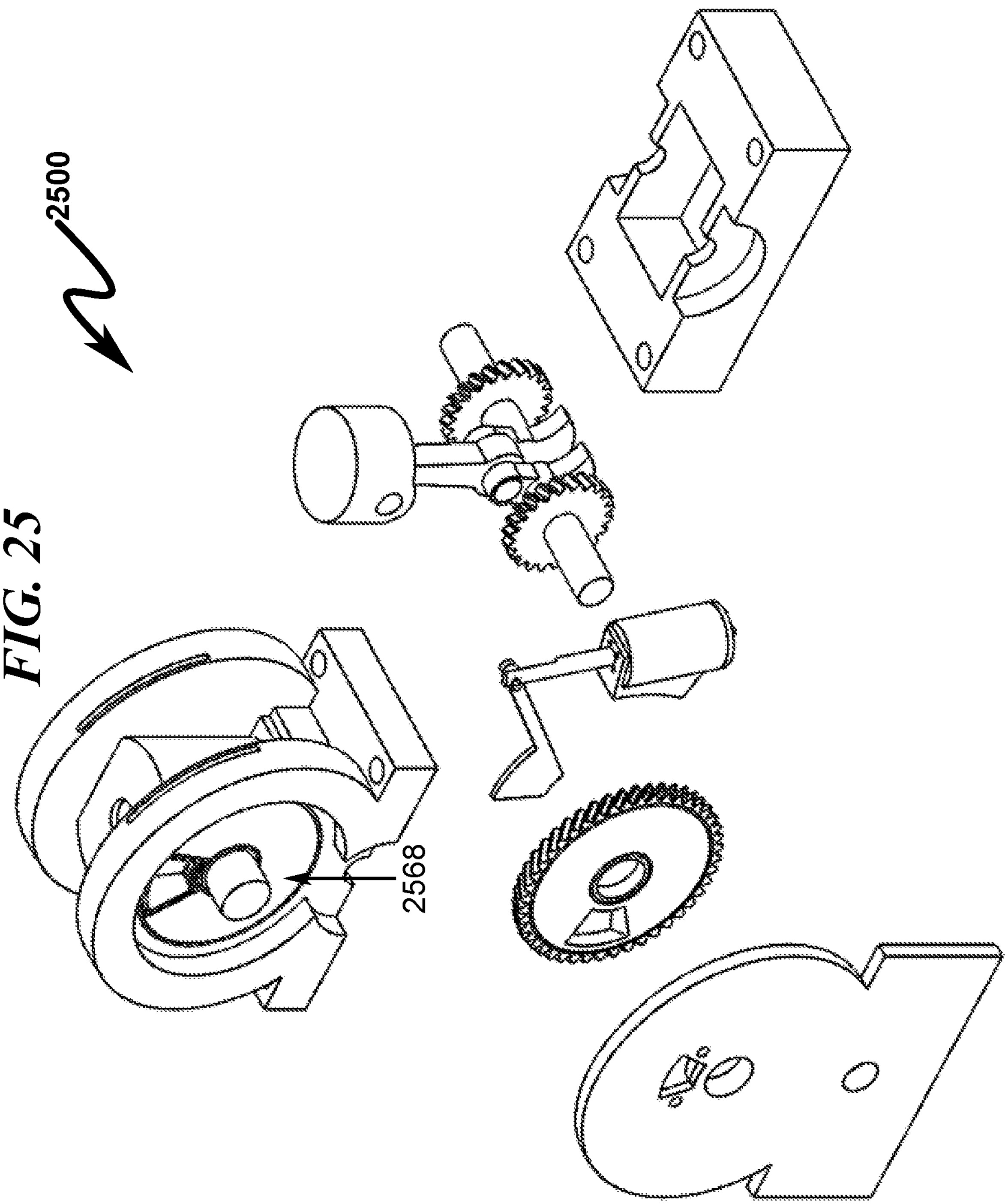
FIG. 25 illustrates a top right front perspective isometric engine block exploded view of a preferred exemplary rudimentary invention system embodiment.
Figure 26:
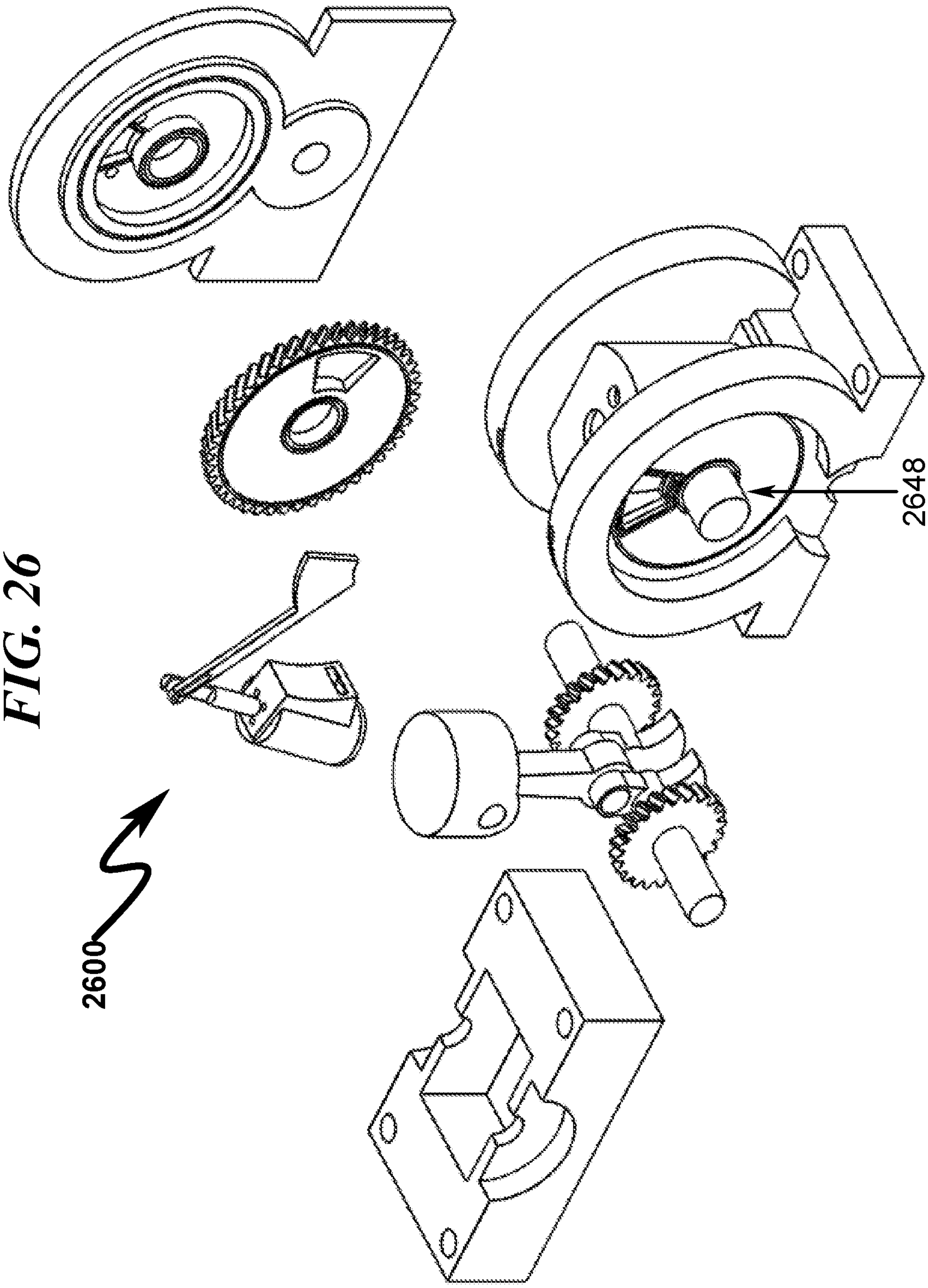
FIG. 26 illustrates a top right rear perspective engine block exploded view of a preferred exemplary rudimentary invention system embodiment.
Figure 27:
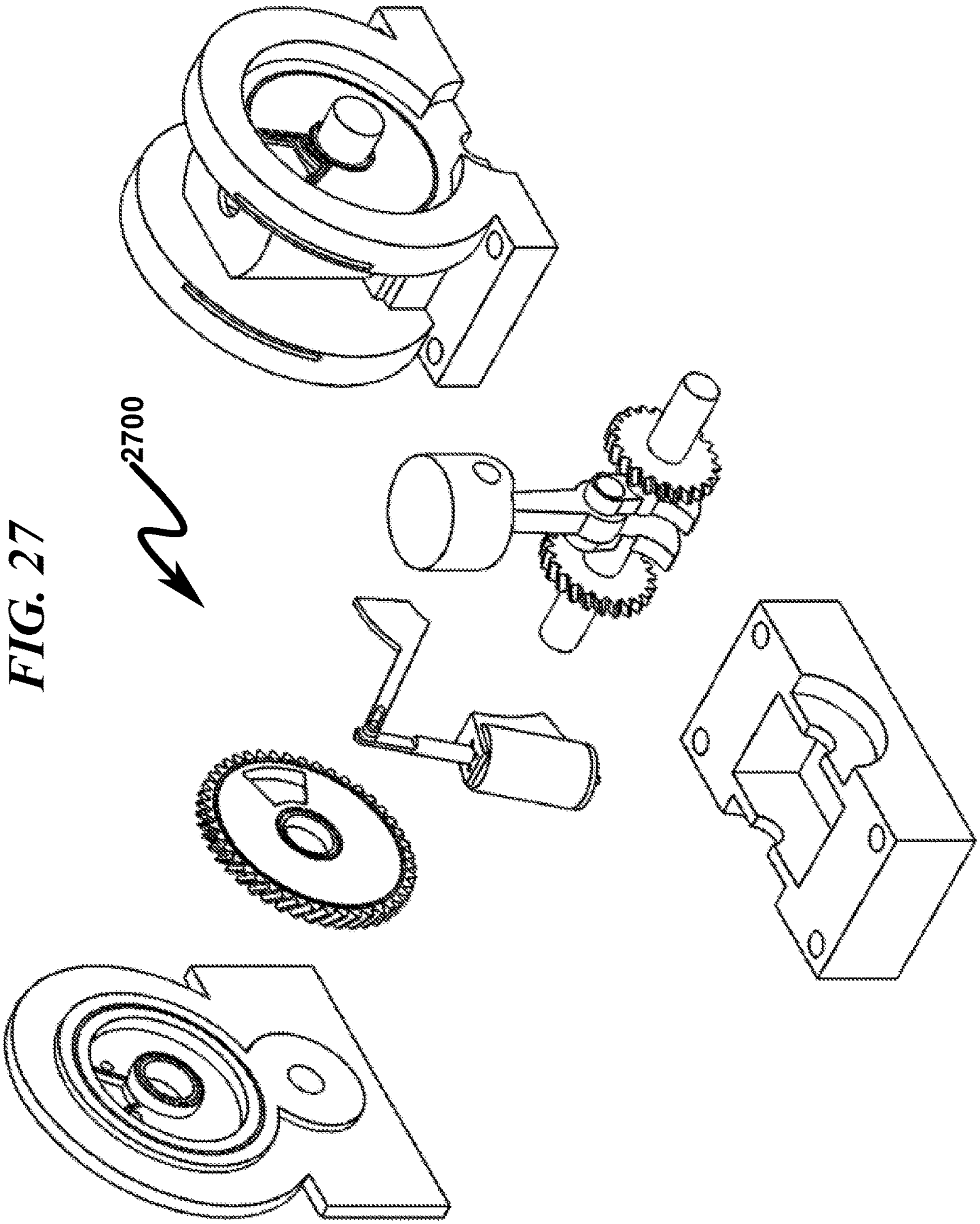
FIG. 27 illustrates a top left front perspective view engine block exploded of a preferred exemplary rudimentary invention system embodiment.
Figure 28:
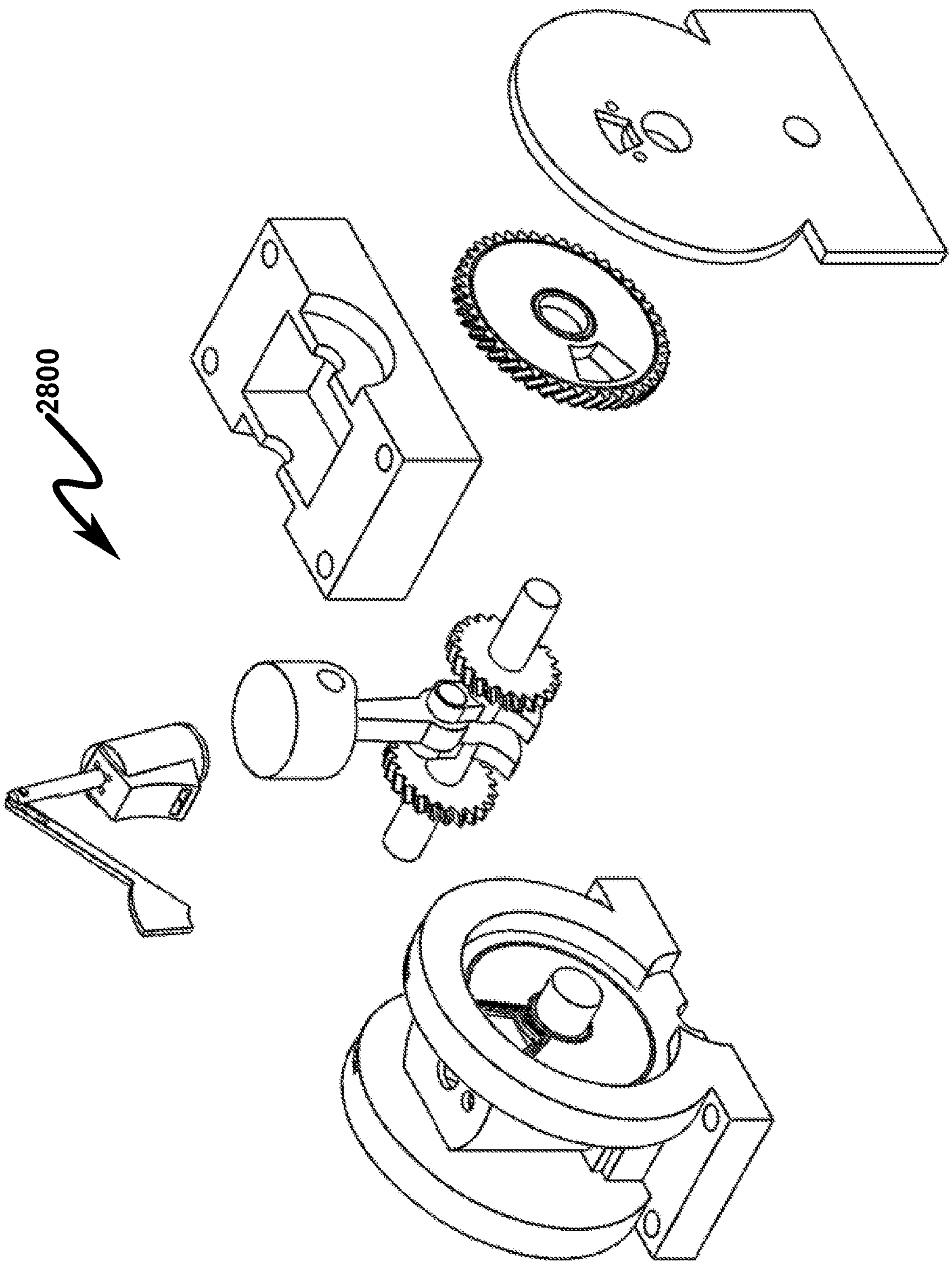
FIG. 28 illustrates a top left rear perspective engine block exploded view of a preferred exemplary rudimentary invention system embodiment.
Figure 29:
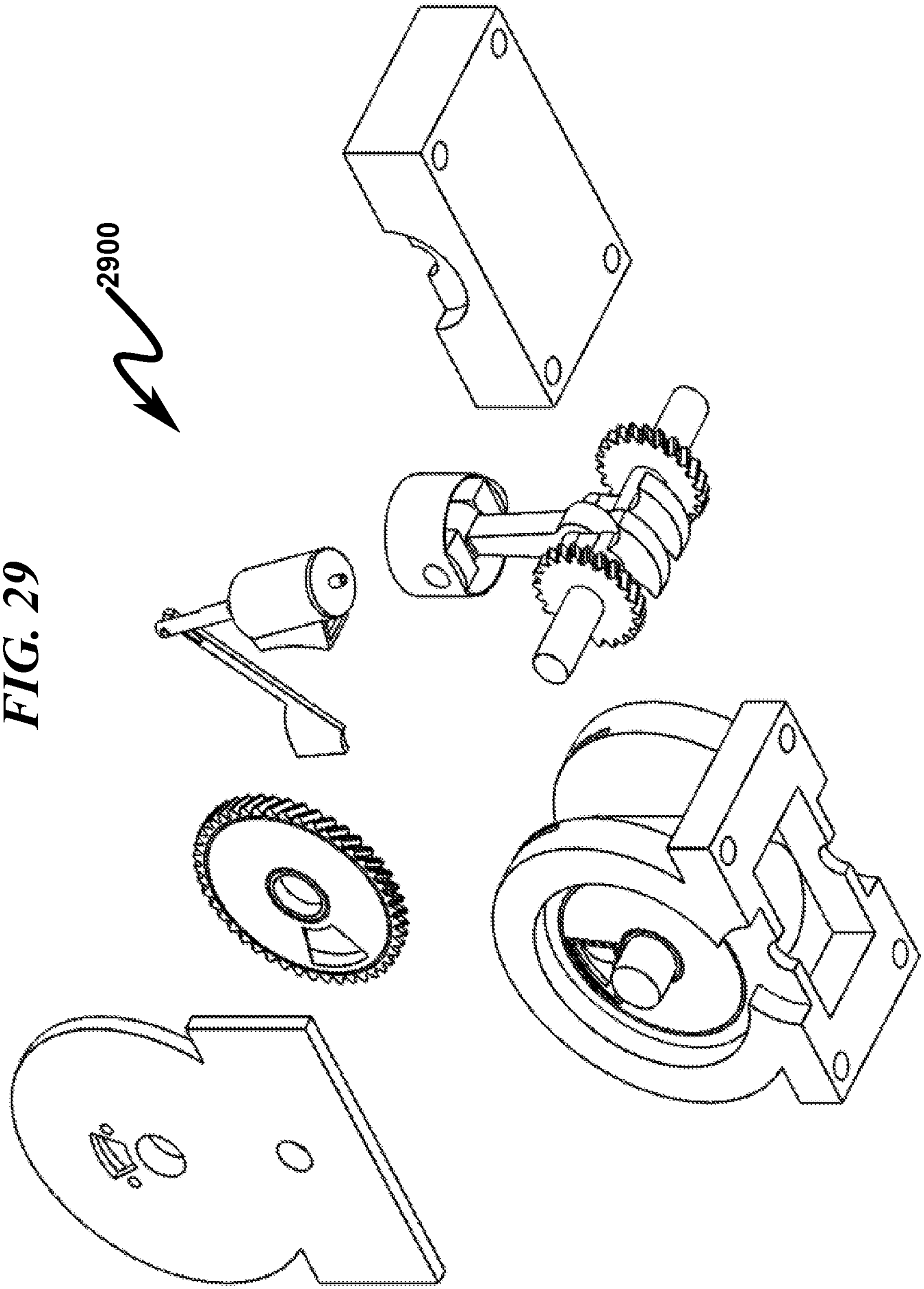
FIG. 29 illustrates a bottom right front perspective engine block exploded view of a preferred exemplary rudimentary invention system embodiment.
Figure 30:
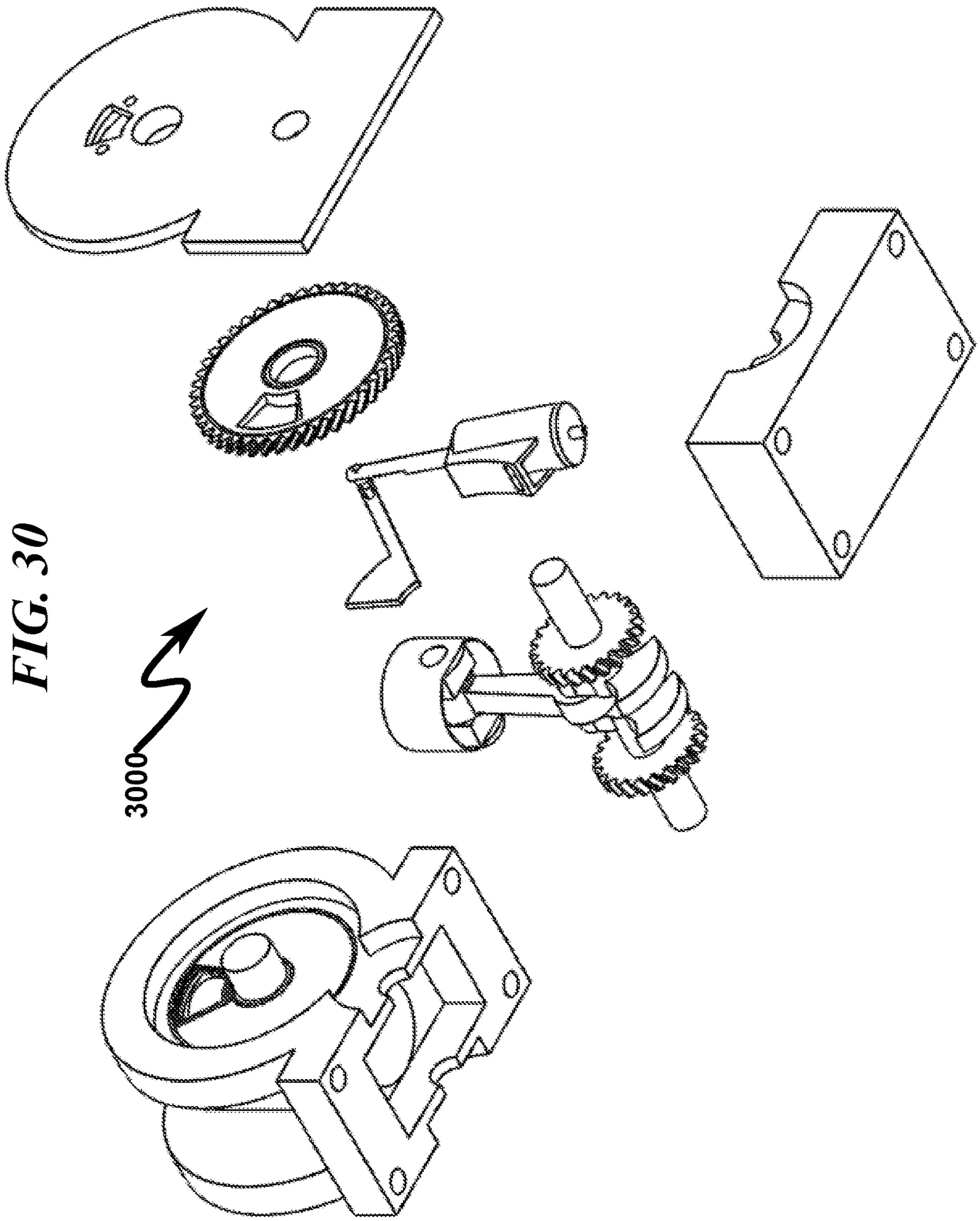
FIG. 30 illustrates a bottom right rear perspective engine block exploded view of a preferred exemplary rudimentary invention system embodiment.
Figure 31:
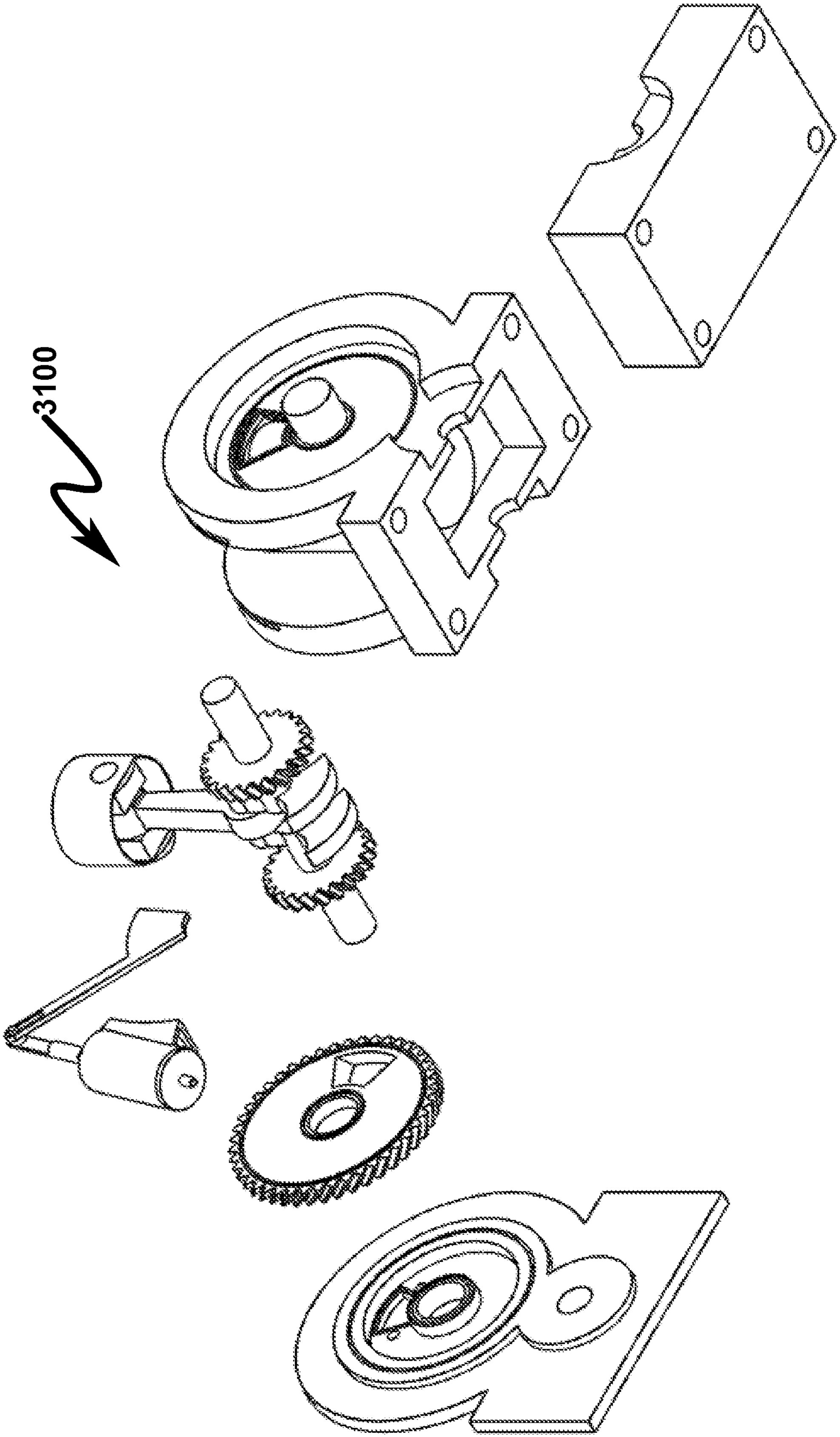
FIG. 31 illustrates a bottom left front perspective engine block exploded view of a preferred exemplary rudimentary invention system embodiment.

The engine crankcase cover (CKC) (1757) is generally depicted in FIG. 17 (1700) to FIG. 24 (2400). The CKC embodies the oil reservoir (COR) (1756) and encapsulates the crankshaft (CRK) (1755).

The CKC is well known to those skilled in the art and only a basic depiction is required.

Rotary Valve Disc (RVD) (7300-8000)

Figure 73:
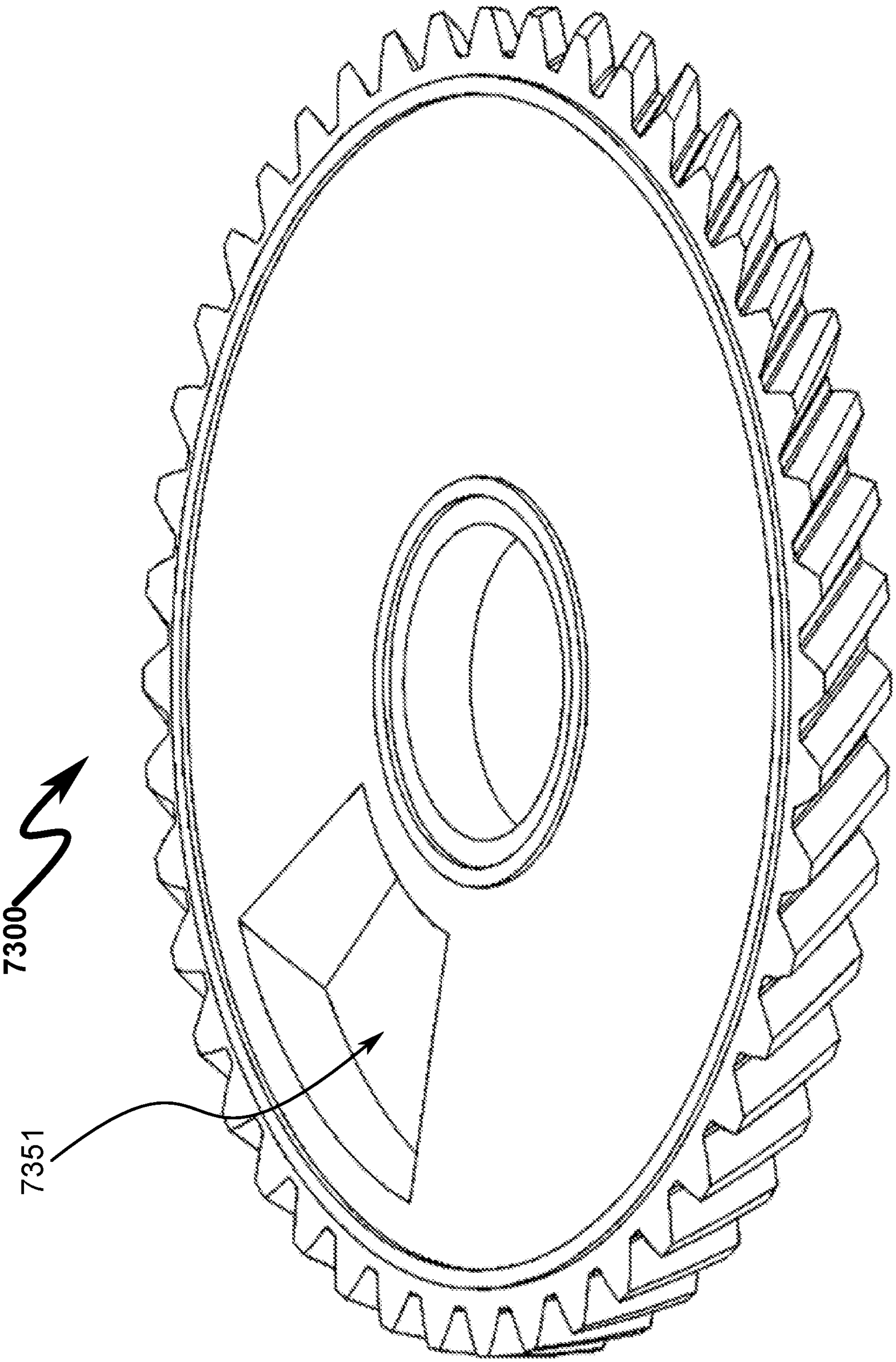
FIG. 73 illustrates a top right front perspective isometric view of an annular sectored conical frustum rotary valve port of a preferred exemplary invention rotary valve disc embodiment.
Figure 74:
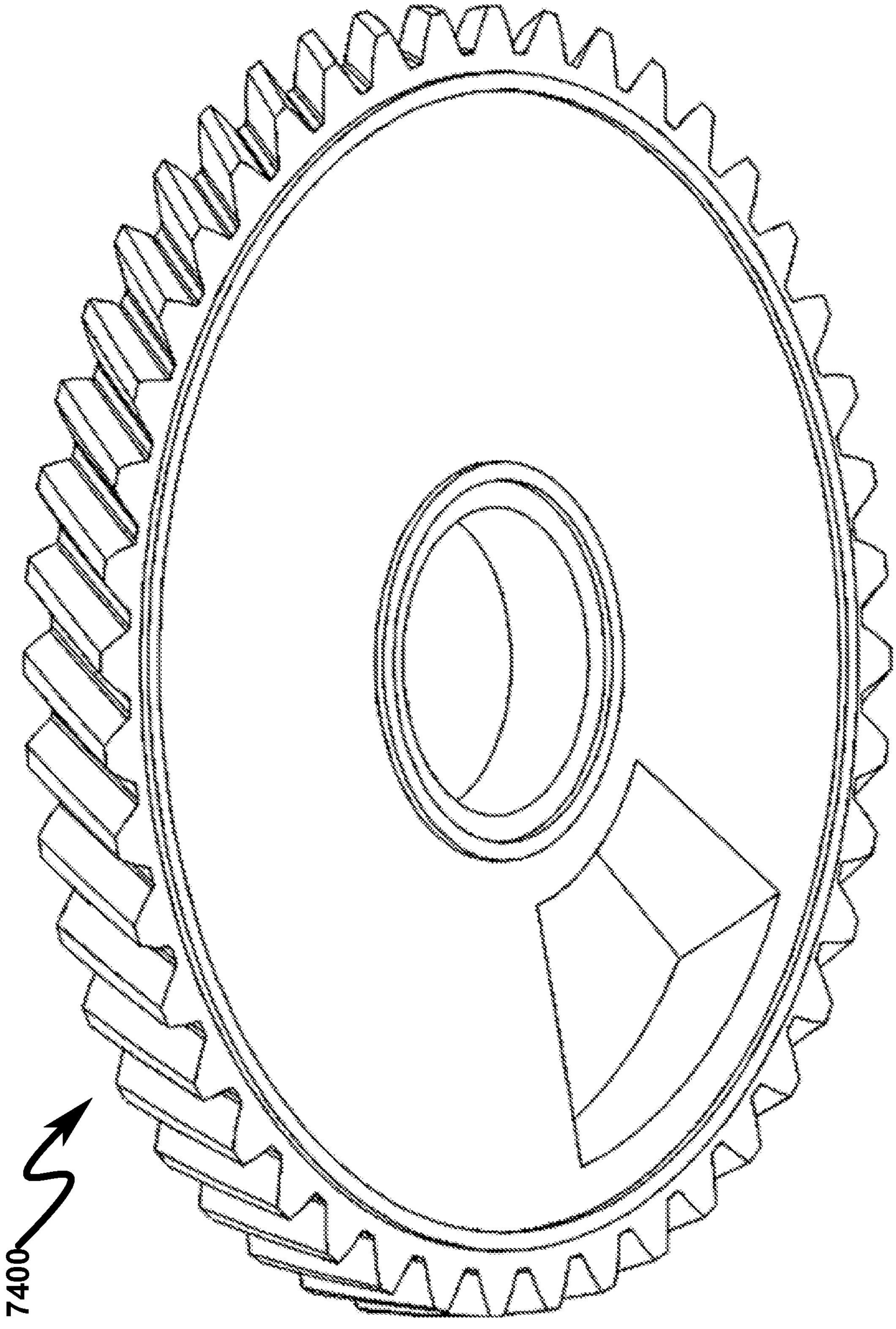
FIG. 74 illustrates a bottom right rear perspective isometric view of an annular sectored conical frustum rotary valve port of a preferred exemplary invention rotary valve disc embodiment.
Figure 75:
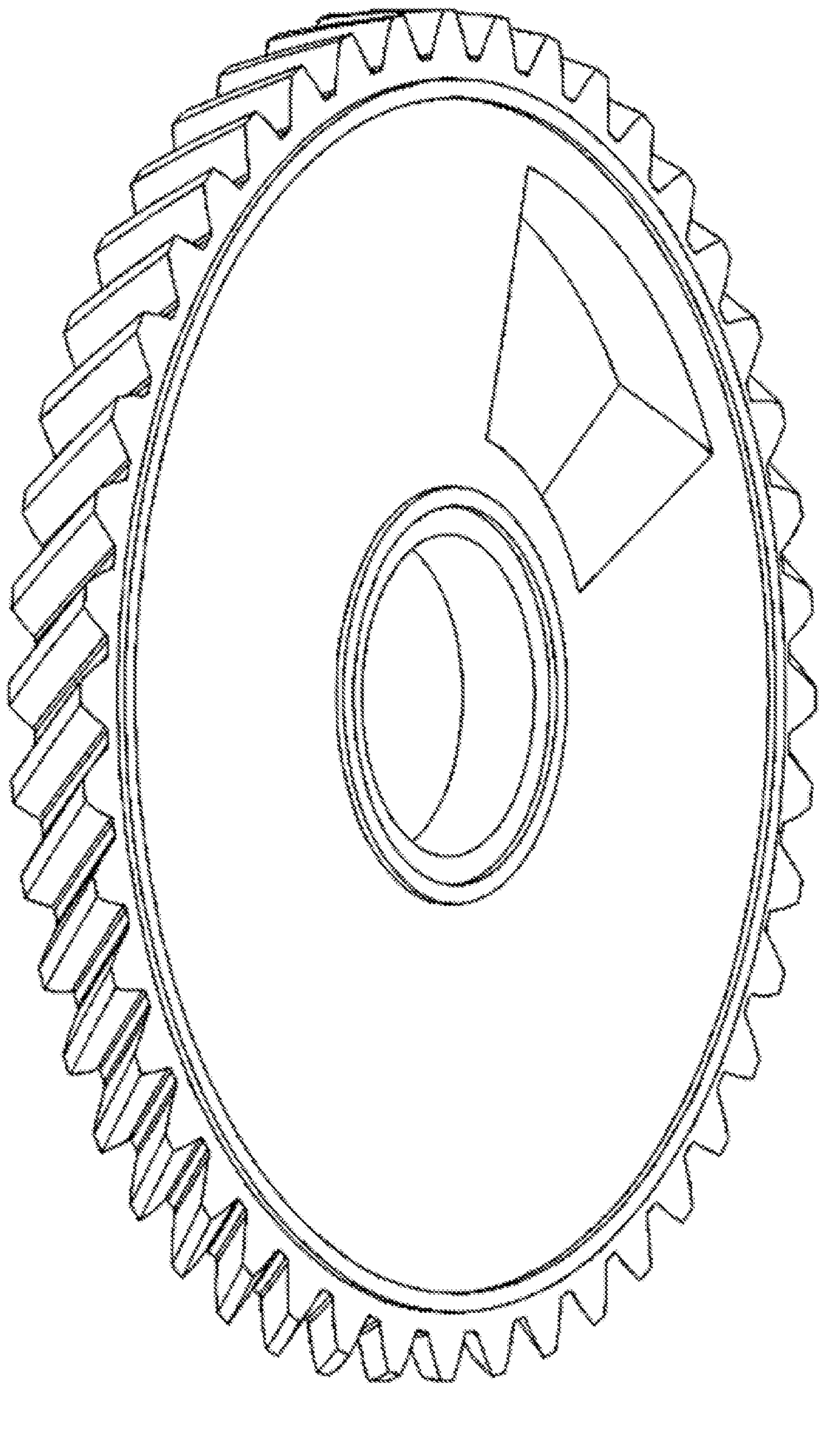
FIG. 75 illustrates a bottom left rear perspective isometric view of an annular sectored conical frustum rotary valve port of a preferred exemplary invention rotary valve disc embodiment.
Figure 76:
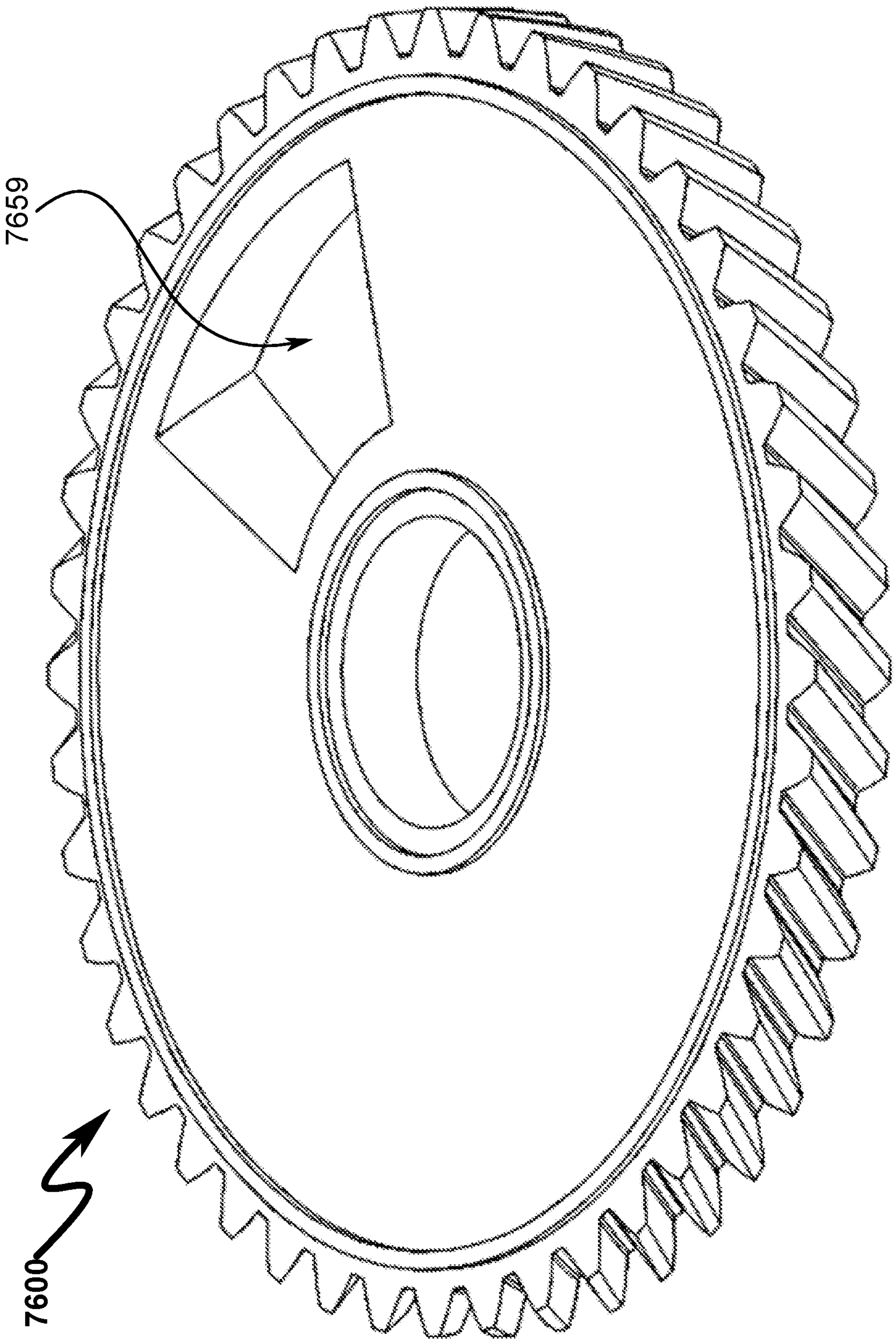
FIG. 76 illustrates a top left front perspective isometric view of an annular sectored conical frustum rotary valve port of a preferred exemplary invention rotary valve disc embodiment.
Figure 77:
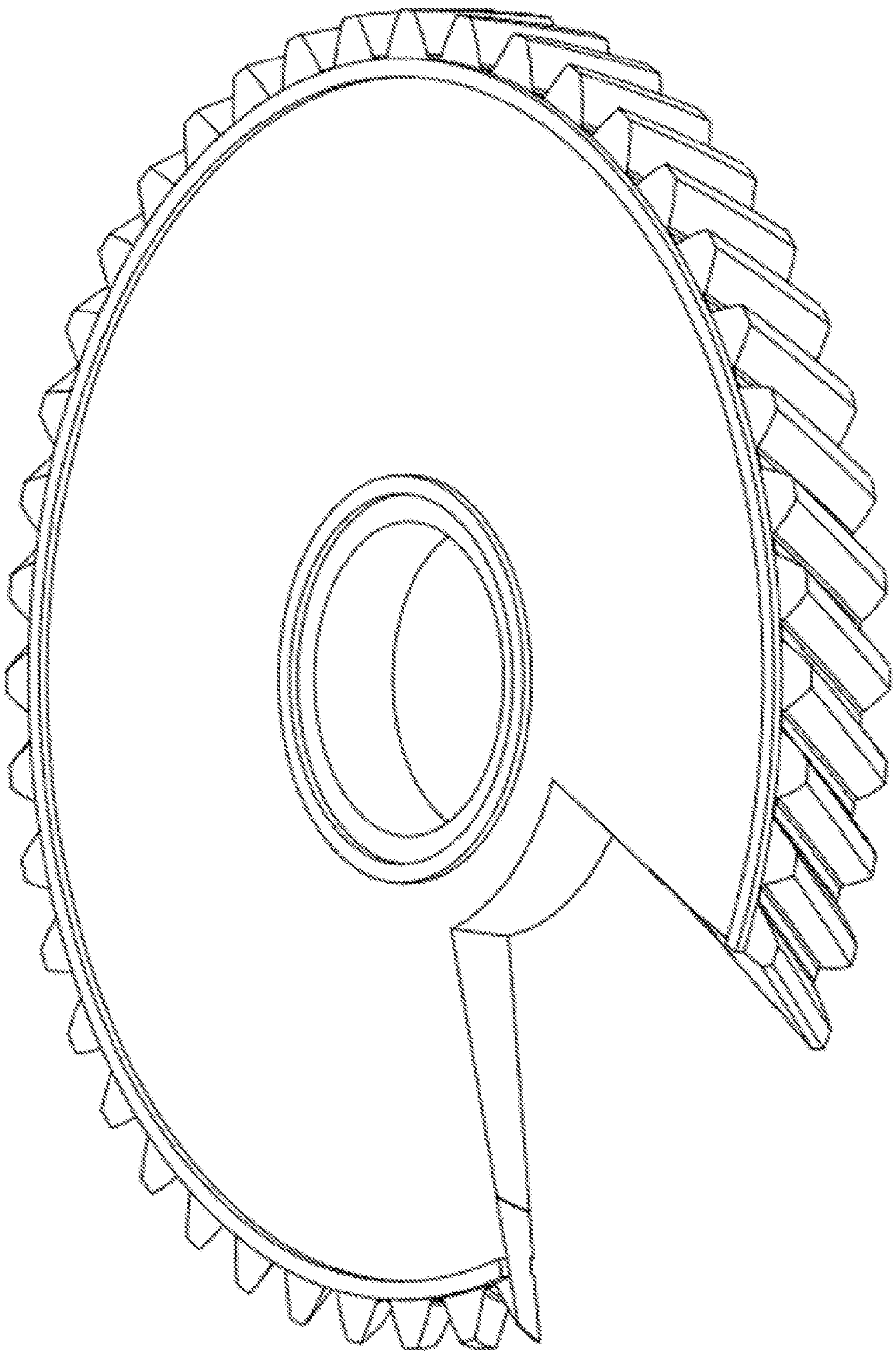
FIG. 77 illustrates a top right front perspective isometric sectioned view of an annular sectored conical frustum rotary valve port of a preferred exemplary invention rotary valve disc embodiment.
Figure 78:
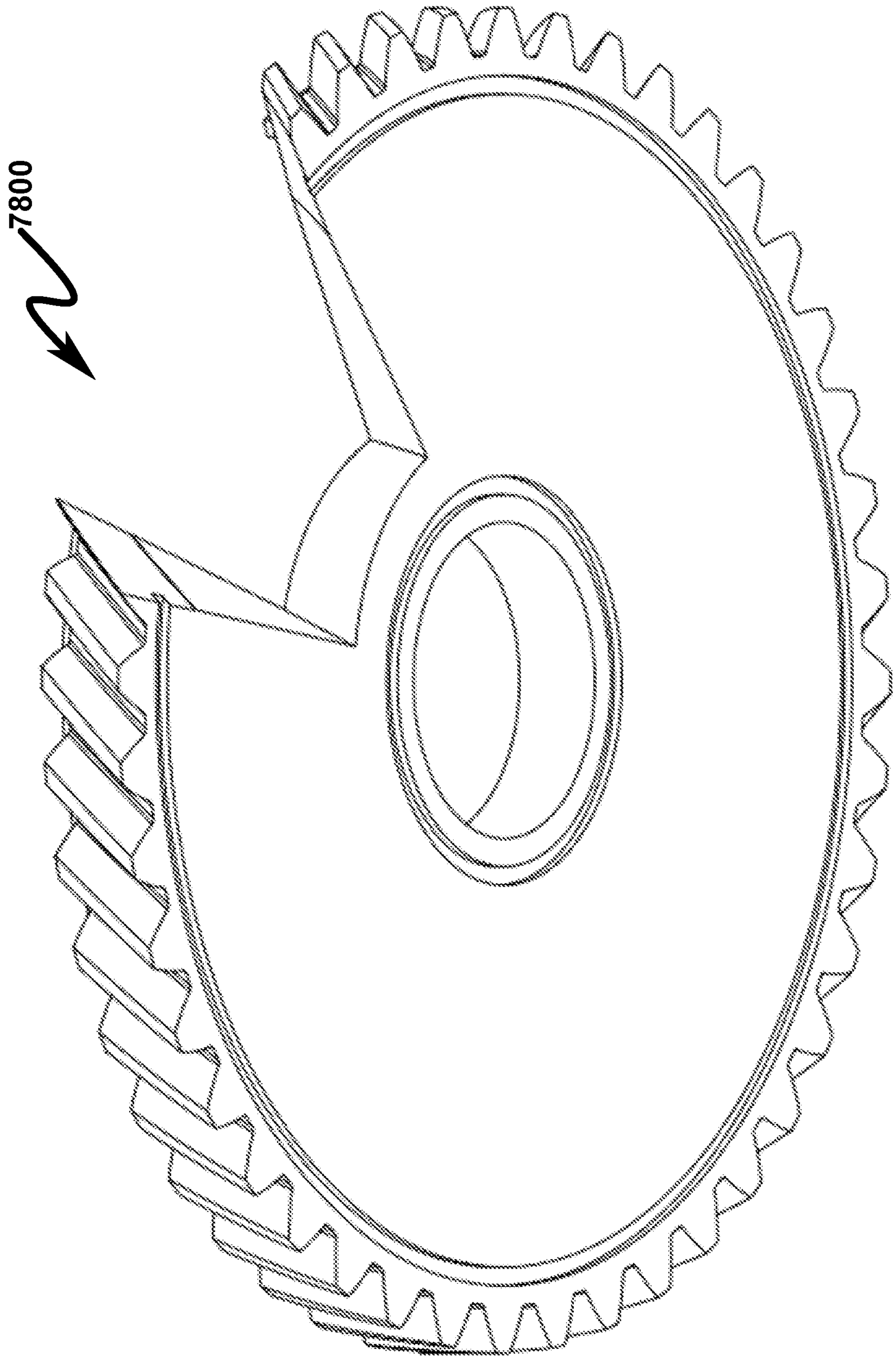
FIG. 78 illustrates a bottom right rear perspective isometric sectioned view of an annular sectored conical frustum rotary valve port of a preferred exemplary invention rotary valve disc embodiment.
Figure 79:
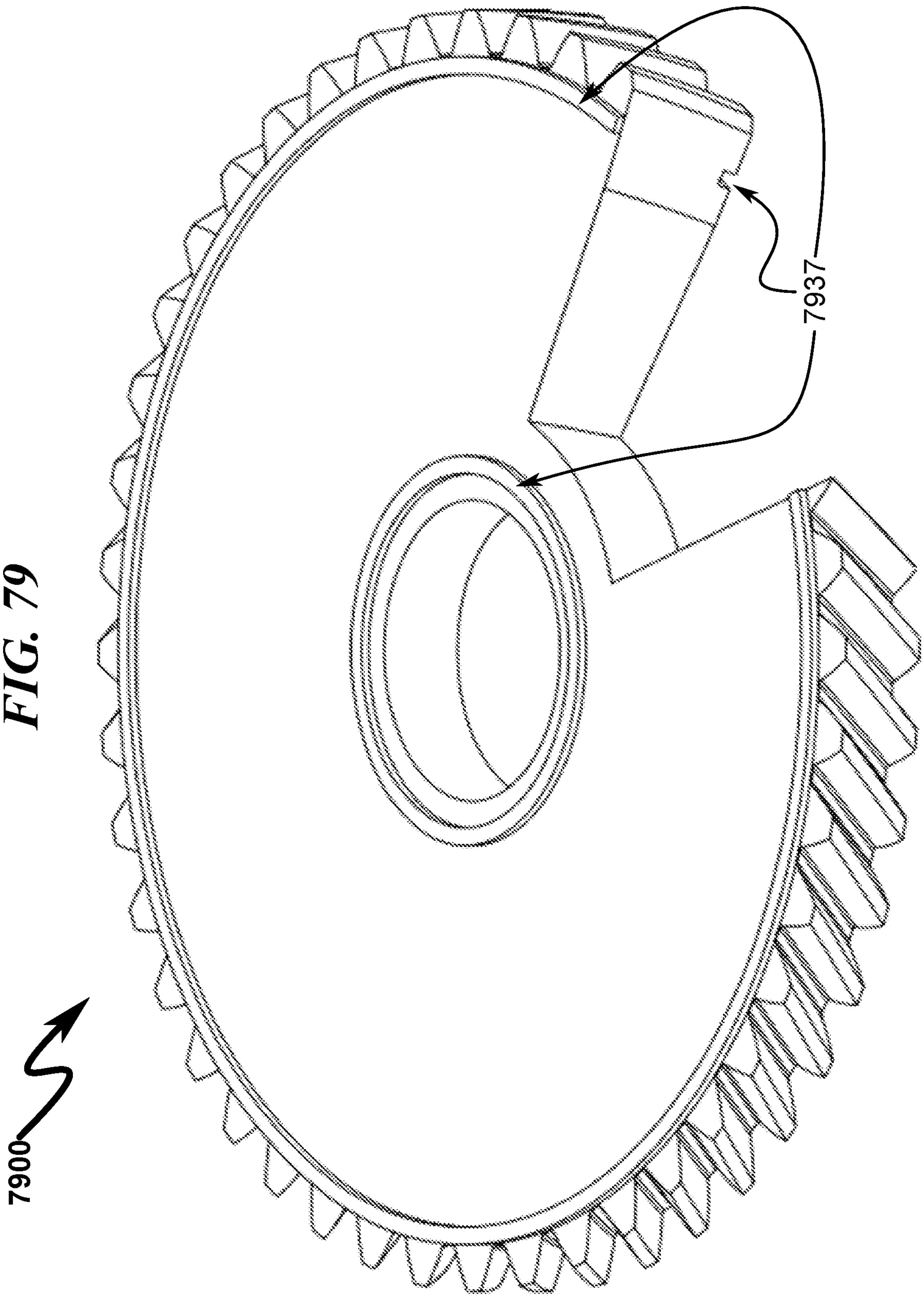
FIG. 79 illustrates a top left front perspective isometric sectioned view of an annular sectored conical frustum rotary valve port of a preferred exemplary invention rotary valve disc embodiment.
Figure 80:
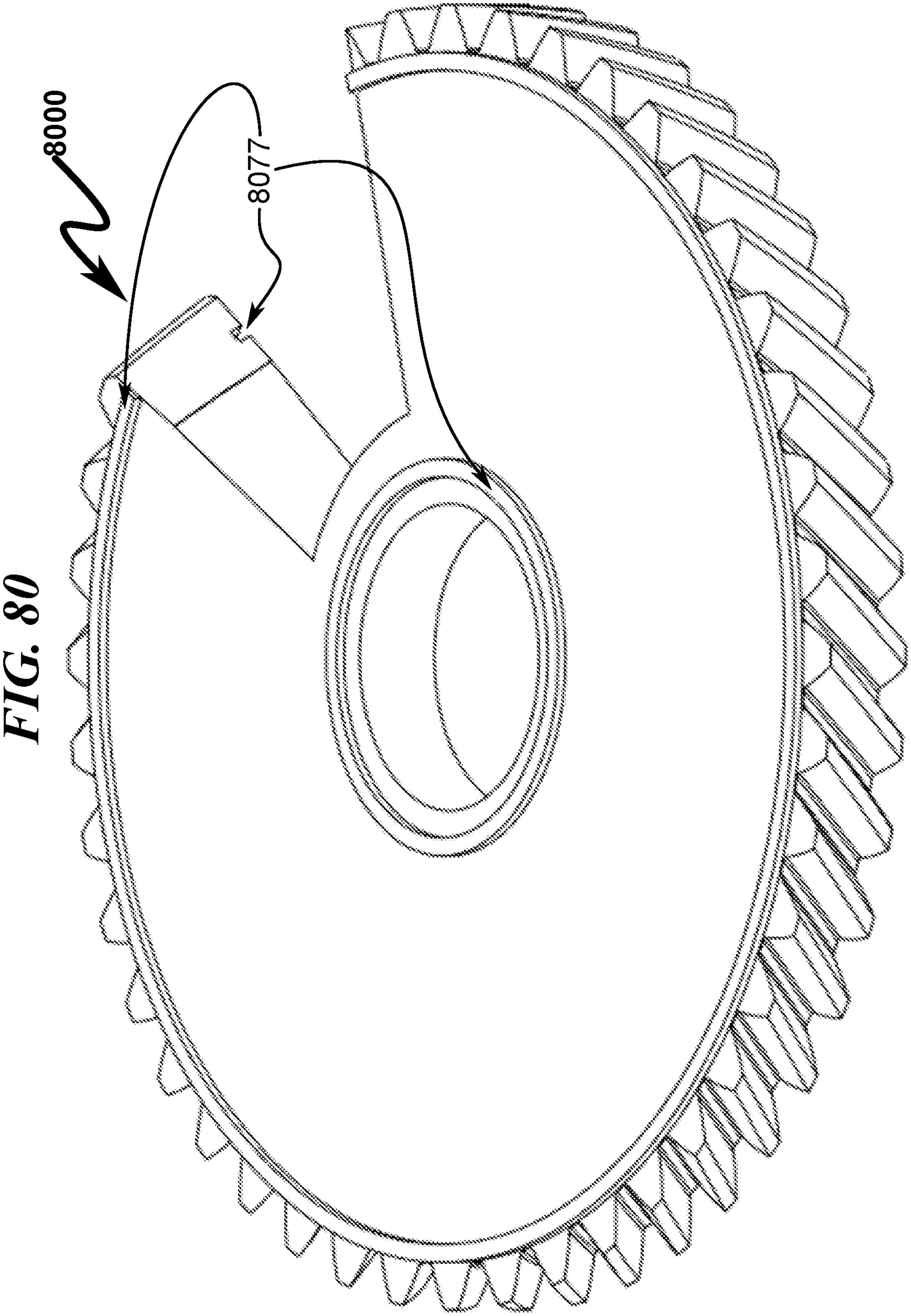
FIG. 80 illustrates a top right front perspective isometric sectioned view of an annular sectored conical frustum rotary valve port of a preferred exemplary invention rotary valve disc embodiment.

Detail views of the rotary valve disc (RVD) are generally depicted in FIG. 73 (7300)-FIG. 80 (8000).

The use of a rotary valve disc is to provide a more volumetrically efficient valve system for an internal combustion engine (ICE) such that timing profile is instituted that allows adherence to the 4-stroke cyclic operation while providing the widest geometrically equivalent valve port opening.

The intake rotary valve disc (IVD) (1752) and exhaust rotary valve disc (EVD) (1758) may be identical and incorporate anti-symmetric rotary valve ports. The RVD comprises a rotary valve port (RVP) and is coupled to the crankshaft and designed to control the flow of molecules into and out of the CCH (15354) based on the rotation angle of the crankshaft.

The RVD comprises a RVP suitable to mate/align with a fixed port on both the intake and exhaust sides of the CCH (15354). The RVP can be geometrically equivalent to the fixed port geometry or they both can be a varied annular sectored conical frustum (ACF) shaped geometric facsimile of the fixed port since the ACF geometry of the RVP is not limitive in its height or width vectors.

The valve system of the IVD (1752) and EVD (1758) coordinate the input transfer of intake air molecules into and the output transfer of combusted exhaust gases out of the CCH (15354) respectively. They rudimentarily comprise an IVP (7351) and EVP (7659), at least one IFP (8941) and one EFP (9061) located at the opposite sides of the CCH (15354), an intake manifold (INM) (4939) with at least one throttle plate (THP) (ND), and an exhaust manifold (EXM) (4979).

The present invention's IVD (1752) and EVD (1758) are identical. As such, only one needs to be depicted.

Intake/Exhaust Rotary Valve Port (IVP)/(EVP) (7300)-(8000)

Detail views of the intake rotary valve port (IVP) (7351) and exhaust rotary valve port (EVP) (7659) are generally depicted in FIG. 73 (7300)-FIG. 80 (8000).

The IVP (7351) provides the intake valve method such that incoming air and fuel molecules are reciprocated according to the Intake Stroke valve opening duration.

Unlike POPPET valve operation, the rotary valve port of the present invention does not have to consider the cam lift function. The equivalent of the cam lift function is provided for by the annular sectored conical frustum (ACF) shaped rotary valve port opening which has a selectable constant height vector that is unwavering. So, there is no "pinch" or "starvation" characteristic as is inherent in other valve systems which limit the volumetric efficiency since these inherent characteristics create an unnecessary amount of restriction to the flow of air and gas molecules into and out of the CCH (15354).

Since the Intake Stroke follows the Exhaust Stroke, it is a preferred characteristic that the IVP be used for the intake valve operation exclusively instead of sharing the intake and the exhaust operations as other rotary valve systems perpetuate. This affords the Exhaust Stroke valve operation a greater and more volumetric exhausting regiment. This separation allows for an obvious cooler operational temperature for the intake side of the CCH (15354) which prevents the inherent tendency towards the super-heated exhaust causing pre-detonation and other adverse effects.

The EVP (7659) provides the exhaust valve method such that combusted exhaust gases are expelled from the CCH (15354) in a reciprocated fashion according to the Exhaust Stroke valve opening duration.

Similar to the IVP, the EVP also does not have to consider the cam lift function since the EVP follows the same ACF port shape maintaining its selectable constant height vector as the IVP. This affords the Exhaust Stroke valve operation a greater and more volumetric exhausting regiment.

Since the Exhaust Stroke follows the Power Stroke, the inherent combusted gas molecules are already super-heated and as such dictates that the EVP is not a suitable candidate to also be used in combination with the intake valve operations. So, the EVP is used exclusively for exhaust operations in the present invention.

The present invention's IVP (7351) and EVP (7659) are identical. As such, only one needs to be depicted.

Fixed Intake/Exhaust Ports (IFP)/(EFP) (8900)-(9600)

Figure 89:
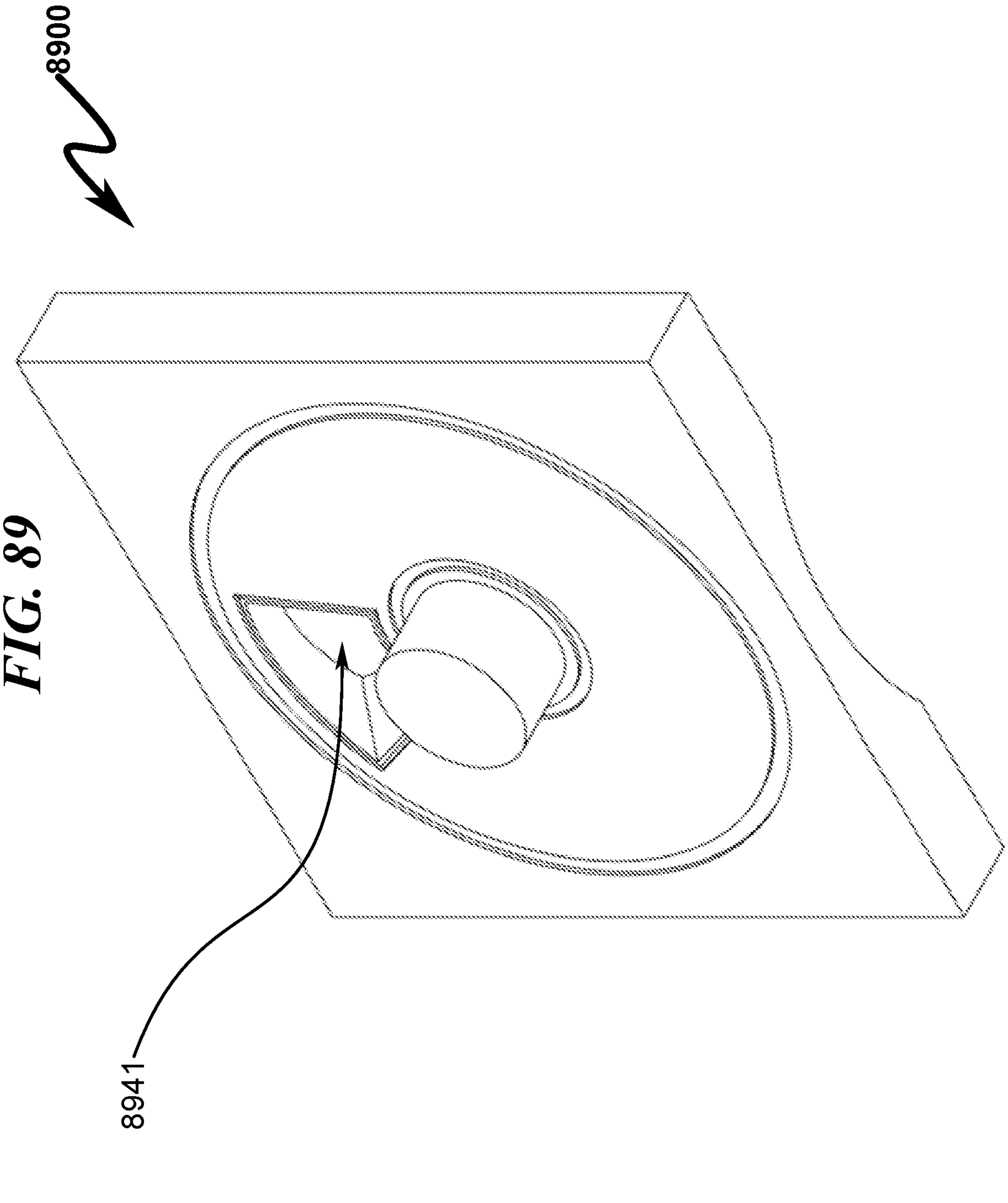
FIG. 89 illustrates a bottom left front perspective isometric cut-away view of an engine block (BLK) combustion chamber (CCH) outer wall embodiment depicting an annular sectored conical frustum shaped fixed port of a preferred exemplary invention system embodiment.
Figure 90:
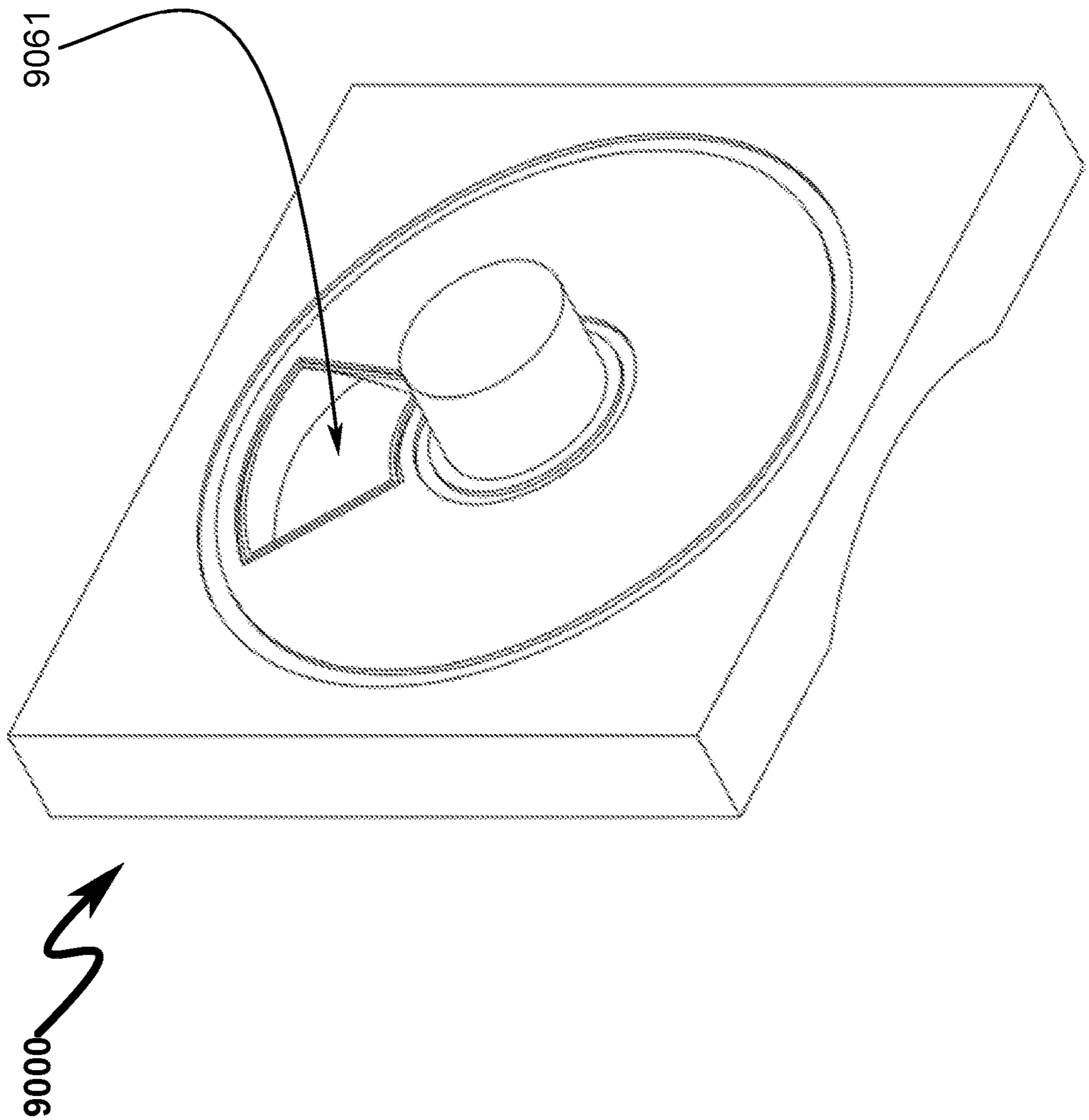
FIG. 90 illustrates a bottom right front perspective isometric cut-away view of an engine block (BLK) combustion chamber (CCH) outer wall embodiment depicting an annular sectored conical frustum shaped fixed port of a preferred exemplary invention system embodiment.
Figure 91:
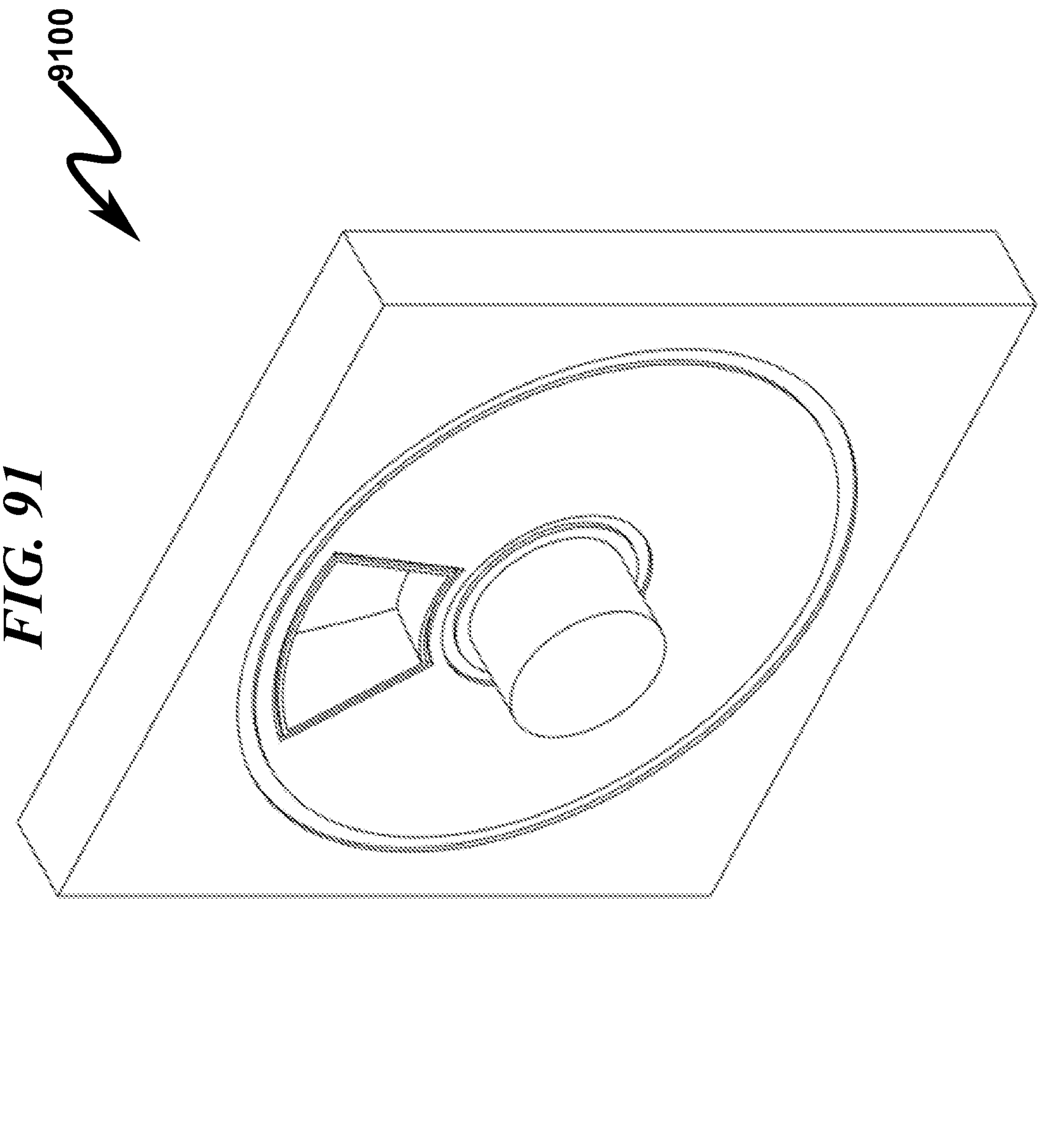
FIG. 91 illustrates a top left front perspective isometric cut-away view of an engine block (BLK) combustion chamber (CCH) outer wall embodiment depicting an annular sectored conical frustum shaped fixed port of a preferred exemplary invention system embodiment.
Figure 92:
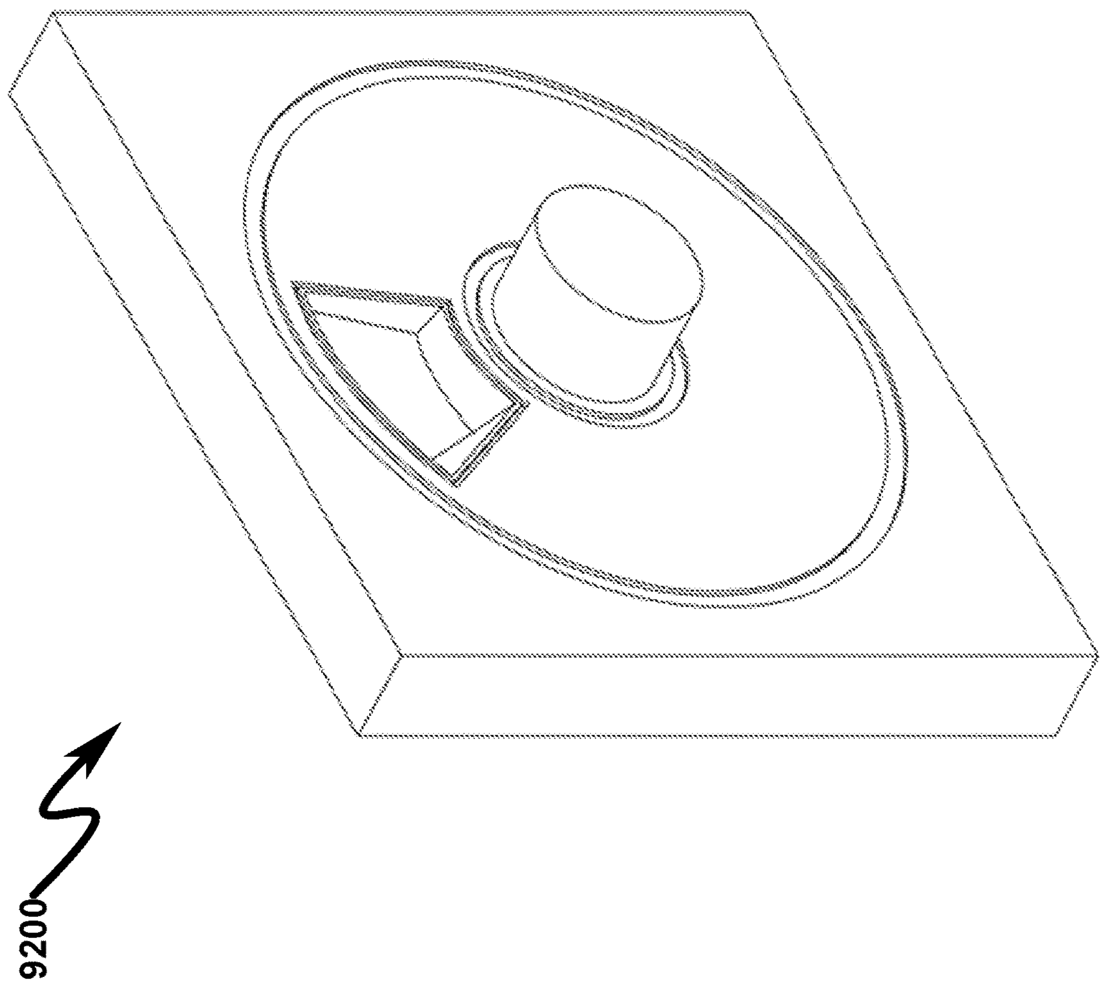
FIG. 92 illustrates a top right front perspective isometric cut-away view of an engine block (BLK) combustion chamber (CCH) outer wall embodiment depicting an annular sectored conical frustum shaped fixed port of a preferred exemplary invention system embodiment.
Figure 93:
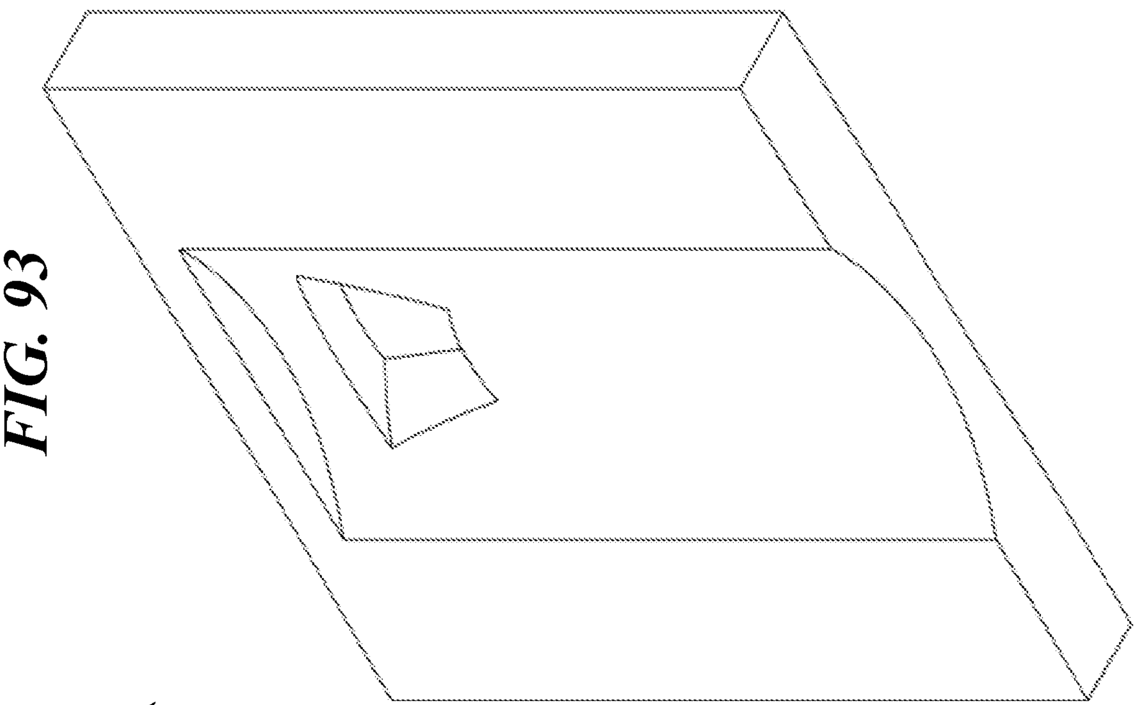
FIG. 93 illustrates a bottom left rear perspective isometric cut-away view of an engine block (BLK) combustion chamber (CCH) inner wall embodiment depicting an annular sectored conical frustum shaped fixed port of a preferred exemplary invention system embodiment.
Figure 94:
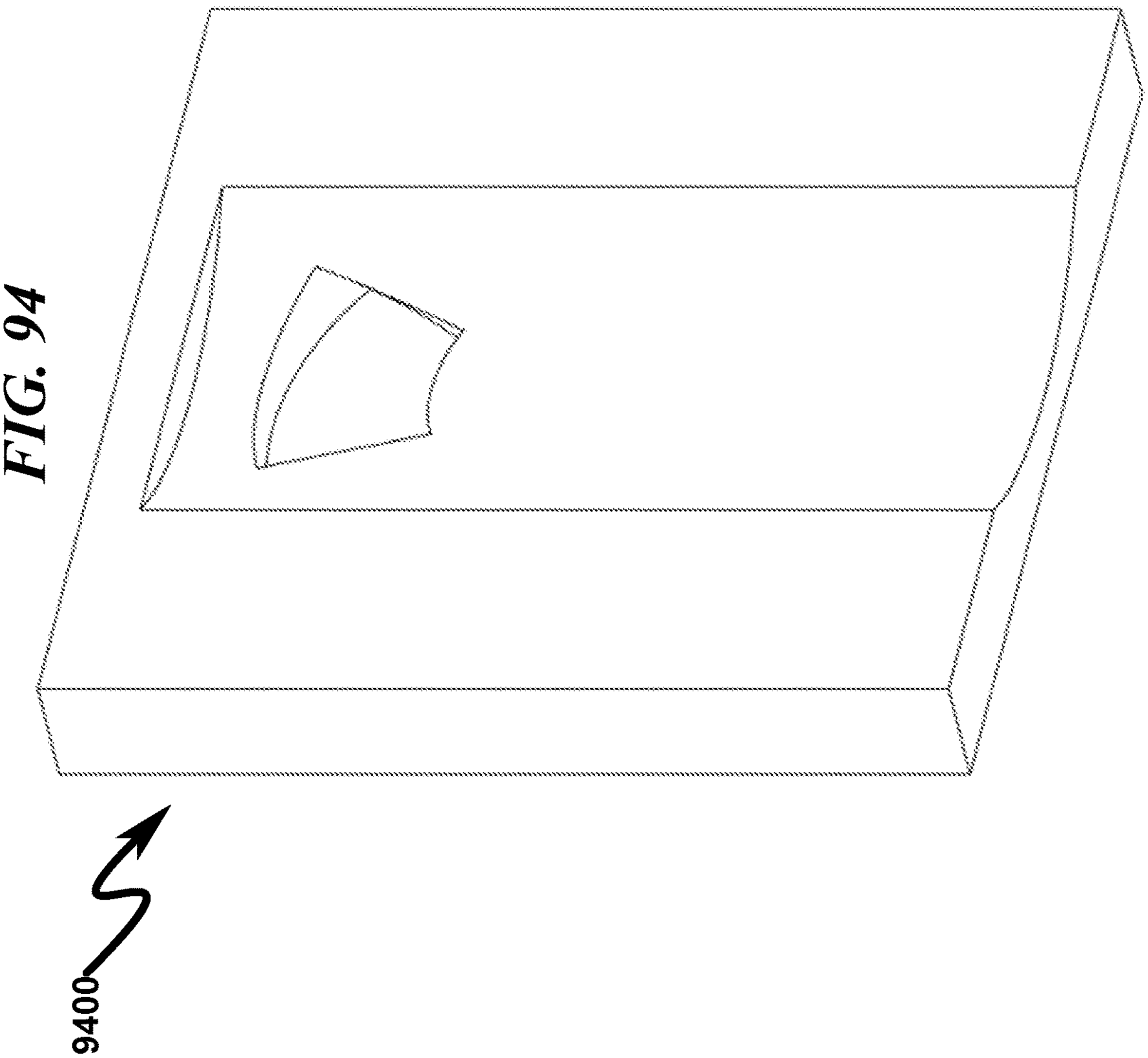
FIG. 94 illustrates a bottom right rear perspective isometric cut-away view of an engine block (BLK) combustion chamber (CCH) inner wall embodiment depicting an annular sectored conical frustum shaped fixed port of a preferred exemplary invention system embodiment.
Figure 95:
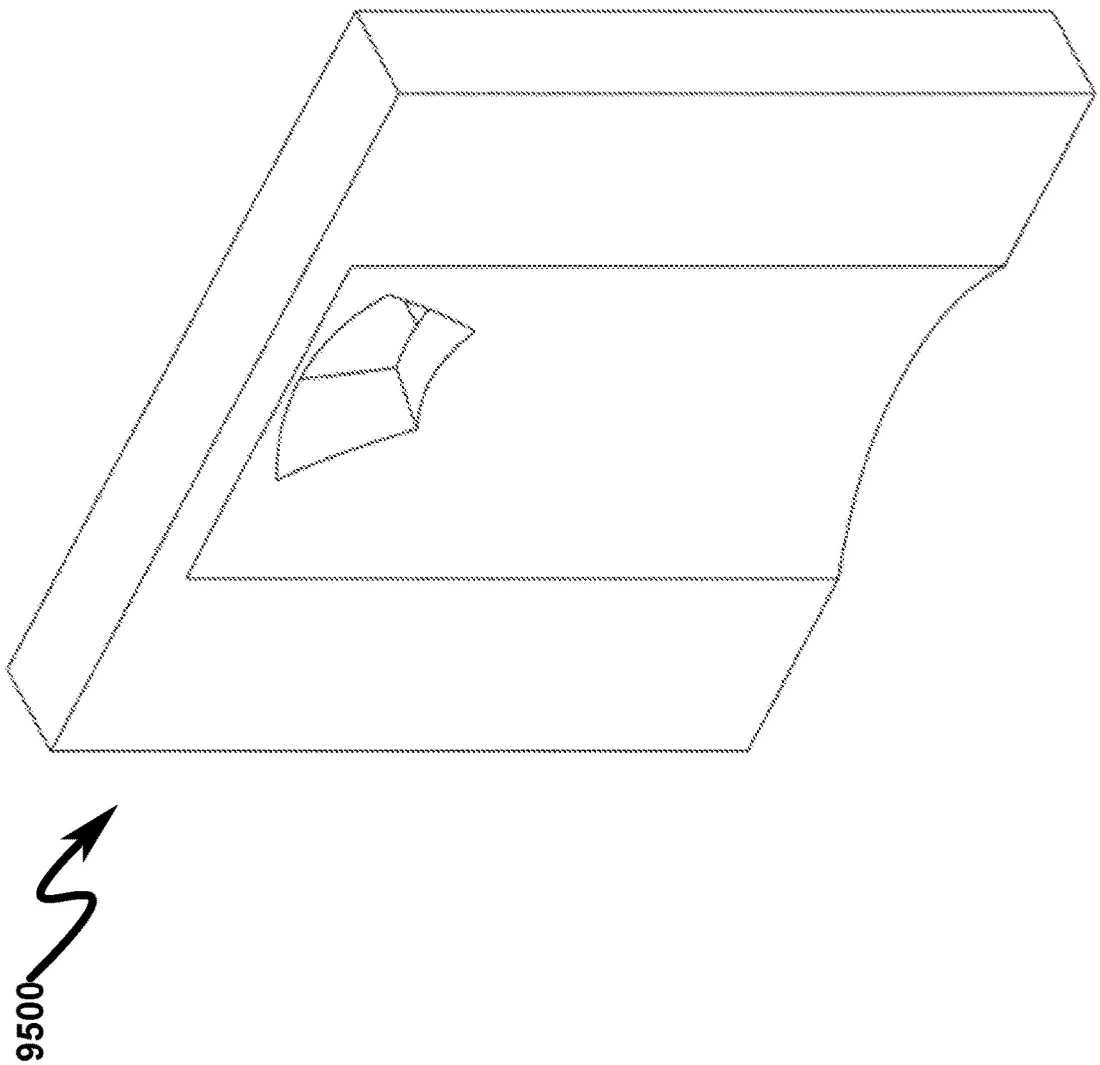
FIG. 95 illustrates a top left rear perspective isometric cut-away view of an engine block (BLK) combustion chamber (CCH) inner wall embodiment depicting an annular sectored conical frustum shaped fixed port of a preferred exemplary invention system embodiment.
Figure 96:
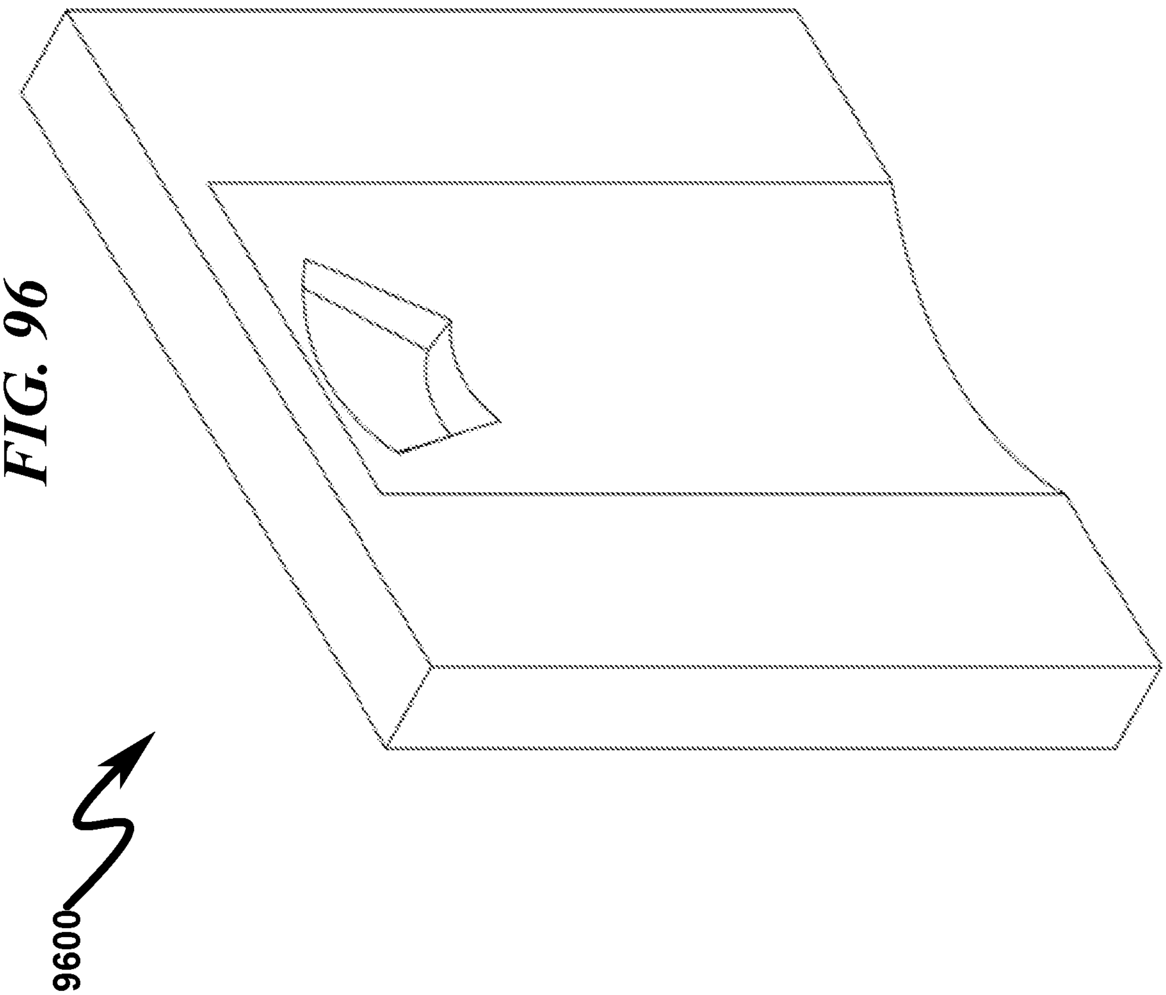
FIG. 96 illustrates a top right rear perspective isometric cut-away view of an engine block (BLK) combustion chamber (CCH) inner wall embodiment depicting an annular sectored conical frustum shaped fixed port of a preferred exemplary invention system embodiment.

Detail views of the intake fixed port (IFP) (8941) and exhaust fixed port (EFP) (9061) are generally depicted in FIG. 89 (8900)-FIG. 96 (9600).

The IFP (8941) is responsible for transmitting the intake air and fuel molecules into the CCH (15354) utilizing the same annular sectored conical frustum (ACF) port shape retaining its constant height vector as the IVP reciprocates its Intake Stroke valve opening duration.

Since this IVP inherits the orientation of reciprocating the intake air and gas molecules into the CCH (15354), it also must close off this IFP (8941) at all times except during the Intake Stroke duration.

The EFP (9061) is responsible for transmitting the combusted exhaust gases and fuel molecules out of the CCH (15354) utilizing the same ACF port shape retaining its constant height vector as the EVP reciprocates during its Exhaust Stroke valve opening duration.

The shape of this ACF port shape can be geometrically equivalent to the EFP (9061) or it can be varied in its height and width vectors into infinite compilations to further enhance its ability to provide a superior volumetric efficient valve method.

The present invention's IFP (8941) and EFP (9061) are identical. As such, only one needs to be depicted.

Intake/Exhaust Engine Block Grooves and Ridges (IGR) (8100)-(8800)

Detail views of the engine block grooves and ridges, intake (IGR) (8231) and exhaust (EGR) (8771) are generally depicted in FIG. 81 (8100)-FIG. 88 (8800).

The IGR (8231) can be configured to control the inboard containment/sealing of compression gases between the IVD (1752) and the IGR (8231) on the outer wall of the CCH (15354) while the EGR (8771) can be configured to control the inboard containment/sealing of combusted gases between the EVD (1758) and the EGR (8771) on the outer wall of the CCH (15354).

Both the IGR (8231) and EGR (8771) should be constructed utilizing high temperature metal parts coated with heat resistant ceramic powder coatings. This is to ensure that the components do not deform due to a change in temperature considerate of the operating characteristics of an ICE.

The present invention's IGR (8231) and EGR (8771) are identical. As such, only one needs to be depicted.

Intake/Exhaust Engine Block Cover (IEC) (EEC) (12100)-(12800)

Figure 121:
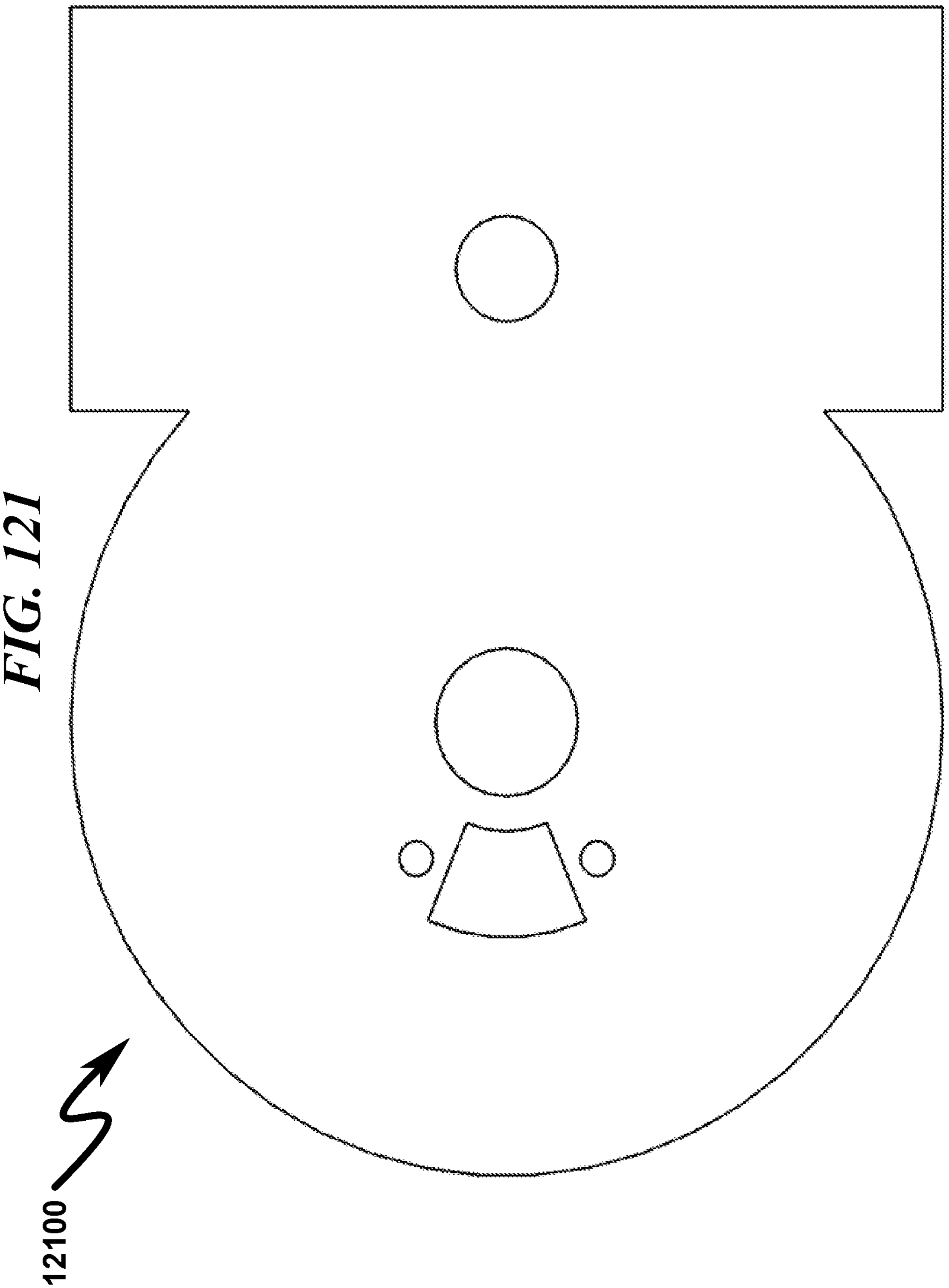
Figure 128:
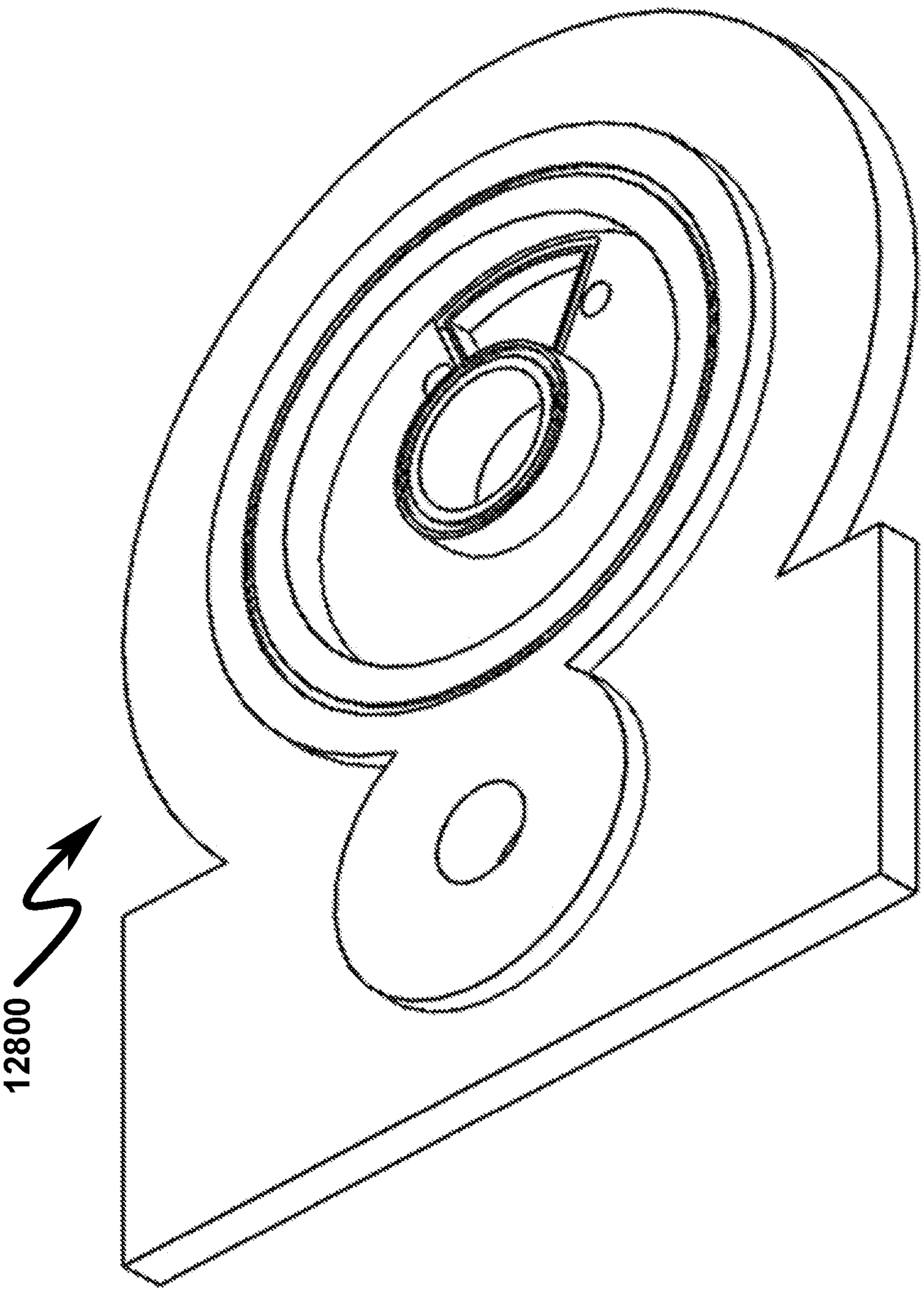

Detail views of the engine block cover, intake (IEC) (1732) and exhaust (EEC) (1772) are generally depicted in FIG. 121 (12100)-FIG. 128 (12800).

The IEC (1732) and EEC (1772) provide the final exterior containment of the RVD and crankshaft gear. The IEC (1732) and EEC (1772) must also provide the initial continuations of the IFP (8941) and EFP (9061) connecting the intake and exhaust manifolds to the IVP (7351) and EVP (7659) of the IVD (1752) and EVD (1758) respectively such that the flow of gases into and out of the CCH (15354) is uninterrupted, except to the reciprocated actions of the IVP (7351) and EVP (7659).

Both the IEC (1732) and EEC (1772) should be constructed utilizing high temperature metal parts coated with heat resistant ceramic powder coatings. This is to ensure that the components do not deform due to a change in temperature considerate of the operating characteristics of an ICE.

The present invention's IEC (1732) and EEC (1772) are identical. As such, only one needs to be depicted.

Intake/Exhaust Engine Block Cover Grooves and Ridges (IGC) (EGC) (12200)-(12800)

Figure 122:
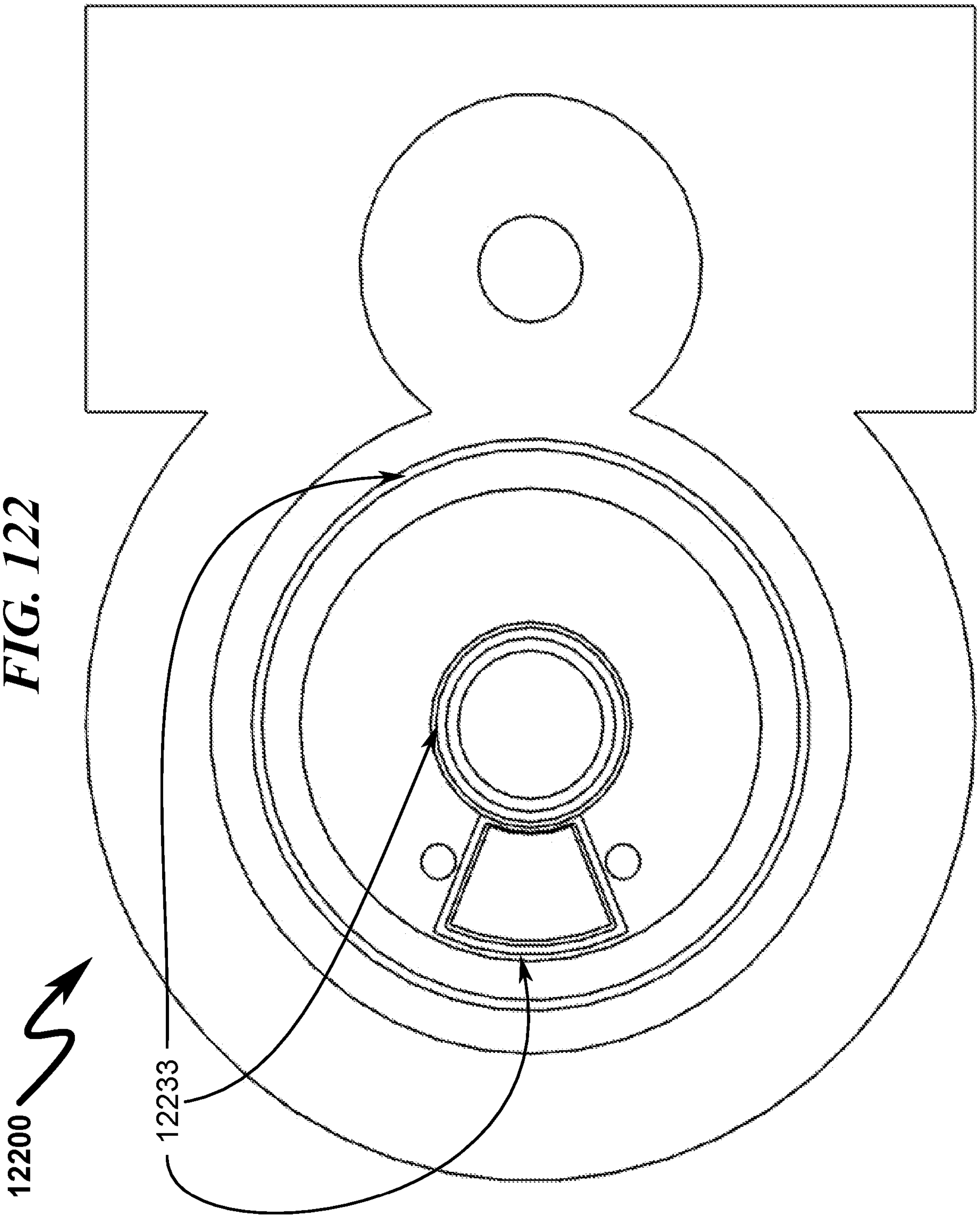

Detail views of the engine block cover grooves and ridges intake (IGC) (12233) and exhaust (EGC) (12673) are generally depicted in FIG. 122 (12200)-FIG. 128 (12800).

The IGC (12233) can be configured to control the containment/sealing of compression gases between the outboard side of the RVD and the inner wall of the IEC (1732) while the EGC (12673) can be configured to control the containment/sealing of combusted gases between the outboard side of the RVD and the inner wall of the EEC (1772).

Both the IGC (12233) and EGC (12673) should be constructed utilizing high temperature metal parts coated with heat resistant ceramic powder coatings. This is to ensure that the components do not deform due to a change in temperature considerate of the operating characteristics of an ICE.

The present invention's IGC (12233) and EGC (12673) are identical. As such, only one needs to be depicted.

Intake/Exhaust Oil Seals (IOS)/(EOS) (9700)-(10400)

Figure 97:
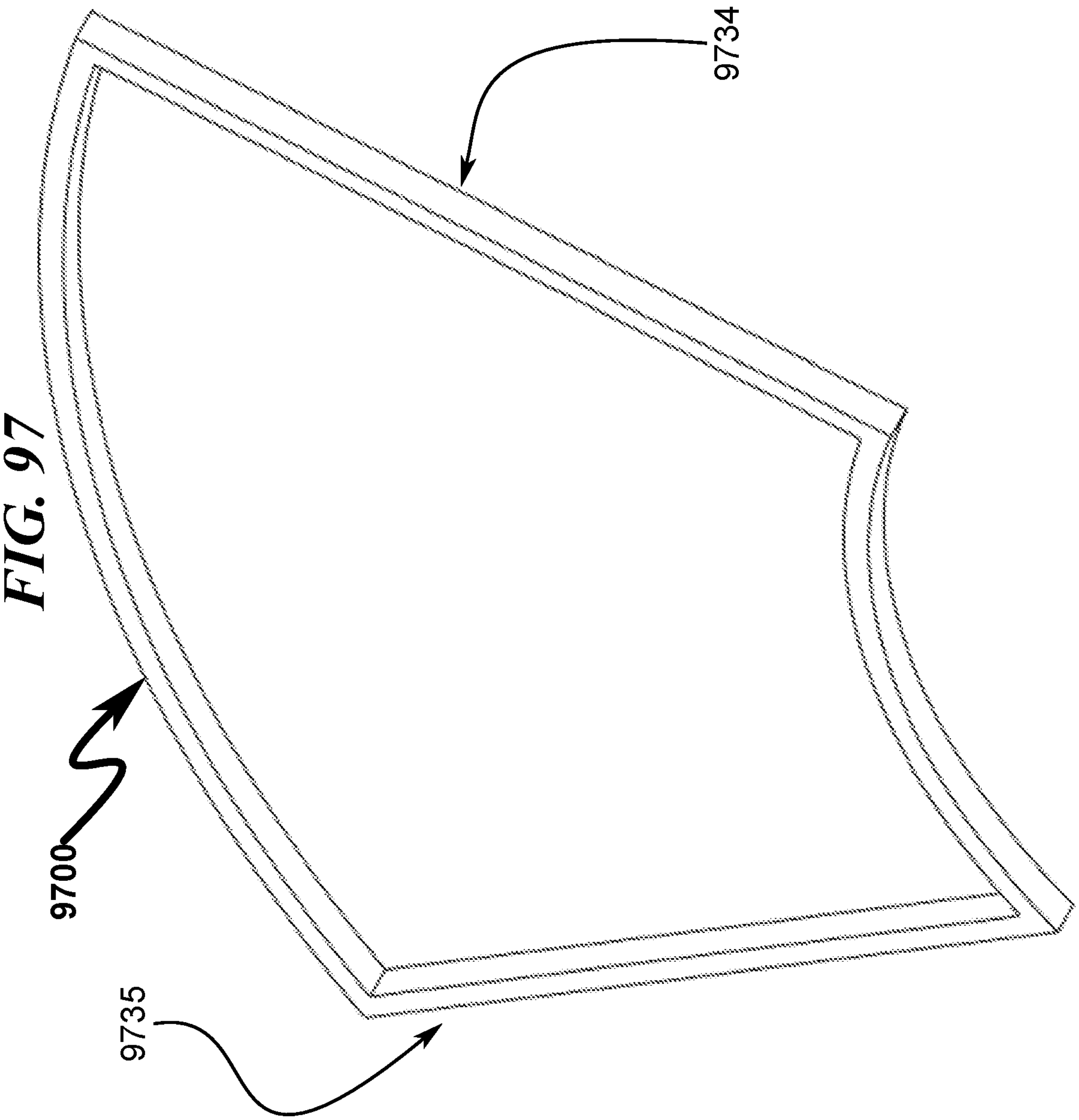
FIG. 97 illustrates a bottom left front perspective isometric view of a unitized oil seal and compression ring embodiment of a preferred exemplary invention system embodiment.
Figure 98:
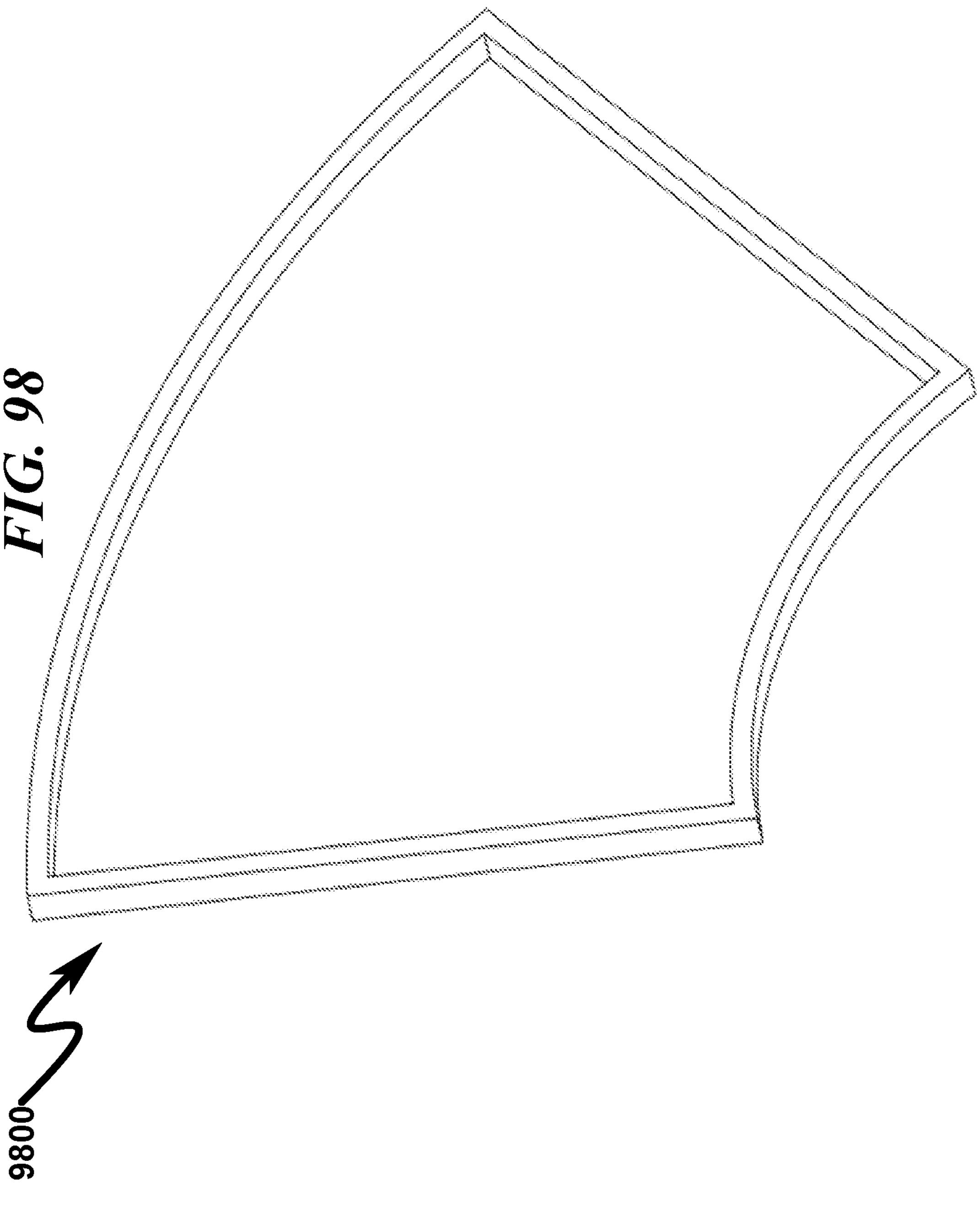
FIG. 98 illustrates a bottom right front perspective isometric view of a unitized oil seal and compression ring embodiment of a preferred exemplary invention system embodiment.
Figure 99:
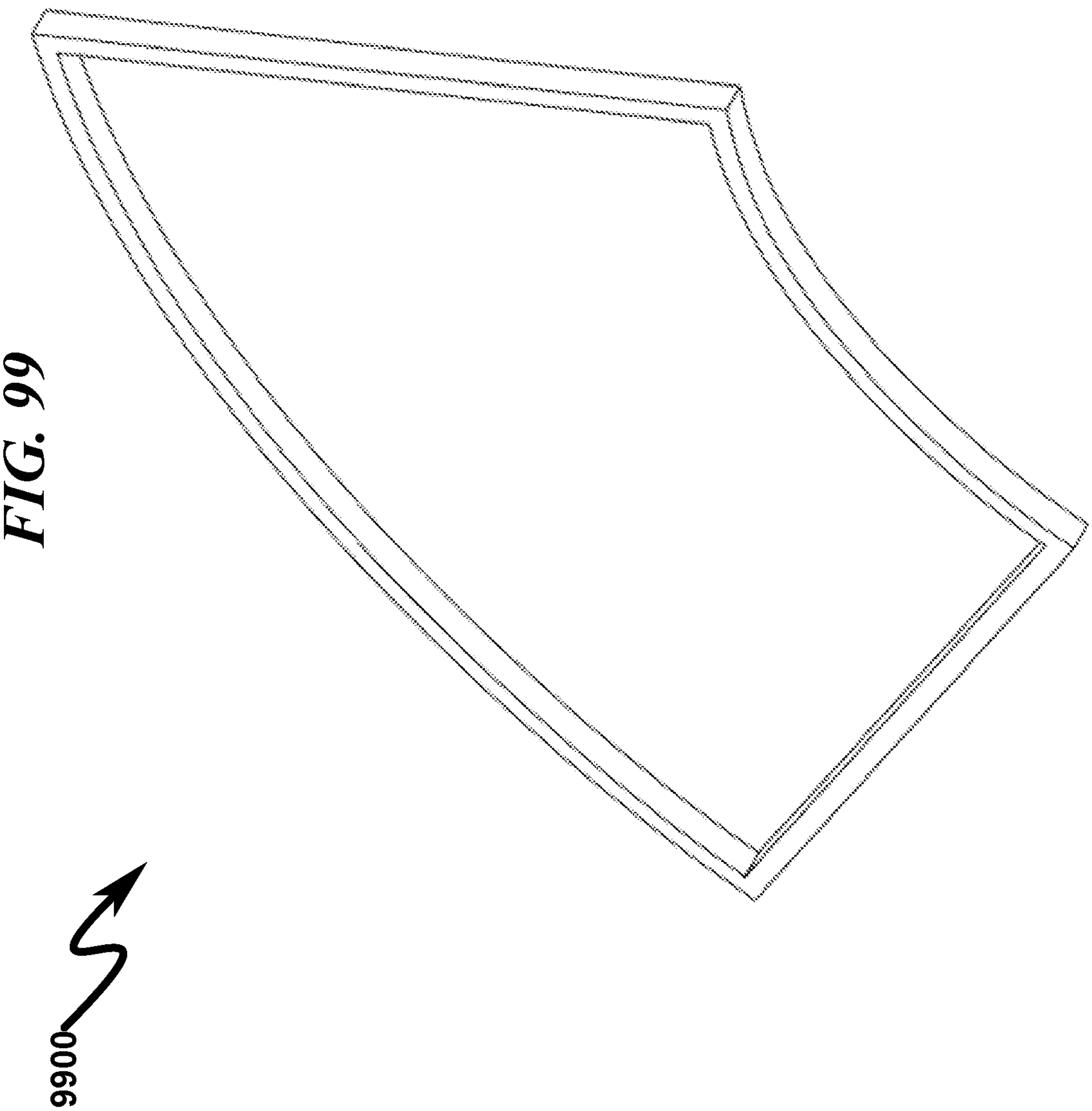
FIG. 99 illustrates a bottom left rear perspective isometric view of a unitized oil seal and compression ring embodiment of a preferred exemplary invention system embodiment.
Figure 100:
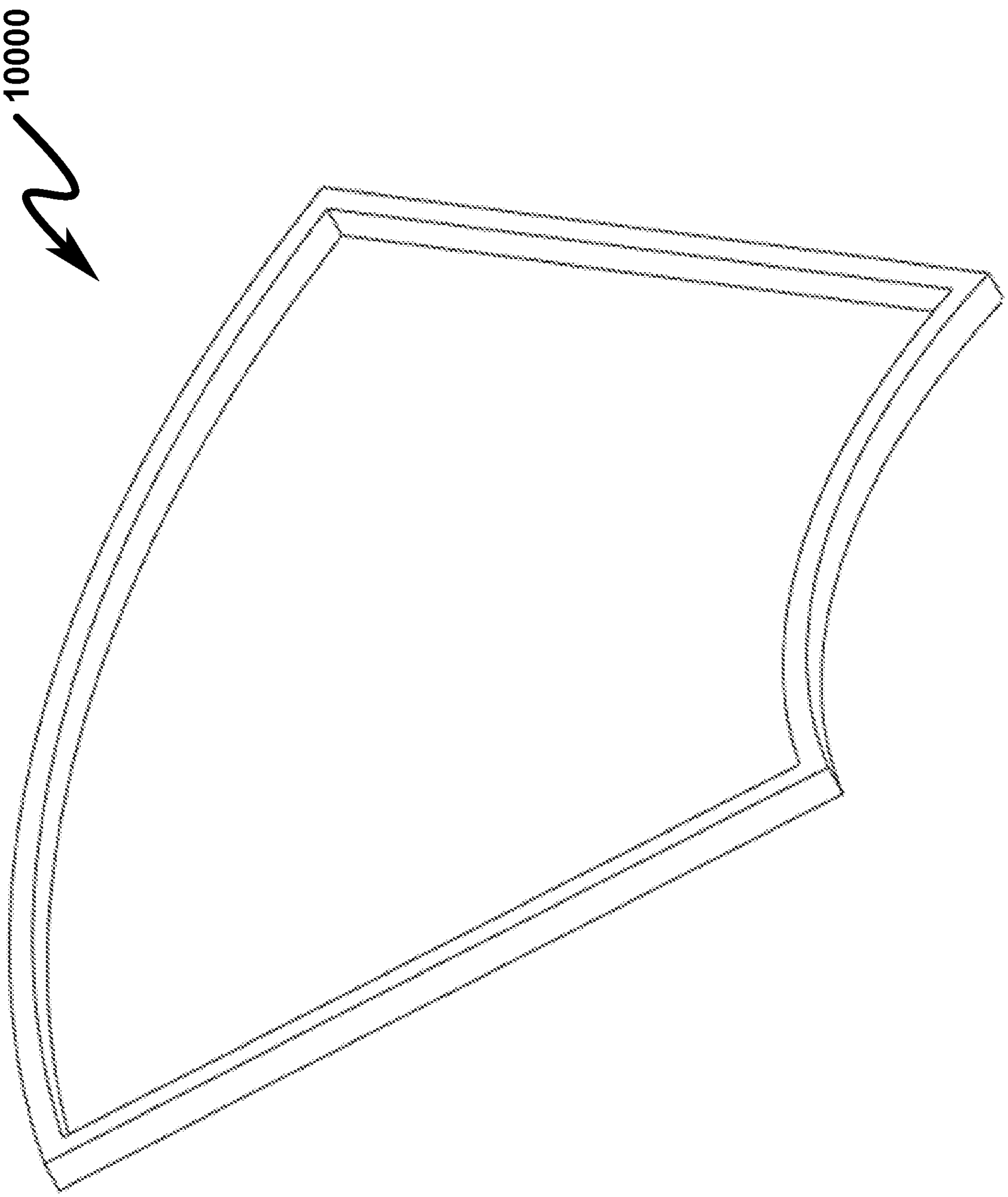
FIG. 100 illustrates a bottom right rear perspective isometric view of a unitized oil seal and compression ring embodiment of a preferred exemplary invention system embodiment.
Figure 101:
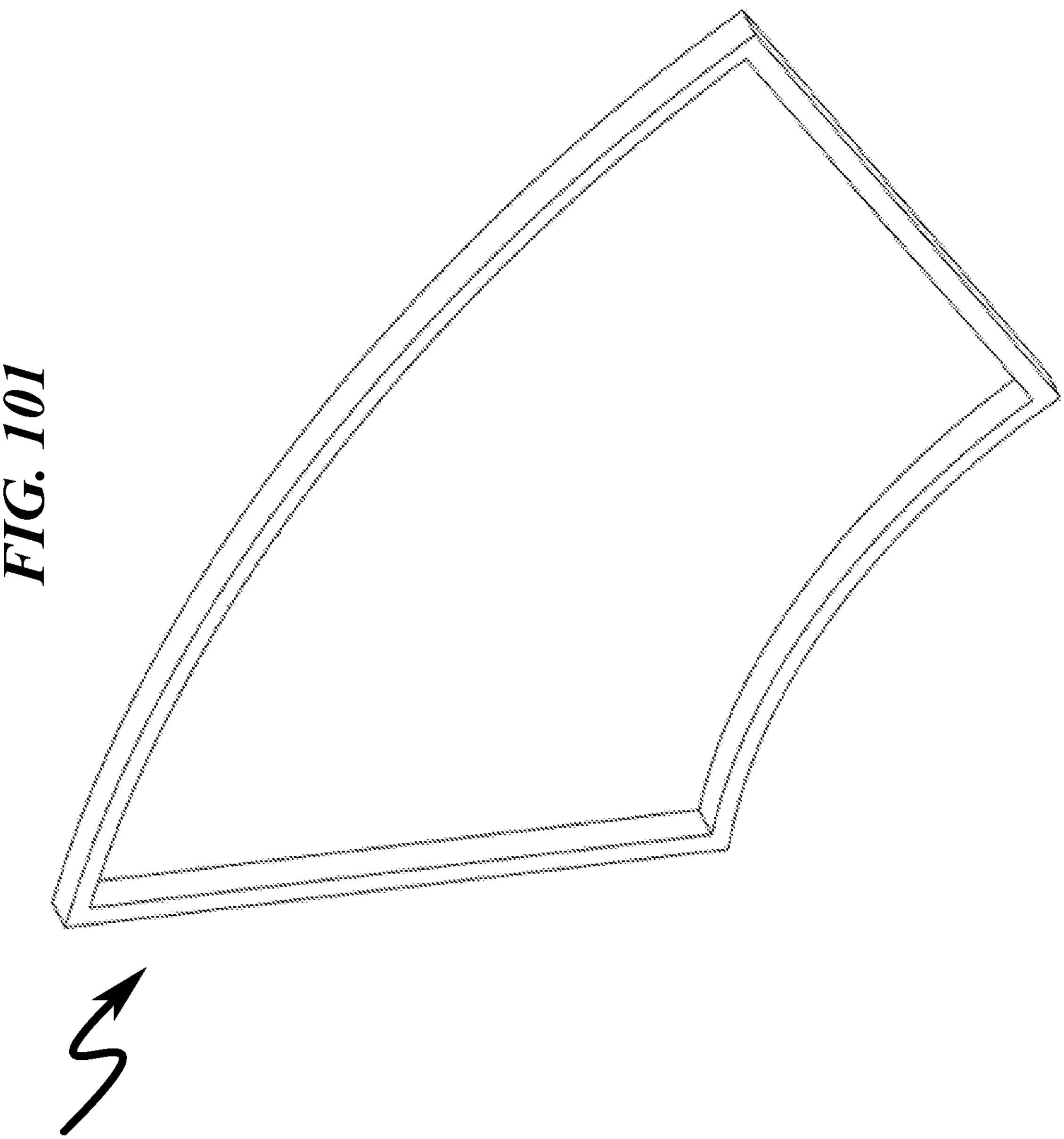
FIG. 101 illustrates a top left front perspective isometric view of a unitized oil seal and compression ring embodiment of a preferred exemplary invention system embodiment.
Figure 102:
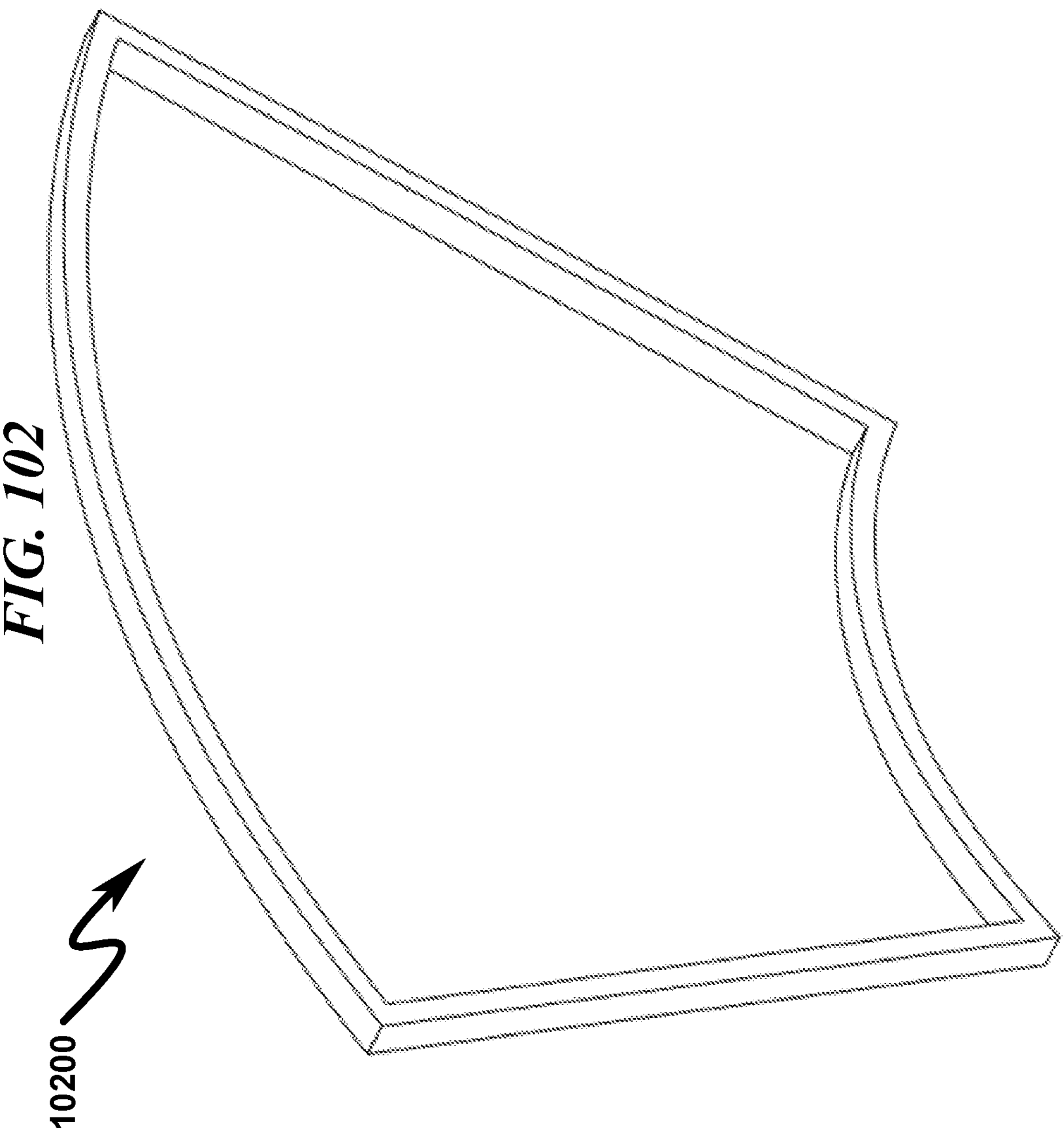
FIG. 102 illustrates a top right front perspective isometric view of a unitized oil seal and compression ring embodiment of a preferred exemplary invention system embodiment.
Figure 103:
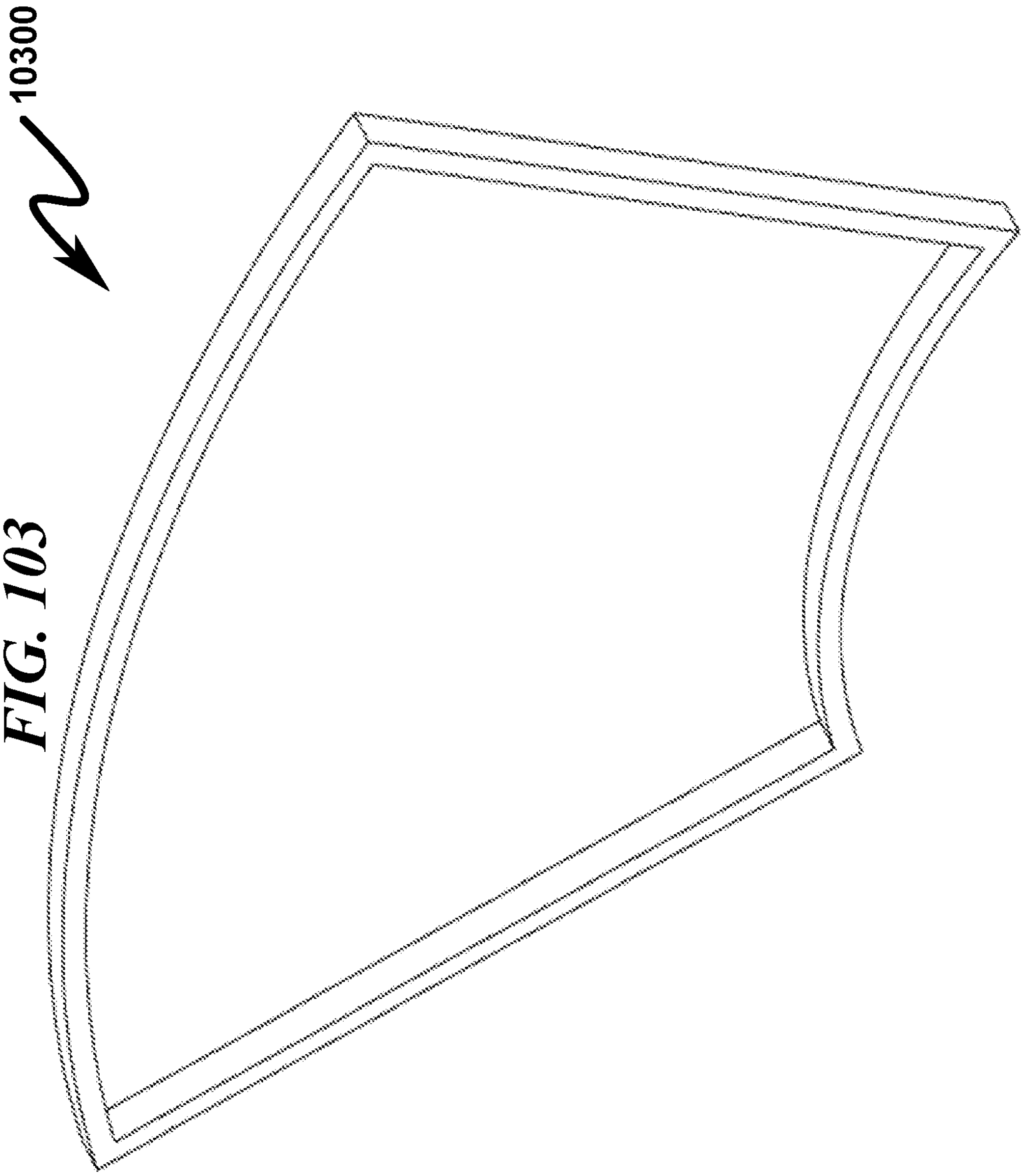
FIG. 103 illustrates a top left rear perspective isometric view of a unitized oil seal and compression ring embodiment of a preferred exemplary invention system embodiment.
Figure 104:
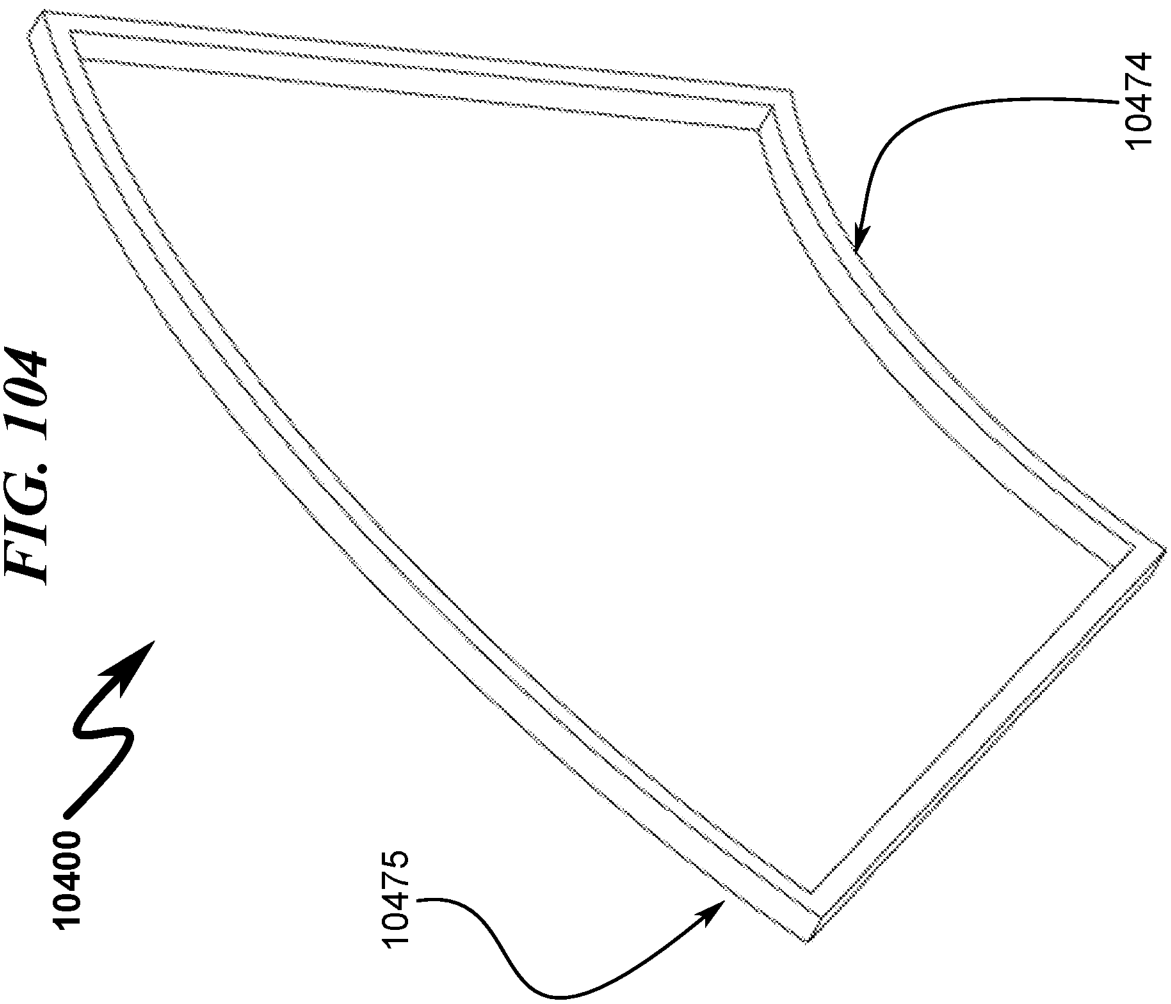
FIG. 104 illustrates a top right rear perspective isometric view of a unitized oil seal and compression ring embodiment of a preferred exemplary invention system embodiment.

Detail views of the oil seals, intake (IOS) (9734) and exhaust (EOS) (10474) are generally depicted in FIG. 97 (9700)-FIG. 104 (10400).

The oil seal grooves can be configured to control the inboard containment/sealing of lubrication oil. These oil seals can be used in concert with further compression sealing rings integral to the oil seal.

The oil seals can be deployed on the outside face of the CCH (15354) and inside face of the engine covers such that their supporting grooves are affixed on the inside face of the engine covers and outer walls of the CCH (15354).

The present invention's IOS (9734) and EOS (10474) are identical. As such, only one needs to be depicted.

Intake/Exhaust Recessed Area (IRA) (ERA) (8100)-(8800)

Detail views of the recessed areas, intake (IRA) (8136) and exhaust (ERA) (8876) are generally depicted in FIG. 81 (8100)-FIG. 88 (8800).

The recessed areas can be configured to contain/seal off of the IVD (1752)/EVD (1758) such that they are compartmentalized and separated from other internal componentry in the BLK (1753).

As such the control and/or containment of the respective RVDs shields the rest of the ICE's internal componentry from the expected debris generated by the ceramic coatings as they wear down normally as would be expected and is well known to those skilled in the art.

This means that the ceramic material coatings must be thick enough to withstand the expected normal wear as the ICE is run as prescribed earlier in the Rudimentary Engine Overview. These ceramic material coatings on some models may be configured to be replaceable disc style mediums such that a systematic replacement profile regiment may be derived.

The present invention's IRA (8136) and ERA (8876) are identical. As such, only one needs to be depicted.

Molecular Airflow Through Rudimentary Engine Intake and Exhaust

Assembly Related Molecular Airflow

Figure 18:
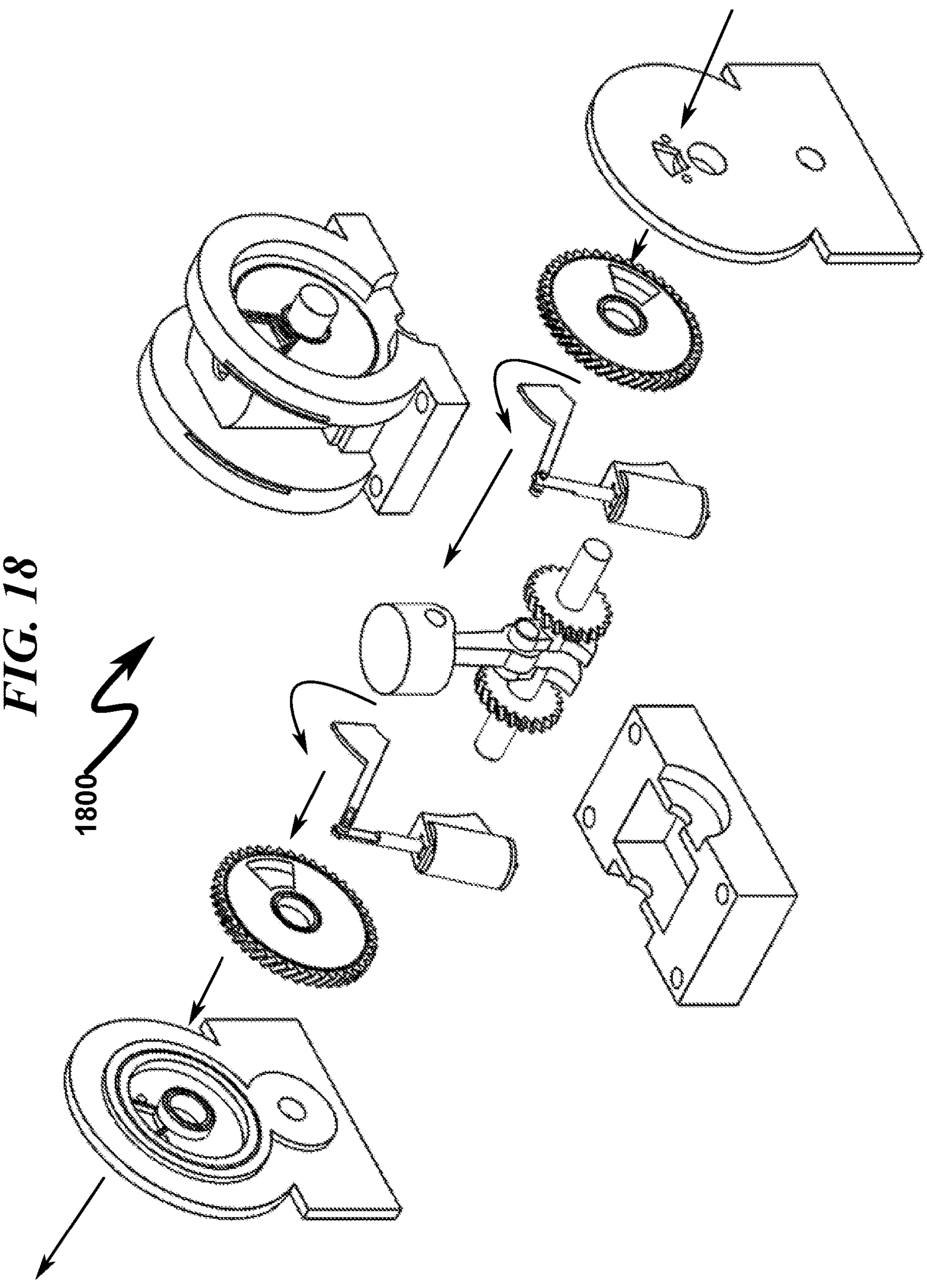
FIG. 18 illustrates a top right rear perspective isometric exploded view of a preferred exemplary rudimentary invention system embodiment.
Figure 19:
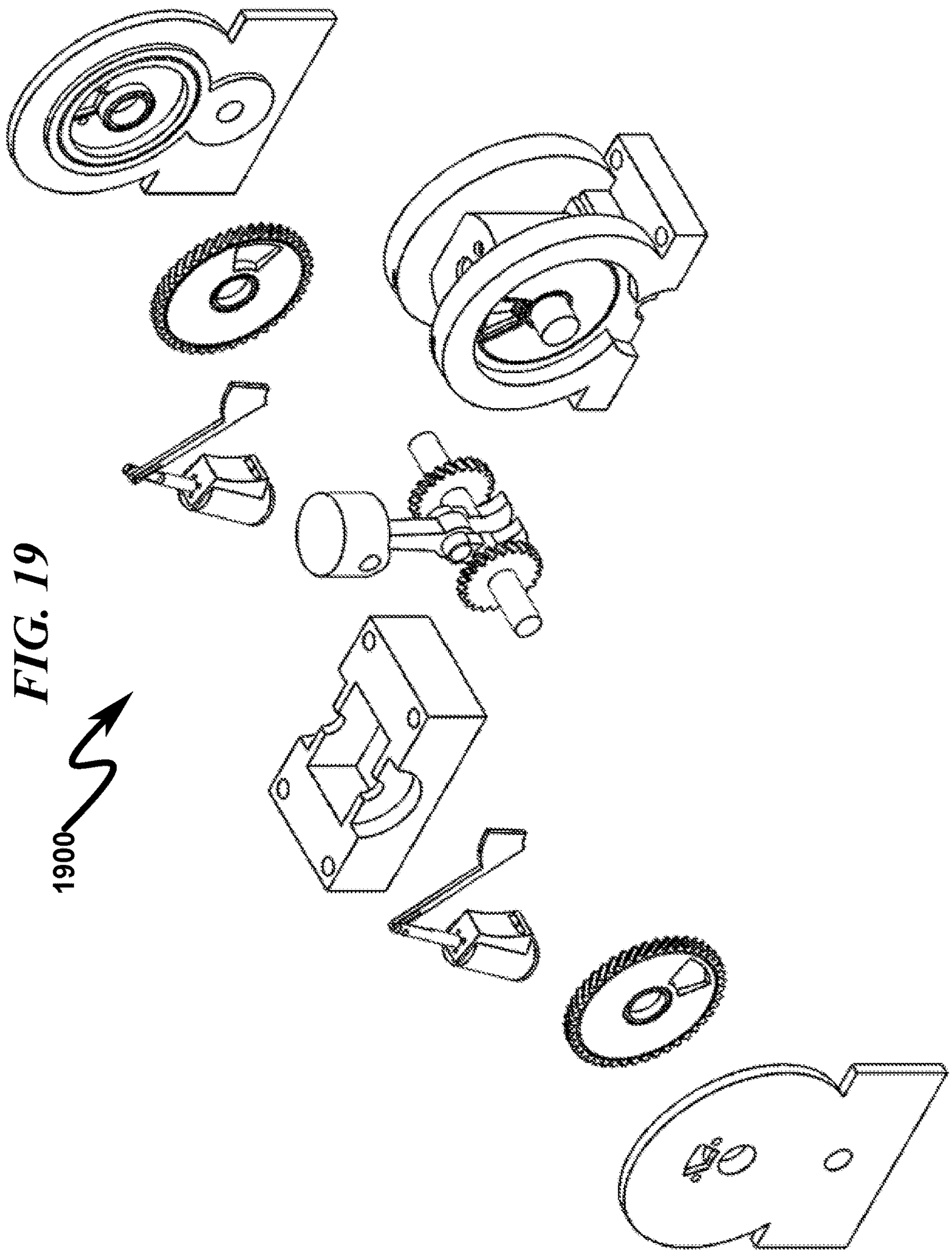
FIG. 19 illustrates a top left front perspective view isometric exploded of a preferred exemplary rudimentary invention system embodiment.
Figure 20:
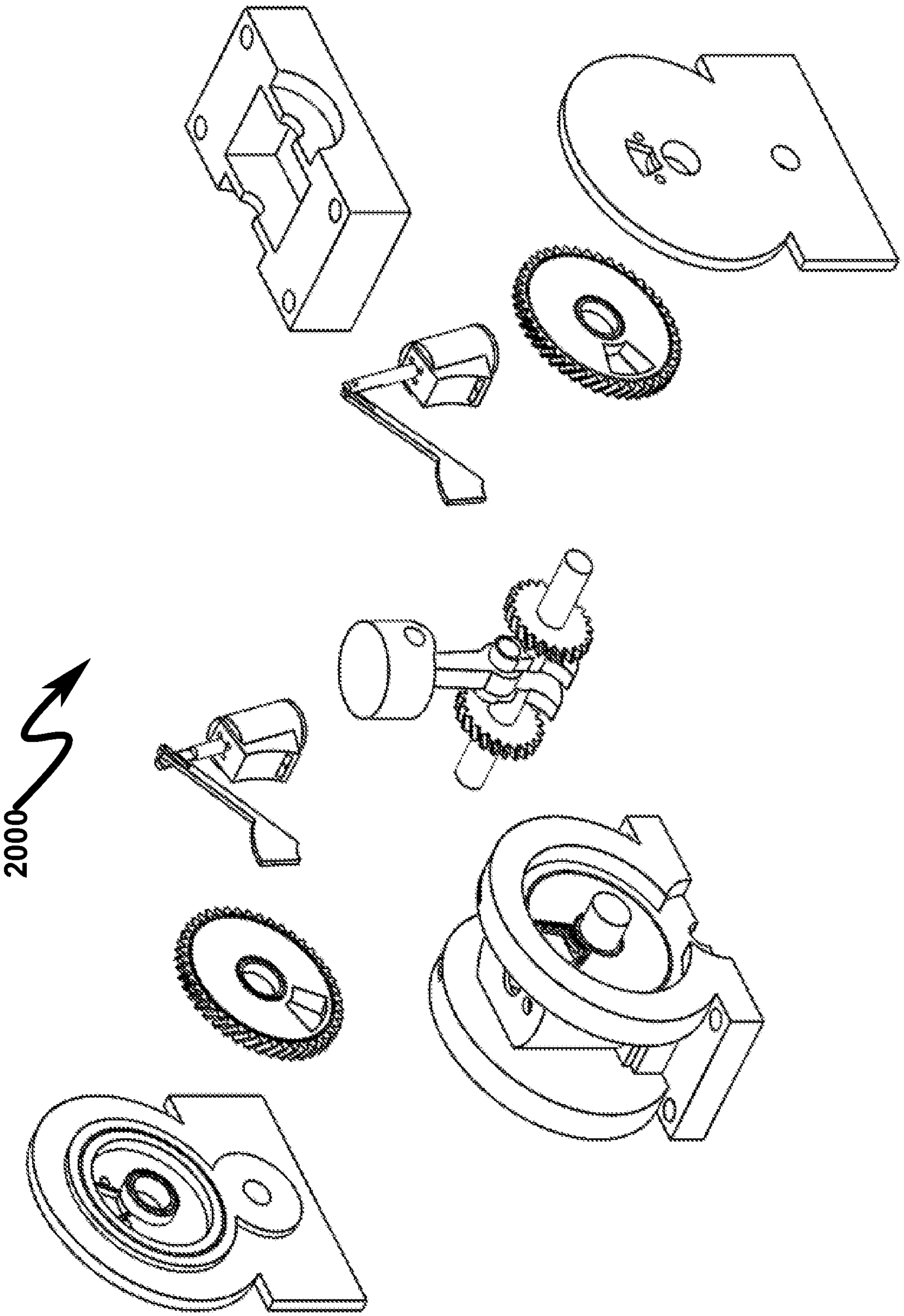
FIG. 20 illustrates a top left rear perspective isometric exploded view of a preferred exemplary rudimentary invention system embodiment.
Figure 21:
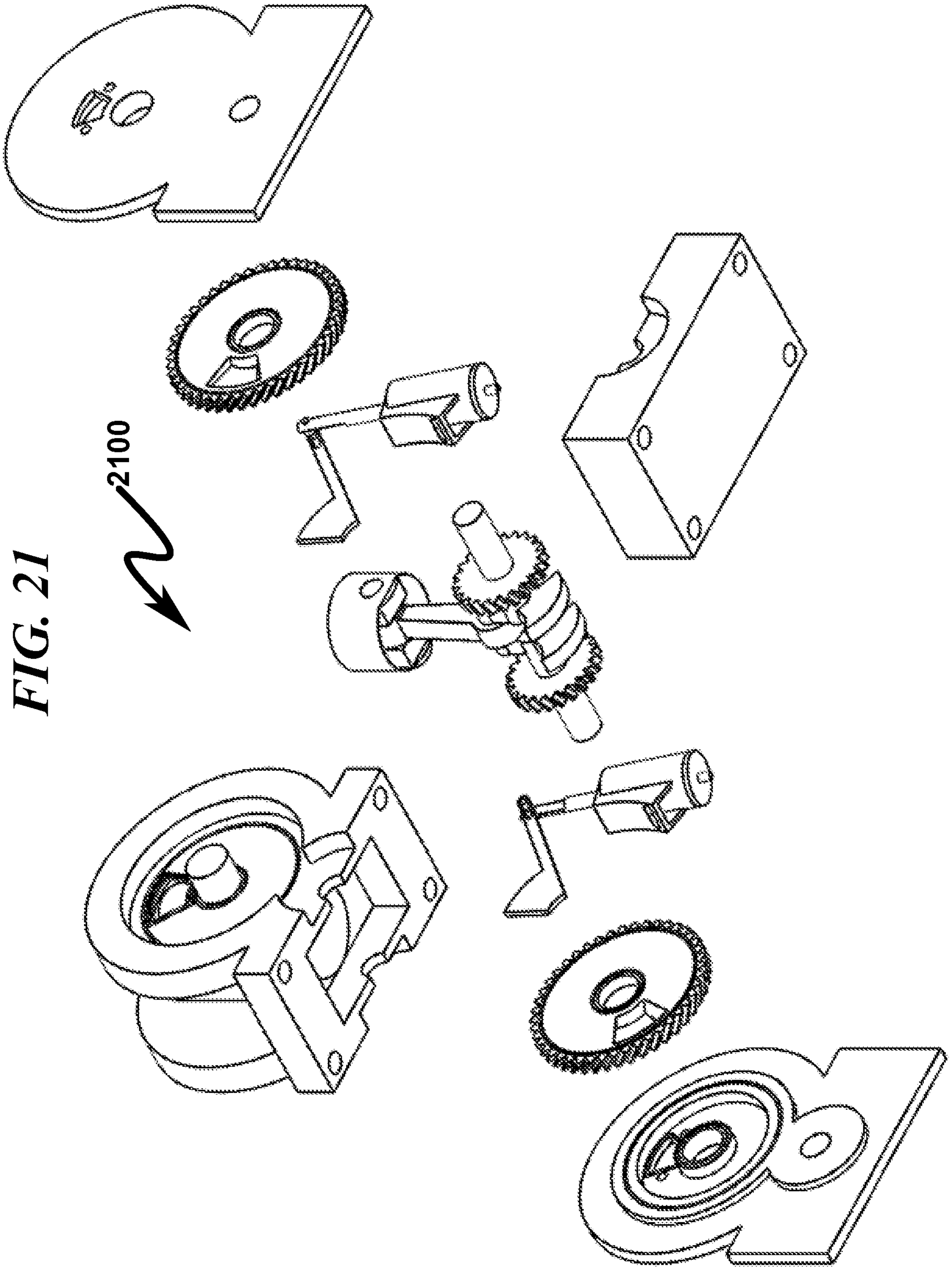
FIG. 21 illustrates a bottom right front perspective isometric exploded view of a preferred exemplary rudimentary invention system embodiment.
Figure 22:
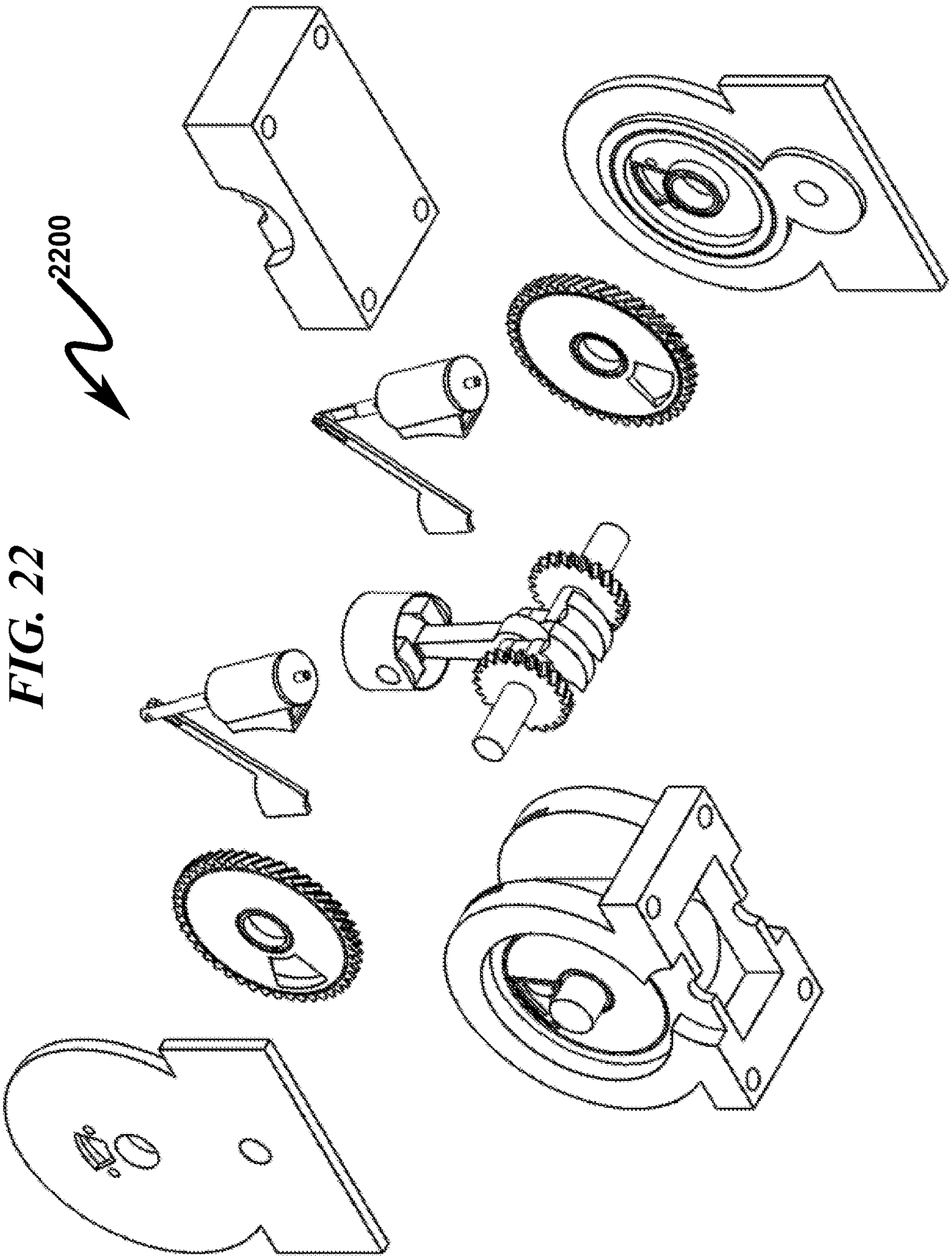
FIG. 22 illustrates a bottom right rear perspective isometric exploded view of a preferred exemplary rudimentary invention system embodiment.
Figure 23:
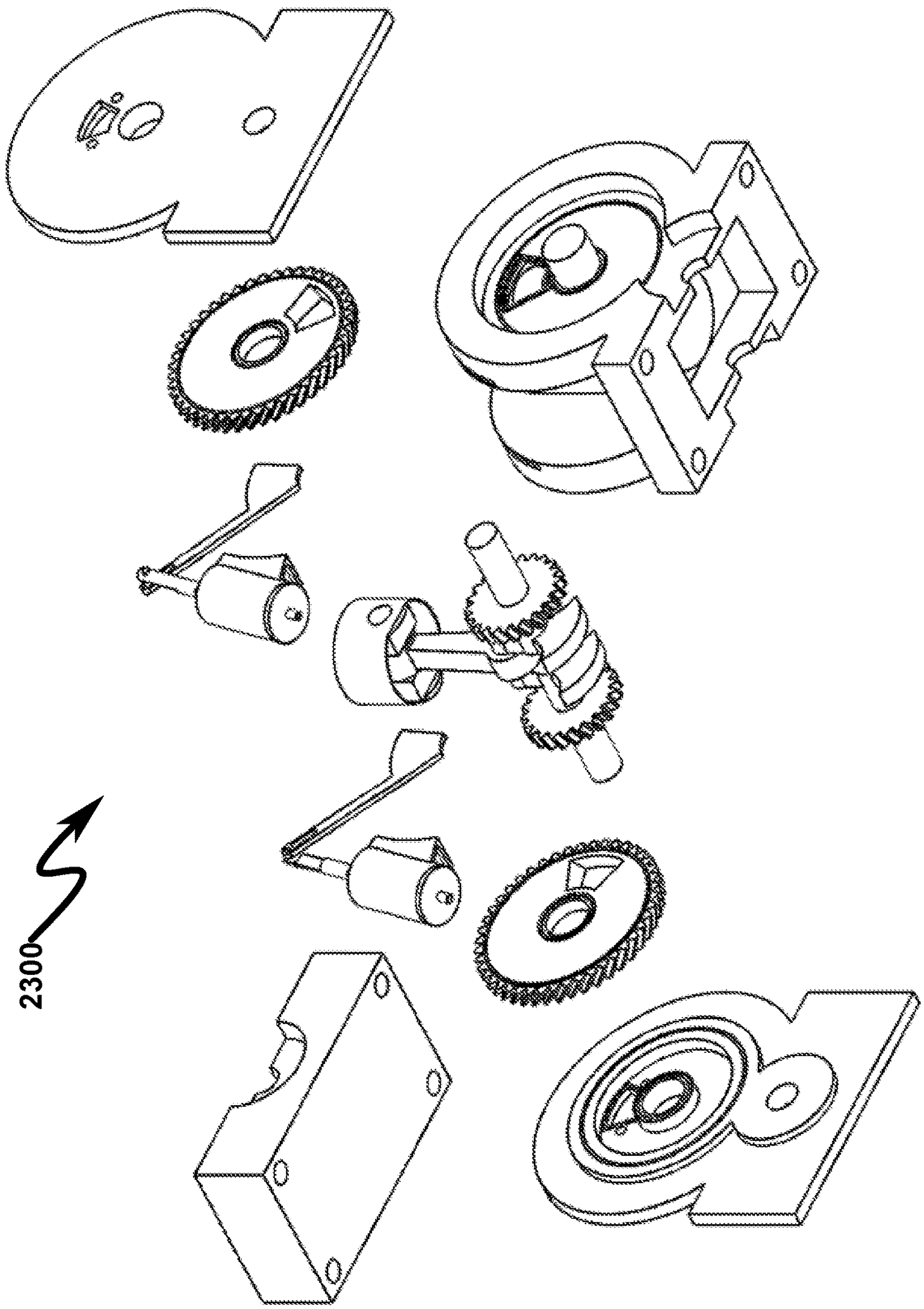
FIG. 23 illustrates a bottom left front perspective isometric exploded view of a preferred exemplary rudimentary invention system embodiment.

Detail views of the related molecular airflow through the assembly are generally depicted in FIG. 18 (1800).

The present invention as embodied in rudimentary form coordinates the related molecular airflow through the following components:

- Intake molecular airflow
- Exhaust molecular airflow

The Molecular Airflow Profile, as depicted by the chain of arrows in FIG. 18 (1800), starts at the intake runner of the IEC (1732), passes through the IVP (7351) of the IVD (1752) alignment with the IFP (8941), modulated by the IMV (1740), compressed ignited powered and expelled by the reciprocated RPI (1707) movement inside the CCH (15354), modulated by the EMV (1760), passes through the EVP (7659) of the EVD (1758) alignment with the EFP (9061) and then completes at the exhaust runner of the EEC (1772).

The annular sectored conical frustum (ACF) shaped port opening enables the IVP to perform its valve method as efficiently as it does because it maintains a constant port opening height that does not vary throughout the range or duration of the valve opening.

The molecular airflow is initialized at the instantaneous moment that the IVP begins its opening duration and the RPI (1707) initializes its downward reciprocated travel in the CCH (15354) during the Intake Stroke.

As the IVP opens wider, the flow of air and fuel molecules increase until the 100% port opening of the IVP is achieved. Then, the molecular airflow profile begins to diminish due to the IVP entering into its closing portion of its duration and since the port retains its constant opening height vector throughout its operation, the valve sequence receives a superior performance profile that doesn't rapidly pinch off the port opening before the IVP is actually closed. This rapid pinch is an inherent flaw in other valve systems as is well known to those skilled in the art. The same characteristic benefits are afforded to the EVP such that a more complete exhausting of the combusted gases is realized.

Rudimentary Molecular Airflow Path

Detail views of the intake and exhaust rudimentary molecular airflow path is generally depicted in FIG. 18 (1800).

The rudimentary ICE molecular airflow path begins at the IEC (1732) and discharges at the EEC (1772) such that the following sequence occurs:

- Intake air molecules enter the IEC during the Intake Stroke.
- These air molecules travel through the IEC.
- The air molecules are then received by the IVD's IVP upon its alignment with the IFP (8941).
- The IFP (8941) transmits the air molecules to the IMB.
- The IMB provides for a reciprocated modulated restriction or delay as the air molecules are further transitioned through the IFP (8941) while heading into the CCH.
- The air molecules mix with the direct injected fuel in the CCH.

- The PDT of the CCH compresses and ignites the air-fuel mixture during the Compression and Power Strokes.
- The CCH discharges the combusted gases once the EVD's EVP opens upon its alignment with the EFP (9061) during the Exhaust Stroke.
- The EMB provides for a reciprocated modulated restriction or delay as the air molecules are further transitioned through the EFP (9061).
- The EFP (9061) transmits the combusted gases into the EEC.
- The EEC transmits the combusted gases out to the exhaust system.

The molecular airflow is then processed into the preferred exhaust system and then onto the atmosphere.

Intake/Exhaust Molecular Airflow Profile

The Molecular Airflow Profile of the intake and exhaust are different as the intake has a relatively cooler operation temperature while the exhaust has an extremely hot operation temperature.

Generally, temperatures of 500° C.-700° C. (932° F.-1293° F.) are produced in the expanding exhaust gases. Hence, the componentry used on the exhaust side of the engine block has to be made of materials that can resist high temperatures and exhibit low frictional coefficients.

Inversely, the intake temperatures of 80° C.-90° C. (180° F.-195° F.) are typically produced in the intake manifold air molecules by the normal aspiration of an ICE. Accordingly, the componentry used on the intake side of the engine block would not be expected to withstand the high temperatures of the exhaust. However, they must also exhibit low frictional coefficients in terms of airflow and part movement.

Owing to the combination of the MSV and the rotary valve of the present invention working in concert to achieve its superior volumetric filling and more complete exhausting of the CCH (15354), the present invention's conceptualized operation is able to achieve higher revolutions per minute (RPM) and greater performance with less environmentally harmful tailpipe emissions.

The Present Invention Valve Port Opening Shape

The present invention incorporates an "annular sectored conical frustum" (ACF) shaped valve port opening which is construed strictly in the mathematical sense. Detail views of the ACF port shape is generally depicted in FIG. 73 (7300)-FIG. 80 (8000) and FIG. 241 (24100)-FIG. 248 (24800).

The mathematical definition of an annular sector is "the region between two concentric circles" while the mathematical definition of concentric circles is "if two or more circles have the same center point origin or common center, they are termed as concentric circles."

The mathematical definition of a frustum is "the portion of a solid that lies between one or two parallel planes cutting it." A right frustum is a parallel truncation of a right pyramid or right cone.

In the case of the present invention, its annular sectored area is cut by a "conical frustum" in a twisting fashion between the "annular sectored" concentric circles. This acts as a blade directing the airflow into and out of the mated rotary and fixed ports in a twisting fashion into and out of the combustion chamber.

This is illustrated by the following drawings depicting the Applicant's claimed invention (using an annular sectored conical frustum) in FIG. 73 (7300) to FIG. 80 (8000) and FIG. 241 (24100)-FIG. 248 (24800).

The present invention's chosen port structure as defined incorporates an "annular sectored conical frustum" port structure as depicted in the drawings, and supported with specific claims limitations that the term "annular sectored conical frustum" is to be construed strictly in the mathematical sense (as is clearly depicted in present invention's drawings), as an element not detailed or cited in any prior art known to applicant.

The current port shape of the present invention is slightly different from its earlier depicted annular sector port shape and is best described as an annular sectored "conical frustum", where the shape of the port is like a sliced part of a cone fitted onto two concentric circles with the referenced elements all incorporated such that it creates a port opening that sort of consistently wipes across its identical mated fixed port in such a fashion that it varies only the width and retains an inherent consistent height vector while also affording an additional push of the molecules resident in front of the conical frustum blade like shape for its resultant port opening as it is rotated through its port opening duration.

This ACF port shape in its IFP (8941) and EFP (9061) as well as the mating IVP (7351) and EVP (7659) has a superior molecular tumbling ability as the molecules swirl into and then out of the combustion chamber in a sort of cyclonic moving effect. The Intake Stroke causes the molecules to flow into the combustion chamber in a downwards spiraling fashion while the Exhaust Stroke pushes the air and gas molecules in an upwards spiraling fashion, both resembling the action or movement often referred to as a cyclonic action.

The size characteristics of the ACF port shape are not limitive and a simple variance of the span and angles of the "annular sectored" or the "conical frustum" portions of the port opening can further enhance/reduce the effective spectrum of the molecular swirling effect. This variance will also affect the rate of molecular tumbling exercised on the gas molecules which in turn affect the inherent inundate/emanate atomization flow characteristic of the combustion chamber.

Both of these factors results in a consistent height disposition that does not exhibit the inherent characteristic flaw which is present in most other port shapes used in rotary or POPPET valve ICE examples where the geometry of their port openings ability gets in the way and cancels out/reduces its own ability to fully realize a maximum volumetric combustion chamber valve efficacy.

In the exemplary present invention the RVP shape resides on two specific geometrical angles such that the left most angle is 112.50° and the right most angle is 67.50° inside of two concentric circles. These two angles are specific but not limitive since the maximum port opening duration allowed by the cyclic 4-stroke regiments dictate that there is only an initial allowable 90-degree port opening duration (RVD rotation) in a 4-stroke ICE and a 180-degree port opening duration (RVD rotation) in a 2-stroke ICE.

These are the basic regiment that can be further researched and experimented on to provide concepts such as valve overlap, valve retard, valve advance, and a concordance of limitless orientations such that they also attempt an attitude towards stoichiometric efficiency. Any other rotary valve port opening will result in less compression to be achieved or less volumetric efficiency into or out of the combustion chamber.

This specific port shape design of the present invention was chosen because it has a "geometrical advantage" over any other rotary valve port opening shape in that no matter the size of the ICE, characteristically; the ACF port shape offers a greater volumetric opening for the induction of air molecules into the combustion chamber. Other shaped port openings cannot allow a comparable amount of molecules per the valve opening duration in its cyclic timing sequences.

This means that for each cycle the present invention RVP opens its orifice wider than any other geometrical shaped rotating valve port, thus allowing more molecules to enter into and exit out of the combustion chamber before sealing it off due to its continuous rotation.

Prior Art Comparisons (25100)-(25500)

One of the defining characteristics of the present invention is its annular sectored conical frustum (ACF) shaped valve port opening. As discussed in the previous section, its deployment adheres to the mathematical definition of an annular sectored conical frustum shape because the sector of its deployment resides between two concentric circles having the same point of origin and its conical frustum is the portion of a solid that lies between one or two parallel planes cutting it. In the case of the present invention, its conical frustum is cut in a twisting fashion between the concentric circles.

In contrast to the present invention, the prior art rotary valve examples of the POSH, DIROSS, and PATTAKOS port opening shapes are non-annular sectors since all their deployments reside between two or more eccentric circles.

The mathematical definition of eccentric circles is as follows: if two or more circles have different center point origins, they are termed as eccentric circles. Given these mathematical definitions, the sector area of a region that is between two eccentric circles then has to be non-annular as the mathematical definition of an annular sector cannot be adhered to in these prior art examples.

Since the difference between concentric and eccentric circles (geometry) is that concentric (geometry) is having a common center point origin while eccentric (geometry) is not having a common center point origin, an annular sector is concentric if its referenced circles origins are the same and a non-annular sector is eccentric if its referenced circles origins are not the same.

The ACF shaped port opening of the present invention is depicted in detail in FIG. 73 (7300) to FIG. 80 (8000) and FIG. 241 (24100)-FIG. 248 (24800). The port opening shape of the prior art examples of POSH in FIG. 252 (25200); DIROSS in FIG. 253 (25300) and PATTAKOS in FIG. 254 (25400) as depicted clearly have a different sectored area than the structures disclosed by the present invention as depicted in FIG. 251 (25100).

It should be further noted specifically that the annular sectored conical frustum depicted in the drawings of the present invention have sharp corners at all of its extents of the radial sectored openings. Whereas these elements are not present, disclosed, or suggested in the three prior art examples. As such, the disclosure of the present invention clearly identifies that it differs from the geometry of the POSH/DIROSS/PATTAKOS prior arts.

In the ensuing analysis, this difference in the port opening shape geometry and other aspects/features of the present invention as compared to the POSH, DIROSS and PATTAKOS prior art example will be evaluated.

Differentiating the POSH Prior Art

The present invention differs significantly from the POSH prior art in the following areas:

(1): The POSH rotary valve disc example does not teach the use of the mathematically defined ACF shaped rotary valve port opening in any of its fixed or rotary valve port openings. Whereas the present invention teaches the use of the mathematically defined ACF shaped valve port opening in all of its fixed and rotary valve port openings.

(2): The POSH rotary valve port example utilizes a port shape that is an elliptical sector bordered by two eccentric circles. The formation of this port shape is nothing like the present invention's port opening shape because it varies both its height and width throughout its alignment of its mating to the fixed port as can be clearly seen in element "B" in FIG. 255 (25500). This results in a reduced high RPM limit that is currently referred to as "starving the engine for air", as is well known to those skilled in the art, whenever a valve mechanism varies both its height and width.

Whereas the present invention adopts an ACF shape port opening in its entire valve port deployments. This ACF port shape maintains a consistent height vector throughout its alignment of its mating to the fixed port as it rotates around the outside wall of the combustion chamber as is depicted in element "A" in FIG. 255 (25500).

The POSH chosen port shape results in a condition wherein the valve openings respond in a less volumetric efficient use of the displacement area of the POSH combustion chamber. Whereas the present invention is configured such that the mathematical definition of an ACF shape fixed port is used to mate with the identically shaped rotary valve port. This enables the present invention to utilize every applicable micron of the displacement available in its combustion chamber.

(3): The POSH rotary valve disc example is configured such that POSH depicts a non-ACF shaped fixed port to mate together with its non-ACF shaped rotary valve port opening according to the mathematical definition of an ACF shaped rotary port. Whereas the present invention is configured such that the mathematical definition of an ACF shape fixed port is used to mate with the identically shaped rotary valve port.

(4): The POSH rotary valve disc example does not separate the intake rotary valve disc from the exhaust rotary valve disc. This use of a single rotary valve disc exposes the ICE to the extreme high temperature present during the Exhaust Stroke. When this superheated valve opens for the following Intake Stroke, the POSH rotary valve disc example will more than likely experience fuel predetonation. Whereas the present invention separates the intake rotary valve disc from the exhaust rotary valve disc. This further shows that the present invention engine is structurally different than the POSH design and likely to be more fuel efficient than POSH.

(5): The POSH rotary valve disc example does not teach a 2-stroke operation of his rotary valve disc. Whereas the present invention is both 2- and 4-stroke operation possible and this 2- and 4-stroke valve operation is not limitive.

(6): The POSH rotary valve disc example does not teach the use of a designated oil reservoir. This is due to the fact that POSH does not provide for the presence of an oil reservoir and mixes its fuel with oil in the crankcase where the oil reservoir would normally be located to lubricate the ICE's internal moving parts.

Whereas the present invention has an oil reservoir which makes it superior to the POSH example in terms of internal and external moving parts lubrication that is facilitated by either the splash of or the high pressure pumping of lubrication oil from the oil reservoir resulting in greater fuel efficiency and cleaner emissions, as is well known to those skilled in the art.

(7): The POSH rotary valve disc example 4-stroke ICE burns some of the lubricating oil in the combustion chamber in its attempt to lubricate itself and produce power. The result of doing this is dirty exhaust pipe emissions. Whereas the present invention does not burn its lubricating oil in the combustion chamber as it has its separate oil reservoir for lubrication, thereby resulting in cleaner exhaust pipe emissions than does the POSH example.

It is well known to those skilled in the art that 2-stroke engines produce a lot of pollution because the air-fuel mixture in them gets contaminated with the engine's lubricating oils. The combustion chamber draws in this contaminated mixture of oil and gas, resulting in some of the unburned or incombustible components of this contaminated mixture gets expelled along with the exhaust gases through the exhaust port.

Normally, only 2-stroke engines burn an oil-gasoline mixture. However, POSH created a hybrid 4-stroke ICE that uses the same fuel mixing vocation as would normally be found only in 2-stroke ICEs. Owing to this, the POSH ICE will emit more smoke, carbon monoxide, hydrocarbons, and other particulate matter than the gas-only 4-stroke ICEs and the present invention's 2- or 4-stroke ICE.

Neither of the present invention's 2- or 4-stroke ICEs mixes any oil in together with the fuel since they all have oil reservoirs for their moving parts lubrication. In this way, the present invention ICEs offer the power capability of a 2-stroke without the drawback of it burning oil with its fuel, thereby resulting in cleaner operation.

(8): The POSH rotary valve disc example does not teach a sealing vocation to address containment of the compression or combustion gases. Whereas the present invention incorporates a sealing apparatus comprising distinct sealing vocations that ensure an effective operational profile by containing the fluids and compression.

(9): The POSH rotary valve disc example does not teach an air fuel mixture which is accomplished inside of the combustion chamber. Whereas the present invention mixes its air and fuel molecules inside of the combustion chamber using a direct injection method for the fuel. It is commonly noted in the art of ICE that mixing the air-fuel mixture inside of the combustion chamber is the most widely used method due to the inherent benefits and characteristic profile advantages attributable to mixing the air-fuel mixture inside of the combustion chamber.

(10): The POSH rotary valve disc example utilizes a carburetor as its fuel delivery system which is less fuel efficient than a direct injection system. Whereas the present invention uses a direct injection fuel delivery method. POSH does not teach a direct injection vocation as it is commonly practiced today and well known to those skilled in the art.

(11): The POSH rotary valve disc example does not teach any element to vary the relative size of its fixed port opening. Whereas the present invention incorporates the use of multi-staged valve (MSV) element on the intake and exhaust fixed ports. This feature determines the cross-sectional opening size of the combustion chamber's fixed intake or exhaust passageways. The further the MSV is inserted into the fixed ports passageway, the greater the molecular delay that is imposed. There are infinite MSV configurations possible, depictions are not limitive.

(12): The POSH rotary valve disc example does not teach the incorporation of a centrifugal advance system. Whereas the present invention provides for an advance on the intake and exhaust RVPs. This yields a greater versatility towards providing for a more effective volumetric efficient profile operation.

(13): The POSH rotary valve disc example does not teach the incorporation of a cooling system applied directly to the rotary valve device. Whereas the present invention provides for a cooling system directly adapted to the rotary valve elements and further employs an assist to the inherent ICE water pump as an added feature. This ensures that the ICE and its internal componentry remain cooler during its normal operational profile.

(14): The POSH rotary valve disc example does not teach a forced induction/discharge system. Whereas the present invention provides for a three-tiered forced induction/discharge profile that is inherent respectively to the intake and exhaust profiles. This allows for a greater induction of air molecules, as well as a more efficient and complete exhausting of the combusted gases, thereby increasing the present invention ICE's volumetric capability.

Differentiating the DIROSS Prior Art

The present invention differs significantly from the DIROSS prior art in the following areas:

(1): The DIROSS rotary valve disc example does not teach the use of the mathematically defined annular sectored conical frustum (ACF) shaped rotary valve port opening in any of its fixed or rotary valve port openings as can be clearly seen in element "C" in FIG. 255 (25500). Whereas the present invention teaches the use of the mathematically defined ACF shaped port opening in all of its fixed and rotary valve port openings.

(2): The DIROSS rotary valve disc example utilizes a port shape that is a non-ACF shape bordered by at least four eccentric circles. The formation of this port shape is nothing like the present invention's port opening shape because it varies both its height and width throughout its alignment of its mating to the fixed port as can be clearly seen in element "C" in FIG. 255 (25500). This results in a reduced high RPM limit as is well known to those skilled in the art.

Whereas the present invention adopts an ACF shape port opening in all of its valve port deployments. This ACF port shape maintains a consistent height vector throughout its alignment of its mating to the fixed port as it rotates around the outside wall of the combustion chamber as is depicted in element "A" in FIG. 255 (25500).

The DIROSS chosen port shape results in a condition wherein the valve openings respond in a less volumetric efficient use of the displacement area of the DIROSS combustion chamber. Whereas the present invention is configured such that the mathematical definition of an ACF shape fixed port is used to mate with the identically shaped rotary valve port. This enables the present invention to utilize every applicable micron of the displacement available in its combustion chamber.

(3): The DIROSS rotary valve disc example is configured such that DIROSS depicts a non-ACF shaped fixed port to mate together with its non-ACF shaped rotary valve port opening according to the mathematical definition of an ACF shaped port. Whereas the present invention is configured such that the mathematical definition of an ACF shape fixed port is used to mate with the identically shaped rotary valve port.

(4): The DIROSS rotary valve disc example separates its intake rotary valve disc from its exhaust rotary valve disc. However, the configuration utilized creates an uncompressible cavity within the upper portion of the combustion chamber which is depicted in the DIROSS patent drawings in FIG. 1, FIG. 7, FIG. 10, and FIG. 15. Furthermore, due to its claimed "dome shaped" block configurations, this additional cavitation in the upper region of its combustion chamber cannot be compressed by the travel of the piston and results in a diminished compression and combustion capacity.

Whereas the present invention separates its intake rotary valve disc from its exhaust rotary valve disc such that there is no uncompressible cavity formed in any portion of its combustion chamber. This shows that the present invention ICE is structurally superior to and likely to be more fuel efficient because it has more positive displacement utilization than does the DIROSS design. Furthermore, the present invention utilizes no such cavitation in its combustion chamber and is thus capable to compress the entire usable combustion chamber area as is well known to those skilled in the art as being the most efficient use of the combustion chamber.

(5): The DIROSS rotary valve disc example causes an inefficient use of the normal 2- or 4-stroke cyclic operations which will result in a higher degree of harmful particulate matter generated and expelled in its exhaust. It would be expected by those skilled in the art that the DIROSS design would have a higher than normal amount of unburned fuel particulate matter in its exhaust due to the unusual shape of the upper portion of its combustion chamber.

Whereas the present invention specifically structured its combustion chamber to limit and/or reduce the harmful particulate matter in its exhaust by reducing or eliminating any and all additional uncompressionable cavitation inside of the engine combustion chamber and head. It is well known to those skilled in the art that cavitation that is uncompressionable results in a high amount of uncombusted fuel being expelled in the Exhaust Stroke due to the combustion process being greatly diminished and cooled.

(6): The DIROSS rotary valve disc example makes a tight seal against a wear plate. This creates a metal-to-metal contact and leads to premature wear and recirculated debris being sent throughout the crankcase and associated moving parts. Whereas the present invention utilizes a compartmentalized recessed area where rotary valve disc lubrication occurs separately away from the ICE crankcase. This affords the present invention a cleaner operational environment and longer service life since there is less recirculatable debris.

(7): Furthermore, while the tight seal against the wear plate of the DIROSS example is its only sealing vocation, the present invention's sealing apparatus provides for further sealing through the use of its grooves and ridges as well as its powder-coated surfaces and oil seal and compression rings, resulting in even better sealing and a cleaner operational environment.

(8): The DIROSS rotary valve port example mates with a similar shaped fixed port that varies both its height and width while the rotary valve disc rotates through its mating alignment with the fixed port. This port shape causes a variance that has a similar effect on the flow of gas molecules pinching off the flow as it opens and closes. This port shape achieves only momentary maximum height utilization, i.e., just before it returns to its typical pinching off the flow of gas molecules as they flow into and out of the combustion chamber.

Whereas the present invention utilizes the exact same ACF shaped port opening in both its rotary valve ports and mating fixed ports. This allows for a greater volumetrical efficient use of the combustion chamber because it doesn't vary its constant height vector throughout its rotation through its mating alignment with its fixed port, resulting in greater performance and less harmful particulate matter to be expelled in the exhaust output.

(9): The DIROSS rotary valve disc example will cause either a poor compression or a diminished volumetric capacity condition such that its combustion chamber displacement will not be fully realized while it exercises its cyclic 2- or 4-stroke operation, resulting in a reduced high RPM limit. Whereas the present invention uses every useable micron of space in its combustion chamber due to its specific use of identical port geometry in its mating fixed and rotary valve port openings.

(10): The DIROSS rotary valve disc example does not teach the incorporation of a centrifugal advance system whereas the present invention provides for an advance on the intake and exhaust RVPs. This yields a greater versatility towards providing for a more effective volumetric efficient profile operation.

(11): The DIROSS rotary valve disc example is cooled utilizing only the expected typical ICE water jackets. These style water jackets only provide a minimum of the cooling capacity required to cool the rotary valve disc as they only cool a portion of the mating surface that the DIROSS rotary valve disc rides against.

Whereas the present invention incorporates a cooling channel spool apparatus applied directly to the rotary valve device such that the center most section of the rotary valve disc is immersed in the coolant flow of an ICE as well as utilizing the typically expected water jackets commonly associated with an ICE. This ensures that adequate cooling is provided for the intake and exhaust rotary valve discs.

The DIROSS rotary valve disc example does not teach the incorporation of a cooling system directly to the rotary valve disc device. Whereas the present invention provides for a cooling system directly adapted to the rotary valve elements and further employs an assist to the inherent ICE water pump as an added feature. This ensures that the ICE and its internal componentry remain cooler during its normal operational profile.

(12): The DIROSS rotary valve disc example does not teach a forced induction/discharge system. Whereas the present invention provides for a three-tiered forced induction/discharge profile that is inherent to the respective intake and exhaust profiles. This allows for a greater induction of air molecules, as well as a more efficient and complete exhausting of the combusted gases, thereby increasing the ICE's volumetric capability.

Differentiating the PATTAKOS Prior Art

The present invention differs significantly from the PATTAKOS prior art in the following areas.

(1): The PATTAKOS rotary valve disc example does not teach the use of the mathematically defined ACF shaped port opening in any of its fixed or rotary valve port openings. Whereas the present invention teaches the use of the mathematically defined ACF shaped port opening in all of its fixed and rotary valve port openings.

(2): The PATTAKOS rotary valve port example utilizes a port shape that begins as an elliptical cavity between two eccentric circles and transitions into a round or circular port opening against the centermost area of the engine head where the mating fixed ports are deployed. These unitized rotary valve discs are deployed in such a fashion that they oppose one another on the uppermost portion of the engine head.

The PATTAKOS transitioning port shape is nothing like the present invention's port opening shape because it varies both its height and width throughout its rotational alignment with its mating fixed port as can be clearly seen in element "D" in FIG. 255 (25500). This results in a reduced high RPM limit.

Whereas the present invention adopts an ACF shape port opening in all of its valve ports. This ACF port shape maintains a consistent height vector throughout its alignment of its mating to the fixed port as it rotates around the outside wall of the combustion chamber as is depicted in element "A" in FIG. 255 (25500).

The PATTAKOS chosen port shape results in a condition wherein the valve openings respond in a less volumetric efficient use of the displacement area of the PATTAKOS combustion chamber. Whereas the present invention is configured such that the mathematical definition of an ACF shape fixed port is used to mate with the identically shaped rotary valve port. This enables the present invention to utilize every applicable micron of the displacement available in the combustion chamber.

(3): The PATTAKOS rotary valve disc example is configured such that PATTAKOS depicts a non-ACF shaped fixed port to mate together with its non-ACF shaped rotary valve port opening according to the mathematical definition of an ACF shaped rotary port. Whereas the present invention is configured such that the mathematical definition of an ACF shape fixed port is used to mate with the identically shaped rotary valve port.

(4): The PATTAKOS rotary valve disc example is configured such that PATTAKOS hopes to cancel out the typical compression/combustion pressures on the face of his unitized intake and exhaust rotary valve discs. Whereas the present invention compartmentalizes its rotary valve discs individually such that the pressures need not cancel each other out. This compartmentalization balances out the effects of the compression/combustion. As the rotary valve discs of the present invention are independent, they do not exhibit a need to cancel out the pressures from the exhaust rotary valve disc against the intake rotary valve disc.

(5): The PATTAKOS rotary valve disc example uses a substantially sized axel to connect his intake and exhaust rotary valve discs in a unitized fashion. This unitization leaves the PATTAKOS valves exposed to the extremely high latent heat transferable from the exhaust rotary valve disc to the intake rotary valve disc, resulting in an unwanted high temperature condition that is sure to cause predetonation or spark knock problems when the intake is not totally separated from the exhaust as is well known to those skilled in the art.

Whereas the present invention separates the intake rotary valve disc from the exhaust rotary valve disc by deploying them on the opposite sides of the combustion chamber. This deployment ensures that there is a minimum latent heat transferability of the extreme temperatures expected on the exhaust side of the combustion chamber to the intake side by way of the walls of the combustion chamber which are centered inside of the typical ICE water jackets. These deployments further control/limit the inherent latent heat transferability.

(6): The PATTAKOS rotary valve port example utilizes an opening in the top portion of the combustion chamber where deployment of the intake and exhaust port openings oppose one another for their actuation. This additional displacement cavity area diminishes the volumetric efficiency of the PATTAKOS combustion area since it is not possible to compress the gas molecules residing in this area during the Compression Stroke. Whereas the present invention utilizes all of the combustion chamber displacement to achieve the maximum possible compression since it does not have this additional displacement cavity to diminish its compression.

(7): The PATTAKOS rotary valve port example utilizes only a tight fitting rotary valve disc element as his rotary valve disc sealing. This leaves the PATTAKOS rotary valve discs susceptible to leakages as his rotary valve discs wear due to the normal wear associated with any rotating part in contact with any stationary part.

Whereas the present invention utilizes compression and combustion sealing grooves and ridges as well as compression seal components added to its oil/fluid seals to seal its rotary valve discs. The present invention recognizes this anticipated wear characteristic and as such incorporates a substantial ceramic powder coating on its rotary valve discs. In this way, a wear patterned expected service life is achieved allowing for a longer operational period since this ceramic coating arrests a great deal of the frictional coefficient wear inherently associated with rotary valve disc operation. This gives the present invention better sealing and less frictional characteristics.

(8): The PATTAKOS rotary valve disc example makes a tight seal against a wear plate. This creates a metal-to-metal contact and leads to premature wear and recirculated debris being sent throughout the crankcase and associated moving parts. Whereas the present invention utilizes a compartmentalized recessed area where rotary valve disc lubrication occurs separately away from the ICE crankcase. This affords the present invention a cleaner operational environment and longer service life since there is less recirculatable debris.

(9): Furthermore, while the tight seal against the wear plate of the PATTAKOS example is its only sealing, the present invention's sealing apparatus provides for further sealing through the use of its grooves and ridges as well as its powder-coated surfaces and oil seal and compression rings, resulting in even better sealing and a cleaner operational environment.

(10): The PATTAKOS rotary valve port example does not teach a 2-stroke operation of his rotary valve disc. Whereas the present invention is both 2- and 4-stroke operation possible and this 2- and 4-stroke valve operation is not limitive.

(11): The PATTAKOS rotary valve disc example does not teach the incorporation of a centrifugal advance system whereas the present invention provides for an advance on the intake and exhaust RVPs. This yields a greater versatility towards providing for a more effective volumetric efficient profile operation.

(12): The PATTAKOS rotary valve disc example does not teach the incorporation of a cooling system applied directly to the rotary valve device. Whereas the present invention provides for a cooling system directly adapted to the rotary valve elements and further employs an assist to the inherent ICE water pump as an added feature. This ensures that the ICE and its internal componentry remain cooler during its normal operational profile.

(13): The PATTAKOS rotary valve disc example does not teach a forced induction/discharge system whereas the present invention provides for a three-tiered forced induction/discharge profile that is inherent to the respective intake and exhaust profiles. This allows for a greater induction of air molecules, as well as a more efficient and complete exhausting of the combusted gases, thereby increasing the ICE's volumetric capability.

(14): The PATTAKOS rotary valve disc example is configured in the drawings to open and close its intake and exhaust ports at exactly the same time as is exampled in the PATTAKOS patent drawings of FIG. 1, FIG. 2, FIG. 3, and FIG. 4. If the PATTAKOS rotary valve disc example was configured correctly it would have to stagger the port openings such that the Exhaust Stroke finishes before the start of the Intake Stroke with obvious consideration of the valve overlap. This configuration will not create much compression and as such will not develop a substantial amount of combustion.

Differentiating the POPPET Prior Art

Apart from the rotary valve prior arts depicted above, one of the more commonly used valve system is the POPPET valves.

While POPPET valves are the most common valve system components in ICEs, there are inherent features of the POPPET valves that cause losses in the molecular airflow rate which hinders the air-fuel combustion efficiency. Apart from the obvious difference between POPPET valves and rotary valves, the present invention design more effectually monitors the molecular airflow than the POPPET valve, thereby increasing the combustion chamber's volumetric efficiency and reducing environmentally harmful emission pollutants.

The present invention rotary valve differs significantly from the POPPET valve prior art in the following areas:

(1): The POPPET style intake and exhaust valves have geometrically inherent characteristics which cause losses in the molecular airflow rate due to the fact that it creates a restriction to itself because of its own inherent geometry. This restriction is present because POPPET valves are deployed in the center of the fixed valve ports leading into and out of the combustion chamber such that the air and gas flow has to pass in, around and over the POPPET valve face and seat. This causes an additional frictional coefficient to exist along the valve stem and other structural elements of the POPPET valve deployments.

Whereas the rotary style intake and exhaust valves such as that of the present invention have geometrical inherent characteristics which cause gains in the molecular airflow rate due to its geometry not providing any restriction to the molecular airflow. Rotary valves are generally not deployed inside of the combustion chamber.

(2): The molecular airflow inherent in POPPET valve systems travel directly proportionately in line with the movement of the POPPET valves creating a larger surface area for the molecular airflow to ride against and on. This creates a resistance to the molecular airflow. Whereas the molecular airflow inherent in rotary valve systems travel inversely proportional at right angles to the movement of the rotary valves which greatly reduces the surface area for the molecular airflow to ride against, over or around.

(3): As the POPPET valves open and close, molecular airflow must travel along and around the geometry of the POPPET valves and fixed valve port surfaces. Whereas in the case of the rotary valves open and close, molecular airflow slipstreams through the RVP opening travelling at right angles into the fixed valve ports as the molecular airflow enters into and exists the combustion chamber. The restriction to this flow in the RVP is greatly reduced since the inherent surface areas are smaller.

(4): These initial airflow losses of POPPET valves are the result of the geometric design of POPPET valves which sit resident directly in the throat of the fixed intake and exhaust Ports as is well known to those skilled in the art. The result of designing a valve that sits resident outside of the throat of the fixed intake and exhaust ports as is depicted in FIG. 251 (25100) such as that of the present invention generates an initial volumetric gain in the more complete filling and emptying of the combustion chamber.

(5): The POPPET valve suffers additional airflow losses as a result of an inherent geometric disadvantage. Since the POPPET valve is resident inside of the combustion chamber, this limits the valve cam lift clearance as it is hampered by the reciprocated travel of the piston from bottom dead center (BDC) to top dead center (TDC) inside of the combustion chamber, as is well known to those skilled in the art.

Whereas the present invention rotary valve geometric advantage provides further airflow gains. Since the present invention rotary valve is not resident in the combustion chamber, there is no cam shaft valve lift limitation. That being the case, as is well known to those skilled in the art, the rotary valve can be opened longer and wider, allowing a more complete filling of air molecules into the combustion chamber, thereby achieving greater volumetric efficiency.

(6): The POPPET valve is compromised on compression ratios. The opening range of POPPET valve is limited at high ICE compression ratios. The higher the compression ratio of the ICE, the less room there is to open the POPPET valve. Whereas the present invention rotary valve ICE is uncompromised on compression ratios. It can have higher compression ratios since there is no limit due to the travel of the piston in consideration of valve opening or compression ratios.

(7): The most powerful POPPET valve ICE is limited to a valve opening cam lift of 0.500" and a valve opening duration of about 232°. Whereas the present invention rotary valve realizes an opening duration increase up to 270° because the rotary valve ICE doesn't have a cam to consider. The valve is opened and closed by the rotation of the valve in reference to the crankshaft.

(8): The POPPET valve is further limited by the valve spring not being able to fully close the valves at higher RPM whereas the present invention rotary valve does not have any valve spring to close the valve. The rotary valve is instead closed by the coupling to the rotation of the crankshaft and thus can experience an increased opening duration which allows for even greater volumetric efficiency.

Comparative Discussion and Summary

The following tables depict the estimated molecular airflow loss (Table 1) and volumetric upper RPM limit (Table 2) of the present invention in comparison to the prior art examples of the POPPET valve, the rotary valves of POSH, DIROSS and PATTAKOS.

According to the estimates of the volumetric limitations deliberated in the previous discussions and the Table 1 references to the notable areas where the frictional losses occurred, the comparative estimates of the listed valve examples generally run into their respective estimated volumetric RPM upper limit at a point less than the present inventions 28000 RPM volumetric upper limit mark. The upper RPM limit is of paramount importance since wide open throttle is where most valve systems compromise their volumetric efficiency when their inherent geometry gets in the way of the flow of gas molecules into and out of the combustion chamber.

Estimated Molecular Airflow Loss

The estimated molecular airflow loss comparison table legend:

Molecular Airflow Loss legend

| Frictional Component/Element | Acronym |
|---|---|
| 1. Port Wall Friction | PWF |
| 2. Port Wall Friction Fixed Port | PFF |
| 3. Port Wall Friction Rotary Port | PFR |
| 4. Contraction @ Push Rod | CPR |
| 5. Bend @ Valve Guide | BVG |
| 6. Expansion Behind Valve Guide | EVG |
| 7. Expansion 25° | E25 |
| 8. Expansion 30° | E30 |

-continued

| Molecular Airflow Loss legend | |
|---|---|
| Frictional Component/Element | Acronym |
| 9. Fluctuation to Exit Valve | FEV |
| 10. Expansion Exiting Valve | EEV |
| 11. Compression Leakage | CPL |

The following Table 1 depicts the estimated molecular airflow loss in the indicated valve system examples:

TABLE 1

| Area of estimated ideal molecular airflow loss | | | | | | |
|---|---|---|---|---|---|---|
| | | Rotary Valve | | | | |
| POPPET Valve | | | Present | POSH | DIROSS | PATTAKOS |
| PWF | 2.60% | PFF | 2.60% | 2.60% | 2.60% | 2.60% |
| | | PER | 2.60% | 2.60% | 2.60% | 2.60% |
| CPR | 1.30% | CPR | N.A. | N.A. | N.A. | N.A. |
| BVG | 7.15% | BVG | N.A. | N.A. | N.A. | N.A. |
| EVG | 2.60% | EVG | N.A. | N.A. | N.A. | N.A. |
| E25 | 7.80% | E25 | N.A. | N.A. | N.A. | N.A. |
| E30 | 12.35% | E30 | N.A. | N.A. | N.A. | N.A. |
| FEV | 11.05% | FEV | N.A. | N.A. | N.A. | N.A. |
| EEV | 20.15% | EEV | N.A. | N.A. | N.A. | N.A. |
| GPL | 3.00% | CPL | 2.00% | 35.00% | 25.00% | 30.00% |
| Result | 68.00% | Result | 7.20% | 40.20% | 30.20% | 35.20% |

The present invention rotary valve example teaches compression and fluid sealing using grooves and ridges, oil seals, compression rings and recessed areas in the discussion or description of its valve operation.

The POPPET valve example only utilizes its valve seat and valve face as well as compression rings to facilitate its compression sealing. According to the discussion in their respective patent specifications, the POSH and DIROSS examples do not teach any compression sealing whereas PATTAKOS does make mention of its sealing methods.

The PATTAKOS example teaches compression sealing by means of "0" rings "etc" and "can be used with arranged fronts with each chamber port lip being in gas tight sealing cooperation with a respective front of the disk rotary valve method" that is somehow dependent on the resultant disposition of the expansion of the associative metals such that a gas tight seal is somehow achieved.

It is well known to those skilled in the art that compression sealing is a factor of compression rings or compression seals affixed such that the containment of a sufficient amount of the compressed or combustion gases are contained for a reasonable period of time. In an ICE, this reasonable period of time refers to the periods of the Intake, Compression, Power, and Exhaust Strokes wherein there are various pressure levels inherent in each individual stroke that should not be compromised by any preceding or subsequent stroke. This means that the valve must be exact. Just as a razor blade cutting a straight line on a piece of paper, a reasonable valve system must cut each subsequent stroke at the pre-defined intervals. For a 4-stroke ICE operation, this means for every 90 degrees of the rotary valve rotation, the rotary port must either open or close the respective fixed valve port opening, consistent with the port opening duration regiment.

In the present invention, several distinct compression retention methods are incorporated as were previously discussed. This makes sure that the port opening duration regiment is adhered to and there would not be any adverse side effects because of the valve method.

Since compression sealing is of paramount importance in an ICE, a conservative estimate based on the effective port opening geometry and the sealing methods/vocations taught in each of the respective patent specification of POSH, DIROSS and PATTAKOS are made. POSH was assigned an estimated 35% compression leakage as well as a 35% reduction in the effective port opening geometry. DIROSS was assigned an estimated 25% compression leakage as well as a 20% reduction in the effective port opening geometry. PATTAKOS was assigned an estimated 30% compression leakage as well as a 25% reduction in the effective port opening geometry.

In view that the conservative estimates have to take into consideration the port opening duration regiment that is the same for all ICE valve systems, the actual effective port opening of each of the valve systems in comparative analysis have to adhere to the maximum opening and closing duration parameters. As such, each example other than the present invention, either cause the port opening to shrink in size or open longer than the maximum allowable opening and closing duration parameters.

Estimated Volumetric Upper RPM Limit

The geometric valve port opening duration is longer at lower RPM and shorter at higher RPM as is shown in the following timing table:

TABLE 2

| RPM | Duration | Estimated Volumetric Upper RPM Limit |
|---|---|---|
| 0 | 0 | POPPET valves have shown a tendency towards an |
| 1 | 15.00 | upper limit of 9600 RPM as is well known to those |
| 100 | 0.15000 | skilled in the art |
| 1000 | 0.01500 | POSH is estimated to experience a limited |
| 2000 | 0.00750 | performance due to an estimated compression |
| 3000 | 0.00500 | leakage based on the invention reporting in the |
| 4000 | 0.00375 | POSH patent specification, resulting in an upper |
| 5000 | 0.00300 | limit estimated to be around 18000 RPM |
| 6000 | 0.00250 | PATTAKOS is estimated to experience a limited |
| 7000 | 0.00214 | performance due to an estimated compression |
| 8000 | 0.00188 | leakage based on the invention reporting in the |
| 9000 | 0.00167 | PATTAKOS patent specification, resulting in an |
| 10000 | 0.00150 | upper limit estimated to be around 20000 RPM |
| 11000 | 0.00136 | DIROSS is estimated to experience a limited |
| 12000 | 0.00125 | performance due to an estimated compression |
| 13000 | 0.00115 | leakage based on the invention reporting in the |
| 14000 | 0.00107 | DIROSS patent specification, resulting in an |
| 15000 | 0.00100 | upper limit estimated to be around 21000 RPM |
| 16000 | 0.00094 | The present invention is estimated that its RVD |
| 17000 | 0.00088 | runs into its projected upper volumetric limit at |
| 18000 | 0.00083 | or about the 28000 RPM mark |
| 19000 | 0.00079 | |
| 20000 | 0.00075 | |
| 21000 | 0.00071 | |
| 22000 | 0.00068 | |
| 23000 | 0.00065 | |
| 24000 | 0.00063 | |
| 25000 | 0.00060 | |
| 26000 | 0.00058 | |
| 27000 | 0.00056 | |
| 28000 | 0.00054 | |
| 29000 | 0.00052 | |
| 30000 | 0.00050 | |

Since most ICE applications operate at 15,000 RPM or less, it is assured that the present invention is well within it most effective operational range without running into the extremes of its limitations as in other valve examples.

While these are estimates based on industry publicized and accepted standard efficiency limits of ICEs, the actual volumetric efficiency of real-world examples obviously will vary from any theoretical example. However, the fact that a rotary valve presents an open unobstructed port opening to an ICE can be submitted as a substantial geometrical advantage over other valve port opening types which are known to hit their upper RPM limit well before that of the present inventions rotary valve. It should be clear to those skilled in the art that the present inventions annular sectored conical frustum shaped rotary valve port opening is superior and novel to other valve port opening styles and valve types.

Comparison Conclusion

The POSH, DIROSS and PATTAKOS prior art patent examples all show a non-ACF shaped port opening with a mating alignment to a non-ACF shaped fixed port.

The present invention only employs an ACF shaped port opening with a mating alignment to an ACF shaped fixed port. It should be noted that the geometrical advantage of the present invention provides a clear superior volumetric efficiency not realized by any of the POSH, DIROSS and PATTAKOS prior art patent examples.

Rudimentary ICE Manufacturing Notes

The manufacture of the rudimentary ICE can easily be facilitated by the use of standard manufacture methods for a good many of the components. There are, however, some components that are more difficult to produce using the standard manufacturing processes and in these instances, it will be more advantageous to employ some of the more recent advancements in manufacture and fabrication.

MSV Port Manufacture/Fabrication

The MSV port may have various sizes and shapes, too numerous to depict in the drawings provided herein. Since the MSV port must pierce into the IFP (8941) and EFP (9061), special cutting tools need to be used to cut the MSV port into the engine block where the fixed ports reside.

Several engineering machining techniques are available to facilitate these port cuts. They include but are not limited to waterjet cutters, laser cutters, additive or subtractive manufacturing and a process where machining or drilling is done to facilitate cutting the MSV port opening in the engine block and then the access holes are welded back up and surfaces are re-machined to specifications. The location of these access holes is placed away from any critical elements of the engine block. A point closest to the edges of the engine block is typically chosen to install the MSV ports.

Also, the engine head can be separated from the engine block making the access to normal length mills and cutting tools possible. Typical CNC mills can cut holes and slots to 2 inches without much difficulty. In some cases, special tools are made to facilitate certain kinds of manufacturing processes.

Most good fabrication shops today will have all three styles of manufacturing machines. Typical performance for these techniques is as follows:

- Waterjet Cutters—4 to 5 inches deep in metals with great accuracy (this one can go much deeper but accuracy begins to drop off at or beyond the 5-inch point).
- Laser Cutters—up to 2 inches on metals with great accuracy.

CNC Mills—1 to 2 inches on metals with great accuracy

Sealing Manufacture/Fabrication

The insertion of the sealing apparatus in terms of its manufacturing/fabrication can employ any one of several techniques. If the engine block and engine covers are mass produced, then the normal casting assembly process would generally be employed. Manufacturing/fabrication of the sealing apparatus grooves and ridges would then occur in an automated CNC machining process.

Engine Block Manufacture/Fabrication

The normal casting assembly process would generally be employed to mass produce the engine block (BLK) (1753). For prototyping purposes, standard CNC milling would best be employed for the manufacturing/fabrication of the engine block.

Engine Head Manufacture/Fabrication

In every instance where practical, the engine head is to be integral to the engine block so as to limit ICE failure due to engine head gasket distortion. If engine head manufacturing/fabrication is required, the preferred split method of an engine head assembly in concert with a combustion chambered sleeve should be deployed.

Engine Block Cover Manufacture/Fabrication

The normal casting assembly process would generally be employed to mass produce the engine block cover, intake (IEC) (1732) and exhaust (EEC) (1772). For prototyping purposes, standard CNC milling would best be employed for the manufacturing/fabrication of the engine block covers.

RVD Manufacture/Fabrication

The manufacturing/fabrication of the rotary valve disc (RVD), intake (IVD) (1752) and exhaust (EVD) (1758) for both mass production and prototyping is best facilitated by an automated CNC process such that raw bar stock is cut and machined into the finished respective RVD.

Annular Sectored Conical Frustum Shaped Port Manufacture/Fabrication

The manufacturing/fabrication of the annular sectored conical frustum (ACF) shaped port is best facilitated by an automated CNC process wherein specific cuts and/or surface grinds are applied such that the multi-surfaced ACF shaped port opening is formed in both the intake and exhaust fixed ports of the engine block and rotary ports of the respective RVDs.

It is of paramount importance that the temperature resisting properties of the metal and/or ceramic materials for manufacturing these components be preserved at all times. Since all of the rudimentary ICE components deployment and respective definition have to remain consistent, the process of their manufacturing or fabrication cannot cause any distortion in their molecular compositions as this would affect the life span of their use in the present invention.

Enhanced System Overview (0200)

Figure 2:
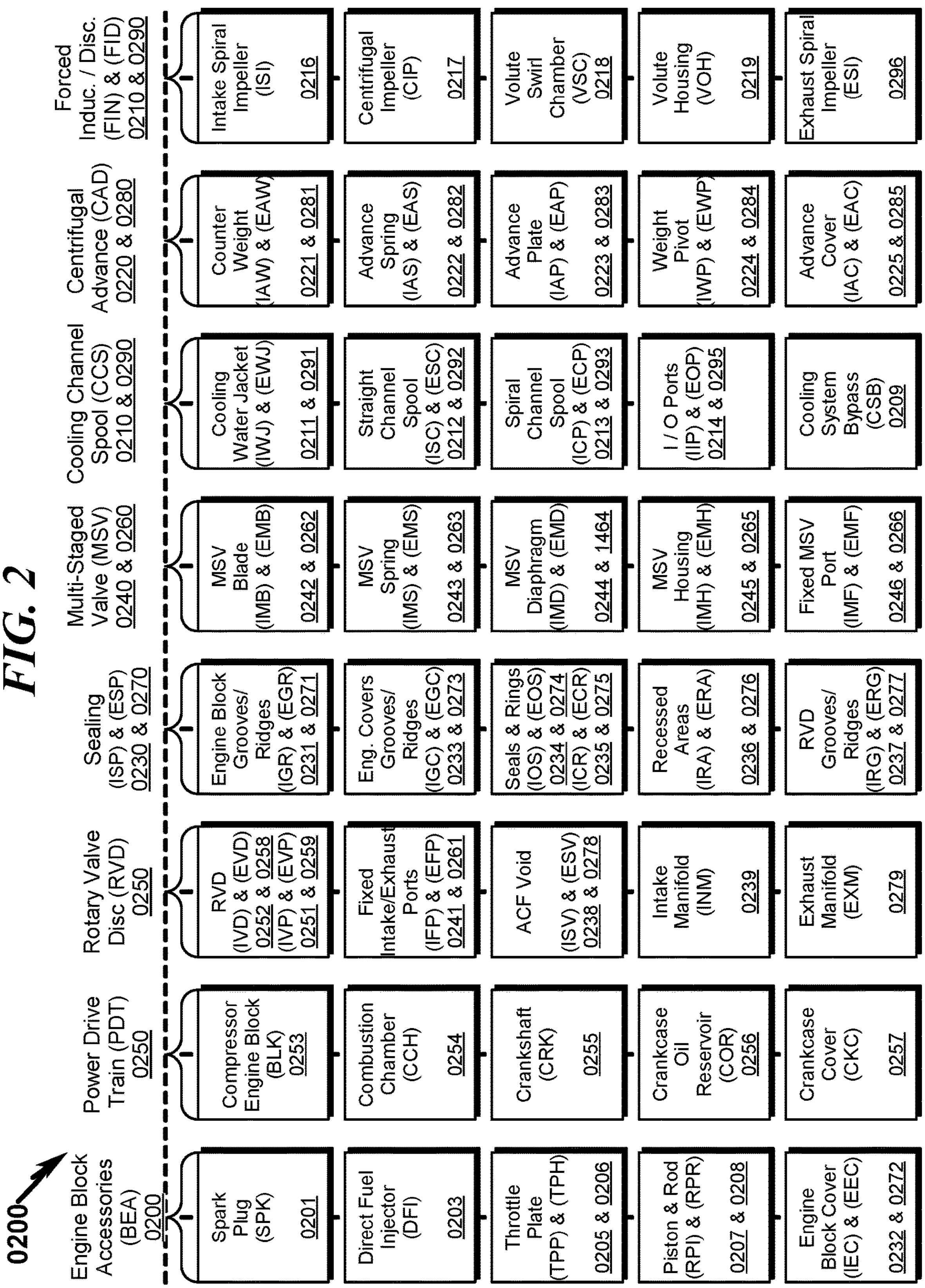
FIG. 2 illustrates a block diagram depicting a preferred enhanced exemplary invention system embodiment.

A block diagram depicting the major system components of the present invention ICE enhanced system is generally depicted in FIG. 2 (0200). The present invention may be constructed using a variety of combinations of the elements depicted in this block diagram. The inherent part numbering is to ensure all parts are clearly represented. While the amounts of part numbers are limited, some parts may be listed in groups outside of their individual categories. Some invention embodiments may incorporate only a portion of the elements and/or subassemblies listed in this block diagram. A brief description of these subassemblies and their related elements is provided below.

Please note that some components in some models may be constructed to have more than one intake RVD (IVD)/exhaust RVD (EVD), one MSV with one fixed MSV port, one fixed intake port and one fixed exhaust port, etc. This is further exampled in the "Integrated/Unitized Compilations" and "Combinatorics of the Present Invention" sections below.

The present invention enhanced system embodiments include improvements generally comprise but are not limited to: (a) centrifugal advance; (b) cooling channel spool; (c) forced induction and (d) forced discharge embodiments.

These enhanced embodiments provide enhanced improvements to the molecular flow of gases into and out of the combustion chamber (CCH) (15354) as earlier depicted in the "follow the leader" (FTL) methodization concept discussion. Further discussions on the molecular airflow follows the detailed descriptions of the four above listed exemplary enhancements incorporated in the present invention.

The present invention enhanced system embodiments incorporates a "push/pull" operational concept such that the inherent follow-the-leader (FTL) molecular effect is enhanced, thereby assisting in the induction of air molecules into and then out of the CCH. The FTL molecular effect is well known to those skilled in the art as the effect of each gas or air molecule acts to pull or push each preceding or subsequent gas or air molecule along in their flow into and out of the CCH.

In the enhanced example of the present invention ICE, the intake cooling apparatus (Spiral Channeled Element) provides a small push/pull force to be exerted on the air molecules as they enter the eye of the intakes cooling apparatus. So, besides providing cooling, this component also provides a slight amount of forced induction on the intake side and forced discharge on the exhaust side to the air molecules pushing or pulling them along as it rotates.

Enhanced Engine Assembled/Assembly Detail (3300)-(64000)

Assembled Views (3300)-(4800)

Figure 48:
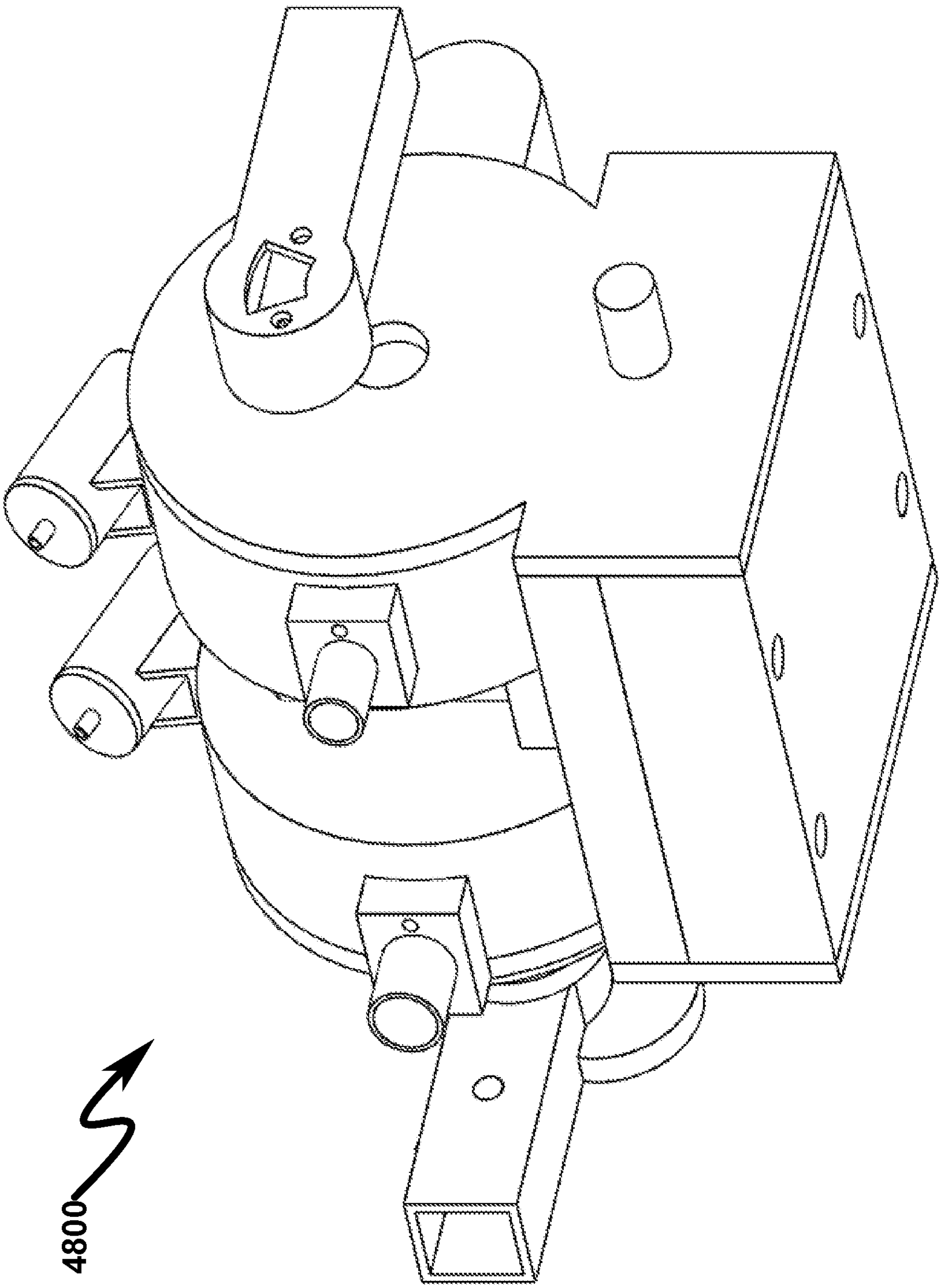
FIG. 48 illustrates a bottom left front perspective isometric view of a preferred exemplary enhanced invention system embodiment.

The present invention as embodied in enhanced form is generally depicted in assembled views in FIG. 33 (3300)-FIG. 48 (4800).

Assembly Exploded Views (4900)-(6400)

The present invention as embodied in enhanced form is generally depicted in assembly exploded views in FIG. 49 (4900)-FIG. 64 (6400). The major components depicted in these assembly exploded views include the following:

- Enhanced Engine Block Accessories (BEA) (4900);
- Intake-Manifold (4939);
- Volute Housing (4919);
- Engine Block Cover, intake (IEC) (4932) and exhaust (EEC) (4972);
- Intake Forced Induction (FIN) & Cooling Channel Spool (CCS) (4910);
- Exhaust Forced Discharge (FID) & Cooling Channel Spool (CCS) (4990);
- Engine Block (BLK) (4953);
- Multi-Staged Valve (MSV), intake (IMV) (4940) and exhaust (EMV) (4960);
- Centrifugal Advance (CAD), intake (4920) and exhaust (4980);
- Power Drive Train (PDT) (4950);
- Sealing, intake (ISP) (4930) and exhaust (ESP) (4970);
- Exhaust Manifold (EXM) (4979).

Enhanced Engine Overview

The present invention as embodied in the rudimentary engine example has been further enhanced by the following engine embodiments that work in concert with the rudimentary engine's geometrical advantage to provide enhancements to the "follow-the-leader" (FTL) methodized concept of the flow of air molecules that has been earlier prescribed to intake into and exhaust out of the combustion chamber such that:

- a centrifugal advance mechanism is incorporated herein;
- a RVD cooling system mechanism is incorporated herein;
- a forced induction mechanism is incorporated herein;
- a forced discharge mechanism is incorporated herein;

None of the compilation of these enhancement embodiments compromise or cancel out any of the normally aspirated functionality of an ICE since these mechanisms are only lined up or positioned in such a fashion where the normal natural aspiration of an ICE is enhanced by their inherent presence.

The intent of these enhancements is to provide either necessary modifications such as the cooling mechanism or an enhanced approach towards the intake or exhaust of the air-fuel mixture into and out of the combustion chamber. The preferred method of these enhancements are specifically designed as unitized embodiments where practical and independent elements where otherwise used.

The annular sectored conical frustum (ACF) and the annular sector port shapes are maintained such that the ACF is deployed on every fixed port, rotary valve port and spiral channel spool. The annular sector port shape is deployed on the CAD apparatus, straight channel spool, FID apparatus, engine block covers, as well as the intake and exhaust manifolds.

Centrifugal Advance Apparatus (CAD) (4920) (4980)

The CAD, intake (4920) and exhaust (4980) are responsible for advancing or retarding the overall engine rotary valve disc (RVD), intake (IVD) (1752) and exhaust (EVD) (1758) ports (RVP), intake (IVP) (7351) and exhaust (EVP) (7659) "opening duration" timing advance or retard based on the engine revolutions per minute (RPM). This unitized embodiment generally comprises a CAD cover, intake (IAC) (18725) and exhaust (EAC) (18885), CAD plate, intake (IAP) (18723) and exhaust (EAP) (18883), CAD counter weight, intake (IAW) (18721) and exhaust (EAW) (18881), CAD weight pivot, intake (IWP) (18724) and exhaust (EWP) (18884) and CAD springs, intake (IAS) (18722) and exhaust (EAS) (18882).

In the present invention, a CAD mechanism is incorporated such that a method for adjusting the "advance" or "retard" of the rotary valve opening duration timing is achieved. This mechanism is unitized together with the rotary valve disc (RVD) such that the rotary valve port opening position on the RVD can be varied. The control of this advance mechanism is performed by the resultant centrifugal force of the rotating RVD acting against the spring tension of the IAS (18722) and EAS (18882) such that as the RPM increases or decreases causes the IAN (18721) and EAW (18881) to push or pull the IAP and EAP to an advanced or retarded position.

The advent of the ACF port shape can be used to further the effects of the CAD in its approach to the intake and exhaust of the combustion chamber. This ACF port shape is included in the IAP and EAP such that it completes the pathway enhancement of the annular sectored portion and the conical frustum slipstreaming effect of the airflow concept.

The CAD provides a change in the ACF shaped port opening's position of the rotary valve port (RVP) by a reciprocated widening or narrowing of the port opening as the RVD rotates in a directly proportional response to a plurality of IAN and EAW reacting to the centrifugal force inherent in the RVD's rotation. The widening and narrowing of the annular sectored portion of the port opening achieves an early or late timing effect on the rotary valve port. This results in the IAN and EAW pivoting on a plurality of IWP and EWP which cause a pushing or pulling effect to be exerted on the IAP and EAP, which is inversely proportional to the IAS and EAS tension, and directly proportional to the ICE's RPM.

Since it is well known to those skilled in the art that the port opening timing is a condition of the valve port open duration versus the port opening geometry, the geometry of the ACF shaped port opening of the present invention further enhances the volumetric efficiency by allowing for the specific profiling of advancing or retarding the size characteristics of its RVP opening. The inherent geometry of the ACF shaped port opening is further enhanced by this CAD embodiment. The resultant unitizations of the IVD and EVD is provided for such that the RVD is coupled together with this CAD embodiment that further enhances the aforementioned geometrical advantage realized by the ACF port shape, allowing for a further enhanced stoichiometric profiling to be rendered in a continuously reciprocating platform.

The ICE can start its idle either in an advanced or retarded position in accordance with the desired operational profile. The present invention anticipates at least one CAD apparatus per RVD in most configurations.

Cooling Channel Spool (CCS) Apparatus (4910) (4990)

The cooling channel spool (CCS) apparatus, intake (4910) and exhaust (4990) are responsible for providing an additional level of cooling directly to the RVD as a cooling assist to the ICE. This CCS apparatus can be integral together with the RVD or other embodiments that further enhance/complement the operation of the RVD. The CCS apparatus generally comprises a cooling water jacket, intake (IWJ) (13711) and exhaust (EWJ) (13591), a straight channel spool, intake (ISC) (NU) and exhaust (ESC) (15792), a spiral channel spool, intake (ICP) (15713) and exhaust (ECP) (25693), an intake water jacket inlet port (IIP) (14414), cooling system bypass (CSB) (4994) and an exhaust water jacket outlet port (EOP) (14495).

Standard ICE cooling is still normally afforded and well known to those skilled in the art. While no depiction of the standard cooling system is made herein, it is generally understood that an ICE can have any of a number of cooling methods.

In the present invention, a cooling mechanism is further incorporated with the standard ICE cooling system such that the ICE coolant is specifically directed to cool a portion of the passageway where intake airflow enters into and exits out of the combustion chamber such that a CCS is unitized together with the RVD which contributes a cooling method for wicking away unwanted heat into the ICE's coolant system where it can be recirculated through the cooling process of the cooling system's radiator.

Typically, an ICE's cooling is a component of (i) air flowing across cooling fins specifically placed around the combustion chamber and engine block, (ii) a liquid coolant that recirculates through water jackets of an ICE, (iii) the pressurized oiling system, which is often times "tapped" to flow through a portion of an ICE's coolant system's radiator or a separate cooling radiator specifically mounted so as to allow airflow across its air fins, as is well known to those skilled in the art.

The CCS of the present invention provides just such a cooling method where a liquid coolant flows through and around the center area of the "spool shaped" CCS embodiment. In concert with the water jacket of the ICE, the CCS provides this wicking effect of removing a substantial amount of heat thusly providing for cooling directly applied on a rotating valve element.

The IWJ and EWJ provide containment for the unitized RVD and respective straight or spiral channel spools.

The ISC and ESC are used respectively in intake or exhaust deployments dependent upon the desired cooling profile that is required. The capacity of the intake or exhaust deployment may or may not be similar to one another as in some models. For example, the capacity of the intake may be greater dependent upon the forced induction of the intake. The straight channel spool should be used in environments where medium to light cooling is needed.

The ICP and ECP are used respectively in intake or exhaust deployments where an extreme cooling profile is required. This is typically used in forced induction and exhaust deployments where the ICE is subject to extreme high temperature conditions.

The present exemplary invention benefits greatly from this CCS in that the inherent heat that is generated by the normal compression and combustion of a typical ICE is dealt with by a wicking effect along the walls, sides, and faces of the combustion chamber and engine head area. The additional cooling capacity of the CCS inherent designed construction is applied within the center of the spool and around the "channel" passageway as the air-fuel mixture flows into and out of the combustion chamber to cool these areas that are normally missed by the standard ICE cooling systems. The CCS also acts as an assist to the coolant system pump such that the shape of the CCS pressurizes the coolant as it is rotated, continuing the flow of coolant from the water jacket inlet to the water jacket outlet.

Forced Induction (FIN) (4910) and Forced Discharge (FID) (4990)

In a closed system, forces are combined or added, as such the "follow-the-leader" (FTL) methodized concept of the flow of air molecules. This method causes an orientation sequencing of a forced induction (FIN) (4910) and a forced discharge (FID) (4990) to enhance the present invention ICE volumetric efficiency capacity. Each element of the FIN/FID system is either perceptively placed or configured in anticipation of its inherent function to act in concert with each subsequent or previous element.

The FIN is achieved through the incorporation of a centrifugal impeller. These impellers are molded into the elements where they are deployed, thus providing for a mechanical advantage. The centrifugal impeller generates a high pressure and low velocity of air and gas molecules as a final by-product of its air charging operation.

Firstly, the centrifugal impeller (CIP) (15217) mechanism is unitized together with the RVD and is molded or bolted to the RVD element in such a fashion as to cause the rotational reaction of the impellers to exert a force onto the mass of the air molecules. This creates a pushing or pulling force that makes the molecules move in the prescribed direction of the impeller blades.

Secondly, the impeller of the spiral channel that is molded into the "Spool" shaped section of the CCS applies a similar force to the rotational reaction of this spiral impeller and also exerts a force onto the mass of the air molecules in a similar fashion to further assist the flow of air molecules along the path to the combustion chamber. These two forces add or combine and once the RVP and the fixed intake port (IFP) (8941) are aligned as the Intake Stroke begins, all three forces act to more volumetrically effectively and efficiently fill the combustion chamber with air and gas molecules.

Thirdly, the ACF port shape opening of the RVP can host/have slight slants or indentions that react similarly to the rotation characteristics of a fan blade (conical frustum) and exert a force onto the air molecules as well as the "Tuned" length of the RVP element can influence the induction of air molecules.

Fourthly, flipping the spiral impellers around into a counter rotation (clockwise/counter-clockwise) can assist in the exhausting of spent combusted gases out of the combustion chamber. Only the spiral impeller can be used in this fashion since the high heat of the compression and combustion of gases increases temperature and would cause premature failures if centrifugal impellers were attempted to be used on the exhaust side of the ICE. These spiral impellers can be attached to the output of the RVD. The only depictions used are the examples where centrifugal or spiral impellers are used on the RVD.

Even though this spiral impeller configuration is not nearly as effective as the centrifugal impeller discussed earlier, it does still provide some forced induction capability at high RPM wide open throttle operation since it is the high RPM operation where ICEs experience a condition where the ICEs tend to starve for air due to the inherent mechanical interference of the internal parts of an ICE creating a massive amount of friction as the air molecules attempt to flow as is well known to those skilled in the art. This spiral impeller feature could be used to enhance the operations of small rotary valve engines where a simple modification could facilitate enhancing its operational capability.

Of course there is also the premise of incorporating a planetary gear set style transmission with an epicyclic gear train to drive these centrifugal impellers at higher speeds thus delivering higher boosted air molecular pressure. The present invention does not intend to provide a full supercharger and makes no attempt at configuring a turbocharger or supercharger; however, these ICEs just as others can be configured with after-market superchargers/turbochargers. The present invention configuration is at best a pre-charger for the specific purpose of overcoming the inherent mechanical frictional coefficient interference of ICEs in general.

These above listed embodiments all work in concert with the flow of air molecules and directly determine the volumetric efficiency of the present invention ICE valve system.

The directional application of each element is important since if one element is installed backwards, then that element would be working against the prescribed flow of air molecules. So, it is essential that care be taken to ensure this factor is followed. In this regard, the components only fit together in one configuration. As is common and well known to those skilled in the art, indexing each subsequent element makes assembling and servicing operations simpler.

Enhanced System Component Detail (12900)-(24000)

Major enhanced system components will now be discussed in detail as depicted in drawings depicted in FIG. 129 (12900)-FIG. 240 (24000).

Centrifugal Advance (CAD) Apparatus Detailed Description

Detail views of the centrifugal advance (CAD) unitized embodiment is generally depicted in FIG. 185 (18500)-FIG. 200 (20000).

The systematic cyclic timing of the ICE is an area of much concern as is noted by those skilled in the art.

The Centrifugal Advance (CAD), intake (4920) and exhaust (4980) apparatus, is unitized together with the respective rotary valve port, intake (IVP) (7351) and exhaust (EVP) (7659) such that it assists in ensuring at all times that the proper timing placement/positioning of the IVP and EVP occurs in an optimally sequenced manner while the IVP and EVP are operating in their normal capacity of opening and closing the respective combustion chamber intake and exhaust ports.

The CAD mechanism is designed to move the position of the IAP (18723) and EAP (18883) resulting in opening the RVP wider or closing the RVP tighter respectively according to desired advance or retard profile.

These two directional acuities enable an advanced/retarded positioning to occur during the effective operational range of an ICE's RPM. As is well known to those skilled in the art, this manipulation can be tuned against the IAS (18722) and EAS (18882), with the intention of delaying or promoting the movement or placement of the respective IAP (18723) and EAP (18883).

In other centrifugal advance mechanisms, when there is a rotating element, a manipulation of that element's rotation can occur through the incorporation of a centrifugal rotation sensitive componentry, as is well known to those skilled in the art.

The CAD apparatus utilizes the inertia of the rotational force acting on the CAD counter weight that is acting against the CAD return spring. As the ICE RPM increases, the CAD counter weight pushes or pulls the CAD plate in an advancing/retarding direction dependent on the profile of the return spring and the CAD counter weight profile designation or objective.

A plurality of CAD counter weight and return spring profiles can be facilitated by varying the degree of spring tension and the physical weight characteristics of the counter weights. The CAD can start in an advanced or retarded static state and due to RPM change to the opposite state while the ICE progresses through its operational range.

This mechanical CAD apparatus can be designated to compensate for otherwise erratic starting and other operating conditions until the ICE has reached full operating temperatures. There are a wide range of usages where this feature is beneficial.

Centrifugal Advance Counter Weight (18500)-(20000)

Detail views of the CAD counter weight embodiment, intake (IAW) (18721) and exhaust (EAW) (18881) are generally depicted in FIG. 185 (18500)-FIG. 200 (20000).

The preferred CAD counter weight can have a plurality of arrangements such that a pre-defined profile can be cast to resist the expected reactions associated with the inertia of the rotational force as well as a plurality of pre-defined spring tension profile to act against the counter weight.

The present invention's IAN (18721) and EAW (18881) are identical. As such, only one needs to be depicted.

Centrifugal Advance Spring (18500)-(20000)

Detail views of the CAD spring embodiment, intake (IAS) (18722) and exhaust (EAS) (18882) are generally depicted in FIG. 185 (18500)-FIG. 200 (20000).

The preferred CAD spring can have a plurality of arrangements such that a pre-defined profile can be cast to resist the expected reactions associated with the inertia of the rotational force as well as a plurality of pre-defined counter weight profile to act against the spring tension.

The present invention's IAS (18722) and EAS (18782) are identical. As such, only one needs to be depicted.

Centrifugal Advance Plate (18500)-(20000)

Detail views of the CAD plate embodiment, intake (IAP) (18723) and exhaust (EAS) (18883) are generally depicted in FIG. 185 (18500)-FIG. 200 (20000).

The CAD plate embodiment rotates on the axis of the RVD such that it can vary the position of the RVP opening.

The present invention's IAP (18723) and EAS (18883) are identical. As such, only one needs to be depicted.

Centrifugal Advance Weight Pivot (18500)-(20000)

Detail views of the CAD weight pivot embodiment, intake (IWP) (18724) and exhaust (EWP) (18884) are generally depicted in FIG. 185 (18500)-FIG. 200 (20000).

The CAD weight pivot causes the CAD counter weight embodiment to pivot about its axis such that the CAD counter weight can push or pull the CAD plate across its designated reciprocations affording an ICE a plurality of the much needed advancing/retarding pre-defined profiles as previously depicted.

The present invention's IWP (18724) and EWP (18884) are identical. As such, only one needs to be depicted.

Centrifugal Advance Cover (18500)-(20000)

Detail views of the CAD cover embodiment, intake (IAC) (18725) and exhaust (EAC) (18885) are generally depicted in FIG. 185 (18500)-FIG. 200 (20000).

The CAD cover completes the encapsulation of the CAD mechanism so that it is isolated from other conditional and environmental elements. The CAD cover may be threaded to be screwed in place so as to preserve its preferred placement to the enhanced RVD embodiment.

The present invention's IAC (18725) and EAC (18885) are identical. As such, only one needs to be depicted.

Cooling Channel Spool (CCS) Apparatus Detailed Description

Figure 129:
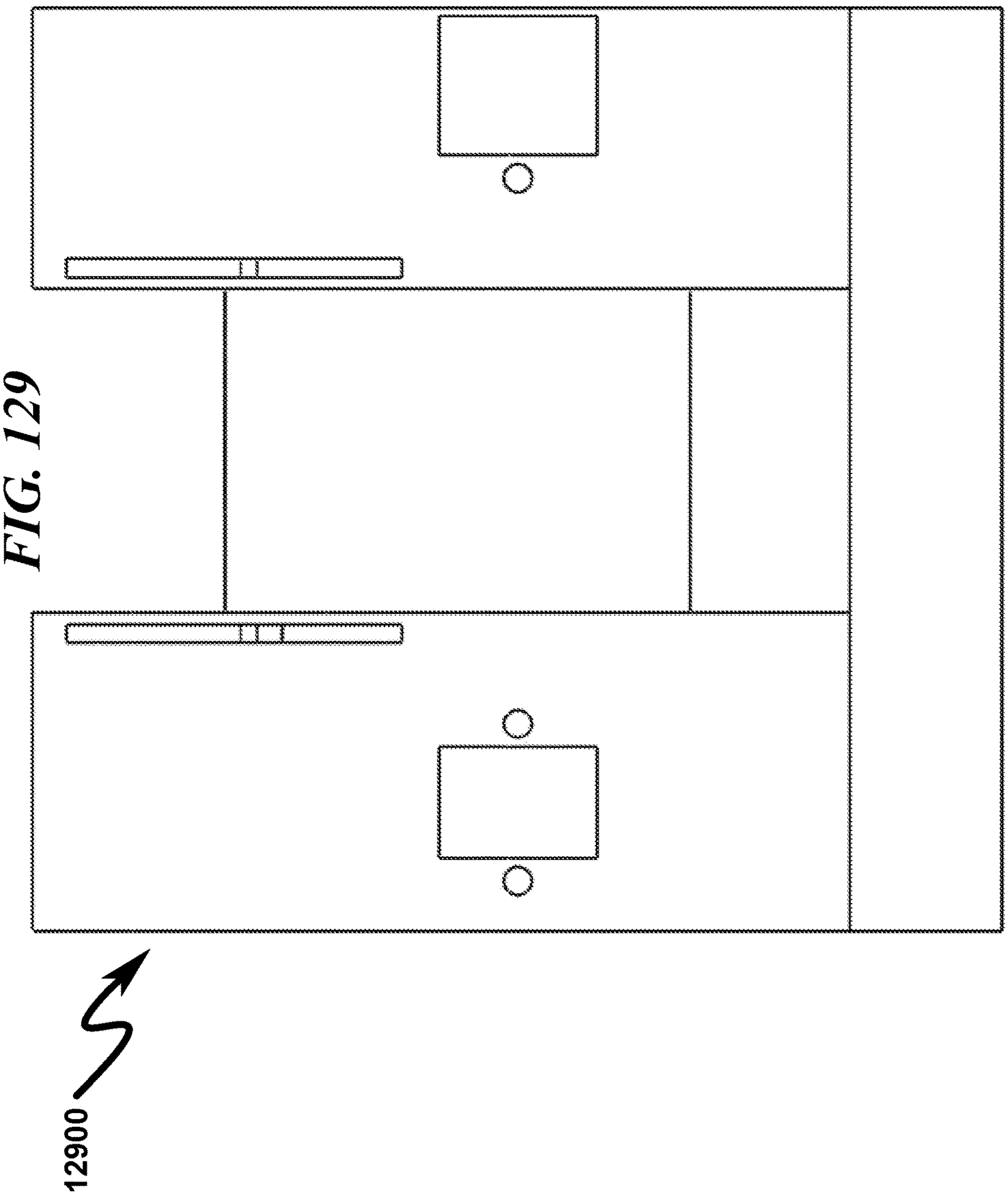
Figure 130:
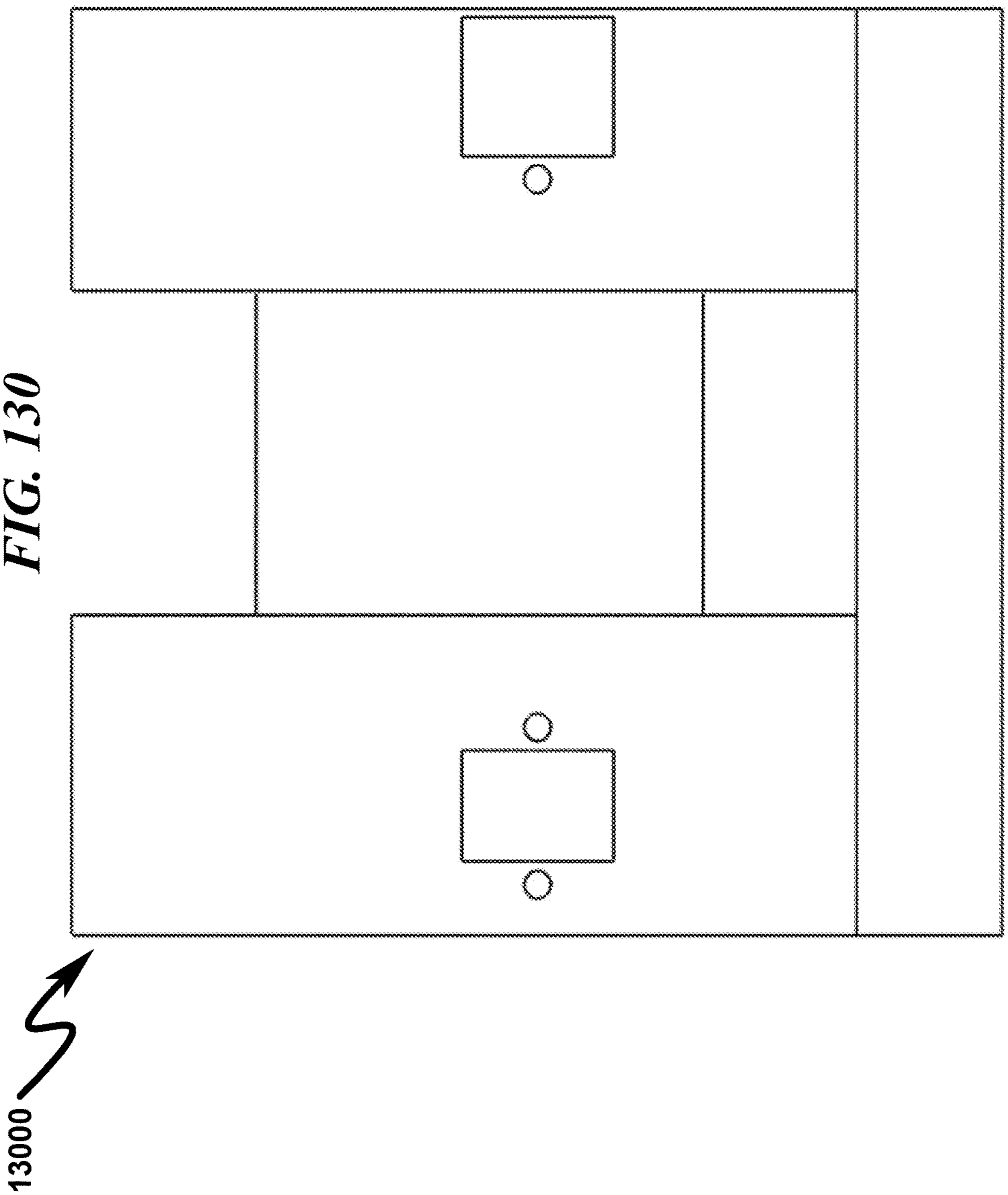

Detail views of the cooling channel spool (CCS) unitized embodiment is generally depicted in FIG. 129 (12900)-FIG. 179 (17900) and FIG. 201 (20100)-FIG. 216 (21600).

The cooling channel spool apparatus generally comprises a cooling water jacket, intake (IWJ) (13711) and exhaust (EWJ) (13591), a straight channel spool, intake (ISC) (NU) and exhaust (ESC) (15792), a spiral channel spool, intake (ICP) (15713) and exhaust (ECP) (25693), an intake water jacket inlet port (IIP) (14414), cooling system bypass (CSB) (4994) and an exhaust water jacket outlet port (EOP) (14495), and at least one coolant pump assisting blade element surrounding the center section of each straight/spiral channel spool element.

The present invention has incorporated a "spool" shape modification to the RVD such that the standard engine coolant can surround a portion of the RVD intake and exhaust air passageways. The significance of the spool shape is that it is a method wherein the RVD passageway can be expanded such that the engine coolant can reach or flow against several surfaces within the centermost area of the expanded RVD.

As the spool shaped RVD rotates, the inherent heat profile is dissipated around the rotating spool shaped element. Because this rotating cooling channel spool (straight/spiral), intake/exhaust is resident inside of the respective cooling water jacket intake (IWJ) (13711) and exhaust (EWJ) (13591), the standard ICE cooling system coolant can wick away a significant amount of the generated unwanted heat away from the RVD so as to be recirculated through the ICE coolant system's radiator.

Additionally, this rotating spool shape performs an additional service as it assists the flow of coolant through the coolant system as a secondary coolant pump, besides just allowing the passageway of the water jacket's inherent cooling capacity. This allows for cooling of the air molecules as they pass through the helical/straight channel passageways. This spool shape allows engine coolant to surround a portion of the RVD air passageway allowing the "Wicking Effect" to take place.

This CCS apparatus serves multiple purposes: (i) provides cooling for the rotary valves, (ii) when the pre-charging forced induction/discharge features are added, the helical/straight channel acts as an interim intercooler for the superheated intake air molecules and combusted gases once they have left the pressurized output of the respective intake and exhaust impellers; (iii) since the helical/straight channel cooling devices reside integrally/unitized to the RVD, the CCS also provides the structure/fixture for the additional integral components, and (iv) it also functions as an auxiliary coolant system pump, which will lengthen the life of the ICE's coolant pump.

Cooling Water Jacket (12900)-(17900) & (20100)-(21600)

Detail views of the cooling water jacket embodiment, intake (IWJ) (13711) and exhaust (EWJ) (13591) are generally depicted in FIG. 129 (12900)-FIG. 179 (17900).

The cooling water jacket embodiment generally comprises a compartmentalization area for the cooling channel spool such that the ICE's coolant can be circulated in and around the centermost area to specifically provide cooling to an expanded RVD.

The present invention's IWJ (13711) and EWJ (13591) are identical. As such, only one needs to be depicted.

Straight Channel Spool (12900)-(17900) & (20100)-(21600)

Detail views of the straight channel spool embodiment, intake (ISC) (NU) and exhaust (ESC) (15792) are generally depicted in FIG. 129 (12900)-FIG. 179 (17900).

The straight channel spool embodiment generally comprises a straight passageway for air/gas molecules to pass through the expanded RVD such that coolant can wick away a significant amount of heat from those air/gas molecules.

The present invention's IAC ISC (NU) and ESC (15792) are identical. As such, only one needs to be depicted.

Spiral Channel Spool (12900)-(17900) & (20100)-(21600)

Detail views of the spiral channel spool embodiment, intake (ICP) (15713) and exhaust (ECP) (25693) are generally depicted in FIG. 129 (12900)-FIG. 179 (17900).

The spiral channel spool embodiment generally comprises a spiraling passageway for air/gas molecules to pass through the expanded RVD such that coolant can wick away a significant amount of heat from those air/gas molecules.

The present invention's ICP (15713) and ECP (25693) are identical. As such, only one needs to be depicted.

Water Jacket Inlet/Outlet Port (12900)-(17900) & (20100)-(21600)

Detail views of the water jacket inlet/outlet port embodiment, intake inlet (IIP) (14414) and exhaust outlet (EOP) (14495) are generally depicted in FIG. 129 (12900)-FIG. 179 (17900).

The water jacket inlet/outlet ports generally comprise an attachment fixture to interface between coolant lines and the ICE's cooling system radiator.

The present invention's IIP (14414) and EOP (14495) are identical. As such, only one needs to be depicted.

Intake Forced Induction (FIN) (4910) Apparatus Detailed Description

Detail views of the intake forced induction (FIN) apparatus are generally depicted in FIG. 145 (14500)-FIG. 184 (18400) and FIG. 217 (21700)-FIG. 232 (23200).

The FIN apparatus generally comprises an intake spiral impeller (ISI) (15916), a centrifugal impeller (CIP) (15217), a volute swirl chamber (VSC) (17318) and a volute housing (VOH) (17319). These components may be unitized to include an intake manifold and a plurality of throttle valve plates that modulate the intake airflow to these components.

Air charging, more commonly known as "Forced Induction", is an appliance created with the sole purpose of forcing more molecular particulate matter into a system. There are many names for the styles and characteristics of forced induction systems.

It can be noted for a given ICE, air charging can improve the engine power output by increasing the intake air density and thus improving the engine's overall efficiency. Since all ICEs have a limit where its inherent mechanical interference limits its effective and efficient operational range (upper RPM limit), the present invention incorporates a forced induction device to be integrated/unitized with the RVD. This device can be molded or bolted onto the RVD. What this translates into is that at high RPMs, the effective opening duration actuated volumetric filling of the combustion chamber via the cyclic operation of the intake RVD becomes enhanced to provide a greater flow of air molecules.

In the present invention, the air charging effect is achieved by the FIN apparatus which generally comprises a CIP as its primary air charging element. It is well known to those skilled in the art that centrifugal impeller air chargers are dynamic which means they only deliver pressure at or above 3000 RPM or higher. This translates into providing even more airflow without the advent of adding more components.

The present invention further incorporates a volute swirl chamber located inside of the volute housing that is mounted directly to the engine block cover. This centralized combination greatly improves the efficacy of the centrifugal air charger since any distance away from the combustion chamber adds frictional coefficients which reduce the efficacy of the air charger.

The present invention's FIN apparatus combines this air charger with the RVD such that a redirection of the standard volute's output is required to allow for minimum losses and boost pressure as prescribed above. This redirection is formulated such that the standard outlet of an air compressor is sealed off; leaving the only passageway for the discharge of built-up air pressure to flow is directly into the RVP and fixed intake port reciprocated alignments, which enables this pressurized airflow into the combustion chamber to begin.

The volute housing generally comprises a mounting flange to affix the volute housing directly to the engine block cover.

A further secondary air charging effect is achieved via the spiral impeller of the CCS apparatus such that in a closed system, forces add as is well known to those skilled in the art.

Operating as a one unit element, this air charger provides trouble free operation of many parts as is noted to those skilled in the art of unitizing components to increase a mechanism's efficiency and performance. It is with this idea then that a simpler applicate be instituted as until now almost all air-chargers have the inherent system losses, wherein for the case of the present invention it is imperative that a minimum of losses be tolerated.

Discussion on the centrifugal air compressor has to be done in two parts; i.e., (i) the standard centrifugal air compressor volute housing comprising the volute chamber, the volute swirl chamber and the volute mounting plate or bracket as is well known to those skilled in the art and (ii) the centrifugal impeller comprising the impeller wheel and impeller blades.

It is well known to those skilled in the art what the constructions of these elements are and as such only a minimal depiction of some of the key components inherent in the present invention is depicted. An air charger is not novel to the industry; however, the adaptation of an air charger to a rotary valve system/device such as the present invention is.

Manufacture of the air charger or as it is termed a "centrifugal air compressor" in the present invention is accomplished by a series of integration or unification of the standard elements of an air charger.

Instead of the normal volute outlet ducting, the outlet of the volute is redirected directly into the rotary valve port by connecting/mounting the volute housing directly above the recessed area of containment for the rotary valve device, i.e., RVD or RVC. This position for the volute enables the output of the volute, which is constantly building up inside of the swirl chamber and the volute chamber against the rotation of the impeller blades, to directly interface with the rotary valve port. This close proximity to the combustion chamber minimizes the typical losses in pressure inherent in air chargers as is well known to those skilled in the art.

To those who are not skilled in the art it may seem somewhat cumbersome to unitize these components, but it is common knowledge in the art that streamlining a complex system enables that system to operate more effectively and efficiently.

Intake Spiral Impeller (14500)-(18400) & (21700)-(23200)

Detail views of the intake spiral impeller embodiment (ISI) (15916) are generally depicted in FIG. 145 (14500)-FIG. 184 (18400) and FIG. 217 (21700)-FIG. 232 (23200).

The ISI embodiment generally comprises an attachment to interface with the RVD such that this spiral impeller rotates in unison with the RVD. The ISI further provides an air charging effect to that of the CCS apparatus since in a closed system forces add, as is well known to those skilled in the art.

Centrifugal Impeller (18000)-(18400) & (21700)-(23200)

Detail views of the centrifugal impeller embodiment (CIP) (15217) are generally depicted in FIG. 180 (18000)-FIG. 184 (18400) and FIG. 217 (21700)-FIG. 232 (23200).

The CIP generally comprises an attachment to interface with the RVD such that this centrifugal impeller rotates in unison with the RVD.

A centrifugal impeller works by pulling air in and then making it move faster as the impeller/fan is rotated.

The airflow behind the fan is slow moving and wide, whereas the airflow in front of the fan is fast moving and narrow, which follows the Law of Conservation of Mass that states that mass can neither be created nor destroyed. The inflows, outflows, and change in storage of mass in a system must be in balance. And obviously, the mass in a system increase if the inflow is higher than the outflow.

In an air compressor this high velocity airflow is directed into a diffuser area: A diffuser is a set of stationary vanes that surround the impeller or it is the widening area around the perimeter of an impeller wheel. The purpose of the diffuser is to increase the efficiency of the centrifugal air pump by allowing a more gradual expansion and less turbulent area for the air molecules to reduce in velocity; whereas the diffuser is "a device for reducing the velocity and increasing the static pressure of fluid/gas passing through a system."

The process of diffusion begins where the vanes of a centrifugal impeller widen and the velocity of the airflow begins to slow down due to the widening of the space between the impeller blades. As this area increases, fluid velocity decreases, and static pressure rises. This diffusion can be further enhanced by the incorporation of stationary diffuser vanes located at the end of the impeller blades and the entrance of the swirl chamber.

The arrows in FIG. 182 (18200)-FIG. 184 (18400) illustrate the airflow into the centrifugal air compressor and then the diffuser before compressing in the swirl chamber and the widest section of the centrifugal impeller blades, as is well known to those skilled in the art.

Volute Swirl Chamber (16900)-(18400) & (21700)-(23200)

Detail views of the volute swirl chamber embodiment (VSC) (17318) are generally depicted in FIG. 169 (16900)-FIG. 184 (18400) and FIG. 217 (21700)-FIG. 232 (23200).

The VSC embodiment generally comprises a swirled area bordering the perimeter of the impeller blades and is integral to the inside of the VOH. In some models, stationery diffuser vanes may be deployed between the impeller blades and the VSC. The VSC is where the low velocity high pressure air molecules are compressed until the RVP and IFP (8941) align, which enables pressurized airflow into the combustion chamber to begin.

Volute Housing (16900)-(18400) & (21700)-(23200)

Detail views of the volute housing embodiment (VOH) (17319) are generally depicted in FIG. 169 (16900)-FIG. 184 (18400) and FIG. 217 (21700)-FIG. 232 (23200).

The VOH embodiment generally comprises an attachment fixture to interface with the IEC. The centrifugal impeller of the air charger is formed to operate inside of the VOH and is integral to the surface of the intake CCS. The placement of the VOH is deployed directly onto the IEC. This close union ensures that there are minimal losses due to the distance from the outlet port of typical molecular "air chargers" which creates frictional losses as is noted in the art of air chargers and is well known to those skilled in the art.

Exhaust Forced Discharge (FID) Apparatus (4990) Detailed Description

Detail views of the exhaust forced discharge (FID) apparatus are generally depicted in FIG. 233 (23300)-FIG. 240 (24000).

In a closed system, forces are combined or added, as is the case of the present invention incorporation of its FID embodiment.

It should be noted that the exhaust side of the ICE is already extremely hot. Unitizing the EVP (7659) together with the CCS apparatus allows for better control of the output temperatures of the exhaust and the inherent emissions of its molecular compressed and combusted gas elements. This is extremely important since if temperatures are well regulated in an ICE, then some of the more negative pollutants are never created in high numbers in the combustion chamber and the ICE runs cleaner and more volumetrically efficient.

In the present invention, exhaust of the spent combusted gases is aided by using the exhaust spiral impeller (ESI) (23396) of the exhaust straight channel spool (ESC) (15792) and the spiral impeller blades attached to the output of the RVD. In addition to the cooling provided by the CCS apparatus, there is a further air-charging apparent within the incorporation of an exhaust spiral channel spool (ECP) (25693) as prescribed earlier in the discussion about the CCS apparatus.

Exhaust Spiral Impeller (ESI) (23200)-(24000)

Detail views of the exhaust spiral impeller (ESI) (23396) are generally depicted in FIG. 233 (23300)-FIG. 240 (24000).

The exhaust spiral impeller is generally either incorporated into the CCS apparatus or deployed directly to the outlet of the EVP (7659). The exhaust spiral impeller is utilized to facilitate a more complete exhausting of the combustion chamber during the Exhaust Stroke.

Molecular Airflow Through Enhanced Engine Intake and Exhaust

Figure 50:
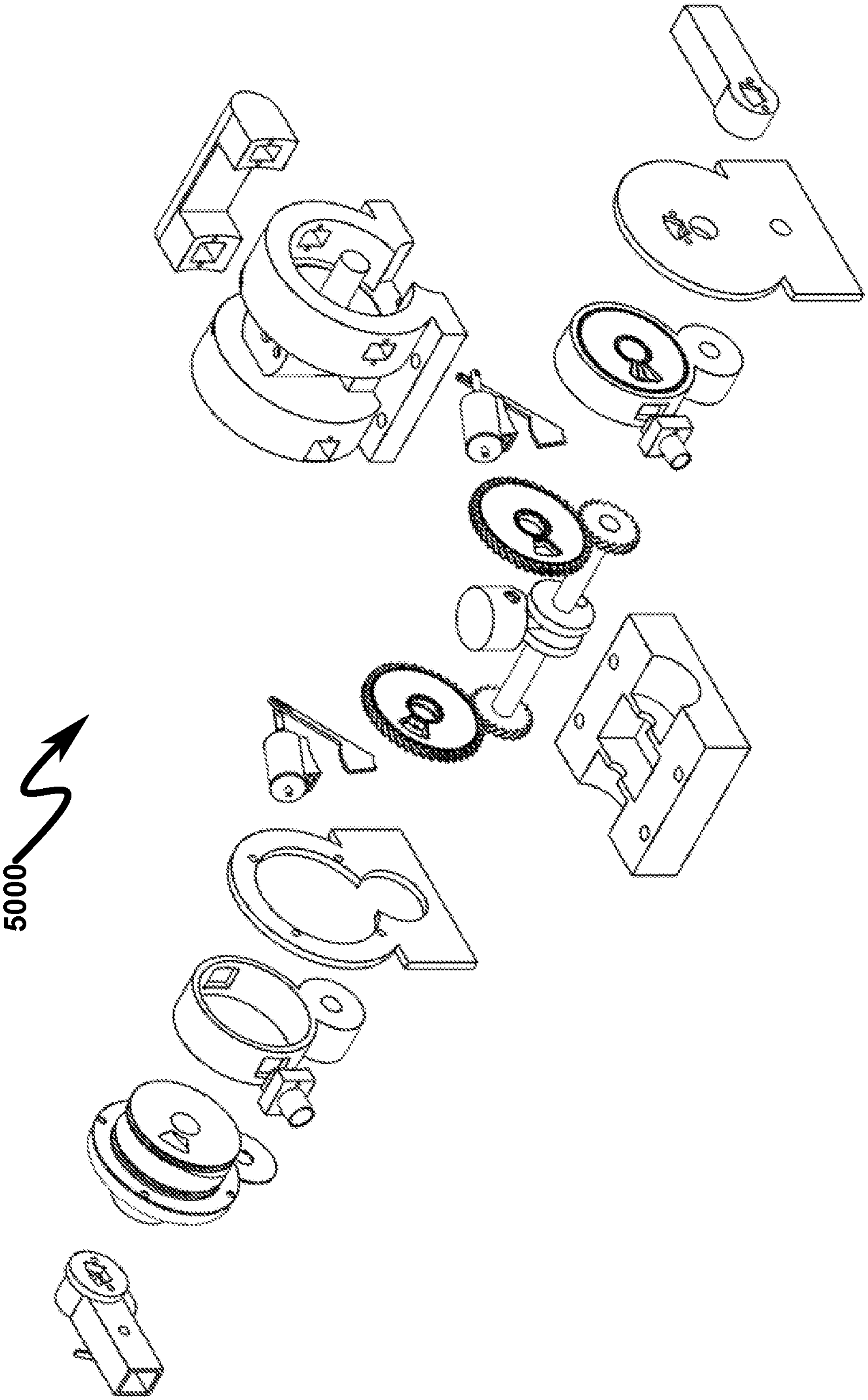
FIG. 50 illustrates a top right rear perspective isometric exploded view of a preferred exemplary enhanced invention system embodiment.
Figure 51:
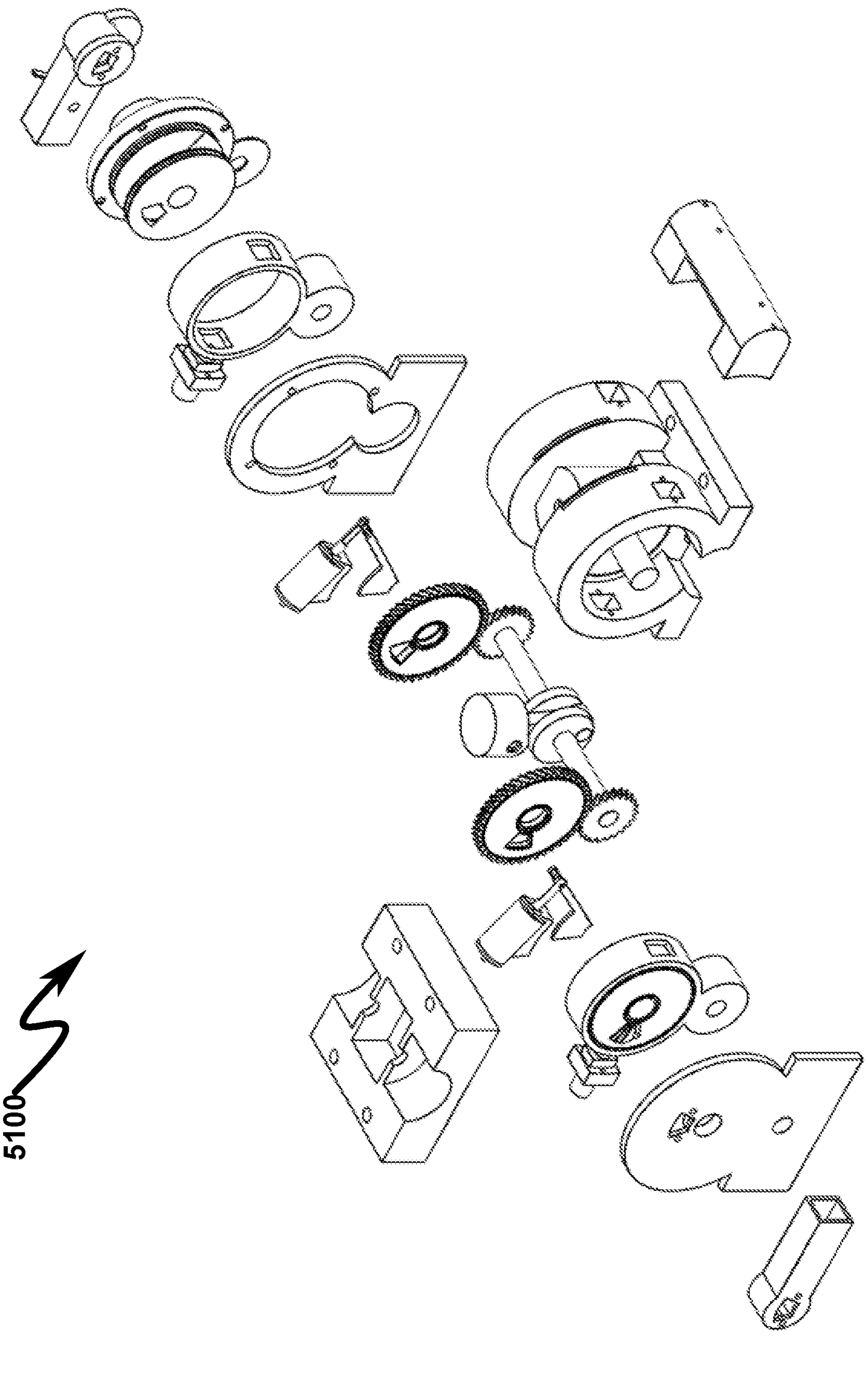
FIG. 51 illustrates a top left rear perspective isometric exploded view of a preferred exemplary enhanced invention system embodiment.
Figure 52:
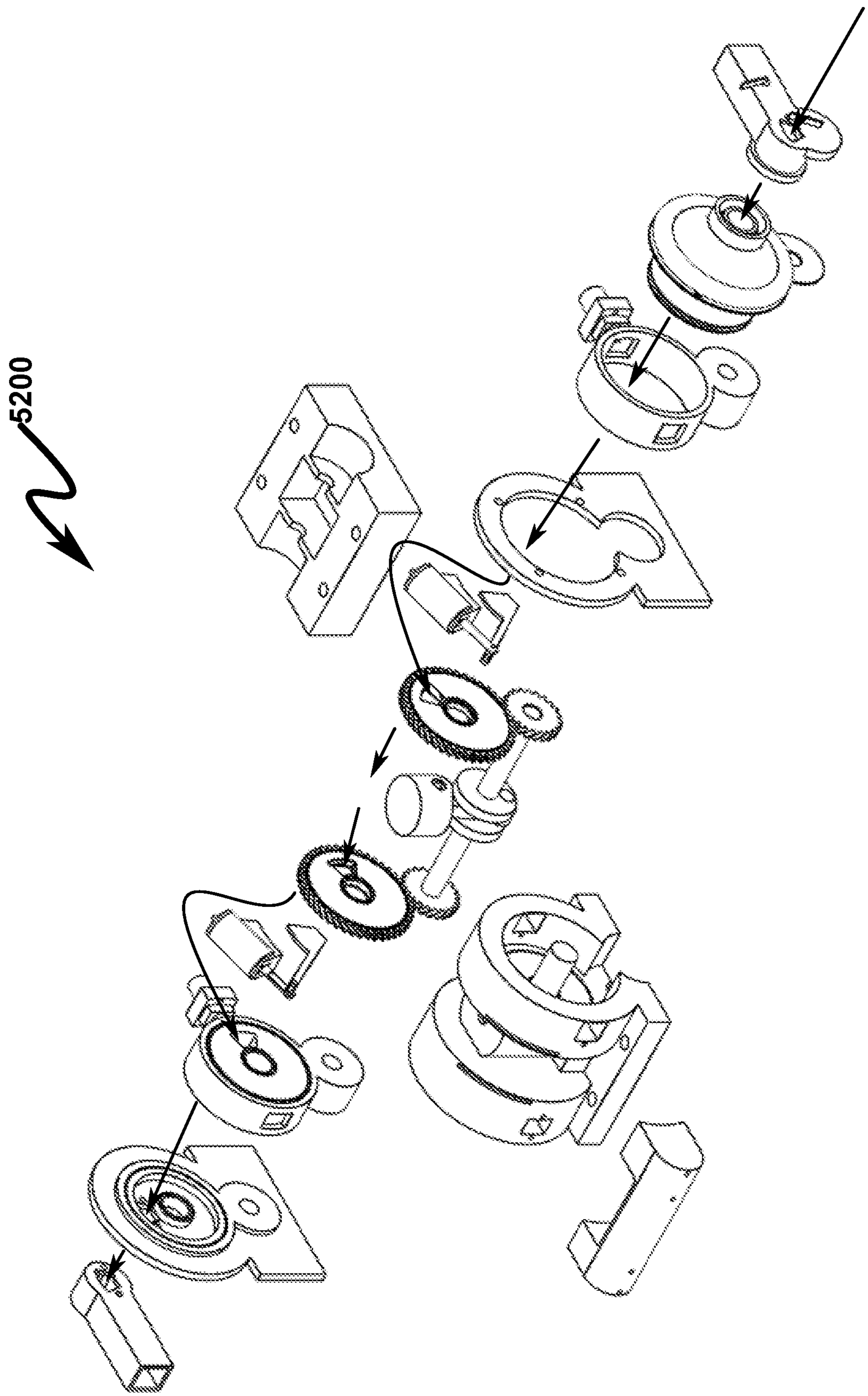
FIG. 52 illustrates a top left front perspective isometric exploded view of a preferred exemplary enhanced invention system embodiment.
Figure 53:
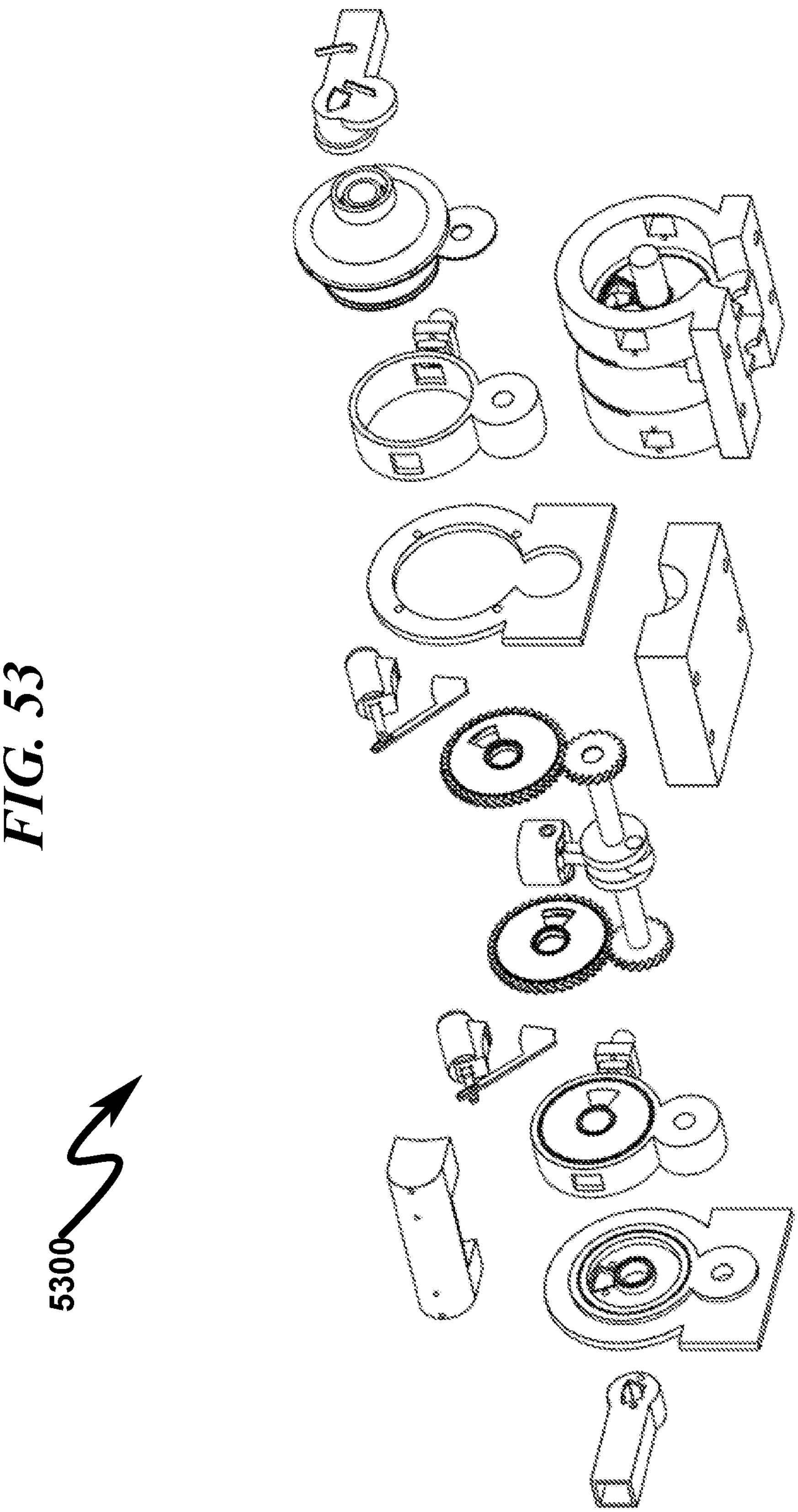
FIG. 53 illustrates a bottom right front perspective isometric exploded view of a preferred exemplary enhanced invention system embodiment.
Figure 54:
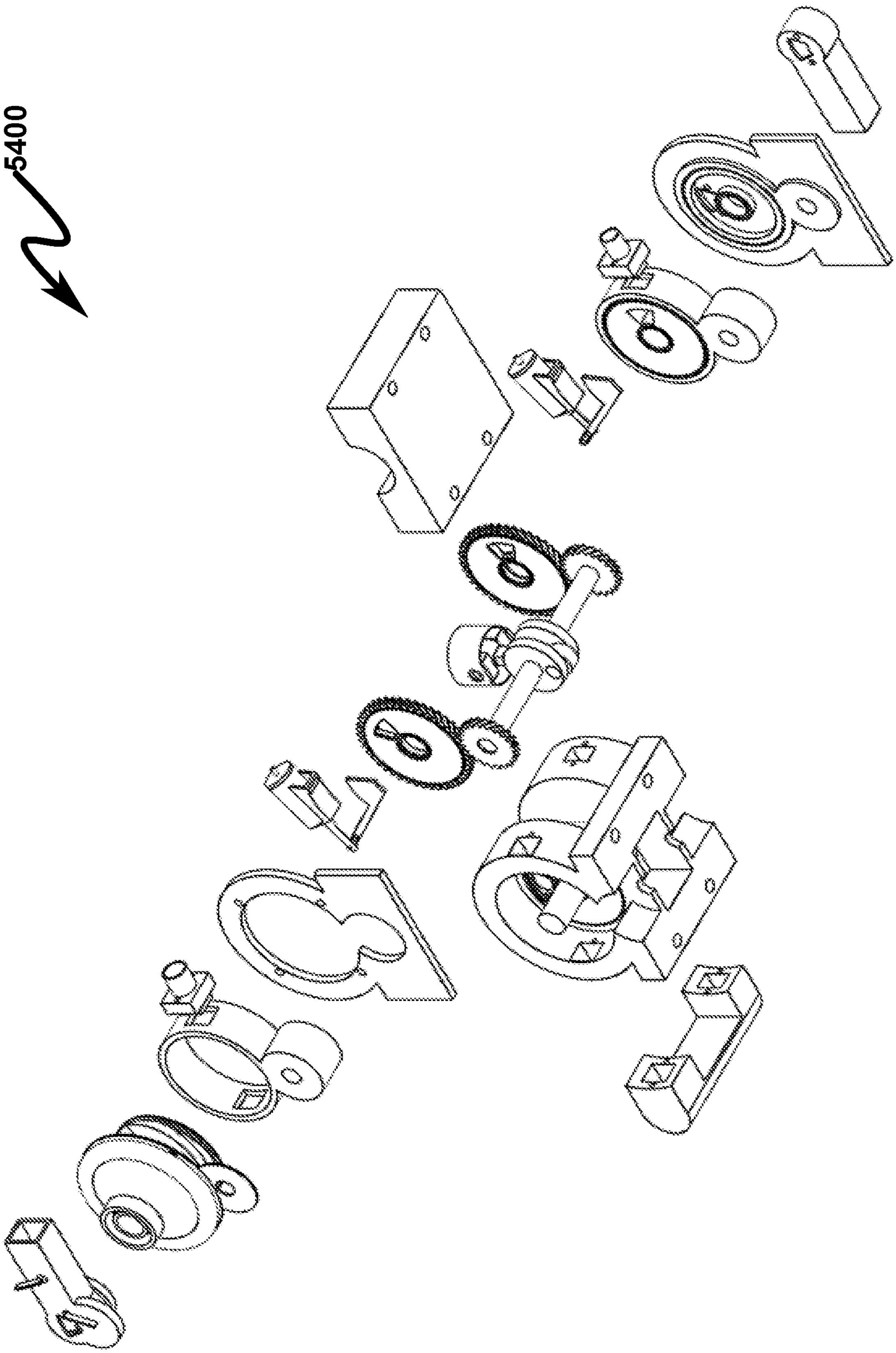
FIG. 54 illustrates a bottom right rear perspective isometric exploded view of a preferred exemplary enhanced invention system embodiment.
Figure 55:
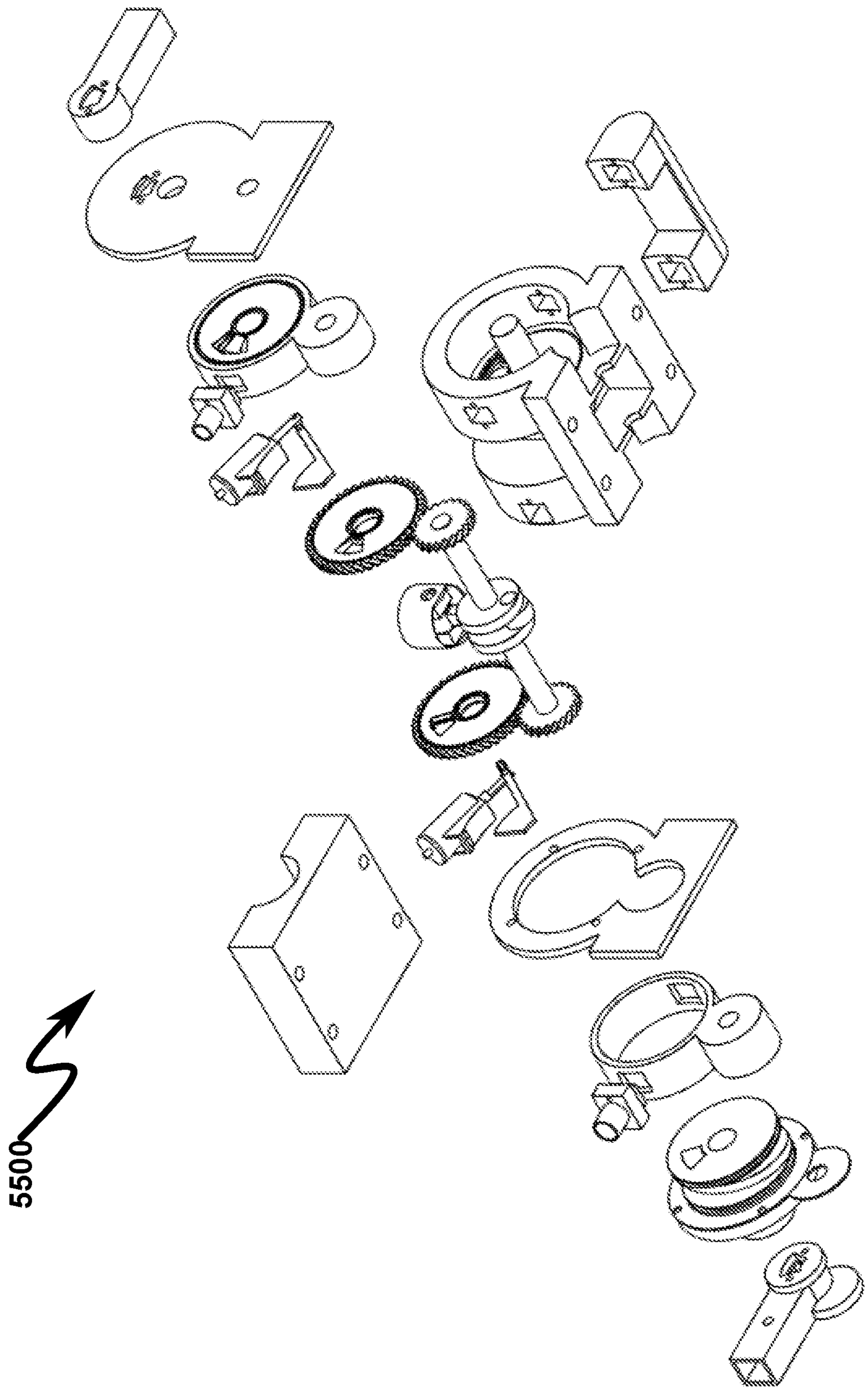
FIG. 55 illustrates a bottom left rear perspective isometric exploded view of a preferred exemplary enhanced invention system embodiment.
Figure 56:
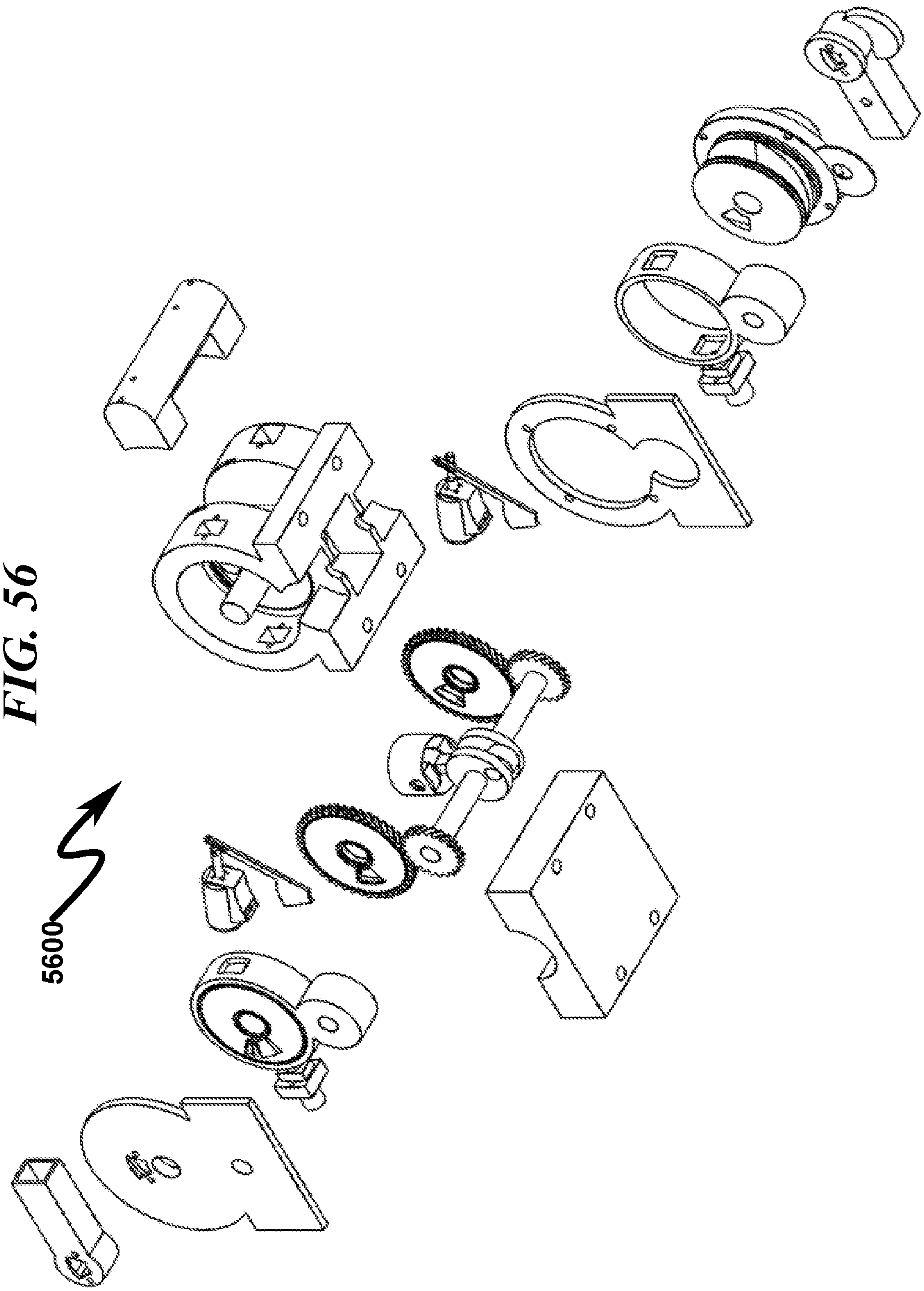
FIG. 56 illustrates a bottom left front perspective isometric exploded view of a preferred exemplary enhanced invention system embodiment.
Figure 57:
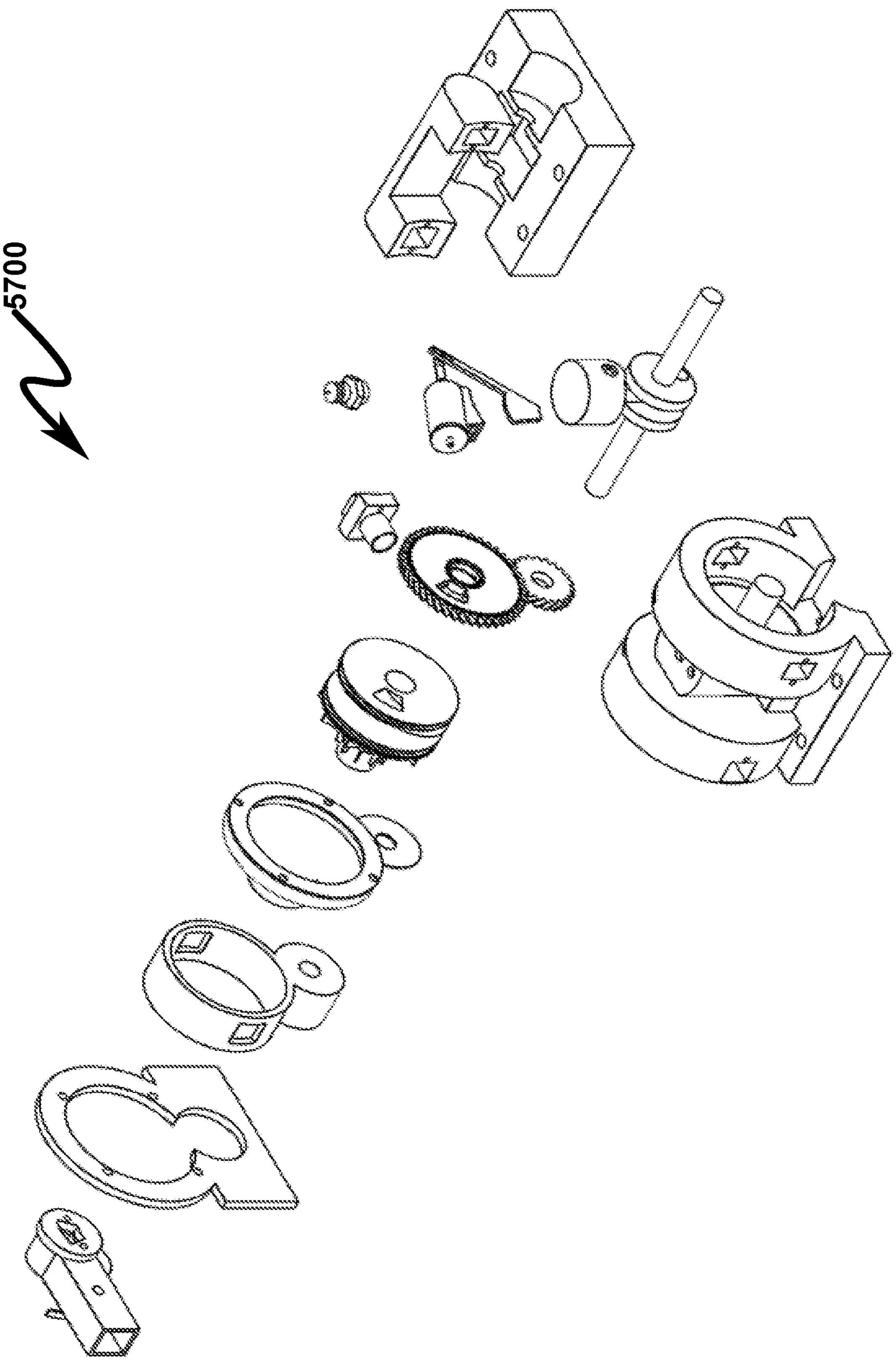
FIG. 57 illustrates a top right half front perspective isometric exploded detail view of a preferred exemplary enhanced invention system embodiment.
Figure 58:
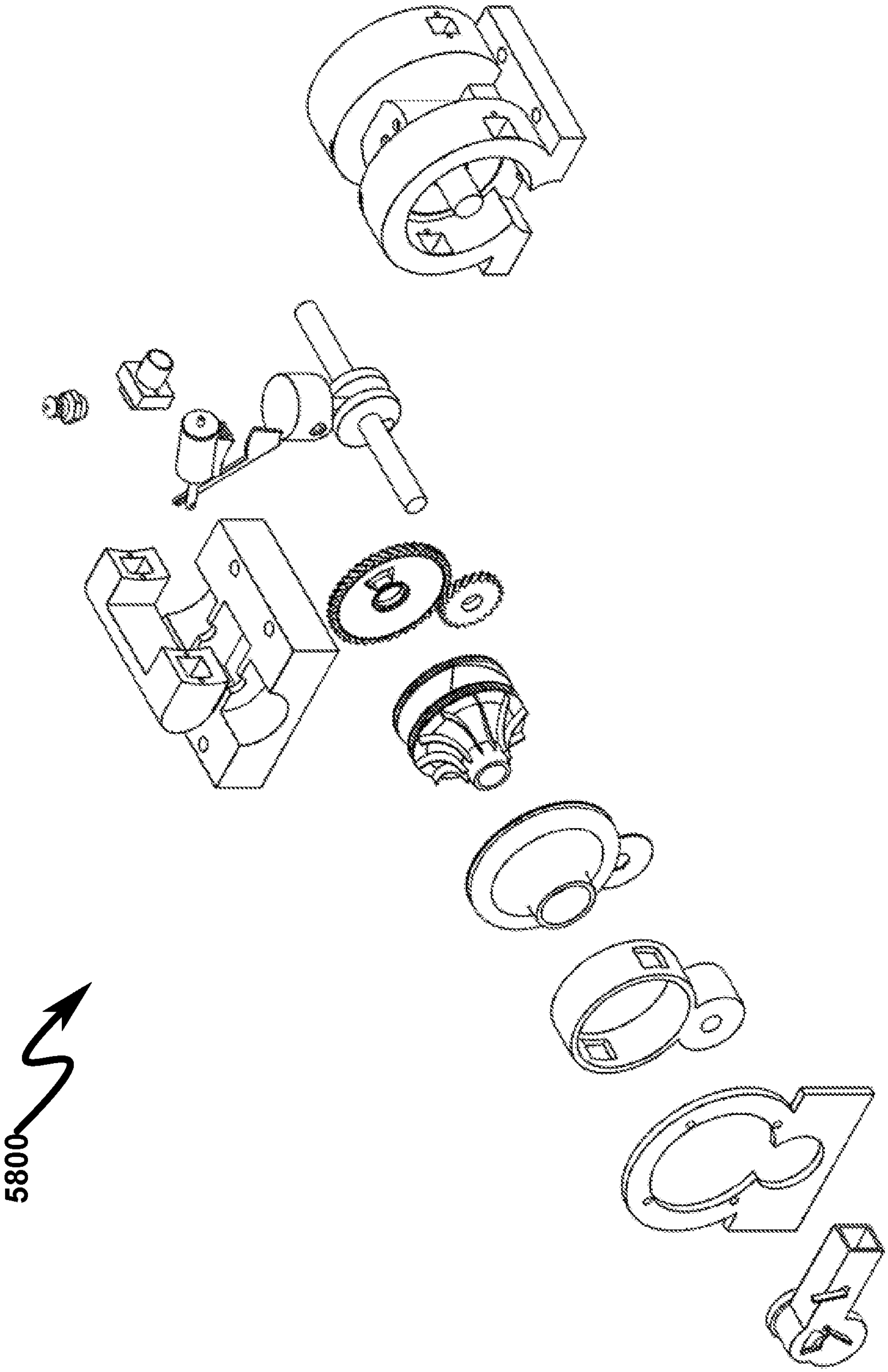
FIG. 58 illustrates a top right half rear perspective isometric exploded detail view of a preferred exemplary enhanced invention system embodiment.
Figure 59:
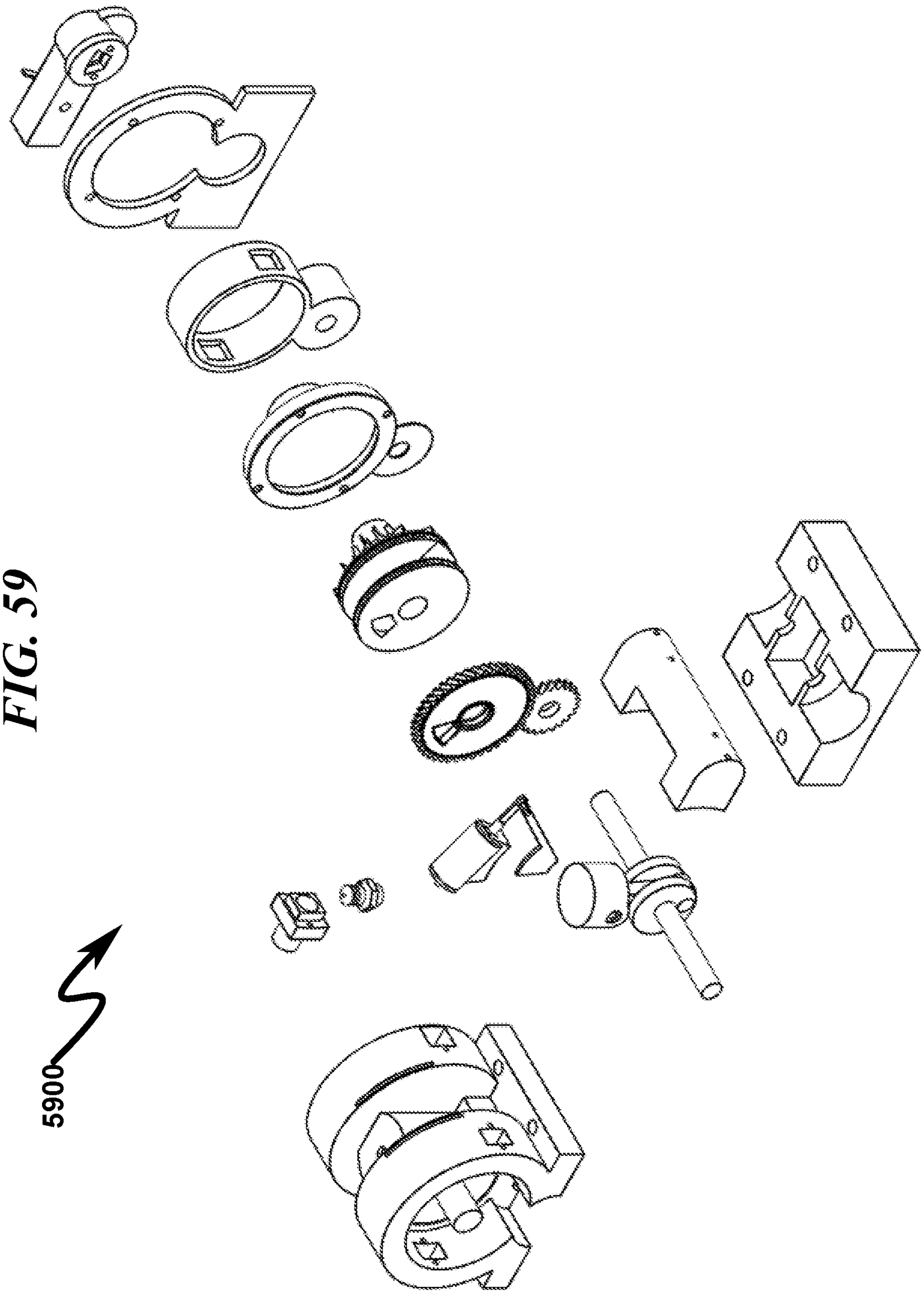
FIG. 59 illustrates a top left half rear perspective isometric exploded detail view of a preferred exemplary enhanced invention system embodiment.
Figure 60:
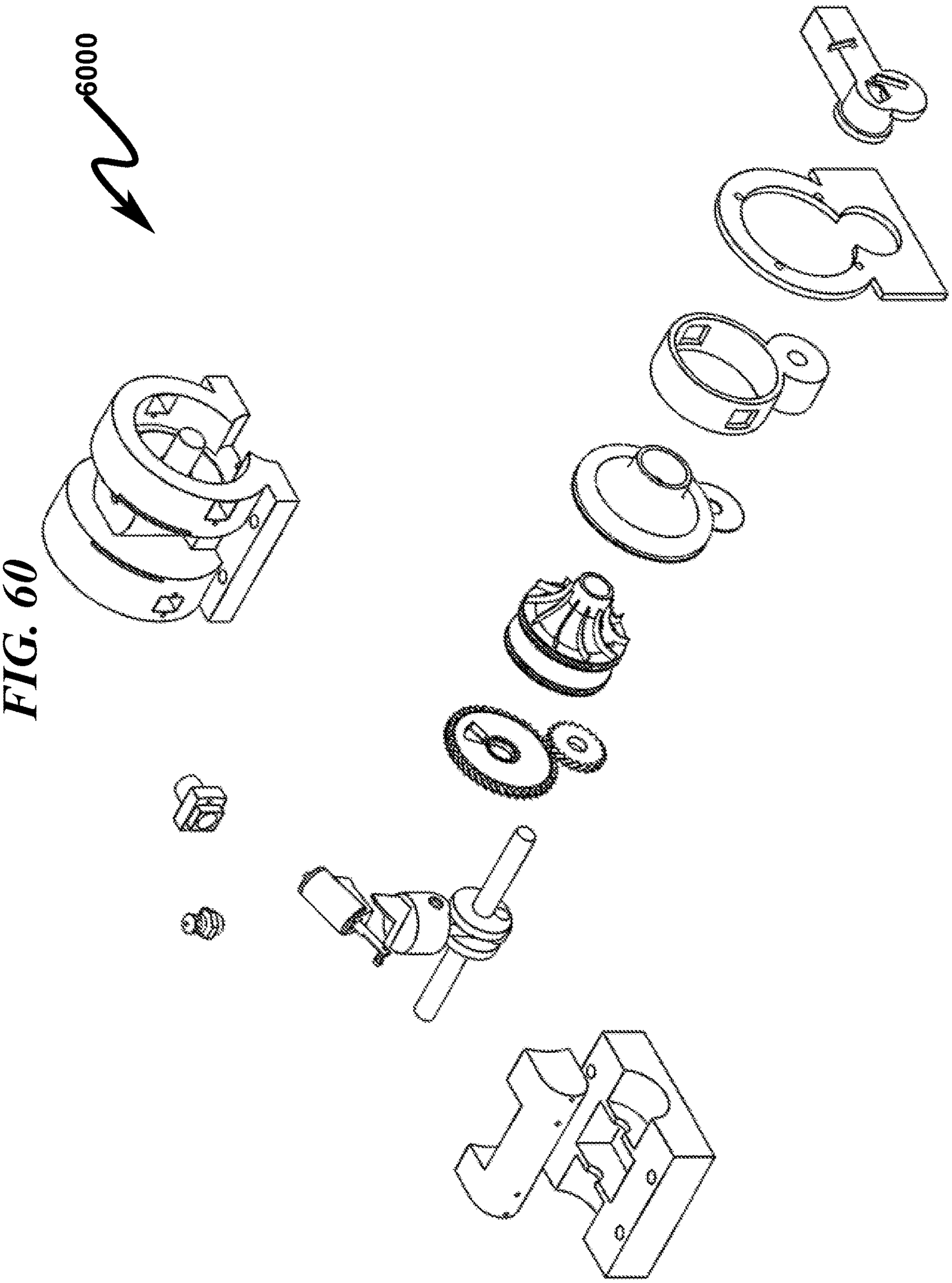
FIG. 60 illustrates a top left half front perspective isometric exploded detail view of a preferred exemplary enhanced invention system embodiment.
Figure 61:
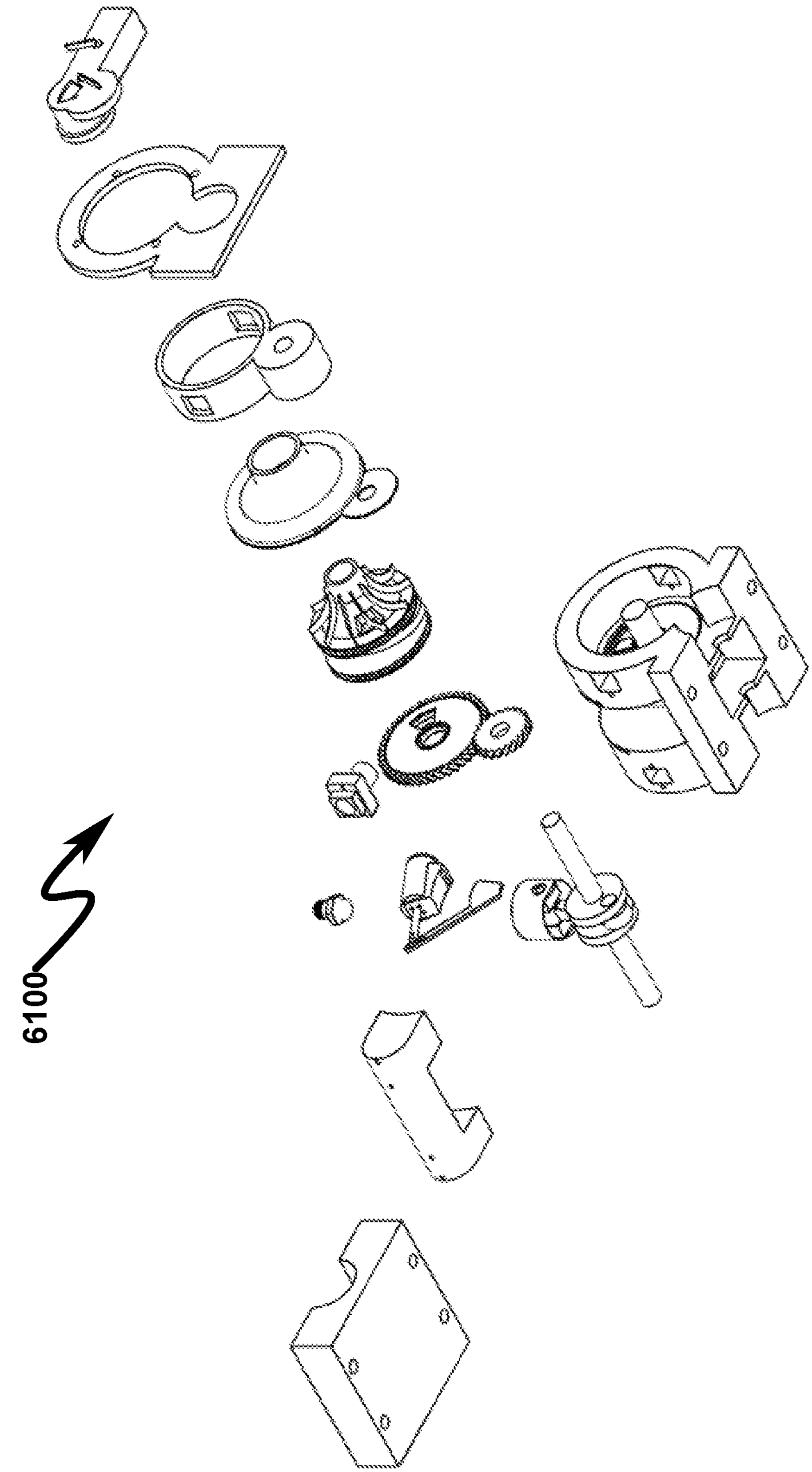
FIG. 61 illustrates a bottom right half front perspective isometric exploded detail view of a preferred exemplary enhanced invention system embodiment.
Figure 62:
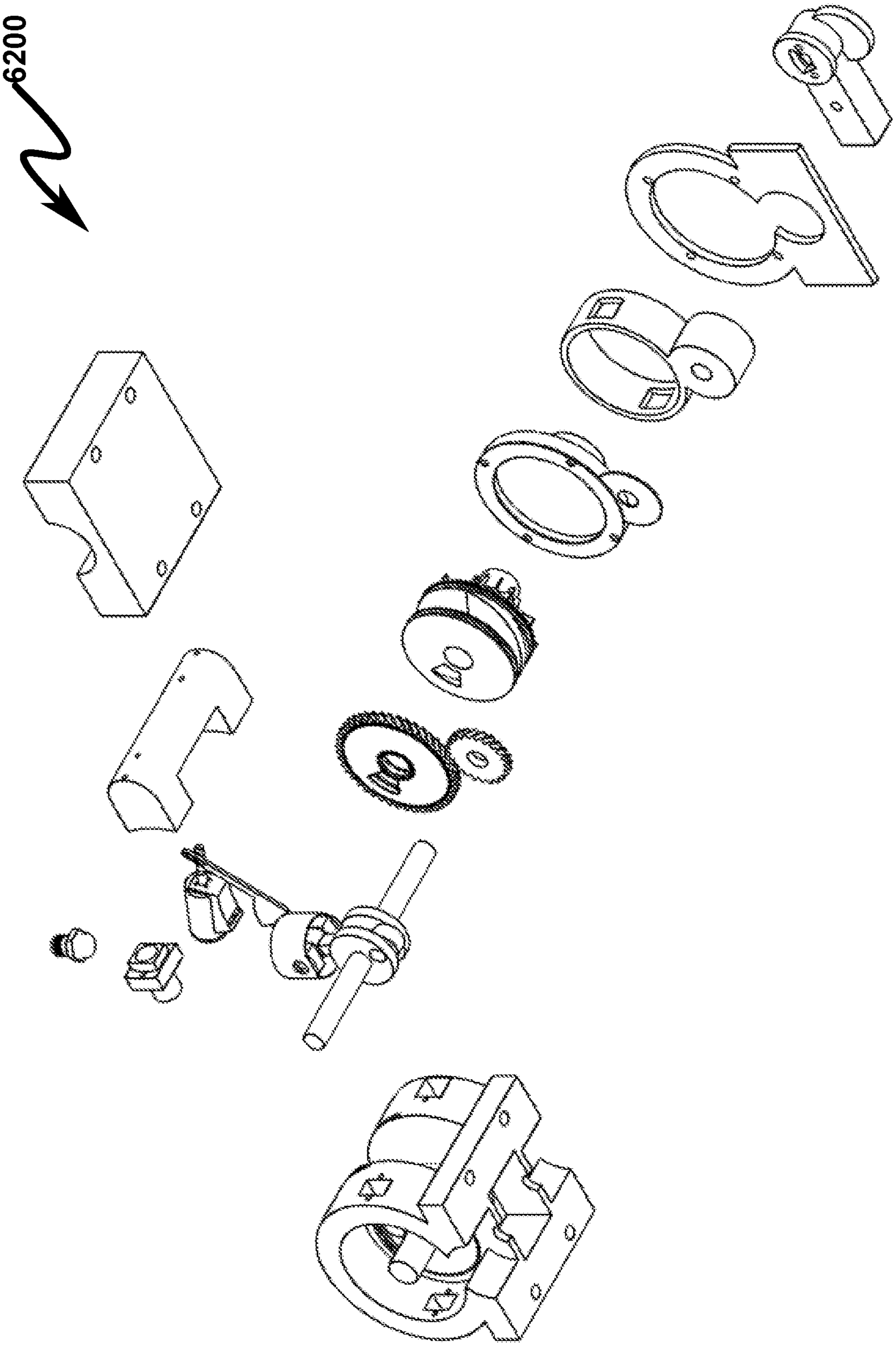
FIG. 62 illustrates a bottom right half rear perspective isometric exploded detail view of a preferred exemplary enhanced invention system embodiment.
Figure 63:
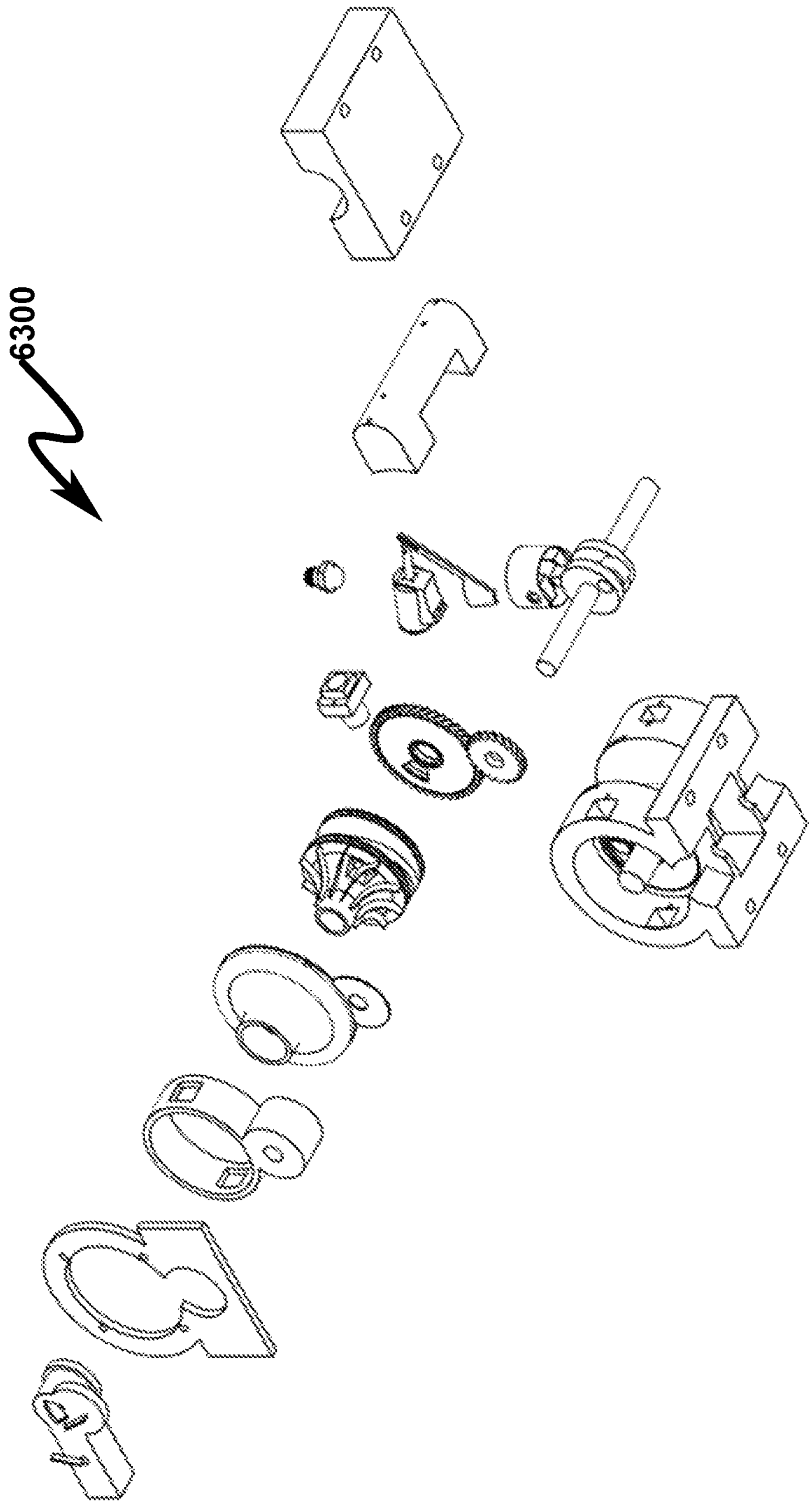
FIG. 63 illustrates a bottom left half rear perspective isometric exploded detail view of a preferred exemplary enhanced invention system embodiment.

The mapping of the molecular airflow through the enhanced present invention an embodiment are depicted in detail in the follow discussion and is shown in FIG. 50 (5000).

The Molecular Airflow Profile, as depicted by the chain of arrows in FIG. 50 (5000), starts at the intake manifold (INM) (4939) then enters the intake runner of the IEC (1732), then enters the volute housing (VOH) (17319), is compressed by the centrifugal air compressor (CIP) (15217) as it passes through the IVP (7351) of the IVD (1752) alignment with the IFP (8941), is modulated by the IMV (1740), further compressed, ignited, powered and then expelled by the reciprocated RPI (1707) movement inside the CCH (15354), this exhaust is modulated by the EMV (1760), as it passes into the EVP (7659) of the EVD (1758) alignment with the EFP (9061) receiving a forced discharge pressurization by the ESI (23396) and then travels through the exhaust runner of the EEC (1772) then completes at the exhaust manifold as it is expelled to the atmosphere.

The enhancement of the ICE molecular airflow begins at the FIN apparatus (4910) and discharges by the enhancement characteristics of the FID apparatus (4990) such that the following sequence occurs:

- ICE intake airflow is enhanced initially by the FIN (4910) as the piston travels downward during the Intake Stroke
- The airflow is further enhanced by the incorporation of the intake CCS apparatus (4910)
- Once the IVD (1752), which has been unitized with the intake CAD apparatus (4920), aligns with the IFP (8941), this airflow is channeled into and out of the CCH (15354) of the PDT (4950) for the Compression and Power Strokes
- Then, once the EVD (1758), which has been unitized with the exhaust CAD apparatus (4980), has aligned with the EFP (9061), the piston travels upward to exhaust the combusted air-fuel mixture during the Exhaust Stroke, causing the combusted air-fuel mixture to be modulated by the EMV (4960)
- Timing of this exhaust is advanced/retarded by the exhaust CAD (4980)
- Thereafter, the flow of combusted air-fuel mixture enters into the exhaust CCS apparatus (4990), where it is integrated with the FID apparatus (4990) causing a more complete exhausting of the CCH (15354)
- The FID apparatus (4990) further pushes the flow of combusted air-fuel mixture out into the EXM (4979) and then into the atmosphere

Enhanced ICE Manufacturing Notes

The present invention ICE requires that modifications and/or appliance adaptation be implemented such that the inherent concepts of the present invention can exist without changing or altering the basic aesthetics of a standard ICE.

These alterations/modifications are stylized to adhere to a further enhancement of the "follow the leader" (FTL) characteristics inherent in all ICEs, as is well known to those skilled in the art. The FTL characteristics dictates that the molecular gas elements tend to follow or be carried along by the effects of the preceding molecular gas elements in front of it, all adhering to the same forces acting upon them.

These enhancements are not limitive as any improvement such as port opening size, shape and edge angularity all speak to the volumetric efficiency which the present invention basic core element manipulates to facilitate the greater volumetric efficient use of the combustion chamber, thereby enabling an ICE substantially higher performance capabilities and lower adverse tailpipe emissions into the environment.

Engine Block (BLK) Manufacture/Fabrication

The manufacture/fabrication of the BLK assemblies requires the acceptance of a series of machining cuts or manufacturing fixtures such that the required ports, recessed areas or other features are added to an ICE engine block.

Detail views of the engine block (BLK) can be found in FIGS. 49 (4900) to 64 (6400) and FIGS. 129 (12900) to 142 (14200).

The resultant modifications to an existing engine block have to host the ACF shaped intake and exhaust rotary valves and their mated ACF shaped fixed intake and exhaust port openings as well as the fixed intake and exhaust MSV ports and the recessed areas as prescribed earlier in this specification. Further modifications are needed to facilitate the sealing apparatus, i.e., grooves and ridges, oil seals and rings, etc.

Several engineering machining techniques are available to facilitate the integration/unification of these parts/elements. The engine block will remain the primary functional element and the RVD, MSV and their associative ports and the sealing apparatus will be the secondary elements which are all either generated or facilitated by either Additive or Subtractive Manufacturing where the separate elements can be combined into one unitized component. It is well known to those skilled in the art that a process where machining/drilling can be done to facilitate these processes, however, they are mostly laborious and expensive.

Centrifugal Advance (CAD) Apparatus Manufacture/Fabrication

The manufacture/fabrication of the intake and exhaust CAD apparatus is facilitated by shelling out the inside area of the RVD and installing a plurality of CAD counter weight pivots to accommodate the plurality of CAD counter weights that must pivot according to their reaction to the forces caused by the rotation of the RVD. In association to the pivots, a CAD plate must be applied such that the pivoting reaction to the centrifugal forces will cause the ACF shaped RVP to vary its opening width with a push/pull process where this movement advances or retards the position of the RVP opening.

Several engineering machining techniques are available to facilitate the integration/unification of the CAD apparatus parts/elements. The RVD will remain the primary functional element and the CAD apparatus will be the secondary element which is either welded or bolted in place. There is also the advent of Additive and Subtractive Manufacturing where the separate elements can be combined into one unitized component. It is well known to those skilled in the art that a process where machining/drilling can be done to facilitate these processes, however, they are mostly laborious and expensive.

Cooling Channel Spool (CCS) Apparatus Manufacture/Fabrication

The manufacture/fabrication of the CCS apparatus requires admitting a spool shaped cylindrical extension to be added to the RVD in such a fashion that engine coolant is allowed to flow in and around the CCS areas wherein a straight or spiral channel exists.

Several engineering machining techniques are available to facilitate the integration/unification of the CCS apparatus parts/elements. The RVD will remain the primary functional element and the CCS apparatus will be the secondary element which is either welded or bolted in place. There is also the advent of Additive and Subtractive Manufacturing where the separate elements can be combined into one unitized component. It is well known to those skilled in the art that a process where machining/drilling can be done to facilitate these processes, however, they are mostly laborious and expensive.

Forced Induction (FID) Apparatus Manufacture/Fabrication

Manufacture of the FID componentry requires acceptance of the unitization/integration of the relevant elements inherent in the make-up of the air charger and rotary valve devices. This unitization is further incorporated into the cooling system since any forced induction system generates heat as an inherent by-product of compressing gases.

Several engineering machining techniques are available to facilitate the integration/unification of these parts/elements. The RVD will remain the primary functional element and the FIN apparatus such as the centrifugal impeller of the air charger will be the secondary element which is either welded or bolted in place. There is also the advent of Additive and Subtractive Manufacturing where these separate elements can be combined into one unitized component. It is well known to those skilled in the art that a process where machining/drilling can be done to facilitate these unitization processes, however, they are mostly laborious and expensive.

Centrifugal Air Compressor Manufacture/Fabrication

The manufacture/fabrication of the centrifugal air compressor has to close off the normally expected outlet ducting and leave the volute housing's only available outlet passage-to-be through or around the centrifugal impeller wheel which is integral to the reciprocated RVD and its RVP opening.

Several engineering machining techniques are available to facilitate the integration/unification of these parts/elements. The RVD will remain the primary functional element and the volute housing will be the secondary element which is either welded or bolted in place. There is also the advent of Additive and Subtractive Manufacturing where the separate elements can be combined into one unitized component. It is well known to those skilled in the art a process where machining/drilling can be done to facilitate these processes, however, they are mostly laborious and expensive.

Forced Discharge (FID) Apparatus Manufacture/Fabrication

Manufacture of the FID apparatus is in part accomplished via adding the spiral channel spool or the spiral impellers to the output of the straight channel spool or the exhaust RVD itself directly.

Several engineering machining techniques are available to facilitate the integration/unification of these parts/elements. The RVD will remain the primary functional element and the spiral impeller will be the secondary element which is either welded or bolted in place. There is also the advent of Additive and Subtractive Manufacturing where the separate elements can be combined into one unitized component. It is well known to those skilled in the art that a process where machining/drilling can be done to facilitate these processes, however, they are mostly laborious and expensive.

Integrated/Unitized Compilations

Integration or unitization is facilitated in the present invention such that the following compilations occur where practical:

- IVD (1752) and intake FIN apparatus (4910) comprises the centrifugal impeller (CIP) (15217), the volute housing (VOH) (17319) and the volute swirl chamber (VSC) (17318) to provide a forced induction enhancement to the ICE;
- IVD (1752) and intake CCS apparatus (4910) comprises the cooling water jacket (IWJ) (13711), straight channel spool (ISC) (NU), spiral channel spool (ICP) (15713) and intake water jacket inlet port (IIP) (14414) to provide an IVD cooling enhancement;
- IVD (1752) and intake CAD apparatus (4920) comprises the CAD counter weight (IAW) (18721), CAD spring (IAS) (18722), CAD plate (IAP) (18723), counter weight pivot (IWP) (18724) and CAD cover (IAC) (18725) to provide a port opening duration enhancement to the IVD;

EVD (1758) and exhaust CAD apparatus (4980) comprises the CAD counter weight (EAW) (18881), CAD spring (EAS) (18882), CAD plate (EAP) (18883), counter weight pivot (EWP) (18884) and CAD cover (EAC) (18885) to provide a port opening duration enhancement to the EVD;

EVD (1758) and exhaust CCS apparatus (4990) comprises the cooling water jacket (EWJ) (13591), straight channel spool (ESC) (15792), spiral channel spool (ECP) (25693) and exhaust water jacket outlet ports (EOP) (14495) to provide an EVD cooling enhancement;

EVD (1758) and exhaust FID apparatus (4990) comprises the spiral impeller (ESI) (23396) to provide a forced discharge enhancement to the ICE.

The integration or unitization is provided for such that the "follow-the-leader" (FTL) conceptualization is further enhanced and the number of inherent components is reduced. This way, coefficient of friction and number of moving parts can be reduced, thereby yielding less recirculated dirt and debris as well as cost.

Combinatorics of the Present Invention

The present invention's inherent combining the preferred embodiment features is easily configured into a plurality of valve configurations wherein there are two or more intake and two or more exhaust RVP clusters.

Since the rotary valve appliances of the present invention are able to be deployed and configured anywhere around the perimeter of the combustion chamber, even from the bottom or top of the combustion chamber, we find the applicability of the present invention's ICE valve system to be near limitless. So, the ICE depictions herein are typical yet not limitive.

It should be noted that the simplicity of combining the rotary valve disc (RVD) of Species A and the rotary valve cylinder (RVC) of Species C, (Patent US11220934) the accompanying gear coupling linkage elements would be deployed on the front and back sides of this configuration since there would be a plurality of rotary valve devices requiring a drive gear coupling linkage on both sides of the ICE connecting to the crankshaft.

This configuration is easily adaptable for the cooling, the CAD, and the forced induction/discharge features. Other limitless variations are also possible.

Rudimentary System Summary

The present invention rudimentary system may be broadly generalized as a valve system comprising:

(a) engine block (BLK) (1753);
(b) engine crankcase cover (CKC) (1757);
(c) intake engine block cover (IEC) (1732);
(d) exhaust engine block cover (EEC) (1772);
(e) intake rotary valve disc (IVD) (1752);
(f) exhaust rotary valve disc (EVD) (1758); and
(g) crankshaft (CRK) (1755);

wherein:

the CRK (1755) comprises a longitudinal rotation axis (LRA);

the IVD (1752) is coupled to the CRK (1755) and concentric with the LRA;

the EVD (1768) is coupled to the CRK (1755) and concentric with the LRA;

the IEC (1732) and the BLK (1753) each comprise a fixed intake port (IFP) (8941);

the IFP (8941) comprises an annular sectored conical frustum void (1738);

the EEC (1772) and the BLK (1753) each comprise a fixed exhaust port (EFP) (9061);

the EFP comprises an annular sectored conical frustum void (1778);

the IVD (1752) comprises an intake rotary valve port (IVP) (7351);

the IVP (7351) comprises an intake annular sectored conical frustum void (ISV) configured to control intake airflow from the IEC (1732) IFP (8941) through the BLK (1753) IFP (8941) as the IVD (1752) rotates;

the EVD (1768) comprises an exhaust rotary valve port (EVP) (7659); and the EVP (7659) comprises an exhaust annular sectored conical frustum void (ESV) configured to control exhaust gas flow from the BLK (1753) EFP through the EEC (1772) EFP as the EVD (1768) rotates.

This general system summary may be augmented by the various elements described herein to produce a wide variety of invention embodiments consistent with this overall design description.

Rudimentary Method Summary

The present invention rudimentary method may be broadly generalized as a valve method operating on a valve system, the system comprising:

(a) engine block (BLK) (1753);
(b) engine crankcase cover (CKC) (1757);
(c) intake engine block cover (IEC) (1732);
(d) exhaust engine block cover (EEC) (1772);
(e) intake rotary valve disc (IVD) (1752);
(f) exhaust rotary valve disc (EVD) (1758); and
(g) crankshaft (CRK) (1755);

wherein:

the CRK (1755) comprises a longitudinal rotation axis (LRA);

the IVD (1752) is coupled to the CRK (1755) and concentric with the LRA;

the EVD (1768) is coupled to the CRK (1755) and concentric with the LRA;

the IEC (1732) and the BLK (1753) each comprise a fixed intake port (IFP) (8941);

the IFP (8941) comprises an annular sectored conical frustum void (1738);

the EEC (1772) and the BLK (1753) each comprise a fixed exhaust port (EFP) (9061);

the EFP (9061) comprises an annular sectored conical frustum void (1778);

the IVD (1752) comprises an intake rotary valve port (IVP) (7351);

the IVP (7351) comprises an intake annular sectored conical frustum void (ISV) configured to control intake airflow from the IEC (1732) IFP (8941) through the BLK (1753) IFP (8941) as the IVD (1752) rotates;

the EVD (1768) comprises an exhaust rotary valve port (EVP) (7659); and the EVP (7659) comprises an exhaust annular sectored conical frustum void (ESV) configured to control exhaust gas flow from the BLK (1753) EFP (9061) through the EEC (1772) EFP (9061) as the EVD (1768) rotates;

the method comprising the steps of:

(1) rotating the CRK (1755) around the LRA to position the ISV over the IEC (1732) IFP (8941) so as to allow intake of air and/or fuel to pass from the IEC (1732) through the BLK (1753) IFP (8941);

(2) rotating the CRK (1755) around the LRA to compress an air/fuel mixture within the BLK (1753);

(3) rotating the CRK (1755) around the LRA to ignite an air/fuel mixture within the BLK (1753);

(4) rotating the CRK (1755) around the LRA to expel exhaust gasses from the BLK (1753) EFP (9061) through the EEC (1772) EFP (9061); and (5) proceeding to step (1);

wherein:

the method operates on the CRK (1755) as a four-stroke power cycle. This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

The method described above is a general two-stroke engine cycle that has been optimized using the intake IVD and exhaust EVD discs that have corresponding IVP and EVP structures that time the intake and exhaust flows through the combustion chamber in accordance with the rotating crankshaft.

Enhanced System Summary

The present invention enhanced system may be broadly generalized as a valve system comprising:

(a) engine block (BLK) (1753);
(b) engine crankcase cover (CKC) (1757);
(c) intake engine block cover (IEC) (1732);
(d) exhaust engine block cover (EEC) (1772);
(e) intake rotary valve disc (IVD) (1752);
(f) exhaust rotary valve disc (EVD) (1758);
(g) crankshaft (CRK) (1755);
(h) intake forced induction (IFI) (4910); and
(i) exhaust forced discharge (EFI) (4990);

wherein:

the CRK (1755) comprises a longitudinal rotation axis (LRA);

the IVD (1752) is coupled to the CRK (1755) and concentric with the LRA;

the EVD (1768) is coupled to the CRK (1755) and concentric with the LRA;

the IEC (1732) and the BLK (1753) each comprise a fixed intake port (IFP) (8941);

the IFP (8941) comprises an annular sectored conical frustum void (1738);

the EEC (1772) and the BLK (1753) each comprise a fixed exhaust port (EFP) (9061);

the EFP (9061) comprises an annular sectored conical frustum void (1778);

the IVD (1752) comprises an intake rotary valve port (IVP) (7351);

the IVP (7351) comprises an intake annular sectored conical frustum void (ISV) configured to control intake airflow from the IEC (1732) IFP (8941) through the BLK (1753) IFP (8941) as the IVD (1752) rotates;

the EVD (1768) comprises an exhaust rotary valve port (EVP) (7659); and the EVP (7659) comprises an exhaust annular sectored conical frustum void (ESV) configured to control exhaust gas flow from the BLK (1753) EFP (9061) through the EEC (1772) EFP (9061) as the EVD (1768) rotates;

the IFI (4910) comprises an intake cooling water jacket (IWJ) (13711) enclosing an intake centrifugal impeller (CIP) (15217), intake spiral impeller (ISI) (15916), and intake spiral channel (IPC) (15713);

the CIP is coupled to the CRK (1755) along the LRA; the ISI is coupled to the CRK (1755) along the LRA; the IFI (4910) is configured to transfer and compress air from the IEC (1732) IFP (8941) to the BLK (1753) IFP (8941);

the EFI (4990) comprises an exhaust cooling water jacket (EWJ) (13591) enclosing an exhaust spiral impeller (ESI) (23396), and exhaust spiral channel (ESC) (15792);

the ESI (23396) is coupled to the CRK (1755) along the LRA; and the EFI (4990) is configured to transfer exhaust from the BLK (1753) EFP (9061) to the EEC (1772) EFP (9061).

This general system summary may be augmented by the various elements described herein to produce a wide variety of invention embodiments consistent with this overall design description.

Enhanced Method Summary

The present invention enhanced method may be broadly generalized as a valve method operating on a valve system, the system comprising:

(a) engine block (BLK) (1753);
(b) engine crankcase cover (CKC) (1757);
(c) intake engine block cover (IEC) (1732);
(d) exhaust engine block cover (EEC) (1772);
(e) intake rotary valve disc (IVD) (1752);
(f) exhaust rotary valve disc (EVD) (1758);
(g) crankshaft (CRK) (1755);
(h) intake forced induction (IFI) (4910); and
(i) exhaust forced discharge (EFI) (4990);

wherein:

the CRK (1755) comprises a longitudinal rotation axis (LRA);

the IVD (1752) is coupled to the CRK (1755) and concentric with the LRA;

the EVD (1768) is coupled to the CRK (1755) and concentric with the LRA;

the IEC (1732) and the BLK (1753) each comprise a fixed intake port (IFP) (8941);

the IFP (8941) comprises an annular sectored conical frustum void (1738);

the EEC (1772) and the BLK (1753) each comprise a fixed exhaust port (EFP) (9061);

the EFP (9061) comprises an annular sectored conical frustum void (1778);

the IVD (1752) comprises an intake rotary valve port (IVP) (7351);

the IVP (7351) comprises an intake annular sectored conical frustum void (ISV) configured to control intake airflow from the IEC (1732) IFP (8941) through the BLK (1753) IFP (8941) as the IVD (1752) rotates;

the EVD (1768) comprises an exhaust rotary valve port (EVP) (7659); and the EVP (7659) comprises an exhaust annular sectored conical frustum void (ESV) configured to control exhaust gas flow from the BLK (1753) EFP (9061) through the EEC (1772) EFP (9061) as the EVD (1768) rotates;

the IFI (4910) comprises an intake cooling water jacket (IWJ) (13711) enclosing an intake centrifugal impeller (CIP) (15217), intake spiral impeller (ISI) (15916), and intake spiral channel (IPC) (15713);

the CIP is coupled to the CRK (1755) along the LRA;

the ISI is coupled to the CRK (1755) along the LRA;

the IFI (4910) is configured to transfer and compress air from the IEC (1732) IFP (8941) to the BLK (1753) IFP (8941);

the EFI (4990) comprises an exhaust cooling water jacket (EWJ) (13591) enclosing an exhaust spiral impeller (ESI) (23396), and exhaust spiral channel (ESC) (15792);

the ESI (23396) is coupled to the CRK (1755) along the LRA; and the EFI (4990) is configured to transfer exhaust from the BLK (1753) EFP (9061) to the EEC (1772) EFP (9061);

the method comprising the steps of:

(1) rotating the CRK (1755) around the LRA to position the ISV over the IEC (1732) IFP (8941) so as to allow intake of air and/or fuel to pass from the IEC (1732) through the BLK (1753) IFP (8941);

(2) rotating the CRK (1755) around the LRA to compress an air/fuel mixture within the BLK (1753);

(3) rotating the CRK (1755) around the LRA to ignite an air/fuel mixture within the BLK (1753);

(4) rotating the CRK (1755) around the LRA to expel exhaust gasses from the BLK (1753) EFP (9061) through the EEC (1772) EFP (9061); and (5) proceeding to step (1);

wherein:

the method operates on the CRK (1755) as a four-stroke power cycle.

his general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

The method described above is a general four-stroke engine cycle that has been optimized using the intake IVD and exhaust EVD discs that have corresponding IVP and EVP structures that time the intake and exhaust flows through the combustion chamber in accordance with the rotating crankshaft.

System/Method Variations

The present invention anticipates a wide variety of variations in the rudimentary theme of construction. The examples presented previously do not represent the entire scope of possible usages. They are meant to cite a few of the almost limitless possibilities.

This rudimentary system, method, and product-by-process may be augmented with a variety of ancillary embodiments, including but not limited to:

An embodiment further comprising an intake multi-staged valve (IMV), the IMV comprising:

(a) intake multi-staged valve blade (IMB) (11342);

(b) intake multi-staged valve spring (IMS) (11343);

(c) intake multi-staged valve diaphragm (IMD) (11344);

(d) intake multi-staged valve housing (IMH) (10545); and (e) intake fixed multi-staged valve port (IMF) (8147);

wherein:

the IMD (11344) is coupled to the IMB (11342) via the IMS (11343);

the IMH (10545) comprises an intake interior housing void (IHV);

the IMD (11344) is configured to conform to the IHV;

the IMF (8147) comprises a void within the BLK (1753) extending across the BLK (1753) IFP (8941) and configured to allow insertion of the IMB (11342) into the IMF (8147) so as to modulate a cross sectional area of the BLK (1753) IFP (8941); and the IMB (11342) is configured to engage the IMF (8147) and dynamically modulate the cross sectional area of the BLK (1753) IFP (8941).

An embodiment further comprising an exhaust multi-staged valve (EMV), the EMV comprising:

(a) exhaust multi-staged valve blade (EMB) (11662);

(b) exhaust multi-staged valve spring (EMS) (11663);

(c) exhaust multi-staged valve diaphragm (EMD) (11664);

(d) exhaust multi-staged valve housing (EMH) (10665); and (e) exhaust fixed multi-staged valve port (EMF) (13176);

wherein:

the EMD (11664) is coupled to the EMB (11662) via the EMS (11663);

the EMH (10665) comprises an exhaust interior housing void (EHV);

the EMD (11664) is configured to conform to the EHV;

the EMF (13176) comprises a void within the BLK (1753) extending across the BLK (1753) EFP (9061) and configured to allow insertion of the EMB (11662) into the EMF (13176) so as to modulate a cross sectional area of the BLK (1753) EFP (9061); and the EMB (11662) is configured to engage the EMF (13176) and dynamically modulate a flow control aperture within the cross sectional area of the BLK (1753) EFP (9061).

An embodiment further comprising intake sealing (ISP) wherein the ISP comprises:

(a) grooves and ridges Intake (IGR) (8231) and Exhaust (EGR) (8771); and (b) seals and rings Intake (ISR) (9734) and Exhaust (ESR) (10474);

wherein:

the IGR (8231) is configured on the BLK (1753) IFP (8941); and the ISR (9734) is configured on the BLK (1753), the ILC (1748), and the IVD (1752).

An embodiment further comprising further comprising exhaust sealing (ESP) wherein the ESP comprises:

(a) grooves and ridges (EGR) (8771); and (b) seals and rings (ESR) (10474);

wherein:

the EGR (8771) is configured on the BLK (1753) EFP (9061); and the ESR (10474) is configured on the BLK (1753), the ELC (1778), and the EVD (1768).

An embodiment wherein the IVD (1752) further comprises grooves and ridges (7937) configured to provide a seal between the IVD (1752) and the IEC (1732) and/or between the IVD (1752) and the BLK (1753).

An embodiment wherein the EVD (1758) further comprises grooves and ridges (8077) configured to provide a seal between the EVD (1758) and the EEC (1757) and/or between the EVD (1758) and the BLK (1753).

An embodiment wherein the IVP (1761) and the EVP (1769) are configured anti-symmetrically along the LRA.

An embodiment wherein:

the IVP (1761) is configured to allow air intake into the BLK (1753) once per revolution of the CRK (1755); and the EVP (1769) is configured to allow exhaust out of the BLK (1753) once per revolution of the CRK (1755).

An embodiment further comprising a piston (RPI) (2563) coupled to a piston connecting rod (RPR) (2567) that is coupled to the CRK (1755).

An embodiment further comprising a direct fuel injector (DFI) (ND) coupled to the BLK (1753) and penetrating a combustion chamber (CCH) (2964) void formed by the BLK (1753).

An embodiment further comprising a spark plug (SPK) (N/D) coupled to the BLK (1753) and penetrating a combustion chamber (CCH) (2964) void formed by the BLK (1753).

An embodiment further comprising an intake centrifugal advance plate (IAP);

wherein:

the IAP is configured to articulate about the LRA;

the IAP comprises a plurality of advance counter weights (IAW);

the IAP comprises a corresponding plurality of centrifugal advance springs (IAS) for each of the CAW;

the plurality of IAW is each individually coupled to the IAP via each of the corresponding plurality of the IAS;

the plurality of IAN are each rotationally coupled to the IVD via a pivot on the IVD; and the IAP comprises an annular sectored conical frustum void configured to control intake airflow from the IEC (1732) IFP (8941) through the BLK (1753) IFP (8941) based on the state of the plurality of the IAN and the plurality of the IAN as the IAP articulates around the LRA.

An embodiment further comprising an exhaust centrifugal advance plate (EAP);

wherein:

the EAP is configured to articulate about the LRA;

the EAP comprises a plurality of advance counter weights (EAW);

the EAP comprises a corresponding plurality of centrifugal advance springs (EAS) for each of the EAW;

the plurality of EAW is each individually coupled to the EAP via each of the corresponding plurality of the EAS;

the plurality of EAW are each rotationally coupled to the EVD via a pivot on the EVD; and the EAP comprises an annular sectored conical frustum void configured to control exhaust flow from the EEC (1709) EFP (9061) through the BLK (1753) EFP based on the state of the plurality of the EAW and the plurality of the EAW as the EAP articulates around the LRA.

One skilled in the art will recognize that other embodiments are possible and hereby anticipated by the present invention based on combinations of elements taught within the above invention description.

CONCLUSION

A valve system/method suitable for an internal combustion engine (ICE), compressor pump, vacuum pump, and/or reciprocating mechanical device has been disclosed. The system/method is optimized for construction of a four-stroke ICE. The rudimentary system incorporates an intake engine block cover (IEC) and exhaust engine block cover (EEC) that enclose an intake rotary valve disc (IVD) and exhaust rotary valve disc (EVD) that control intake/exhaust flow through a respective intake rotary valve port (IVP) and an exhaust rotary valve port (EVP) into and out of a combustion cylinder that provides power to a piston and crankshaft. An intake multi-staged valve (IMV) and exhaust multi-staged valve (EMV) provide intake and exhaust flow control for the IVD/IVP and EVD/EVP. An enhanced system may include a variety of intake/exhaust port seals (IPS/EPS), forced induction (FIN), centrifugal advance (CAD), and/or cooling channel spool (ICS/ECS).

CLAIMS INTERPRETATION

The following rules apply when interpreting the CLAIMS of the present invention:

The CLAIM PREAMBLE should be considered as limiting the scope of the claimed invention.

"WHEREIN" clauses should be considered as limiting the scope of the claimed invention.

"WHEREBY" clauses should be considered as limiting the scope of the claimed invention.

"ADAPTED TO" clauses should be considered as limiting the scope of the claimed invention.

"ADAPTED FOR" clauses should be considered as limiting the scope of the claimed invention.

The term "MEANS" specifically invokes the means-plus-function claims limitation recited in 35 U.S.C. § 112(f) and such claim shall be construed to cover the corresponding structure, material, or acts described in the specification and equivalents thereof.

The phrase "MEANS FOR" specifically invokes the means-plus-function claims limitation recited in 35 U.S.C. § 112(f) and such claim shall be construed to cover the corresponding structure, material, or acts described in the specification and equivalents thereof.

The phrase "STEP FOR" specifically invokes the step-plus-function claims limitation recited in 35 U.S.C. § 112(f) and such claim shall be construed to cover the corresponding structure, material, or acts described in the specification and equivalents thereof.

The step-plus-function claims limitation recited in 35 U.S.C. § 112(f) shall be construed to cover the corresponding structure, material, or acts described in the specification and equivalents thereof ONLY for such claims including the phrases "MEANS FOR", "MEANS", or "STEP FOR."

The phrase "AND/OR" in the context of an expression "X and/or Y" should be interpreted to define the set of "(X and Y)" in union with the set "(X or Y)" as interpreted by Ex Parte Gross (USPTO Patent Trial and Appeal Board, Appeal 2011-004811, Ser. No. 11/565,411, ("'and/or' covers embodiments having element A alone, B alone, or elements A and B taken together").

The claims presented herein are to be interpreted in light of the specification and drawings presented herein with sufficiently narrow scope such as to not preempt any abstract idea.

The claims presented herein are to be interpreted in light of the specification and drawings presented herein with sufficiently narrow scope such as to not preclude every application of any idea.

The claims presented herein are to be interpreted in light of the specification and drawings presented herein with sufficiently narrow scope such as to preclude any basic mental process that could be performed entirely in the human mind.

The claims presented herein are to be interpreted in light of the specification and drawings presented herein with sufficiently narrow scope such as to preclude any process that could be performed entirely by human manual effort.

Although a preferred embodiment of the present invention has been illustrated in the accompanying drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:

1. A valve system comprising:

(a) engine block (BLK) (1753);

(b) engine crankcase cover (CKC) (1757);

(c) intake engine block cover (IEC) (1732);

(d) exhaust engine block cover (EEC) (1772);

(e) intake rotary valve disc (IVD) (1752);

(f) exhaust rotary valve disc (EVD) (1758); and (g) crankshaft (CRK) (1755);

wherein:

said CRK (1755) comprises a longitudinal rotation axis (LRA);

said IVD (1752) is coupled to said CRK (1755) and concentric with said LRA;

said EVD (1768) is coupled to said CRK (1755) and concentric with said LRA;

said IEC (1732) and said BLK (1753) each comprise a fixed intake port (IFP) (8941);

said IFP (8941) comprises an annular sectored conical frustum void (1738);

said EEC (1772) and said BLK (1753) each comprise a fixed exhaust port (EFP) (9061);

said EFP (9061) comprises an annular sectored conical frustum void (1778);

said IVD (1752) comprises an intake rotary valve port (IVP) (7351);

said IVP (7351) comprises an intake annular sectored conical frustum void (ISV) configured to control intake airflow from said IEC (1732) IFP (8941) through said BLK (1753) IFP (8941) as said IVD (1752) rotates;

said EVD (1768) comprises an exhaust rotary valve port (EVP) (7659); and said EVP (7659) comprises an exhaust annular sectored conical frustum void (ESV) configured to control exhaust gas flow from said BLK (1753) EFP (9061) through said EEC (1772) EFP (9061) as said EVD (1768) rotates.

2. The valve system of claim 1 further comprising an intake multi-staged valve (IMV) (1740), said IMV comprising:

(a) intake multi-staged valve blade (IMB) (11342);

(b) intake multi-staged valve spring (IMS) (11343);

(c) intake multi-staged valve diaphragm (IMD) (11344);

(d) intake multi-staged valve housing (IMH) (10545); and (e) intake fixed multi-staged valve port (IMF) (8147);

wherein:

said IMD (11344) is coupled to said IMB (11342) via said IMS (11343);

said IMH (10545) comprises an intake interior housing void (IHV);

said IMD (11344) is configured to conform to said IHV;

said IMF (8147) comprises a void within said BLK (1753) extending across said BLK (1753) IFP (8941) and configured to allow insertion of said IMB (11342) into said IMF (8147) so as to modulate a cross sectional area of said BLK (1753) IFP (8941); and said IMB (11342) is configured to engage said IMF (8147) and dynamically modulate said cross sectional area of said BLK (1753) IFP (8941).

3. The valve system of claim 1 further comprising an exhaust multi-staged valve (EMV) (1760), said EMV comprising:

(a) exhaust multi-staged valve blade (EMB) (11662);

(b) exhaust multi-staged valve spring (EMS) (11663);

(c) exhaust multi-staged valve diaphragm (EMD) (11664);

(d) exhaust multi-staged valve housing (EMH) (10665); and (e) exhaust fixed multi-staged valve port (EMF) (13176);

wherein:

said EMD (11664) is coupled to said EMB (11662) via said EMS (11663);

said EMH (10665) comprises an exhaust interior housing void (EHV);

said EMD (11664) is configured to conform to said EHV;

said EMF (13176) comprises a void within said BLK (1753) extending across said BLK (1753) EFP (9061) and configured to allow insertion of said EMB (11662) into said EMF (13176) so as to modulate a cross sectional area of said BLK (1753) EFP (9061); and said EMB (11662) is configured to engage said EMF (13176) and dynamically modulate a flow control aperture within said cross sectional area of said BLK (1753) EFP (9061).

4. The valve system of claim 1 further comprising intake sealing (ISP) wherein said ISP comprises:

(a) grooves and ridges (IGR) (8231); and (b) seals and rings (ISR) (9734);

wherein:

said IGR (8231) is configured on said BLK (1753) IFP (8941); and said ISR (9734) is configured on said BLK (1753), said ILC (1748), and said IVD (1752).

5. The valve system of claim 1 further comprising exhaust sealing (ESP) wherein said ESP comprises:

(a) grooves and ridges (EGR) (8771); and (b) seals and rings (ESR) (10474);

wherein:

said EGR (8771) is configured on said BLK (1753) EFP (9061); and said ESR (10474) is configured on said BLK (1753), said ELC (1778), and said EVD (1768).

6. The valve system of claim 1 wherein said IVD (1752) further comprises grooves and ridges (7937) configured to provide a seal between said IVD (1752) and said IEC (1732) and/or between said IVD (1752) and said BLK (1753).

7. The valve system of claim 1 wherein said EVD (1758) further comprises grooves and ridges (8077) configured to provide a seal between said EVD (1758) and said EEC (1757) and/or between said EVD (1758) and said BLK (1753).

8. The valve system of claim 1 wherein said IVP (7351) and said EVP (7659) are configured anti-symmetrically along said LRA.

9. The valve system of claim 1 wherein:
said IVP (7351) is configured to allow air intake into said BLK (1753) once per revolution of said CRK (1755); and
said EVP (7659) is configured to allow exhaust out of said BLK (1753) once per revolution of said CRK (1755).

10. The valve system of claim 1 wherein said IVD (1752) and said EVD (1758) are each mechanically coupled to said CRK (1755) via one or more gears.

11. A valve system comprising:
(a) engine block (BLK) (1753);
(b) engine crankcase cover (CKC) (1757);
(c) intake engine block cover (IEC) (1732);
(d) exhaust engine block cover (EEC) (1772);
(e) intake rotary valve disc (IVD) (1752);
(f) exhaust rotary valve disc (EVD) (1758);
(g) crankshaft (CRK) (1755);
(h) intake forced induction (IFI) (4910); and
(i) exhaust forced discharge (EFI) (4990);
wherein:
said CRK (1755) comprises a longitudinal rotation axis (LRA);
said IVD (1752) is coupled to said CRK (1755) and concentric with said LRA;
said EVD (1768) is coupled to said CRK (1755) and concentric with said LRA;
said IEC (1732) and said BLK (1753) each comprise a fixed intake port (IFP) (8941);
said IFP (8941) comprises an annular sectored conical frustum void (1738);
said EEC (1772) and said BLK (1753) each comprise a fixed exhaust port (EFP) (9061);
said EFP (9061) comprises an annular sectored conical frustum void (1778);
said IVD (1752) comprises an intake rotary valve port (IVP) (7351);
said IVP (7351) comprises an intake annular sectored conical frustum void (ISV) configured to control intake airflow from said IEC (1732) IFP (8941) through said BLK (1753) IFP (8941) as said IVD (1752) rotates;
said EVD (1768) comprises an exhaust rotary valve port (EVP) (7659); and
said EVP (7659) comprises an exhaust annular sectored conical frustum void (ESV) configured to control exhaust gas flow from said BLK (1753) EFP (9061) through said EEC (1772) EFP (9061) as said EVD (1768) rotates;
said IFI (4910) comprises an intake cooling water jacket (IWJ) (13711) enclosing an intake centrifugal impeller (CIP) (15217), intake spiral impeller (ISI) (15916), and intake spiral channel (IPC) (15713);
said CIP is coupled to said CRK (1755) along said LRA;
said ISI is coupled to said CRK (1755) along said LRA;
said IFI (4910) is configured to transfer and compress air from said IEC (1732) IFP (8941) to said BLK (1753) IFP (8941);
said EFI (4990) comprises an exhaust cooling water jacket (EWJ) (13591) enclosing an exhaust spiral impeller (ESI) (23396), and exhaust spiral channel (ESC) (15792);
said ESI (23396) is coupled to said CRK (1755) along said LRA; and
said EFI (4990) is configured to transfer exhaust from said BLK (1753) EFP (9061) to said EEC (1772) EFP (9061).

12. The valve system of claim 11 further comprising an intake multi-staged valve (IMV) (1740), said IMV comprising:
(a) intake multi-staged valve blade (IMB) (11342);
(b) intake multi-staged valve spring (IMS) (11343);
(c) intake multi-staged valve diaphragm (IMD) (11344);
(d) intake multi-staged valve housing (IMH) (10545); and
(e) intake fixed multi-staged valve port (IMF) (8147);
wherein:
said IMD (11344) is coupled to said IMB (11342) via said IMS (11343);
said IMH (10545) comprises an intake interior housing void (IHV);
said IMD (11344) is configured to conform to said IHV;
said IMF (8147) comprises a void within said BLK (1753) extending across said BLK (1753) IFP (8941) and configured to allow insertion of said IMB (11342) into said IMF (8147) so as to modulate a cross sectional area of said BLK (1753) IFP (8941); and
said IMB (11342) is configured to engage said IMF (8147) and dynamically modulate said cross sectional area of said BLK (1753) IFP (8941).

13. The valve system of claim 11 further comprising an exhaust multi-staged valve (EMV) (1760), said EMV comprising:
(a) exhaust multi-staged valve blade (EMB) (11662);
(b) exhaust multi-staged valve spring (EMS) (11663);
(c) exhaust multi-staged valve diaphragm (EMD) (11664);
(d) exhaust multi-staged valve housing (EMH) (10665); and
(e) exhaust fixed multi-staged valve port (EMF) (13176);
wherein:
said EMD (11664) is coupled to said EMB (11662) via said EMS (11663);
said EMH (10665) comprises an exhaust interior housing void (EHV);
said EMD (11664) is configured to conform to said EHV;
said EMF (13176) comprises a void within said BLK (1753) extending across said BLK (1753) EFP (9061) and configured to allow insertion of said EMB (11662) into said EMF (13176) so as to modulate a cross sectional area of said BLK (1753) EFP (9061); and
said EMB (11662) is configured to engage said EMF (13176) and dynamically modulate a flow control aperture within said cross sectional area of said BLK (1753) EFP (9061).

14. The valve system of claim 11 further comprising intake sealing (ISP) wherein said ISP comprises:
(a) grooves and ridges (IGR) (8231); and
(b) seals and rings (ISR) (9734);
wherein:
said IGR (8231) is configured on said BLK (1753) IFP (8941); and
said ISR (9734) is configured on said BLK (1753), said ILC (1748), and said IVD (1752).

15. The valve system of claim 11 further comprising exhaust sealing (ESP) wherein said ESP comprises:
(a) grooves and ridges (EGR) (8771); and
(b) seals and rings (ESR) (10474);
wherein:
said EGR (8771) is configured on said BLK (1753) EFP (9061); and
said ESR (10474) is configured on said BLK (1753), said ELC (1778), and said EVD (1768).

16. The valve system of claim 11 wherein said IVD (1752) further comprises grooves and ridges (7937) configured to provide a seal between said IVD (1752) and said IEC (1732) and/or between said IVD (1752) and said BLK (1753).

17. The valve system of claim 11 wherein said EVD (1758) further comprises grooves and ridges (8077) configured to provide a seal between said EVD (1758) and said EEC (1757) and/or between said EVD (1758) and said BLK (1753).

18. The valve system of claim 11 wherein said IVP (7351) and said EVP (7659) are configured anti-symmetrically along said LRA.

19. The valve system of claim 11 wherein:

said IVP (7351) is configured to allow air intake into said BLK (1753) once per revolution of said CRK (1755); and said EVP (7659) is configured to allow exhaust out of said BLK (1753) once per revolution of said CRK (1755).

20. The valve system of claim 11 wherein said IVD (1752) and said EVD (1758) are each mechanically coupled to said CRK (1755) via one or more gears.

21. The valve system of claim 11 further comprising an intake centrifugal advance plate (IAP) (18723);

wherein:

said IAP (18723) is configured to articulate about said LRA;

said IAP (18723) comprises a plurality of advance counter weights (IAW) (18721);

said IAP (18723) comprises a corresponding plurality of centrifugal advance springs (IAS) (18722) for each of said IAW;

said plurality of IAN (18721) are each individually coupled to said IAP (18723) via each of said corresponding plurality of said IAS (18722);

said plurality of IAN (18721) are each rotationally coupled to said IVD (1752) via a pivot on said IVD (1752); and said IAP (18723) comprises an annular sectored conical frustum void configured to control intake airflow from said IEC (1732) IFP (8941) through said BLK (1753) IFP (8941) based on the state of said plurality of said IAN (18721) and said plurality of said IAN (18721) as said IAP (18723) articulates around said LRA.

22. The valve system of claim 11 further comprising an exhaust centrifugal advance plate (EAP) (18883);

wherein:

said EAP (18883) is configured to articulate about said LRA;

said EAP (18883) comprises a plurality of advance counter weights (EAW) (18881);

said EAP (18883) comprises a corresponding plurality of centrifugal advance springs (EAS) (18882) for each of said EAW (18881);

said plurality of EAW (18881) are each individually coupled to said EAP (18883) via each of said corresponding plurality of said EAS (18882);

said plurality of EAW (18881) are each rotationally coupled to said EVD (1758) via a pivot on said EVD (1758); and said EAP (18883) comprises an annular sectored conical frustum void configured to control exhaust flow from said BLK (1753) EFP (9061) through said EEC (1772) EFP (9061) based on the state of said plurality of said EAW (18881) and said plurality of said EAS (18882) as said EAP (18883) articulates around said LRA.

23. A valve method operating on a valve system, said system comprising:

(a) engine block (BLK) (1753);

(b) engine crankcase cover (CKC) (1757);

(c) intake engine block cover (IEC) (1732);

(d) exhaust engine block cover (EEC) (1772);

(e) intake rotary valve disc (IVD) (1752);

(f) exhaust rotary valve disc (EVD) (1758); and (g) crankshaft (CRK) (1755);

wherein:

said CRK (1755) comprises a longitudinal rotation axis (LRA);

said IVD (1752) is coupled to said CRK (1755) and concentric with said LRA;

said EVD (1768) is coupled to said CRK (1755) and concentric with said LRA;

said IEC (1732) and said BLK (1753) each comprise a fixed intake port (IFP) (8941);

said IFP (8941) comprises an annular sectored conical frustum void (1738);

said EEC (1772) and said BLK (1753) each comprise a fixed exhaust port (EFP) (9061);

said EFP (9061) comprises an annular sectored conical frustum void (1778);

said IVD (1752) comprises an intake rotary valve port (IVP) (7351);

said IVP (7351) comprises an intake annular sectored conical frustum void (ISV) configured to control intake airflow from said IEC (1732) IFP (8941) through said BLK (1753) IFP (8941) as said IVD (1752) rotates;

said EVD (1768) comprises an exhaust rotary valve port (EVP) (7659); and said EVP (7659) comprises an exhaust annular sectored conical frustum void (ESV) configured to control exhaust gas flow from said BLK (1753) EFP through said EEC (1772) EFP (9061) as said EVD (1768) rotates;

said method comprising the steps of:

(1) rotating said CRK (1755) around said LRA to position said ISV over said IEC (1732) IFP (8941) so as to allow intake of air and/or fuel to pass from said IEC (1732) through said BLK (1753) IFP (8941);

(2) rotating said CRK (1755) around said LRA to compress an air/fuel mixture within said BLK (1753);

(3) rotating said CRK (1755) around said LRA to ignite an air/fuel mixture within said BLK (1753);

(4) rotating said CRK (1755) around said LRA to expel exhaust gasses from said BLK (1753) EFP (9061) through said EEC (1772) EFP (9061); and (5) proceeding to step (1);

wherein:

said method operates on said CRK (1755) as a four-stroke power cycle.

24. A valve method operating on a valve system, said system comprising:

(a) engine block (BLK) (1753);

(b) engine crankcase cover (CKC) (1757);

(c) intake engine block cover (IEC) (1732);

(d) exhaust engine block cover (EEC) (1772);

(e) intake rotary valve disc (IVD) (1752);

(f) exhaust rotary valve disc (EVD) (1758);

(g) crankshaft (CRK) (1755);

(h) intake forced induction (IFI) (4910); and (i) exhaust forced discharge (EFI) (4990);

wherein:

said CRK (1755) comprises a longitudinal rotation axis (LRA);

said IVD (1752) is coupled to said CRK (1755) and concentric with said LRA;

said EVD (1768) is coupled to said CRK (1755) and concentric with said LRA;

said IEC (1732) and said BLK (1753) each comprise a fixed intake port (IFP) (8941);

said IFP (8941) comprises an annular sectored conical frustum void (1738);

said EEC (1772) and said BLK (1753) each comprise a fixed exhaust port (EFP) (9061);

said EFP (9061) comprises an annular sectored conical frustum void (1778);

said IVD (1752) comprises an intake rotary valve port (IVP) (7351);

said IVP (7351) comprises an intake annular sectored conical frustum void (ISV) configured to control intake airflow from said IEC (1732) IFP (8941) through said BLK (1753) IFP (8941) as said IVD (1752) rotates;

said EVD (1768) comprises an exhaust rotary valve port (EVP) (7659); and said EVP (7659) comprises an exhaust annular sectored conical frustum void (ESV) configured to control exhaust gas flow from said BLK (1753) EFP (9061) through said EEC (1772) EFP (9061) as said EVD (1768) rotates;

said IFI (4910) comprises an intake cooling water jacket (IWJ) (13711) enclosing an intake centrifugal impeller (CIP) (15217), intake spiral impeller (ISI) (15916), and intake spiral channel (IPC) (15713);

said CIP is coupled to said CRK (1755) along said LRA;

said ISI is coupled to said CRK (1755) along said LRA;

said IFI (4910) is configured to transfer and compress air from said IEC (1732) IFP (8941) to said BLK (1753) IFP (8941);

said EFI (4990) comprises an exhaust cooling water jacket (EWJ) (13591) enclosing an exhaust spiral impeller (ESI) (23396), and exhaust spiral channel (ESC) (15792);

said ESI (23396) is coupled to said CRK (1755) along said LRA; and said EFI (4990) is configured to transfer exhaust from said BLK (1753) EFP (9061) to said EEC (1772) EFP (9061);

said method comprising the steps of:

(1) rotating said CRK (1755) around said LRA to position said ISV over said IEC (1732) IFP (8941) so as to allow intake of air and/or fuel to pass from said IEC (1732) through said BLK (1753) IFP (8941);

(2) rotating said CRK (1755) around said LRA to compress an air/fuel mixture within said BLK (1753);

(3) rotating said CRK (1755) around said LRA to ignite an air/fuel mixture within said BLK (1753);

(4) rotating said CRK (1755) around said LRA to expel exhaust gasses from said BLK (1753) EFP (9061) through said EEC (1772) EFP (9061); and (5) proceeding to step (1);

wherein:

said method operates on said CRK (1755) as a four-stroke power cycle.

* * * * *